US010191257B2

(12) United States Patent
Take

(10) Patent No.: US 10,191,257 B2
(45) Date of Patent: Jan. 29, 2019

(54) LENS SYSTEM, OPTICAL APPARATUS AND MANUFACTURING METHOD

(71) Applicant: Nikon Corporation, Tokyo (JP)

(72) Inventor: Toshinori Take, Yokohama (JP)

(73) Assignee: Nikon Corporation, Tokyo (JP)

( * ) Notice: Subject to any disclaimer, the term of this patent is extended or adjusted under 35 U.S.C. 154(b) by 261 days.

(21) Appl. No.: 14/482,682

(22) Filed: Sep. 10, 2014

(65) Prior Publication Data

US 2015/0089793 A1 Apr. 2, 2015

Related U.S. Application Data

(60) Continuation of application No. 13/875,546, filed on May 2, 2013, now abandoned, which is a division of (Continued)

(30) Foreign Application Priority Data

May 27, 2009 (JP) ................................ 2009-127260
May 27, 2009 (JP) ................................ 2009-127261
(Continued)

(51) Int. Cl.
*G02B 15/163* (2006.01)
*G02B 15/14* (2006.01)
(Continued)

(52) U.S. Cl.
CPC .......... *G02B 15/163* (2013.01); *G02B 15/14* (2013.01); *G02B 15/167* (2013.01);
(Continued)

(58) Field of Classification Search
CPC .. G02B 15/163; G02B 15/167; G02B 15/173; G02B 15/20; G02B 15/161
(Continued)

(56) References Cited

U.S. PATENT DOCUMENTS 5,272,564 A 12/1993 Suzuki et al.
5,715,088 A 2/1998 Kenzaburo
(Continued)

FOREIGN PATENT DOCUMENTS

JP 61-270718 A 12/1986
JP 04-001715 A 1/1992
(Continued)

OTHER PUBLICATIONS

Office Action (Notification of Reasons of Rejection) dated Dec. 14, 2012, in Japanese Patent Application No. 2009-127260.
(Continued)

*Primary Examiner* — Zachary Wilkes
(74) *Attorney, Agent, or Firm* — Shapiro, Gabor and Rosenberger, PLLC

(57) ABSTRACT

A lens system having, in order from an object, at least a first lens group G1 having positive refractive power, and second to fourth lens groups G2 to G4, wherein the first lens group G1 includes a front portion lens group G1*a*, and a rear portion lens group G1*b* which is disposed to an image side of the front portion lens group G1*a* with an air distance therebetween, and performs focusing by shifting the rear portion lens group G1*b* in the optical axis direction, and the fourth lens group G4 includes, in order from the object, a negative lens and a positive lens (cemented negative lens L41), a negative lens L42, and an aperture stop S, and is fixed in the optical axis direction with respect to an image plane I upon zooming from a wide angle end state to a telephoto end state.

16 Claims, 208 Drawing Sheets

(EXAMPLE 1)

Related U.S. Application Data application No. 12/788,292, filed on May 26, 2010, now Pat. No. 8,503,097.

(30) Foreign Application Priority Data

May 27, 2009 (JP) ................................ 2009-127262
May 27, 2009 (JP) ................................ 2009-127263

(51) Int. Cl.
*G02B 27/64* (2006.01)
*G02B 15/20* (2006.01)
*G02B 15/167* (2006.01)
*G02B 15/173* (2006.01)

(52) U.S. Cl.
CPC .......... *G02B 15/173* (2013.01); *G02B 15/20* (2013.01); *G02B 27/646* (2013.01); *Y10T 29/49004* (2015.01); *Y10T 29/49826* (2015.01)

(58) Field of Classification Search
USPC ........................................ 359/683, 684, 685
See application file for complete search history.

(56) References Cited

U.S. PATENT DOCUMENTS 6,141,156 A 10/2000 Aoki
6,147,810 A 11/2000 Misaka
7,218,457 B2 5/2007 Sensui
7,224,535 B2 5/2007 Neil
7,505,213 B2 3/2009 Tsutsumi et al.
8,405,915 B2* 3/2013 Hayakawa .......... G02B 15/173 359/676
2003/0053210 A1 3/2003 Shinohara
2003/0103268 A1 6/2003 Nishikawa et al.
2005/0275949 A1 12/2005 Fujimoto et al.
2007/0229966 A1 10/2007 Nakatani et al.
2007/0229971 A1 10/2007 Souma
2008/0247049 A1 10/2008 Inoko
2008/0259454 A1* 10/2008 Nanba ................. G02B 15/173 359/676
2008/0297901 A1 12/2008 Shinichi
2010/0214667 A1 8/2010 Hayakawa

FOREIGN PATENT DOCUMENTS

JP 05-048937 A 2/1993
JP 06-130330 A 5/1994
JP 07-294817 A 11/1995
JP 08-062541 A 3/1996
JP 08-136863 A 5/1996
JP 10-282413 A 10/1998
JP 11-44848 A 2/1999
JP 11-142738 A 5/1999
JP 11-223770 A 8/1999
JP 11-258504 A 9/1999
JP 2001-75008 A 3/2001
JP 2002-296502 A 10/2002
JP 2003-241096 A 8/2003
JP 2003-241098 A 8/2003
JP 2004-61679 A 2/2004
JP 2004-109559 A 4/2004
JP 2004-212612 A 7/2004
JP 2005-284097 A 10/2005
JP 2005-352057 A 12/2005
JP 2007-003600 A 1/2007
JP 2007-192858 A 8/2007
JP 2007-219040 A 8/2007
JP 2007-264174 A 10/2007
JP 2007-279077 A 10/2007
JP 2008-257005 A 10/2008

OTHER PUBLICATIONS

Office Action (Notification of Reasons of Rejection) dated Dec. 14, 2012, in Japanese Patent Application No. 2009-127261.
Office Action (Notification of Reasons of Rejection) dated Dec. 14, 2012, in Japanese Patent Application No. 2009-127263.

* cited by examiner (EXAMPLE 1)

COMA ABERRATION

COMA ABERRATION

COMA ABERRATION (EXAMPLE 2)

(EXAMPLE 3)

(EXAMPLE 4)

(EXAMPLE 5)

(EXAMPLE 6)

COMA ABERRATION

COMA ABERRATION

COMA ABERRATION (EXAMPLE 7)

(EXAMPLE 8)

(EXAMPLE 9)

(EXAMPLE 10)

(EXAMPLE 11)

(EXAMPLE 12)

COMA ABERRATION

COMA ABERRATION

COMA ABERRATION (EXAMPLE 13)

(EXAMPLE 14)

COMA ABERRATION

COMA ABERRATION

COMA ABERRATION (EXAMPLE 15)

COMA ABERRATION

COMA ABERRATION

COMA ABERRATION (EXAMPLE 16)

(EXAMPLE 17)

(EXAMPLE 18)

(EXAMPLE 19)

(EXAMPLE 20)

(EXAMPLE 21)

COMA ABERRATION

COMA ABERRATION

COMA ABERRATION (EXAMPLE 22)

(EXAMPLE 23)

(EXAMPLE 24)

(EXAMPLE 25)

(EXAMPLE 26)

(EXAMPLE 27)

LENS SYSTEM, OPTICAL APPARATUS AND MANUFACTURING METHOD

INCORPORATION BY REFERENCE

This invention claims the benefit of Japanese Patent Application Nos. 2009-127260, 2009-127261, 2009-127262 and 2009-127263 which are hereby incorporated by reference.

TECHNICAL FIELD AND BACKGROUND

The present invention relates to a lens system that is used for an optical apparatus such as a digital still camera.

As a focusing method for a high zoom ratio optical system, a front lens feed method for feeding a lens group disposed closest to the object (e.g. see Japanese Laid-Open Patent Publication No. H11-258504) and an internal focusing method (e.g. see Japanese Laid-Open Patent Publication No. 2004-212612) have been known.

However if focusing is attempted using the conventional front lens feed method, the support mechanism and driver mechanism of the focusing lens group tend to be large, since the large and heavy lens group that is disposed closest to the object is normally moved.

The total length of the lens system also tends to increase upon focusing on an object at close distance.

If the conventional internal focusing method is used, an advantage is that the support mechanism and drive mechanism of the focusing lens group can be compact, since the focusing lens group is a second or subsequent lens group, which is lighter than the first lens group disposed closest to the object. However in the case of the internal focusing method, the focusing mechanism tends to become complicated, since focusing cannot be performed on objects at a same photographic distance with a same feed amount throughout the entire zooming range from the wide angle end state to the telephoto end state.

Further, in order to prevent a photographic error due to an image blur caused by hand motion, it is desired that the above mentioned high zoom ratio zoom lens has an image blur correction function, which corrects an image blur on the image plane by setting all or a part of one lens group, out of the lens group constituting the lens system, as a shift lens group, and shifting the shift lens group so as to have a component approximately orthogonal to the optical axis, according to a value that is output by a detection system for detecting a blur of the lens system. Generally for a shift lens group, it is preferable to select a lens group located near a diaphragm where the abaxial flux of light passes near the optical axis upon zooming, so as to minimize the performance deterioration during lens shift.

Moreover many optical systems with high zoom ratios have a vibration proof function for correcting an image blur on an image plane by decentering all or a part of one lens group, out of the lens groups constituting the lens system, as a shift lens group, in order to prevent photographic errors due to an image blur caused by hand motion. However if a lens group which moves during zooming, is decentered for the purpose of vibration proofing as in the case of a conventional optical system, the optical performance may dramatically drop, which makes it impossible to obtain good images.

SUMMARY OF THE INVENTION

It is an object of the present invention to provide a lens system, an optical apparatus and a manufacturing method which can simultaneously implement a decrease in the total length of the lens system, and simplification of the focusing mechanism by appropriately setting the arrangement of the focusing lens group.

It is another object of the present invention to provide a lens system, an optical apparatus and a manufacturing method which can shift images, having an excellent image forming performance even if the shift lens group is shifted, by appropriately setting the arrangement of the shift lens group and aperture stop.

It is still another object of the present invention to provide a lens system, an optical apparatus and a manufacturing method which can minimize the influence of decentering so as to prevent the deterioration of performance.

A first aspect of the present invention is a lens system comprising, in order from an object, a first lens group having positive refractive power, and second to fourth lens groups, wherein the first lens group includes a front portion lens group, and a rear portion lens group disposed to an image side of the front portion lens group with an air distance therebetween, and performs focusing by shifting the rear portion lens group in an optical axis direction, and the fourth lens group includes, in order from the object, a negative lens, a positive lens, a negative lens and an aperture stop, and is fixed in the optical axis direction with respect to an image plane upon zooming from a wide angle end state to a telephoto end state.

In the first aspect of the present invention, it is preferable that the fourth lens group has, in order from the object, a cemented lens of a negative lens and a positive lens, a negative lens and an aperture stop.

In the first aspect of the present invention, it is preferable that the fourth lens group has, in order from the object, a cemented lens of a negative lens having a concave surface facing the object and a positive lens having a concave surface facing the image, a negative lens having a concave surface facing the object, and an aperture stop.

In the first aspect of the present invention, it is preferable that the fourth lens group has negative refractive power.

In the first aspect of the present invention, it is preferable that the conditional expression $1.30<ft/f1b<3.10$ is satisfied, where ft denotes a focal length of the total lens system in the telephoto end state, and f1b denotes a focal length of the rear portion lens group of the first lens group.

In the first aspect of the present invention, it is preferable that the second lens group has negative refractive power.

In the first aspect of the present invention, it is preferable that the conditional expression $0.23<|f2/f4|<0.88$ is satisfied, where f2 denotes a focal length of the second lens group and f4 denotes a focal length of the fourth lens group.

In the first aspect of the present invention, it is preferable that at least one of the front portion lens group and the rear portion lens group of the first lens group has positive refractive power.

In the first aspect of the present invention, it is preferable that the rear portion lens group of the first lens group has positive refractive power.

In the first aspect of the present invention, it is preferable that the conditional expression $0.90<TL/f1b<2.48$ is satisfied, where TL denotes a total length of the lens system in the telephoto end state, and f1b denotes a focal length of the rear portion lens group of the first lens group.

In the first aspect of the present invention, it is preferable that the first lens group is fixed in the optical axis direction with respect to the image plane upon focusing on infinity in zooming from the wide angle end state to the telephoto end state.

In the first aspect of the present invention, it is preferable that the fourth lens group is fixed in the optical axis direction with respect to the image plane upon zooming from the wide angle end state to the telephoto end state.

In the first aspect of the present invention, it is preferable that the conditional expression $0.59<TL/ft<0.70$ is satisfied, where TL denotes a total length of the lens system in the telephoto end state, and ft denotes a focal length of the total lens system in the telephoto end state.

In the first aspect of the present invention, it is preferable that the third lens group has positive refractive power.

In the first aspect of the present invention, it is preferable that the third lens group has at least one aspherical surface.

In the first aspect of the present invention, it is preferable that all or a part of the fourth lens group is shifted so as to have a component orthogonal to the optical axis.

It is preferable that the first aspect of the present invention has a fifth lens group and a sixth lens group which are disposed to an image side of the fourth lens group, wherein the first lens group has positive refractive power, the second lens group has negative refractive power, the third lens group has positive refractive power, the fourth lens group has negative refractive power, the fifth lens group has positive refractive power, and the sixth lens group has negative refractive power.

It is preferable that the first aspect of the present invention has a fifth lens group which is disposed to an image side of the fourth lens group, wherein the fifth lens group has positive refractive power.

In this case, it is preferable that the conditional expression $0.40<|f2/f5|<1.00$ is satisfied, where f2 denotes a focal length of the second lens group, and f5 denotes a focal length of the fifth lens group.

It is also preferable that the fifth lens group, in order from the object, a positive lens component, a negative lens component, and a positive lens component, and the aperture stop is disposed to the object side of the fifth lens group.

It is also preferable that the fifth lens group further comprises, in order from the object, a cemented lens of a positive lens and a negative lens, and a positive lens.

It is also preferable that the fifth lens group has at least one aspherical surface.

It is also preferable that this lens system has a sixth lens group which is disposed to an image side of the fifth lens group, and the sixth lens group has negative refractive power.

An optical apparatus according to the present invention is an optical apparatus having a lens system for forming an image of an object on a predetermined image plane, wherein the lens system is the lens system according to the first aspect of the present invention.

A second aspect of the present invention is a lens system having, in order from an object, an "a" lens group having positive refractive power, a "b" lens group having negative refractive power, and a "c" lens group having positive refractive power, wherein an aperture stop is disposed between the "b" lens group and the "c" lens group, and all or a part of the "b" lens group is shifted so as to have a component orthogonal to the optical axis.

In the second aspect of the present invention, it is preferable that the "b" lens group is fixed in an optical axis direction with respect to an image plane upon zooming from a wide angle end state to a telephoto end state.

In the second aspect of the present invention, it is preferable that the aperture stop is integrated with the "b" lens group upon zooming from the wide angle end state to the telephoto end state.

In the second aspect of the present invention, it is preferable that the "b" lens group is a fourth lens group from the object side.

In the second aspect of the present invention, it is preferable that a second lens group, which is the second lens group from the object side, has negative refractive power, and the conditional expression $0.43<(-f2)/fc<1.00$ is satisfied, where f2 denotes a focal length of the second lens group, and fc denotes a focal length of the "c" lens group.

In the second aspect of the present invention, it is preferable that the second lens group, which is the second lens group from the object side, has negative refractive power, and the conditional expression $0.23<(-f2)/(-fb)<0.88$ is satisfied, where f2 denotes a focal length of the second lens group, and fb denotes a focal length of the "b" lens group.

In the second aspect of the present invention, it is preferable that a first lens group, which is disposed closest to the object, includes a front portion lens group, and a rear portion lens group disposed to an image side of the front portion lens group with an air distance therebetween.

In this case, it is preferable that the conditional expression $1.30<ft/f1b<3.10$ is satisfied, where ft denotes a focal length of the total lens system in the telephoto end state, and f1b denotes a focal length of the rear portion lens group of the first lens group.

It is also preferable that focusing is performed by shifting the rear portion lens group of the first lens group in the optical axis direction.

An optical apparatus according to the present invention is an optical apparatus having a lens system for forming an image of an object on a predetermined image plane, wherein the lens system is the lens system according to the second aspect of the present invention.

A third aspect of the present invention is a lens system comprising, in order from an object, first to fifth lens groups, wherein the first lens group includes a front portion lens group, and a rear portion lens group disposed to an image side of the front portion lens group with an air distance therebetween, and performs focusing by shifting the rear portion lens group in an optical axis direction, and the fifth lens group includes, in order from the object, a positive lens component, a negative lens component and a positive lens component, and an aperture stop is disposed to the object side of the fifth lens group.

A fourth aspect of the present invention is a lens system comprising, in order from an object, first to fifth lens groups, wherein the first lens group is divided into at least two subgroups, a front portion lens group, which is a subgroup closest to the object our of the subgroups, has positive refractive power, and focusing is performed by shifting a rear portion lens group, which is a subgroup closest to an image out of the subgroups, in an optical axis direction, and the conditional expression $0.59<TL/ft<0.70$ is satisfied, where TL denotes a total length of the lens system in a telephoto end state, and ft denotes a focal length of the total lens system in the telephoto end state.

Now configuration of a manufacturing method according to the present invention will be described.

A first manufacturing method of the present invention is a manufacturing method for a lens system which comprises, in order from an object, a first lens group having positive refractive power, and second to fourth lens groups, wherein operation is confirmed after each lens is assembled in a lens barrel so that the first lens group includes a front portion lens group, and a rear portion lens group disposed to an image side of the front portion lens group with an air distance therebetween, and performs focusing by shifting the rear portion lens group in an optical axis direction, and the fourth lens group includes, in order from the object, a negative lens, a positive lens, a negative lens and an aperture stop, and is fixed in the optical axis direction with respect to an image plane upon zooming from a wide angle end state to a telephoto end state.

In this manufacturing method, it is preferable that the fourth lens group further has, in order from the object, a cemented lens of a negative lens and a positive lens, a negative lens, and an aperture stop.

In the first manufacturing method, it is preferable that the conditional expression $1.30<ft/f1b<3.10$ is satisfied, where ft denotes a focal length of the total lens system in the telephoto end state, and f1b denotes a focal length of the rear portion lens group of the first lens group.

In the first manufacturing method, it is preferable that the following conditional expression $0.23<|f2/f4|<0.88$ is satisfied, where f2 denotes a focal length of the second lens group and f4 denotes a focal length of the fourth lens group.

A second manufacturing method of the present invention is a manufacturing method for a lens system which has, in order from an object, an "a" lens group having positive refractive power, a "b" lens group having negative refractive power, and a "c" lens group having positive refractive power, wherein operation is confirmed after each lens is assembled in a lens barrel so that an aperture stop is disposed between the "b" lens group and the "c" lens group, and all or a part of the "b" lens group is shifted so as to have a component orthogonal to the optical axis.

A third manufacturing method of the present invention is a manufacturing method for a lens system which comprises, in order from an object, first to fifth lens groups, wherein operation is confirmed after each lens is assembled in a lens barrel so that the first lens group includes a front portion lens group, and a rear portion lens group disposed to an image side of the front portion lens group with an air distance therebetween, and performs focusing by shifting the rear portion lens group in an optical axis direction, the fifth lens group includes, in order from the object, a positive lens component, a negative lens component, and a positive lens component, and an aperture stop is disposed to the object side of the fifth lens group.

A fourth manufacturing method of the present invention is a manufacturing method for a lens system which comprises, in order from an object, first to fifth lens groups, wherein operation is confirmed after each lens is assembled in a lens barrel so that the first lens group is divided into at least two subgroups, a front portion lens group, which is a subgroup closest to the object out of the subgroups, has positive refractive power, focusing is performed by shifting a rear portion lens group, which is a subgroup closest to an image out of the subgroups, in an optical axis direction, and the conditional expression $0.59<TL/ft>0.70$ is satisfied, where TL denotes a total length of the lens system in a telephoto end state, and ft denotes a focal length of the total lens system in the telephoto end state.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 3 are graphs showing various aberrations of the lens system according to Example 1 upon focusing on infinity, where

FIG. 4 are graphs showing coma aberrations of the lens system according to Example 1 in the lens shift state (0.4 mm) upon focusing on infinity, where

FIG. 5 are graphs showing various aberrations of the lens system according to Example 1 upon close distance focusing, where

FIG. 7 are graphs showing various aberrations of the lens system according to Example 2 upon focusing on infinity, where

FIG. 8 are graphs showing coma aberrations of the lens system according to Example 2 in the lens shift state (0.4 mm) upon focusing on infinity, where

FIG. 9 are graphs showing various aberrations of the lens system according to Example 2 upon close distance focusing, where

FIG. 11A shows the wide angle end state, FIG. 11B shows the intermediate focal length state, and FIG. 11C shows the telephoto end state;

FIG. 12 are graphs showing various aberrations of the lens system according to Example 3 upon close distance focusing, where

FIG. 14 are graphs showing various aberrations of the lens system according to Example 4 upon focusing on infinity, where

FIG. 15 are graphs showing various aberrations of the lens system according to Example 4 upon close distance focusing, where

FIG. 17 are graphs showing various aberrations of the lens system according to Example 5 upon focusing on infinity, where

FIG. 18 are graphs showing various aberrations of the lens system according to Example 5 upon close distance focusing, where

FIG. 20 are graphs showing various aberrations of the lens system according to Example 6 upon focusing on infinity, where

FIG. 21 are graphs showing coma aberrations of the lens system according to Example 6 in the lens shift state (0.4 mm) upon focusing on infinity, where

FIG. 22 are graphs showing various aberrations of the lens system according to Example 6 upon close distance focusing, where

FIG. 24 are graphs showing various aberrations of the lens system according to Example 7 upon focusing on infinity, where

FIG. 25 are graphs showing coma aberrations of the lens system according to Example 7 in the lens shift state (0.4 mm) upon focusing on infinity, where

FIG. 26 are graphs showing various aberrations of the lens system according to Example 7 upon close distance focusing, where

FIG. 28 are graphs showing various aberrations of the lens system according to Example 8 upon focusing on infinity, where

FIG. 29 are graphs showing coma aberrations of the lens system according to Example 8 in the lens shift state (0.4 mm) upon focusing on infinity, where

FIG. 30 are graphs showing various aberrations of the lens system according to Example 8 upon close distance focusing, where

FIG. 32 are graphs showing various aberrations of the lens system according to Example 9 upon focusing on infinity, where

FIG. 33 are graphs showing coma aberrations of the lens system according to Example 9 in the lens shift state (0.4 mm) upon focusing on infinity, where

FIG. 34 are graphs showing various aberrations of the lens system according to Example 9 upon close distance focusing, where

FIG. 36 are graphs showing various aberrations of the lens system according to Example 10 upon focusing on infinity, where

FIG. 37 are graphs showing coma aberrations of the lens system according to Example 10 in the lens shift state (0.4 mm) upon focusing on infinity, where

FIG. 38 are graphs showing various aberrations of the lens system according to Example 10 upon close distance focusing, where

FIG. 40 are graphs showing various aberrations of the lens system according to Example 11 upon focusing on infinity, where

FIG. 41 are graphs showing coma aberrations of the lens system according to Example 11 in the lens shift state (0.4 mm) upon focusing on infinity, where

FIG. 42 are graphs showing various aberrations of the lens system according to Example 11 upon close distance focusing, where

FIG. 44 are graphs showing various aberrations of the lens system according to Example 12 upon focusing on infinity, where

FIG. 45 are graphs showing coma aberrations of the lens system according to Example 12 in the lens shift state (0.4 mm) upon focusing on infinity, where

FIG. 46 are graphs showing various aberrations of the lens system according to Example 12 upon close distance focusing, where

FIG. 48 are graphs showing various aberrations of the lens system according to Example 13 upon focusing on infinity, where

FIG. 49 are graphs showing coma aberrations of the lens system according to Example 13 in the lens shift state (0.4 mm) upon focusing on infinity, where

FIG. 50 are graphs showing various aberrations of the lens system according to Example 13 upon close distance focusing, where

FIG. 52 are graphs showing various aberrations of the lens system according to Example 14 upon focusing on infinity, where

FIG. 53 are graphs showing coma aberrations of the lens system according to Example 14 in the lens shift state (0.4 mm) upon focusing on infinity, where

FIG. 54 are graphs showing various aberrations of the lens system according to Example 14 upon close distance focusing, where

FIG. 56 are graphs showing various aberrations of the lens system according to Example 15 upon focusing on infinity, where

FIG. 57 are graphs showing coma aberrations of the lens system according to Example 15 in the lens shift state (0.4 mm) upon focusing on infinity, where

FIG. 58 are graphs showing various aberrations of the lens system according to Example 15 upon close distance focusing, where

FIG. 60 are graphs showing various aberrations of the lens system according to Example 16 upon focusing on infinity, where

FIG. 61 are graphs showing various aberrations of the lens system according to Example 16 upon close distance focusing, where

FIG. 63 are graphs showing various aberrations of the lens system according to Example 17 upon focusing on infinity, where

FIG. 64 are graphs showing various aberrations of the lens system according to Example 17 upon close distance focusing, where

FIG. 66 are graphs showing various aberrations of the lens system according to Example 18 upon focusing on infinity, where

FIG. 67 are graphs showing various aberrations of the lens system according to Example 18 upon close distance focusing, where

FIG. 69 are graphs showing various aberrations of the lens system according to Example 19 upon focusing on infinity, where

FIG. 70 are graphs showing various aberrations of the lens system according to Example 19 upon close distance focusing, where

FIG. 72 are graphs showing various aberrations of the lens system according to Example 20 upon focusing on infinity, where

FIG. 73 are graphs showing various aberrations of the lens system according to Example 20 upon close distance focusing, where

FIG. 75 are graphs showing various aberrations of the lens system according to Example 21 upon focusing on infinity, where

FIG. 76 are graphs showing coma aberrations of the lens system according to Example 21 in the lens shift state (0.4 mm) upon focusing on infinity, where

FIG. 77 are graphs showing various aberrations of the lens system according to Example 21 upon close distance focusing, where

FIG. 79 are graphs showing various aberrations of the lens system according to Example 22 upon focusing on infinity, where

FIG. 80 are graphs showing various aberrations of the lens system according to Example 22 upon close distance focusing, where

FIG. 82 are graphs showing various aberrations of the lens system according to Example 23 upon focusing on infinity, where

FIG. 83 are graphs showing various aberrations of the lens system according to Example 23 upon close distance focusing, where

FIG. 85 are graphs showing various aberrations of the lens system according to Example 24 upon focusing on infinity, where

FIG. 86 are graphs showing various aberrations of the lens system according to Example 24 upon close distance focusing, where

FIG. 88 are graphs showing various aberrations of the lens system according to Example 25 upon focusing on infinity, where

FIG. 89 are graphs showing various aberrations of the lens system according to Example 25 upon close distance focusing, where

FIG. 91 are graphs showing various aberrations of the lens system according to Example 26 upon focusing on infinity, where

FIG. 92 are graphs showing various aberrations of the lens system according to Example 26 upon close distance focusing, where

FIG. 94 are graphs showing various aberrations of the lens system according to Example 27 upon focusing on infinity, where

FIG. 95 are graphs showing various aberrations of the lens system according to Example 27 upon close distance focusing, where

DESCRIPTION OF THE PREFERRED EMBODIMENTS

First Embodiment Group

Figure 1:
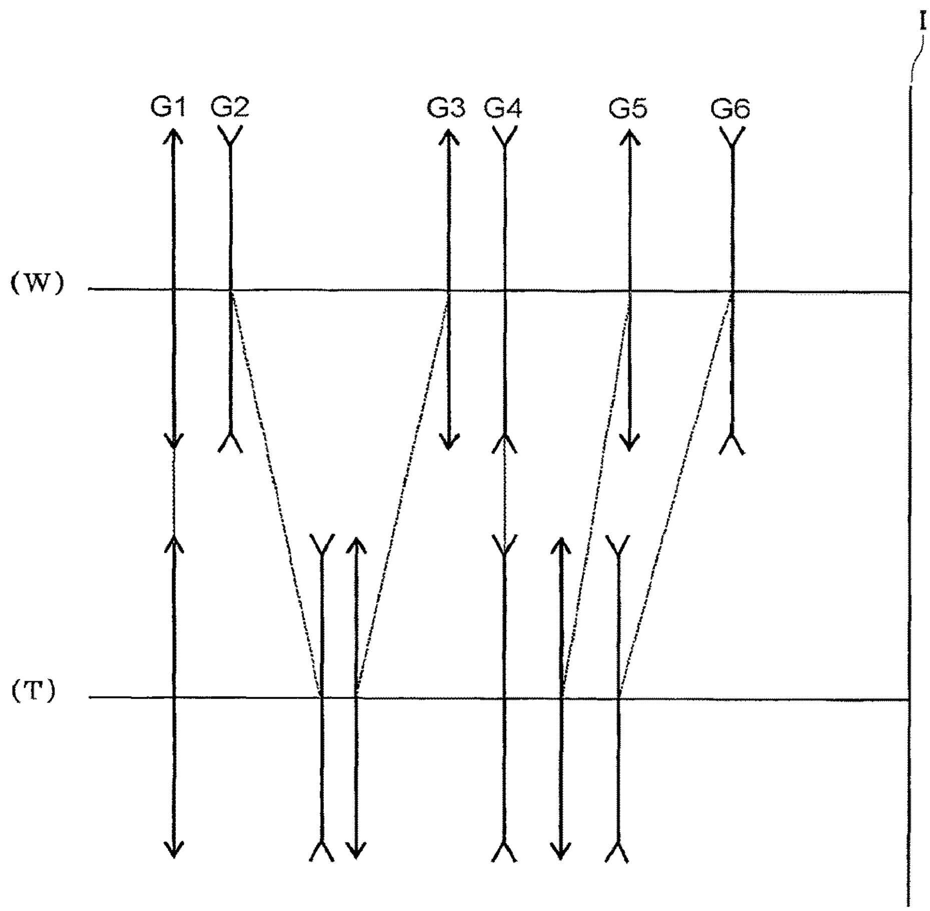
FIG. 1 is a diagram depicting an allocation of refractive power in a lens system according to each example of the present invention, and shifting state of each lens group upon changing of a focal distance state from the wide angle end state to the telephoto end state.

A lens system according to a first embodiment group of the present invention will now be described with reference to the drawings. A lens system of the present embodiment has, in order from an object, at least a first lens group having positive refractive power and second to fourth lens groups, wherein the first lens group has a front portion lens group, and a rear portion lens group disposed to an image side of the front portion lens group with an air distance therebetween, and performs focusing by shifting the rear portion lens group in the optical axis direction, and the fourth lens group has, in order from the object, a negative lens, a positive lens, a negative lens and an aperture stop, and is fixed in the optical axis direction with respect to the image plane upon zooming from the wide angle end state to the telephoto end state.

In the case of the lens system of the present embodiment, which is comprised of a plurality of lens groups, an optical system having a high zoom ratio can be easily constructed. Since the first lens group has positive refractive power, a decrease in total length and a correction of distortion can be implemented in a balanced manner. The first lens group is divided into at least two groups, that is the front portion lens group and the rear portion lens group disposed to the image side of the front portion lens group with an air distance therebetween, and focusing is performed using the rear portion lens group, therefore the focusing mechanism can be simplified, and as a result, focusing speed can be increased. At the same time, a close distance fluctuation of spherical aberration and curvature of field due to focusing can be minimized. Further, objects in a same photographic distance can be focused on with a same feed amount throughout the entire zooming area from the wide angle end state to the telephoto end state. The fourth lens group has, in order from the object, a negative lens, a positive lens, a negative lens and an aperture lens, and is fixed in the optical axis direction with respect to the image plane upon zooming from the wide angle end state to the telephoto end state, whereby the spherical aberration and curvature of field can be corrected well. Disposing the aperture stop to the image side of the fourth lens group, like the case of the present embodiment, makes it easier to correct distortion. And disposing the diaphragm closer to a lens mount than an image blur correction mechanism can simplify the diaphragm mechanism.

In the lens system according to the present embodiment, it is preferable that the fourth lens group has, in order from the object, a cemented lens of a negative lens and a positive lens, a negative lens, and an aperture stop, in order to correct the spherical aberration and curvature of field well.

In the lens system according to the present embodiment, it is preferable that the fourth lens group has, in order from the object, a cemented lens of a negative lens having a concave surface facing the object and a positive lens having a concave surface facing the image, a negative lens having a concave surface facing the object, and an aperture stop, in order to correct the spherical aberration and curvature of field well.

In the lens system according to the present embodiment, it is preferable that the fourth lens group has negative refractive power in order to correct the spherical aberration well.

In the lens system according to the present embodiment, it is preferable that the following conditional expression (1) is satisfied, where ft denotes a focal length of the total lens system in the telephoto end state, and f1b denotes a focal length of the rear portion lens group of the first lens group.

$$1.30<ft/f1b<3.10 \quad (1)$$

The conditional expression (1) is a conditional expression for specifying an appropriate range of the ratio of the focal length of the total lens system in the telephoto end state and the focal length of the rear portion lens group of the first lens group that is disposed closest to the image. If the upper limit of the conditional expression (1) is exceeded, the refractive power of the rear portion lens group becomes relatively high. As a result, an aberration fluctuation of the coma aberration and a curvature of field upon focusing increases, which is not desirable. If the lower limit of the conditional expression (1) is not reached, the refractive power of the rear portion lens group becomes relatively low. This is advantageous in terms of aberration correction, but increase the shift distance of the focusing lens group, which makes it difficult to balance decreasing size and increase performance. As a result, the total lens length increases, which runs against the intention of the present invention, and is therefore not desirable.

In order to ensure the effect of the present embodiment, it is preferable to set the upper limit of the conditional expression (1) to 2.95. In order to further ensure the effect of the present embodiment, it is preferable to set the upper limit of the conditional expression (1) to 2.80. In order to further ensure the effect of the present embodiment, it is preferable to set the upper limit of the conditional expression (1) to 2.65.

In order to ensure the effect of the present embodiment, it is preferable to set the lower limit of the conditional expression (1) to 1.50. In order to further ensure the effect of the present embodiment, it is preferable to set the lower limit of the conditional expression (1) to 1.70. In order to further ensure the effect of the present embodiment, it is preferable to set the lower limit of the conditional expression (1) to 1.90.

In the lens group according to the present embodiment, it is preferable that the second lens group has negative refractive power, in order to correct the coma aberration and curvature of field well.

In the lens system according to the present embodiment, it is preferable that the following conditional expression (2) is satisfied, where f2 denotes a focal length of the second lens group, and f4 denotes a focal length of the fourth lens group.

$$0.23<|f2/f4|<0.88 \quad (2)$$

The conditional expression (2) is a conditional expression for specifying an appropriate range of the ratio of the focal lengths of the second lens group and the fourth lens group. If the upper limit of the conditional expression (2) is exceeded, the refractive power of the second lens group becomes relatively low, and the fluctuation of the coma aberration generated in the second lens group upon zooming increases. The refractive power of the fourth lens group becomes relatively high, and the shift distance increases upon zooming, and a fluctuation of curvature of field generated in the fourth lens group increases. As a result, it becomes difficult to suppress the deterioration of performance in the total zooming range from the wide angle end state to the telephoto end state.

If the lower limit of the conditional expression (2) is not reached, the refractive power of the second lens group becomes relatively high, and correction of coma aberration becomes insufficient. Since the second lens group cannot contribute efficiently to zooming, a high zoom ratio, about 4 times or more, cannot be secured. Further, the refractive power of the fourth lens group becomes relatively low, and spherical aberration and curvature of field, which are generated in the fourth lens group, increase excessively, which makes it difficult to achieve the object of the present invention, that is, implementing excellent optical performance.

In order to ensure the effect of the present embodiment, it is preferable to set the upper limit of the conditional expression (2) to 0.80. In order to further ensure the effect of the present embodiment, it is preferable to set the upper limit of the conditional expression (2) to 0.75. In order to further ensure the effect of the present embodiment, it is preferable to set the upper limit of the conditional expression (2) to 0.70.

In order to ensure the effect of the present embodiment, it is preferable to set the lower limit of the conditional expression (2) to 0.30. In order to further ensure the effect of the present invention, it is preferable to set the lower limit of the conditional expression (2) to 0.35. In order to further ensure the effect of the present embodiment, it is preferable to set the lower limit of the conditional expression (2) to 0.40.

It is preferable that the lens system according to the present embodiment has a fifth lens group which is disposed to the image side of the fourth lens group, and the following conditional expression (3) is satisfied, where f2 denotes a focal length of the second lens group, and f5 denotes a focal length of the fifth lens group.

$$0.40<|f2/f5|<1.00 \quad (3)$$

The conditional expression (3) is a conditional expression for specifying an appropriate range of the ratio of the focal lengths of the second lens group and the fifth lens group. If the upper limit of the conditional expression (3) is exceeded, the refractive power of the second lens group becomes relatively low, and the fluctuation of the coma aberration generated in the second lens group upon zooming increases. The refractive power of the fifth lens group becomes relatively high, and the shift distance increases upon zooming, and a fluctuation of spherical aberration generated in the fifth lens group increases. As a result, it becomes difficult to suppress the deterioration of performance in the total zooming range from the wide angle end state to the telephoto end state.

If the lower limit of the conditional expression (3) is not reached, the refractive power of the second lens group becomes relatively high, and since the second lens group cannot contribute efficiently to zooming, high zoom ratio, about four times or more, cannot be secured. Further, the refractive power of the fifth lens group becomes relatively low, and spherical aberration and coma aberration, which are generated in the fifth lens group, increased excessively, which makes it difficult to achieve the objective of the present invention, that is, implementing excellent optical performance.

In order to ensure the effect of the present embodiment, it is preferable to set the upper limit of the conditional expression (3) to 0.95. In order to further ensure the effect of the present embodiment, it is preferable to set the upper limit of the conditional expression (3) to 0.90. In order to further ensure the effect of the present embodiment, it is preferable to set the upper limit of the conditional expression (3) to 0.85.

In order to ensure the effect of the present embodiment, it is preferable to set the lower limit of the conditional expression (3) to 0.50. In order to further ensure the effect of the present embodiment, it is preferable to set the lower limit of the conditional expression (3) to 0.55. In order to further ensure the effect of the present embodiment, it is preferable to set the lower limit of the conditional expression (3) to 0.60.

In the lens system according to the present embodiment, it is preferable that at least one of the front portion lens group and the rear portion lens group of the first lens group has positive refractive power. In order to decrease the total length and minimize the generation of distortion, it is preferable that the front portion lens group of the first lens group has positive refractive power. In order to minimize close distance fluctuation of the spherical aberration and curvature of field due to focusing, it is preferable that the rear portion lens group of the first lens group has positive refractive power.

In the lens system according to the present embodiment, it is preferable that the following conditional expression (4) is satisfied, where TL denotes a total length of the lens system in the telephoto end state, and f1b denotes a focal length of the rear portion lens group of the first lens group.

$$0.90<TL/f1b>2.48 \qquad (4)$$

The conditional expression (4) is a conditional expression for specifying an appropriate range of the ratio of the total length of the lens system and the focal length of the rear portion lens group of the first lens group which is disposed closest to the object. If the upper limit of the conditional expression (4) is exceeded, the refractive power of the rear portion lens group becomes relatively high. As a result, aberration fluctuation of coma aberration and curvature of field upon focusing increases, which is not desirable. If the lower limit of the conditional expression (4) is not reached, the refractive power of the rear portion lens group becomes relatively low. This is advantageous in terms of aberration correction, but increases the shift distance of the focusing lens group, which makes it difficult to balance decreasing size and increasing performance. As a result, the total lens length increases, which runs against the intention of the present invention, and is therefore not desirable.

In order to ensure the effect of the present embodiment, it is preferable to set the upper limit of the conditional expression (4) to 2.20. In order to further ensure the effect of the present embodiment, it is preferable to set the upper limit of the conditional expression (4) to 1.90. In order to further ensure the effect of the present embodiment, it is preferable to set the upper limit of the conditional expression (4) to 1.75.

In order to ensure the effect of the present embodiment, it is preferable to set the lower limit of the conditional expression (4) to 1.00. In order to further ensure the effect of the present embodiment, it is preferable to set the lower limit of the conditional expression (4) to 1.10. In order to further ensure the effect of the present embodiment, it is preferable to set the lower limit of the conditional expression (4) to 1.20.

In the lens system according to the present embodiment, it is preferable that the first lens group is fixed in the optical axis direction with respect to the image plane upon focusing on infinity in zooming from the wide angle end state to the telephoto end state in order to reduce performance deterioration due to decentering, and particularly to minimize deterioration of curvature of field and implement good optical performance.

It is preferable that the lens system according to the present embodiment has a fifth lens group and a sixth lens group which are disposed to the image side of the fourth lens group, wherein the first lens group has positive refractive power, the second lens group has negative refractive power, the third lens group has positive refractive power, the fourth lens group has negative refractive power, the fifth lens group has positive refractive power, and the sixth lens group has negative refractive power, in order to correct spherical aberration, coma aberration and curvature of field well, and implement excellent optical performance with high zoom ratio.

In the lens system according to the present embodiment, it is preferable that all or a part of the fourth lens group is shifted so as to have a component orthogonal to the optical axis, and thereby image blur on the image plane is corrected when motion blur is generated, in order to correct the image well during lens shift, and spherical aberration, sine condition and Petzval sum are corrected well. The spherical aberration and sine condition are corrected for suppressing decentering coma aberration which is generated in the center area of the screen when the shift lens group is shifted approximately orthogonal to the optical axis. The Petzval sum is corrected for suppressing curvature of field which is generated in the peripheral area of the screen when the shift lens group is shifted approximately orthogonal to the optical axis.

Figure 96:
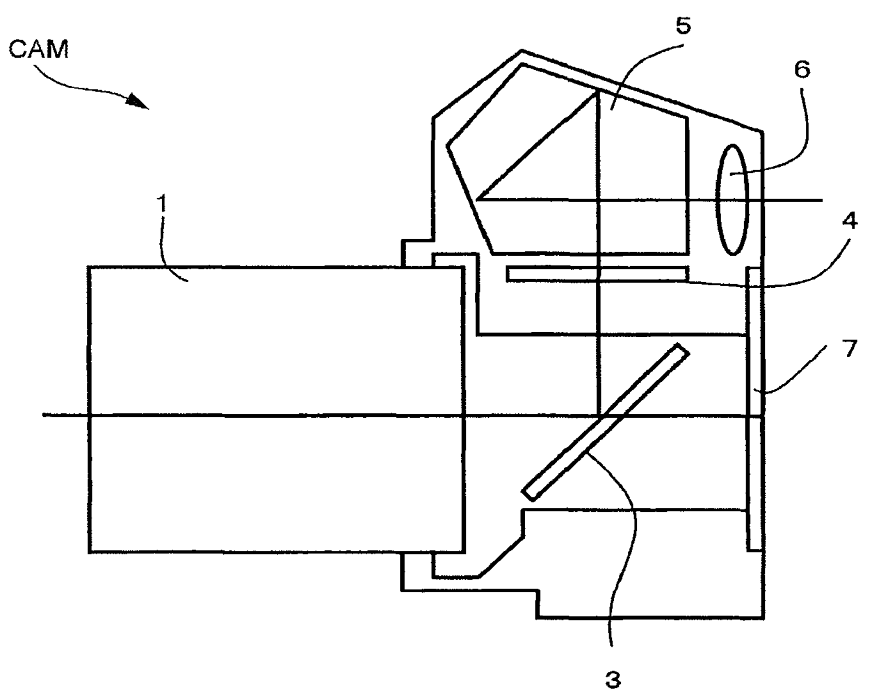
FIG. 96 is a cross-sectional view depicting a digital single lens reflex camera CAM having the lens system with the above configuration as a camera lens.

FIG. 96 is a cross-sectional view depicting a digital single lens reflex camera CAM (optical apparatus) having the lens system with the above configuration as a camera lens 1. In the digital single lens reflex camera CAM shown in FIG. 96, the light from an object, which is not illustrated, is collected by the camera lens 1, and an image is formed on a focal plane plate 4 via a quick return mirror 3. The light that formed the image on the focal plane plate 4 is reflected in a penta prism 5 a plurality of times, and is guided to an ocular 6. As a result, the user can observe an image of the object as an erect image via the ocular 6.

If the user presses a release button, which is not illustrated, the quick return mirror 3 is retracted out of the optical path, and the light from the object, which is not illustrated, collected by the camera lens 1, forms an object image on a picture element 7. Thereby the light from the object is imaged by the picture element 7, and is recorded in a memory, which is not illustrated, as the object image. In this way, the user can photograph the object by this camera CAM. The camera CAM shown in FIG. 96 may have a removable camera lens 1, or may be integrated with the camera lens 1. The camera CAM may be a single lens reflex camera, or may be a compact camera not having a quick return mirror.

The configuration of the digital single lens reflex camera CAM is the same for all the embodiments herein below.

Examples of the First Embodiment Group

Each example (Example 1 to Example 5) in the first embodiment group will now be described with reference to the drawings. FIG. 1 is a diagram depicting the allocation of refractive power in the lens system and a shifting state of each lens group upon changing of the focal length state from the wide angle end state (W) to the telephoto end state (T) according to each example. As FIG. 1 shows, the lens system according to each example has, in order from the object, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power. And upon changing of the focal length state (that is, zooming) from the wide angle end state to the telephoto end state, the first lens group G1 and the fourth lens group G4 are fixed with respect to the image plane I, the distance between the first lens group G1 and the second lens group G2 increases, the distance between the second lens group G2 and the third lens group G3 decreases, the distance between the third lens group G3 and the fourth lens group G4 increases, the distance between the fourth lens group G4 and the fifth lens group G5 decreases, and the distance between the fifth lens group G5 and the sixth lens group G6 decreases.

The configuration of the lens system and relative shift relationship upon zooming shown in FIG. 1 are common for all the lens systems to be described below.

In each example, an aspherical surface is given by the following expression (a) where y is a height in a direction perpendicular to the optical axis, S (y) is a distance (sag amount) from a tangential plane of a vertex of each aspherical surface at height y to each aspherical surface along the optical axis, r is a radius of curvature of the reference spherical surface (paraxial radius of curvature), κ is a conical coefficient, and Cn is an aspherical coefficient of the n-th order. In each example, the aspherical coefficient C2 of the second order is 0, and description thereof is omitted. "E−n" means "$\times 10^{-n}$". For example, 1.234 E−05=$1.234\times 10^{-5}$.

$$S(y)=(y^2/r)/\{1+(1-\kappa\cdot y^2/r^2)^{1/2}\}+C4\times y^4+C6\times y^6+C8\times y^8+C10\times y^{10} \qquad (a)$$

In each example, the values of the parameters are listed in the tables (Tables 1, 6, 11, 16 and 21). In [All Parameters] in the tables, f denotes a focal length of the total system, F. NO. denotes an F number, and 2ω denotes an angle of view. The total lens length indicates a distance from the first surface of the lens surface to the image plane I on the optical axis upon focusing on infinity. In [Lens Data], a surface number denotes a sequence of the lens surface from the object, along the light traveling direction, r denotes a radius of curvature of each lens surface, d denotes a surface distance, that is a distance from each optical surface to the next optical surface (or image plane) on the optical axis, nd denotes a refractive index at the d-line (wavelength: 587.6 nm), and νd is an Abbe number at the d-line (wavelength: 587.6 nm). "*" is attached to the surface number if the lens surface is aspherical, and a paraxial radius of curvature is shown in the column of the radius of curvature r. "0.0000" of the radius of curvature indicates a plane or aperture. The refractive index of air "1.00000" is omitted. [Lens group focal length data] shows a first surface and the focal length of each group.

In [Aspherical Data] (Tables 2, 7, 12, 17 and 22), R denotes a vertex radius of curvature, κ denotes a conical coefficient, and $C^4$ to $C^{10}$ denote a value of each aspherical constant. [Variable distance data] (Tables 3, 8, 13, 18 and 23) shows variable distance upon focusing on infinity in each focal distance when the lens system is in the wide angle end state, intermediate focal length state, and telephoto end state. In [Focusing lens group shift distance] (Tables 4, 9, 14, 19 and 24), f denotes a focal length, and Δ1*b* denotes a shift distance of the rear portion lens group G1*b* upon close distance focusing (photographic distance 1.8 m) (the direction of shift to the object is defined as a positive direction). In [conditional expression correspondence value] (Tables 5, 10, 15, 20 and 25), values corresponding to the above mentioned conditional expressions (1) to (4) are shown.

"mm" is normally used for the unit of focal length, radius of curvature, surface distance and other lengths in all the parameter values herein below. However the unit is not limited to "mm", but another appropriate unit can be used instead, since an equivalent optical performance is obtained even if an optical system is proportionally expanded or proportionally reduced.

The above description is the same for all the examples shown herein below.

Example 1

Figure 2:
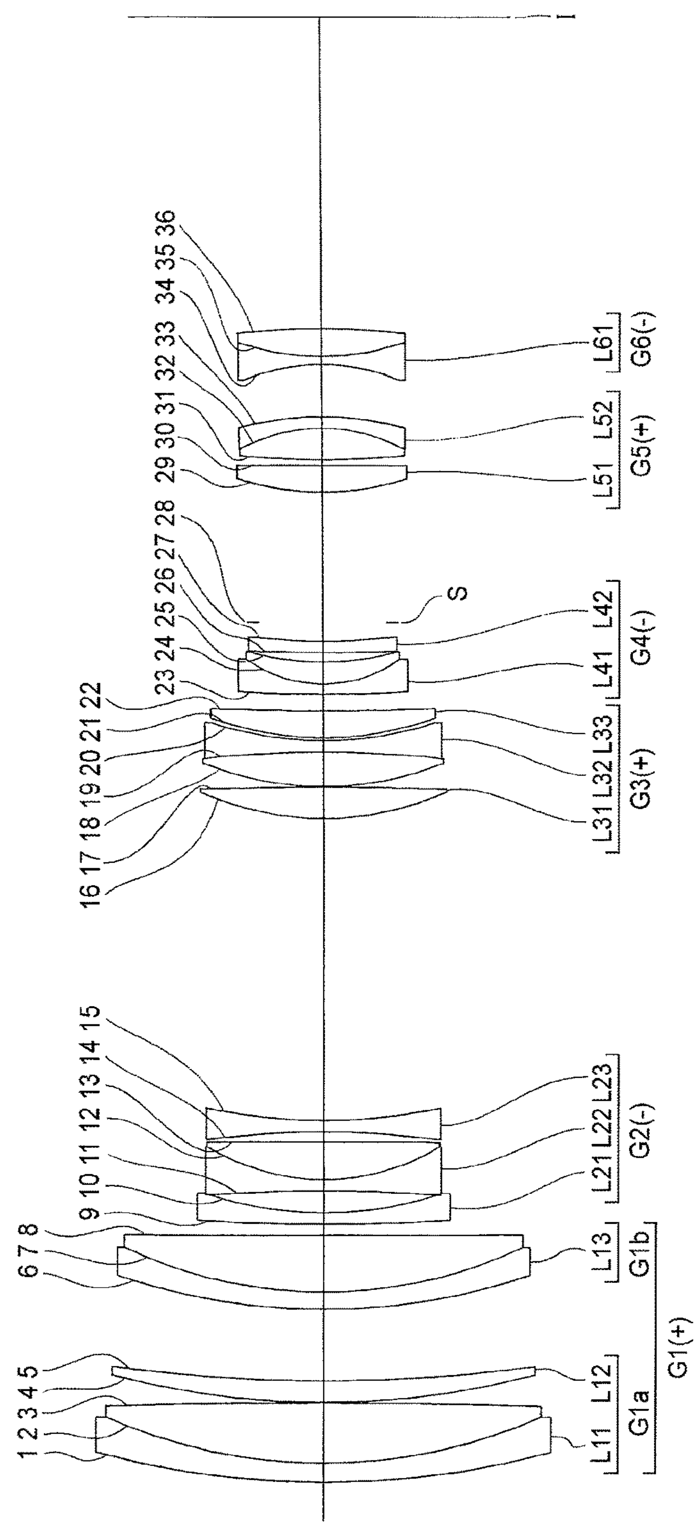
FIG. 2 is a diagram depicting a configuration of a lens system according to Example 1.

Example 1 will now be described with reference to FIG. 2 to FIG. 5 and Table 1 to Table 5. FIG. 2 is a diagram depicting a configuration of a lens system according to Example 1. As FIG. 2 shows, in the lens system according to Example 1, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented negative lens L32 in which a biconvex lens and a biconcave lens are cemented, and a positive meniscus lens L33 having a convex surface facing the object.

The fourth lens group G4 has, in order from the object, a cemented negative lens L41 in which a negative meniscus lens having a convex surface facing the object and a positive meniscus lens having a convex surface facing the object are cemented, and a negative meniscus lens L42 having a convex surface facing the object. In this example, all or a part of the fourth lens group G4 shift as a shift lens group, so as to have a component in an approximately orthogonal to the optical axis.

The fifth lens group G5 has, in order from the object, a biconvex lens L51, and a cemented positive lens L52 in which a biconvex lens and a negative meniscus lens having a convex surface facing the image are cemented.

The sixth lens group G6 has, in order from the object, a cemented negative lens L61 in which a biconcave lens and a biconvex lens are cemented.

The image plane I is formed on a picture element, which is not illustrated, and the picture element is constituted by a CCD, CMOS or the like (description on the image plane I is the same for the examples herein below).

The aperture stop S is disposed closest to the image in the fourth lens group G4, and is fixed with respect to the image plane I upon zooming from the wide angle end state to the telephoto end state.

Parameter values of Example 1 are shown in Table 1.

TABLE 1

[All parameters]

| | Wide-angle end | intermediate focal length | telephoto end |
|---|---|---|---|
| f | 81.59~ | 199.36~ | 392.00 |
| FNO | 4.59~ | 5.61~ | 5.87 |
| 2ω | 29.77~ | 12.13~ | 6.20 |
| Image Height | 21.60~ | 21.60~ | 21.60 |
| Total lens Length | 258.89~ | 258.89~ | 258.89 |

[Lens data]

| Surface Number | r | d | nd | νd |
|---|---|---|---|---|
| 1 | 131.4316 | 3.30 | 1.79952 | 42.24 |
| 2 | 79.5641 | 10.60 | 1.49782 | 82.52 |
| 3 | −1117.1906 | 0.10 | | |
| 4 | 125.2669 | 3.70 | 1.49782 | 82.52 |
| 5 | 226.1411 | (d5) | | |
| 6 | 97.0031 | 3.00 | 1.84666 | 23.78 |
| 7 | 69.6269 | 10.00 | 1.58913 | 61.16 |
| 8 | 5170.1602 | (d8) | | |
| 9 | 281.7482 | 2.00 | 1.81600 | 46.62 |
| 10 | 55.1616 | 3.80 | | |
| 11 | −253.2341 | 2.00 | 1.75500 | 52.32 |
| 12 | 33.0485 | 6.65 | 1.80810 | 22.76 |
| 13 | −1843.9411 | 1.80 | | |
| 14 | −121.8581 | 2.00 | 1.81600 | 46.62 |
| 15 | 81.1182 | (d15) | | |
| 16 | 44.5000 | 5.50 | 1.64000 | 60.08 |
| 17 | −500.9830 | 0.20 | | |
| 18 | 47.5000 | 6.15 | 1.60300 | 65.44 |
| 19 | −153.9169 | 2.00 | 1.80518 | 25.42 |
| 20 | 52.6835 | 0.50 | | |
| *21 | 44.6691 | 4.75 | 1.59201 | 67.02 |
| 22 | 351.2823 | (d22) | | |
| 23 | 229.8851 | 1.80 | 1.75700 | 47.82 |
| 24 | 19.3839 | 3.95 | 1.79504 | 28.54 |
| 25 | 41.9378 | 1.70 | | |
| 26 | 306.0080 | 2.00 | 1.75500 | 52.32 |
| 27 | 93.0447 | 3.30 | | |
| 28 | 0.0000 | (d28) | (aperture stop S) | |
| *29 | 40.9184 | 4.75 | 1.59201 | 67.02 |
| 30 | −1709.5554 | 1.00 | | |
| 31 | 118.3219 | 5.60 | 1.48749 | 70.23 |
| 32 | −25.1824 | 2.00 | 1.72047 | 34.71 |
| 33 | −46.7938 | (d33) | | |
| 34 | −31.1643 | 1.50 | 1.80400 | 46.57 |
| 35 | 37.1717 | 4.90 | 1.72825 | 28.46 |
| 36 | −115.4294 | (Bf) | | |

[Each group focal length data]

| Group | First surface | Focal length |
|---|---|---|
| G1 | 1 | 110.8156 |
| G2 | 9 | −31.3101 |
| G3 | 16 | 42.4527 |
| G4 | 23 | −52.0327 |
| G5 | 29 | 41.9333 |
| G6 | 34 | −47.7618 |

In Example 1, the twenty first and twenty ninth lens surfaces are aspherical. Table 2 shows the [Aspherical data].

TABLE 2

[Aspherical data]

| R | κ | $C_4$ | $C_6$ | $C_8$ | $C_{10}$ |
|---|---|---|---|---|---|
| Twenty first surface | | | | | |
| 44.6691 | +3.3063 | $-6.0735 \times 10^{-6}$ | $-5.8617 \times 10^{-9}$ | $+6.7417 \times 10^{-13}$ | $-1.7957 \times 10^{-14}$ |
| Twenty ninth surface | | | | | |
| 40.9184 | +5.2049 | $-6.7013 \times 10^{-6}$ | $-1.5290 \times 10^{-8}$ | $+2.1354 \times 10^{-11}$ | $-2.4026 \times 10^{-13}$ |

In Example 1, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 3 shows the [Variable distance data].

TABLE 3

[Variable distance data]

| | Wide-angle end | intermediate focal length | telephoto end |
|---|---|---|---|
| d5 | 12.7115 | 12.7115 | 12.7115 |
| d8 | 2.0000 | 23.7622 | 28.4231 |
| d15 | 53.3167 | 23.8139 | 2.0000 |
| d22 | 2.9663 | 10.7068 | 27.8599 |
| d28 | 23.1736 | 15.3971 | 2.0146 |
| d33 | 9.1769 | 7.4489 | 3.0225 |
| Bf | 54.9998 | 64.5041 | 82.3125 |

Table 4 shows the [Focusing lens group shift distance] in Example 1.

TABLE 4

[Focusing lens group shift distance]

| | Wide-angle end | intermediate focal length | telephoto end |
|---|---|---|---|
| f | 81.5935 | 199.3602 | 392.0025 |
| Δ1b | 10.7115 | 10.7115 | 10.7115 |

Table 5 shows the [Conditional expression correspondence value] in Example 1.

TABLE 5

[Conditional expression correspondence value]

ft = 392.0025
f1b = 201.0773
f2 = −31.3101
f4 = −52.0327

TABLE 5-continued

| [Conditional expression correspondence value] |
|---|
| f5 = 41.9333 |
| TL = 258.8947 |
| (1)ft/f1b = 1.9495 |
| (2)\|f2/f4\| = 0.6017 |
| (3)\|f2/f5\| = 0.7467 |
| (4)TL/f1b = 1.2875 |

Figure 3A:
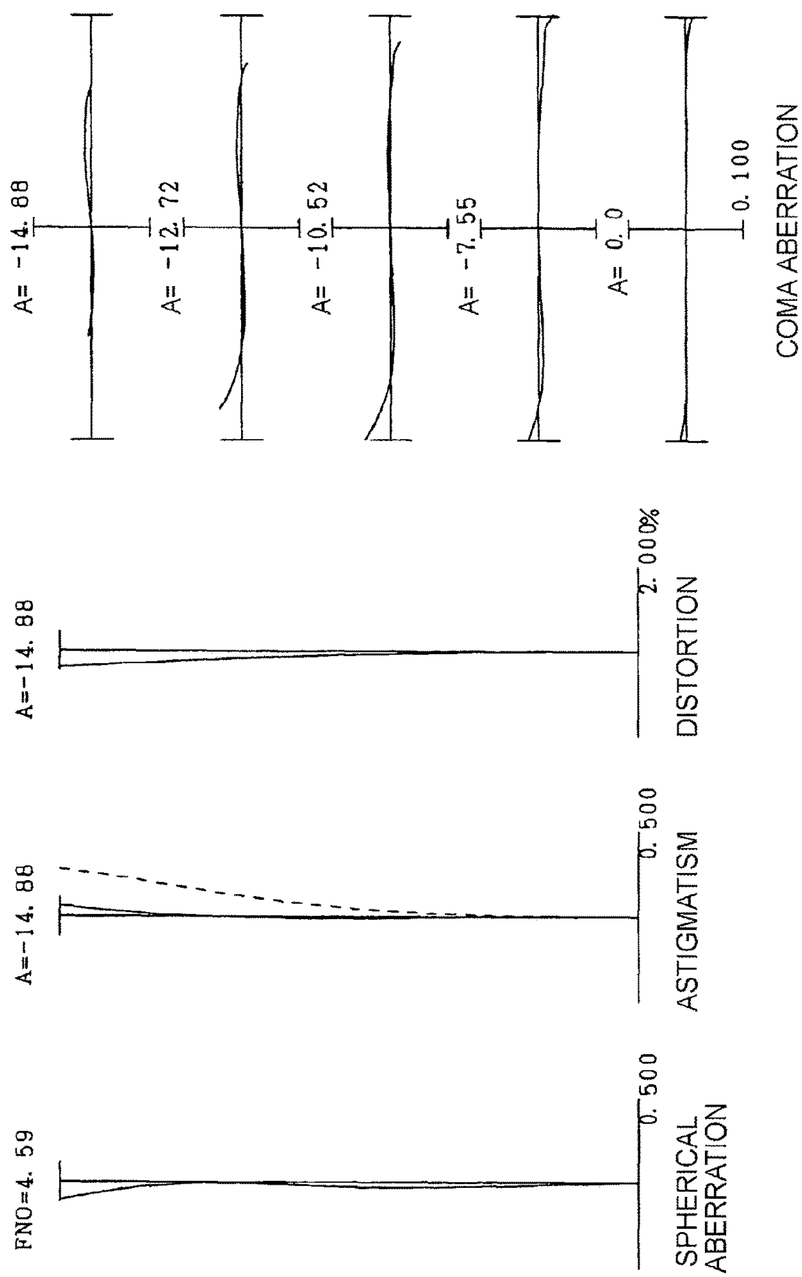
FIG. 3A shows the wide angle end state.
Figure 3B:
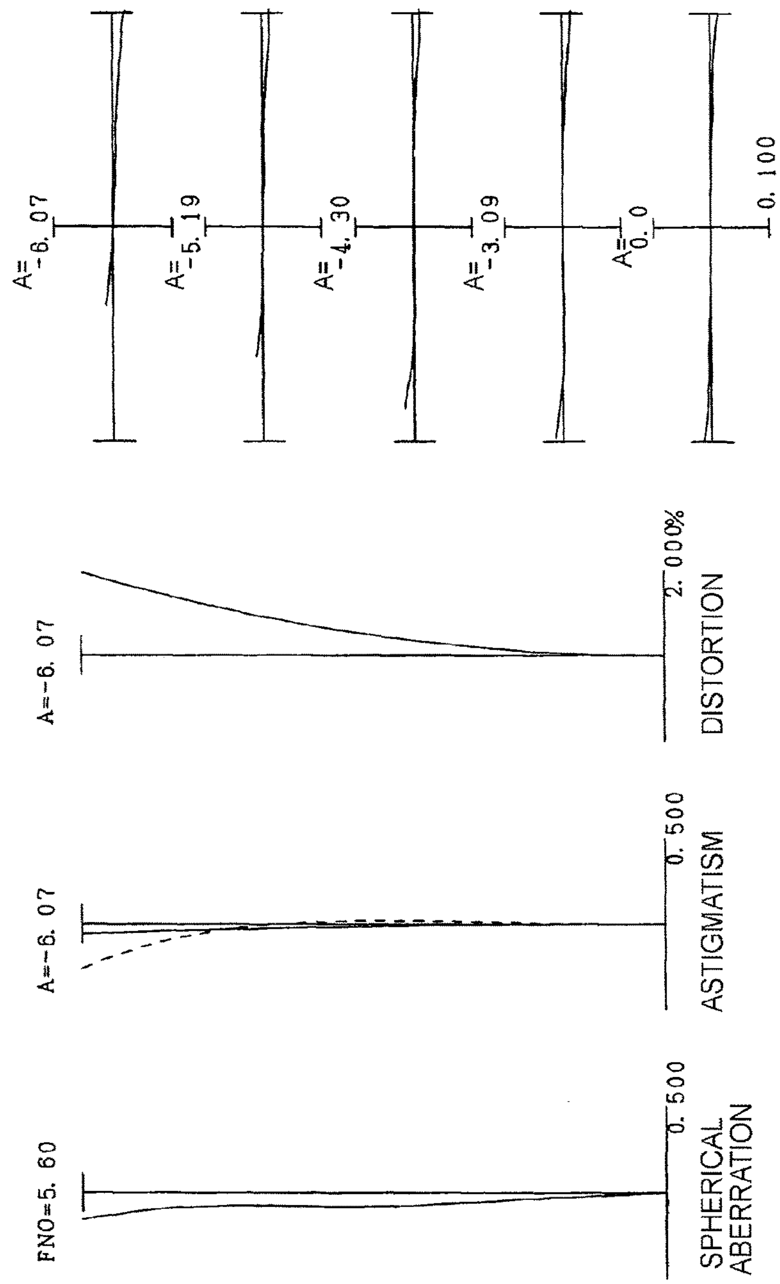
FIG. 3B shows the intermediate focal length state.
Figure 3C:
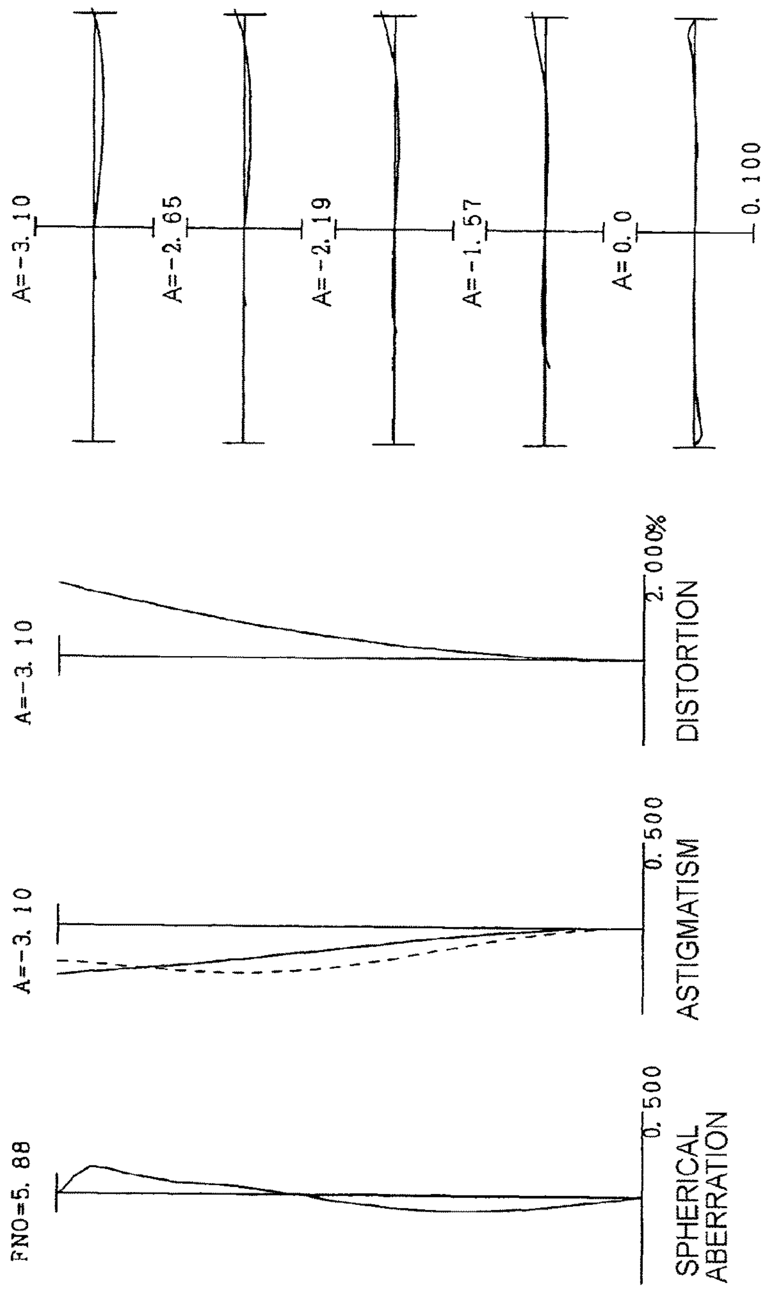
FIG. 3C shows the telephoto end state.
Figure 4A:
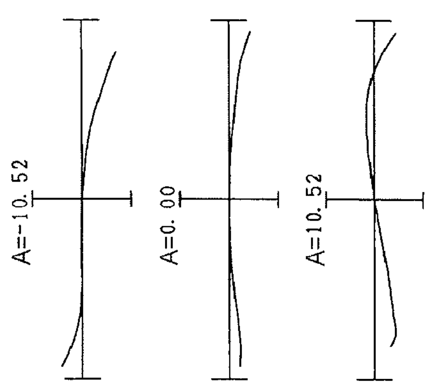
FIG. 4A shows the wide angle end state.
Figure 4B:
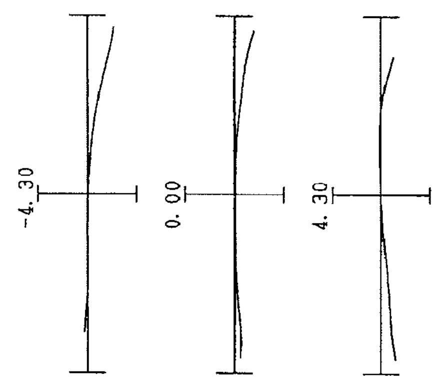
FIG. 4B shows the intermediate focal length state.
Figure 4C:
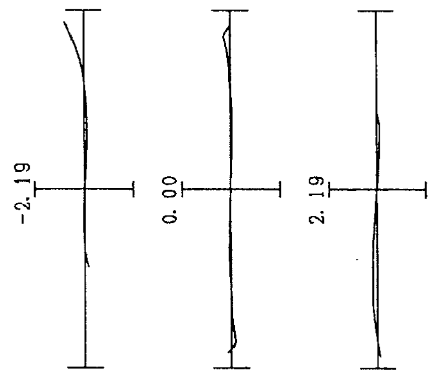
FIG. 4C shows the telephoto end state.
Figure 5A:
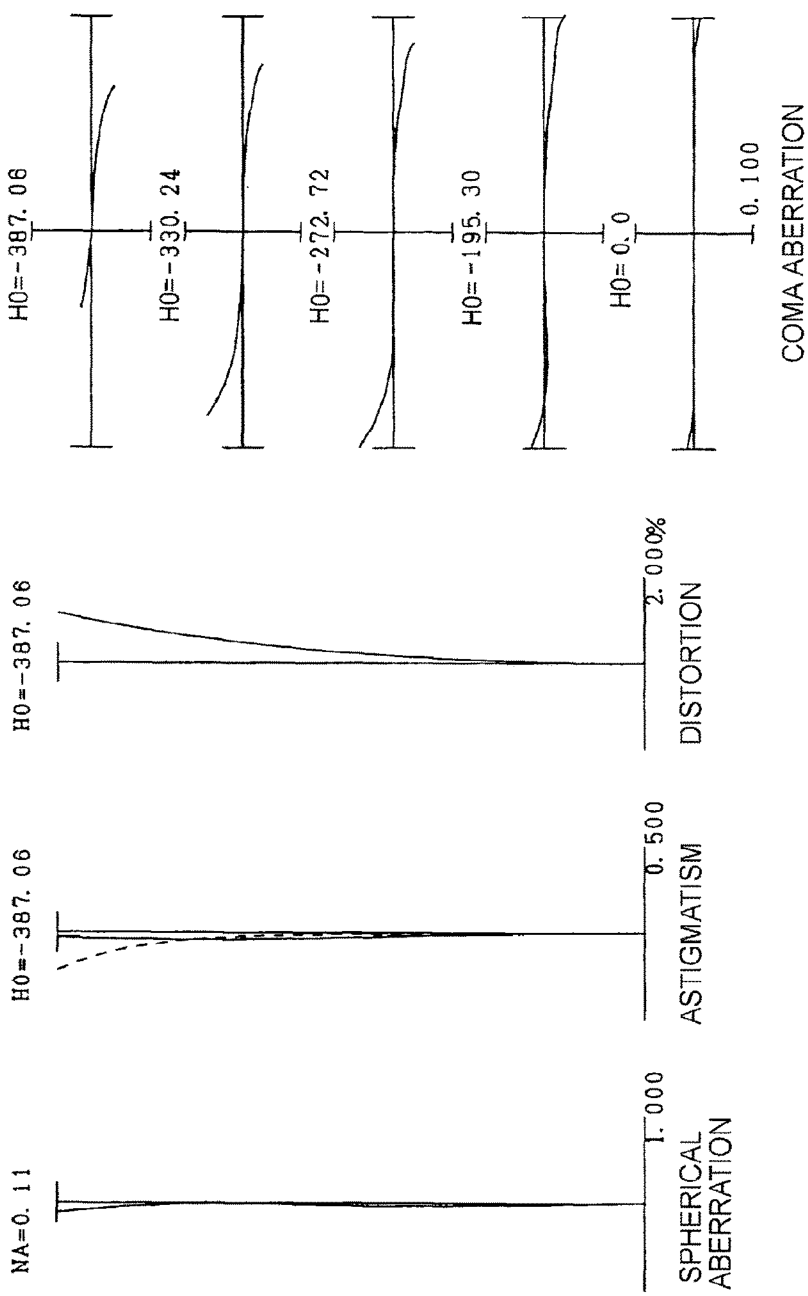
FIG. 5A shows the wide angle end state.
Figure 5B:
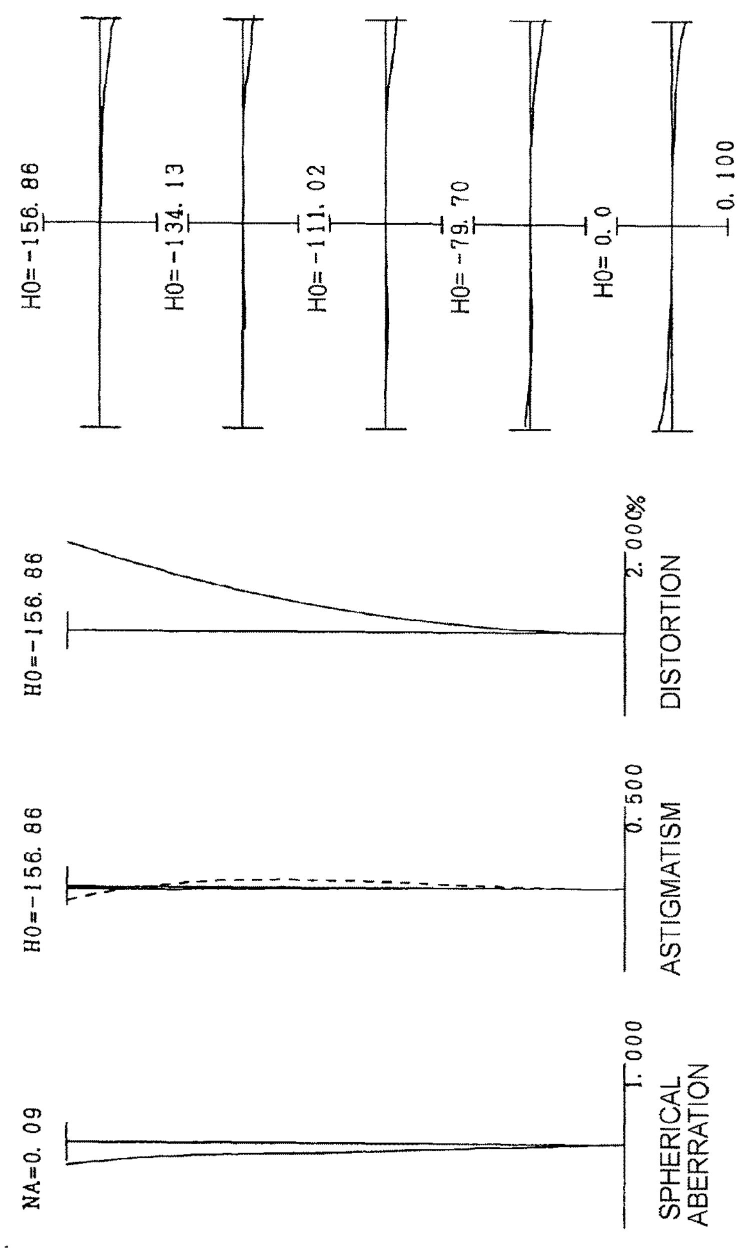
FIG. 5B shows the intermediate focal length state.
Figure 5C:
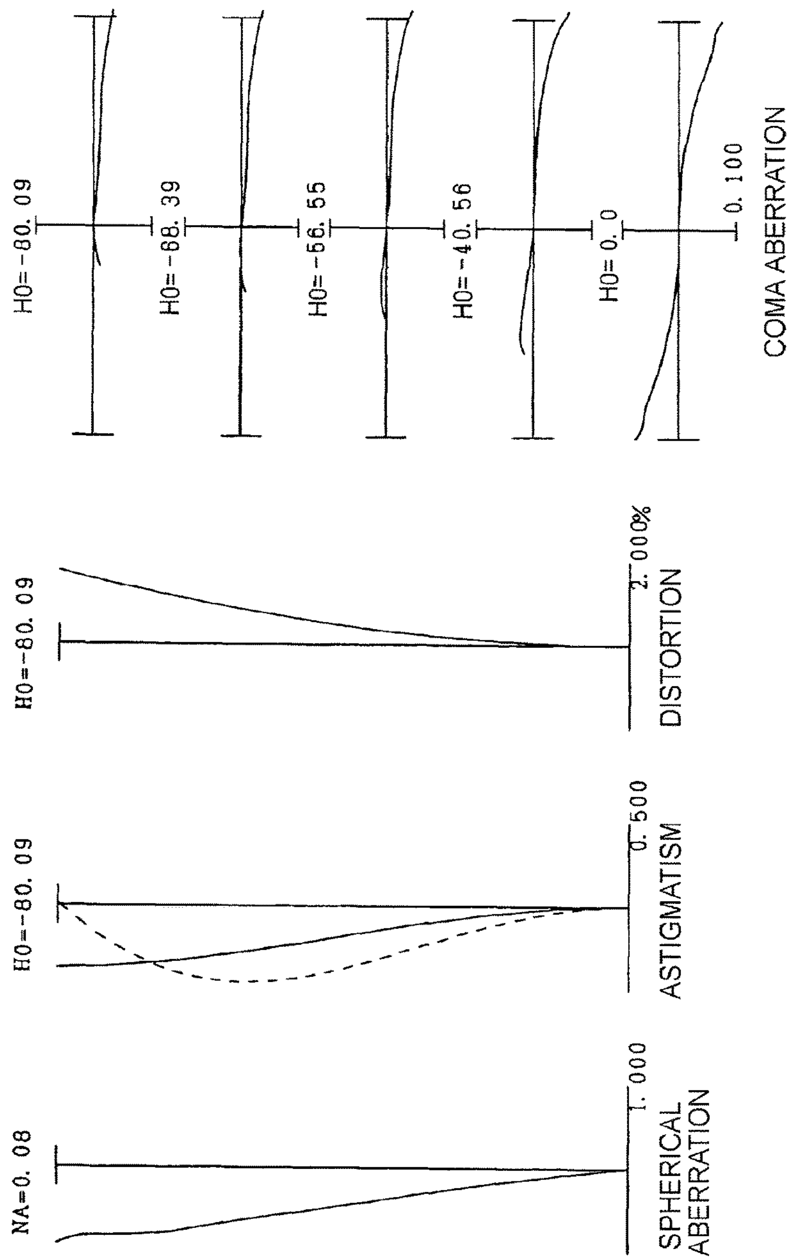
FIG. 5C shows the telephoto end state.

FIGS. 3 to 5 are graphs showing various aberrations of Example 1 at d-line (wavelength: 587.6 nm). In other words, FIG. 3A are graphs showing various aberrations upon focusing on infinity in the wide angle end state (f=81.59 mm), FIG. 3B are graphs showing various aberrations upon focusing on infinity in the intermediate focal length state (f=199.36 mm), and FIG. 3C are graphs showing various aberrations upon focusing on infinity in the telephoto end state (f=392.00 mm). FIG. 4A is a graph showing a coma aberration in the lens shift state (0.4 mm) upon focusing on infinity in the wide angle end state (f=81.59 mm), FIG. 4B is a graph showing a coma aberration in the lens shift state (0.4 mm) upon focusing on infinity in the intermediate focal length state (f=199.36 mm), and FIG. 4C is a graph showing a coma aberration in the lens shift state (0.4 mm) upon focusing on infinity in the telephoto end state (f=392.00 mm). FIG. 5A are graphs showing various aberrations upon close distance focusing (photographic distance: 1.8 m) in the wide angle end state (f=81.59 mm), FIG. 5B are graphs showing various aberrations upon close distance focusing (photographic distance: 1.8 m) in the intermediate focal length state (f=199.36 mm), and FIG. 5C are graphs showing various aberrations upon close distance focusing (photographic distance: 1.8 m) in the telephoto end state (f=392.00 mm).

In each graph showing aberrations, FNO denotes an F number, A denotes a half angle of view, and H0 denotes an object height with respect to each image height. In the graphs showing spherical aberration, a value of the F number corresponding to a maximum aperture is shown, in the graphs showing astigmatism and distortion, a maximum value of the image height is shown respectively, and in the graphs showing coma aberration, a value of each image height is shown. In the graph showing astigmatism, a solid line indicates a sagittal image surface, and a broken line indicates a meridional image surface. This description on graphs showing aberrations is the same for the other examples, for which description is omitted.

As each graph showing aberrations indicates, according to Example 1, various aberrations are corrected well in each focal length state, from the wide angle end state to the telephoto end state, implementing excellent image forming performance.

Example 2

Figure 6:
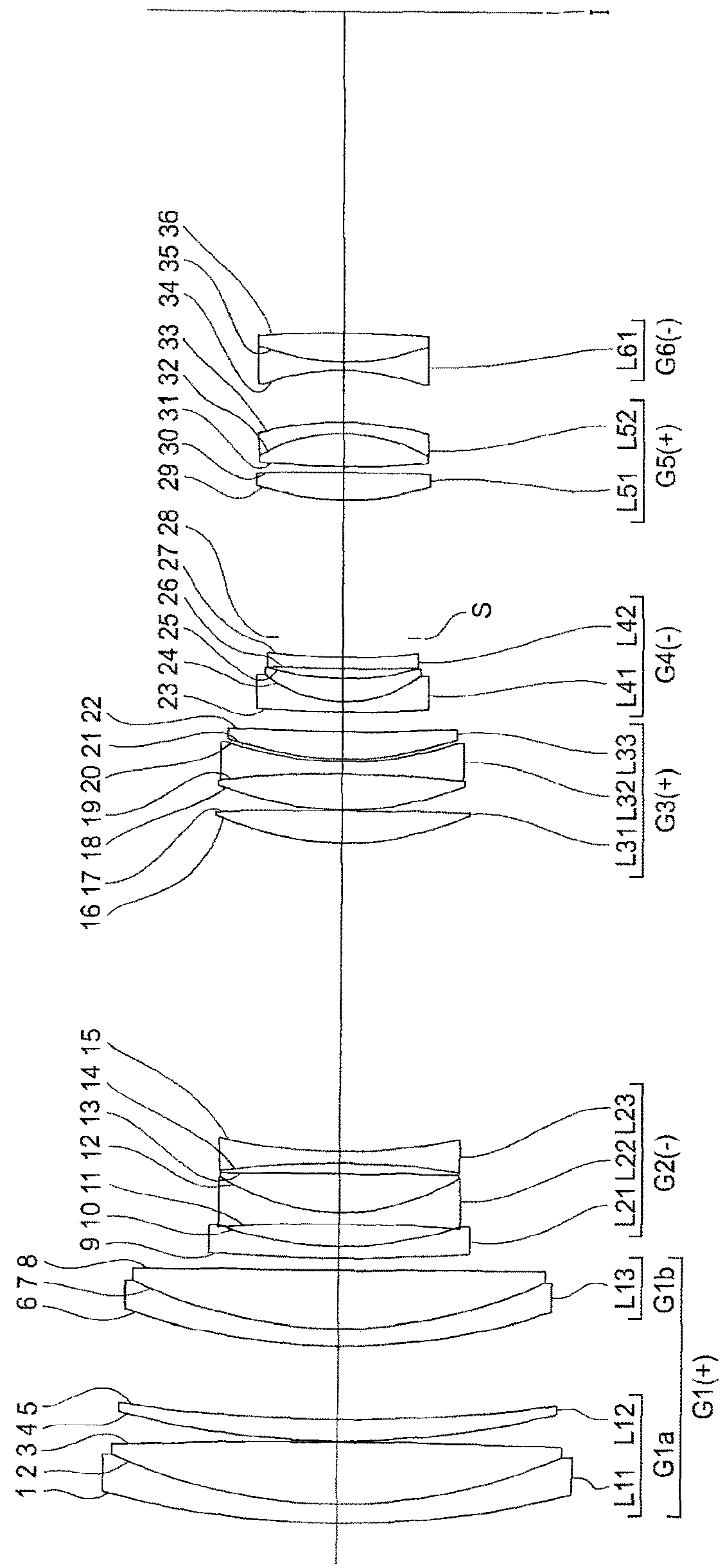
FIG. 6 is a diagram depicting a configuration of a lens system according to Example 2.

Example 2 will now be described with reference to FIG. 6 to FIG. 9 and Table 6 to Table 10. FIG. 6 is a diagram depicting a configuration of a lens system according to Example 2. As FIG. 6 shows, in the lens system according to Example 2, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a positive meniscus lens L33 having a convex surface facing the object.

The fourth lens group G4 has, in order from the object, a cemented negative lens L41 in which a negative meniscus lens having a convex surface facing the object and a positive meniscus lens having a convex surface facing the object are cemented, and a negative meniscus lens L42 having a convex surface facing the object. In this example, all or a part of the fourth lens group G4 shift as a shift lens group, so as to have a component in an approximately orthogonal to the optical axis.

The fifth lens group G5 has, in order from the object, a biconvex lens L51, and a cemented positive lens L52 in which a biconvex lens and a negative meniscus lens having a convex surface facing the image are cemented.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 2 are shown in Table 6.

TABLE 6

[All parameters]

| | Wide-angle end | intermediate focal length | telephoto end |
|---|---|---|---|
| f | 81.59~ | 199.36~ | 392.00 |
| FNO | 4.59~ | 5.61~ | 5.85 |
| 2ω | 29.77~ | 12.13~ | 6.20 |
| Image Height | 21.60~ | 21.60~ | 21.60 |
| Total lens Length | 258.89~ | 258.89~ | 258.89 |

[Lens data]

| Surface Number | r | d | nd | νd |
|---|---|---|---|---|
| 1 | 131.2682 | 3.30 | 1.79952 | 42.24 |
| 2 | 79.2077 | 10.60 | 1.49782 | 82.52 |
| 3 | −1090.3032 | 0.10 | | |
| 4 | 123.2408 | 3.70 | 1.49782 | 82.52 |
| 5 | 220.9763 | (d5) | | |
| 6 | 96.1976 | 3.00 | 1.84666 | 23.78 |
| 7 | 69.0965 | 10.00 | 1.58913 | 61.16 |
| 8 | 4928.1656 | (d8) | | |
| 9 | 288.2296 | 2.00 | 1.81600 | 46.62 |
| 10 | 54.2542 | 3.80 | | |
| 11 | −249.4274 | 2.00 | 1.75500 | 52.32 |
| 12 | 32.8351 | 6.65 | 1.80810 | 22.76 |
| 13 | −1937.0128 | 1.80 | | |
| 14 | −118.0849 | 2.00 | 1.81600 | 46.62 |
| 15 | 86.5424 | (d15) | | |
| 16 | 44.5000 | 5.50 | 1.64000 | 60.08 |
| 17 | −500.0000 | 0.20 | | |
| 18 | 47.5000 | 6.15 | 1.60300 | 65.44 |

TABLE 6-continued

| | | | | |
|---|---|---|---|---|
| 19 | −154.7487 | 2.00 | 1.80518 | 25.42 |
| 20 | 51.9426 | 0.50 | | |
| *21 | 45.3806 | 4.75 | 1.59201 | 67.02 |
| 22 | 409.1975 | (d22) | | |
| 23 | 229.8851 | 1.80 | 1.75700 | 47.82 |
| 24 | 19.2035 | 3.95 | 1.79504 | 28.54 |
| 25 | 42.0732 | 1.70 | | |
| 26 | 553.9438 | 2.00 | 1.75500 | 52.32 |
| 27 | 103.9914 | 3.30 | | |
| 28 | 0.0000 | (d28) | (aperture stop S) | |
| *29 | 41.2885 | 4.75 | 1.59201 | 67.02 |
| 30 | −299.5240 | 1.00 | | |
| 31 | 142.3003 | 5.60 | 1.48749 | 70.23 |
| 32 | −25.3123 | 2.00 | 1.72047 | 34.71 |
| 33 | −47.5235 | (d33) | | |
| 34 | −33.2184 | 1.50 | 1.80400 | 46.57 |
| 35 | 34.4337 | 4.90 | 1.72825 | 28.46 |
| 36 | −160.1625 | (Bf) | | |

[Each group focal length data]

| Group | First surface | Focal length |
|---|---|---|
| G1 | 1 | 110.1486 |
| G2 | 9 | −31.3559 |
| G3 | 16 | 42.7470 |
| G4 | 23 | −51.5772 |
| G5 | 29 | 40.9494 |
| G6 | 34 | −46.5805 |

In Example 2, the twenty first and twenty ninth lens surfaces are aspherical. Table 7 shows the [Aspherical data].

TABLE 7

[Aspherical data]

| R | κ | $C_4$ | $C_6$ | $C_8$ | $C_{10}$ |
|---|---|---|---|---|---|
| Twenty first surface | | | | | |
| 45.3806 | +3.5082 | $-6.2708 \times 10^{-6}$ | $-6.0885 \times 10^{-9}$ | $+8.5423 \times 10^{-13}$ | $-1.9843 \times 10^{-14}$ |
| Twenty ninth surface | | | | | |
| 41.2885 | +5.3966 | $-7.1249 \times 10^{-6}$ | $-1.6306 \times 10^{-8}$ | $+2.2822 \times 10^{-11}$ | $-2.6353 \times 10^{-13}$ |

In Example 2, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 8 shows the [Variable distance data].

TABLE 8

[Variable distance data]

| | Wide-angle end | intermediate focal length | telephoto end |
|---|---|---|---|
| d5 | 12.5666 | 12.5666 | 12.5666 |
| d8 | 2.0000 | 23.5395 | 28.6365 |
| d15 | 52.7950 | 23.5222 | 2.0000 |
| d22 | 3.3567 | 11.0899 | 27.5152 |
| d28 | 23.7470 | 15.7538 | 2.7671 |
| d33 | 8.8798 | 7.1223 | 2.4250 |
| Bf | 54.9997 | 64.7502 | 82.4337 |

Table 9 shows the [Focusing lens group shift distance] in Example 2.

TABLE 9

[Focusing lens group shift distance]

| | Wide-angle end | intermediate focal length | telephoto end |
|---|---|---|---|
| f | 81.5935 | 199.3601 | 392.0023 |
| Δ1b | 10.5666 | 10.5666 | 10.5666 |

Table 10 shows the [Conditional expression correspondence value] in Example 2.

TABLE 10

[Conditional expression correspondence value]

ft = 392.0023
f1b = 199.4630
f2 = −31.3559
f4 = −51.5772
f5 = 40.9494
TL = 258.8947
(1)ft/f1b = 1.9653
(2)|f2/f4| = 0.6079
(3)|f2/f5| = 0.7657
(4)TL/f1b = 1.2980

Figure 7A:
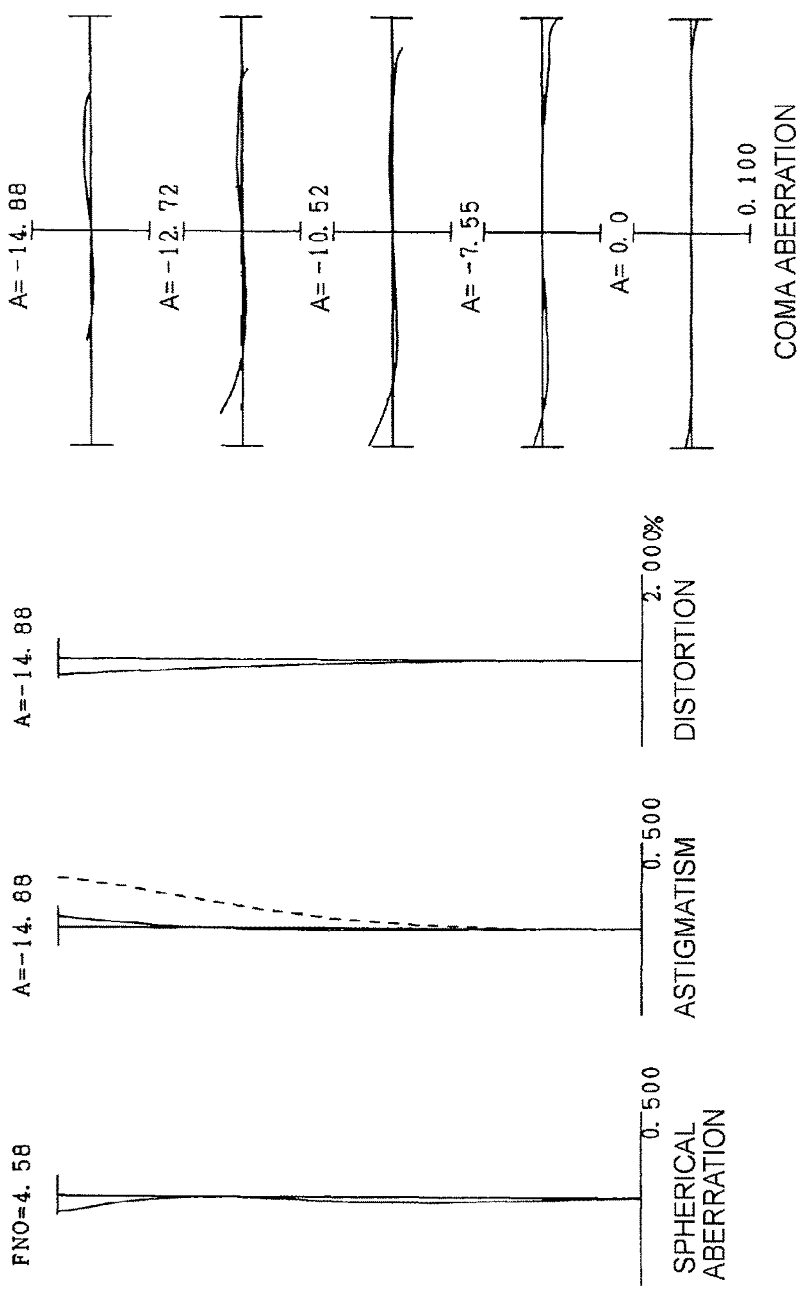
FIG. 7A shows the wide angle end state.
Figure 7B:
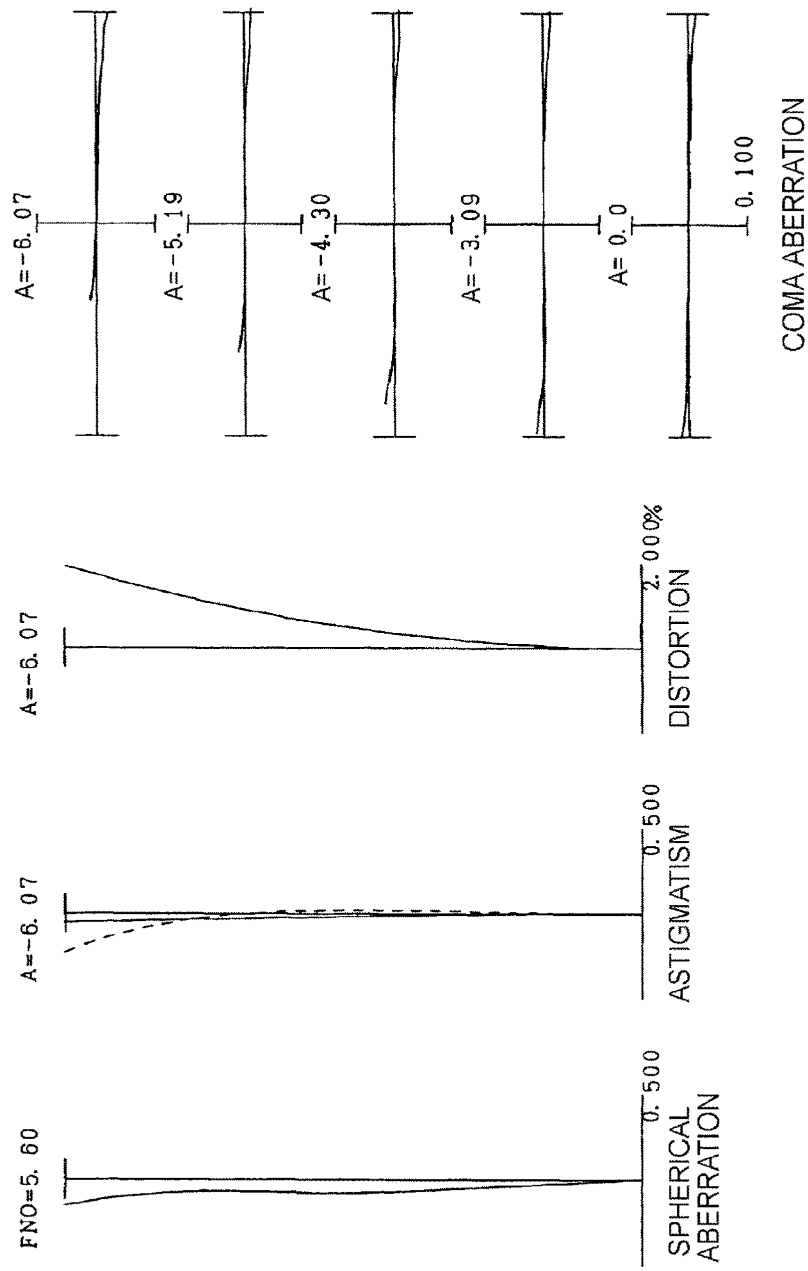
FIG. 7B shows the intermediate focal length state.
Figure 7C:
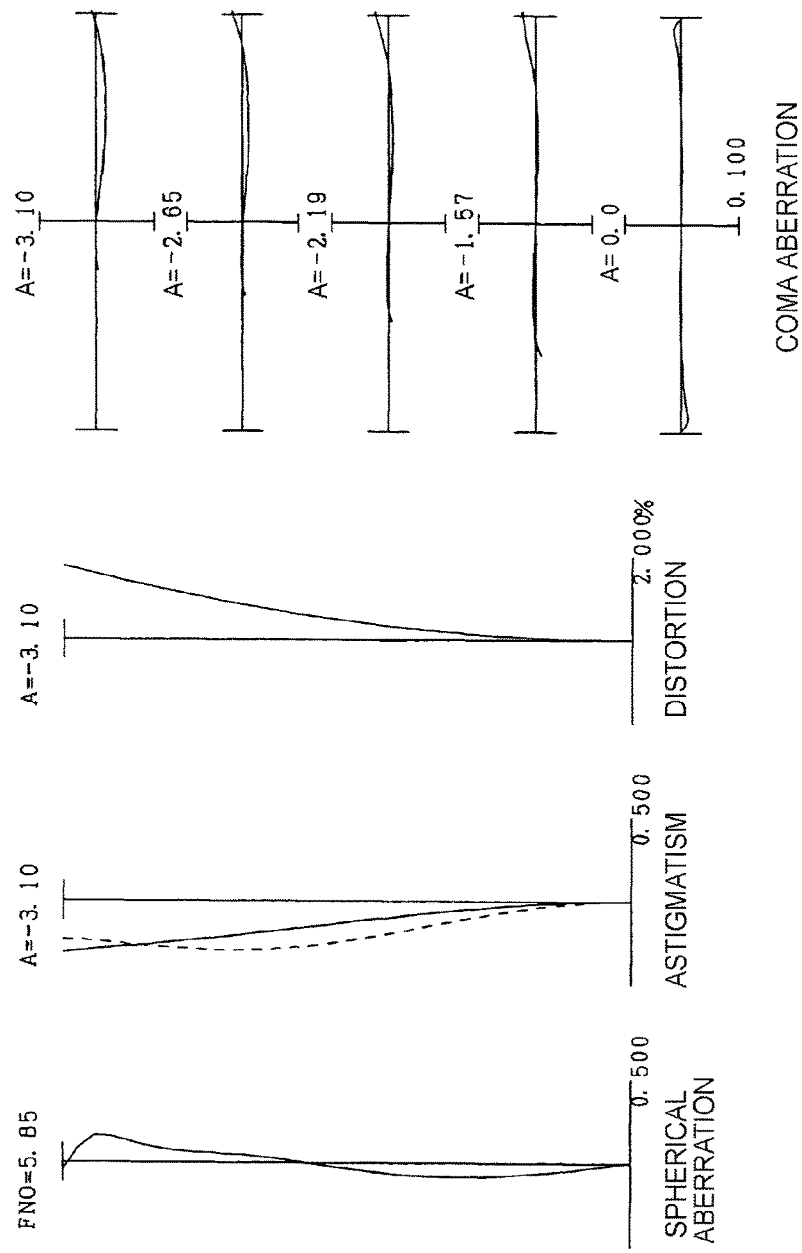
FIG. 7C shows the telephoto end state.
Figure 8A:
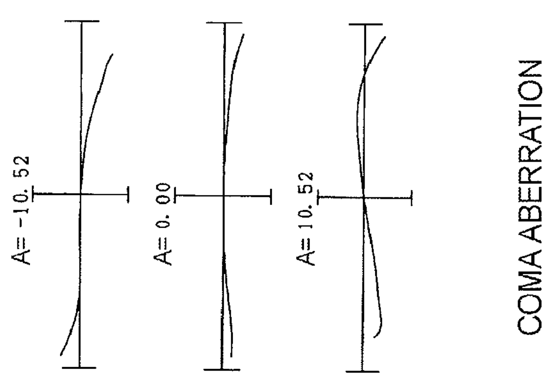
FIG. 8A shows the wide angle end state.
Figure 8B:
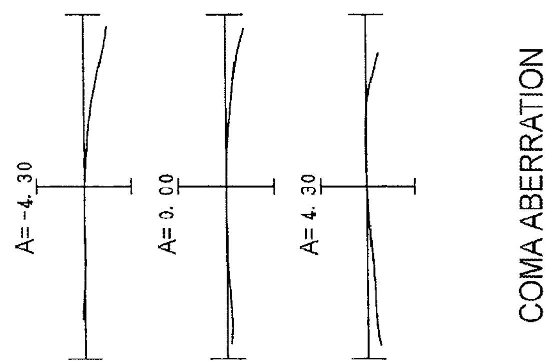
FIG. 8B shows the intermediate focal length state.
Figure 8C:
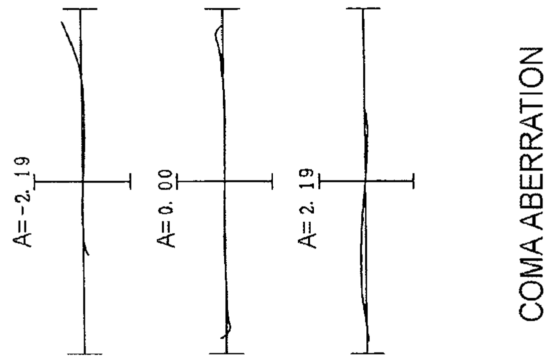
FIG. 8C shows the telephoto end state.
Figure 9A:
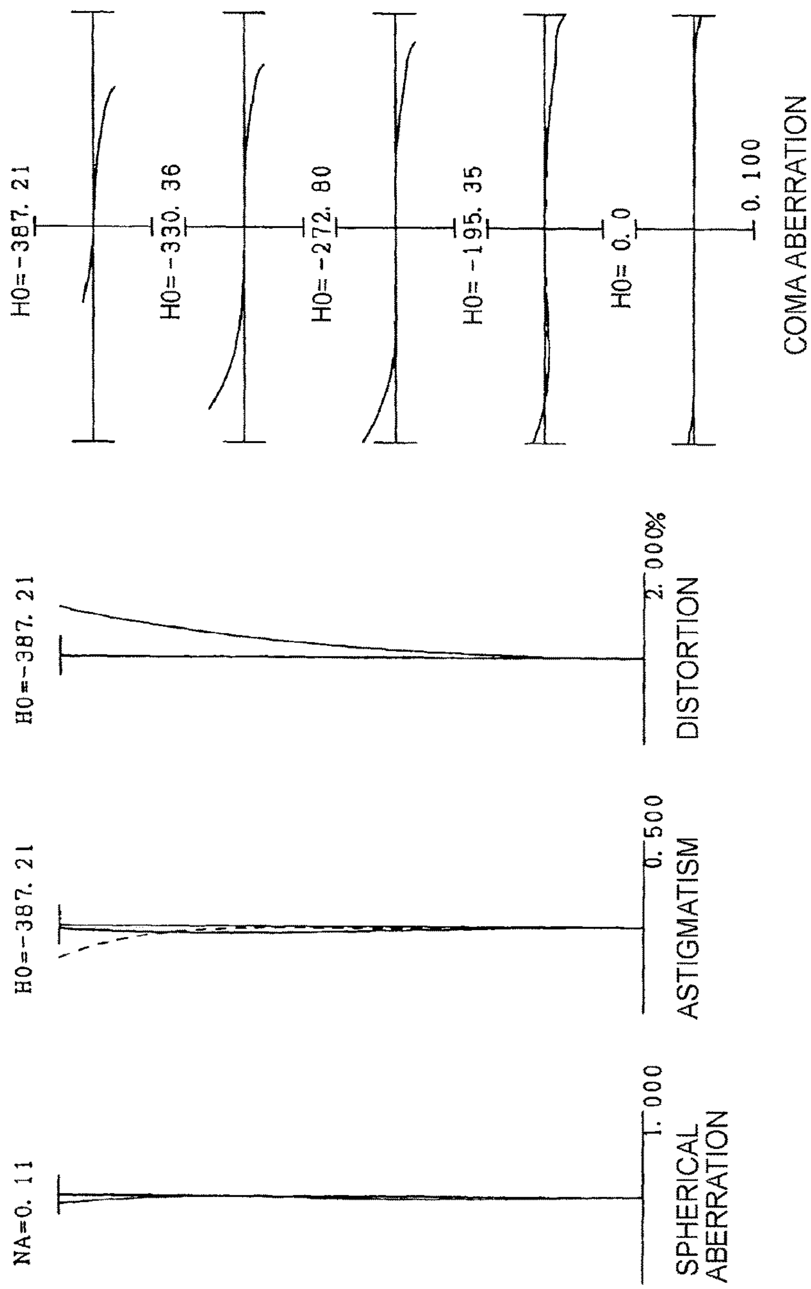
FIG. 9A shows the wide angle end state.
Figure 9B:
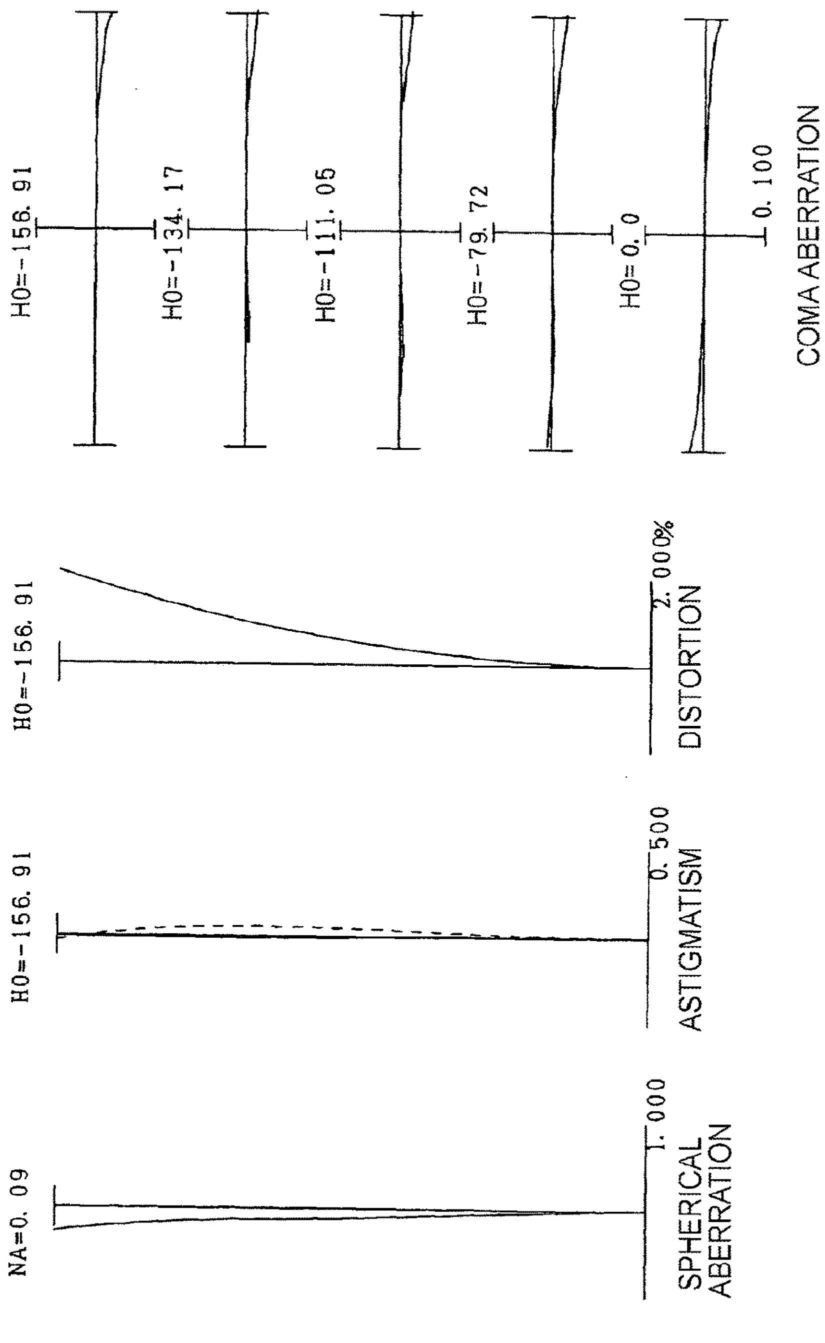
FIG. 9B shows the intermediate focal length state.
Figure 9C:
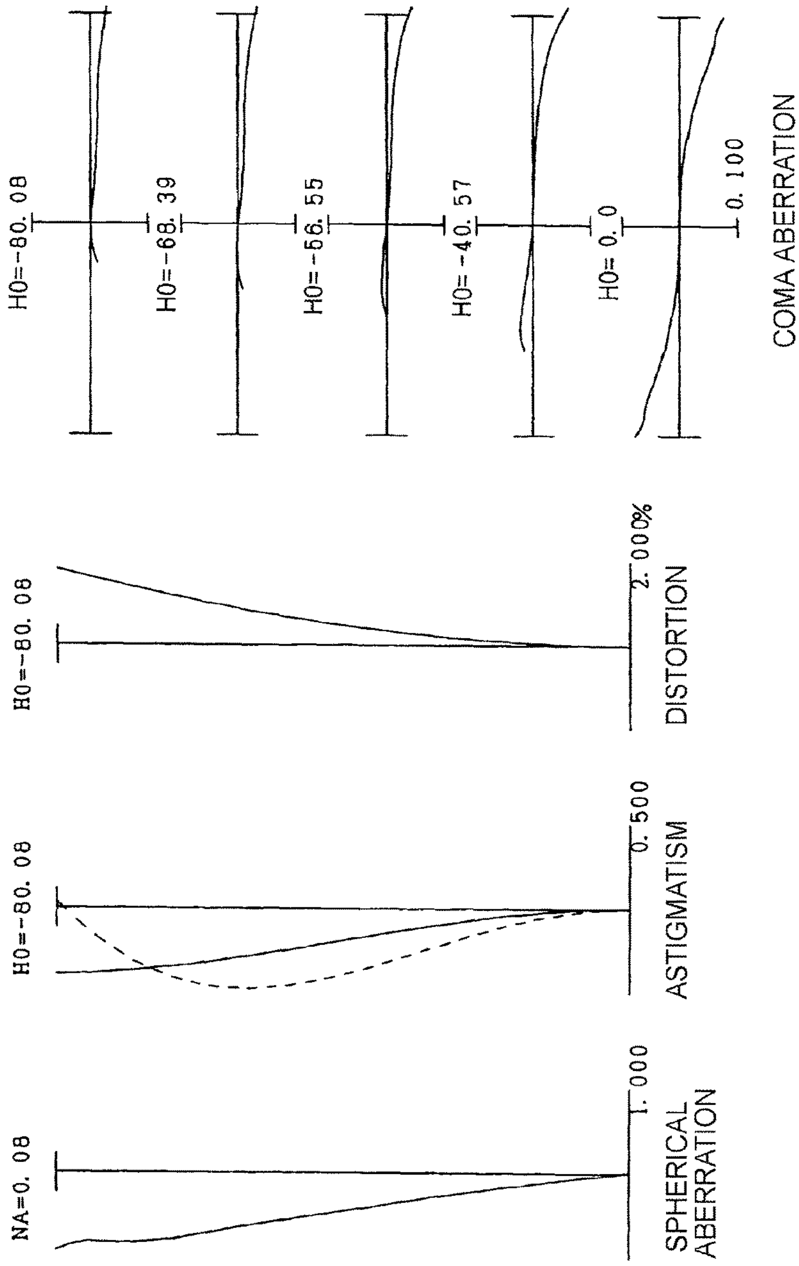
FIG. 9C shows the telephoto end state.

FIGS. 7 to 9 are graphs showing various aberrations of Example 2 at d-line (wavelength: 587.6 nm). In other words, FIG. 7A are graphs showing various aberrations upon focusing on infinity in the wide angle end state (f=81.59 mm), FIG. 7B are graphs showing various aberrations upon focusing on infinity in the intermediate focal length state (f=199.36 mm), and FIG. 7C are graphs showing various aberrations upon focusing on infinity in the telephoto end state (f=392.00 mm). FIG. 8A is a graph showing a coma aberration in the lens shift state (0.4 mm) upon focusing on infinity in the wide angle end state (f=81.59 mm), FIG. 8B is a graph showing a coma aberration in the lens shift state (0.4 mm) upon focusing on infinity in the intermediate focal length state (f=199.36 mm), and FIG. 8C is a graph showing a coma aberration in the lens shift state (0.4 mm) upon focusing on infinity in the telephoto end state (f=392.00 mm). FIG. 9A are graphs showing various aberrations upon close distance focusing (photographic distance: 1.8 m) in the wide angle end state (f=81.59 mm), FIG. 9B are graphs showing various aberrations upon close distance focusing (photographic distance: 1.8 m) in the intermediate focal length state (f=199.36 mm), and FIG. 9C are graphs showing various aberrations upon close distance focusing (photographic distance: 1.8 m) in the telephoto end state (f=392.00 mm).

As each graph showing aberrations indicates, according to Example 2, various aberrations are corrected well in each focal length state, from the wide angle end state to the telephoto end state, implementing excellent image forming performance.

Example 3

Figure 10:
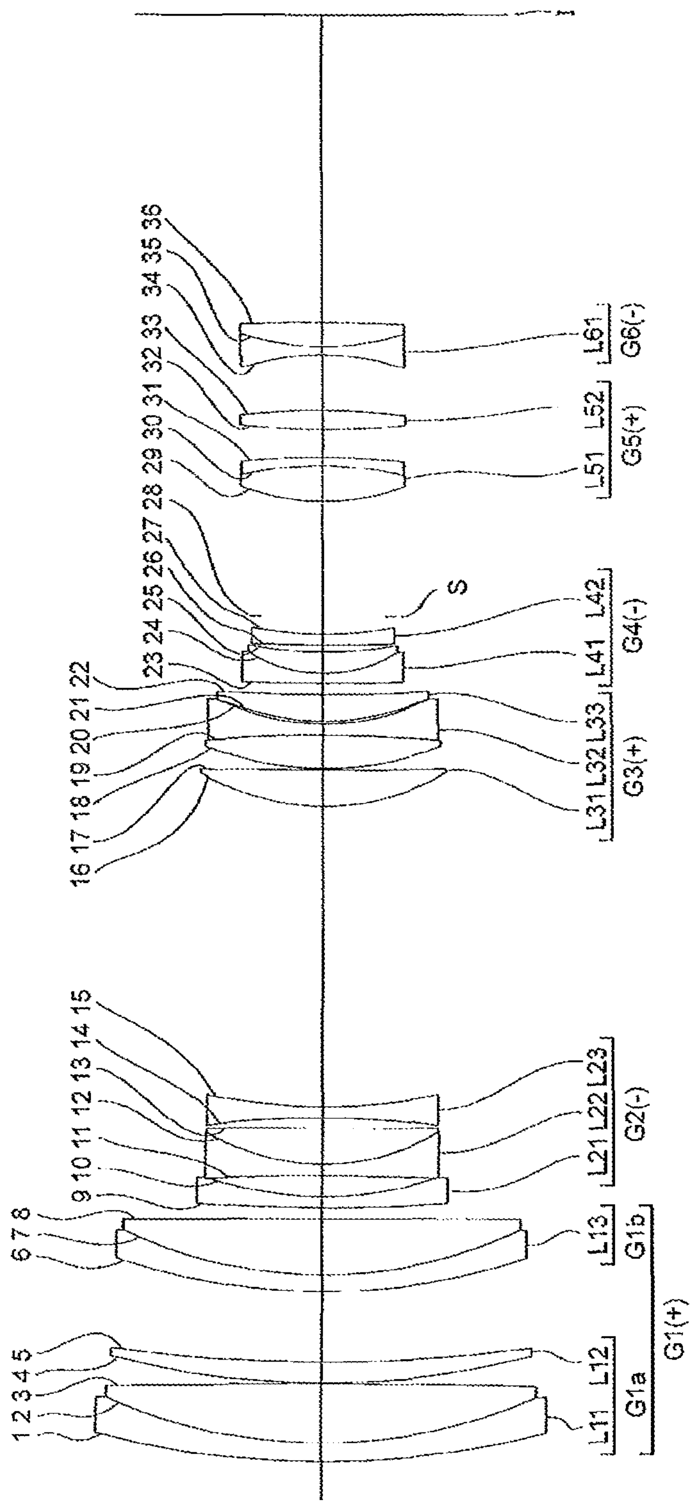
FIG. 10 is a diagram depicting a configuration of a lens system according to Example 3.

Example 3 will now be described with reference to FIG. 10 to FIG. 12 and Table 11 to Table 15. FIG. 10 is a diagram depicting a configuration of a lens system according to Example 3. As FIG. 10 shows, in the lens system according to Example 3, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a positive meniscus lens L31 having a convex surface facing the object, a cemented positive lens L32 in which a biconvex lens and a biconcave lens are cemented, and a positive meniscus lens L33 having a convex surface facing the object.

The fourth lens group G4 has, in order from the object, a cemented negative lens L41 in which a negative meniscus lens having a convex surface facing the object and a positive meniscus lens having a convex surface facing the object are cemented, and a negative meniscus lens L42 having a convex surface facing the object.

The fifth lens group G5 has, in order from the object, a cemented positive lens L51 in which a biconvex lens and a negative meniscus lens having a convex surface facing the image are cemented, and a biconvex lens L52.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 3 are shown in Table 11.

TABLE 11

[All parameters]

| | Wide-angle end | intermediate focal length | telephoto end |
|---|---|---|---|
| f | 81.59~ | 199.36~ | 392.00 |
| FNO | 4.59~ | 5.61~ | 5.80 |
| 2ω | 29.77~ | 12.13~ | 6.20 |
| Image Height | 21.60~ | 21.60~ | 21.60 |
| Total lens Length | 258.89~ | 258.89~ | 258.89 |

[Lens data]

| Surface Number | r | d | nd | νd |
|---|---|---|---|---|
| 1 | 133.8083 | 3.30 | 1.79952 | 42.24 |
| 2 | 78.8175 | 10.60 | 1.49782 | 82.52 |
| 3 | −1382.5946 | 0.10 | | |
| 4 | 123.9007 | 3.70 | 1.49782 | 82.52 |
| 5 | 225.7793 | (d5) | | |
| 6 | 96.4071 | 3.00 | 1.84666 | 23.78 |
| 7 | 69.2697 | 10.00 | 1.58913 | 61.16 |
| 8 | 4131410.10 | (d8) | | |
| 9 | 285.2072 | 2.00 | 1.81600 | 46.62 |
| 10 | 56.3264 | 3.69 | | |
| 11 | −326.3135 | 2.00 | 1.75500 | 52.32 |
| 12 | 33.7548 | 6.48 | 1.80810 | 22.76 |
| 13 | −2938.9650 | 1.80 | | |
| 14 | −139.5484 | 2.00 | 1.81600 | 46.62 |
| 15 | 80.6087 | (d15) | | |
| 16 | 36.3892 | 6.50 | 1.63854 | 55.38 |
| 17 | 1172.1590 | 0.20 | | |
| 18 | 47.5000 | 6.00 | 1.60300 | 65.44 |
| 19 | −193.2842 | 2.00 | 1.79504 | 28.69 |
| 20 | 34.9652 | 0.50 | | |
| *21 | 34.4094 | 4.75 | 1.59201 | 67.02 |
| 22 | 250.3789 | (d22) | | |
| 23 | 338.2642 | 1.80 | 1.75500 | 52.32 |
| 24 | 21.0000 | 3.84 | 1.85026 | 32.35 |
| 25 | 55.4412 | 1.25 | | |
| 26 | 257.4850 | 2.00 | 1.81600 | 46.62 |
| 27 | 55.5783 | 3.30 | | |
| 28 | 0.0000 | (d28) | (aperture stop S) | |
| 29 | 34.7699 | 6.40 | 1.48749 | 70.23 |
| 30 | −54.0693 | 1.50 | 1.78470 | 26.29 |
| 31 | −118.0352 | 5.00 | | |
| *32 | 101.5391 | 3.44 | 1.59201 | 67.02 |
| 33 | −103.4701 | (d33) | | |
| 34 | −37.4152 | 1.50 | 1.81600 | 46.62 |
| 35 | 39.2241 | 4.35 | 1.76182 | 26.52 |
| 36 | −273.3331 | (Bf) | | |

[Each group focal length data]

| Group | First surface | Focal length |
|---|---|---|
| G1 | 1 | 111.2886 |
| G2 | 9 | −33.1811 |
| G3 | 16 | 45.7397 |
| G4 | 23 | −50.3605 |
| G5 | 29 | 40.4786 |
| G6 | 34 | −49.4603 |

In Example 3, the twenty first and thirty second lens surfaces are aspherical. Table 12 shows the [Aspherical data].

TABLE 12

[Aspherical data]

| R | κ | $C_4$ | $C_6$ | $C_8$ | $C_{10}$ |
|---|---|---|---|---|---|
| Twenty first surface | | | | | |
| 34.4094 | +2.1394 | $-7.8728 \times 10^{-6}$ | $-1.0276 \times 10^{-8}$ | $+5.7397 \times 10^{-13}$ | $-3.9681 \times 10^{-14}$ |
| Thirty second surface | | | | | |
| 101.5391 | +8.6994 | $-3.7200 \times 10^{-6}$ | $-5.5601 \times 10^{-9}$ | $+2.6654 \times 10^{-11}$ | $-6.1182 \times 10^{-14}$ |

In Example 3, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 13 shows the [Variable distance data].

TABLE 13

[Variable distance data]

| | Wide-angle end | intermediate focal length | telephoto end |
|---|---|---|---|
| d5 | 12.5694 | 12.5694 | 12.5694 |
| d8 | 2.0000 | 24.6107 | 29.4259 |
| d15 | 53.7638 | 23.9276 | 2.0000 |
| d22 | 2.0000 | 9.2256 | 26.3380 |

TABLE 13-continued

[Variable distance data]

| | Wide-angle end | intermediate focal length | telephoto end |
|---|---|---|---|
| d28 | 20.5472 | 13.9626 | 2.0000 |
| d33 | 10.0198 | 7.9655 | 1.9516 |
| Bf | 54.9999 | 63.6389 | 81.6154 |

Table 14 shows the [Focusing lens group shift distance] in Example 3.

TABLE 14

[Focusing lens group shift distance]

| | Wide-angle end | intermediate focal length | telephoto end |
|---|---|---|---|
| f | 81.5936 | 199.3606 | 392.0046 |
| Δ1b | 10.5694 | 10.5694 | 10.5694 |

Table 15 shows the [Conditional expression correspondence value] in Example 3.

TABLE 15

[Conditional expression correspondence value]

ft = 392.0046
f1b = 195.4172
f2 = −33.1811
f4 = −50.3605
f5 = 40.4786
TL = 258.8949
(1)ft/f1b = 2.0060
(2)|f2/f4| = 0.6589
(3)|f2/f5| = 0.8197
(4)TL/f1b = 1.3248

Figure 11A:
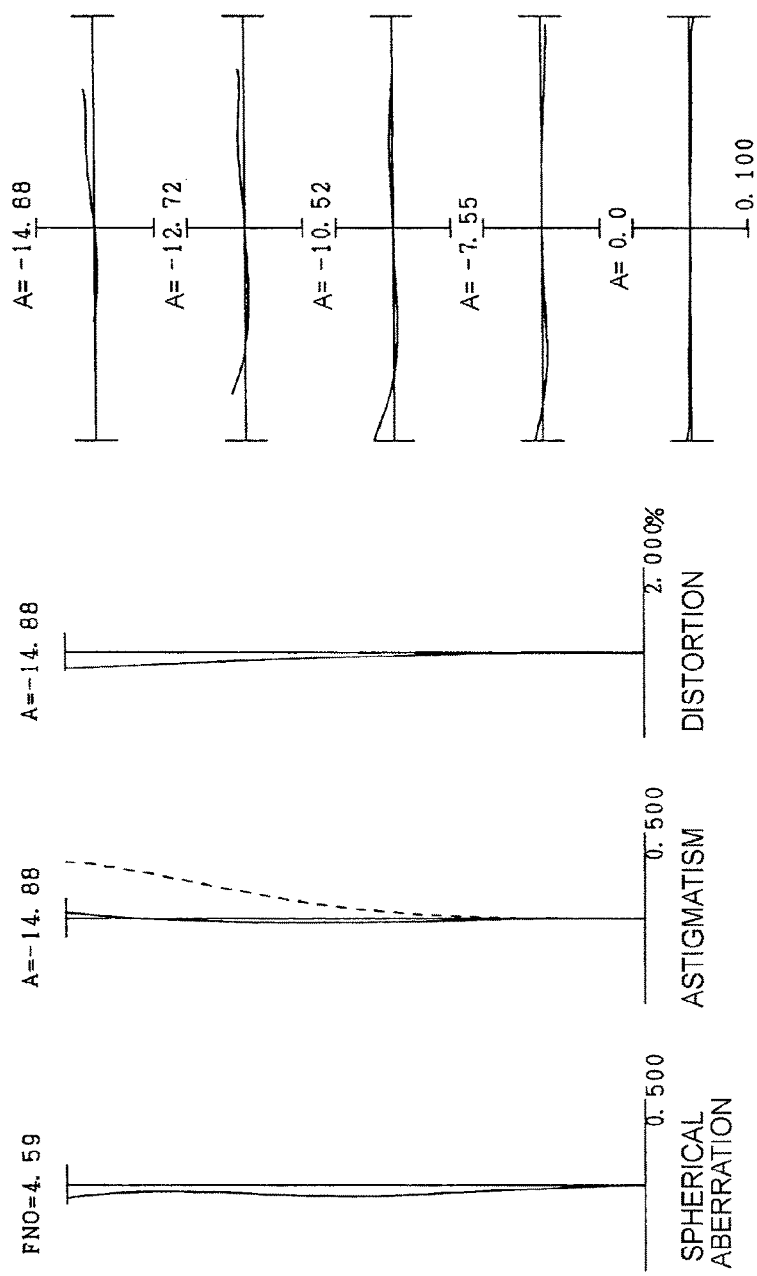
FIGS. 11A to 11C are graphs showing various aberrations of the lens system according to Example 3 upon focusing on infinity, where
Figure 11B:
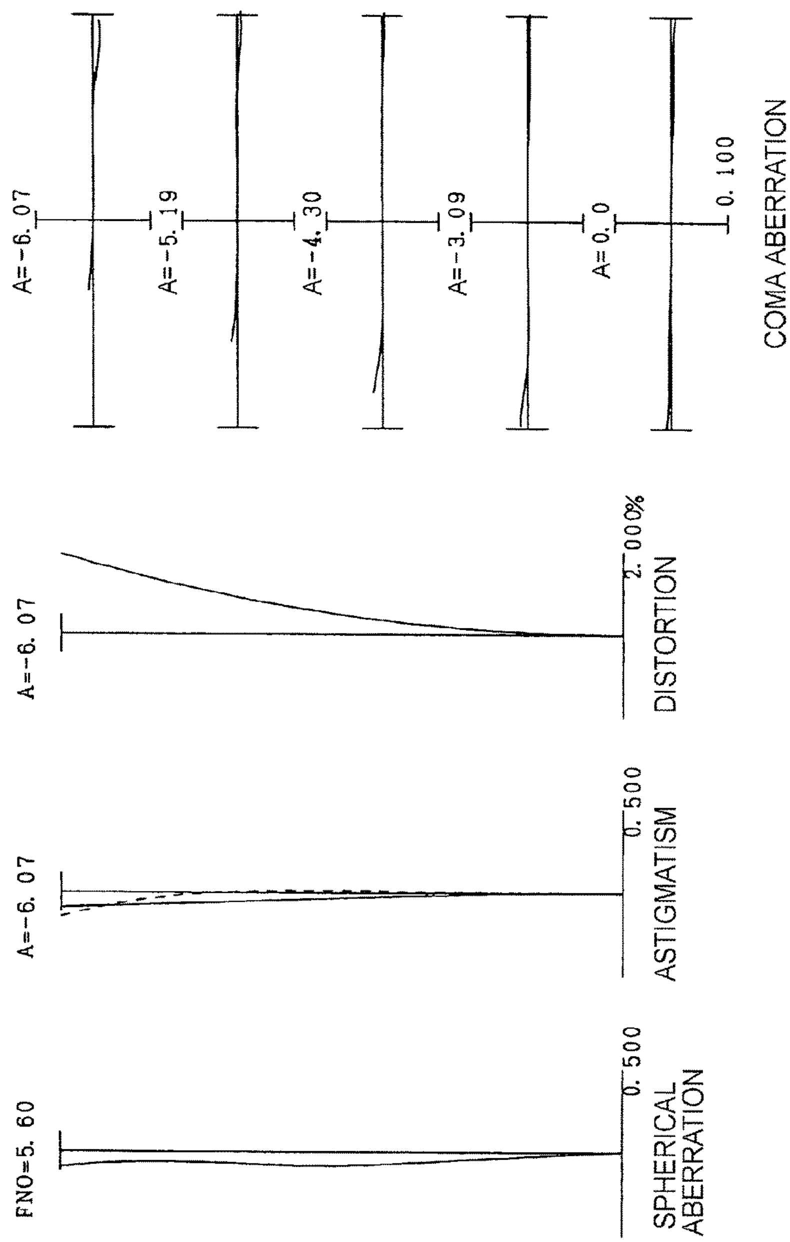
Figure 11C:
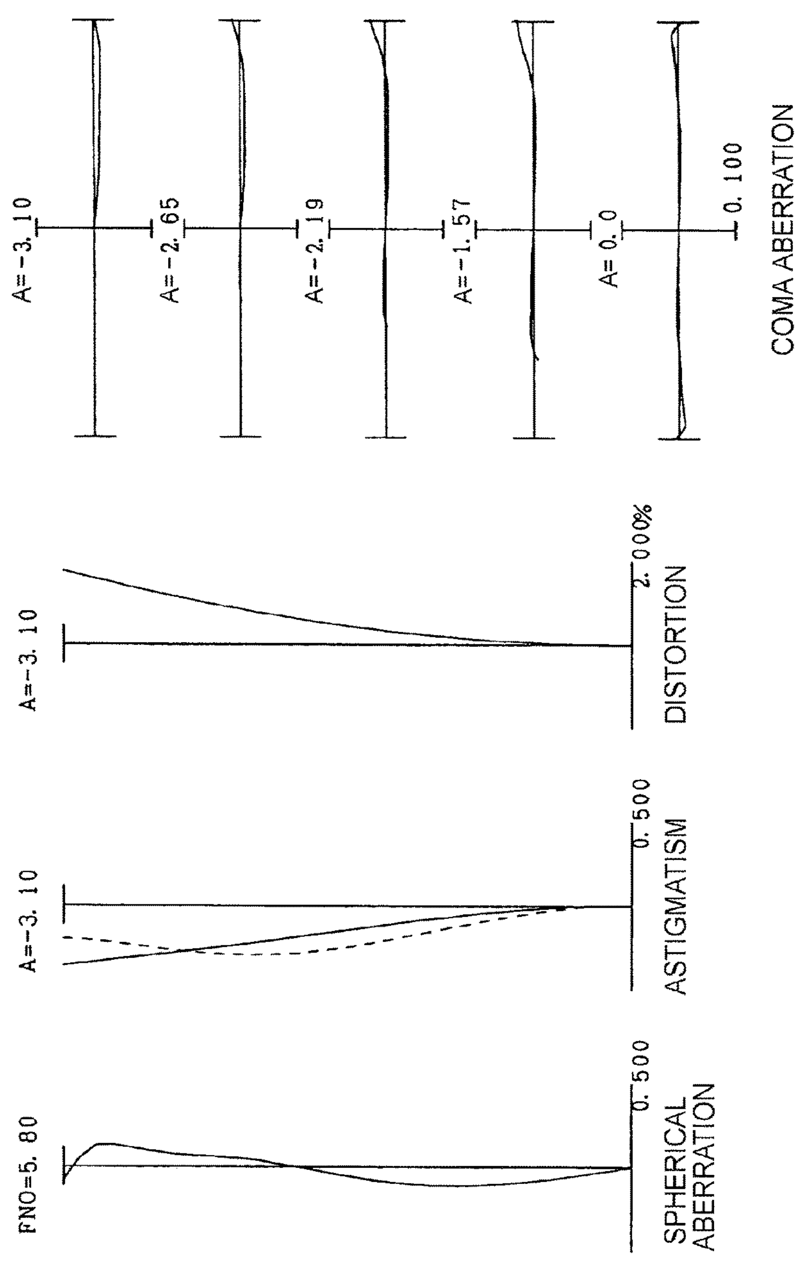
Figure 12A:
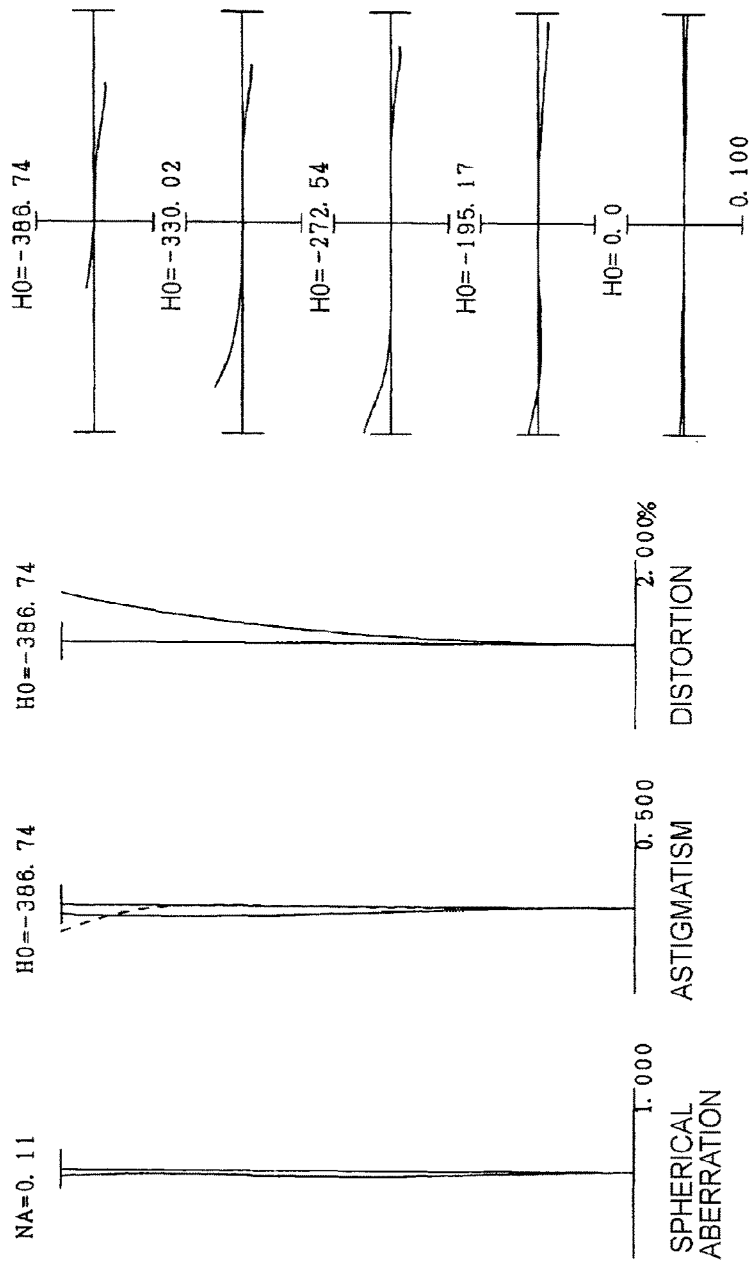
FIG. 12A shows the wide angle end state.
Figure 12B:
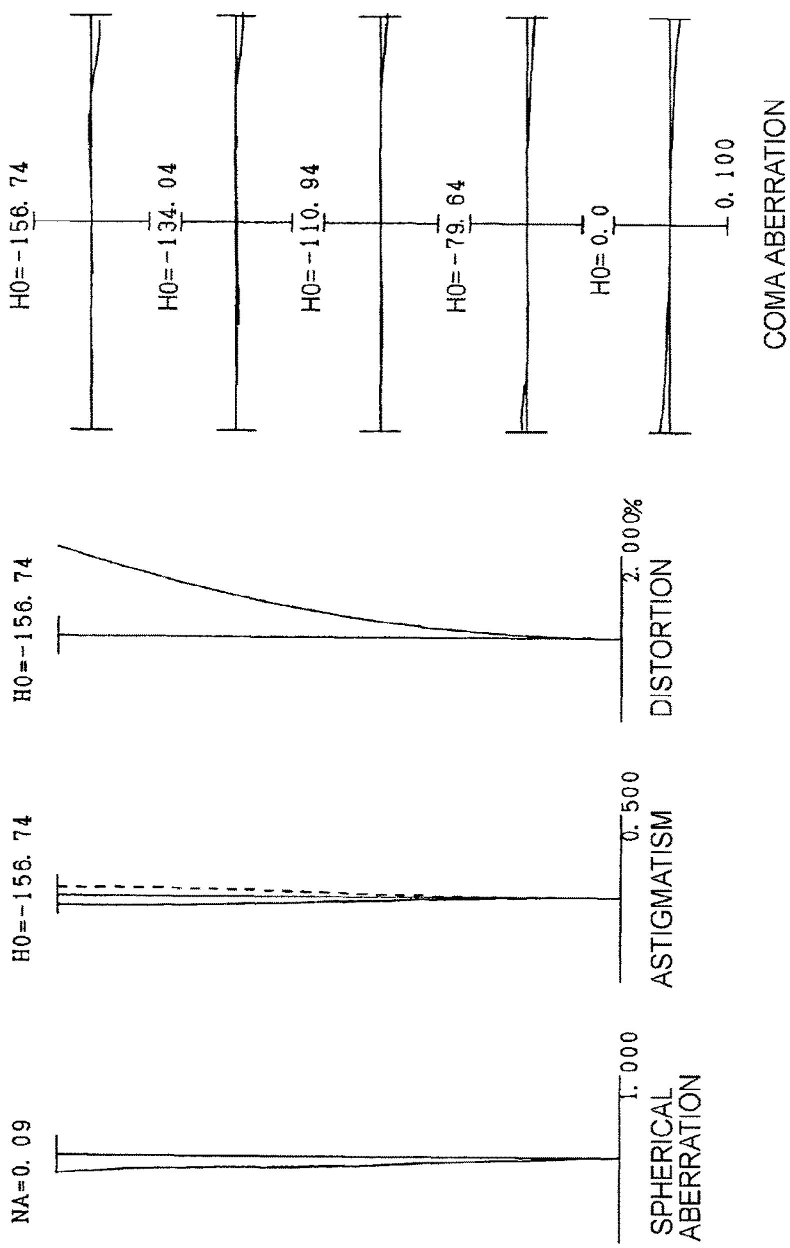
FIG. 12B shows the intermediate focal length state.
Figure 12C:
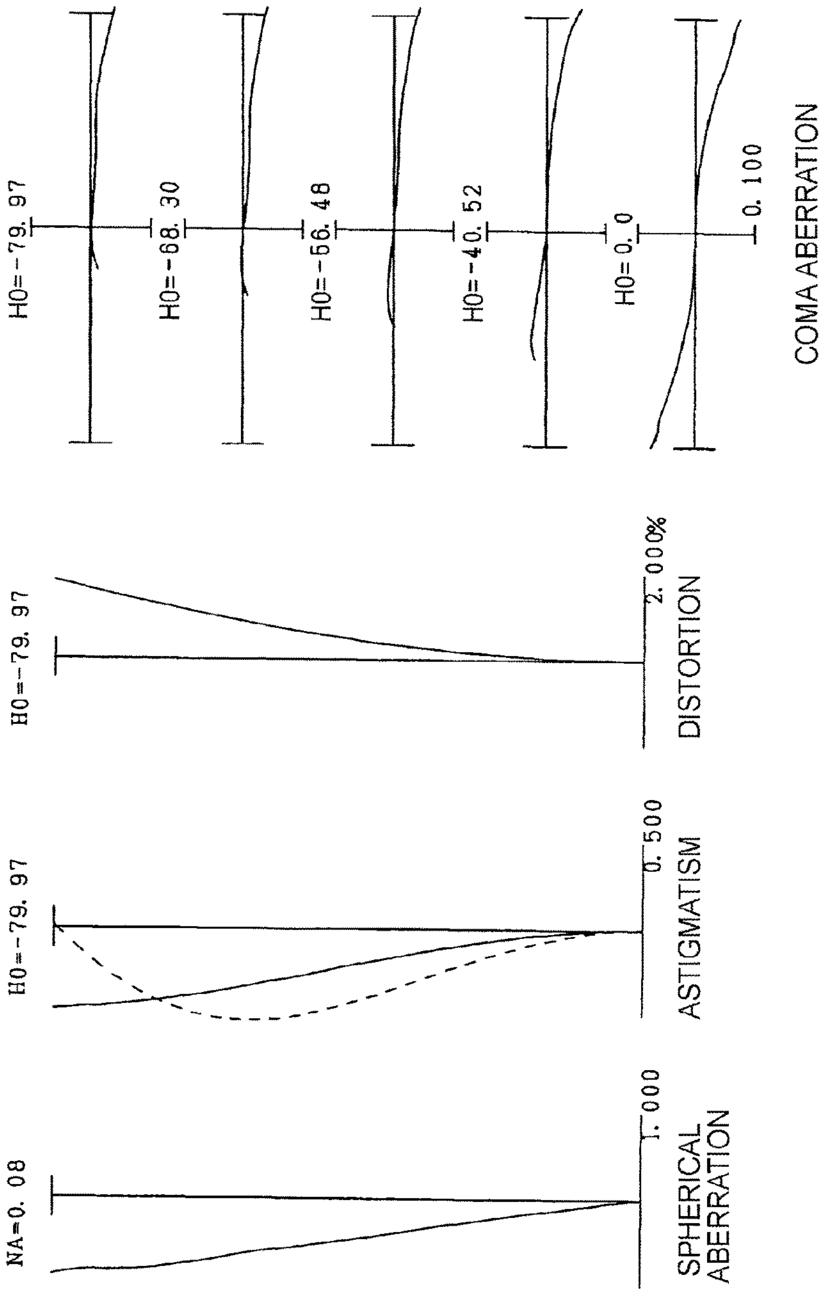
FIG. 12C shows the telephoto end state.

FIGS. 11A to 11C and FIG. 12 are graphs showing various aberrations of Example 3 at d-line (wavelength: 587.6 nm). In other words, FIG. 11A are graphs showing various aberrations upon focusing on infinity in the wide angle end state (f=81.59 mm), FIG. 11B are graphs showing various aberrations upon focusing on infinity in the intermediate focal length state (f=199.36 mm), and FIG. 11C are graphs showing various aberrations upon focusing on infinity in the telephoto end state (f=392.00 mm). FIG. 12A are graphs showing various aberrations upon close distance focusing (photographic distance: 1.8 m) in the wide angle end state (f=81.59 mm), FIG. 12B are graphs showing various aberrations upon close distance focusing (photographic distance: 1.8 m) in the intermediate focal length state (f=199.36 mm), and FIG. 12C are graphs showing various aberrations upon close distance focusing (photographic distance: 1.8 m) in the telephoto end state (f=392.00 mm).

As each graph showing aberrations indicates, according to Example 3, various aberrations are corrected well in each focal length state, from the wide angle end state to the telephoto end state, implementing excellent image forming performance.

Example 4

Figure 13:
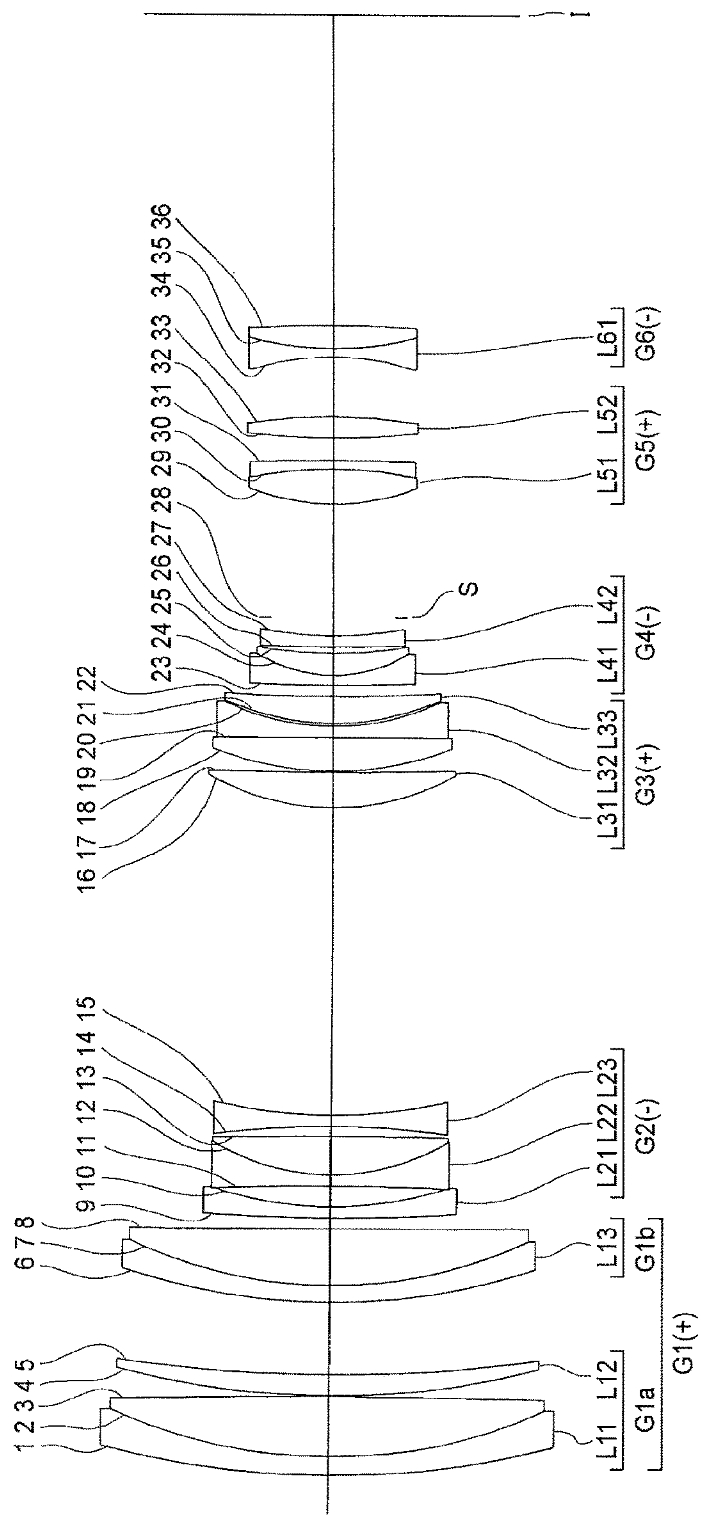
FIG. 13 is a diagram depicting a configuration of a lens system according to Example 4.

Example 4 will now be described with reference to FIG. 13 to FIG. 15 and Table 16 to Table 20. FIG. 13 is a diagram depicting a configuration of a lens system according to Example 4. As FIG. 13 shows, in the lens system according to Example 4, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a positive meniscus lens L31 having a convex surface facing the object, a cemented positive lens L32 in which a biconvex lens and a biconcave lens are cemented, and a positive meniscus lens L33 having a convex surface facing the object.

The fourth lens group G4 has, in order from the object, a cemented negative lens L41 in which a negative meniscus lens having a convex surface facing the object and a positive meniscus lens having a convex surface facing the object are cemented, and a negative meniscus lens L42 having a convex surface facing the object.

The fifth lens group G5 has, in order from the object, a cemented positive lens L51 in which a biconvex lens and a negative meniscus lens having a convex surface facing the image are cemented, and a biconvex lens L52.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 4 are shown in Table 16.

TABLE 16

[All parameters]

| | Wide-angle end | | intermediate focal length | | telephoto end |
|---|---|---|---|---|---|
| f | 81.59 | ~ | 199.36 | ~ | 392.00 |
| FNO | 4.59 | ~ | 5.61 | ~ | 5.81 |
| 2ω | 29.77 | ~ | 12.13 | ~ | 6.20 |
| Image Height | 21.60 | ~ | 21.60 | ~ | 21.60 |
| Total lens Length | 258.89 | ~ | 258.89 | ~ | 258.89 |

[Lens data]

| Surface Number | r | d | nd | νd |
|---|---|---|---|---|
| 1 | 133.2189 | 3.30 | 1.79952 | 42.24 |
| 2 | 78.8413 | 10.60 | 1.49782 | 82.52 |
| 3 | −1349.4584 | 0.10 | | |
| 4 | 122.6506 | 3.70 | 1.49782 | 82.52 |
| 5 | 220.7135 | (d5) | | |
| 6 | 97.4575 | 3.00 | 1.84666 | 23.78 |
| 7 | 69.9753 | 10.00 | 1.58913 | 61.16 |
| 8 | 24541.3080 | (d8) | | |
| 9 | 282.3894 | 2.00 | 1.81600 | 46.62 |
| 10 | 56.0314 | 3.60 | | |
| 11 | −461.8664 | 2.00 | 1.75500 | 52.32 |
| 12 | 33.3947 | 6.76 | 1.80810 | 22.76 |
| 13 | −738.5057 | 1.80 | | |

TABLE 16-continued

| | | | | |
|---|---|---|---|---|
| 14 | −126.0189 | 2.00 | 1.81600 | 46.62 |
| 15 | 74.9764 | (d15) | | |
| 16 | 37.2017 | 6.19 | 1.64000 | 60.08 |
| 17 | 576.2061 | 0.20 | | |
| 18 | 47.5000 | 6.00 | 1.60300 | 65.44 |
| 19 | −7507.9456 | 2.00 | 1.80518 | 25.42 |
| 20 | 36.3965 | 0.50 | | |
| *21 | 34.8130 | 4.75 | 1.59201 | 67.02 |
| 22 | 233.2302 | (d22) | | |
| 23 | 229.8851 | 1.80 | 1.75500 | 52.32 |
| 24 | 21.0000 | 3.87 | 1.85026 | 32.35 |
| 25 | 56.8337 | 1.27 | | |
| 26 | 310.8842 | 2.00 | 1.81600 | 46.62 |
| 27 | 51.7027 | 3.30 | | |
| 28 | 0.0000 | (d28) | (aperture stop S) | |
| 29 | 33.4670 | 6.20 | 1.48749 | 70.23 |
| 30 | −59.9741 | 1.50 | 1.72342 | 37.95 |
| 31 | −389.3003 | 4.00 | | |
| *32 | 92.5529 | 3.79 | 1.59201 | 67.02 |
| 33 | −79.9013 | (d33) | | |
| 34 | −36.8881 | 1.50 | 1.81600 | 46.62 |
| 35 | 44.4662 | 4.15 | 1.75520 | 27.51 |
| 36 | −209.2278 | (Bf) | | |

[Each group focal length data]

| Group | First surface | Focal length |
|---|---|---|
| G1 | 1 | 111.9505 |
| G2 | 9 | −33.2912 |
| G3 | 16 | 45.4892 |
| G4 | 23 | −50.1305 |
| G5 | 29 | 40.9529 |
| G6 | 34 | −50.9236 |

In Example 4, the twenty first and thirty second lens surfaces are aspherical. Table 17 shows the [Aspherical data].

TABLE 17

[Aspherical data]

| R | κ | $C_4$ | $C_6$ | $C_8$ | $C_{10}$ |
|---|---|---|---|---|---|
| Twenty first surface | | | | | |
| 34.8130 | +2.1787 | $-7.5607 \times 10^{-6}$ | $-9.8093 \times 10^{-9}$ | $+7.0798 \times 10^{-13}$ | $-3.7586 \times 10^{-14}$ |
| Thirty second surface | | | | | |
| 92.5529 | +10.9948 | $-5.1008 \times 10^{-6}$ | $-6.0990 \times 10^{-9}$ | $+2.5694 \times 10^{-11}$ | $-6.0529 \times 10^{-14}$ |

In Example 4, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 18 shows the [Variable distance data].

TABLE 18

[Variable distance data]

| | Wide-angle end | intermediate focal length | telephoto end |
|---|---|---|---|
| d5 | 12.7700 | 12.7700 | 12.7700 |
| d8 | 2.0000 | 24.7297 | 29.0024 |
| d15 | 54.4773 | 24.4138 | 2.0000 |
| d22 | 2.0000 | 9.3337 | 27.4749 |
| d28 | 20.1271 | 13.9837 | 2.0000 |
| d33 | 10.6112 | 8.2089 | 1.8252 |
| Bf | 54.9997 | 63.5451 | 81.9118 |

Table 19 shows the [Focusing lens group shift distance] in Example 4.

TABLE 19

[Focusing lens group shift distance]

| | Wide-angle end | intermediate focal length | telephoto end |
|---|---|---|---|
| f | 81.5936 | 199.3606 | 392.0046 |
| Δ1b | 10.7700 | 10.7700 | 10.7700 |

Table 20 shows the [Conditional expression correspondence value] in Example 4.

TABLE 20

[Conditional expression correspondence value]

ft = 392.0023
f1b = 198.5617
f2 = −33.2912
f4 = −50.1305
f5 = 40.9529
TL = 258.8947
(1) ft/f1b = 1.9742
(2) |f2/f4| = 0.6641
(3) |f2/f5| = 0.8129
(4) TL/f1b = 1.3039

Figure 14A:
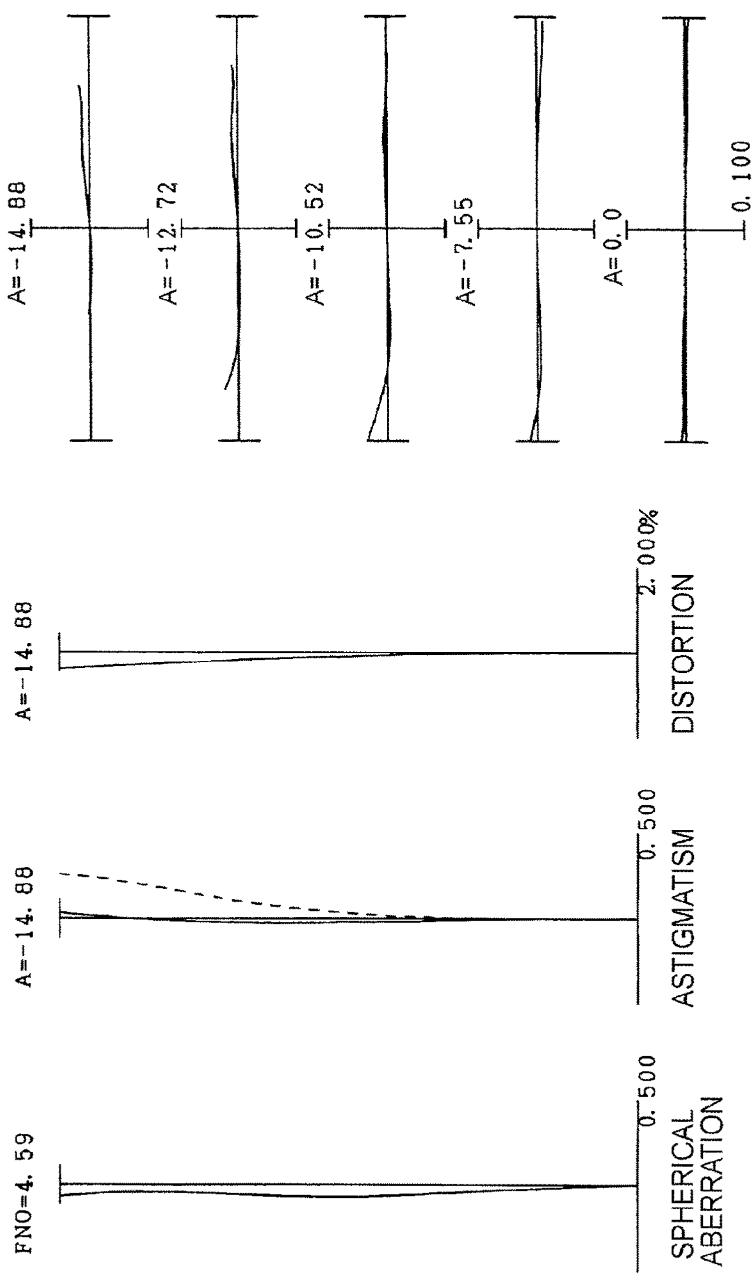
FIG. 14A shows the wide angle end state.
Figure 14B:
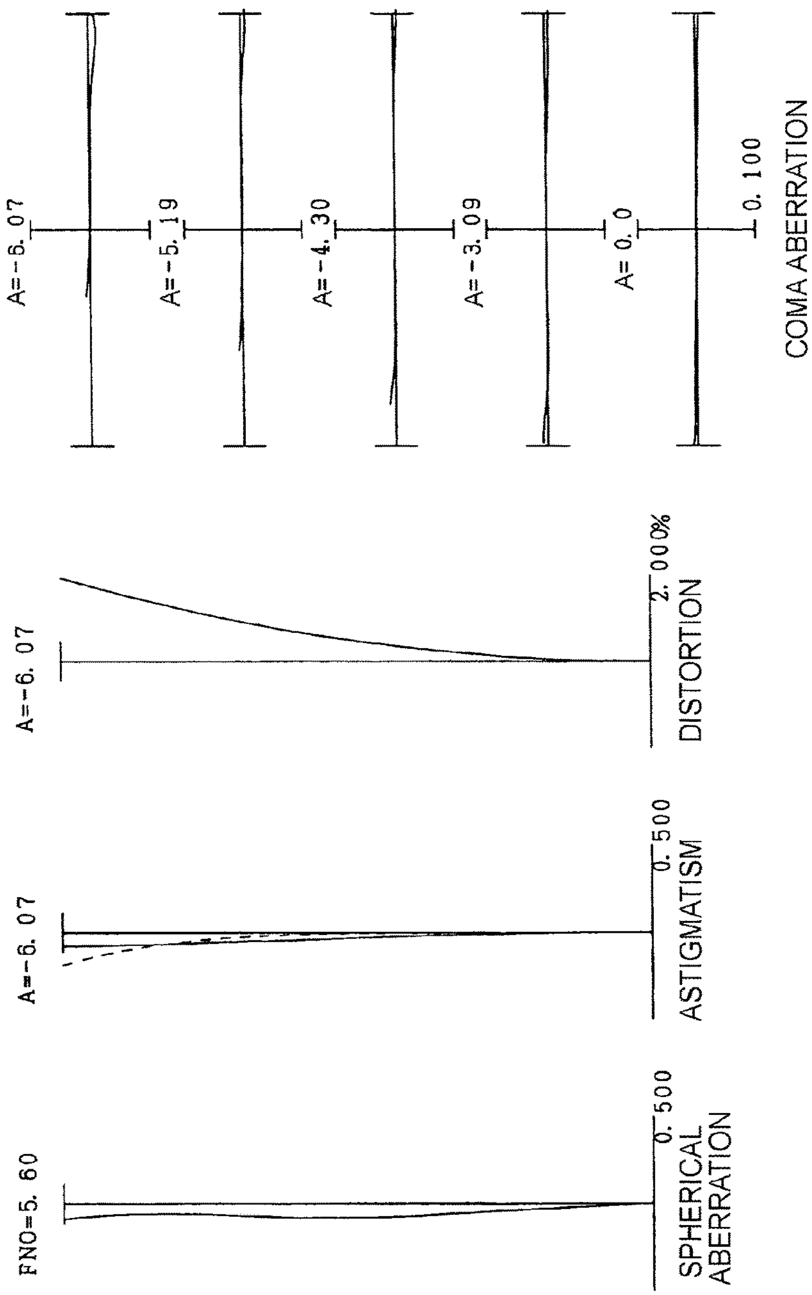
FIG. 14B shows the intermediate focal length state.
Figure 14C:
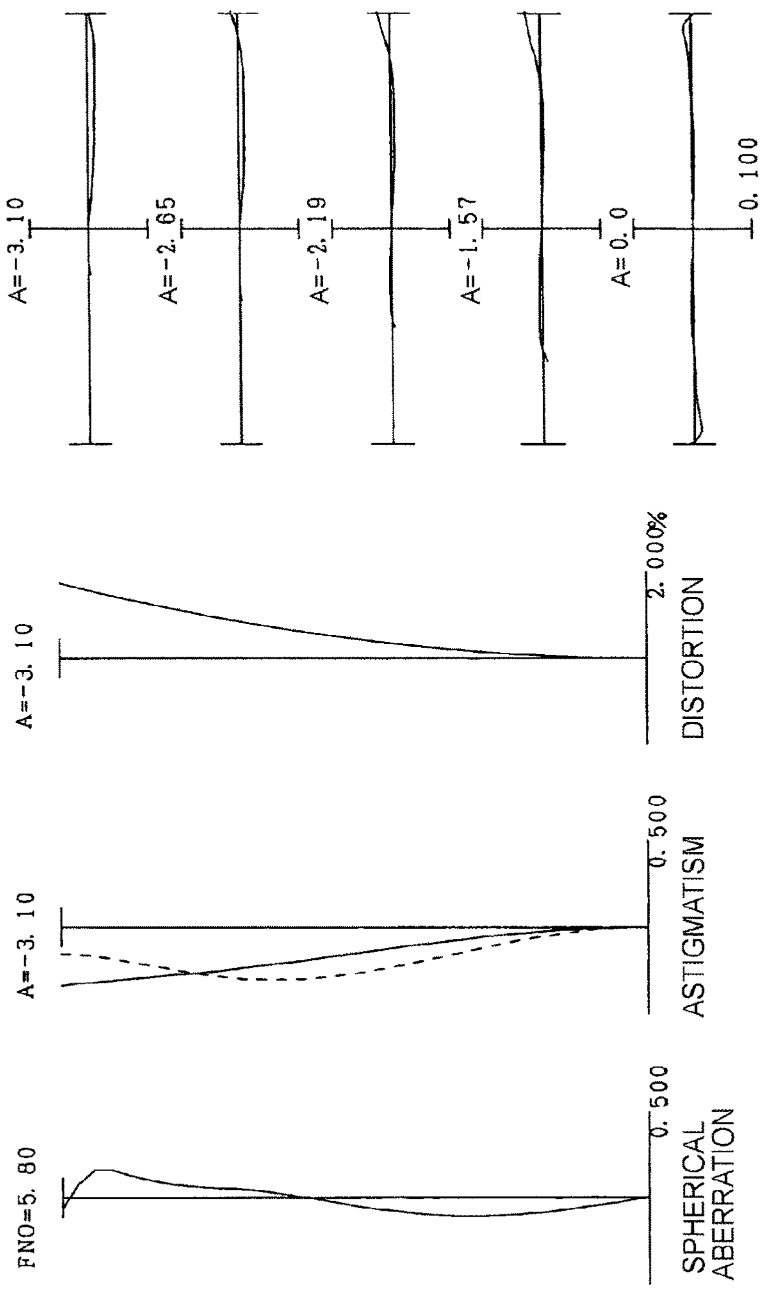
FIG. 14C shows the telephoto end state.
Figure 15A:
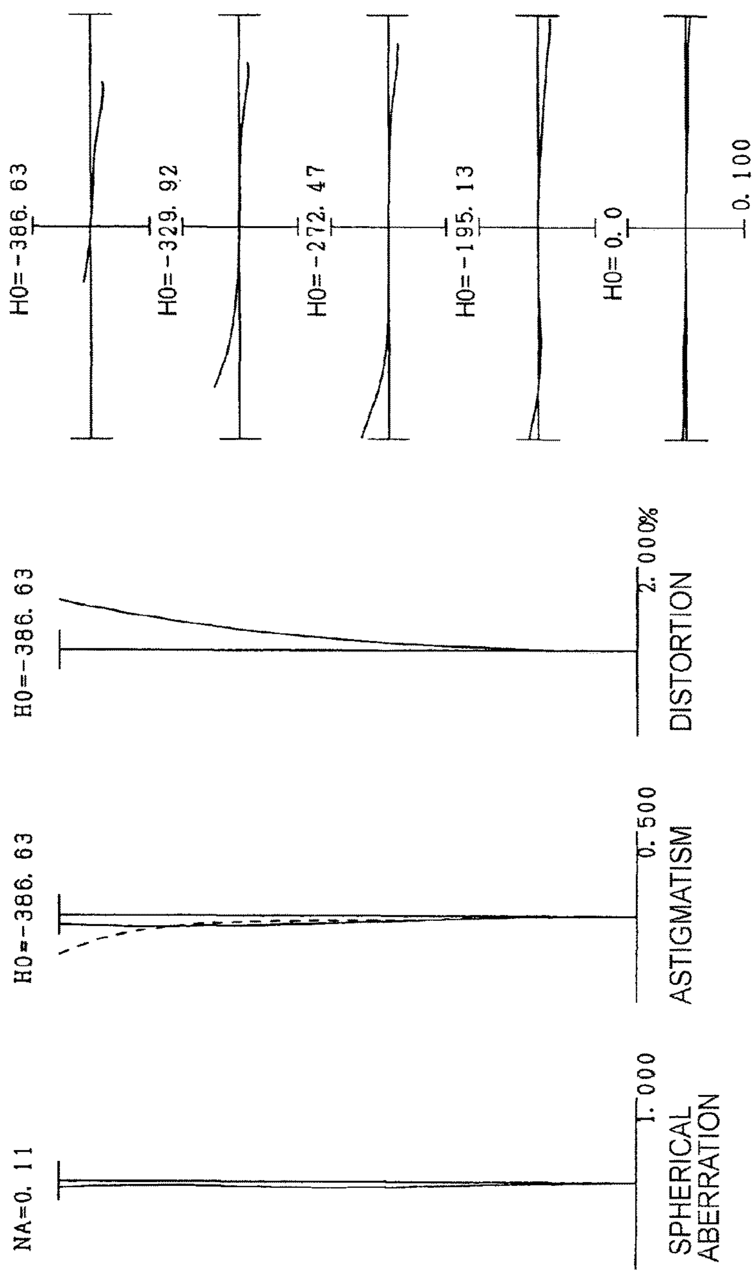
FIG. 15A shows the wide angle end state.
Figure 15B:
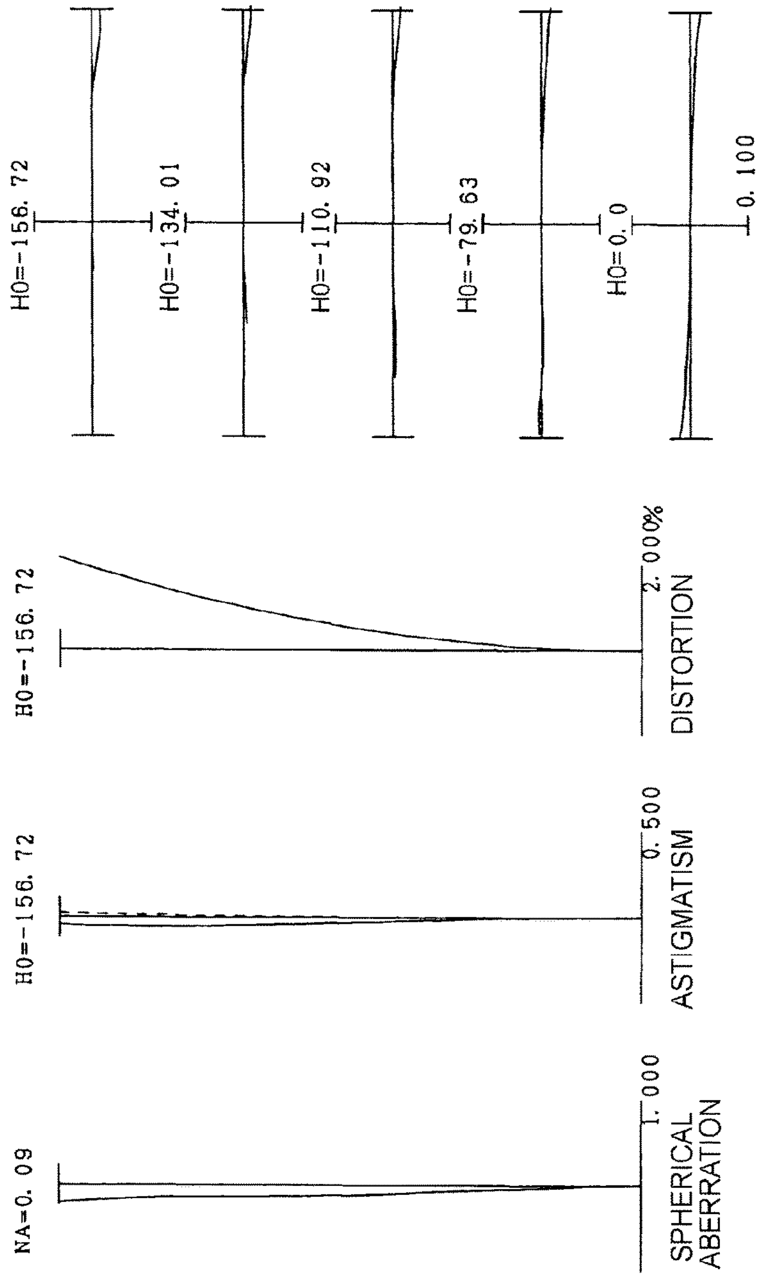
FIG. 15B shows the intermediate focal length state.
Figure 15C:
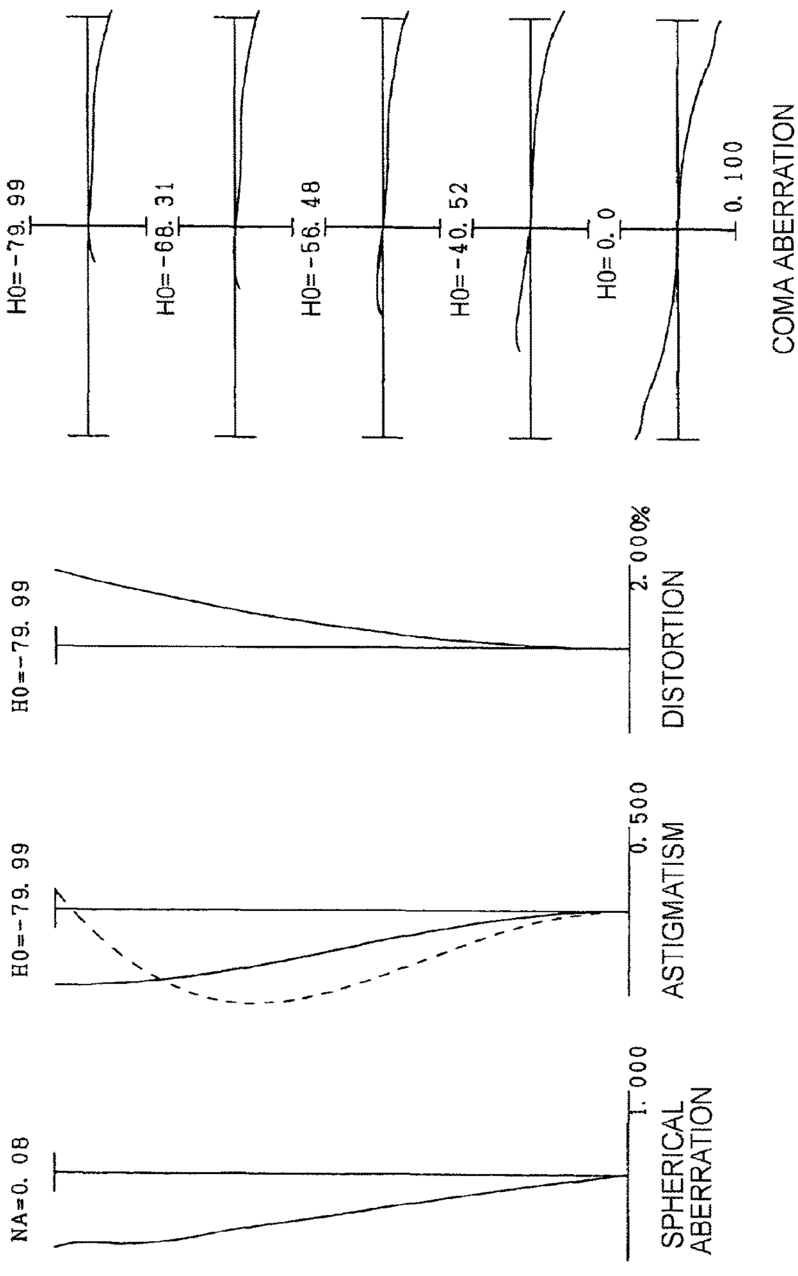
FIG. 15C shows the telephoto end state.

FIG. 14 and FIG. 15 are graphs showing various aberrations of Example 4 at d-line (wavelength: 587.6 nm). In other words, FIG. 14A are graphs showing various aberrations upon focusing on infinity in the wide angle end state (f=81.59 mm), FIG. 14B are graphs showing various aberrations upon focusing on infinity in the intermediate focal length state (f=199.36 mm), and FIG. 14C are graphs showing various aberrations upon focusing on infinity in the telephoto end state (f=392.00 mm). FIG. 15A are graphs showing various aberrations upon close distance focusing (photographic distance: 1.8 m) in the wide angle end state (f=81.59 mm), FIG. 15B are graphs showing various aberrations upon close distance focusing (photographic distance:

1.8 m) in the intermediate focal length state (f=199.36 mm), and FIG. 15C are graphs showing various aberrations upon close distance focusing (photographic distance: 1.8 m) in the telephoto end state (f=392.00 mm).

As each graph showing aberrations indicates, according to Example 1, various aberrations are corrected well in each focal length state, from the wide angle end state to the telephoto end state, implementing excellent image forming performance.

Example 5

Figure 16:
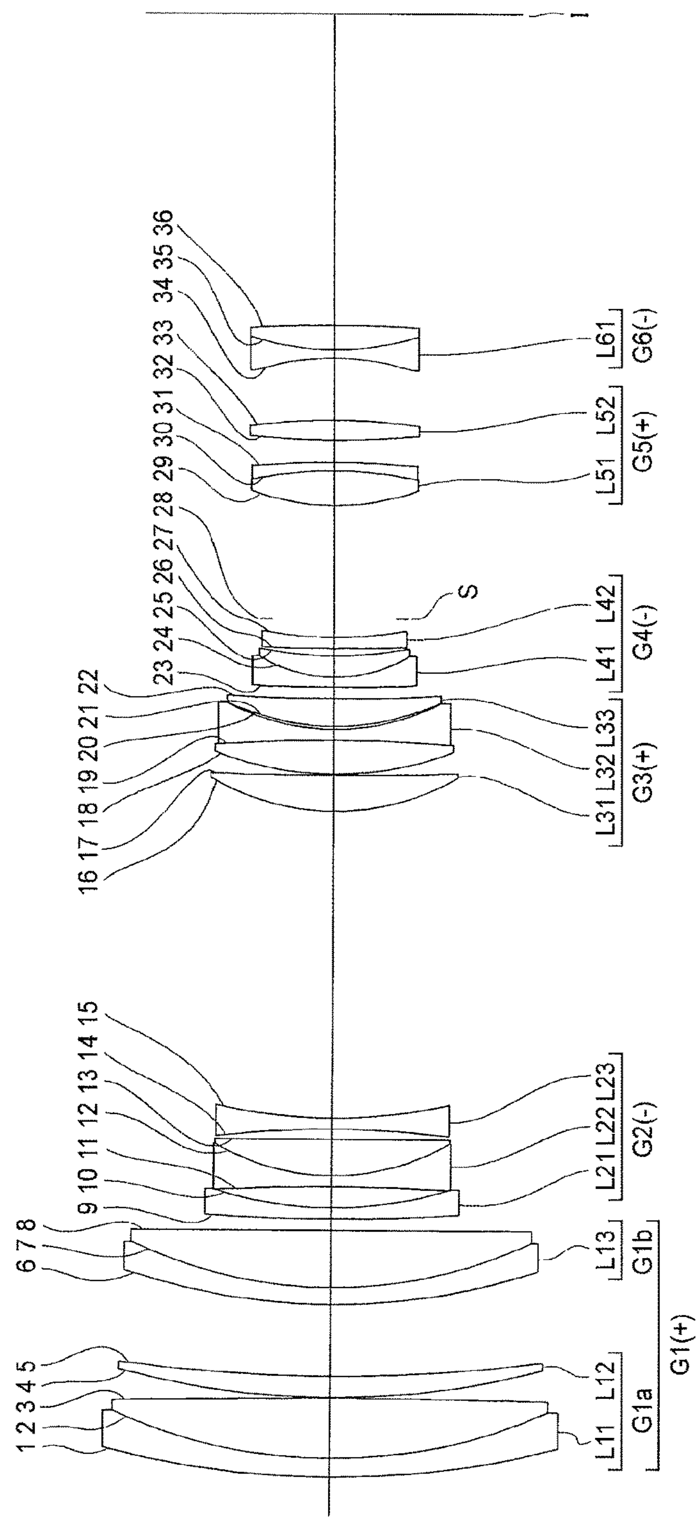
FIG. 16 is a diagram depicting a configuration of a lens system according to Example 5.

Example 5 will now be described with reference to FIG. 16 to FIG. 18 and Table 21 to Table 25. FIG. 16 is a diagram depicting a configuration of a lens system according to Example 5. As FIG. 16 shows, in the lens system according to Example 5, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a positive meniscus lens L31 having a convex surface facing the object, a cemented positive lens L32 in which a biconvex lens and a biconcave lens are cemented, and a positive meniscus lens L33 having a convex surface facing the object.

The fourth lens group G4 has, in order from the object, a cemented negative lens L41 in which a negative meniscus lens having a convex surface facing the object and a positive meniscus lens having a convex surface facing the object are cemented, and a negative meniscus lens L42 having a convex surface facing the object.

The fifth lens group G5 has, in order from the object, a cemented positive lens L51 in which a biconvex lens and a negative meniscus lens having a convex surface facing the image are cemented, and a biconvex lens L52.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 5 are shown in Table 21.

TABLE 21

[All parameters]

| | Wide-angle end | | intermediate focal length | | telephoto end |
|---|---|---|---|---|---|
| f | 81.59 | ~ | 199.36 | ~ | 392.00 |
| FNO | 4.59 | ~ | 5.61 | ~ | 5.80 |
| 2ω | 29.77 | ~ | 12.13 | ~ | 6.20 |
| Image Height | 21.60 | ~ | 21.60 | ~ | 21.60 |
| Total lens Length | 258.90 | ~ | 258.90 | ~ | 258.90 |

TABLE 21-continued

[Lens data]

| Surface Number | r | d | nd | νd |
|---|---|---|---|---|
| 1 | 133.6762 | 3.30 | 1.79952 | 42.24 |
| 2 | 79.0071 | 10.60 | 1.49782 | 82.52 |
| 3 | −1375.1125 | 0.10 | | |
| 4 | 123.6607 | 3.70 | 1.49782 | 82.52 |
| 5 | 225.7101 | (d5) | | |
| 6 | 97.7416 | 3.00 | 1.84666 | 23.78 |
| 7 | 70.2029 | 10.00 | 1.58913 | 61.16 |
| 8 | 44043.7160 | (d8) | | |
| 9 | 268.7227 | 2.00 | 1.81600 | 46.62 |
| 10 | 57.1628 | 3.64 | | |
| 11 | −333.8661 | 2.00 | 1.75500 | 52.32 |
| 12 | 33.9852 | 6.40 | 1.80810 | 22.76 |
| 13 | −10324.962 | 1.80 | | |
| 14 | −146.8295 | 2.00 | 1.81600 | 46.62 |
| 15 | 77.5945 | (d15) | | |
| 16 | 35.9057 | 6.40 | 1.63854 | 55.38 |
| 17 | 568.1739 | 0.20 | | |
| 18 | 47.5000 | 6.00 | 1.60300 | 65.44 |
| 19 | −247.4569 | 2.00 | 1.79504 | 28.69 |
| 20 | 34.2135 | 0.50 | | |
| *21 | 33.5894 | 4.88 | 1.59201 | 67.02 |
| 22 | 277.3494 | (d22) | | |
| 23 | 290.3258 | 1.80 | 1.75500 | 52.32 |
| 24 | 21.0000 | 3.83 | 1.85026 | 32.35 |
| 25 | 55.5062 | 1.27 | | |
| 26 | 272.4402 | 2.00 | 1.81600 | 46.62 |
| 27 | 54.3181 | 3.30 | | |
| 28 | 0.0000 | (d28) | (aperture stop S) | |
| 29 | 34.7823 | 6.20 | 1.48749 | 70.23 |
| 30 | −57.3362 | 1.50 | 1.78470 | 26.29 |
| 31 | −145.0487 | 4.00 | | |
| *32 | 109.8688 | 3.49 | 1.59201 | 67.02 |
| 33 | −90.1349 | (d33) | | |
| 34 | −37.9388 | 1.50 | 1.81600 | 46.62 |
| 35 | 39.7626 | 4.36 | 1.76182 | 26.52 |
| 36 | −237.8547 | (Bf) | | |

[Each group focal length data]

| Group | First surface | Focal length |
|---|---|---|
| G1 | 1 | 112.0296 |
| G2 | 9 | −33.3823 |
| G3 | 16 | 45.7985 |
| G4 | 23 | −50.1309 |
| G5 | 29 | 40.9799 |
| G6 | 34 | −51.4035 |

In Example 5, the twenty first and thirty second lens surfaces are aspherical. Table 22 shows the [Aspherical data].

TABLE 22

| [Aspherical data] | | | | | |
|---|---|---|---|---|---|
| R | κ | $C_4$ | $C_6$ | $C_8$ | $C_{10}$ |
| Twenty first surface | | | | | |
| 33.5894 | +2.0354 | $-7.9225 \times 10^{-6}$ | $-1.0415 \times 10^{-8}$ | $+5.4592 \times 10^{-13}$ | $-4.0884 \times 10^{-14}$ |
| Thirty second surface | | | | | |
| 109.8688 | −4.4025 | $-2.6052 \times 10^{-6}$ | $-4.9948 \times 10^{-9}$ | $+2.5279 \times 10^{-11}$ | $-5.5767 \times 10^{-14}$ |

In Example 5, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 23 shows the [Variable distance data]. In the table, the direction of shift to the object is defined as a positive direction.

TABLE 23

| [Variable distance data] | | | |
|---|---|---|---|
| | Wide-angle end | intermediate focal length | telephoto end |
| d5 | 12.7840 | 12.7840 | 12.7840 |
| d8 | 2.0000 | 24.8714 | 29.5496 |
| d15 | 54.2502 | 24.2109 | 2.0000 |
| d22 | 2.0000 | 9.1679 | 26.7006 |
| d28 | 20.1680 | 13.8569 | 2.0000 |
| d33 | 10.9315 | 8.6853 | 2.1288 |
| Bf | 55.0000 | 63.5573 | 81.9705 |

Table 24 shows the [Focusing lens group shift distance] in Example 5. In the table, the direction of shift to the object is defined as a positive direction.

TABLE 24

| [Focusing lens group shift distance] | | | |
|---|---|---|---|
| | Wide-angle end | intermediate focal length | telephoto end |
| f | 81.5937 | 199.3609 | 392.0050 |
| Δ1b | 10.7840 | 10.7840 | 10.7840 |

Table 25 shows the [Conditional expression correspondence value] in Example 5.

TABLE 25

| [Conditional expression correspondence value] |
|---|
| ft = 392.0050 |
| f1b = 198.6996 |
| f2 = −33.3823 |
| f4 = −50.1309 |
| f5 = 40.9799 |
| TL = 258.8950 |
| (1) ft/f1b = 1.9729 |
| (2) \|f2/f4\| = 0.6659 |
| (3) \|f2/f5\| = 0.8146 |
| (4) TL/f1b = 1.3029 |

Figure 17A:
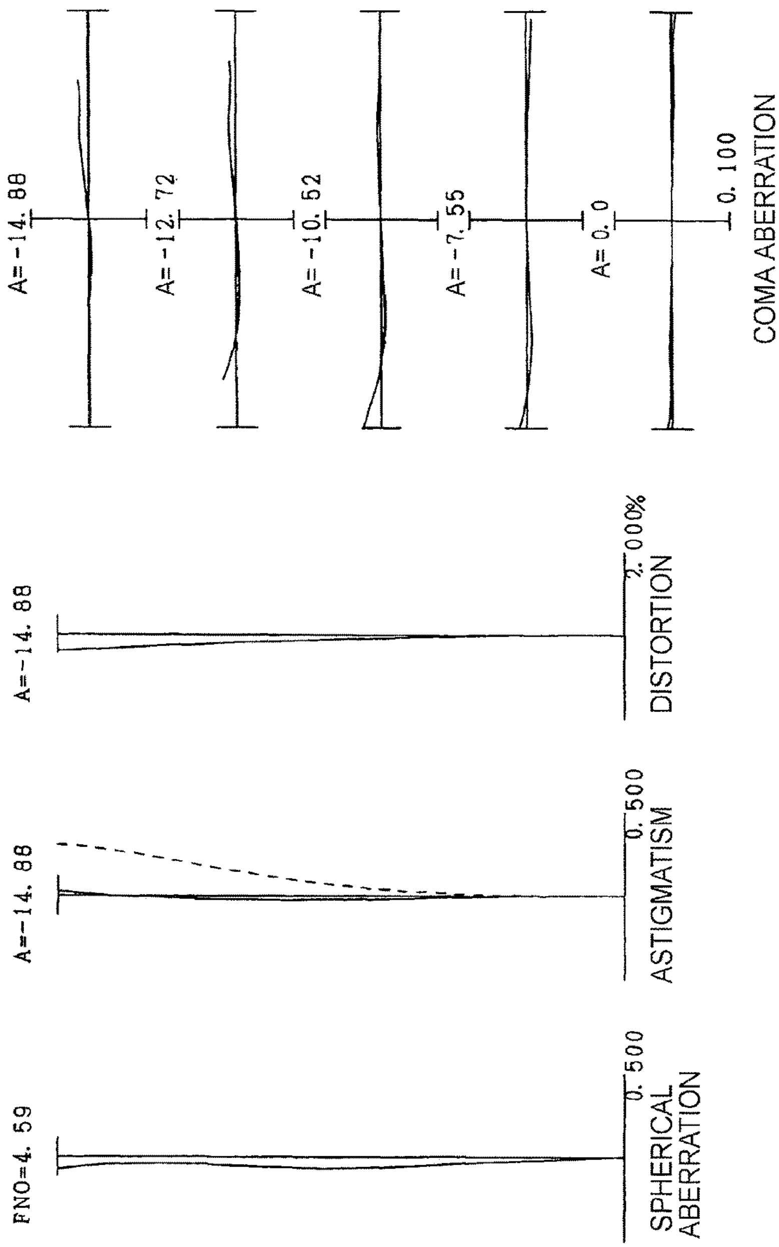
FIG. 17A shows the wide angle end state.
Figure 17B:
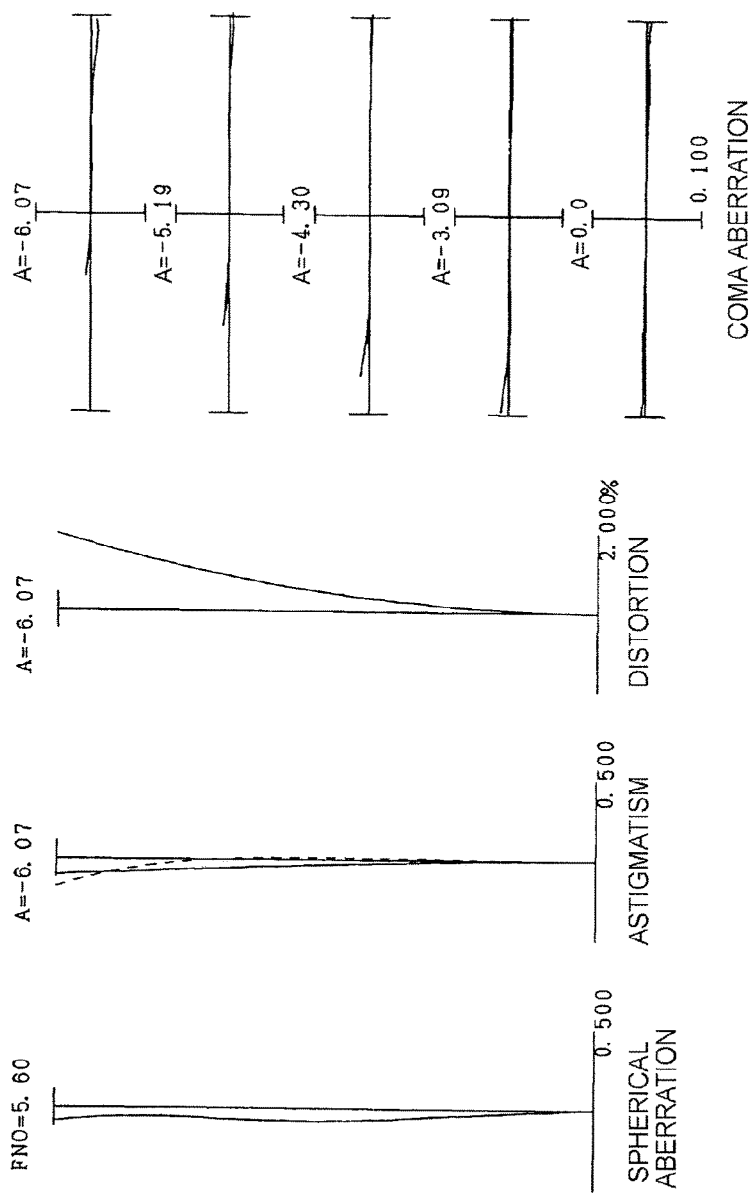
FIG. 17B shows the intermediate focal length state.
Figure 17C:
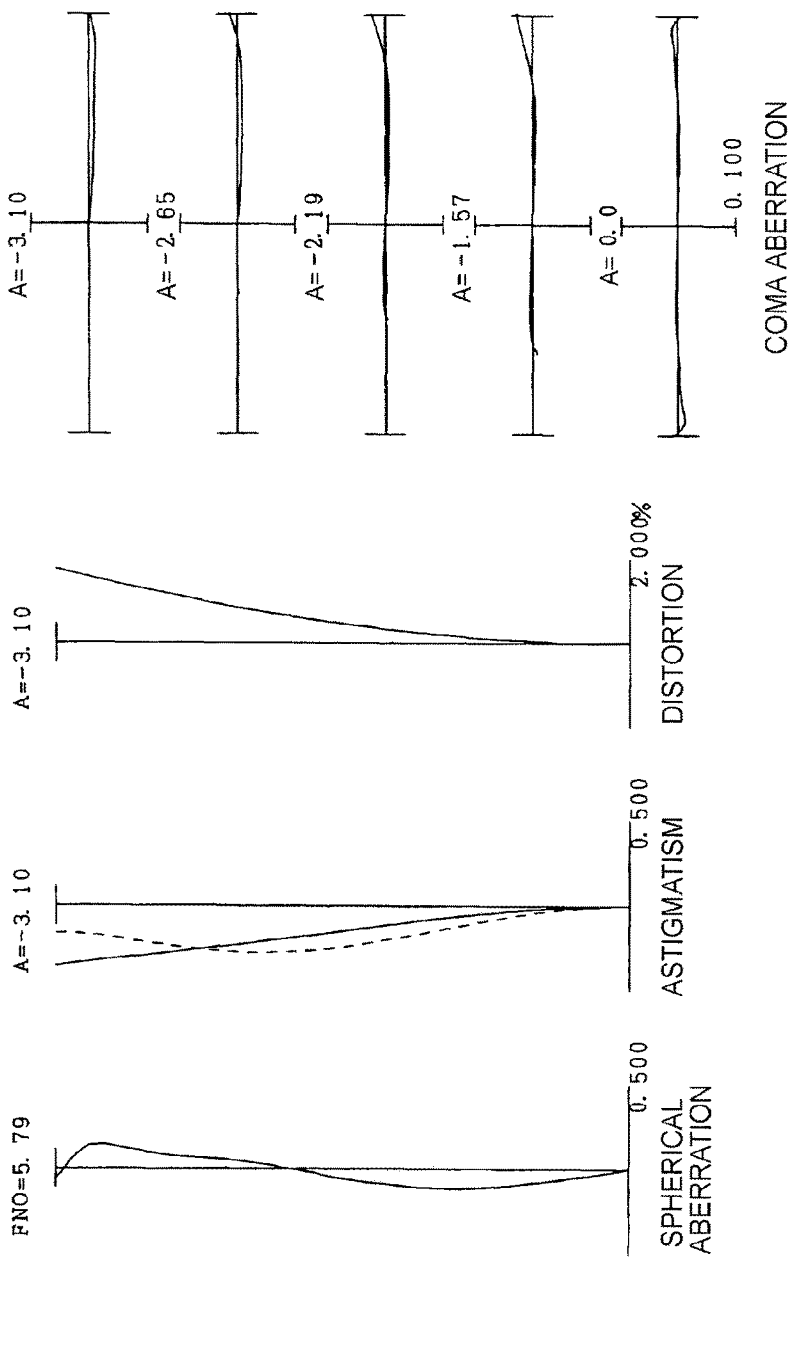
FIG. 17C shows the telephoto end state.
Figure 18A:
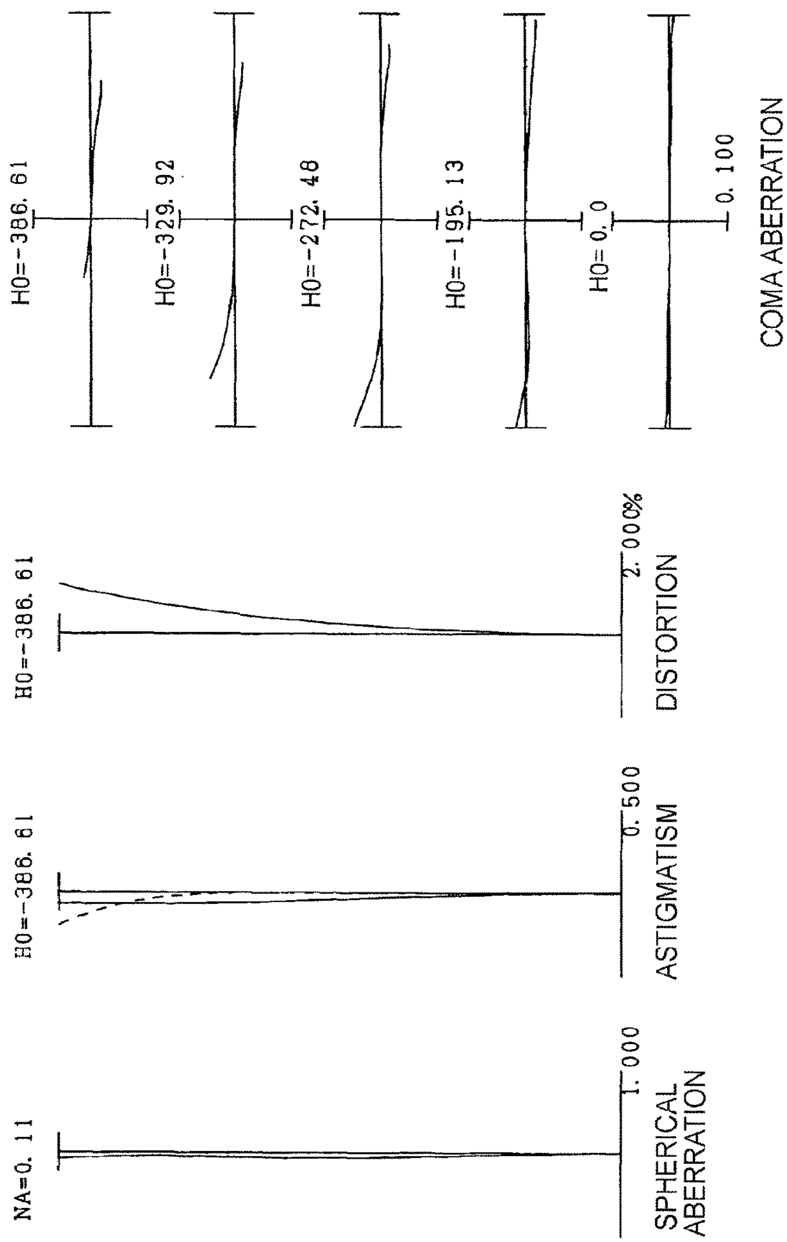
FIG. 18A shows the wide angle end state.
Figure 18B:
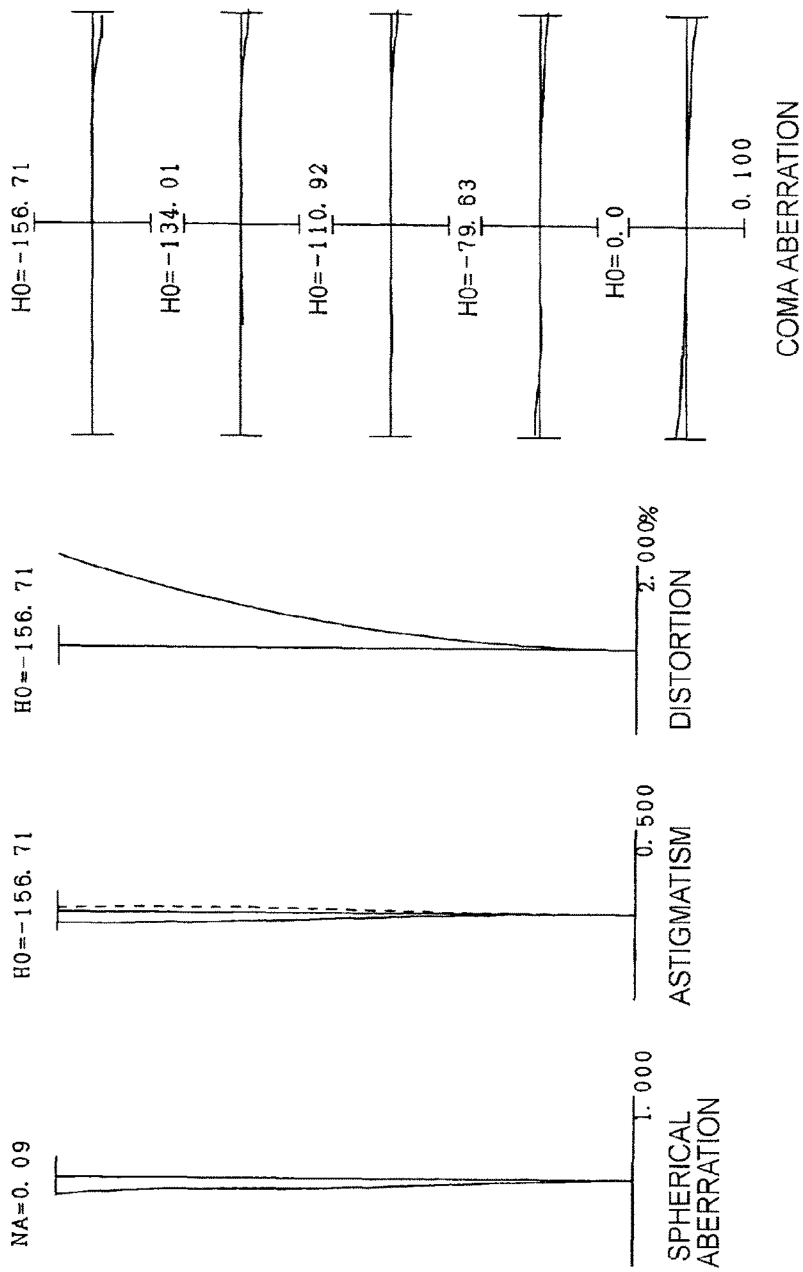
FIG. 18B shows the intermediate focal length state.
Figure 18C:
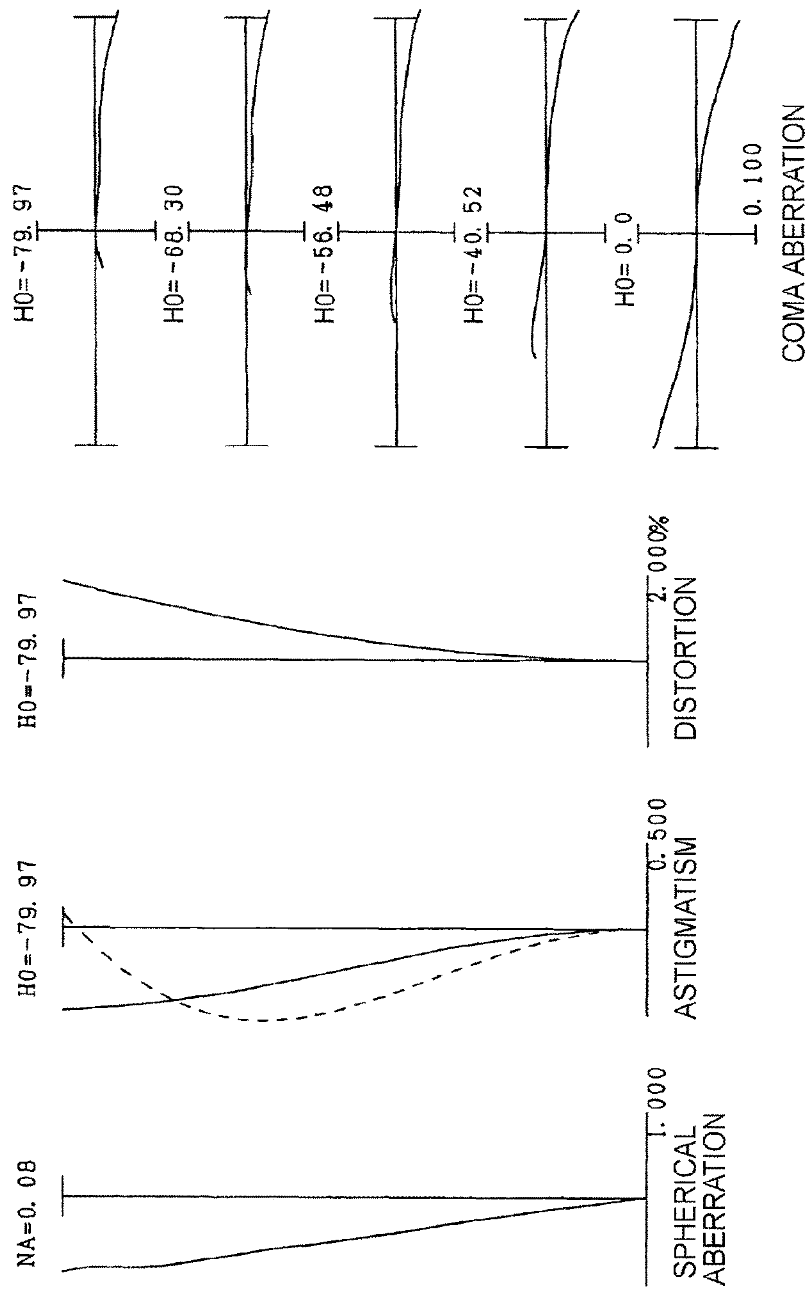
FIG. 18C shows the telephoto end state.

FIG. 17 and FIG. 18 are graphs showing various aberrations of Example 5 at d-line (wavelength: 587.6 nm). In other words, FIG. 15A are graphs showing various aberrations upon focusing on infinity in the wide angle end state (f=81.59 mm), FIG. 15B are graphs showing various aberrations upon focusing on infinity in the intermediate focal length state (f=199.36 mm), and FIG. 15C are graphs showing various aberrations upon focusing on infinity in the telephoto end state (f=392.00 mm). FIG. 16A are graphs showing various aberrations upon close distance focusing (photographic distance: 1.8 m) in the wide angle end state (f=81.59 mm), FIG. 16B are graphs showing various aberrations upon close distance focusing (photographic distance: 1.8 m) in the intermediate focal length state (f=199.36 mm), and FIG. 16C are graphs showing various aberrations upon close distance focusing (photographic distance: 1.8 m) in the telephoto end state (f=392.00 mm).

As each graph showing aberrations indicates, according to Example 5, various aberrations are corrected well in each focal length state, from the wide angle end state to the telephoto end state, implementing excellent image forming performance.

As described above, according to the present embodiment, a lens system which can provide high image forming performance while simultaneously implementing a decrease in the total length of the lens system and simplification of the focusing mechanism, and an optical apparatus having this lens system and a manufacturing method thereof, can be provided.

Second Embodiment Group

A lens system according to a second embodiment group will now be described with reference to the drawings. A lens system of the present embodiment has, in order from an object, an "a" lens group having positive refractive power, a "b" lens group having negative refractive power, and a "c" lens group having positive refractive power, wherein an aperture stop is disposed between the "b" lens group and the "c" lens group, and all or a part of the "b" lens group is shifted so as to have a component orthogonal to the optical axis.

Having a plurality of lens groups makes it easier to construct an optical system with a high zoom ratio. Disposing the aperture stop between the "b" lens group and the "c" lens group makes it easier to correct distortion. Disposing the diaphragm in a position closer to the lens mount than the image blur correction mechanism, that is, a position closer to the image side of the "b" lens group that is a shift lens group, can simplify the diaphragm mechanism.

In the lens system according to the present embodiment, it is preferable that all or a part of the "b" lens group is shifted so as to have a component orthogonal to the optical axis, and therefore image blur on the image plane is corrected when motion blur is generated, in order to correct the image well during lens shift, and spherical aberration, sine condition and Petzval sum are corrected well. The spherical aberration and sine condition are corrected for suppressing decentering coma aberration which is generated in the center area of the screen when the shift lens group is shifted approximately orthogonal to the optical axis. The Petzval sum is corrected for suppressing curvature of field which is generated in the peripheral area of the screen when the shift lens group is shifted approximately orthogonal to the optical axis.

In the lens system according to the present embodiment, it is preferable that the "b" lens group is fixed in the optical axis direction with respect to the image plane upon zooming from the wide angle end state to the telephoto end state in order to reduce performance deterioration due to decentering, particularly to minimize deterioration of curvature of field, and implement good optical performance.

In the lens system according to the present embodiment, it is preferable that the aperture stop is integrated with the "b" lens group upon zooming from the wide angle end state to the telephoto end state, since distortion can be corrected well and disposing the aperture stop closer to the lens mount, than the image blur correction mechanism, simplifies the diaphragm mechanism.

In the lens system according to the present embodiment, it is preferable that the "b" lens group is the fourth lens group from the object side, in order to reduce performance deterioration due to decentering, particularly to minimize deterioration of the curvature of field, and implement good optical performance.

In the lens system according to the present embodiment, it is preferable that a second lens group, which is the second lens group from the object side, has negative refractive power, and the following expression (5) is satisfied, where f2 denotes a focal length of the second lens group, and fc denotes a focal length of the "c" lens group.

$$0.43<(-f2)/fc<1.00 \quad (5)$$

The conditional expression (5) is a conditional expression for specifying an appropriate range of the ratio of the focal lengths of the second lens group and the "c" lens group. If the upper limit of the conditional expression (5) is exceeded, the refractive power of the second lens group becomes relatively low, and the fluctuation of the coma aberration generated in the second lens group upon zooming increases. The refractive power of the "c" lens group becomes relatively high, and the shift distance increases upon zooming, and a fluctuation of spherical aberration generated in the "c" lens group increases. As a result, it becomes difficult to suppress the deterioration of performance in the total zooming range from the wide angle end state to the telephoto end state.

If the lower limit of the conditional expression (5) is not reached, the refractive power of the second lens group becomes relatively high, and the second lens group cannot contribute efficiently to zooming, and as a result, a high zoom ratio, about four times or more, cannot be secured. Further, the refractive power of the "c" lens group becomes relatively low, and spherical aberration and coma aberration, which are generated in the "c" lens group, increase excessively, which makes it difficult to achieve the object of the present invention, that is, implementing excellent optical performance.

In order to ensure the effect of the present embodiment, it is preferable to set the upper limit of the conditional expression (5) to 0.95. In order to further ensure the effect of the present embodiment, it is preferable to set the upper limit of the conditional expression (5) to 0.90. In order to further ensure the effect of the present embodiment, it is preferable to set the upper limit of the conditional expression (5) to 0.85.

In order to ensure the effect of the present embodiment, it is preferable to set the lower limit of the conditional expression (5) to 0.50. In order to further ensure the effect of the present embodiment, it is preferable to set the lower limit of the conditional expression (5) to 0.55. In order to further ensure the effect of the present embodiment, it is preferable to set the lower limit of the conditional expression (5) to 0.60.

In the lens system according to the present embodiment, it is preferable that a second lens group, which is the second lens group from the object side, has negative refractive power, and the following conditional expression (6) is satisfied, where f2 denotes a focal length of the second lens group, and fb denotes a focal length of the "b" lens group.

$$0.23<(-f2)/(-fb)<0.88 \quad (6)$$

The conditional expression (6) is a conditional expression for specifying an appropriate range of the ratio of the focal lengths of the second lens group and the "b" lens group. If the upper limit of the conditional expression (6) is exceeded, the refractive power of the second lens group becomes relatively low, and the fluctuation of the coma aberration generated in the second lens group upon zooming increases. The refractive power of the "b" lens group becomes relatively high, and the shift distance increases upon zooming, and a fluctuation of curvature of field generated in the "b" lens group increases. As a result, it becomes difficult to suppress the deterioration of performance in the total zooming range from the wide angle end state to the telephoto end state.

If the lower limit of the conditional expression (6) is not reached, the refractive power of the second lens group becomes relatively high, and correction of coma aberration becomes insufficient. Since the second lens group cannot contribute efficiently to zooming, a high zoom ratio, about four times or more, cannot be secured. Further, the refractive power of the "b" lens group becomes relatively low, and spherical aberration and curvature of field, which are generated in the "b" lens group, increase excessively, which makes it difficult to achieve the object of the present invention, that is, implementing excellent optical performance.

In order to ensure the effect of the present embodiment, it is preferable to set the upper limit of the conditional expression (6) to 0.80. In order to further ensure the effect of the present embodiment, it is preferable to set the upper limit of the conditional expression (6) to 0.75. In order to further ensure the effect of the present embodiment, it is preferable to set the upper limit of the conditional expression (6) to 0.70.

In order to ensure the effect of the present embodiment, it is preferable to set the lower limit of the conditional expression (6) to 0.30. In order to further ensure the effect of the present embodiment, it is preferable to set the lower limit of the conditional expression (6) to 0.35. In order to further ensure the effect of the present embodiment, it is preferable to set the lower limit of the conditional expression (6) to 0.40.

In the lens system according to the present embodiment, it is preferable that a first lens group, which is disposed closest to the object, has at least a front portion lens group, and a rear portion lens group disposed to an image side of the front portion lens group with an air distance therebetween, in order to correct distortion well.

In the lens system according to the present embodiment, it is preferable that the following conditional expression (7) is satisfied, where ft denotes a focal length of the total lens system in the telephoto end state, and f1b denotes a focal length of the rear portion lens group of the first lens group.

$$1.30<ft/f1b<3.10 \quad (7)$$

The conditional expression (7) is a conditional expression for specifying an appropriate range of the ratio of the focal length of the total lens system in the telephoto end state and the focal length of the rear portion lens group of the lens group that is disposed closest to the object. If the upper limit of the conditional expression (7) is exceeded, the refractive power of the rear portion lens group becomes relatively high. As a result, an aberration fluctuation of the coma aberration and a curvature of field upon focusing increases, which is not desirable. If the lower limit of the conditional expression (7) is not reached, the refractive power of the rear portion lens group becomes relatively low. This is advantageous in terms of aberration correction, but increase the shift distance of the focusing lens group, which makes it difficult to balance decreasing size and increase performance. As a result, the total lens length increases, which runs against the intention of the present invention, and is therefore not desirable.

In order to ensure the effect of the present embodiment, it is preferable to set the upper limit of the conditional expression (7) to 2.95. In order to further ensure the effect of the present embodiment, it is preferable to set the upper limit of the conditional expression (7) to 2.80. In order to further ensure the effect of the present embodiment, it is preferable to set the upper limit of the conditional expression (7) to 2.65.

In order to ensure the effect of the present embodiment, it is preferable to set the lower limit of the conditional expression (7) to 1.50. In order to further ensure the effect of the present embodiment, it is more preferable to set the lower limit of the conditional expression (7) to 1.70. In order to further ensure the effect of the present embodiment, it is preferable to set the lower limit of the conditional expression (7) to 1.90.

In the lens system according to the present embodiment, it is preferable that focusing is performed by shifting the rear portion lens group of the first lens group in the optical axis direction, in order to simplify the focusing mechanism, and minimize the short distance fluctuation of the spherical aberration and curvature of field due to focusing.

In the lens system according to the present embodiment, it is preferable that at least one of the front portion lens group and the rear portion lens group of the first lens group has positive refractive power. It is preferable that the front portion lens group has positive refractive power in order to decrease the total length thereof, and minimize the generation of distortion. It is preferable that the rear portion lens group has positive refractive power in order to minimize close distance fluctuation of spherical aberration and curvature of field due to focusing.

In the lens system according to the present embodiment, it is preferable that the first lens group disposed closest to the object is fixed in the optical axis direction with respect to the image plane upon focusing on infinity in zooming from the wide angle end state to the telephoto end state in order to reduce performance deterioration due to decentering, particularly to minimize deterioration of curvature of field and implement good optical performance.

In the lens system according to the present embodiment, it is preferable that the lens system has, in order from the object, a first lens group having positive refractive power, a second lens group having negative refractive power, a third lens group having positive refractive power, a fourth lens group having negative refractive power, a fifth lens group having positive refractive power, and a sixth lens group having negative refractive power, in order to correct spherical aberration, coma aberration and curvature of field well, and implement excellent optical performance with high zoom ratio.

In the lens system according to the present embodiment, it is preferable that the following conditional expression (8) is satisfied, where TL denotes a total length of the lens system in the telephoto end state, and f1b denotes a focal length of the rear portion lens group of the first lens group.

$$0.90<TL/f1b<2.48 \quad (8)$$

The conditional expression (8) is a conditional expression for specifying an appropriate range of the ratio of the total length of the lens system and the focal length of the rear portion lens group of the first lens group. If the upper limit of the conditional expression (8) is exceeded, the refractive power of the rear portion lens group becomes relatively high. As a result, an aberration fluctuation of the coma aberration and a curvature of field upon focusing increases, which is not desirable. If the lower limit of the conditional expression (8) is not reached, the refractive power of the rear portion lens group becomes relatively low. This is advantageous in terms of aberration correction, but increase the shift distance of the focusing lens group, which makes it difficult to balance decreasing size and increase performance. As a result, the total lens length increases, which runs against the intention of the present invention, and is therefore not desirable.

In order to ensure the effect of the present embodiment, it is preferable to set the upper limit of the conditional expression (8) to 2.20. In order to further ensure the effect of the present embodiment, it is preferable to set the upper limit of the conditional expression (8) to 1.90. In order to further ensure the effect of the present embodiment, it is preferable to set the upper limit of the conditional expression (8) to 1.75.

In order to ensure the effect of the present embodiment, it is preferable to set the lower limit of the conditional expression (8) to 1.00. In order to further ensure the effect of the present invention, it is preferable to set the lower limit of the conditional expression (8) to 1.10. In order to further ensure the effect of the present embodiment, it is preferable to set the lower limit of the conditional expression (8) to 1.20.

Examples of the Second Embodiment Group

Each example (Example 6 to Example 13) in the second embodiment group will now be described with reference to the drawings. For the lens systems according to these examples as well, allocation of refractive power and a shifting state of each lens group upon changing of the focal length state from the wide angle end state (W) to the telephoto end state (T) are shown in FIG. 1. In these examples, the third lens group G3 corresponds to the "a" lens group, the fourth lens group G4 corresponds to the "b" lens group, and the fifth lens group G5 corresponds to the "c" lens group.

Example 6

Figure 19:
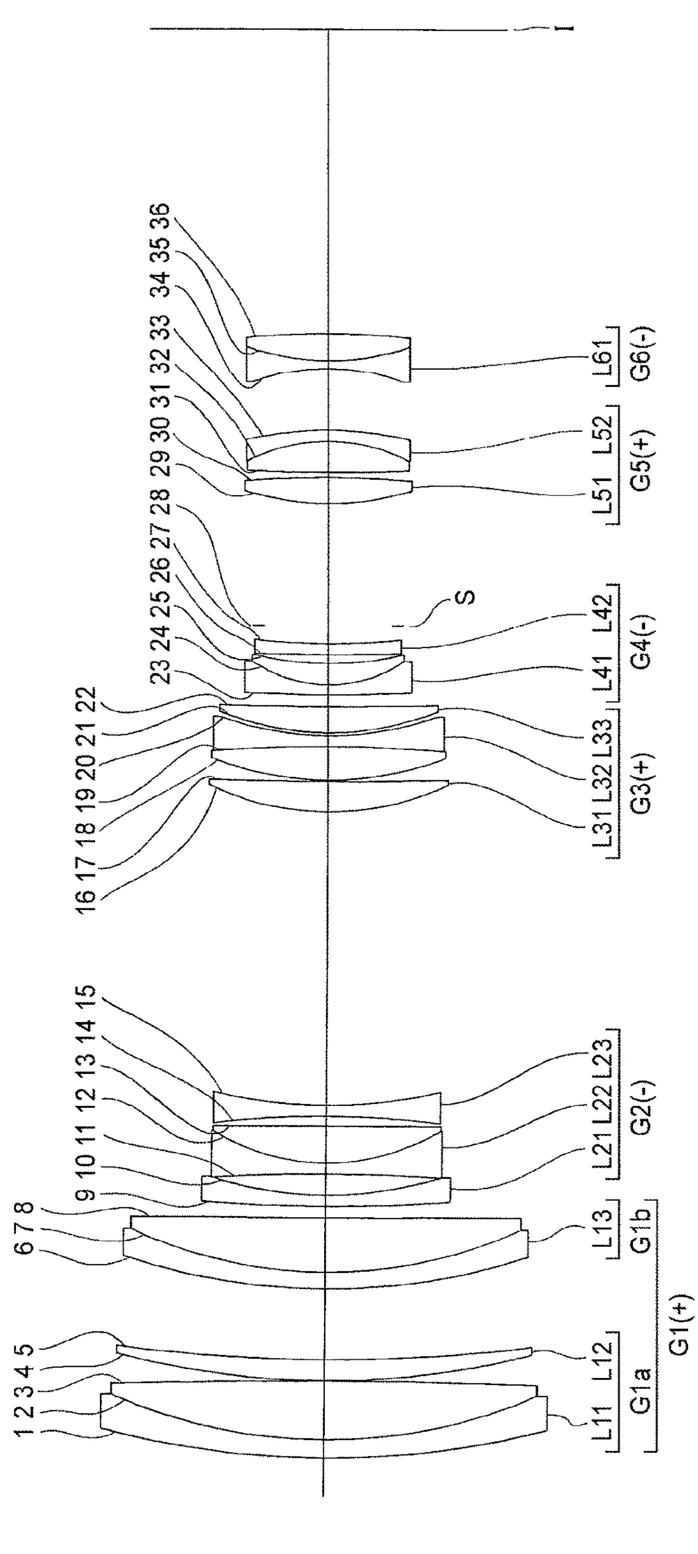
FIG. 19 is a diagram depicting a configuration of a lens system according to Example 6.

Example 6 will now be described with reference to FIG. 19 to FIG. 22 and Table 26 to Table 30. FIG. 19 is a diagram depicting a configuration of a lens system according to Example 6. As FIG. 19 shows, in the lens system according to Example 6, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a positive meniscus lens having a convex surface facing the object are cemented, and a biconcave lens L23.

The third lens group G3 has, in order from the object, a positive meniscus lens L31 having a convex surface facing the object, a cemented negative lens L32 in which a biconvex lens and a biconcave lens are cemented, and a positive meniscus lens L33 having a convex surface facing the object.

The fourth lens group G4 has, in order from the object, a cemented negative lens L41 in which a negative meniscus lens having a convex surface facing the object and a positive meniscus lens having a convex surface facing the object are cemented, and a negative meniscus lens L42 having a convex surface facing the object. In this example, all or a part of the fourth lens group G4 shift as a shift lens group, so as to have a component in an approximately orthogonal to the optical axis.

The fifth lens group G5 has, in order from the object, a biconvex lens L51, and a cemented positive lens L52 in which a biconvex lens and a negative meniscus lens having a convex surface facing the image are cemented.

The sixth lens group G6 has, in order from the object, a cemented negative lens L61 in which a biconcave lens and a biconvex lens are cemented.

The image plane I is formed on a picture element, which is not illustrated, and the picture element is constituted by a CCD, CMOS or the like (description on the image plane I is the same for the examples herein below).

The aperture stop S is disposed between the fourth lens group G4 and the fifth lens group G5, and is fixed with respect to the image plane I upon zooming from the wide angle end state to the telephoto end state.

Parameter values of Example 6 are shown in Table 26.

TABLE 26

[All parameters]

| | Wide-angle end | | intermediate focal length | | telephoto end |
|---|---|---|---|---|---|
| f | 81.59 | ~ | 199.36 | ~ | 392.00 |
| FNO | 4.59 | ~ | 5.61 | ~ | 5.80 |
| 2ω | 29.77 | ~ | 12.13 | ~ | 6.20 |
| Image Height | 21.60 | ~ | 21.60 | ~ | 21.60 |
| Total lens Length | 258.89 | ~ | 258.89 | ~ | 258.89 |

TABLE 26-continued

[Lens data]

| Surface Number | r | d | nd | νd |
|---|---|---|---|---|
| 1 | 130.9188 | 3.30 | 1.79952 | 42.24 |
| 2 | 79.9333 | 10.60 | 1.49782 | 82.52 |
| 3 | −1071.6925 | 0.10 | | |
| 4 | 125.6062 | 3.70 | 1.49782 | 82.52 |
| 5 | 236.8887 | (d5) | | |
| 6 | 97.7870 | 3.00 | 1.84666 | 23.78 |
| 7 | 69.9541 | 10.00 | 1.58913 | 61.16 |
| 8 | 3884.6216 | (d8) | | |
| 9 | 244.4738 | 2.00 | 1.81600 | 46.62 |
| 10 | 57.2202 | 3.79 | | |
| 11 | −274.6703 | 2.00 | 1.75500 | 52.32 |
| 12 | 32.6857 | 6.66 | 1.80810 | 22.76 |
| 13 | 9723.0952 | 1.80 | | |
| 14 | −137.3351 | 2.00 | 1.81600 | 46.62 |
| 15 | 73.1200 | (d15) | | |
| 16 | 42.1345 | 5.50 | 1.64000 | 60.08 |
| 17 | 641.2034 | 0.20 | | |
| 18 | 47.5000 | 6.11 | 1.60300 | 65.44 |
| 19 | −219.7775 | 2.00 | 1.80518 | 25.42 |
| 20 | 47.3936 | 0.50 | | |
| *21 | 40.1024 | 4.77 | 1.59201 | 67.02 |
| 22 | 554.8003 | (d22) | | |
| 23 | 229.8851 | 1.80 | 1.75700 | 47.82 |
| 24 | 19.8208 | 3.93 | 1.79504 | 28.54 |
| 25 | 44.2895 | 1.69 | | |
| 26 | 431.0523 | 2.00 | 1.75500 | 52.32 |
| 27 | 90.6832 | 3.30 | | |
| 28 | 0.0000 | (d28) | (aperture stop S) | |
| *29 | 39.9222 | 4.77 | 1.59201 | 67.02 |
| 30 | −172.2870 | 1.00 | | |
| 31 | 270.0063 | 5.60 | 1.48749 | 70.23 |
| 32 | −26.4362 | 2.00 | 1.72047 | 34.71 |
| 33 | −54.3782 | (d33) | | |
| 34 | −32.3794 | 1.50 | 1.80400 | 46.57 |
| 35 | 37.1350 | 4.94 | 1.72825 | 28.46 |
| 36 | −109.3703 | (Bf) | | |

[Each group focal length data]

| Group | First surface | Focal length |
|---|---|---|
| G1 | 1 | 110.1565 |
| G2 | 9 | −31.7725 |
| G3 | 16 | 43.9023 |
| G4 | 23 | −52.0887 |
| G5 | 29 | 42.6516 |
| G6 | 34 | −51.0082 |

In Example 6, the twenty first and twenty ninth lens surfaces are aspherical. Table 27 shows the [Aspherical data].

TABLE 27

| [Aspherical data] | | | | | |
|---|---|---|---|---|---|
| R | κ | $C_4$ | $C_6$ | $C_8$ | $C_{10}$ |
| Twenty first surface | | | | | |
| 40.1024 | +2.6501 | $-6.4176 \times 10^{-6}$ | $-6.2241 \times 10^{-9}$ | $+5.7922 \times 10^{-13}$ | $-1.9424 \times 10^{-14}$ |
| Twenty ninth surface | | | | | |
| 39.9222 | +4.5700 | $-6.8664 \times 10^{-6}$ | $-1.4014 \times 10^{-8}$ | $+1.9016 \times 10^{-11}$ | $-1.8265 \times 10^{-13}$ |

In Example 6, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 28 shows the [Variable distance data].

TABLE 28

| [Variable distance data] | | | |
|---|---|---|---|
| | Wide-angle end | intermediate focal length | telephoto end |
| d5 | 12.7546 | 12.7546 | 12.7546 |
| d8 | 2.0097 | 23.4240 | 28.2042 |
| d15 | 53.1074 | 23.8776 | 2.0000 |
| d22 | 2.1025 | 9.9180 | 27.0154 |
| d28 | 22.1519 | 14.8371 | 2.0000 |
| d34 | 11.2106 | 8.8642 | 3.1418 |
| Bf | 54.9997 | 64.6608 | 83.2197 |

Table 29 shows the [Focusing lens group shift distance] in Example 6.

TABLE 29

| [Focusing lens group shift distance] | | | |
|---|---|---|---|
| | Wide-angle end | intermediate focal length | telephoto end |
| f | 81.5935 | 199.3602 | 392.0024 |
| Δ1b | 10.7545 | 10.7545 | 10.7545 |

Table 30 shows the [Conditional expression correspondence value] in Example 6.

TABLE 30

| [Conditional expression correspondence value] |
|---|
| ft = 392.0024 |
| f1b = 204.7568 |
| f2 = −31.7725 |
| fb = −52.0887 |
| fc = 42.6516 |
| TL = 258.947 |
| (5) (−f2)/fc = 0.7449 |
| (6) (−f2)/(−fb) = 0.6100 |
| (7) ft/f1b = 1.9145 |
| (8) TL/f1b = 1.2644 |

Figure 20A:
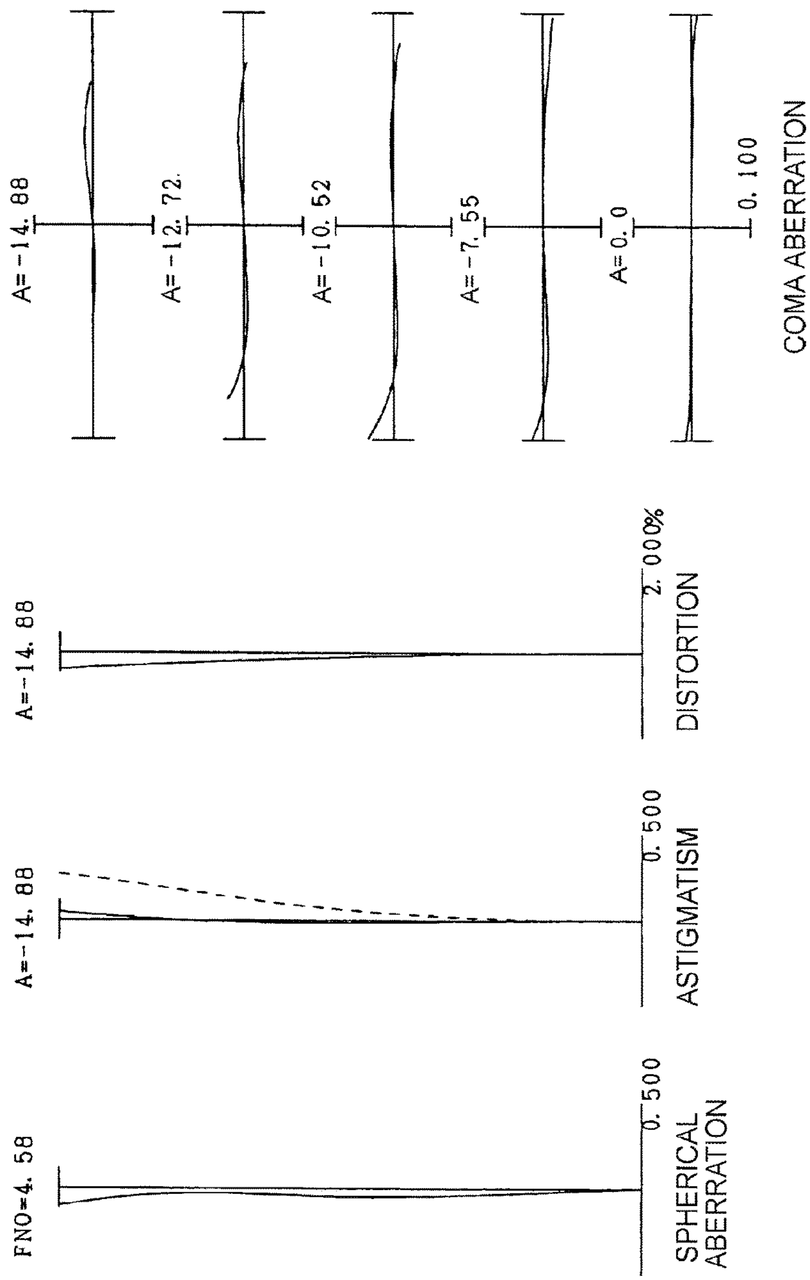
FIG. 20A shows the wide angle end state.
Figure 20B:
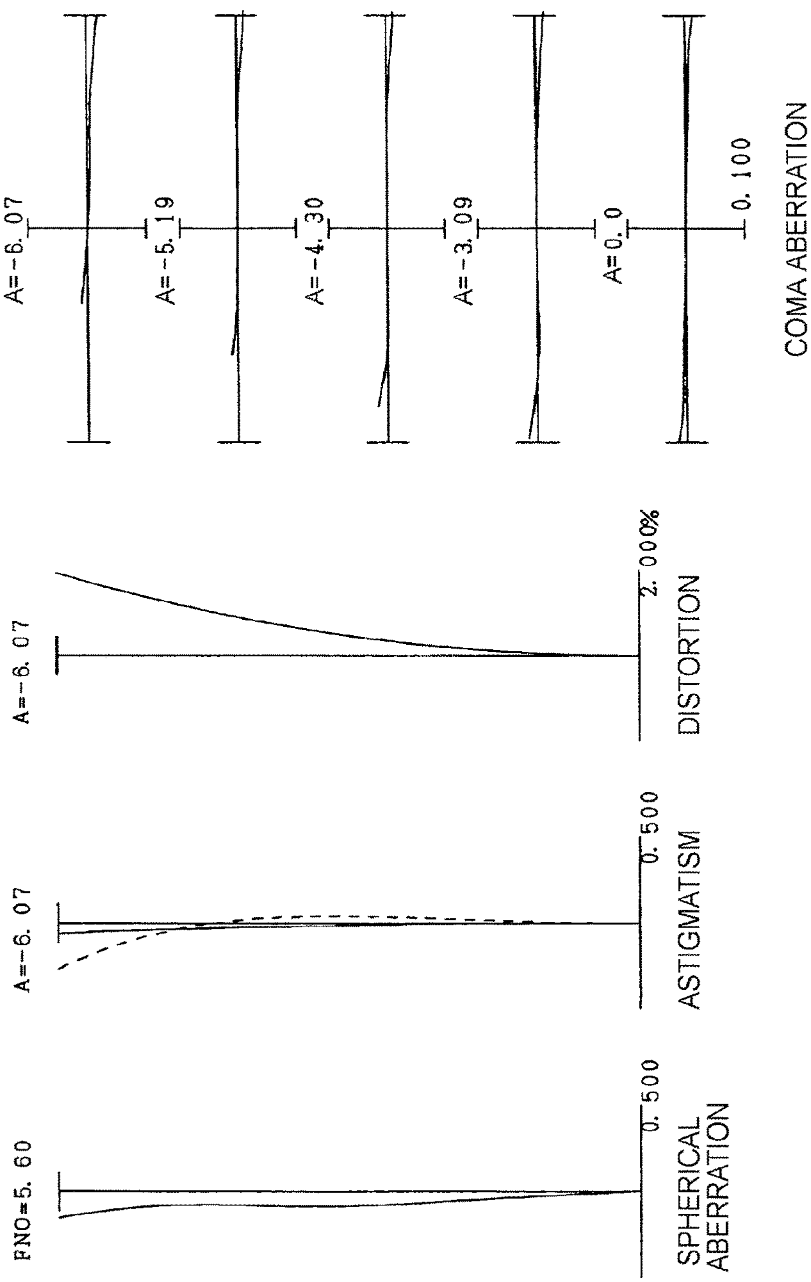
FIG. 20B shows the intermediate focal length state.
Figure 20C:
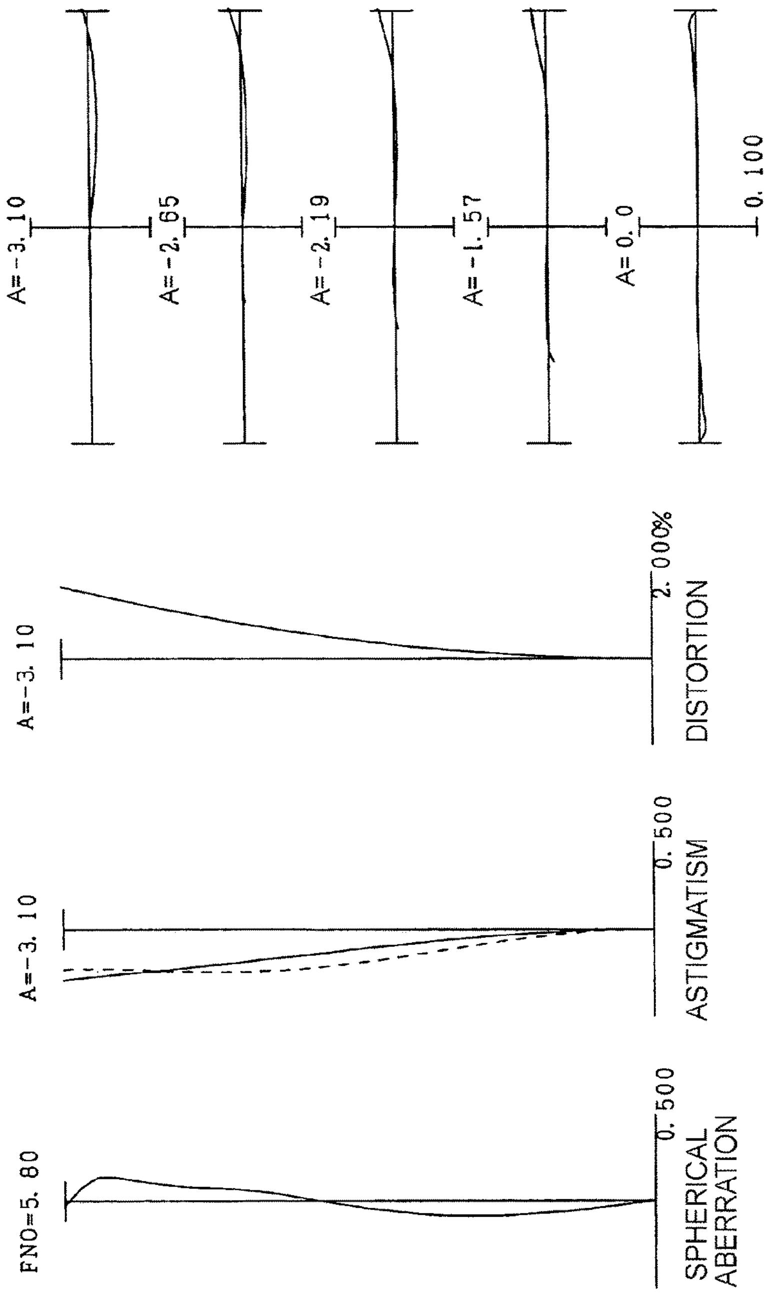
FIG. 20C shows the telephoto end state.
Figure 21C:
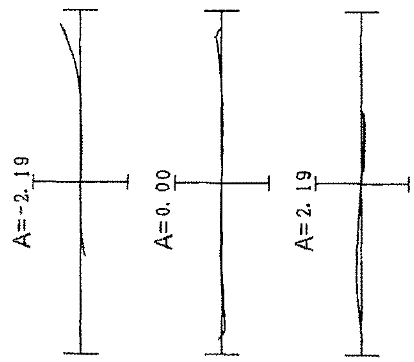
FIG. 21C shows the telephoto end state.
Figure 21B:
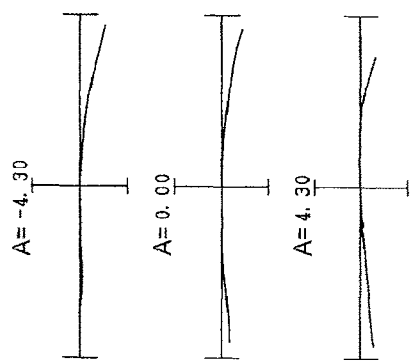
FIG. 21B shows the intermediate focal length state.
Figure 21A:
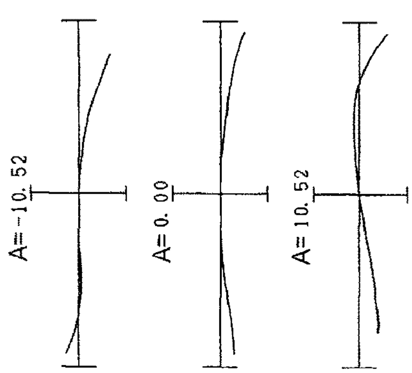
FIG. 21A shows the wide angle end state.
Figure 22A:
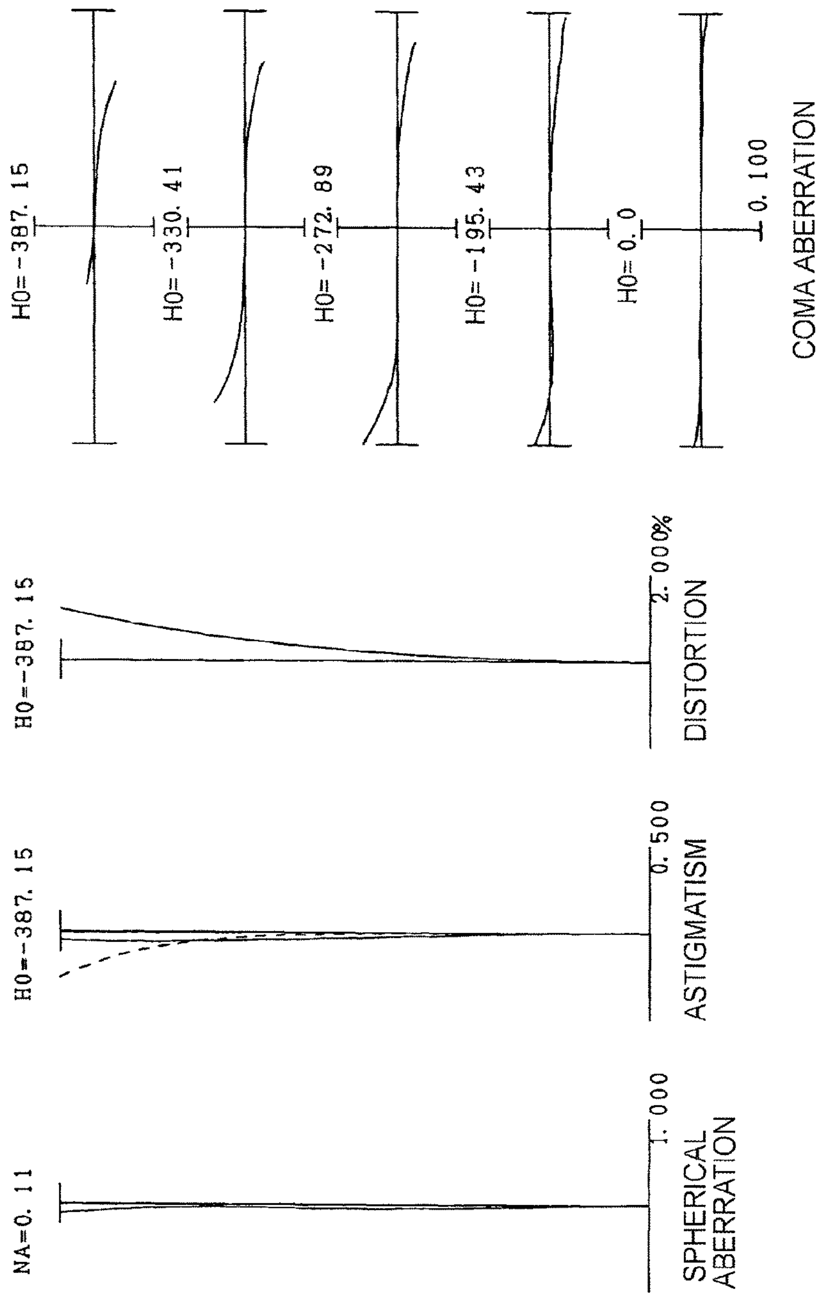
FIG. 22A shows the wide angle end state.
Figure 22B:
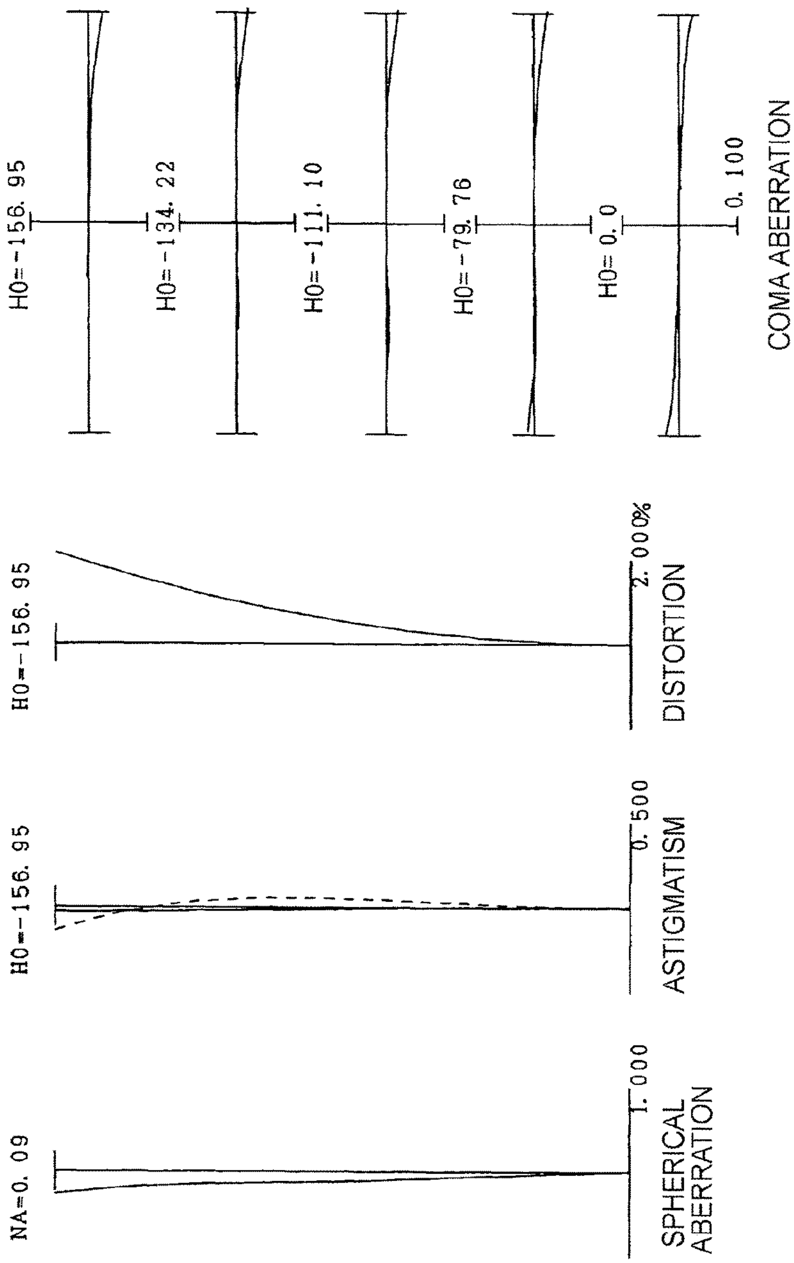
FIG. 22B shows the intermediate focal length state.
Figure 22C:
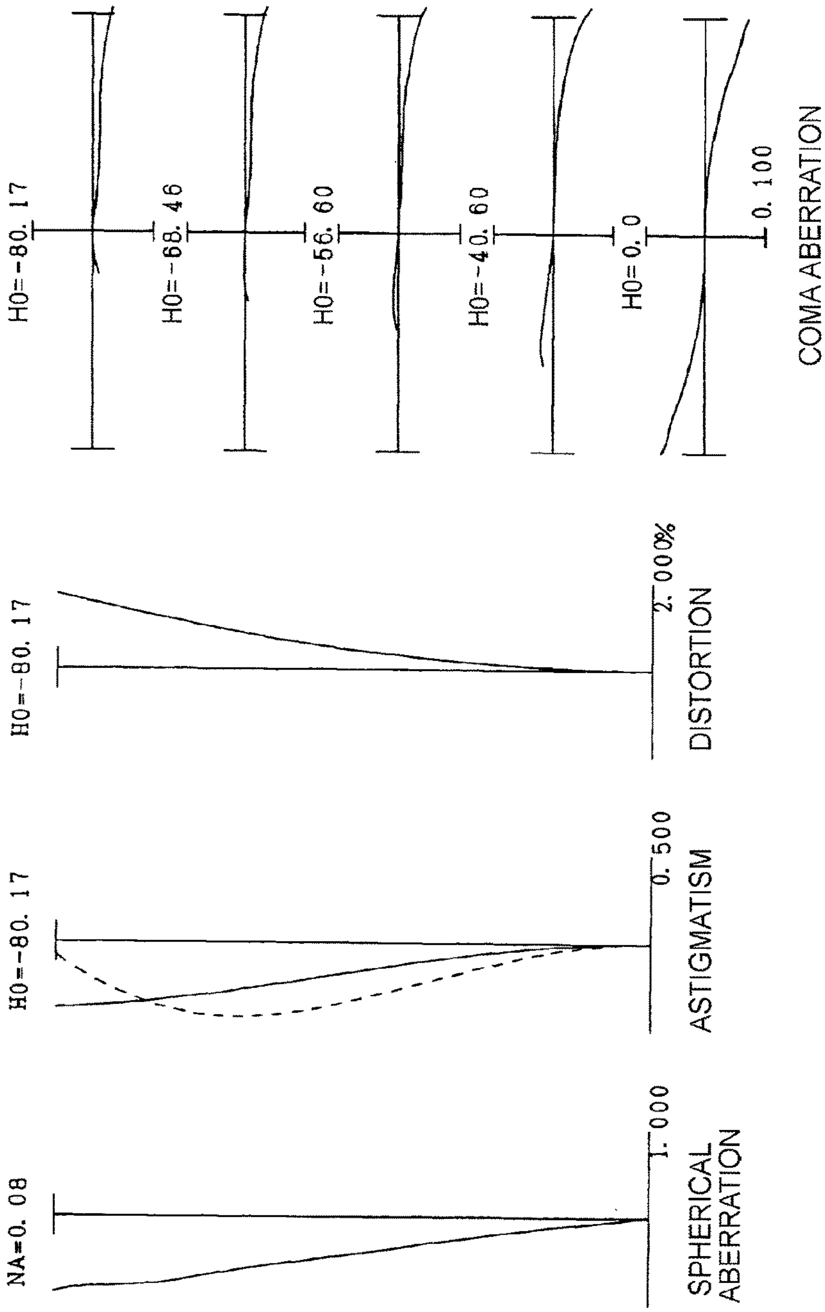
FIG. 22C shows the telephoto end state.

FIGS. 20 to 22 are graphs showing various aberrations of Example 6 at d-line (wavelength: 587.6 nm). In other words, FIG. 20A are graphs showing various aberrations upon focusing on infinity in the wide angle end state (f=81.59 mm), FIG. 20B are graphs showing various aberrations upon focusing on infinity in the intermediate focal length state (f=199.36 mm), and FIG. 20C are graphs showing various aberrations upon focusing on infinity in the telephoto end state (f=392.00 mm). FIG. 21A is a graph showing a coma aberration in the lens shift state (0.4 mm) upon focusing on infinity in the wide angle end state (f=81.59 mm), FIG. 21B is a graph showing a coma aberration in the lens shift state (0.4 mm) upon focusing on infinity in the intermediate focal length state (f=199.36 mm), and FIG. 21C is a graph showing a coma aberration in the lens shift state (0.4 mm) upon focusing on infinity in the telephoto end state (f=392.00 mm). FIG. 22A are graphs showing various aberrations upon close distance focusing (photographic distance: 1.8 m) in the wide angle end state (f=81.59 mm), FIG. 22B are graphs showing various aberrations upon close distance focusing (photographic distance: 1.8 m) in the intermediate focal length state (f=199.36 mm), and FIG. 22C are graphs showing various aberrations upon close distance focusing (photographic distance: 1.8 m) in the telephoto end state (f=392.00 mm).

In each graph showing aberrations, FNO denotes an F number, A denotes a half angle of view, and H0 denotes an object height with respect to each image height. In the graphs showing spherical aberration, a value of the F number corresponding to a maximum aperture is shown, in the graphs showing astigmatism and distortion, a maximum value of the image height is shown respectively, and in the graphs showing coma aberration, a value of each image height is shown. In the graph showing astigmatism, a solid line indicates a sagittal image surface, and a broken line indicates a meridional image surface. This description on graphs showing aberrations is the same for the other examples, for which description is omitted.

As each graph showing aberrations indicates, according to Example 6, various aberrations are corrected well in each focal length state, from the wide angle end state to the telephoto end state, implementing excellent image forming performance.

Example 7

Figure 23:
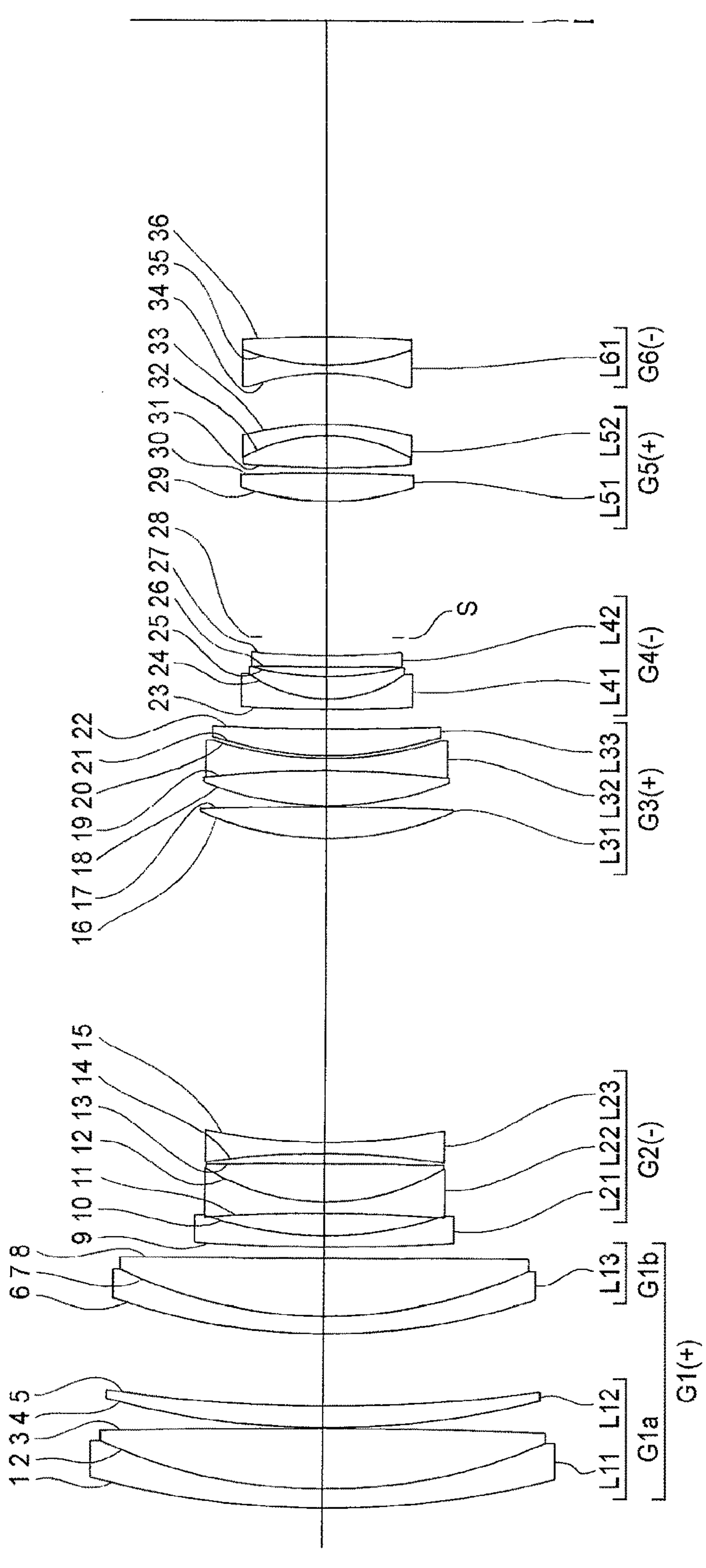
FIG. 23 is a diagram depicting a configuration of a lens system according to Example 7.

Example 7 will now be described with reference to FIG. 23 to FIG. 26 and Table 31 to Table 35. FIG. 23 is a diagram depicting a configuration of a lens system according to Example 7. As FIG. 23 shows, in the lens system according to Example 7, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a positive meniscus lens L33 having a convex surface facing the object.

The fourth lens group G4 has, in order from the object, a cemented negative lens L41 in which a negative meniscus lens having a convex surface facing the object and a positive meniscus lens having a convex surface facing the object are cemented, and a negative meniscus lens L42 having a convex surface facing the object. In this example, all or a part of the fourth lens group G4 shift as a shift lens group, so as to have a component in an approximately orthogonal to the optical axis.

The fifth lens group G5 has, in order from the object, a biconvex lens L51, and a cemented positive lens L52 in which a biconvex lens and a negative meniscus lens having a convex surface facing the image are cemented.

The sixth lens group G6 has, in order from the object, a cemented negative lens L61 in which a biconcave lens and a biconvex lens are cemented.

The aperture stop S is disposed between the fourth lens group G4 and the fifth lens group G5, and is fixed with respect to the image plane I upon zooming from the wide angle end state to the telephoto end state.

Parameter values of Example 7 are shown in Table 31.

TABLE 31

[All parameters]

| | Wide-angle end | intermediate focal length | telephoto end |
|---|---|---|---|
| f | 81.59~ | 199.36~ | 392.00 |
| FNO | 4.59~ | 5.61~ | 5.85 |
| 2ω | 29.77~ | 12.13~ | 6.20 |
| Image Height | 21.60~ | 21.60~ | 21.60 |
| Total lens Length | 258.89~ | 258.89~ | 258.89 |

[Lens data]

| Surface Number | r | d | nd | νd |
|---|---|---|---|---|
| 1 | 131.2682 | 3.30 | 1.79952 | 42.24 |
| 2 | 79.2077 | 10.60 | 1.49782 | 82.52 |
| 3 | −1090.3032 | 0.10 | | |
| 4 | 123.2408 | 3.70 | 1.49782 | 82.52 |
| 5 | 220.9763 | (d5) | | |
| 6 | 96.1976 | 3.00 | 1.84666 | 23.78 |
| 7 | 69.0965 | 10.00 | 1.58913 | 61.16 |
| 8 | 4928.1656 | (d8) | | |
| 9 | 288.2296 | 2.00 | 1.81600 | 46.62 |
| 10 | 54.2542 | 3.80 | | |
| 11 | −249.4274 | 2.00 | 1.75500 | 52.32 |
| 12 | 32.8351 | 6.65 | 1.80810 | 22.76 |
| 13 | −1937.0128 | 1.80 | | |
| 14 | −118.0849 | 2.00 | 1.81600 | 46.62 |
| 15 | 86.5424 | (d15) | | |
| 16 | 44.5000 | 5.50 | 1.64000 | 60.08 |
| 17 | −500.0000 | 0.20 | | |
| 18 | 47.5000 | 6.15 | 1.60300 | 65.44 |
| 19 | −154.7487 | 2.00 | 1.80518 | 25.42 |

TABLE 31-continued

| Surface Number | r | d | nd | νd |
|---|---|---|---|---|
| 20 | 51.9426 | 0.50 | | |
| *21 | 45.3806 | 4.75 | 1.59201 | 67.02 |
| 22 | 409.1975 | (d22) | | |
| 23 | 229.8851 | 1.80 | 1.75700 | 47.82 |
| 24 | 19.2035 | 3.95 | 1.79504 | 28.54 |
| 25 | 42.0732 | 1.70 | | |
| 26 | 553.9438 | 2.00 | 1.75500 | 52.32 |
| 27 | 103.9914 | 3.30 | | |
| 28 | 0.0000 | (d28) | (aperture stop S) | |
| *29 | 41.2885 | 4.75 | 1.59201 | 67.02 |
| 30 | −299.5240 | 1.00 | | |
| 31 | 142.3003 | 5.60 | 1.48749 | 70.23 |
| 32 | −25.3123 | 2.00 | 1.72047 | 34.71 |
| 33 | −47.5235 | (d33) | | |
| 34 | −33.2184 | 1.50 | 1.80400 | 46.57 |
| 35 | 34.4337 | 4.90 | 1.72825 | 28.46 |
| 36 | −160.1625 | (Bf) | | |

[Each group focal length data]

| Group | First surface | Focal length |
|---|---|---|
| G1 | 1 | 110.1486 |
| G2 | 9 | −31.3559 |
| G3 | 16 | 42.7470 |
| G4 | 23 | −51.5772 |
| G5 | 29 | 40.9494 |
| G6 | 34 | −46.5805 |

In Example 7, the twenty first and twenty ninth lens surfaces are aspherical. Table 32 shows the [Aspherical data].

TABLE 32

[Aspherical data]

| R | κ | $C_4$ | $C_6$ | $C_8$ | $C_{10}$ |
|---|---|---|---|---|---|
| Twenty first surface | | | | | |
| 45.3806 | +3.5082 | $-6.2708 \times 10^{-6}$ | $-6.0885 \times 10^{-9}$ | $+8.5423 \times 10^{-13}$ | $-1.9843 \times 10^{-14}$ |
| Twenty ninth surface | | | | | |
| 41.2885 | +5.3966 | $-7.1249 \times 10^{-6}$ | $-1.6306 \times 10^{-8}$ | $+2.2822 \times 10^{-11}$ | $-2.6353 \times 10^{-13}$ |

In Example 7, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 33 shows the [Variable distance data].

TABLE 33

[Variable distance data]

| | Wide-angle end | intermediate focal length | telephoto end |
|---|---|---|---|
| d5 | 12.5666 | 12.5666 | 12.5666 |
| d8 | 2.0000 | 23.5395 | 28.6365 |
| d15 | 52.7950 | 23.5222 | 2.0000 |
| d22 | 3.3567 | 11.0899 | 27.5152 |
| d28 | 23.7470 | 15.7538 | 2.7671 |
| d34 | 8.8798 | 7.1223 | 2.4250 |
| Bf | 54.9997 | 64.7502 | 82.4337 |

Table 34 shows the [Focusing lens group shift distance] in Example 7.

TABLE 34

| [Focusing lens group shift distance] | | | |
|---|---|---|---|
| | Wide-angle end | intermediate focal length | telephoto end |
| f | 81.5935 | 199.3601 | 392.0023 |
| Δ1b | 10.5666 | 10.5666 | 10.5666 |

Table 35 shows the [Conditional expression correspondence value] in Example 7.

TABLE 35

[Conditional expression correspondence value]

ft = 392.0023
f1b = 199.4630
f2 = −31.3559
fb = −51.5772
fc = 40.9494
TL = 258.8947
(5)(−f2)/fc = 0.7657
(6)(−f2)/(−fb) = 0.6079
(7)ft/f1b = 1.9653
(8)TL/f1b = 1.2980

Figure 24A:
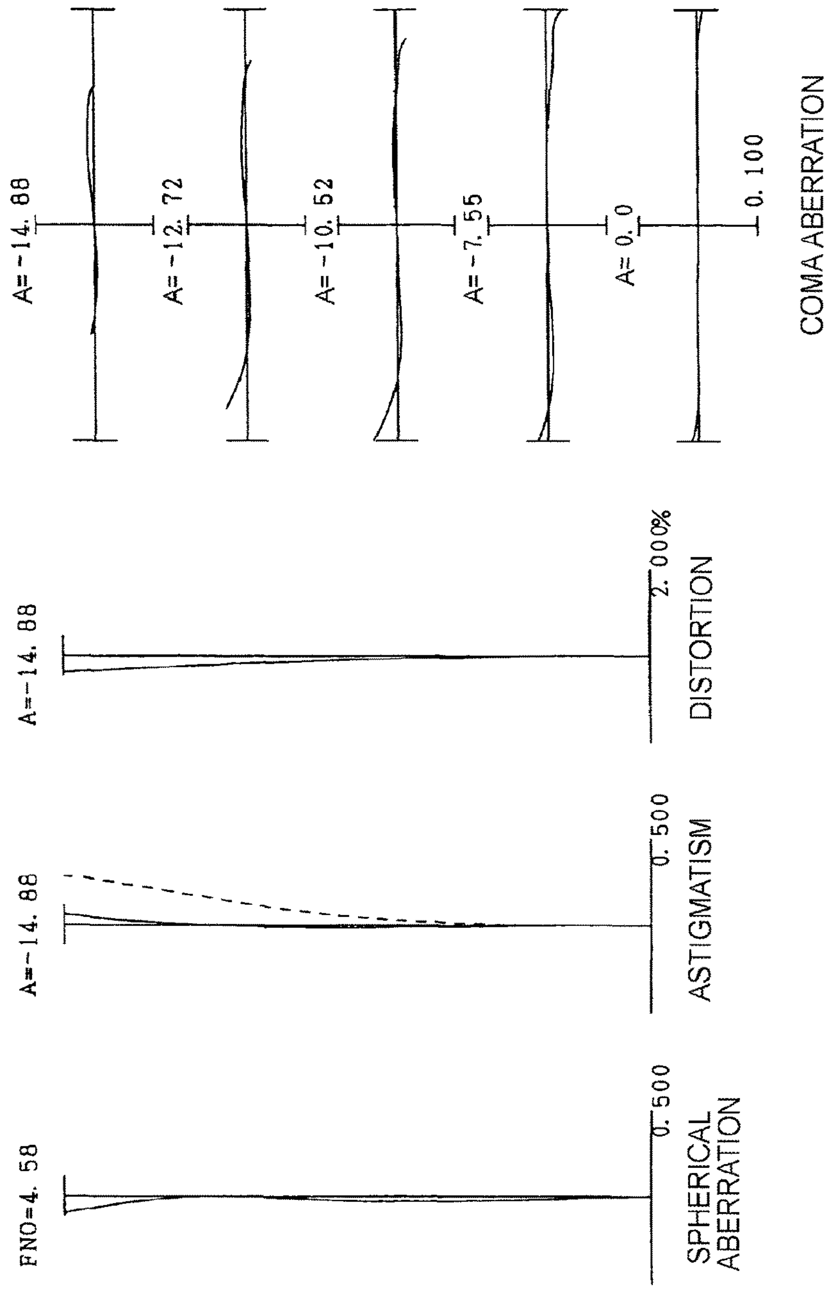
FIG. 24A shows the wide angle end state.
Figure 24B:
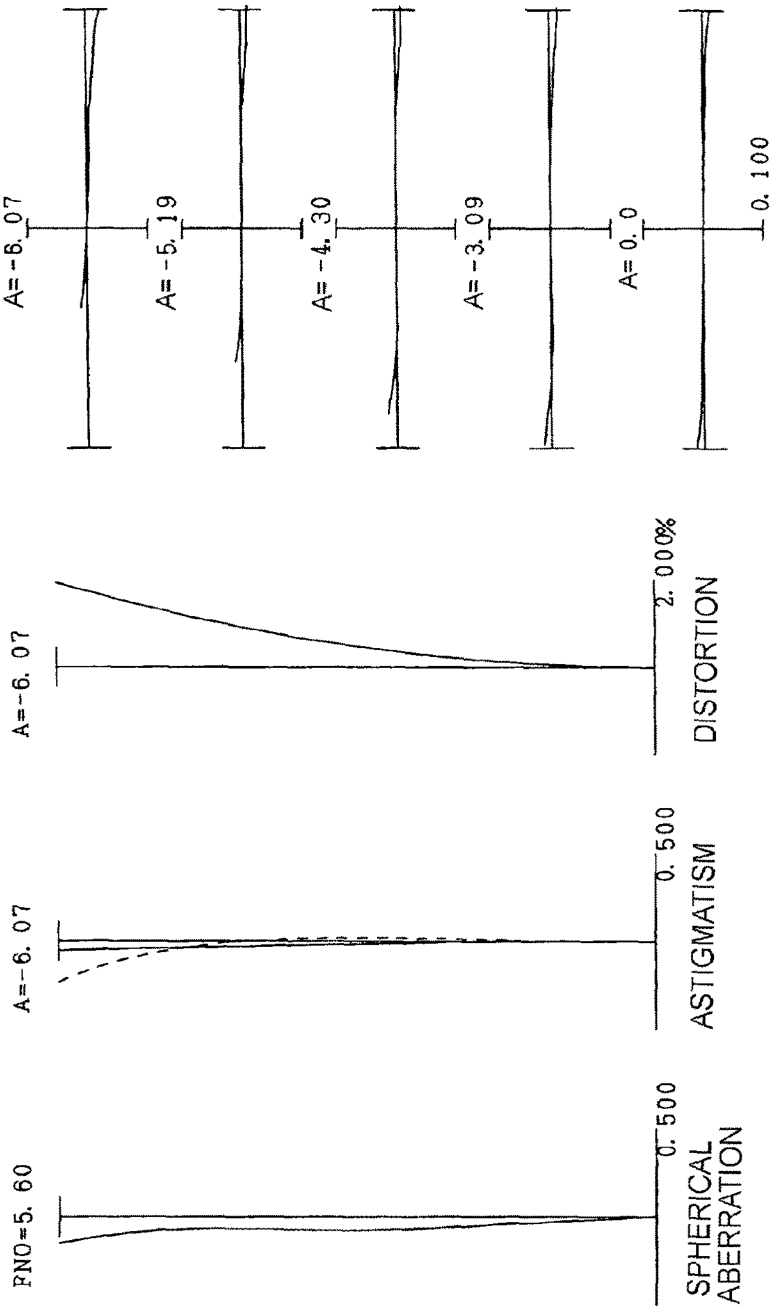
FIG. 24B shows the intermediate focal length state.
Figure 24C:
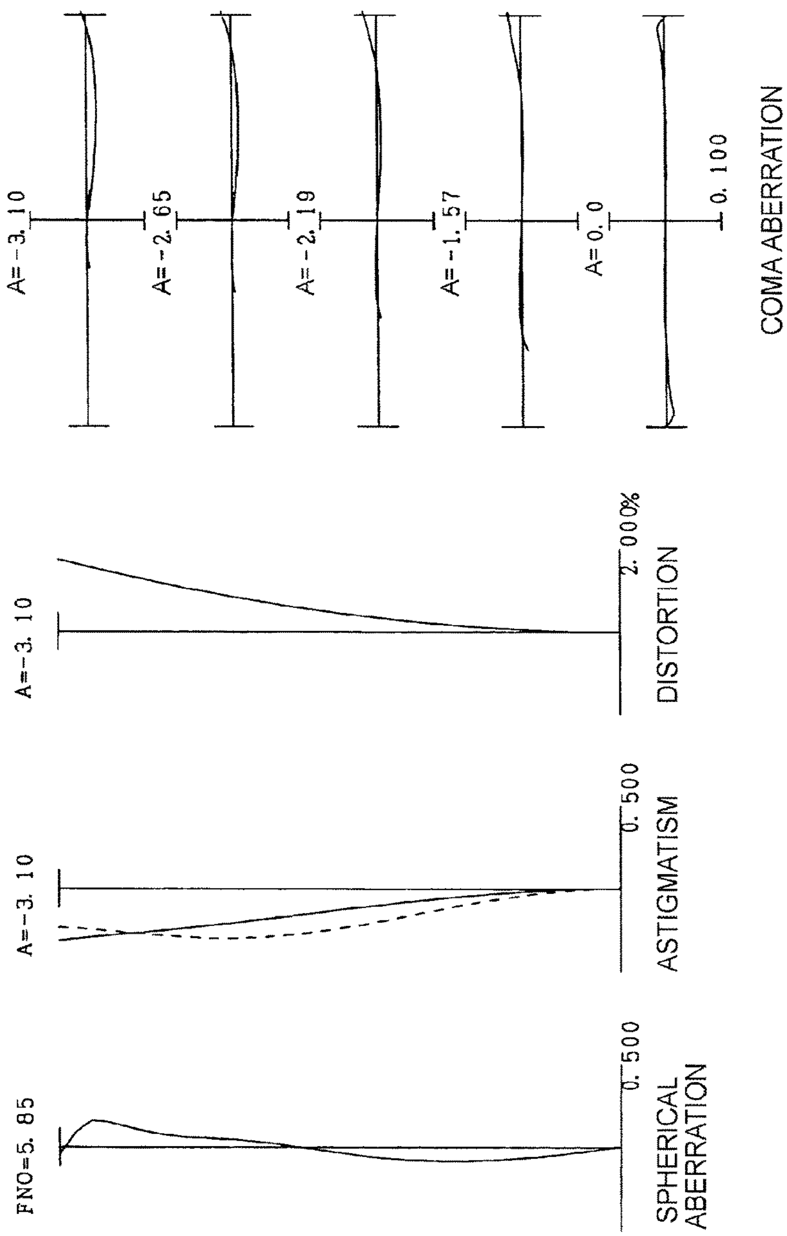
FIG. 24C shows the telephoto end state.
Figure 25A:
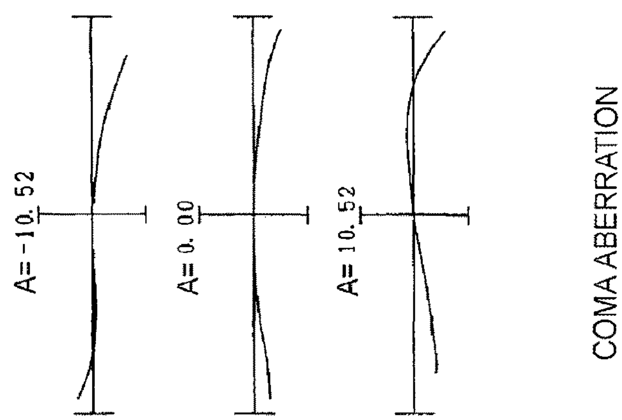
FIG. 25A shows the wide angle end state.
Figure 25B:
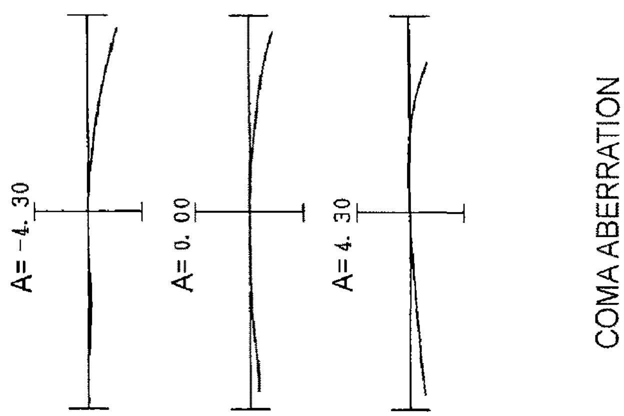
FIG. 25B shows the intermediate focal length state.
Figure 25C:
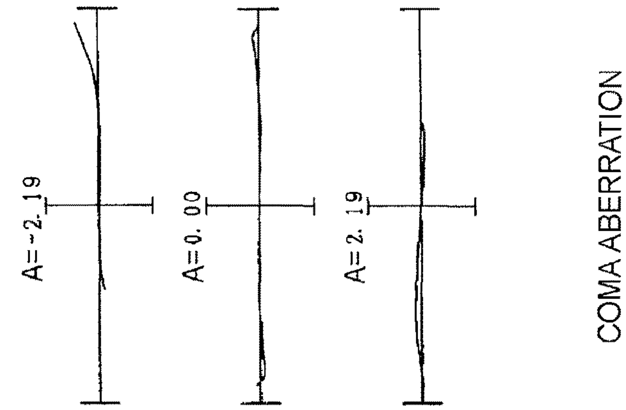
FIG. 25C shows the telephoto end state.
Figure 26A:
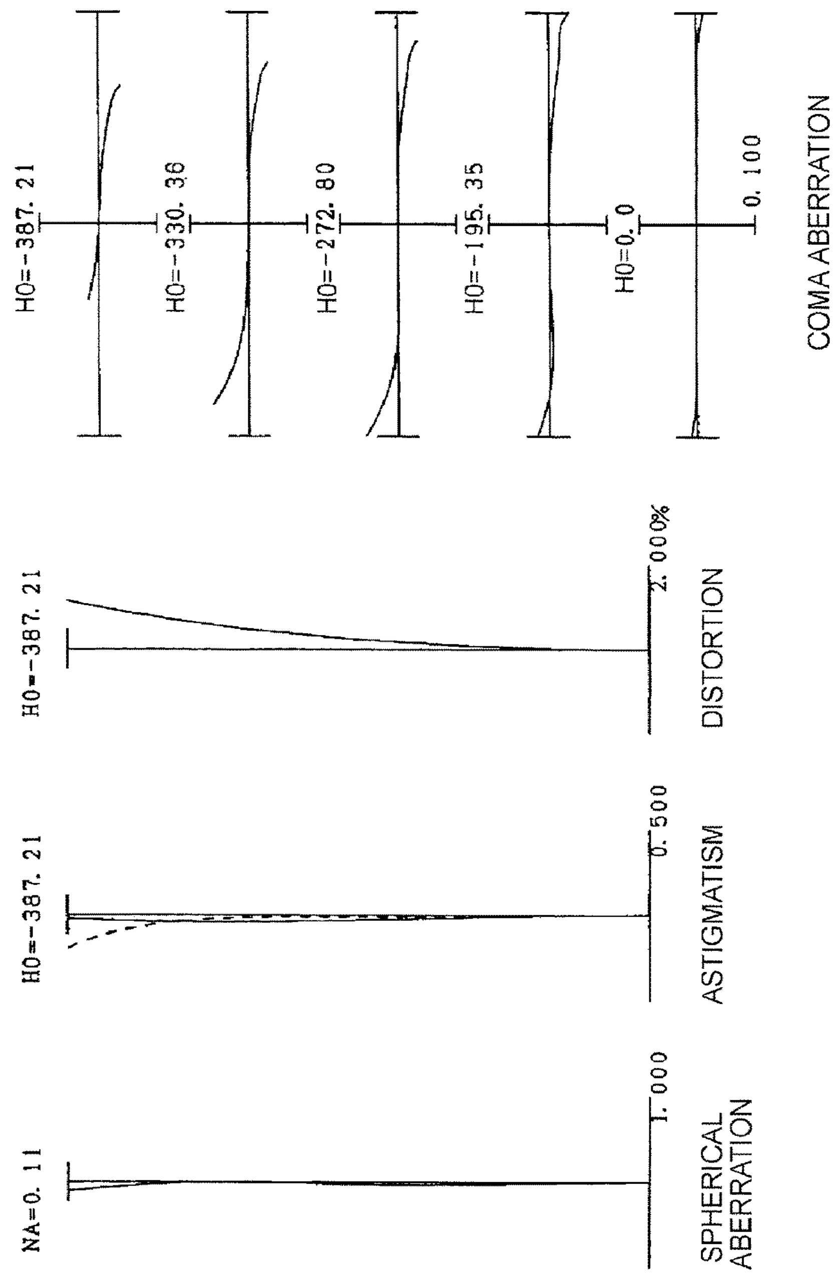
FIG. 26A shows the wide angle end state.
Figure 26B:
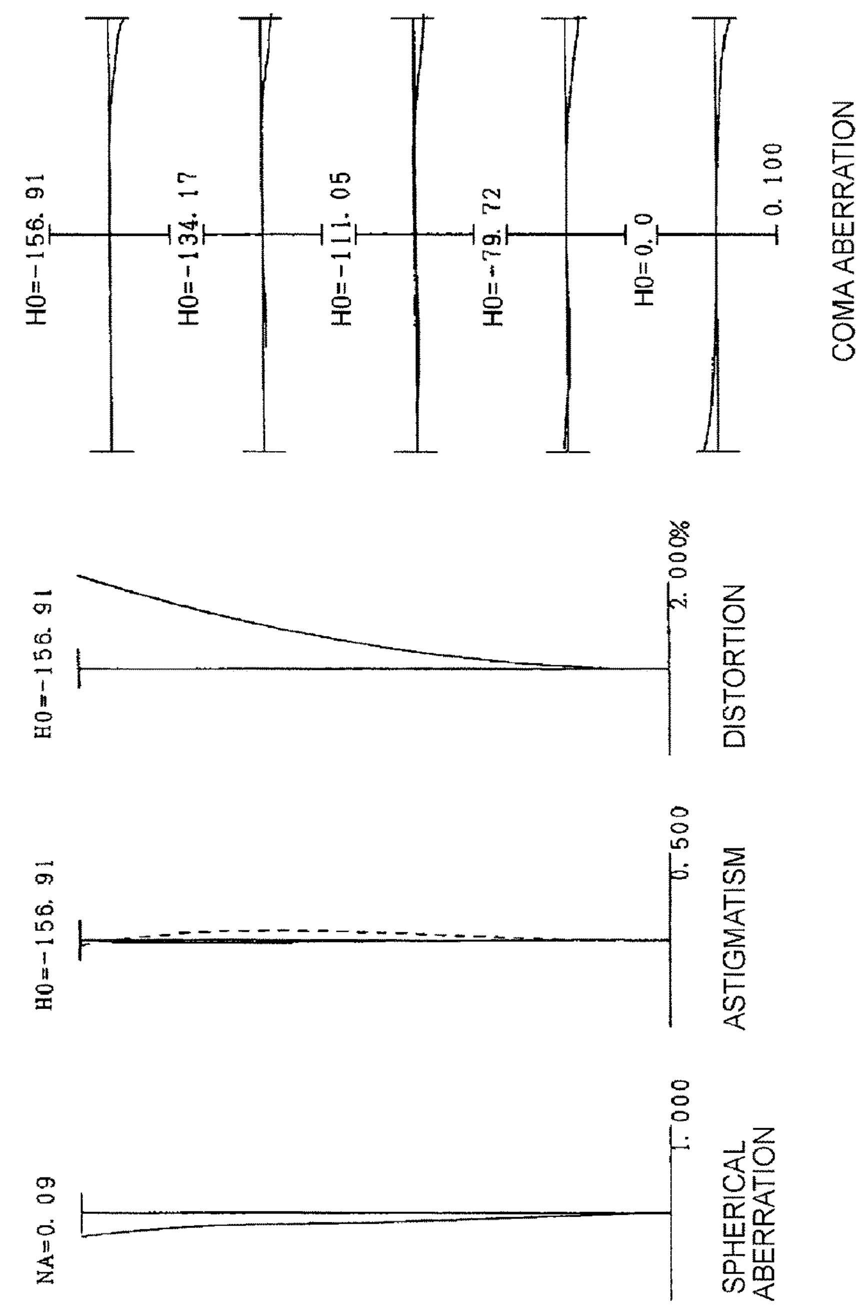
FIG. 26B shows the intermediate focal length state.
Figure 26C:
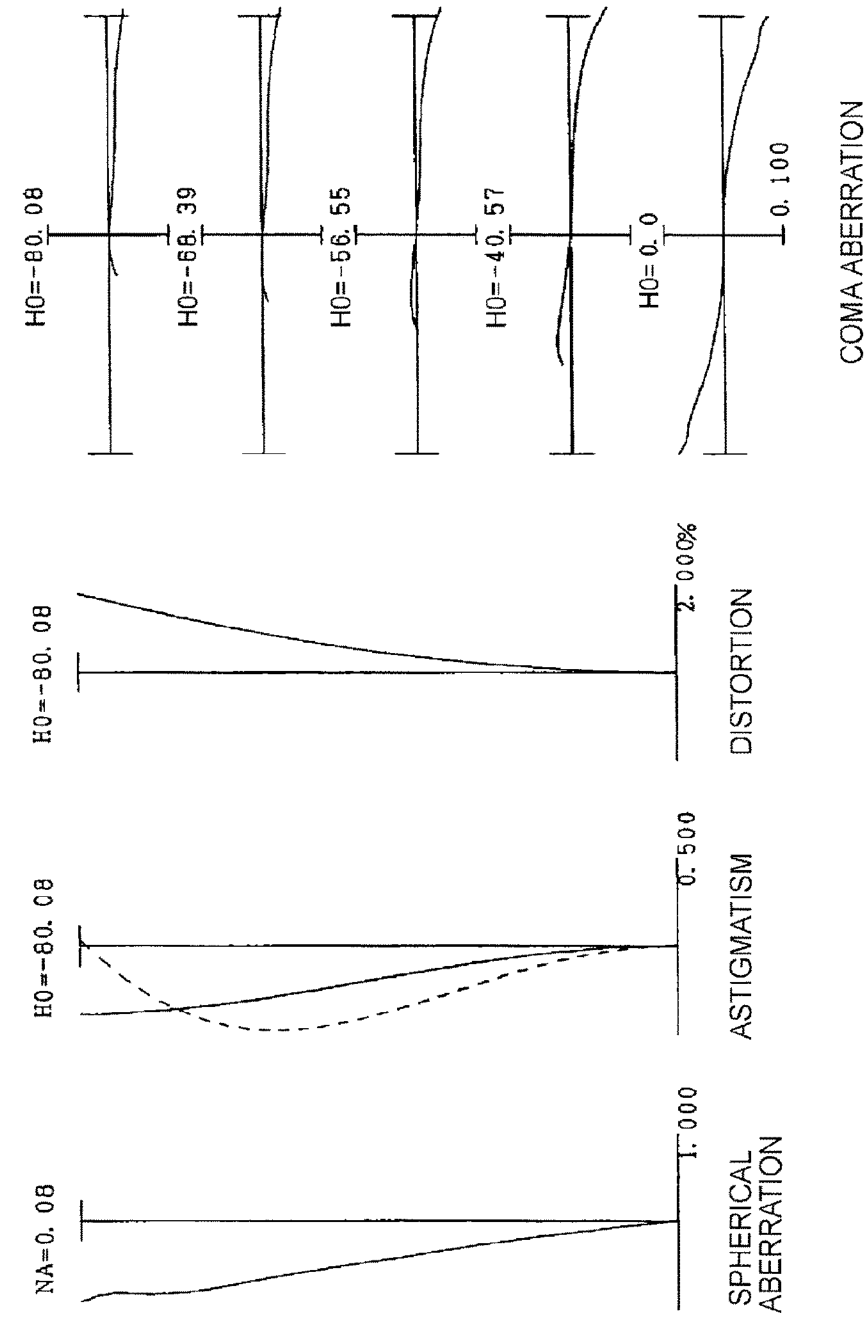
FIG. 26C shows the telephoto end state.

FIGS. 24 to 26 are graphs showing various aberrations of Example 7 at d-line (wavelength: 587.6 nm). In other words, FIG. 24A are graphs showing various aberrations upon focusing on infinity in the wide angle end state (f=81.59 mm), FIG. 24B are graphs showing various aberrations upon focusing on infinity in the intermediate focal length state (f=199.36 mm), and FIG. 24C are graphs showing various aberrations upon focusing on infinity in the telephoto end state (f=392.00 mm). FIG. 25A is a graph showing a coma aberration in the lens shift state (0.4 mm) upon focusing on infinity in the wide angle end state (f=81.59 mm), FIG. 25B is a graph showing a coma aberration in the lens shift state (0.4 mm) upon focusing on infinity in the intermediate focal length state (f=199.36 mm), and FIG. 25C is a graph showing a coma aberration in the lens shift state (0.4 mm) upon focusing on infinity in the telephoto end state (f=392.00 mm). FIG. 26A are graphs showing various aberrations upon close distance focusing (photographic distance: 1.8 m) in the wide angle end state (f=81.59 mm), FIG. 26B are graphs showing various aberrations upon close distance focusing (photographic distance: 1.8 m) in the intermediate focal length state (f=199.36 mm), and FIG. 26C are graphs showing various aberrations upon close distance focusing (photographic distance: 1.8 m) in the telephoto end state (f=392.00 mm).

As each graph showing aberrations indicates, according to Example 7, various aberrations are corrected well in each focal length state, from the wide angle end state to the telephoto end state, implementing excellent image forming performance.

Example 8

Figure 27:
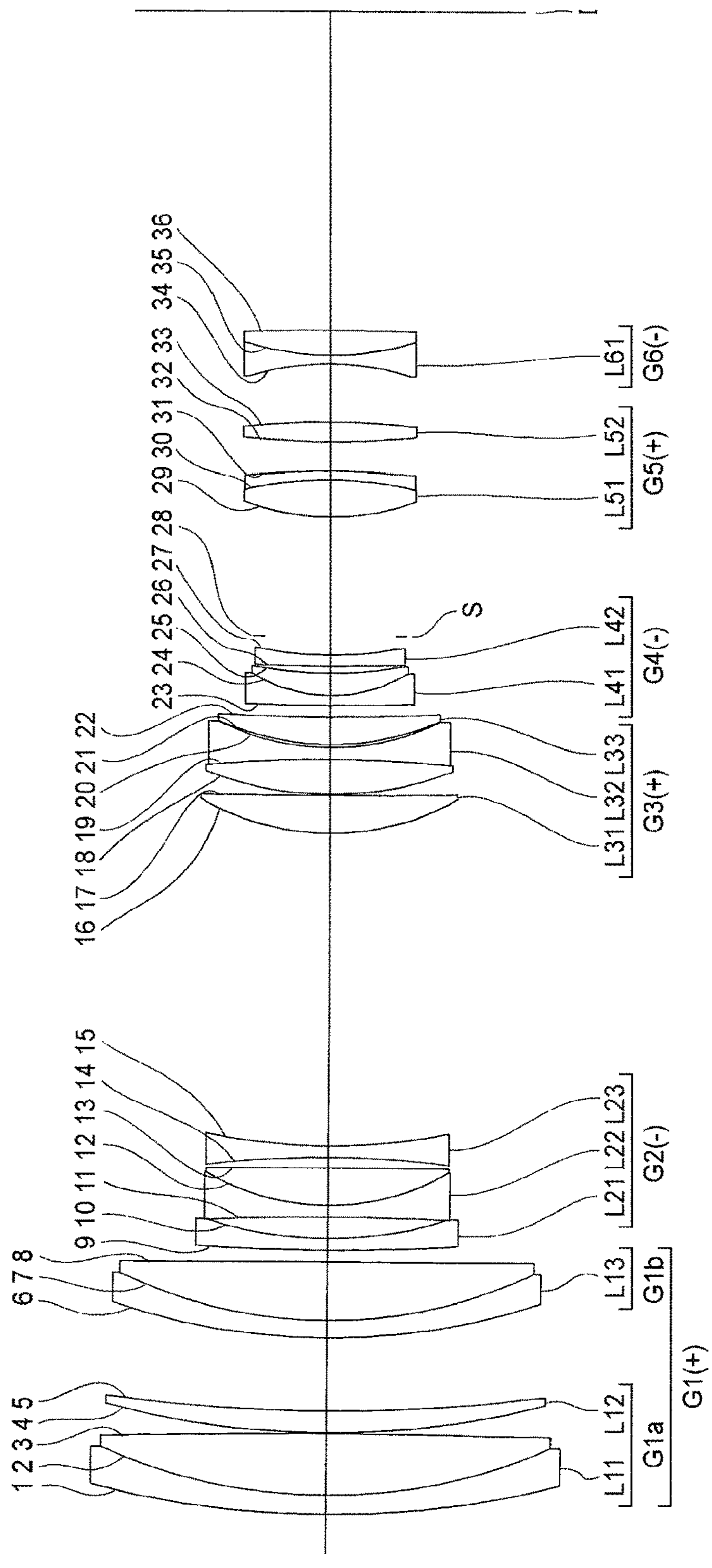
FIG. 27 is a diagram depicting a configuration of a lens system according to Example 8.

Example 8 will now be described with reference to FIG. 27 to FIG. 30 and Table 36 to Table 40. FIG. 27 is a diagram depicting a configuration of a lens system according to Example 8. As FIG. 27 shows, in the lens system according to Example 8, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a positive meniscus lens L31 having a convex surface facing the object, a cemented positive lens L32 in which a biconvex lens and a biconcave lens are cemented, and a positive meniscus lens L33 having a convex surface facing the object.

The fourth lens group G4 has, in order from the object, a cemented negative lens L41 in which a negative meniscus lens having a convex surface facing the object and a positive meniscus lens having a convex surface facing the object are cemented, and a negative meniscus lens L42 having a convex surface facing the object. In this example, all or a part of the fourth lens group G4 shift as a shift lens group, so as to have a component in an approximately orthogonal to the optical axis.

The fifth lens group G5 has, in order from the object, a cemented positive lens L51 in which a biconvex lens and a negative meniscus lens having a convex surface facing the image are cemented, and a biconvex lens L52.

The sixth lens group G6 has, in order from the object, a cemented negative lens L61 in which a biconcave lens and a biconvex lens are cemented.

The aperture stop S is disposed between the fourth lens group G4 and the fifth lens group G5, and is fixed with respect to the image plane I upon zooming from the wide angle end state to the telephoto end state.

Parameter values of Example 8 are shown in Table 36.

TABLE 36

| [All parameters] | | | |
|---|---|---|---|
| | Wide-angle end | intermediate focal length | telephoto end |
| f | 81.59~ | 199.36~ | 392.00 |
| FNO | 4.59~ | 5.61~ | 5.80 |
| 2ω | 29.77~ | 12.13~ | 6.20 |
| Image Height | 21.60~ | 21.60~ | 21.60 |
| Total lens Length | 258.89~ | 258.89~ | 258.89 |

| [Lens data] | | | | |
|---|---|---|---|---|
| Surface Number | r | d | nd | νd |
| 1 | 133.8083 | 3.30 | 1.79952 | 42.24 |
| 2 | 78.8175 | 10.60 | 1.49782 | 82.52 |
| 3 | −1382.5946 | 0.10 | | |
| 4 | 123.9007 | 3.70 | 1.49782 | 82.52 |
| 5 | 225.7793 | (d5) | | |
| 6 | 96.4071 | 3.00 | 1.84666 | 23.78 |
| 7 | 69.2697 | 10.00 | 1.58913 | 61.16 |
| 8 | 4131410.10 | (d8) | | |
| 9 | 285.2072 | 2.00 | 1.81600 | 46.62 |
| 10 | 56.3264 | 3.69 | | |
| 11 | −326.3135 | 2.00 | 1.75500 | 52.32 |

TABLE 36-continued

| | | | | |
|---|---|---|---|---|
| 12 | 33.7548 | 6.48 | 1.80810 | 22.76 |
| 13 | −2938.9650 | 1.80 | | |
| 14 | −139.5484 | 2.00 | 1.81600 | 46.62 |
| 15 | 80.6087 | (d15) | | |
| 16 | 36.3892 | 6.50 | 1.63854 | 55.38 |
| 17 | 1172.1590 | 0.20 | | |
| 18 | 47.5000 | 6.00 | 1.60300 | 65.44 |
| 19 | −193.2842 | 2.00 | 1.79504 | 28.69 |
| 20 | 34.9652 | 0.50 | | |
| *21 | 34.4094 | 4.75 | 1.59201 | 67.02 |
| 22 | 250.3789 | (d22) | | |
| 23 | 338.2642 | 1.80 | 1.75500 | 52.32 |
| 24 | 21.0000 | 3.84 | 1.85026 | 32.35 |
| 25 | 55.4412 | 1.25 | | |
| 26 | 257.4850 | 2.00 | 1.81600 | 46.62 |
| 27 | 55.5783 | 3.30 | | |
| 28 | 0.0000 | (d28) | (aperture stop S) | |
| 29 | 34.7699 | 6.40 | 1.48749 | 70.23 |
| 30 | −54.0693 | 1.50 | 1.78470 | 26.29 |
| 31 | −118.0352 | 5.00 | | |
| *32 | 101.5391 | 3.44 | 1.59201 | 67.02 |
| 33 | −103.4701 | (d33) | | |
| 34 | −37.4152 | 1.50 | 1.81600 | 46.62 |
| 35 | 39.2241 | 4.35 | 1.76182 | 26.52 |
| 36 | −273.3331 | (Bf) | | |

[Each group focal length data]

| Group | First surface | Focal length |
|---|---|---|
| G1 | 1 | 111.2886 |
| G2 | 9 | −33.1811 |
| G3 | 16 | 45.7397 |
| G4 | 23 | −50.3605 |
| G5 | 29 | 40.4786 |
| G6 | 34 | −49.4603 |

In Example 8, the twenty first and thirty second lens surfaces are aspherical. Table 37 shows the [Aspherical data].

TABLE 37

[Aspherical data]

| R | κ | $C_4$ | $C_6$ | $C_8$ | $C_{10}$ |
|---|---|---|---|---|---|
| Twenty first surface | | | | | |
| 34.4094 | +2.1394 | $-7.8728\times10^{-6}$ | $-1.0276\times10^{-8}$ | $+5.7397\times10^{-13}$ | $-3.9681\times10^{-14}$ |
| Thirty second surface | | | | | |
| 101.5391 | +8.6994 | $-3.7200\times10^{-6}$ | $-5.5601\times10^{-9}$ | $+2.\ 6654\times10^{-11}$ | $-6.1182\times10^{-14}$ |

In Example 8, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 38 shows the [Variable distance data].

TABLE 38

[Variable distance data]

| | Wide-angle end | intermediate focal length | telephoto end |
|---|---|---|---|
| d5 | 12.5694 | 12.5694 | 12.5694 |
| d8 | 2.0000 | 24.6107 | 29.4259 |
| d15 | 53.7638 | 23.9276 | 2.0000 |
| d22 | 2.0000 | 9.2256 | 26.3380 |
| d28 | 20.5472 | 13.9626 | 2.0000 |
| d34 | 10.0198 | 7.9655 | 1.9516 |
| Bf | 54.9999 | 63.6389 | 81.6154 |

Table 39 shows the [Focusing lens group shift distance] in Example 8.

TABLE 39

[Focusing lens group shift distance]

| | Wide-angle end | intermediate focal length | telephoto end |
|---|---|---|---|
| f | 81.5936 | 199.3606 | 392.0046 |
| Δ1b | 10.5694 | 10.5694 | 10.5694 |

Table 40 shows the [Conditional expression correspondence value] in Example 8.

TABLE 40

[Conditional expression correspondence value]

ft = 392.0046
f1b = 195.4172
f2 = −33.1811
fb = −50.3605
fc = 40.4786
TL = 258.8949
(5)(−f2)/fc = 0.8197
(6)(−f2)/(−fb) = 0.6589
(7)ft/f1b = 2.0060
(8)TL/f1b = 1.3248

Figure 28A:
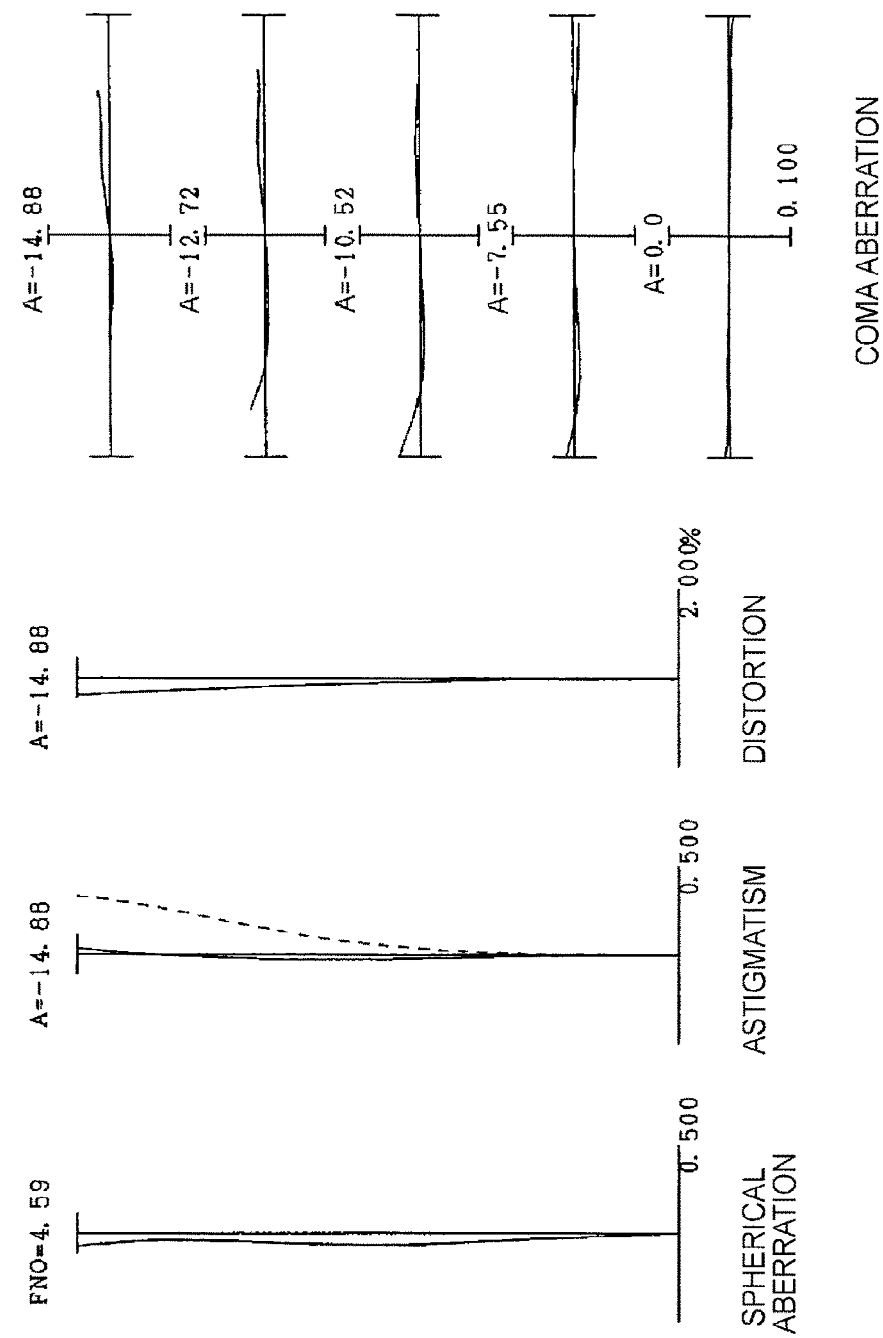
FIG. 28A shows the wide angle end state.
Figure 28B:
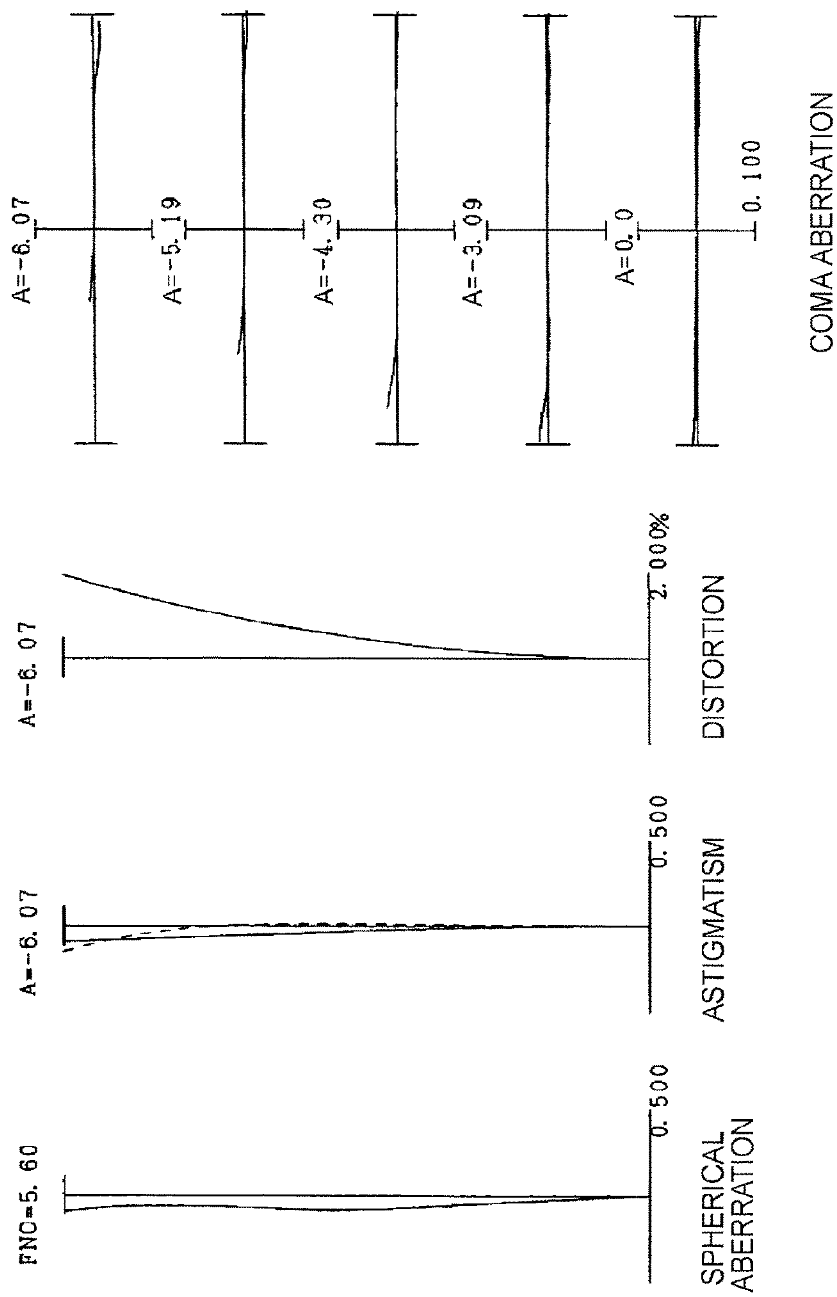
FIG. 28B shows the intermediate focal length state.
Figure 28C:
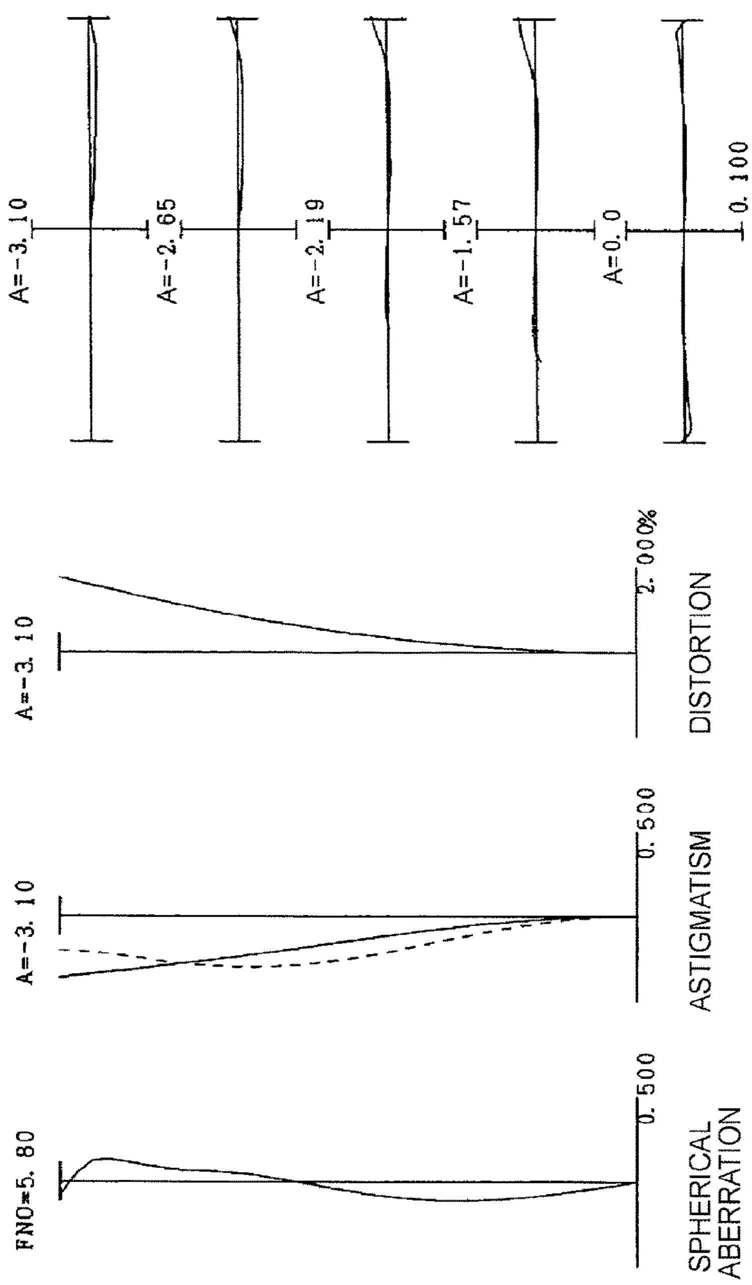
FIG. 28C shows the telephoto end state.
Figure 29C:
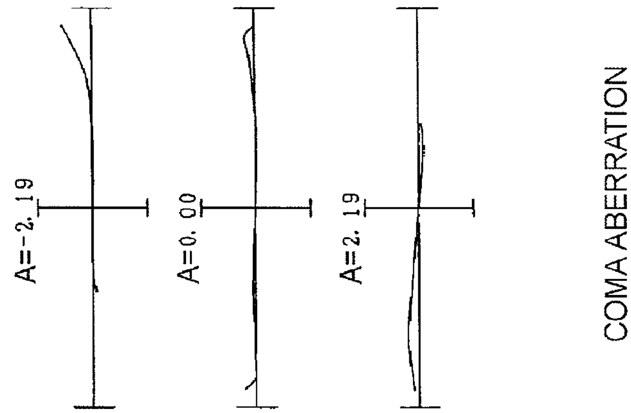
FIG. 29C shows the telephoto end state.
Figure 29B:
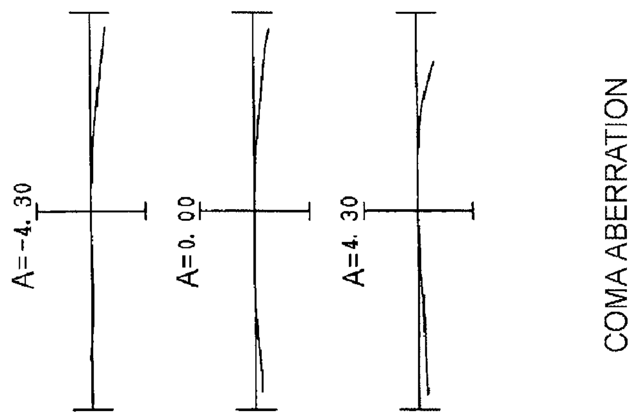
FIG. 29B shows the intermediate focal length state.
Figure 29A:
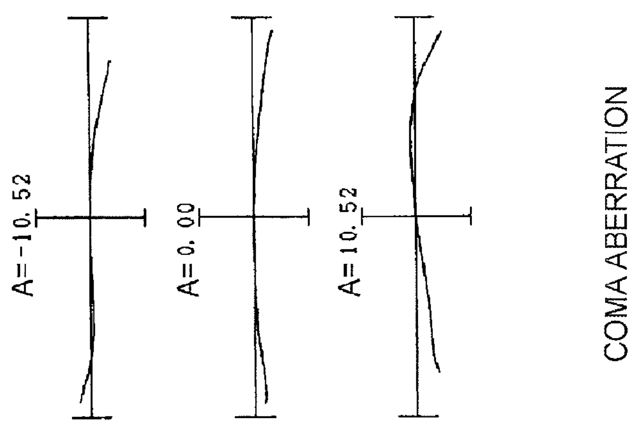
FIG. 29A shows the wide angle end state.
Figure 30A:
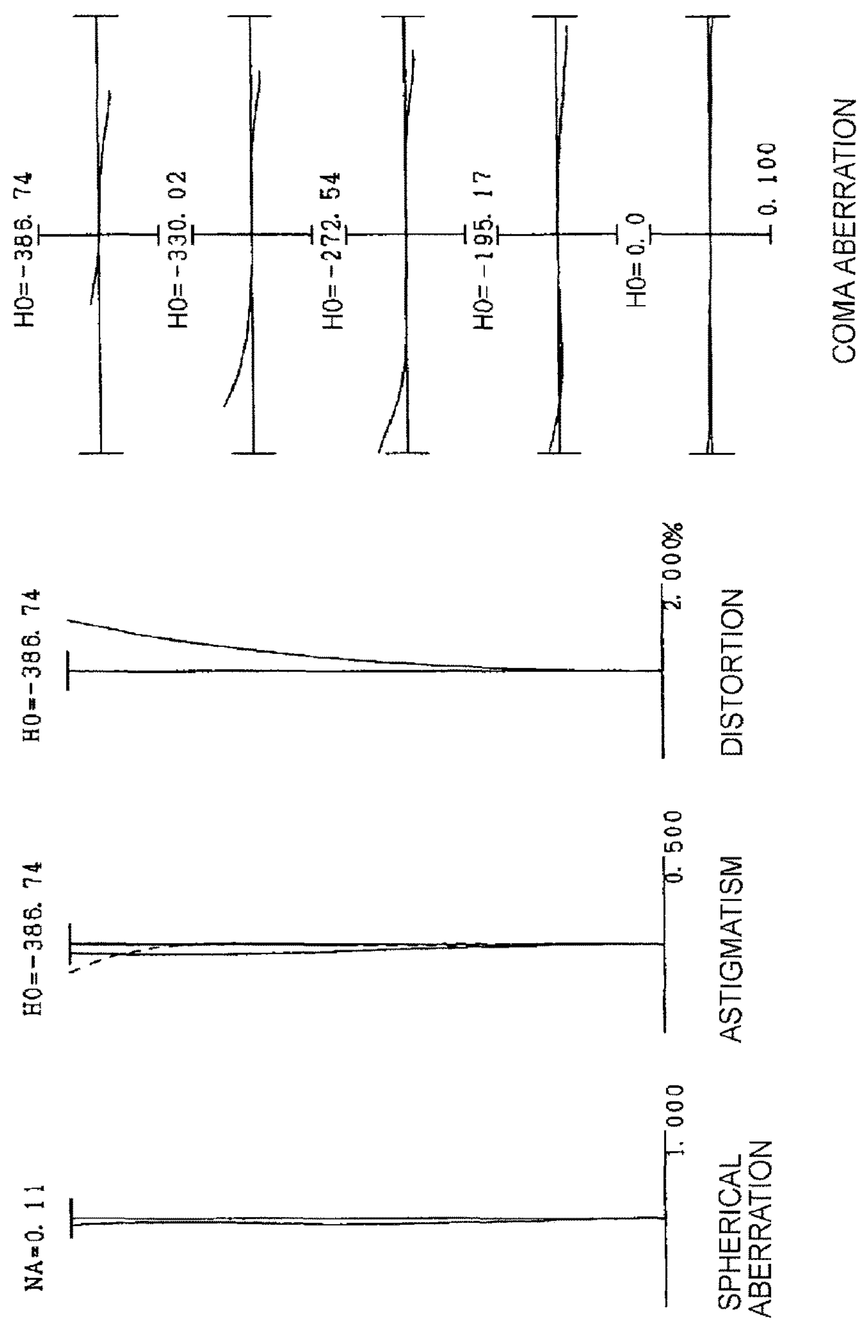
FIG. 30A shows the wide angle end state.
Figure 30B:
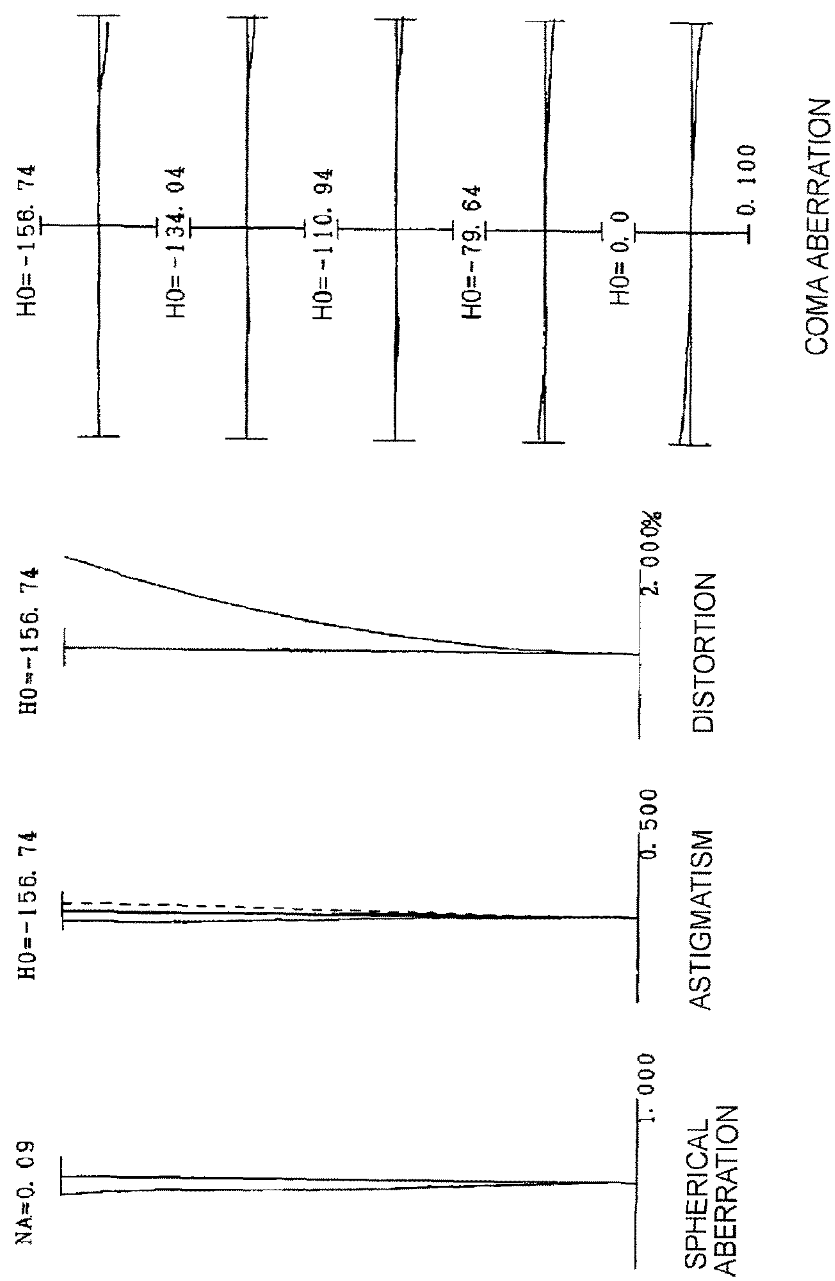
FIG. 30B shows the intermediate focal length state.
Figure 30C:
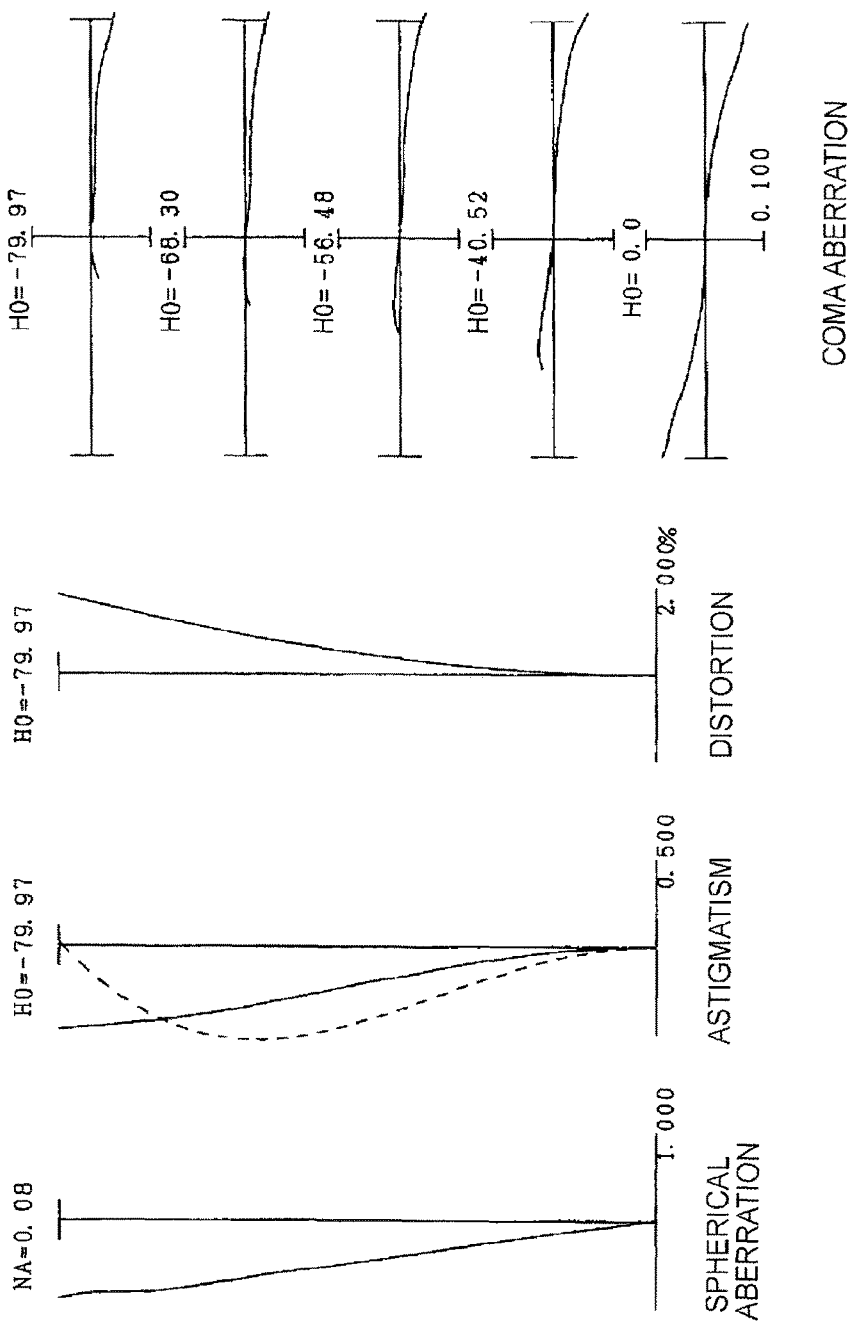
FIG. 30C shows the telephoto end state.

FIGS. 28 to 30 are graphs showing various aberrations of Example 8 at d-line (wavelength: 587.6 nm). In other words, FIG. 28A are graphs showing various aberrations upon focusing on infinity in the wide angle end state (f=81.59 mm), FIG. 28B are graphs showing various aberrations upon focusing on infinity in the intermediate focal length state (f=199.36 mm), and FIG. 28C are graphs showing various aberrations upon focusing on infinity in the telephoto end state (f=392.00 mm). FIG. 29A is a graph showing a coma aberration in the lens shift state (0.4 mm) upon focusing on infinity in the wide angle end state (f=81.59 mm), FIG. 29B is a graph showing a coma aberration in the lens shift state (0.4 mm) upon focusing on infinity in the intermediate focal length state (f=199.36 mm), and FIG. 29C is a graph showing a coma aberration in the lens shift state (0.4 mm) upon focusing on infinity in the telephoto end state (f=392.00 mm). FIG. 30A are graphs showing various aberrations upon close distance focusing (photographic distance: 1.8 m) in the wide angle end state (f=81.59 mm), FIG. 30B are graphs showing various aberrations upon close distance focusing (photographic distance: 1.8 m) in the intermediate focal length state (f=199.36 mm), and FIG. 30C are graphs showing various aberrations upon close distance focusing (photographic distance: 1.8 m) in the telephoto end state (f=392.00 mm).

As each graph showing aberrations indicates, according to Example 8, various aberrations are corrected well in each focal length state, from the wide angle end state to the telephoto end state, implementing excellent image forming performance.

Example 9

Figure 31:
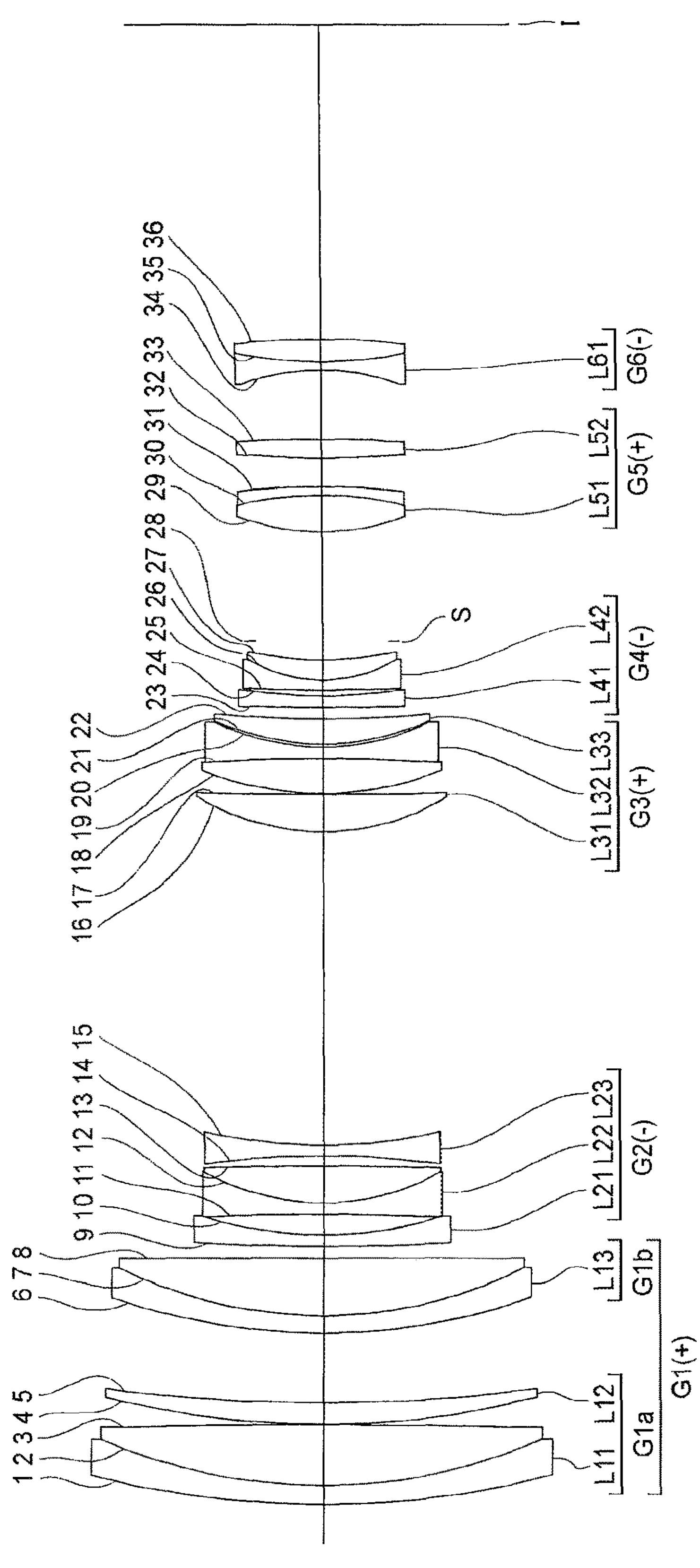
FIG. 31 is a diagram depicting a configuration of a lens system according to Example 9.

Example 9 will now be described with reference to FIG. 31 to FIG. 34 and Table 41 to Table 45. FIG. 31 is a diagram depicting a configuration of a lens system according to Example 9. As FIG. 31 shows, in the lens system according to Example 9, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a biconvex lens are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a positive meniscus lens L31 having a convex surface facing the object, a cemented positive lens L32 in which a biconvex lens and a biconcave lens are cemented, and a positive meniscus lens L33 having a convex surface facing the object.

The fourth lens group G4 has, in order from the object, a negative meniscus lens L41 having a convex surface facing the object, and a cemented negative lens L42 in which a negative meniscus lens having a convex surface facing the object and a positive meniscus lens having a convex surface facing the object are cemented. In this example, all or a part of the fourth lens group G4 shift as a shift lens group, so as to have a component in an approximately orthogonal to the optical axis.

The fifth lens group G5 has, in order from the object, a cemented positive lens L51 in which a biconvex lens and a negative meniscus lens having a convex surface facing the image are cemented, and a biconvex lens L52.

The sixth lens group G6 has, in order from the object, a cemented negative lens L61 in which a biconcave lens and a biconvex lens are cemented.

The aperture stop S is disposed between the fourth lens group G4 and the fifth lens group G5, and is fixed with respect to the image plane I upon zooming from the wide angle end state to the telephoto end state.

Parameter values of Example 9 are shown in Table 41.

TABLE 41

[All parameters]

| | Wide-angle end | intermediate focal length | telephoto end |
|---|---|---|---|
| f | 81.59~ | 199.36~ | 392.00 |
| FNO | 4.59~ | 5.61~ | 5.80 |
| 2ω | 29.77~ | 12.13~ | 6.21 |
| Image Height | 21.60~ | 21.60~ | 21.60 |
| Total lens Length | 258.90~ | 258.90~ | 258.90 |

TABLE 41-continued

[Lens data]

| Surface Number | r | d | nd | νd |
|---|---|---|---|---|
| 1 | 134.8455 | 3.30 | 1.79952 | 42.24 |
| 2 | 79.5748 | 10.60 | 1.49782 | 82.52 |
| 3 | −1547.8058 | 0.10 | | |
| 4 | 128.2096 | 3.70 | 1.49782 | 82.52 |
| 5 | 242.3479 | (d5) | | |
| 6 | 93.5271 | 3.00 | 1.84666 | 23.78 |
| 7 | 66.9353 | 10.00 | 1.58913 | 61.16 |
| 8 | −75015.782 | (d8) | | |
| 9 | 332.8521 | 2.00 | 1.81600 | 46.62 |
| 10 | 55.2905 | 3.62 | | |
| 11 | −438.4927 | 2.00 | 1.75500 | 52.32 |
| 12 | 35.2527 | 6.40 | 1.80810 | 22.76 |
| 13 | −696.2189 | 1.80 | | |
| 14 | −129.8079 | 2.00 | 1.81600 | 46.62 |
| 15 | 77.0152 | (d15) | | |
| 16 | 35.4471 | 6.49 | 1.63854 | 55.38 |
| 17 | 578.5681 | 0.20 | | |
| 18 | 47.5000 | 6.01 | 1.60300 | 65.44 |
| 19 | −313.3385 | 2.00 | 1.79504 | 28.69 |
| 20 | 35.4290 | 0.50 | | |
| *21 | 33.7197 | 4.50 | 1.59201 | 67.02 |
| 22 | 162.9293 | (d22) | | |
| 23 | 403.1724 | 2.00 | 1.81600 | 46.62 |
| 24 | 70.4507 | 1.06 | | |
| 25 | 229.8851 | 1.80 | 1.75500 | 52.32 |
| 26 | 21.0000 | 3.56 | 1.85026 | 32.35 |
| 27 | 49.2909 | 3.30 | | |
| 28 | 0.0000 | (d28) | (aperture stop S) | |
| 29 | 33.1928 | 6.40 | 1.48749 | 70.23 |
| 30 | −53.2227 | 1.50 | 1.78470 | 26.29 |
| 31 | −111.4723 | 5.00 | | |
| *32 | 121.2854 | 3.30 | 1.59201 | 67.02 |
| 33 | −199.8057 | (d33) | | |
| 34 | −33.5352 | 1.50 | 1.81600 | 46.62 |
| 35 | 60.5640 | 3.97 | 1.76182 | 26.52 |
| 36 | −106.9829 | (Bf) | | |

[Each group focal length data]

| Group | First surface | Focal length |
|---|---|---|
| G1 | 1 | 109.8643 |
| G2 | 9 | −32.9572 |
| G3 | 16 | 46.0530 |
| G4 | 23 | −52.1621 |
| G5 | 29 | 44.3871 |
| G6 | 34 | −56.8957 |

In Example 9, the twenty first and thirty second lens surfaces are aspherical. Table 42 shows the [Aspherical data].

TABLE 42

[Aspherical data]

| R | κ | $C_4$ | $C_6$ | $C_8$ | $C_{10}$ |
|---|---|---|---|---|---|
| Twenty first surface | | | | | |
| 33.7197 | +2.0962 | $-8.1989 \times 10^{-6}$ | $-1.1471 \times 10^{-8}$ | $+1.2837 \times 10^{-12}$ | $-4.5945 \times 10^{-14}$ |
| Thirty second surface | | | | | |
| 121.2854 | −5.4957 | $-2.6213 \times 10^{-6}$ | $-8.3350 \times 10^{-9}$ | $+4.5271 \times 10^{-11}$ | $-1.0236 \times 10^{-13}$ |

In Example 9, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 43 shows the [Variable distance data].

TABLE 43

| [Variable distance data] | | | |
|---|---|---|---|
| | Wide-angle end | intermediate focal length | telephoto end |
| d5 | 12.1838 | 12.1838 | 12.1838 |
| d8 | 2.0000 | 25.0203 | 29.4123 |
| d15 | 54.7687 | 24.6430 | 2.0000 |
| d22 | 2.0000 | 9.1053 | 27.3564 |
| d28 | 19.2143 | 13.8160 | 2.0000 |
| d34 | 12.1235 | 9.6991 | 2.4325 |
| Bf | 55.0001 | 62.8228 | 81.9052 |

Table 44 shows the [Focusing lens group shift distance] in Example 9.

TABLE 44

| [Focusing lens group shift distance] | | | |
|---|---|---|---|
| | Wide-angle end | intermediate focal length | telephoto end |
| f | 81.5937 | 199.3609 | 392.0048 |
| Δ1b | 10.1838 | 10.1838 | 10.1838 |

Table 45 shows the [Conditional expression correspondence value] in Example 9.

TABLE 45

| [Conditional expression correspondence value] |
|---|
| ft = 392.0048 |
| f1b = 189.7831 |
| f2 = −32.9572 |
| fb = −52.1621 |
| fc = 44.3871 |
| TL = 258.8951 |
| (5)(−f2)/fc = 0.7425 |
| (6)(−f2)/(−fb) = 0.6318 |
| (7)ft/f1b = 2.0655 |
| (8)TL/f1b = 1.3642 |

Figure 32A:
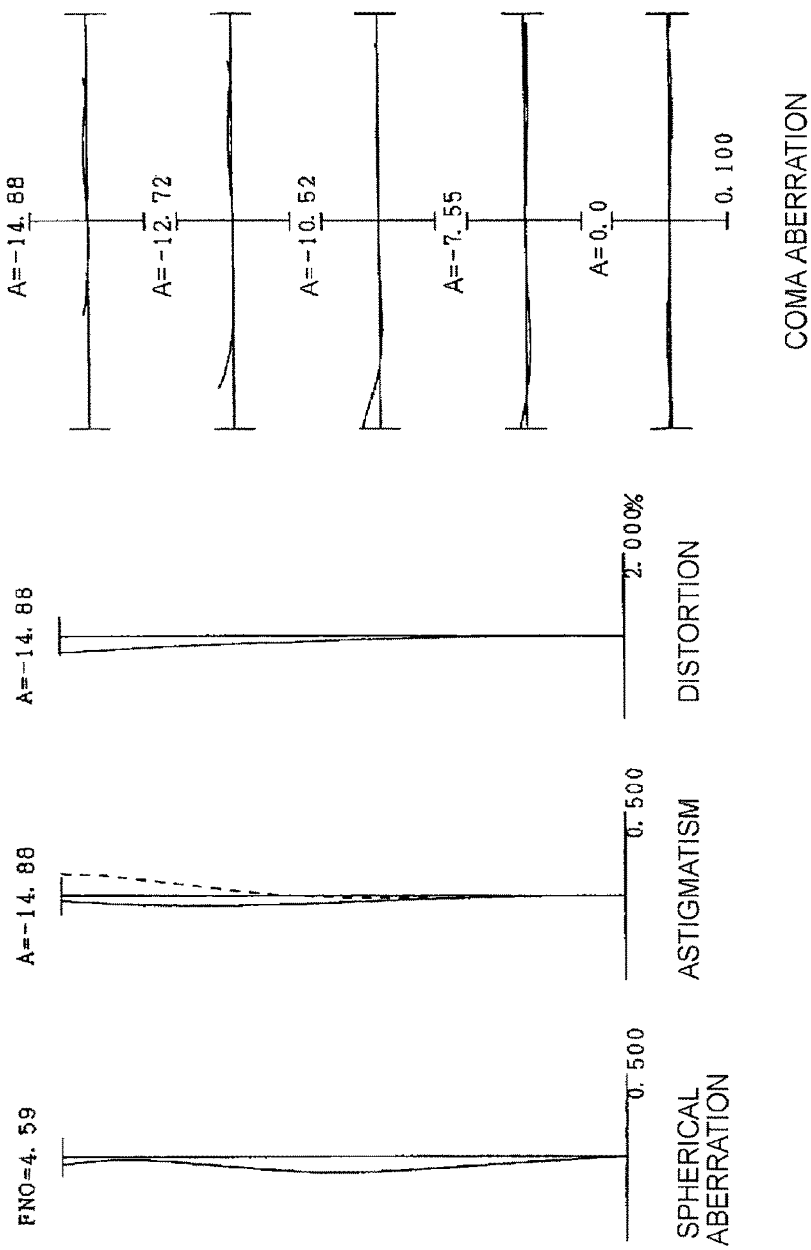
FIG. 32A shows the wide angle end state.
Figure 32B:
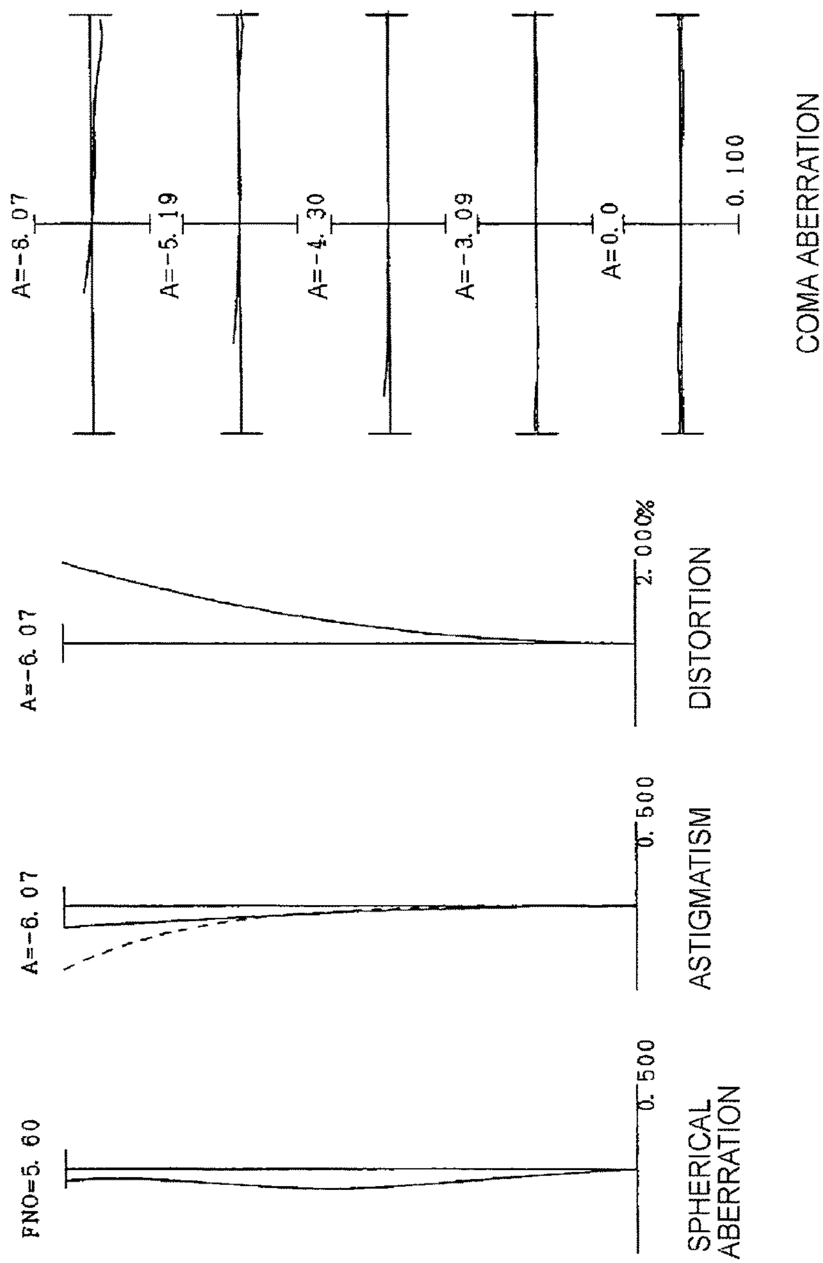
FIG. 32B shows the intermediate focal length state.
Figure 32C:
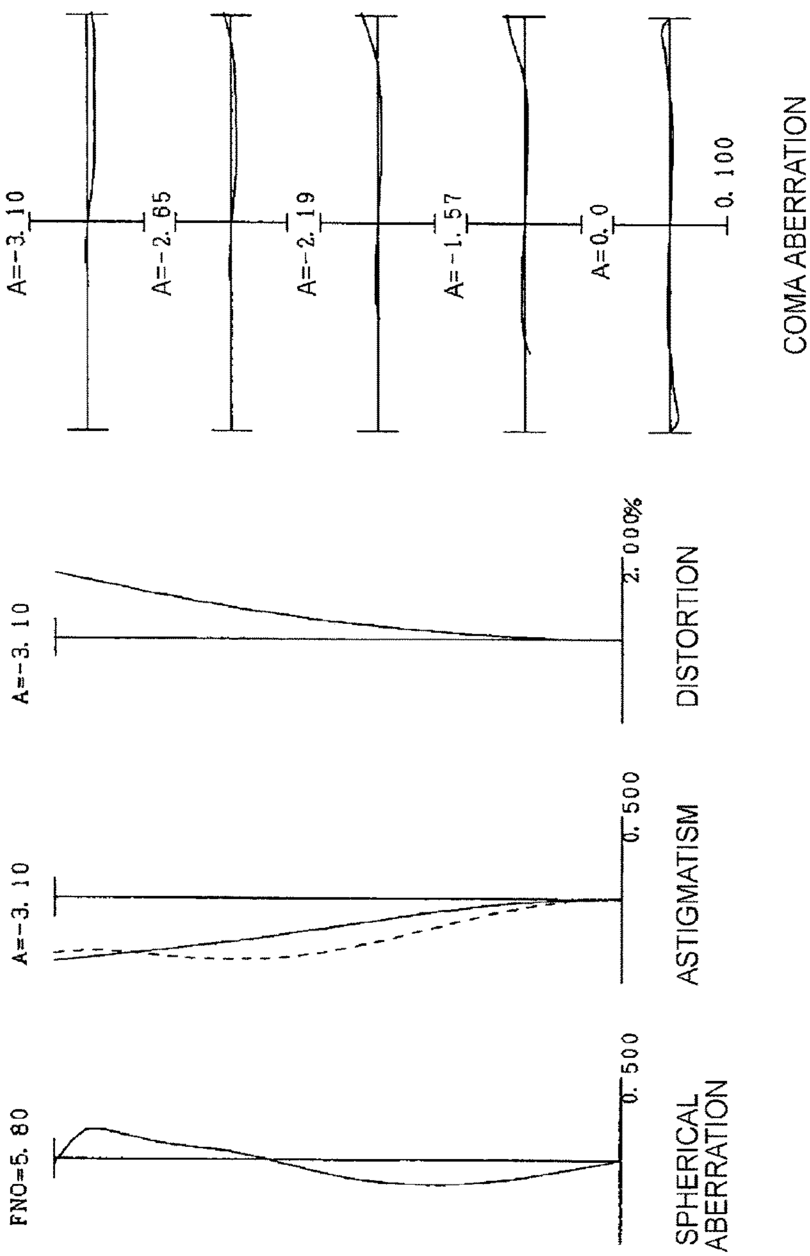
FIG. 32C shows the telephoto end state.
Figure 33A:
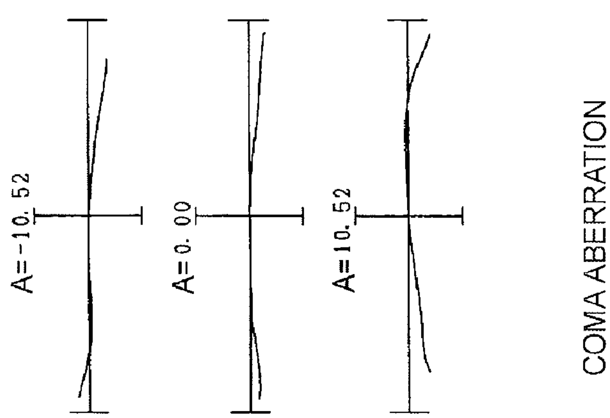
FIG. 33A shows the wide angle end state.
Figure 33B:
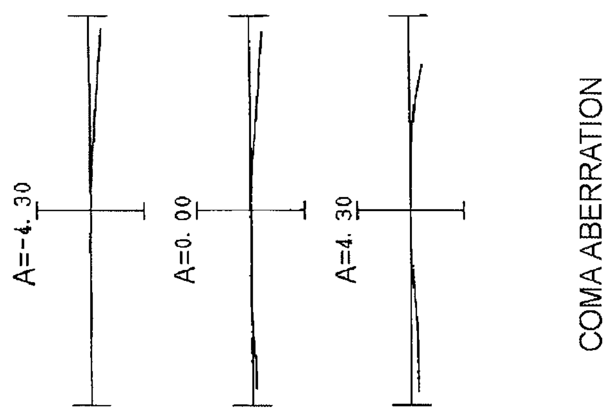
FIG. 33B shows the intermediate focal length state.
Figure 33C:
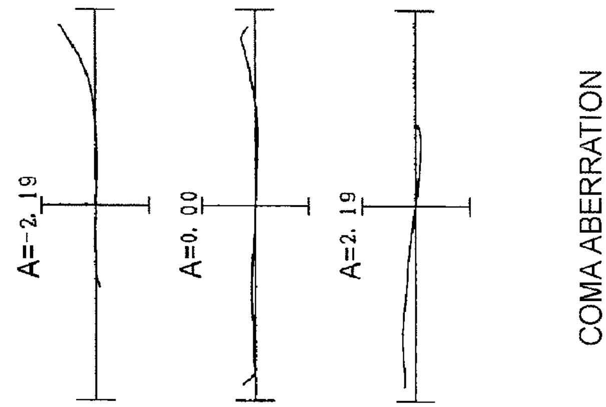
FIG. 33C shows the telephoto end state.
Figure 34A:
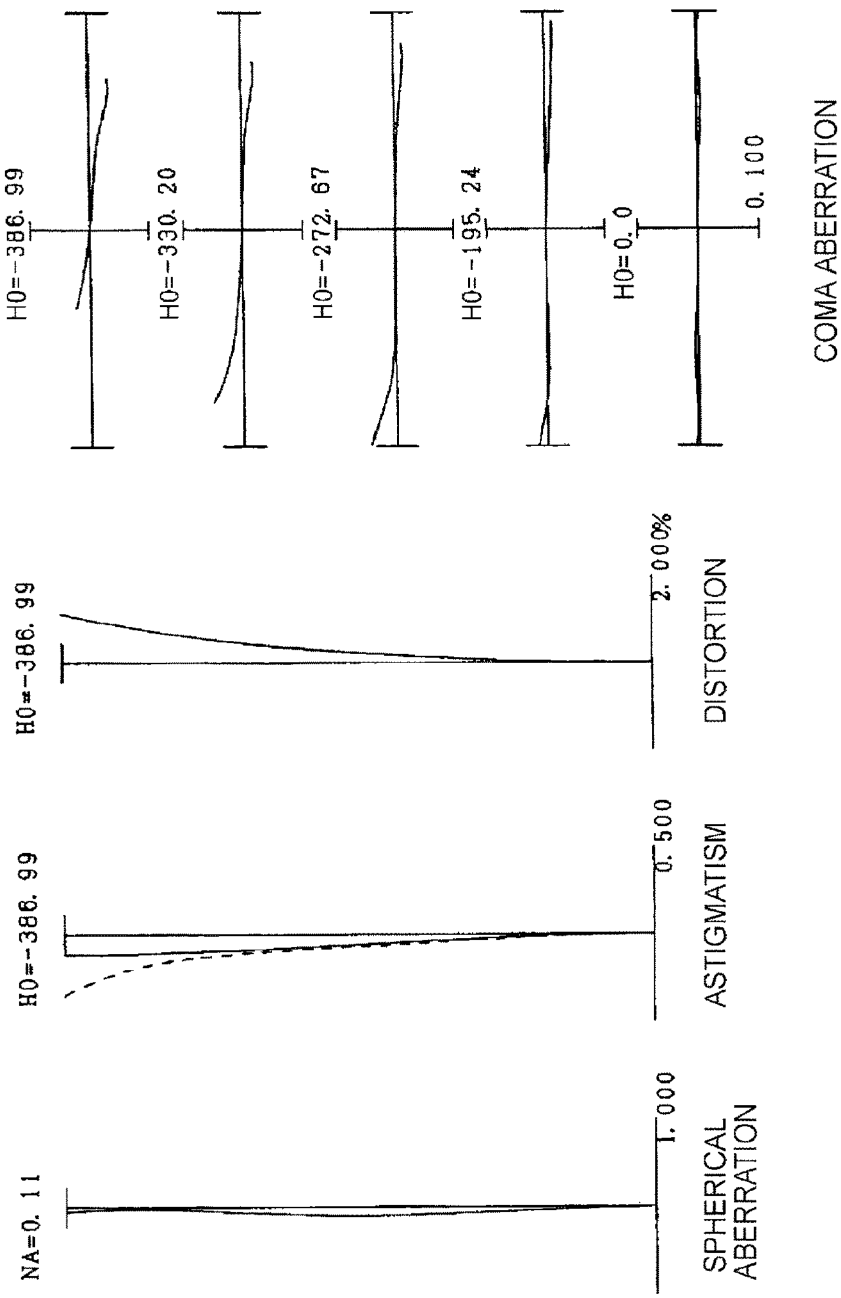
FIG. 34A shows the wide angle end state.
Figure 34B:
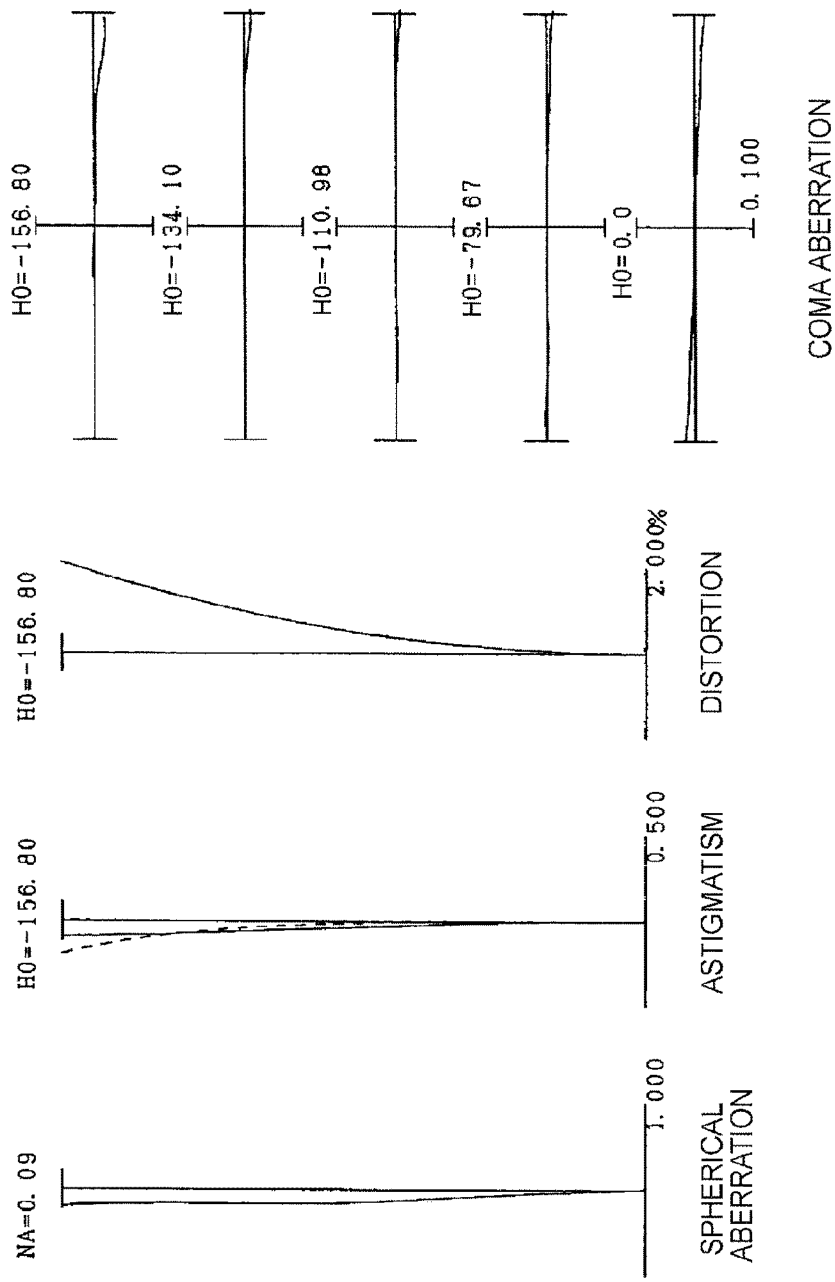
FIG. 34B shows the intermediate focal length state.
Figure 34C:
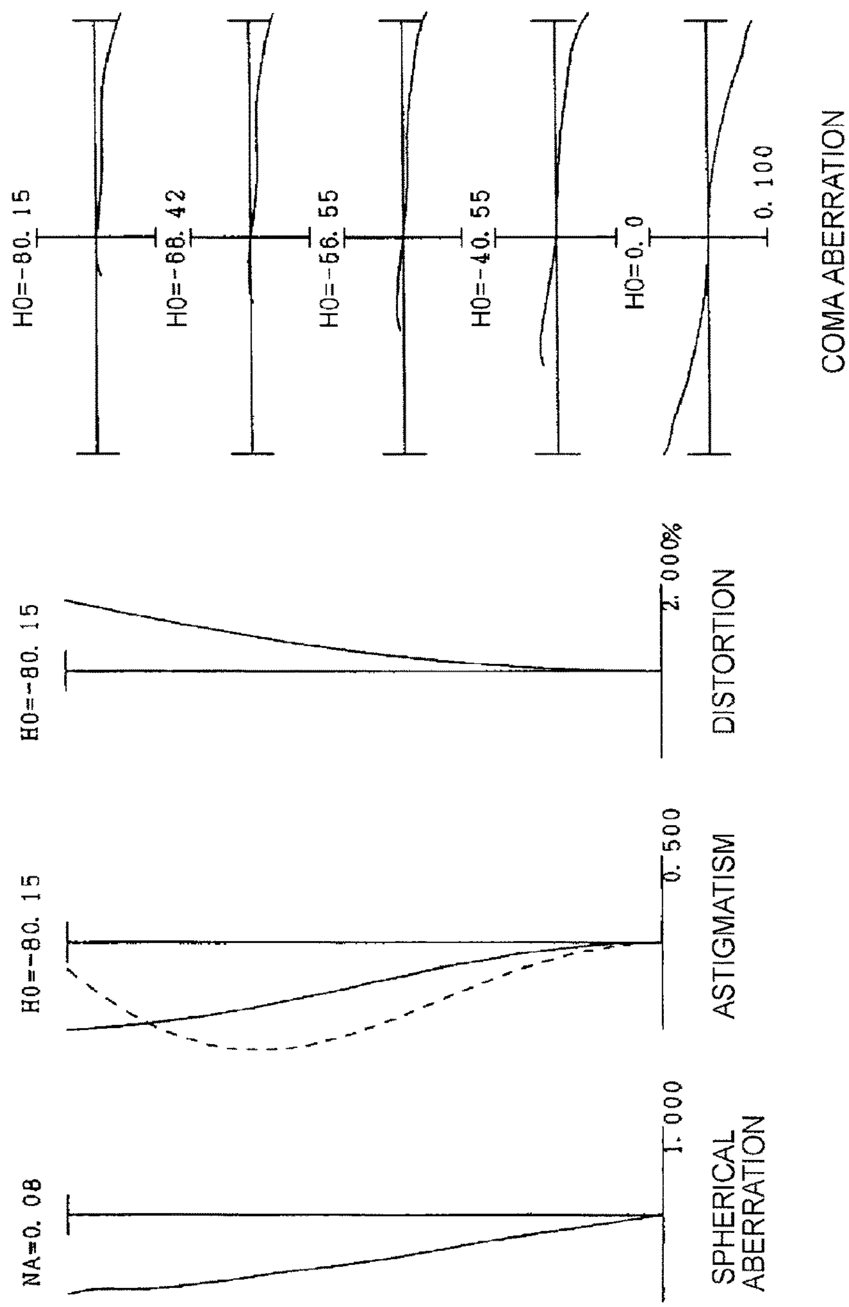
FIG. 34C shows the telephoto end state.

FIGS. 32 to 34 are graphs showing various aberrations of Example 9 at d-line (wavelength: 587.6 nm). In other words, FIG. 32A are graphs showing various aberrations upon focusing on infinity in the wide angle end state (f=81.59 mm), FIG. 32B are graphs showing various aberrations upon focusing on infinity in the intermediate focal length state (f=199.36 mm), and FIG. 32C are graphs showing various aberrations upon focusing on infinity in the telephoto end state (f=392.00 mm). FIG. 33A is a graph showing a coma aberration in the lens shift state (0.4 mm) upon focusing on infinity in the wide angle end state (f=81.59 mm), FIG. 33B is a graph showing a coma aberration in the lens shift state (0.4 mm) upon focusing on infinity in the intermediate focal length state (f=199.36 mm), and FIG. 33C is a graph showing a coma aberration in the lens shift state (0.4 mm) upon focusing on infinity in the telephoto end state (f=392.00 mm). FIG. 34A are graphs showing various aberrations upon close distance focusing (photographic distance: 1.8 m) in the wide angle end state (f=81.59 mm), FIG. 34B are graphs showing various aberrations upon close distance focusing (photographic distance: 1.8 m) in the intermediate focal length state (f=199.36 mm), and FIG.

34C are graphs showing various aberrations upon close distance focusing (photographic distance: 1.8 m) in the telephoto end state (f=392.00 mm).

As each graph showing aberrations indicates, according to Example 9, various aberrations are corrected well in each focal length state, from the wide angle end state to the telephoto end state, implementing excellent image forming performance.

Example 10

Figure 35:
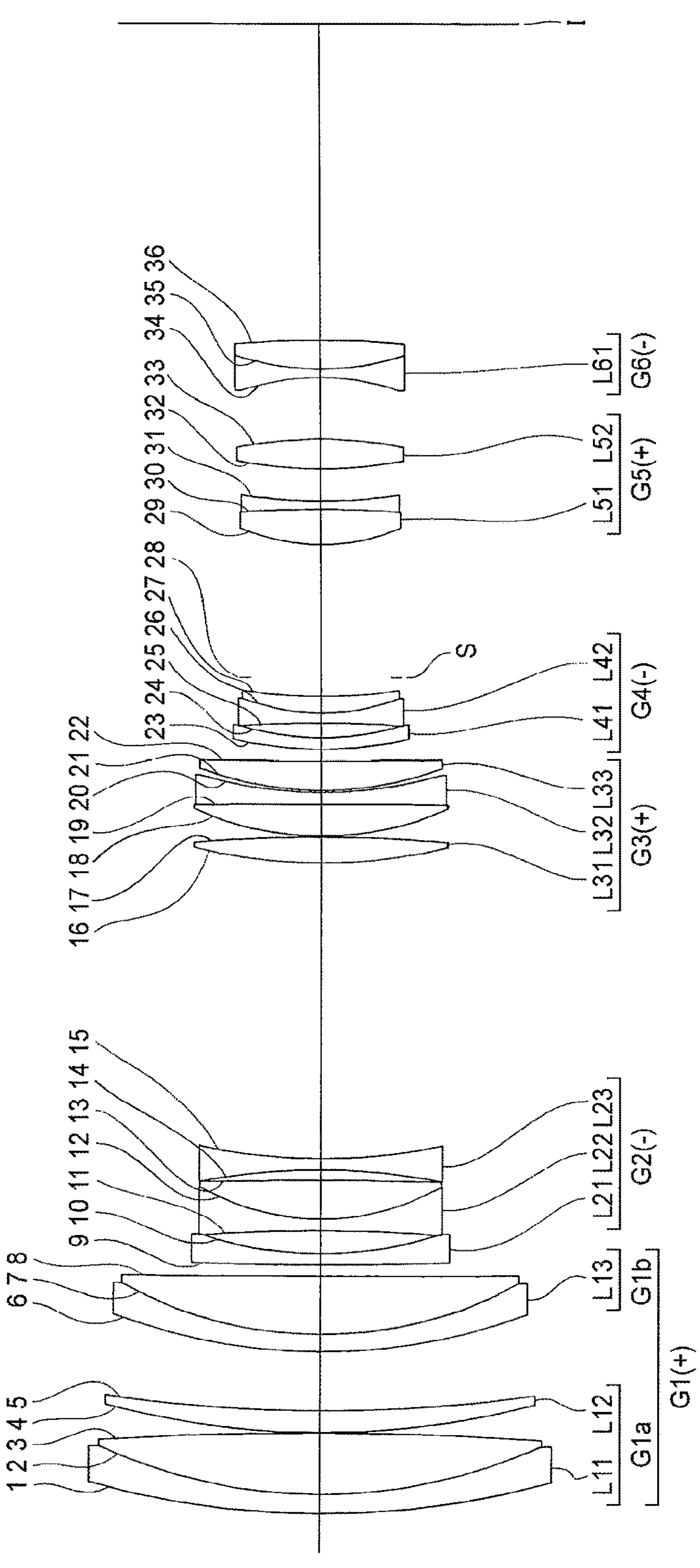
FIG. 35 is a diagram depicting a configuration of a lens system according to Example 10.

Example 10 will now be described with reference to FIG. 35 to FIG. 38 and Table 46 to Table 50. FIG. 35 is a diagram depicting a configuration of a lens system according to Example 10. As FIG. 35 shows, in the lens system according to Example 10, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a positive meniscus lens L33 having a convex surface facing the object.

The fourth lens group G4 has, in order from the object, a negative meniscus lens L41 having a convex surface facing the object, and a cemented negative lens L42 in which a biconcave lens and a positive meniscus lens having a convex surface facing the object are cemented. In this example, all or a part of the fourth lens group G4 shift as a shift lens group, so as to have a component in an approximately orthogonal to the optical axis.

The fifth lens group G5 has, in order from the object, a cemented positive lens L51 in which a biconvex lens and a biconcave lens are cemented, and a biconvex lens L52.

The sixth lens group G6 has, in order from the object, a cemented negative lens L61 in which a biconcave lens and a biconvex lens are cemented.

The aperture stop S is disposed between the fourth lens group G4 and the fifth lens group G5, and is fixed with respect to the image plane I upon zooming from the wide angle end state to the telephoto end state.

Parameter values of Example 10 are shown in Table 46.

TABLE 46

| [All parameters] | | | | | |
|---|---|---|---|---|---|
| | Wide-angle end | | intermediate focal length | | telephoto end |
| f | 81.59 | ~ | 199.36 | ~ | 392.00 |
| FNO | 4.59 | ~ | 5.61 | ~ | 5.80 |
| 2ω | 29.77 | ~ | 12.13 | ~ | 6.20 |

TABLE 46-continued

| | | | | | |
|---|---|---|---|---|---|
| Image Height | 21.60 | ~ | 21.60 | ~ | 21.60 |
| Total lens Length | 258.89 | ~ | 258.89 | ~ | 258.89 |

[Lens data]

| Surface Number | r | d | nd | νd |
|---|---|---|---|---|
| 1 | 126.0186 | 3.30 | 1.79952 | 42.24 |
| 2 | 77.5473 | 10.60 | 1.49782 | 82.52 |
| 3 | −547.5618 | 0.10 | | |
| 4 | 122.6966 | 3.70 | 1.49782 | 82.52 |
| 5 | 217.2231 | (d5) | | |
| 6 | 84.6235 | 3.00 | 1.84666 | 23.78 |
| 7 | 60.1469 | 10.00 | 1.58913 | 61.16 |
| 8 | 4800.8473 | (d8) | | |
| 9 | 506.2739 | 2.00 | 1.81600 | 46.62 |
| 10 | 55.4834 | 4.00 | | |
| 11 | −233.2084 | 2.00 | 1.75500 | 52.32 |
| 12 | 35.7567 | 6.75 | 1.80810 | 22.76 |
| 13 | −542.5552 | 1.80 | | |
| 14 | −89.1219 | 2.00 | 1.81600 | 46.62 |
| 15 | 88.6080 | (d15) | | |
| 16 | 76.9231 | 4.50 | 1.72916 | 54.68 |
| 17 | −220.3525 | 0.20 | | |
| 18 | 45.3282 | 5.50 | 1.60300 | 65.44 |
| 19 | −1753.6227 | 2.00 | 1.84666 | 23.78 |
| 20 | 60.5621 | 0.40 | | |
| *21 | 48.1025 | 5.10 | 1.59201 | 67.02 |
| 22 | 1154.9344 | (d22) | | |
| 23 | 54.9083 | 2.00 | 1.83481 | 42.71 |
| 24 | 40.6717 | 2.50 | | |
| 25 | −166.6667 | 1.80 | 1.77250 | 49.60 |
| 26 | 30.6534 | 2.95 | 1.84666 | 23.78 |
| 27 | 75.2024 | 3.30 | | |
| 28 | 0.0000 | (d28) | (aperture stop S) | |
| 29 | 29.3279 | 6.10 | 1.48749 | 70.23 |
| 30 | −170.5677 | 1.50 | 1.78470 | 26.29 |
| 31 | 73.5357 | 5.50 | | |
| *32 | 59.7416 | 5.20 | 1.59201 | 67.02 |
| 33 | −59.5375 | (d33) | | |
| 34 | −33.3814 | 1.50 | 1.81600 | 46.62 |
| 35 | 38.9044 | 5.00 | 1.76182 | 26.52 |
| 36 | −133.0942 | (Bf) | | |

[Each group focal length data]

| Group | First surface | Focal length |
|---|---|---|
| G1 | 1 | 97.2288 |
| G2 | 9 | −28.9504 |
| G3 | 16 | 42.3244 |
| G4 | 23 | −53.7194 |
| G5 | 29 | 40.6089 |
| G6 | 34 | −51.0052 |

In Example 10, the twenty first and thirty second lens surfaces are aspherical. Table 47 shows the [Aspherical data].

TABLE 47

[Aspherical data]

| R | κ | $C_4$ | $C_6$ | $C_8$ | $C_{10}$ |
|---|---|---|---|---|---|
| Twenty first surface | | | | | |
| 48.1025 | +3.3060 | $-3.4244 \times 10^{-6}$ | $-3.5396 \times 10^{-9}$ | $+1.6713 \times 10^{-12}$ | $-1.0047 \times 10^{-14}$ |
| Thirty second surface | | | | | |
| 59.7416 | +10.6606 | $-1.0210 \times 10^{-5}$ | $-1.3998 \times 10^{-8}$ | $+1.6666 \times 10^{-11}$ | $-1.7273 \times 10^{-13}$ |

In Example 10, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 48 shows the [Variable distance data].

TABLE 48

[Variable distance data]

| | Wide-angle end | intermediate focal length | telephoto end |
|---|---|---|---|
| d5 | 10.2121 | 10.2121 | 10.2121 |
| d8 | 2.0000 | 15.7033 | 21.7781 |
| d15 | 51.3519 | 24.5386 | 2.0000 |
| d22 | 2.0000 | 15.1100 | 31.5738 |
| d28 | 23.2999 | 11.0484 | 2.0000 |
| d34 | 10.7312 | 4.7535 | 1.8048 |
| Bf | 54.9997 | 73.2287 | 85.2252 |

Table 49 shows the [Focusing lens group shift distance] in Example 10.

TABLE 49

[Focusing lens group shift distance]

| | Wide-angle end | intermediate focal length | telephoto end |
|---|---|---|---|
| f | 81.5935 | 199.3602 | 392.0024 |
| Δ1b | 8.2121 | 8.2121 | 8.2121 |

Table 50 shows the [Conditional expression correspondence value] in Example 10.

TABLE 50

[Conditional expression correspondence value]

ft = 392.0024
f1b = 176.1592
f2 = −28.9504
fb = −53.7194
fc = 44.6089
TL = 258.8947
(5) (−f2)/fc = 0.6490
(6) (−f2)/(−fb) = 0.5389
(7) ft/f1b = 2.2253
(8) TL/f1b = 1.4697

Figure 36A:
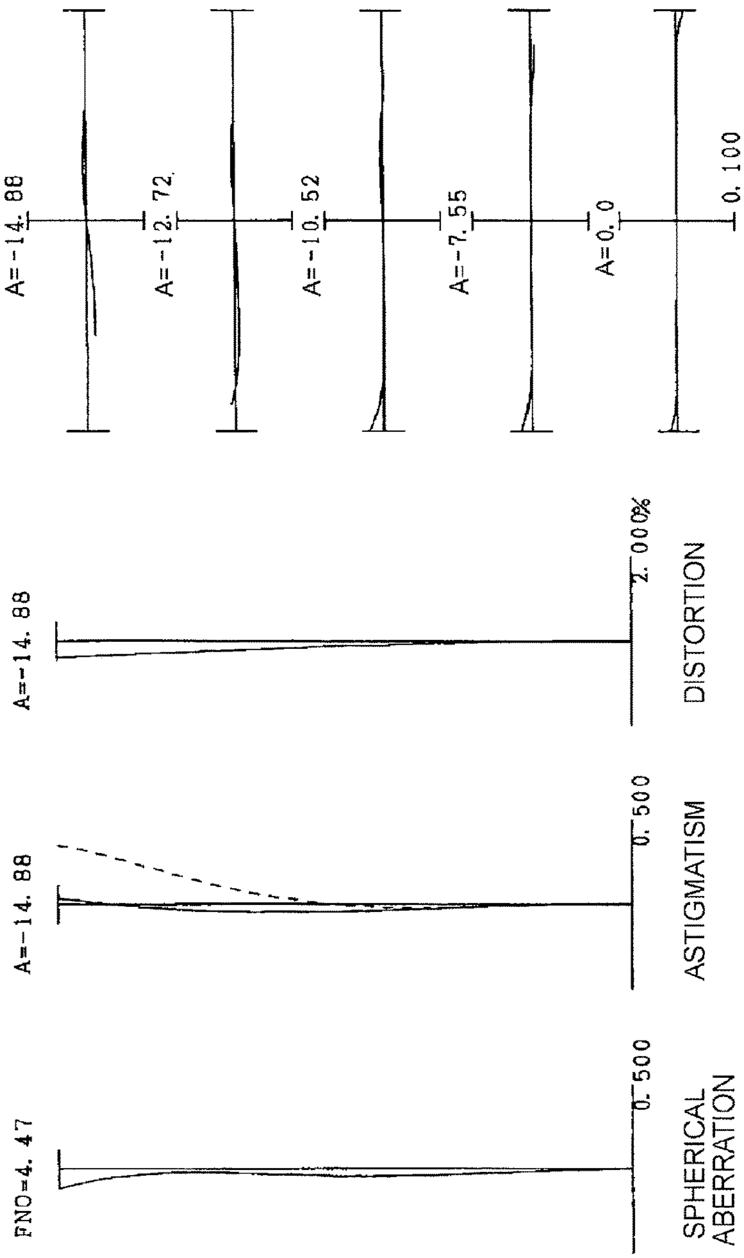
FIG. 36A shows the wide angle end state.
Figure 36B:
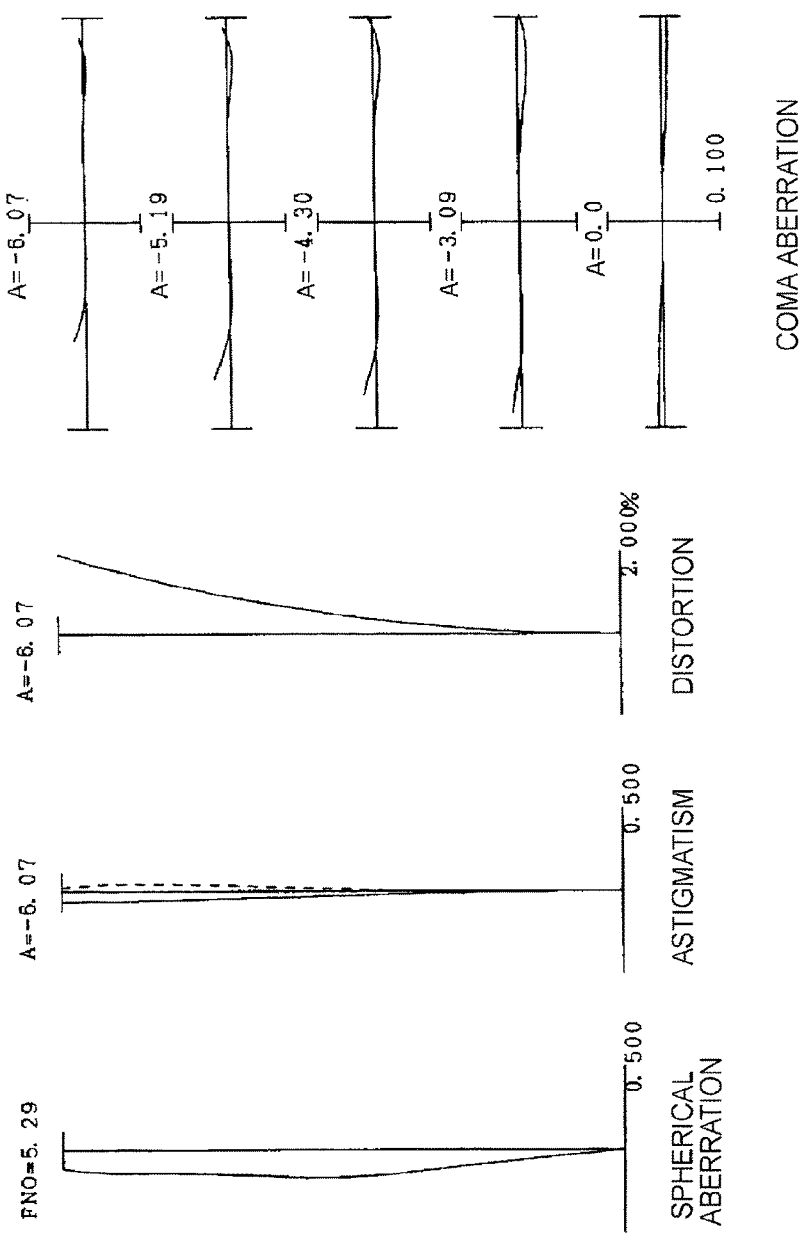
FIG. 36B shows the intermediate focal length state.
Figure 36C:
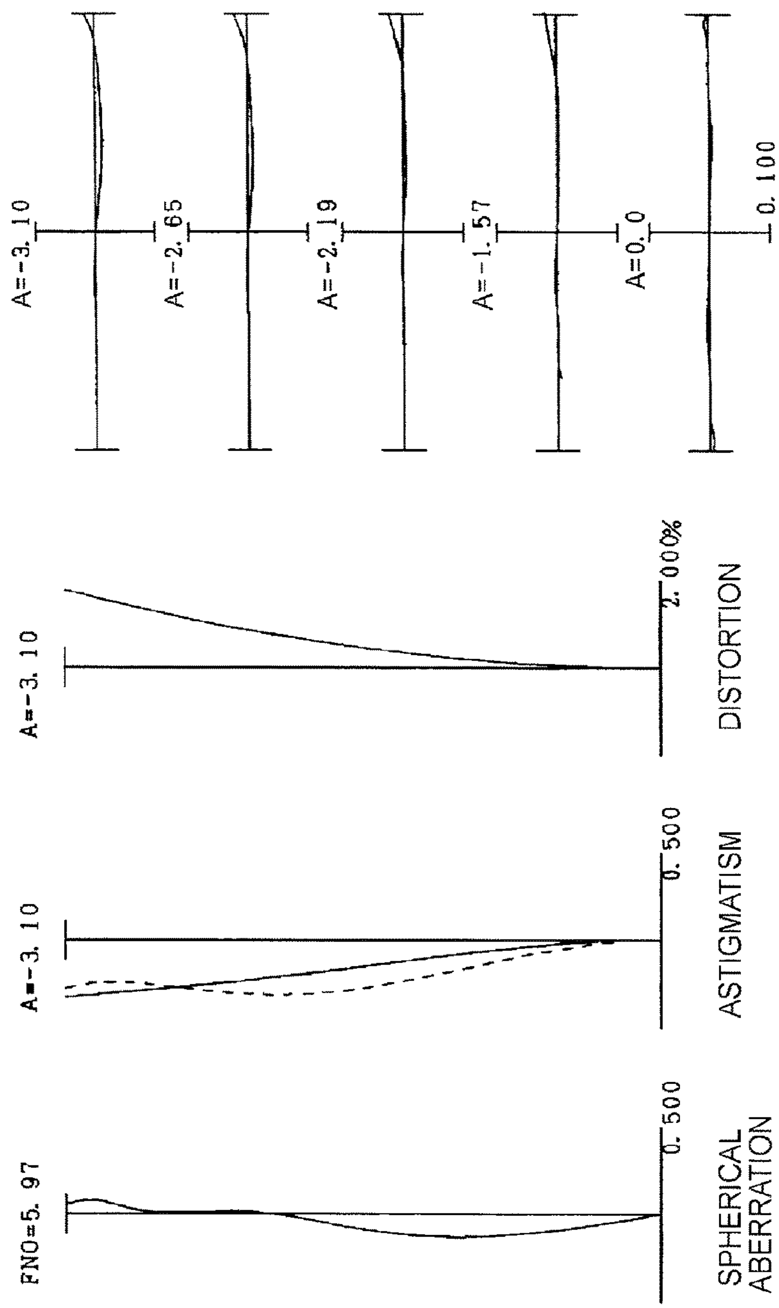
FIG. 36C shows the telephoto end state.
Figure 37A:
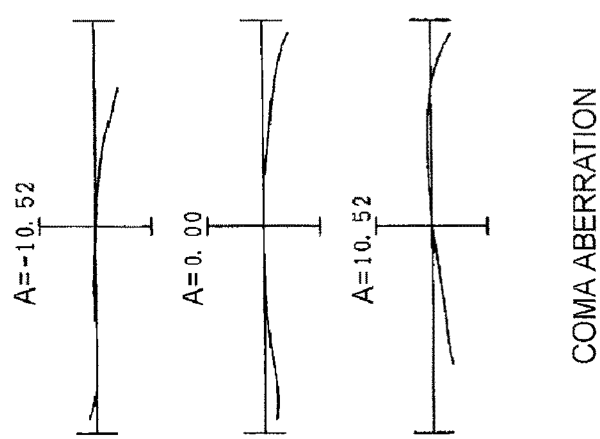
FIG. 37A shows the wide angle end state.
Figure 37B:
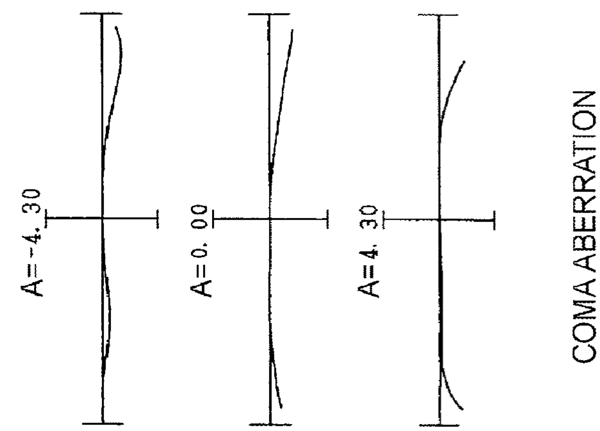
FIG. 37B shows the intermediate focal length state.
Figure 37C:
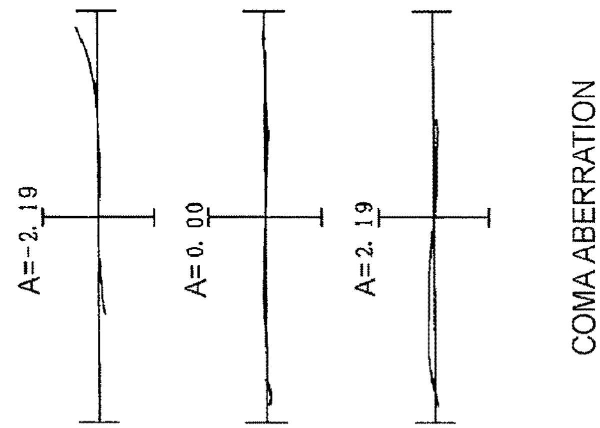
FIG. 37C shows the telephoto end state.
Figure 38A:
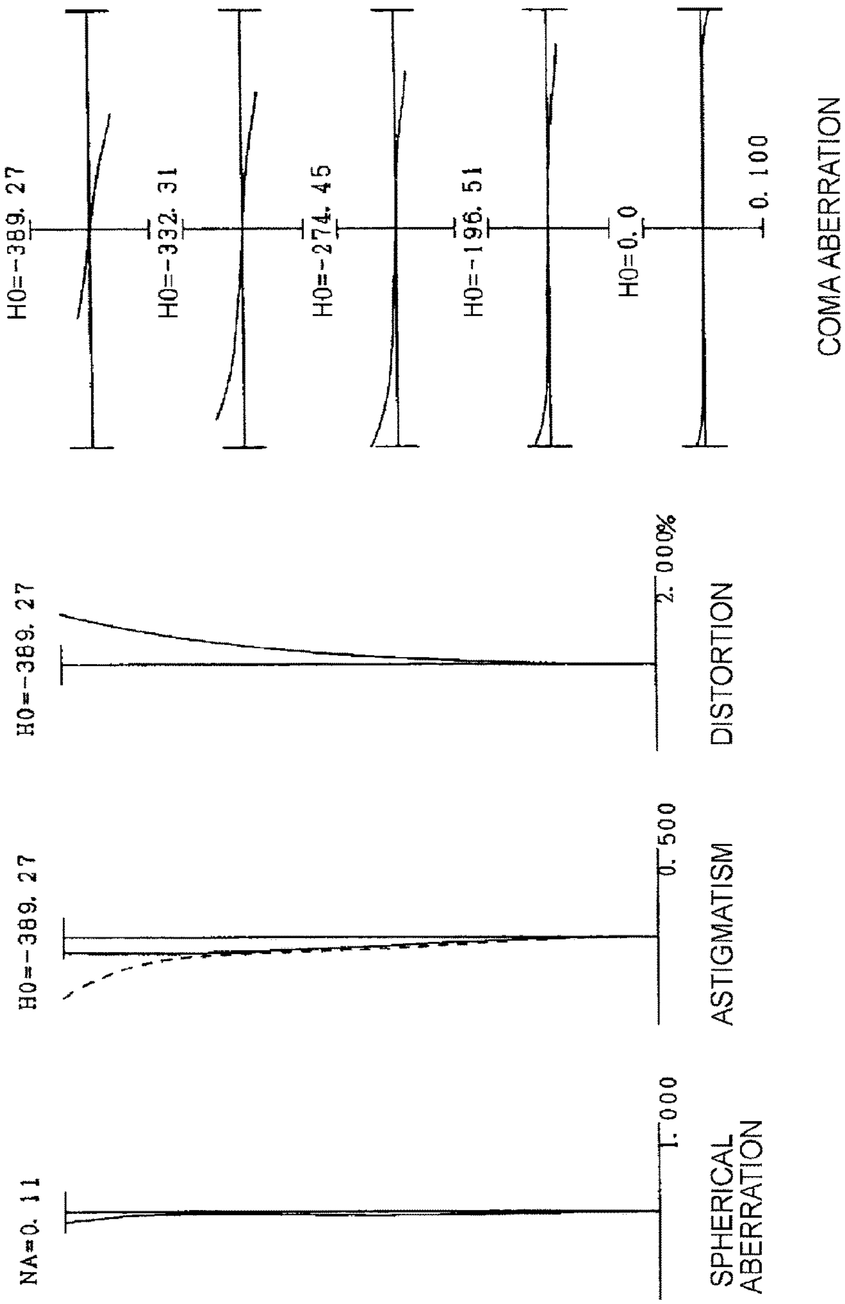
FIG. 38A shows the wide angle end state.
Figure 38B:
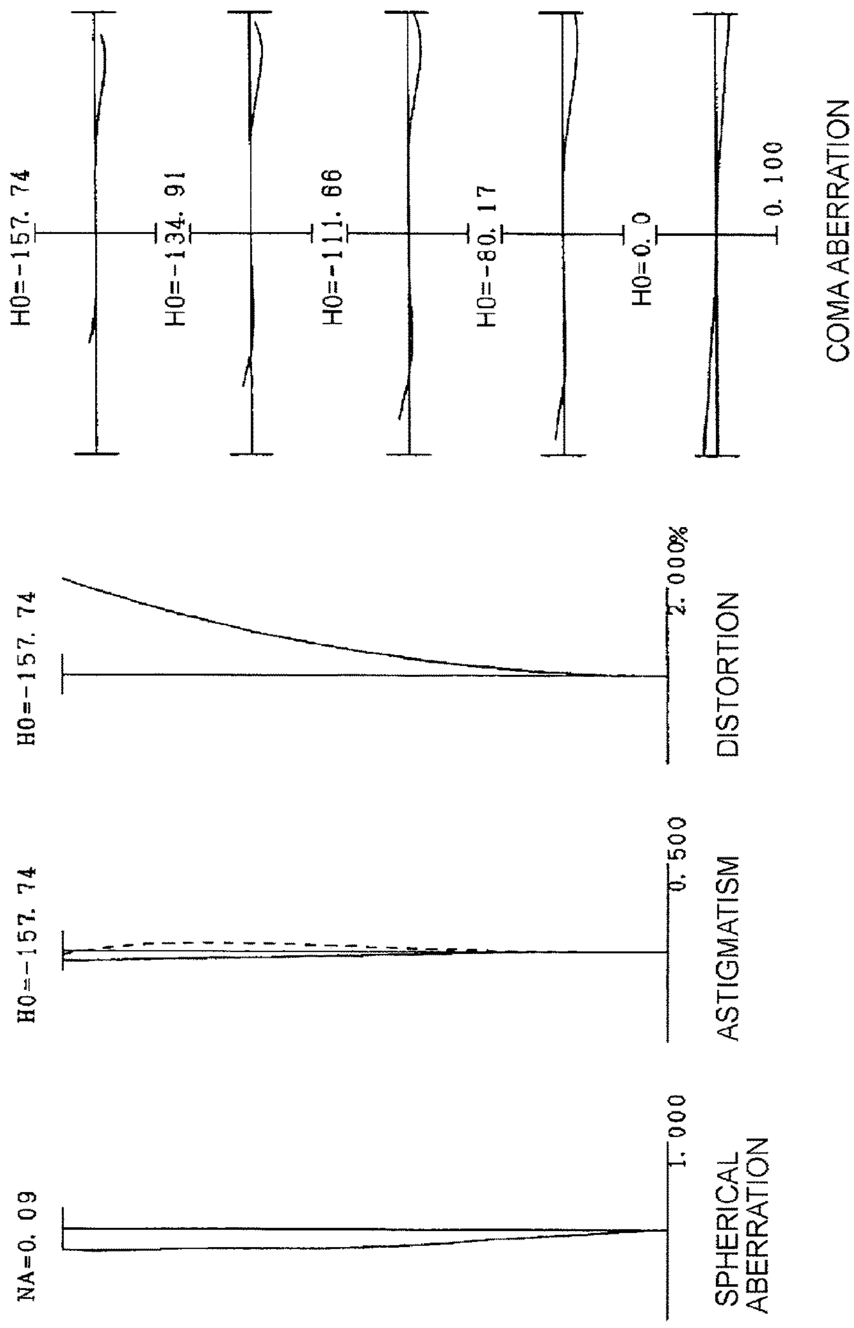
FIG. 38B shows the intermediate focal length state.
Figure 38C:
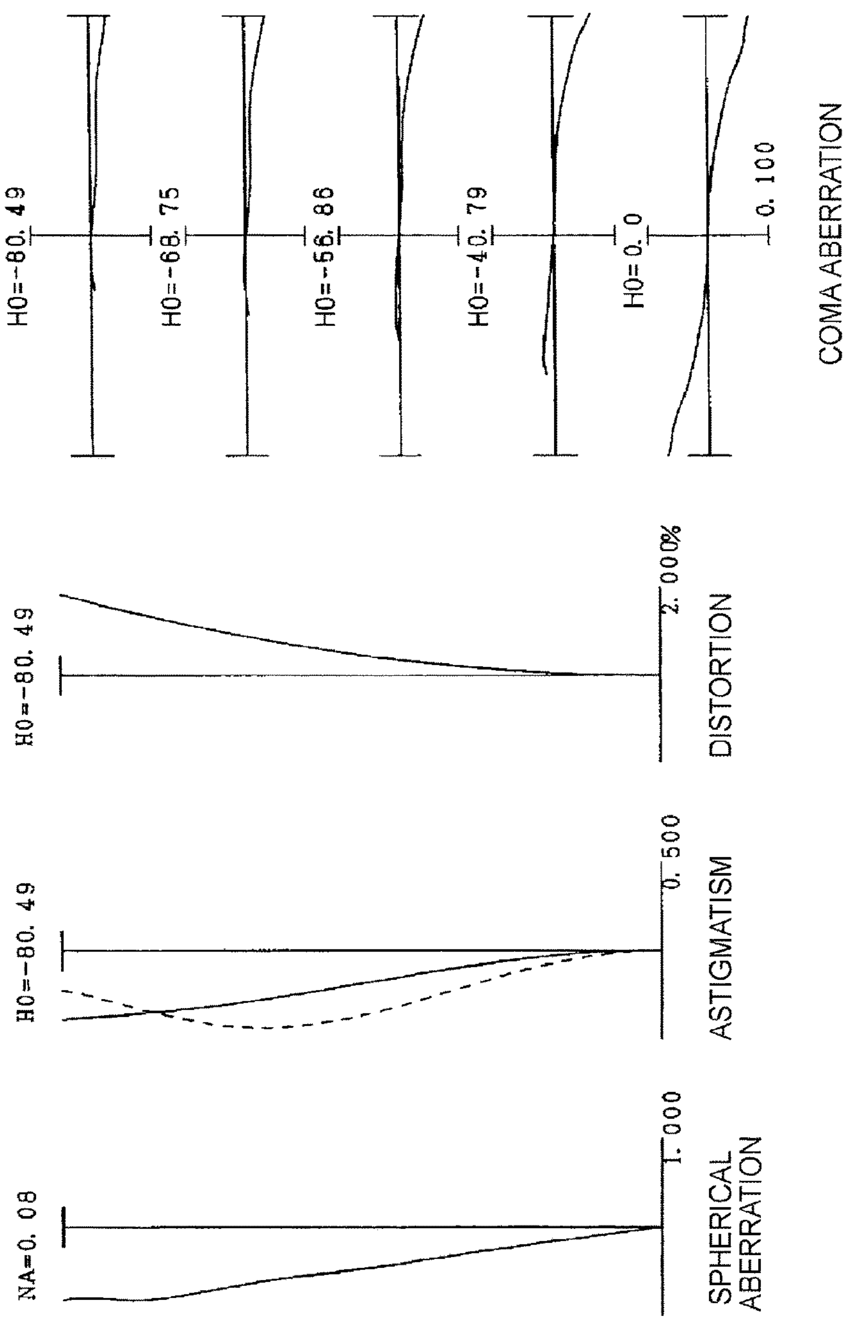
FIG. 38C shows the telephoto end state.

FIGS. 36 to 38 are graphs showing various aberrations of Example 10 at d-line (wavelength: 587.6 nm). In other words, FIG. 36A are graphs showing various aberrations upon focusing on infinity in the wide angle end state (f=81.59 mm), FIG. 36B are graphs showing various aberrations upon focusing on infinity in the intermediate focal length state (f=199.36 mm), and FIG. 36C are graphs showing various aberrations upon focusing on infinity in the telephoto end state (f=392.00 mm). FIG. 37A is a graph showing a coma aberration in the lens shift state (0.4 mm) upon focusing on infinity in the wide angle end state (f=81.59 mm), FIG. 37B is a graph showing a coma aberration in the lens shift state (0.4 mm) upon focusing on infinity in the intermediate focal length state (f=199.36 mm), and FIG. 37C is a graph showing a coma aberration in the lens shift state (0.4 mm) upon focusing on infinity in the telephoto end state (f=392.00 mm). FIG. 38A are graphs showing various aberrations upon close distance focusing (photographic distance: 1.8 m) in the wide angle end state (f=81.59 mm), FIG. 38B are graphs showing various aberrations upon close distance focusing (photographic distance: 1.8 m) in the intermediate focal length state (f=199.36 mm), and FIG. 38C are graphs showing various aberrations upon close distance focusing (photographic distance: 1.8 m) in the telephoto end state (f=392.00 mm).

As each graph showing aberrations indicates, according to Example 10, various aberrations are corrected well in each focal length state, from the wide angle end state to the telephoto end state, implementing excellent image forming performance.

Example 11

Figure 39:
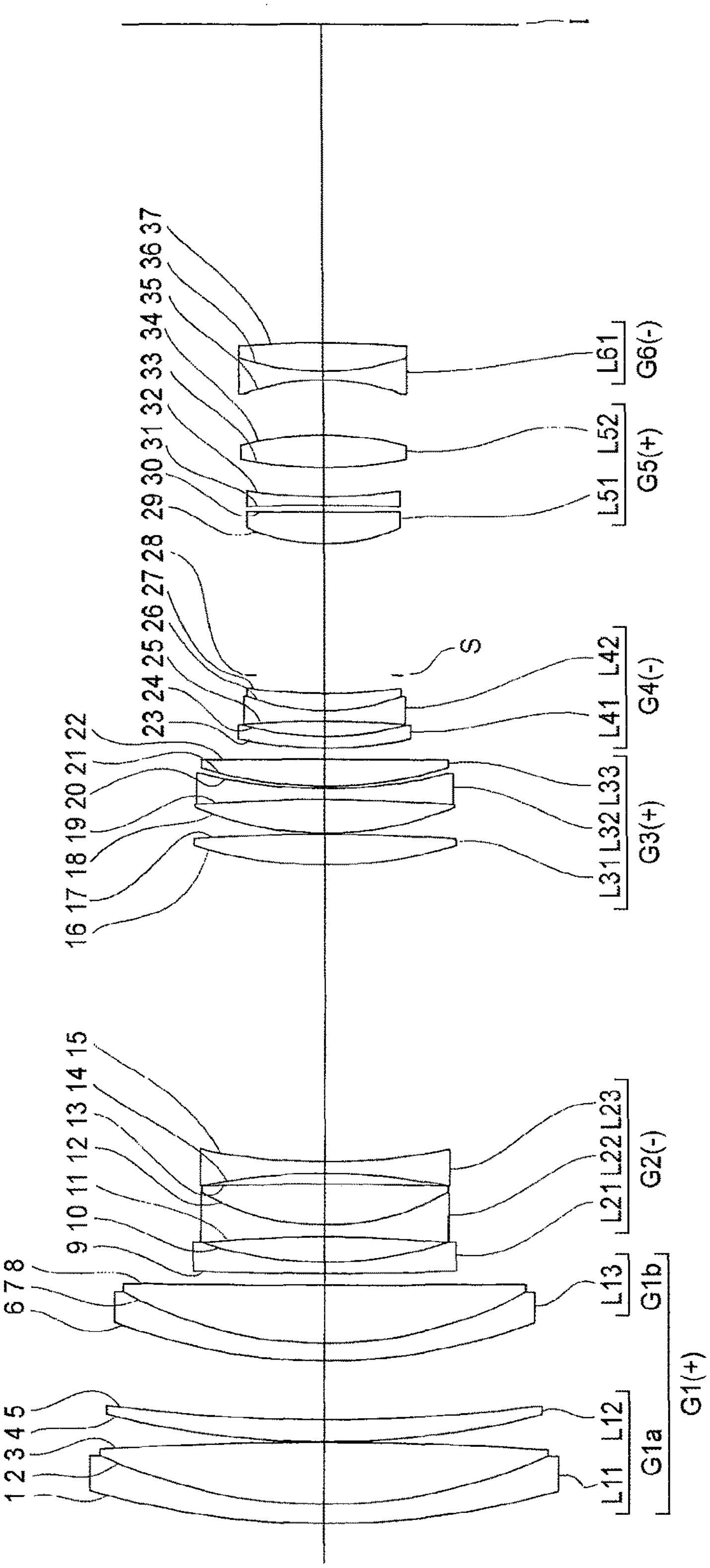
FIG. 39 is a diagram depicting a configuration of a lens system according to Example 11.

Example 11 will now be described with reference to FIG. 39 to FIG. 42 and Table 51 to Table 55. FIG. 39 is a diagram depicting a configuration of a lens system according to Example 11. As FIG. 39 shows, in the lens system according to Example 11, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a biconvex lens L33.

The fourth lens group G4 has, in order from the object, a negative meniscus lens L41 having a convex surface facing the object, and a cemented negative lens L42 in which a biconcave lens and a positive meniscus lens having a convex surface facing the object are cemented. In this example, all or a part of the fourth lens group G4 shift as a shift lens group, so as to have a component in an approximately orthogonal to the optical axis.

The fifth lens group G5 has, in order from the object, a positive meniscus lens L51 having a convex surface facing the object, a biconcave lens L52, and a biconvex lens L53.

The sixth lens group G6 has, in order from the object, a cemented negative lens L61 in which a biconcave lens and a biconvex lens are cemented.

The aperture stop S is disposed between the fourth lens group G4 and the fifth lens group G5, and is fixed with respect to the image plane I upon zooming from the wide angle end state to the telephoto end state.

Parameter values of Example 11 are shown in Table 51.

TABLE 51

[All parameters]

| | Wide-angle end | | intermediate focal length | | telephoto end |
|---|---|---|---|---|---|
| f | 81.59 | ~ | 199.36 | ~ | 392.00 |
| FNO | 4.59 | ~ | 5.61 | ~ | 5.90 |
| 2ω | 29.77 | ~ | 12.13 | ~ | 6.19 |
| Image Height | 21.60 | ~ | 21.60 | ~ | 21.60 |
| Total lens Length | 258.89 | ~ | 258.89 | ~ | 258.89 |

[Lens data]

| Surface Number | r | d | nd | νd |
|---|---|---|---|---|
| 1 | 122.4311 | 3.30 | 1.79952 | 42.24 |
| 2 | 77.4140 | 10.60 | 1.49782 | 82.52 |
| 3 | −539.5955 | 0.10 | | |
| 4 | 126.8126 | 3.70 | 1.49782 | 82.52 |
| 5 | 233.0088 | (d5) | | |
| 6 | 84.8861 | 3.00 | 1.84666 | 23.78 |
| 7 | 60.3167 | 10.00 | 1.58913 | 61.16 |
| 8 | 2560.7553 | (d8) | | |
| 9 | 472.5913 | 2.00 | 1.81600 | 46.62 |
| 10 | 56.1997 | 4.36 | | |
| 11 | −193.0227 | 2.00 | 1.75500 | 52.32 |
| 12 | 35.9906 | 7.04 | 1.80810 | 22.76 |
| 13 | −530.3842 | 1.87 | | |
| 14 | −87.5435 | 2.00 | 1.81600 | 46.62 |
| 15 | 89.2753 | (d15) | | |
| 16 | 65.7140 | 5.27 | 1.72916 | 54.68 |
| 17 | −266.7227 | 0.20 | | |
| 18 | 49.1422 | 5.82 | 1.60300 | 65.44 |
| 19 | −233.9052 | 2.00 | 1.84666 | 23.78 |
| 20 | 75.7754 | 0.40 | | |
| *21 | 59.1575 | 4.57 | 1.59201 | 67.02 |
| 22 | −2322.4950 | (d22) | | |
| 23 | 57.8236 | 2.00 | 1.83400 | 37.16 |
| 24 | 41.8455 | 2.60 | | |
| 25 | −170.2688 | 1.80 | 1.77250 | 49.60 |
| 26 | 29.0742 | 3.05 | 1.84666 | 23.78 |
| 27 | 74.4580 | 3.30 | | |
| 28 | 0.0000 | (d28) | (aperture stop S) | |
| 29 | 27.5941 | 5.56 | 1.48749 | 70.23 |
| 30 | 777.9248 | 1.11 | | |
| 31 | −405.8904 | 1.50 | 1.84666 | 23.78 |
| 32 | 67.1692 | 5.10 | | |
| *33 | 54.0531 | 5.56 | 1.59201 | 67.02 |
| 34 | −51.4056 | (d34) | | |
| 35 | −33.4861 | 1.50 | 1.81600 | 46.62 |
| 36 | 35.9355 | 4.90 | 1.78472 | 25.68 |
| 37 | −185.1792 | (Bf) | | |

[Each group focal length data]

| Group | First surface | Focal length |
|---|---|---|
| G1 | 1 | 96.4408 |
| G2 | 9 | −28.4070 |
| G3 | 16 | 42.0108 |
| G4 | 23 | −53.3548 |
| G5 | 29 | 43.2894 |
| G6 | 35 | −48.4510 |

In Example 11, the twenty first and thirty third lens surfaces are aspherical. Table 52 shows the [Aspherical data].

TABLE 52

| [Aspherical data] | | | | | |
|---|---|---|---|---|---|
| R | κ | $C_4$ | $C_6$ | $C_8$ | $C_{10}$ |
| Twenty first surface | | | | | |
| 59.1575 | +5.1063 | $-3.5087 \times 10^{-6}$ | $-3.5087 \times 10^{-6}$ | $-3.3186 \times 10^{-9}$ | $+1.9541 \times 10^{-12}$ |
| Thirty third surface | | | | | |
| 54.0531 | +7.8072 | $-1.1372 \times 10^{-5}$ | $-1.3002 \times 10^{-8}$ | $-1.3002 \times 10^{-8}$ | $+1.1857 \times 10^{-11}$ |

In Example 11, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d34 between the fifth lens group G5 and the sixth lens group G6, and the back focus Bf, change upon zooming. Table 53 shows the [Variable distance data].

TABLE 53

| [Variable distance data] | | | |
|---|---|---|---|
| | Wide-angle end | intermediate focal length | telephoto end |
| d5 | 10.2449 | 10.2449 | 10.2449 |
| d8 | 2.0000 | 14.4836 | 20.8984 |
| d15 | 51.2074 | 24.5569 | 2.0000 |
| d22 | 2.0000 | 16.1668 | 32.3090 |
| d28 | 22.6985 | 10.0915 | 2.0000 |
| d34 | 9.5237 | 3.4816 | 1.6163 |
| Bf | 54.9999 | 73.6490 | 83.6053 |

Table 54 shows the [Focusing lens group shift distance] in Example 11.

TABLE 54

| [Focusing lens group shift distance] | | | |
|---|---|---|---|
| | Wide-angle end | intermediate focal length | telephoto end |
| f | 81.5936 | 199.3605 | 392.0030 |
| Δ1b | 8.2449 | 8.2449 | 8.2449 |

Table 55 shows the [Conditional expression correspondence value] in Example 11.

TABLE 55

| [Conditional expression correspondence value] |
|---|
| ft = 392.0030 |
| f1b = 179.9971 |
| f2 = −28.4070 |
| fb = −53.3548 |
| fc = 43.2894 |
| TL = 258.8948 |
| (5) (−f2)/fc = 0.6562 |
| (6) (−f2)/(−fb) = 0.5324 |
| (7) ft/f1b = 2.1778 |
| (8) TL/f1b = 1.4383 |

Figure 40A:
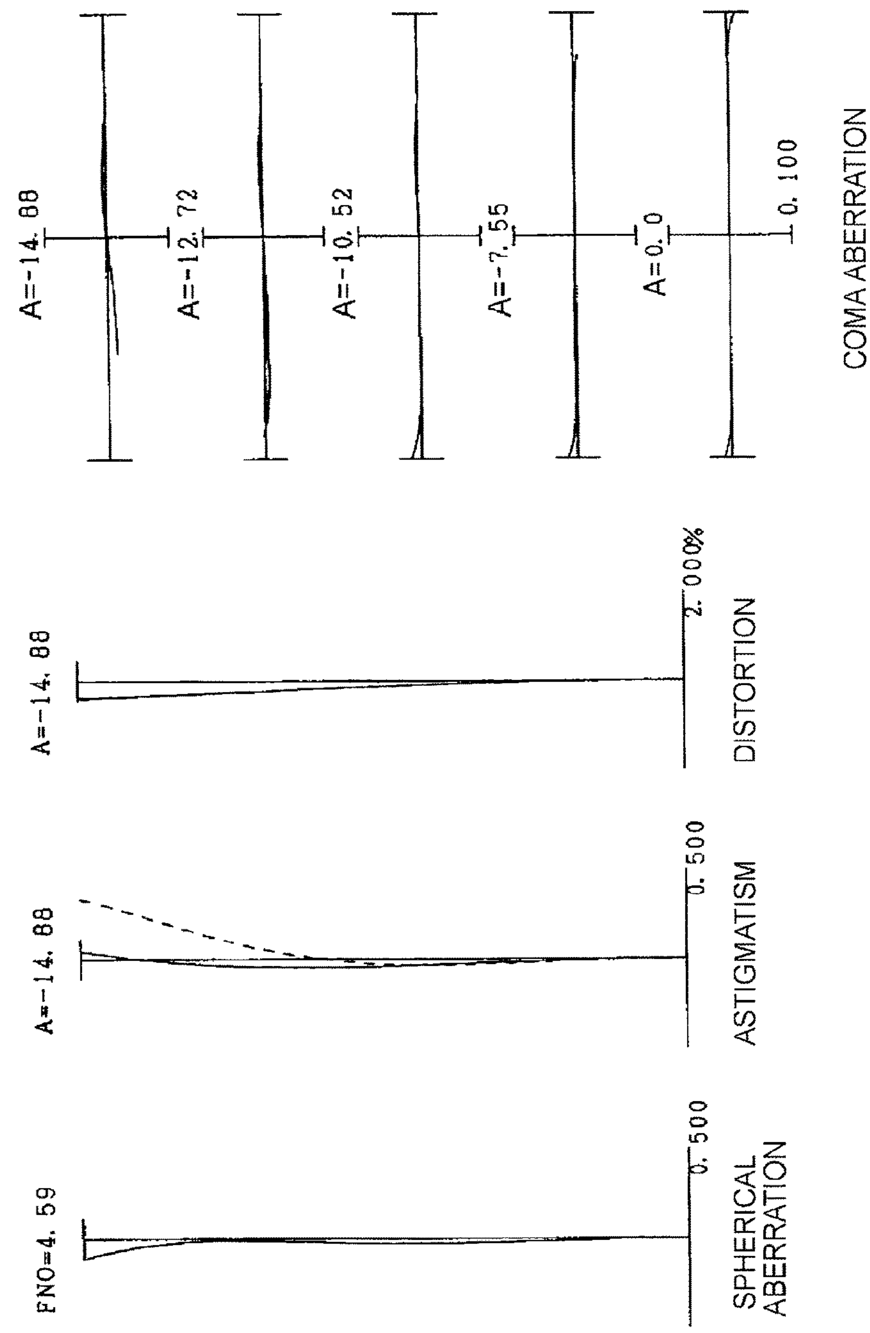
FIG. 40A shows the wide angle end state.
Figure 40B:
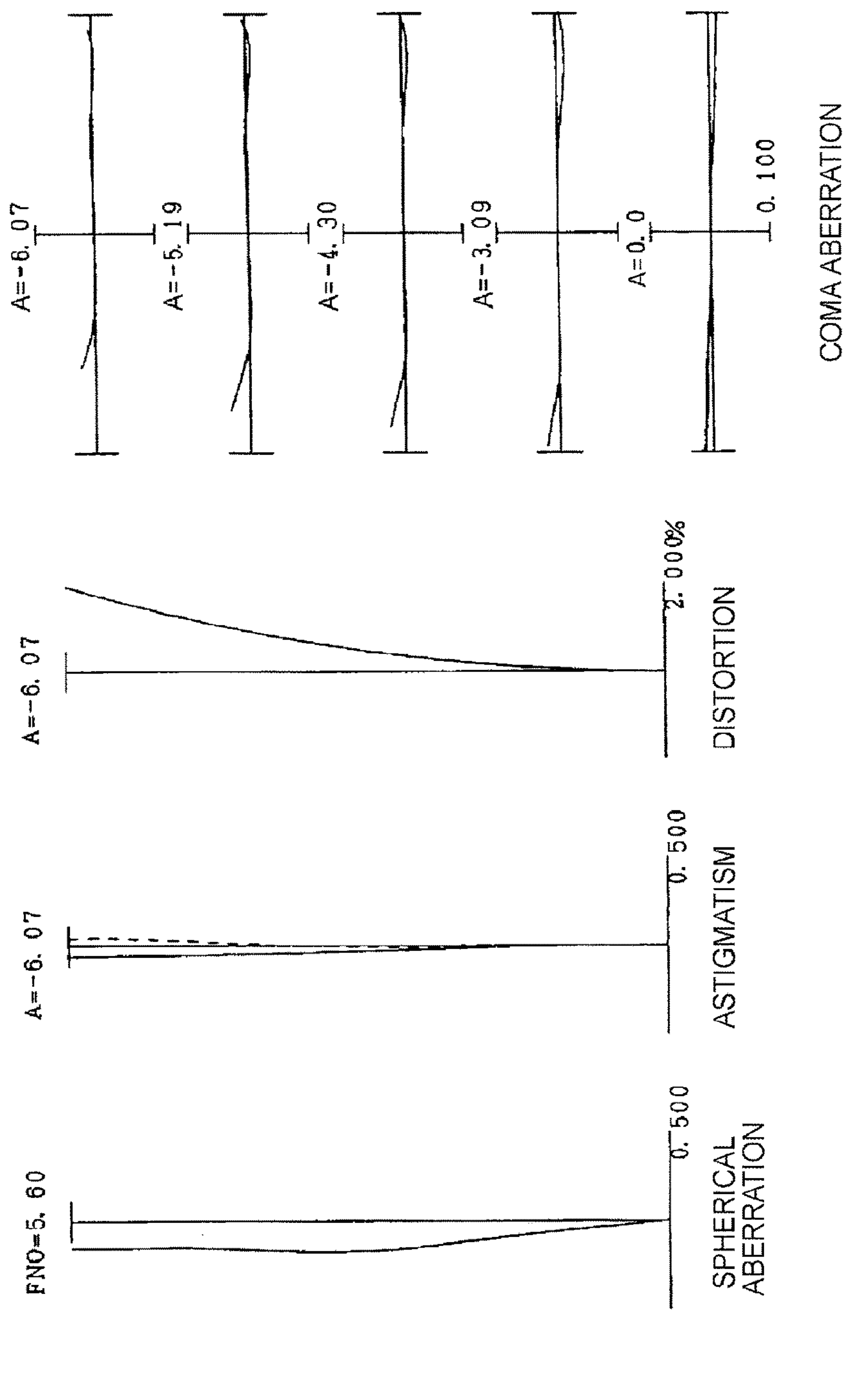
FIG. 40B shows the intermediate focal length state.
Figure 40C:
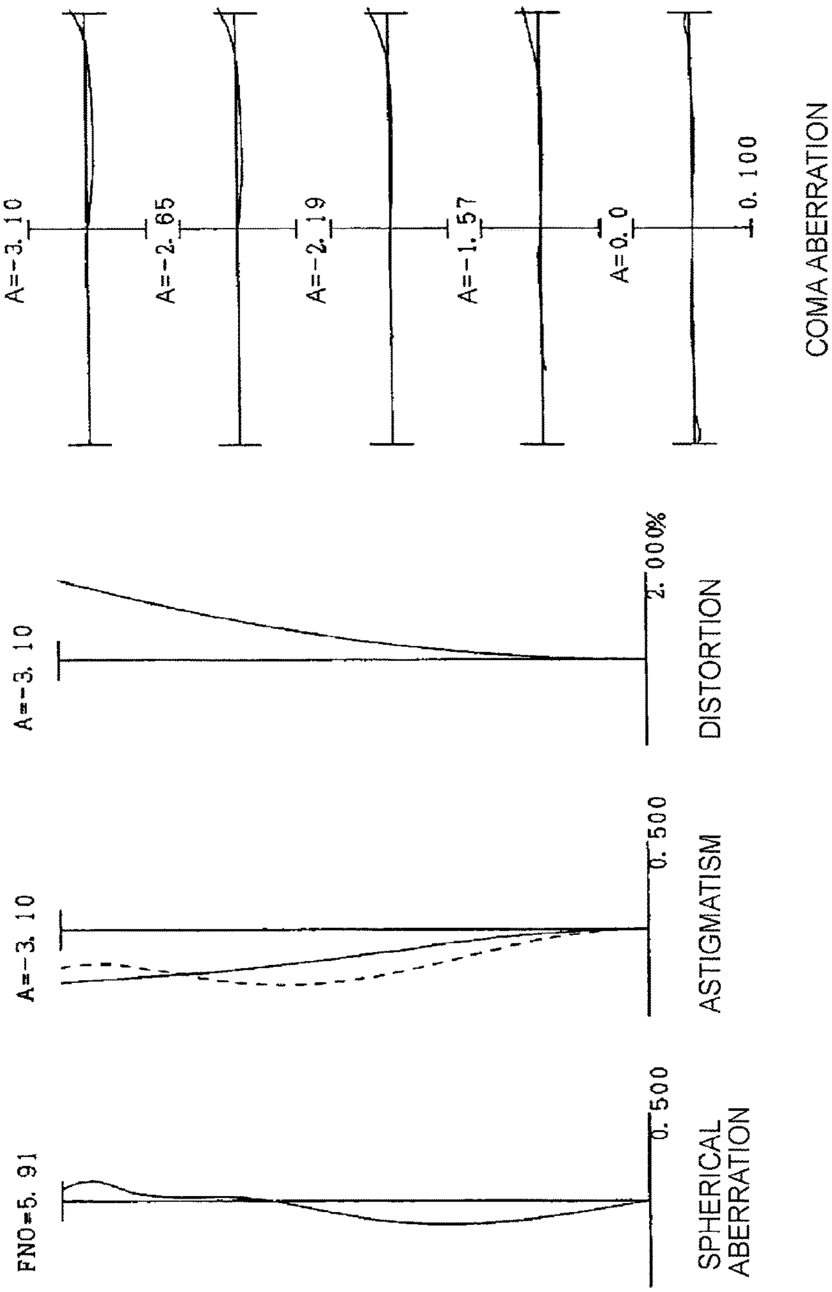
FIG. 40C shows the telephoto end state.
Figure 41A:
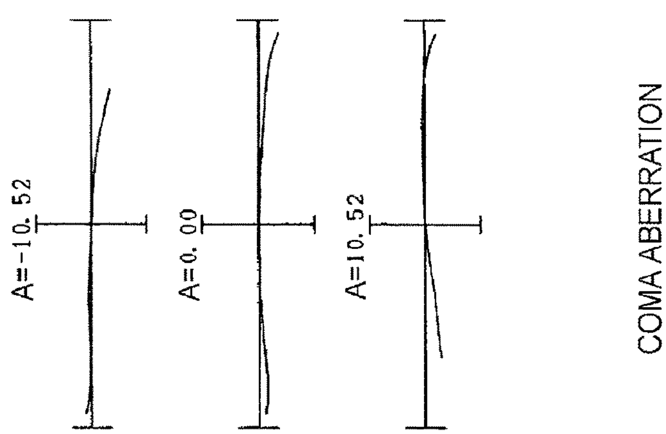
FIG. 41A shows the wide angle end state.
Figure 41B:
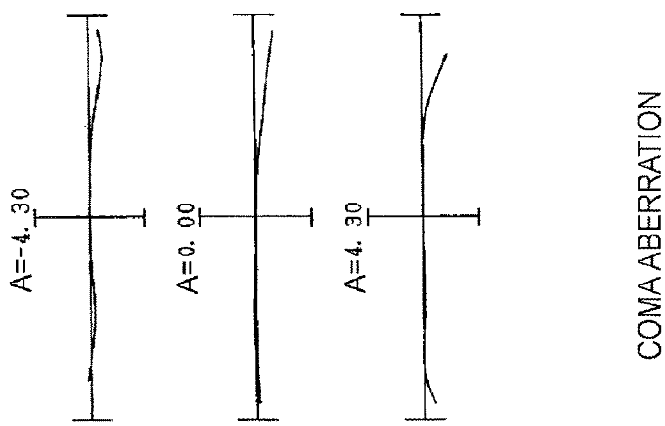
FIG. 41B shows the intermediate focal length state.
Figure 41C:
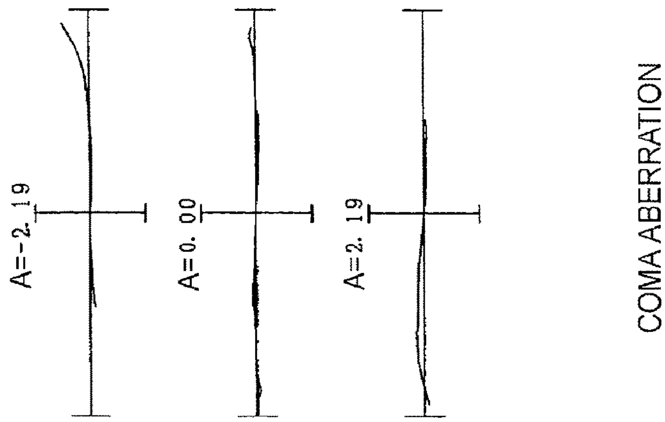
FIG. 41C shows the telephoto end state.
Figure 42A:
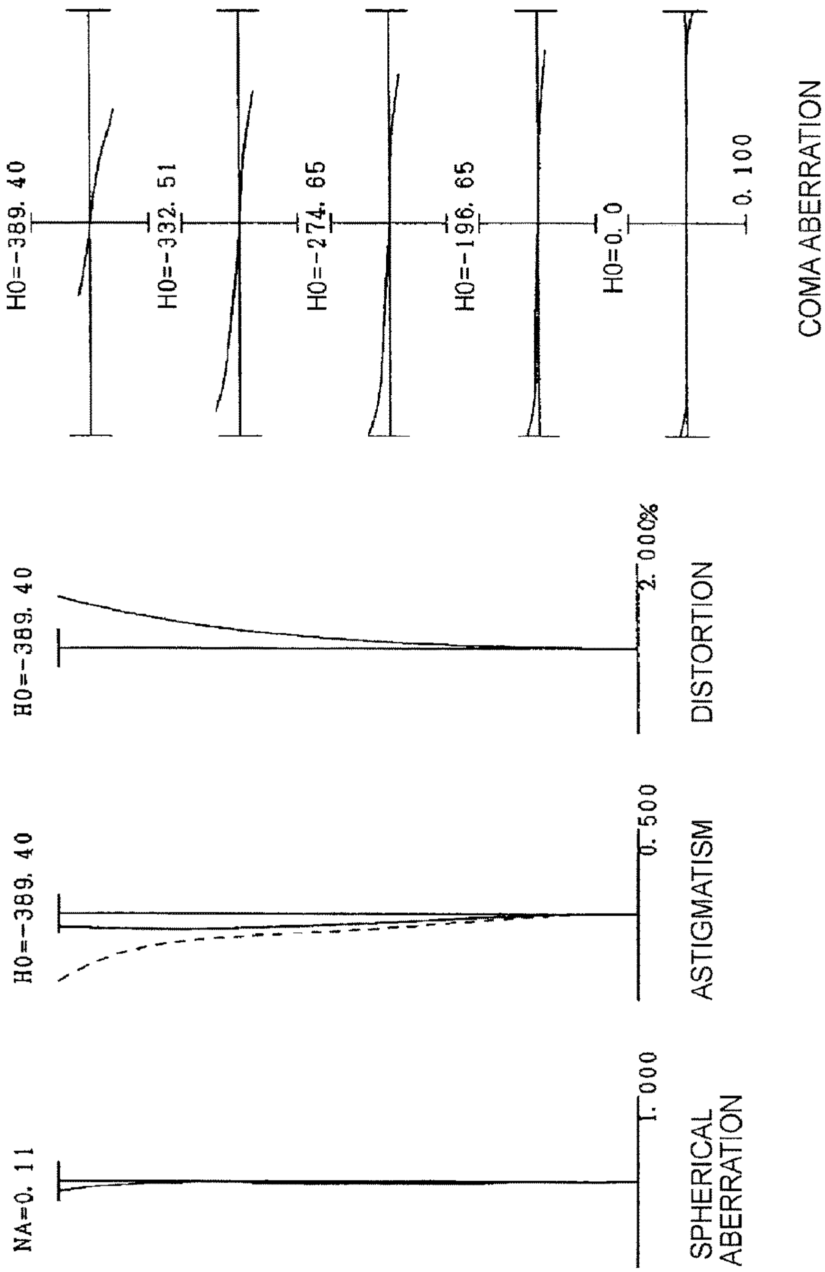
FIG. 42A shows the wide angle end state.
Figure 42B:
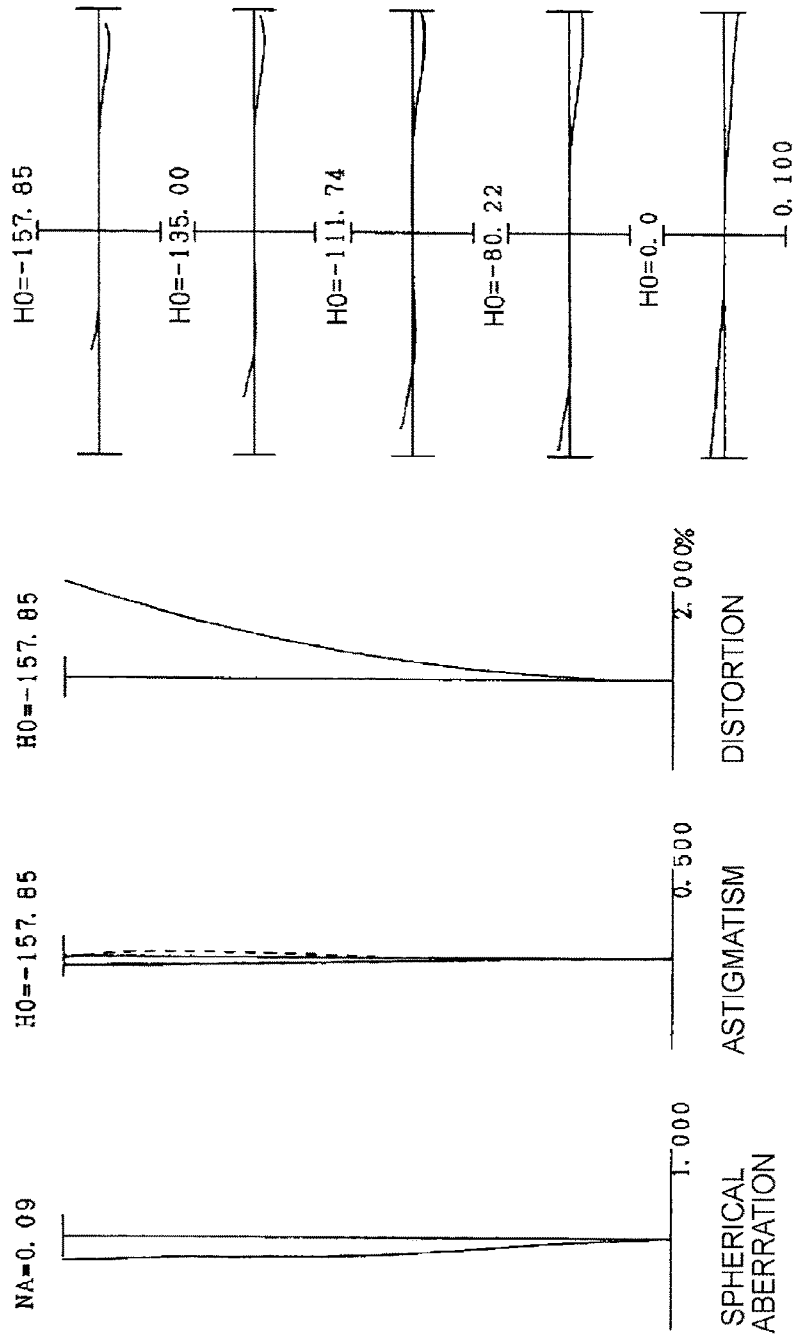
FIG. 42B shows the intermediate focal length state.
Figure 42C:
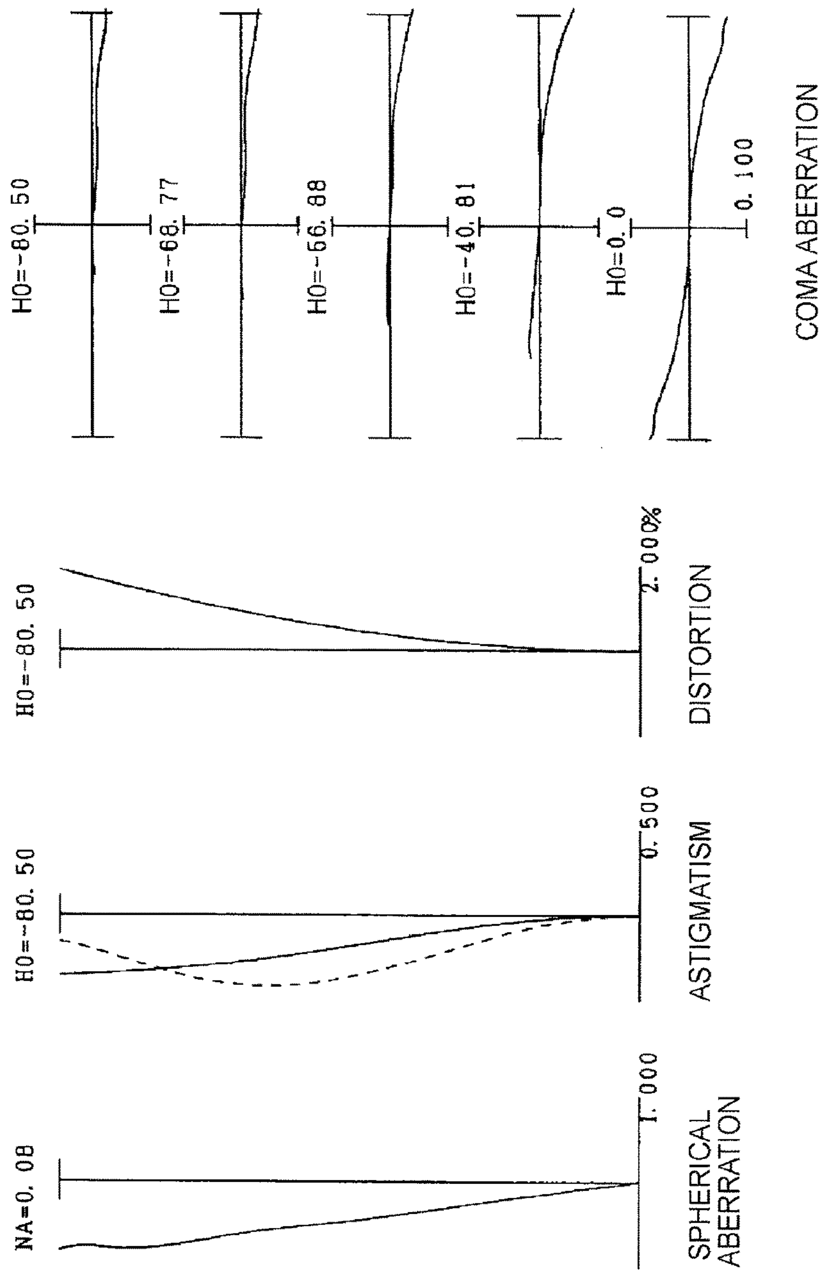
FIG. 42C shows the telephoto end state.

FIGS. 40 to 42 are graphs showing various aberrations of Example 11 at d-line (wavelength: 587.6 nm). In other words, FIG. 40A are graphs showing various aberrations upon focusing on infinity in the wide angle end state (f=81.59 mm), FIG. 40B are graphs showing various aberrations upon focusing on infinity in the intermediate focal length state (f=199.36 mm), and FIG. 40C are graphs showing various aberrations upon focusing on infinity in the telephoto end state (f=392.00 mm). FIG. 41A is a graph showing a coma aberration in the lens shift state (0.4 mm) upon focusing on infinity in the wide angle end state (f=81.59 mm), FIG. 41B is a graph showing a coma aberration in the lens shift state (0.4 mm) upon focusing on infinity in the intermediate focal length state (f=199.36 mm), and FIG. 41C is a graph showing a coma aberration in the lens shift state (0.4 mm) upon focusing on infinity in the telephoto end state (f=392.00 mm). FIG. 42A are graphs showing various aberrations upon close distance focusing (photographic distance: 1.8 m) in the wide angle end state (f=81.59 mm), FIG. 42B are graphs showing various aberrations upon close distance focusing (photographic distance: 1.8 m) in the intermediate focal length state (f=199.36 mm), and FIG. 42C are graphs showing various aberrations upon close distance focusing (photographic distance: 1.8 m) in the telephoto end state (f=392.00 mm).

As each graph showing aberrations indicates, according to Example 11, various aberrations are corrected well in each focal length state, from the wide angle end state to the telephoto end state, implementing excellent image forming performance.

Example 12

Figure 43:
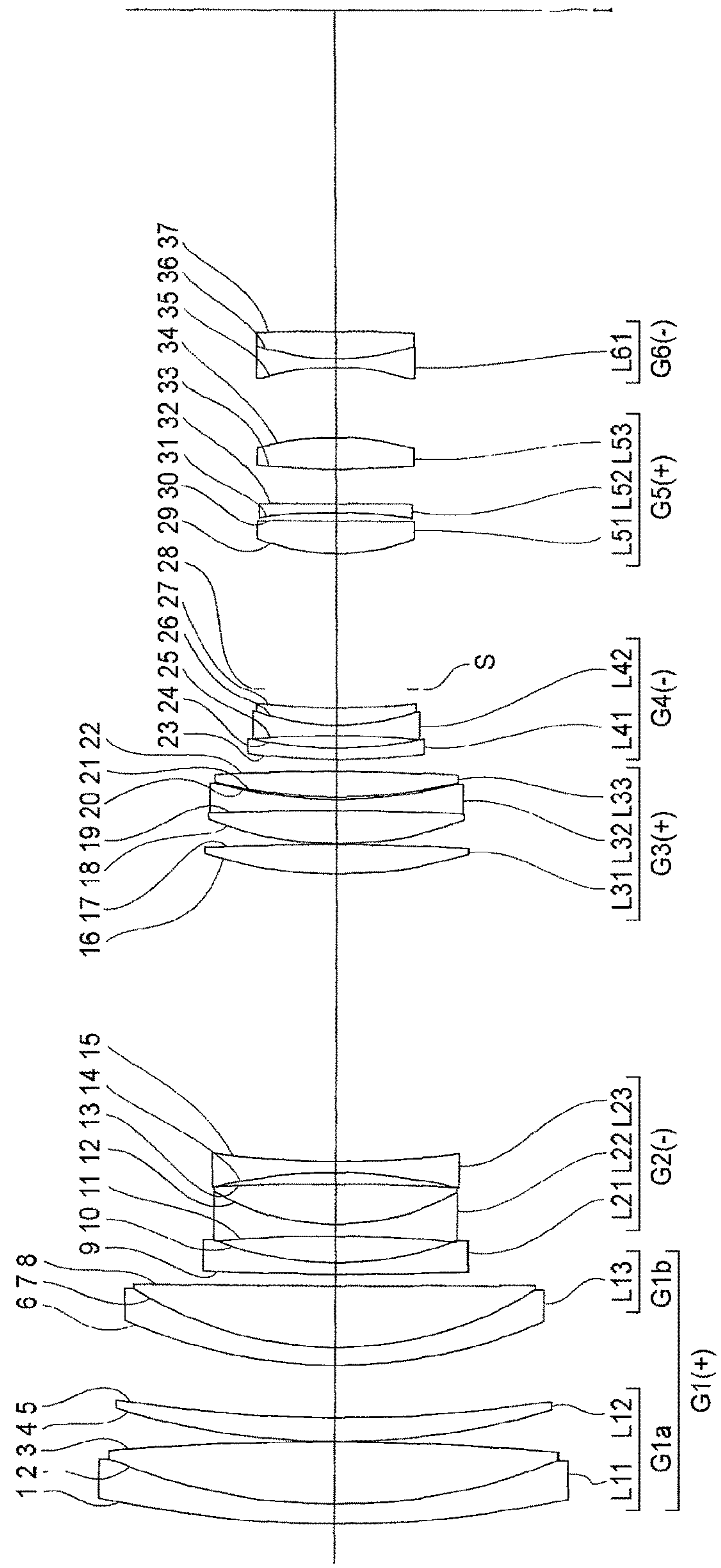
FIG. 43 is a diagram depicting a configuration of a lens system according to Example 12.

Example 12 will now be described with reference to FIG. 43 to FIG. 46 and Table 56 to Table 60. FIG. 43 is a diagram depicting a configuration of a lens system according to Example 12. As FIG. 43 shows, in the lens system according to Example 12, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a biconvex lens L33.

The fourth lens group G4 has, in order from the object, a negative meniscus lens L41 having a convex surface facing the object, and a cemented negative lens L42 in which a biconcave lens and a positive meniscus lens having a convex surface facing the object are cemented. In this example, all or a part of the fourth lens group G4 shift as a shift lens group, so as to have a component in an approximately orthogonal to the optical axis.

The fifth lens group G5 has, in order from the object, a biconvex lens L51, a negative meniscus lens L52 having a convex surface facing the image, and a biconvex lens L53.

The sixth lens group G6 has, in order from the object, a cemented negative lens L61 in which a biconcave lens and a biconvex lens are cemented.

The aperture stop S is disposed between the fourth lens group G4 and the fifth lens group G5, and is fixed with respect to the image plane I upon zooming from the wide angle end state to the telephoto end state.

Parameter values of Example 12 are shown in Table 56.

TABLE 56

[All parameters]

| | Wide-angle end | | intermediate focal length | | telephoto end |
|---|---|---|---|---|---|
| f | 81.59 | ~ | 200.00 | ~ | 392.00 |
| FNO | 4.59 | ~ | 5.80 | ~ | 6.02 |
| 2ω | 29.75 | ~ | 12.08 | ~ | 6.19 |
| Image Height | 21.60 | ~ | 21.60 | ~ | 21.60 |
| Total lens Length | 259.00 | ~ | 259.00 | ~ | 259.00 |

[Lens data]

| Surface Number | r | d | nd | νd |
|---|---|---|---|---|
| 1 | 157.3816 | 3.30 | 1.79952 | 42.24 |
| 2 | 84.5029 | 10.50 | 1.49782 | 82.52 |
| 3 | −400.0243 | 0.10 | | |
| 4 | 109.4238 | 4.00 | 1.49782 | 82.52 |
| 5 | 201.1329 | (d5) | | |
| 6 | 75.0577 | 3.00 | 1.84666 | 23.78 |
| 7 | 54.2010 | 10.50 | 1.58913 | 61.16 |
| 8 | 2984.3552 | (d8) | | |
| 9 | 533.6900 | 2.00 | 1.81600 | 46.62 |
| 10 | 49.9474 | 4.50 | | |
| 11 | −184.3948 | 2.00 | 1.75500 | 52.32 |
| 12 | 35.1698 | 6.80 | 1.80810 | 22.76 |
| 13 | −356.9356 | 1.95 | | |
| 14 | −73.9121 | 2.00 | 1.81600 | 46.62 |
| 15 | 144.9031 | (d15) | | |
| 16 | 62.1563 | 5.02 | 1.72916 | 54.68 |
| 17 | −386.4902 | 0.20 | | |
| 18 | 49.9745 | 5.66 | 1.60300 | 65.44 |
| 19 | −362.7248 | 2.00 | 1.84666 | 23.78 |
| 20 | 68.0406 | 0.40 | | |
| *21 | 68.1766 | 4.43 | 1.59201 | 67.02 |
| 22 | −290.1053 | (d22) | | |
| 23 | 94.2996 | 2.00 | 1.81600 | 46.62 |
| 24 | 56.8700 | 2.11 | | |
| 25 | −152.8690 | 1.80 | 1.77250 | 49.60 |
| 26 | 33.8096 | 2.94 | 1.84666 | 23.78 |
| 27 | 89.5000 | 3.30 | | |
| 28 | 0.0000 | (d28) | (aperture stop S) | |
| 29 | 30.7985 | 5.59 | 1.49700 | 81.54 |
| 30 | −1866.1065 | 1.50 | | |
| 31 | −83.0064 | 1.50 | 1.84666 | 23.78 |
| 32 | 1498.2397 | 5.93 | | |
| *33 | 94.2945 | 5.40 | 1.59201 | 67.02 |
| 34 | −44.4597 | (d34) | | |
| 35 | −35.9775 | 1.50 | 1.81600 | 46.62 |
| 36 | 34.6595 | 4.65 | 1.76182 | 26.52 |
| 37 | −333.2838 | (Bf) | | |

[Each group focal length data]

| Group | First surface | Focal length |
|---|---|---|
| G1 | 1 | 92.7571 |
| G2 | 9 | −28.7665 |
| G3 | 16 | 43.5730 |
| G4 | 23 | −55.2171 |
| G5 | 29 | 43.3727 |
| G6 | 35 | −45.8752 |

In Example 12, the twenty first and thirty third lens surfaces are aspherical. Table 57 shows the [Aspherical data].

TABLE 57

[Aspherical data]

| R | κ | $C_4$ | $C_6$ | $C_8$ | $C_{10}$ |
|---|---|---|---|---|---|
| Twenty first surface | | | | | |
| 68.1766 | +6.4289 | $-3.5300 \times 10^{-6}$ | $-2.4444 \times 10^{-9}$ | $+1.4025 \times 10^{-13}$ | $-5.1737 \times 10^{-15}$ |
| Thirty third surface | | | | | |
| 94.2945 | +3.6771 | $-6.3530 \times 10^{-6}$ | $-2.3874 \times 10^{-9}$ | $+8.1294 \times 10^{-12}$ | $-2.0403 \times 10^{-14}$ |

In Example 12, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d34 between the fifth lens group G5 and the sixth lens group G6, and the back focus Bf, change upon zooming. Table 58 shows the [Variable distance data].

TABLE 58

| [Variable distance data] | | | |
|---|---|---|---|
| | Wide-angle end | intermediate focal length | telephoto end |
| d5 | 9.0611 | 9.0611 | 9.0611 |
| d8 | 2.0000 | 15.6658 | 22.0846 |
| d15 | 49.0479 | 23.2194 | 2.0000 |
| d22 | 2.0000 | 14.1624 | 28.9641 |
| d28 | 23.2684 | 10.6609 | 2.0000 |
| d34 | 12.0408 | 7.0601 | 2.0000 |
| Bf | 55.0001 | 72.5884 | 86.3084 |

Table 59 shows the [Focusing lens group shift distance] in Example 12.

TABLE 59

| [Focusing lens group shift distance] | | | |
|---|---|---|---|
| | Wide-angle end | intermediate focal length | telephoto end |
| f | 81.5937 | 199.9999 | 392.0039 |
| Δ1b | 7.0610 | 7.0610 | 7.0610 |

Table 60 shows the [Conditional expression correspondence value] in Example 12.

TABLE 60

| [Conditional expression correspondence value] |
|---|
| ft = 392.0039 |
| f1b = 155.5055 |
| f2 = −28.7665 |
| fb = −55.2171 |
| fc = 43.3727 |
| TL = 259.0000 |
| (5) (−f2)/fc = 0.6632 |
| (6) (−f2)/(−fb) = 0.5210 |
| (7) ft/f1b = 2.5208 |
| (8) TL/f1b = 1.6655 |

Figure 44A:
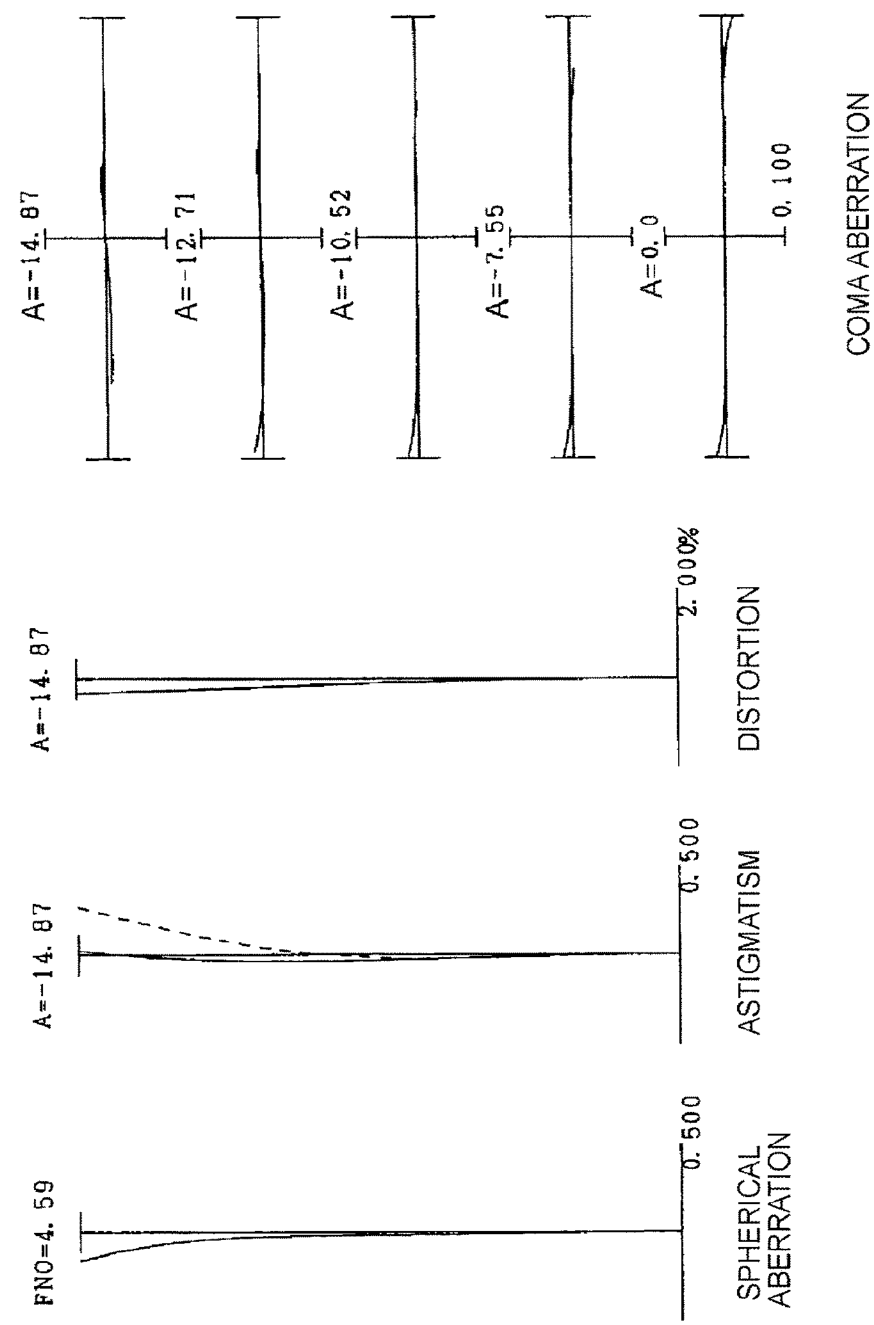
FIG. 44A shows the wide angle end state.
Figure 44B:
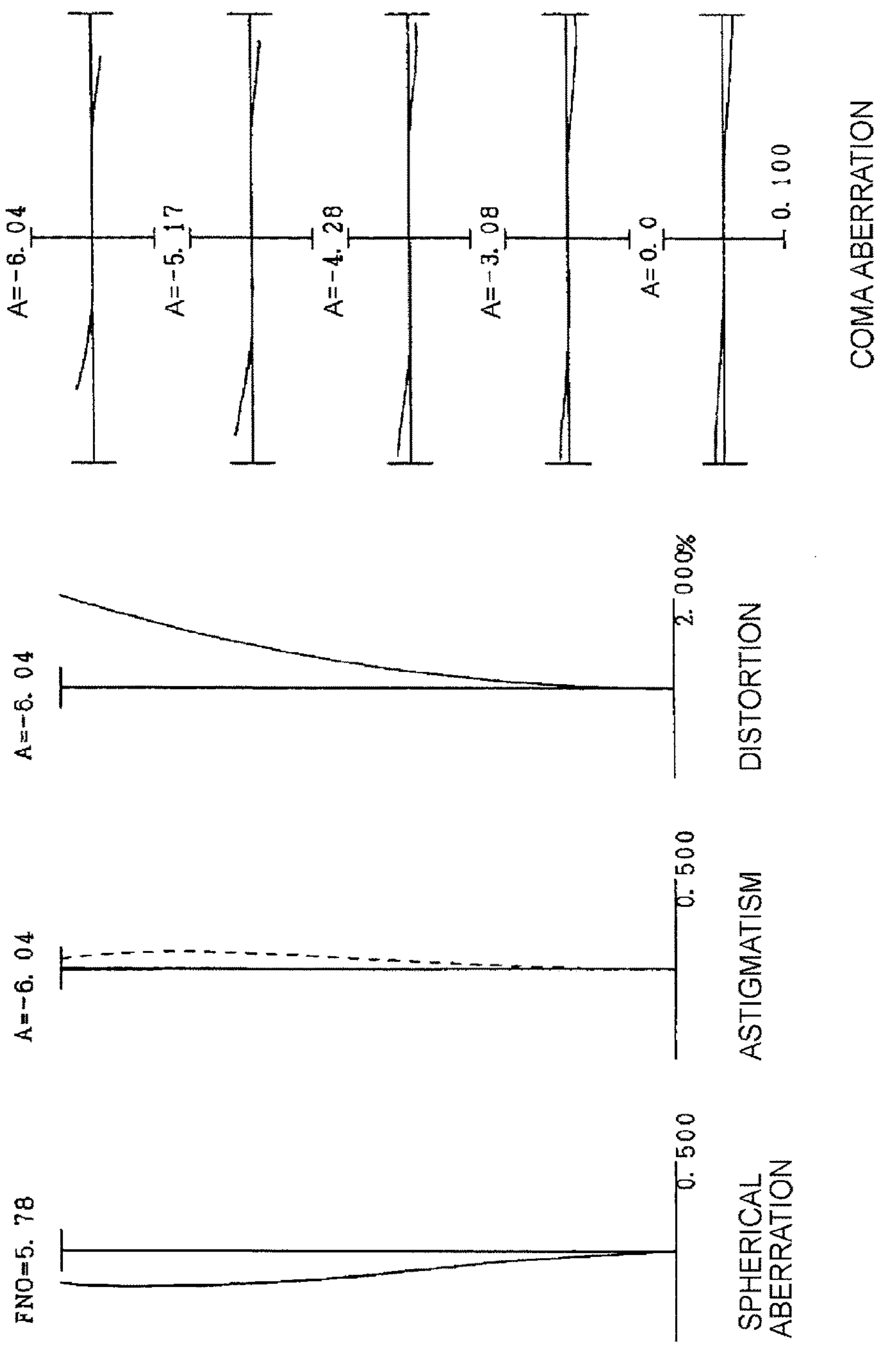
FIG. 44B shows the intermediate focal length state.
Figure 44C:
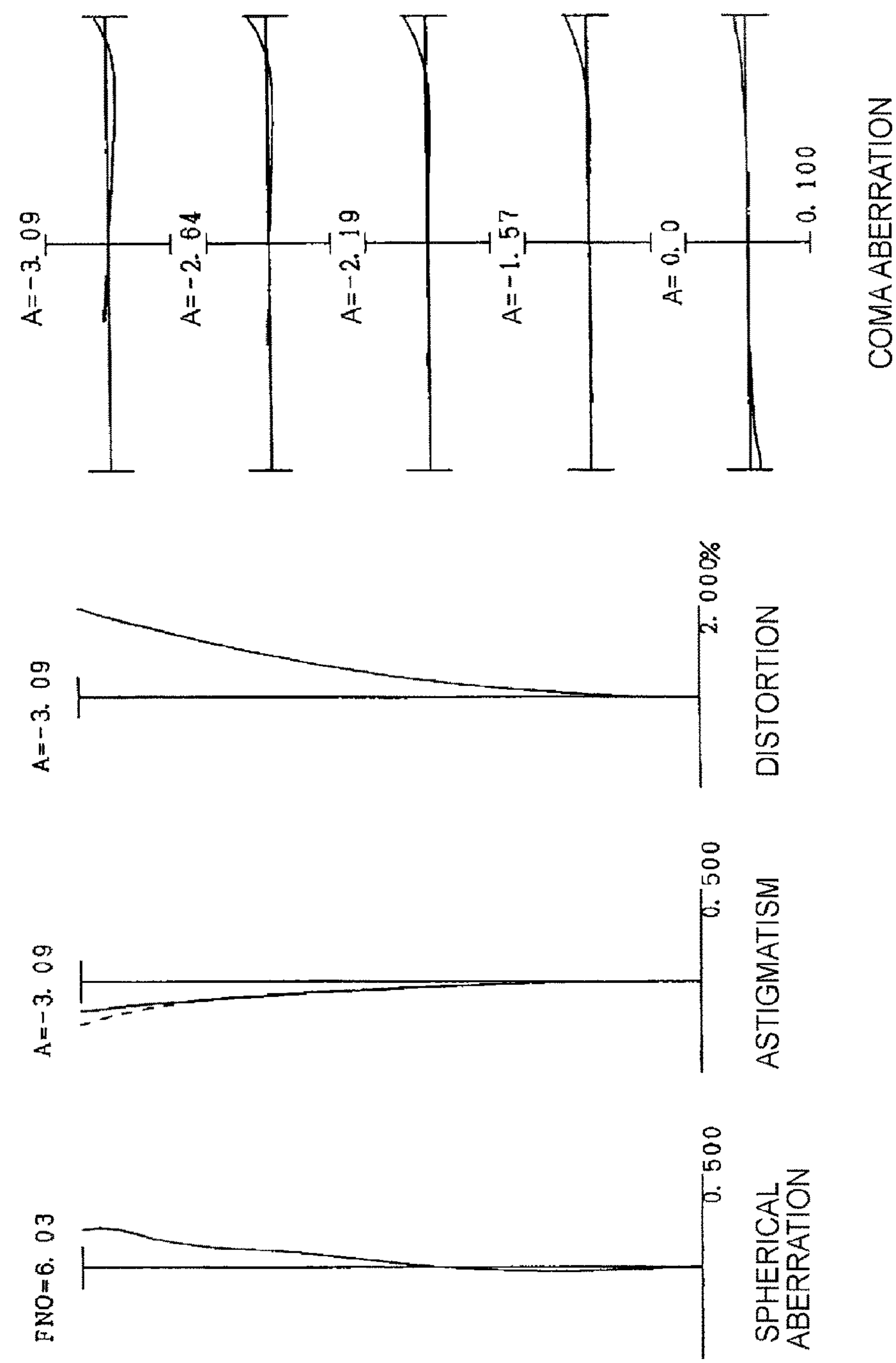
FIG. 44C shows the telephoto end state.
Figure 45C:
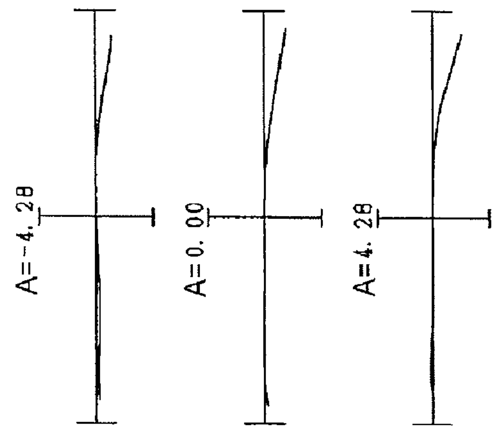
FIG. 45C shows the telephoto end state.
Figure 45B:
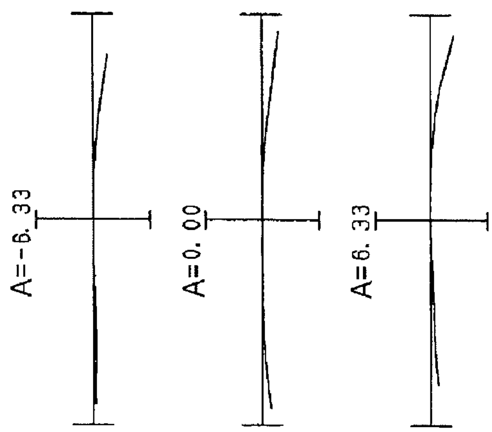
FIG. 45B shows the intermediate focal length state.
Figure 45A:
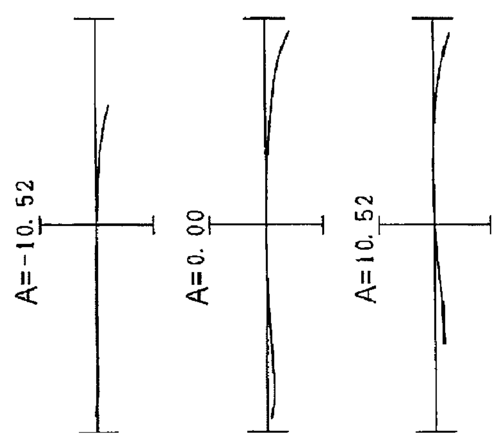
FIG. 45A shows the wide angle end state.
Figure 46A:
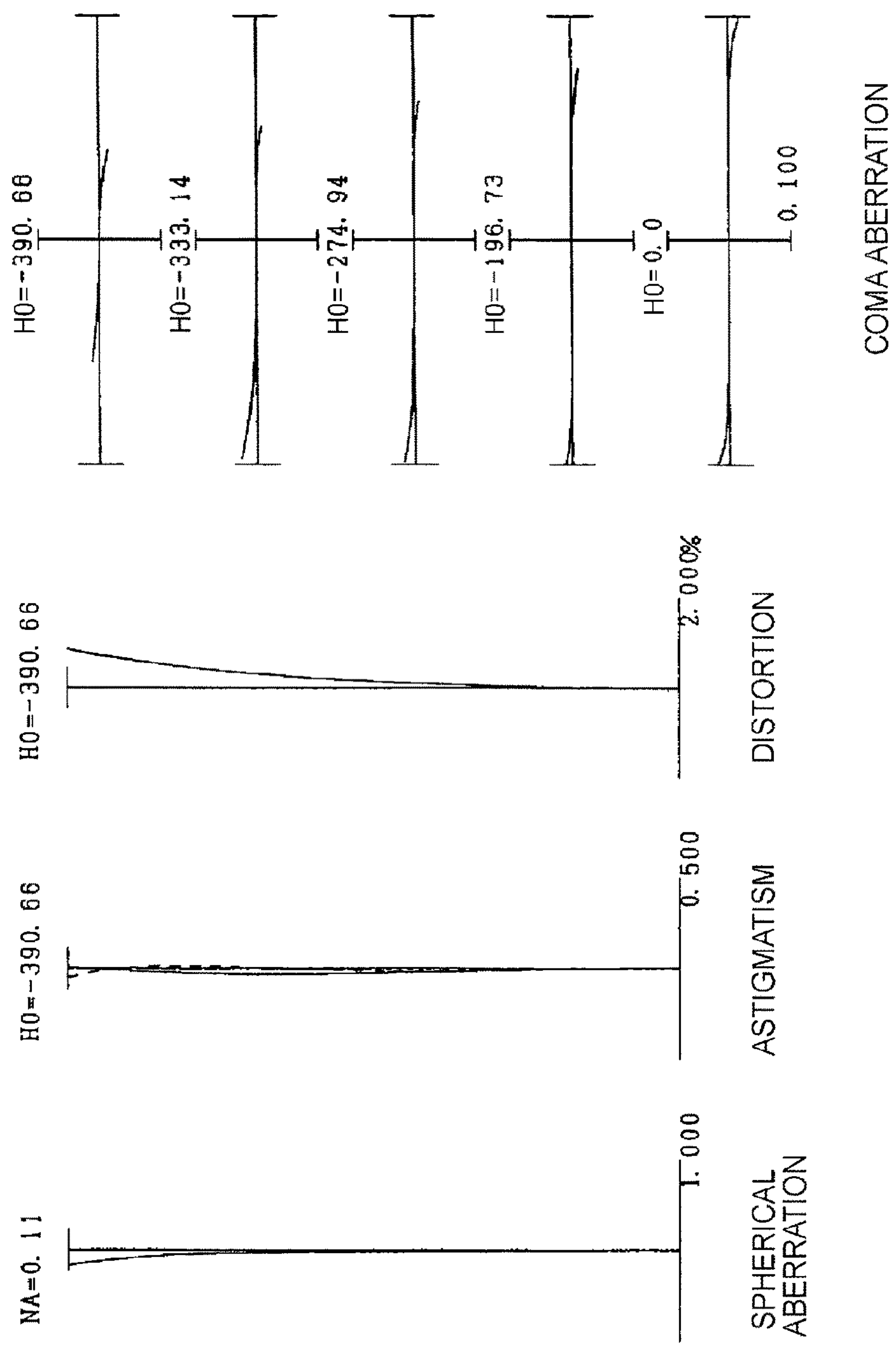
FIG. 46A shows the wide angle end state.
Figure 46B:
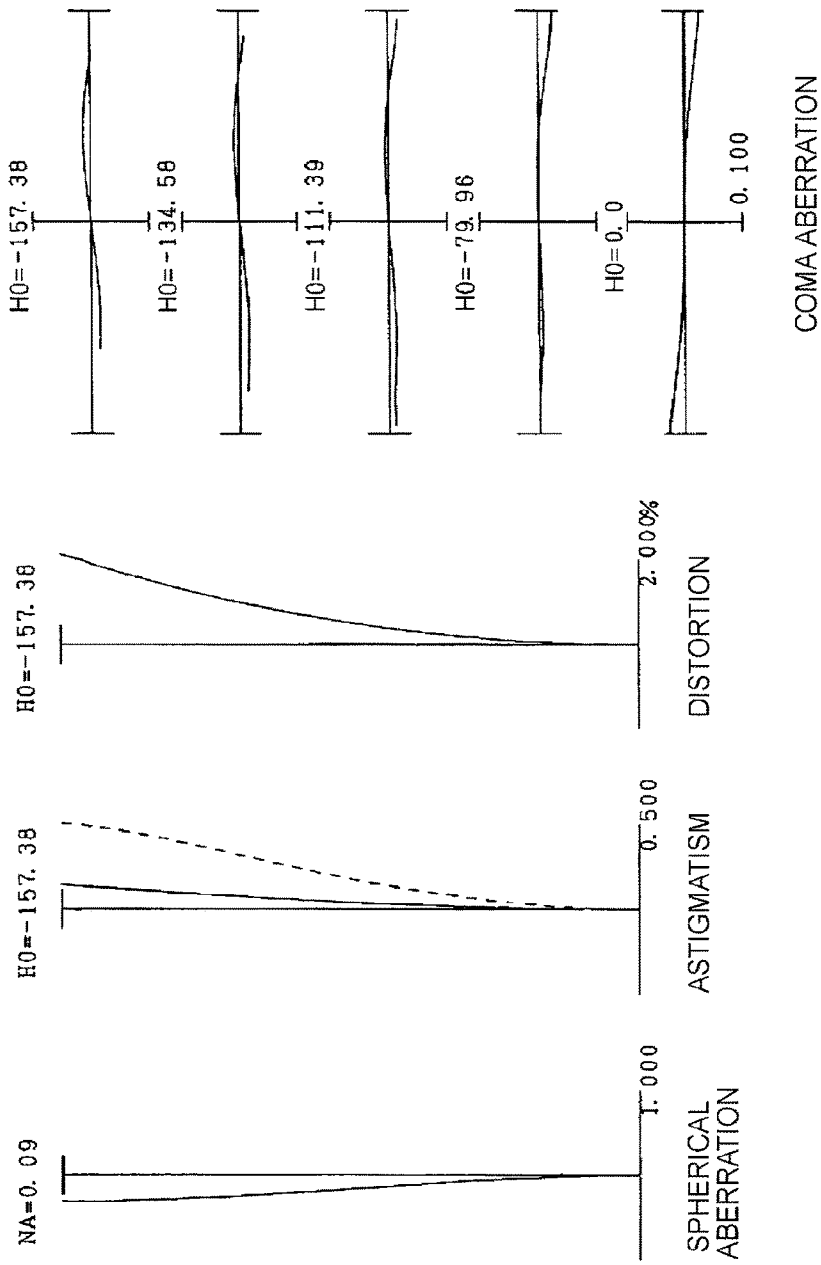
FIG. 46B shows the intermediate focal length state.
Figure 46C:
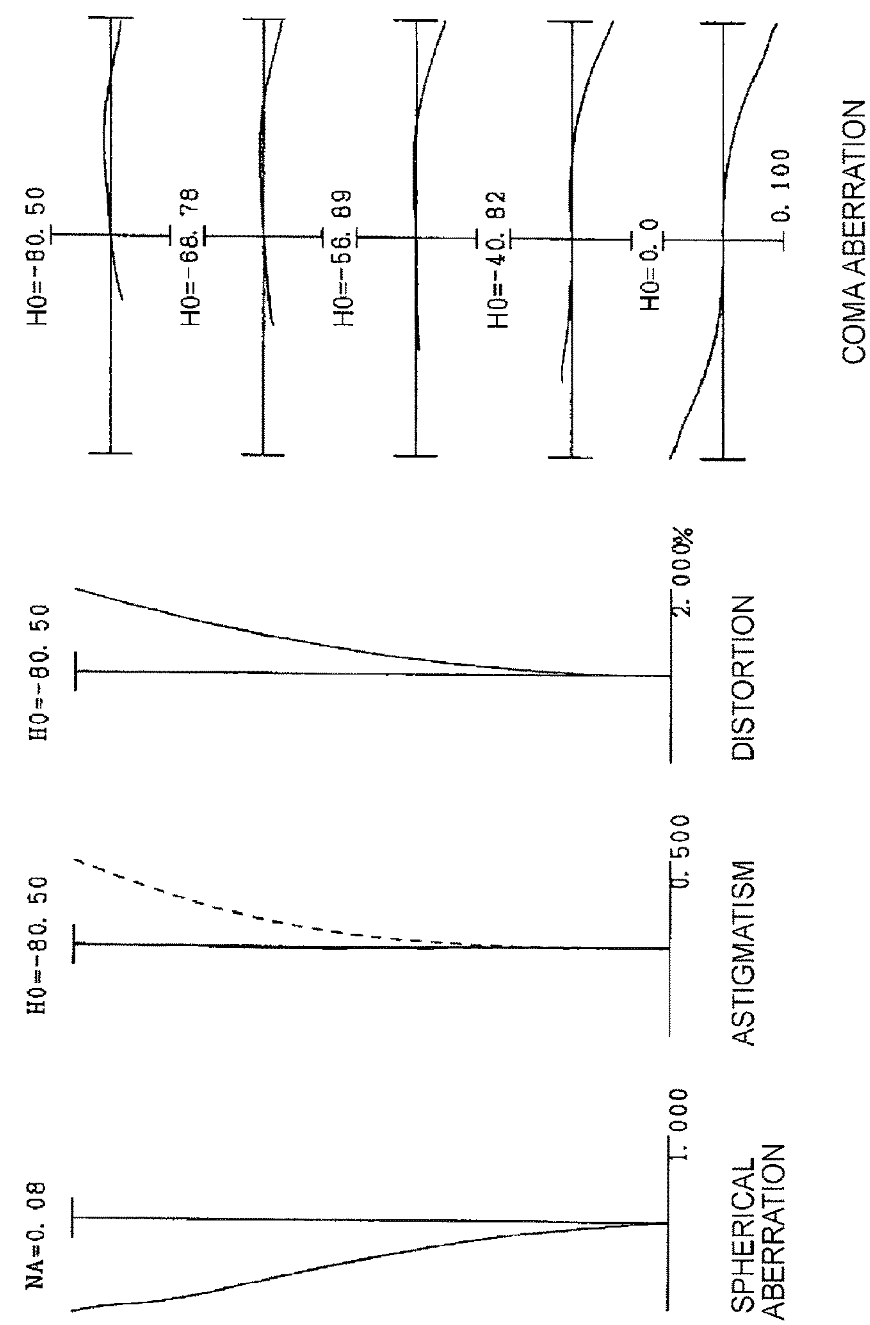
FIG. 46C shows the telephoto end state.

FIGS. 44 to 46 are graphs showing various aberrations of Example 12 at d-line (wavelength: 587.6 nm). In other words, FIG. 44A are graphs showing various aberrations upon focusing on infinity in the wide angle end state (f=81.59 mm), FIG. 44B are graphs showing various aberrations upon focusing on infinity in the intermediate focal length state (f=200.00 mm), and FIG. 44C are graphs showing various aberrations upon focusing on infinity in the telephoto end state (f=392.00 mm). FIG. 45A is a graph showing a coma aberration in the lens shift state (0.4 mm) upon focusing on infinity in the wide angle end state (f=81.59 mm), FIG. 45B is a graph showing a coma aberration in the lens shift state (0.4 mm) upon focusing on infinity in the intermediate focal length state (f=200.00 mm), and FIG. 45C is a graph showing a coma aberration in the lens shift state (0.4 mm) upon focusing on infinity in the telephoto end state (f=392.00 mm). FIG. 46A are graphs showing various aberrations upon close distance focusing (photographic distance: 1.8 m) in the wide angle end state (f=81.59 mm), FIG. 46B are graphs showing various aberrations upon close distance focusing (photographic distance: 1.8 m) in the intermediate focal length state (f=200.00 mm), and FIG. 46C are graphs showing various aberrations upon close distance focusing (photographic distance: 1.8 m) in the telephoto end state (f=392.00 mm).

As each graph showing aberrations indicates, according to Example 12, various aberrations are corrected well in each focal length state, from the wide angle end state to the telephoto end state, implementing excellent image forming performance.

Example 13

Figure 47:
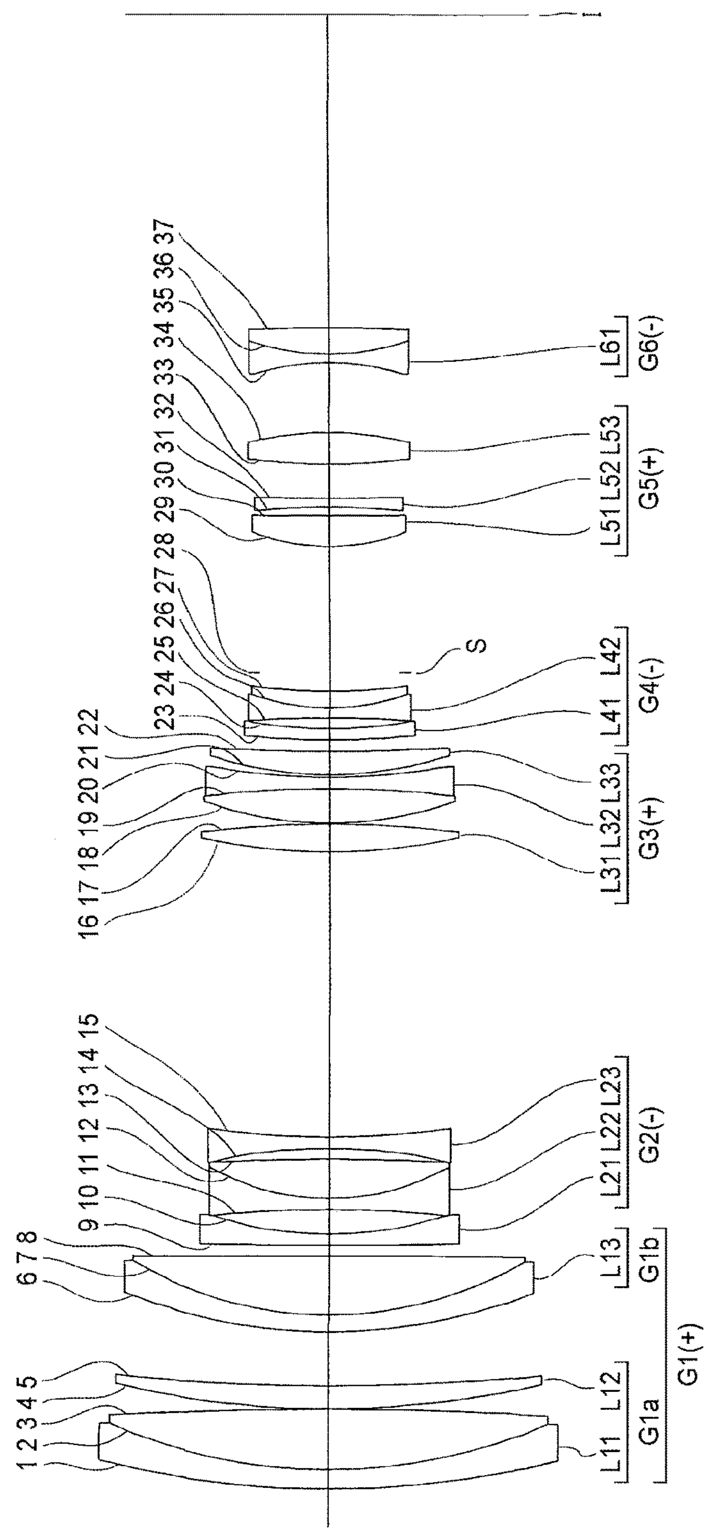
FIG. 47 is a diagram depicting a configuration of a lens system according to Example 13.

Example 13 will now be described with reference to FIG. 47 to FIG. 50 and Table 61 to Table 65. FIG. 47 is a diagram depicting a configuration of a lens system according to Example 13. As FIG. 47 shows, in the lens system according to Example 13, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a biconvex lens are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a positive meniscus lens L33 having a convex surface facing the object.

The fourth lens group G4 has, in order from the object, a negative meniscus lens L41 having a convex surface facing the object, and a cemented negative lens L42 in which a biconcave lens and a positive meniscus lens having a convex surface facing the object are cemented. In this example, all or a part of the fourth lens group G4 shift as a shift lens group, so as to have a component in an approximately orthogonal to the optical axis.

The fifth lens group G5 has, in order from the object, a positive meniscus lens L51 having a convex surface facing the object, a biconcave lens L52, and a biconvex lens L53.

The sixth lens group G6 has, in order from the object, a cemented negative lens L61 in which a biconcave lens and a biconvex lens are cemented.

The aperture stop S is disposed between the fourth lens group G4 and the fifth lens group G5, and is fixed with respect to the image plane I upon zooming from the wide angle end state to the telephoto end state.

Parameter values of Example 13 are shown in Table 61.

TABLE 61

| [All parameters] | | | |
|---|---|---|---|
| | Wide-angle end | intermediate focal length | telephoto end |
| f | 81.59~ | 200.00~ | 392.00 |
| FNO | 4.59~ | 5.80~ | 6.00 |
| 2ω | 29.89~ | 12.08~ | 6.19 |
| Image Height | 21.60~ | 21.60~ | 21.60 |
| Total lens Length | 259.00~ | 259.00~ | 259.00 |

TABLE 61-continued

| [Lens data] | | | | |
|---|---|---|---|---|
| Surface Number | r | d | nd | νd |
| 1 | 137.8365 | 3.30 | 42.24 | 1.79952 |
| 2 | 80.3919 | 10.50 | 82.52 | 1.49782 |
| 3 | −590.6028 | 0.10 | | 1.00000 |
| 4 | 135.6109 | 3.98 | 82.52 | 1.49782 |
| 5 | 316.8088 | (d5) | | |
| 6 | 80.3916 | 3.00 | 23.78 | 1.84666 |
| 7 | 56.9394 | 10.26 | 61.16 | 1.58913 |
| 8 | −5092.0839 | (d8) | | |
| 9 | 898.2577 | 2.00 | 46.62 | 1.81600 |
| 10 | 55.8033 | 4.27 | | |
| 11 | −178.3098 | 2.00 | 52.32 | 1.75500 |
| 12 | 36.2625 | 6.80 | 22.76 | 1.80810 |
| 13 | −330.4063 | 1.88 | | |
| 14 | −76.4913 | 2.00 | 46.62 | 1.81600 |
| 15 | 124.0482 | (d15) | | |
| 16 | 87.2446 | 4.88 | 54.68 | 1.72916 |
| 17 | −147.6473 | 0.20 | | |
| 18 | 54.4904 | 6.00 | 65.44 | 1.60300 |
| 19 | −149.7863 | 2.00 | 23.78 | 1.84666 |
| 20 | 96.7062 | 0.40 | | |
| 21 | 55.3506 | 4.18 | 65.44 | 1.60300 |
| 22 | 314.2168 | (d22) | | |
| 23 | 122.2514 | 2.00 | 46.62 | 1.81600 |
| 24 | 65.1247 | 1.84 | | |
| 25 | −179.0558 | 1.80 | 49.60 | 1.77250 |
| 26 | 32.8901 | 2.96 | 23.78 | 1.84666 |
| 27 | 84.4546 | 3.30 | | |
| 28 | 0.0000 | (d28) | (aperture stop S) | |
| 29 | 30.2362 | 5.41 | 81.54 | 1.49700 |
| 30 | 691.6772 | 1.50 | | |
| 31 | −97.7031 | 1.50 | 23.78 | 1.84666 |
| 32 | 369.7789 | 6.00 | | |
| *33 | 74.2923 | 5.57 | 67.87 | 1.59319 |
| 34 | −47.4634 | (d34) | | |
| 35 | −33.9102 | 1.50 | 46.62 | 1.81600 |
| 36 | 36.4984 | 4.64 | 26.52 | 1.76182 |
| 37 | −220.4591 | (Bf) | | |

| [Each group focal length data] | | |
|---|---|---|
| Group | First surface | Focal length |
| G1 | 1 | 93.8532 |
| G2 | 9 | −29.3096 |
| G3 | 16 | 43.9086 |
| G4 | 23 | −55.2735 |
| G5 | 29 | 43.2494 |
| G6 | 35 | −45.8281 |

In Example 13, the thirty third lens surface is aspherical. Table 62 shows the [Aspherical data].

TABLE 62

| [Aspherical data] Thirty third surface | | | | | |
|---|---|---|---|---|---|
| R | κ | $C_4$ | $C_6$ | $C_8$ | $C_{10}$ |
| 74.2923 | +1.2435 | $-5.7876 \times 10^{-6}$ | $-3.0853 \times 10^{-9}$ | $+1.6355 \times 10^{-11}$ | $-4.2846 \times 10^{-14}$ |

In Example 13, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d34 between the fifth lens group G5 and the sixth lens group G6, and the back focus Bf, change upon zooming. Table 63 shows the [Variable distance data].

TABLE 63

| [Variable distance data] | | | |
|---|---|---|---|
| | Wide-angle end | intermediate focal length | telephoto end |
| d5 | 9.3719 | 9.3719 | 9.3719 |
| d8 | 2.0000 | 15.3558 | 21.7726 |
| d15 | 50.0575 | 23.6986 | 2.0000 |
| d22 | 2.0000 | 15.0031 | 30.2850 |
| d28 | 22.3623 | 10.1959 | 2.0000 |
| d34 | 12.4482 | 7.0738 | 2.0000 |
| Bf | 55.0002 | 72.5408 | 85.8099 |

Table 64 shows the [Focusing lens group shift distance] in Example 13.

TABLE 64

| [Focusing lens group shift distance] | | | |
|---|---|---|---|
| | Wide-angle end | intermediate focal length | telephoto end |
| f | 81.5938 | 200.0002 | 392.0050 |
| Δ1b | 7.3707 | 7.3707 | 7.3707 |

Table 65 shows the [Conditional expression correspondence value] in Example 13.

TABLE 65

| [Conditional expression correspondence value] |
|---|
| ft = 392.0050 |
| f1b = 161.4108 |
| f2 = −29.3096 |
| fb = −55.2735 |
| fc = 43.2494 |
| TL = 259.0001 |
| (5)(−f2)/fc = 0.6777 |
| (6)(−f2)/(−fb) = 0.5303 |
| (7)ft/f1b = 2.4286 |
| (8)TL/f1b = 1.6046 |

Figure 48A:
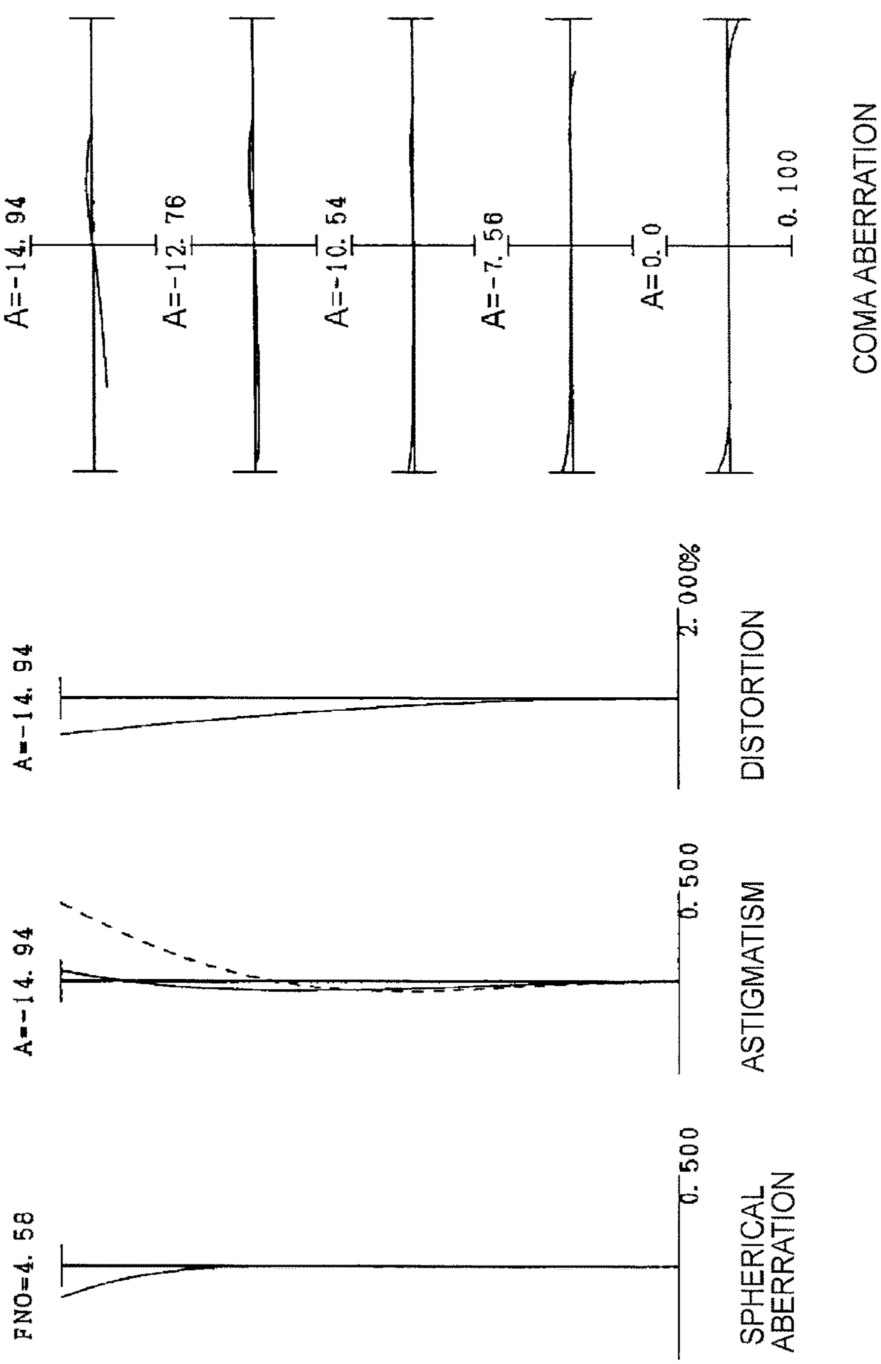
FIG. 48A shows the wide angle end state.
Figure 48B:
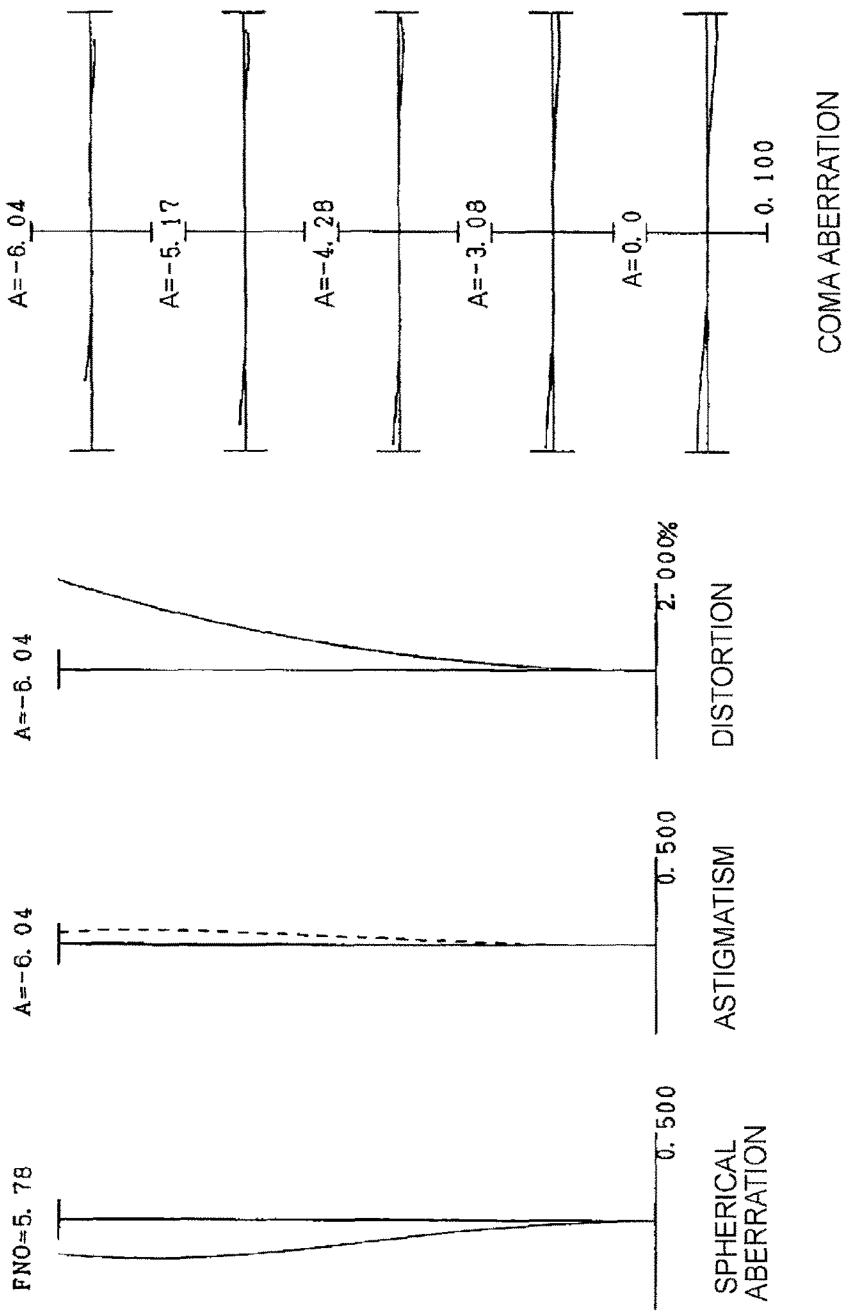
FIG. 48B shows the intermediate focal length state.
Figure 48C:
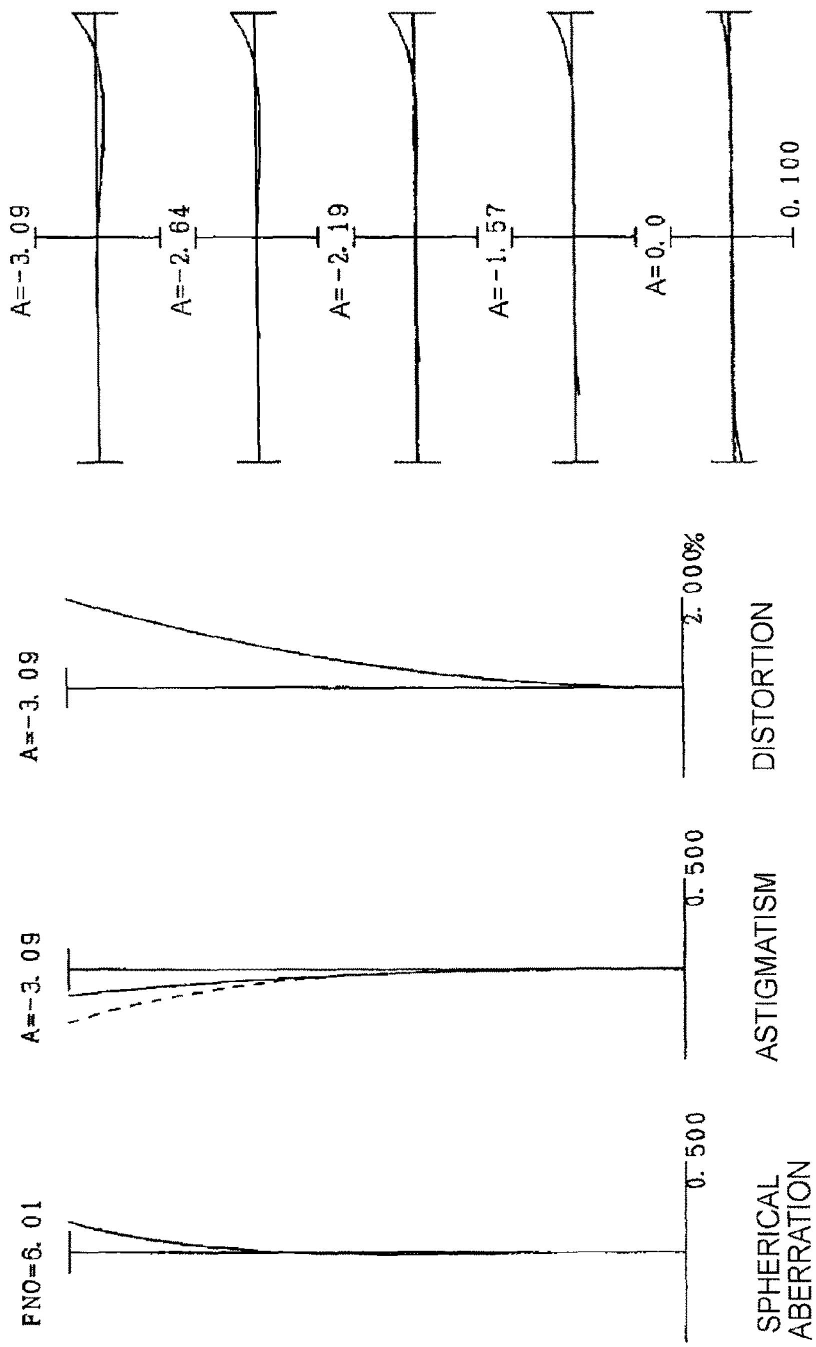
FIG. 48C shows the telephoto end state.
Figure 49A:
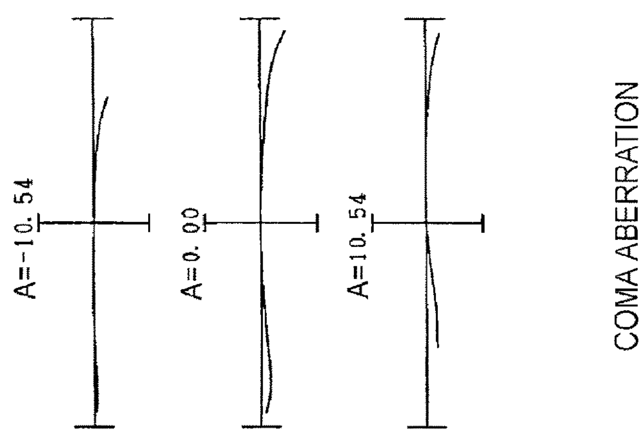
FIG. 49A shows the wide angle end state.
Figure 49B:
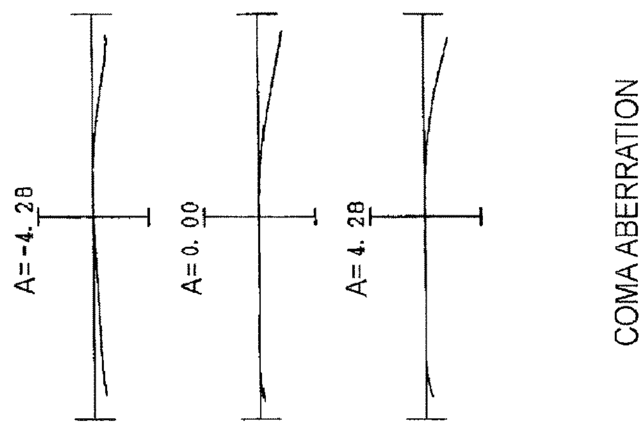
FIG. 49B shows the intermediate focal length state.
Figure 49C:
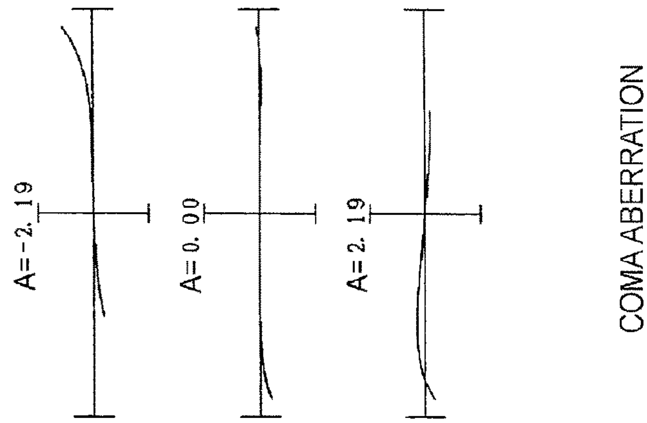
FIG. 49C shows the telephoto end state.
Figure 50A:
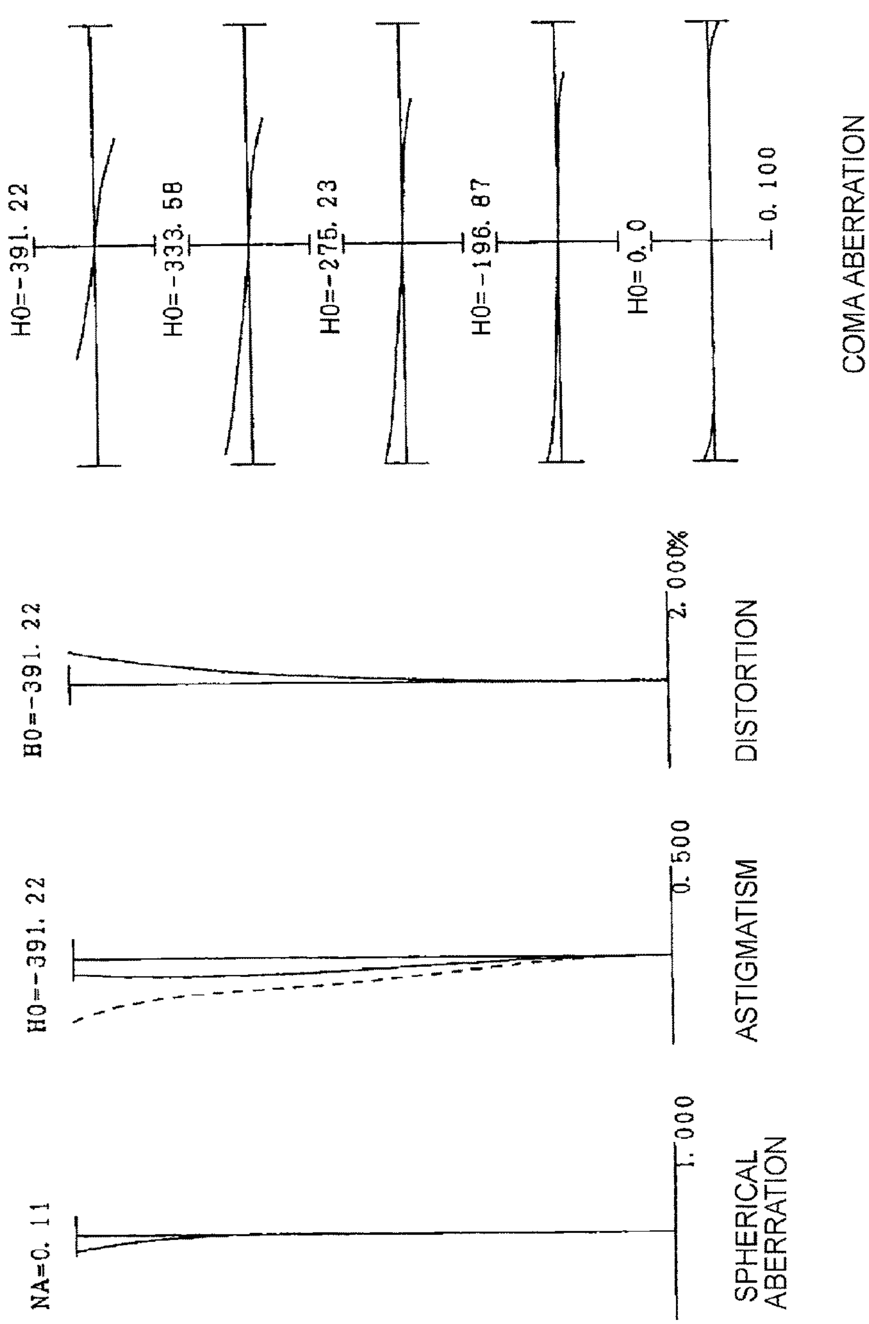
FIG. 50A shows the wide angle end state.
Figure 50B:
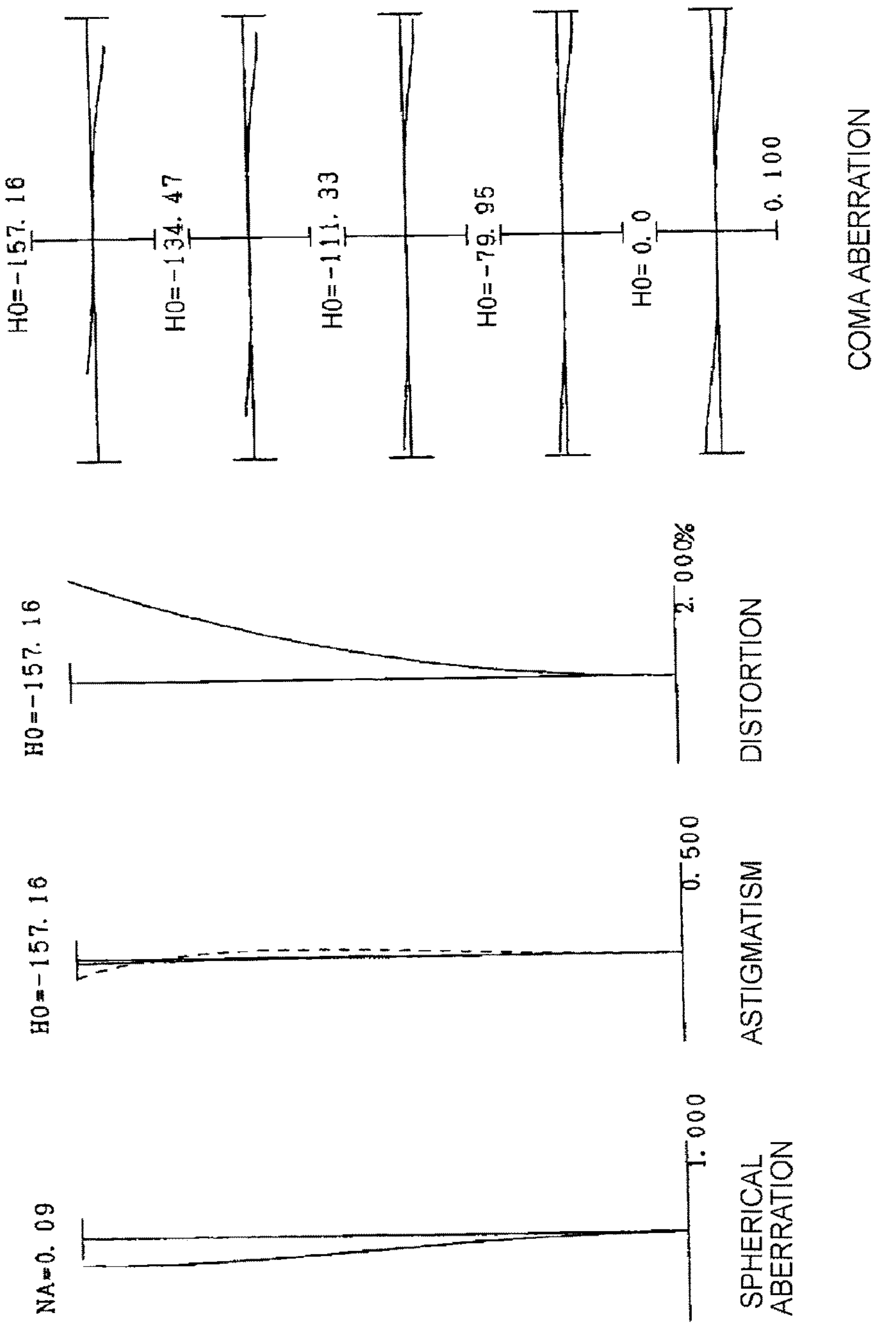
FIG. 50B shows the intermediate focal length state.
Figure 50C:
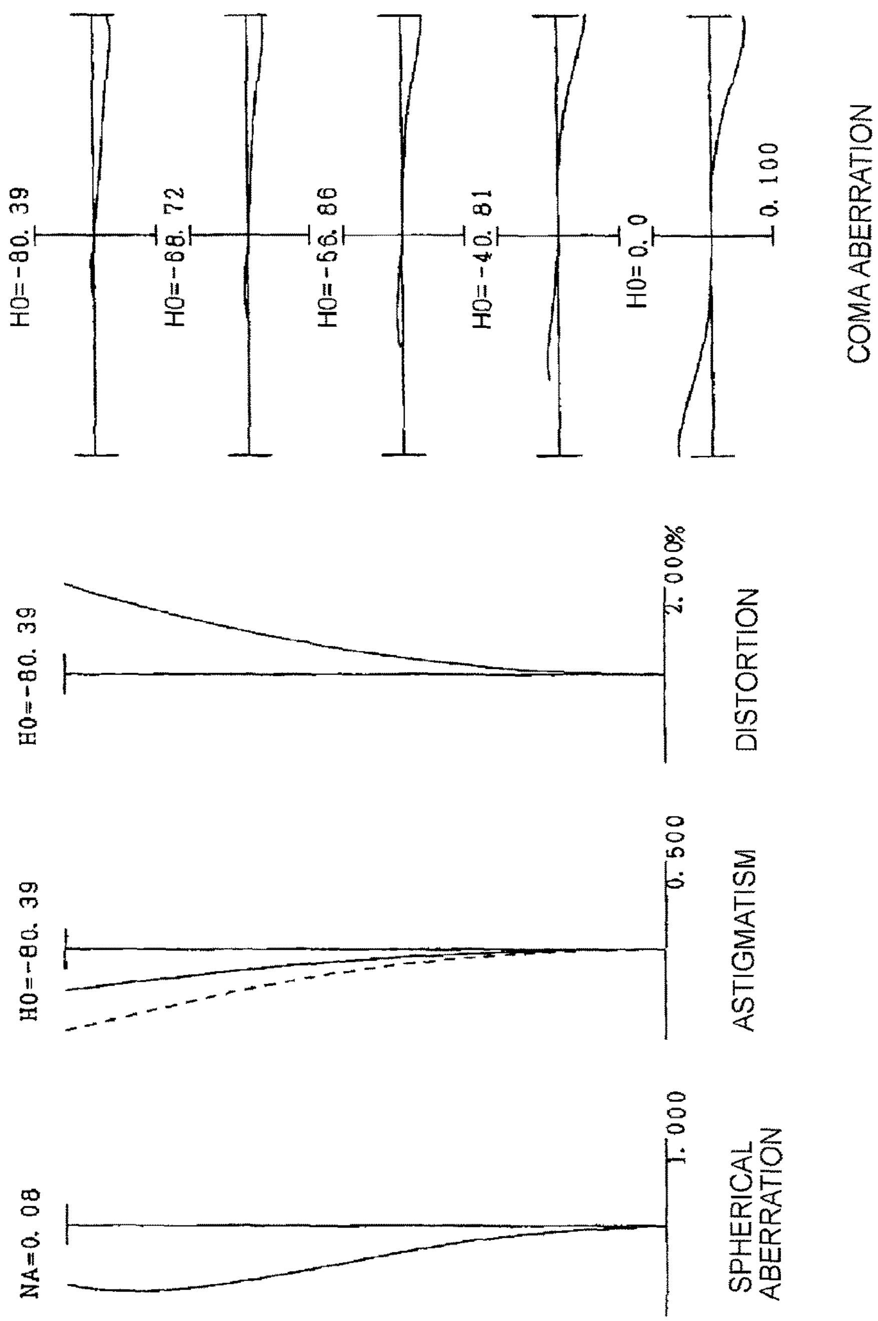
FIG. 50C shows the telephoto end state.

FIGS. 48 to 50 are graphs showing various aberrations of Example 13 at d-line (wavelength: 587.6 nm). In other words, FIG. 48A are graphs showing various aberrations upon focusing on infinity in the wide angle end state (f=81.59 mm), FIG. 48B are graphs showing various aberrations upon focusing on infinity in the intermediate focal length state (f=200.00 mm), and FIG. 48C are graphs showing various aberrations upon focusing on infinity in the telephoto end state (f=392.00 mm). FIG. 49A is a graph showing a coma aberration in the lens shift state (0.4 mm) upon focusing on infinity in the wide angle end state (f=81.59 mm), FIG. 49B is a graph showing a coma aberration in the lens shift state (0.4 mm) upon focusing on infinity in the intermediate focal length state (f=200.00 mm), and FIG. 49C is a graph showing a coma aberration in the lens shift state (0.4 mm) upon focusing on infinity in the telephoto end state (f=392.00 mm). FIG. 50A are graphs showing various aberrations upon close distance focusing (photographic distance: 1.8 m) in the wide angle end state (f=81.59 mm), FIG. 50B are graphs showing various aberrations upon close distance focusing (photographic distance: 1.8 m) in the intermediate focal length state (f=199.36 mm), and FIG. 50C are graphs showing various aberrations upon close distance focusing (photographic distance: 1.8 m) in the telephoto end state (f=392.00 mm).

As each graph showing aberrations indicates, according to Example 13, various aberrations are corrected well in each focal length state, from the wide angle end state to the telephoto end state, implementing excellent image forming performance.

As described above, the present embodiment can provide a lens system, an optical apparatus and a manufacturing method which can shift images, having an excellent image forming performing even if the shift lens group is shifted, since the arrangement of the shift lens group and aperture stop is appropriately set.

Third Embodiment Group

A lens system according to a third embodiment group will now be described with reference to the drawings. A lens system of the present embodiment has, in order from an object, at least first to fifth lens groups, wherein the first lens group has a front portion lens group, and a rear portion lens group disposed to an image side of the front portion lens group with an air distance therebetween, and performs focusing by shifting the rear portion lens group in the optical axis direction, the fifth lens group has, in order from the object, a positive lens component, a negative lens component, and a positive lens component, and the aperture stop is disposed to the object side of the fifth lens group.

In the case of the lens system of the present embodiment, which is comprised of five or more lens groups, an optical system having a high zoom ratio can be easily constructed. Since the first lens group which is disposed closest to the object has a front portion lens group and the rear portion lens group disposed to the image side of the front portion lens group with an air distance therebetween, and focusing is performed using the rear portion lens group out of these two subgroups, the focusing mechanism can be simplified and a close distance fluctuation of spherical aberration and curvature of field due to focusing can be minimized. Further, objects in the same photographic distance can be focused with a same feed amount throughout the entire zooming area from the wide angle end state to the telephoto end state. The fifth lens group has, in order from the object, a positive lens component, a negative lens component, and a positive lens component, so the spherical aberration and curvature of field can be corrected well. The aperture stop is disposed to the object side of the fifth lens group, so distortion can be corrected easily. The spherical aberration and coma aberration which are generated in the fifth lens group alone can also be corrected well.

In the lens system according to the present embodiment, it is preferable that the fifth lens group has, in order from the object, a positive lens, a negative lens and a positive lens, in order to correct the spherical aberration and coma aberration well.

In the lens system according to the present embodiment, it is preferable that the fifth lens group has, in order from the object, a cemented lens of a positive lens and a negative lens, and a positive lens, in order to correct the spherical aberration and coma aberration well.

In the lens system according to the present embodiment, it is preferable that the fourth lens group is fixed in the optical axis direction with respect to the image plane upon zooming from the wide angle end state to the telephoto end state, in order to reduce performance deterioration due to decentering, particularly a drop in curvature of field.

Another lens system according to the present embodiment has, in order from the object, at least first to fifth lens groups, wherein the fourth lens group is fixed in the optical axis direction with respect to the image plane upon zooming from the wide angle end state to the telephoto end state, and the fifth lens group has at least one aspherical surface. In the case of the lens system according to the present embodiment, which is comprised of five or more lens groups, an optical system having a high zoom ratio can be easily constructed. Since the fourth lens group is fixed with respect to the image plane upon changing of the lens position from the wide angle end state to the telephoto end state, decentering is decreased. Further, a drop in performance due to decentering, particularly curvature of field, is reduced, so good performance can be implemented. Disposing at least one aspherical surface in the fifth lens group improves correction of coma aberration. Particularly a drop in performance of coma aberration due to decentering can be reduced.

In the lens system according to the present embodiment, it is preferable that the third lens group has at least one aspherical surface, in order to correct the spherical aberration and coma aberration well, and particularly to reduce a drop in performance of coma aberration due to decentering.

In the lens system according to the present embodiment, it is preferable that the aperture stop is disposed between the fourth lens group and the fifth lens group. By this configuration, distortion can be corrected well. Disposing the aperture stop closer to the lens mount than the image blur correction mechanism simplifies the diaphragm mechanism.

In the lens system according to the present embodiment, it is preferable that the aperture stop is integrated with the fourth lens group upon zooming from the wide angle end state to the telephoto end state. By this configuration, distortion can be corrected well. Disposing the aperture stop closer to the lens mount than the image blur correction mechanism simplifies the diaphragm mechanism.

In the lens system according to the present embodiment, it is preferable that the third lens group has positive refractive power, in order to correct the spherical aberration and coma aberration well.

In the lens system according to the present embodiment, it is preferable that the fourth lens group has negative refractive power, in order to correct the spherical aberration well.

In the lens system according to the present embodiment, it is preferable that the fifth lens group has positive refractive power, in order to correct coma aberration and curvature of field well.

In the lens system according to the present embodiment, it is preferable that all or a part of the fourth lens group is shifted so as to have a component orthogonal to the optical axis, and therefore image blur on the image plane is corrected when motion blur is generated, in order to correct the image well during lens shift, and spherical aberration, sine condition and Petzval sum are corrected well. The spherical aberration and sine condition are corrected for suppressing decentering coma aberration which is generated in the center area of the screen when the shift lens group is shifted approximately orthogonal to the optical axis. The Petzval sum is corrected for suppressing curvature of field which is generated in the peripheral area of the screen when the shift lens group is shifted approximately orthogonal to the optical axis.

In the lens system according to the present embodiment, it is preferable that both the second lens group and the fourth lens group have negative refractive power, and the following conditional expression (9) is satisfied, where f2 denotes a focal length of the second lens group, and f4 denotes a focal length of the fourth lens group.

$$0.23<(-f2)/(-f4)<0.88 \quad (9)$$

The conditional expression (9) is a conditional expression for specifying an appropriate range of the ratio of the focal lengths of the second lens group and the "c" lens group. If the upper limit of the conditional expression (9) is exceeded, the refractive power of the second lens group becomes relatively low, and the fluctuation of the coma aberration generated in the second lens group upon zooming increases. The refractive power of the fourth lens group becomes relatively high, and the shift distance increases upon zooming, and a fluctuation of curvature of field generated in the fourth lens group increases. As a result, it becomes difficult to suppress the deterioration of performance in the total zooming range from the wide angle end state to the telephoto end state.

If the lower limit of the conditional expression (9) is not reached, the refractive power of the second lens group becomes relatively high, and correction of coma aberration becomes insufficient. Since the second lens group cannot contribute efficiently to zooming, a high zoom ratio, about four times or more, cannot be secured. Further, the refractive power of the fourth lens group becomes relatively low, and the spherical aberration and curvature of field, which are generated in the fourth lens group, increase excessively, which makes it difficult to achieve the object of the present invention, that is, implementing excellent optical performance.

In order to ensure the effect of the present embodiment, it is preferable to set the upper limit of the conditional expression (9) to 0.80. In order to further ensure the effect of the present embodiment, it is preferable to set the upper limit of the conditional expression (9) to 0.75. In order to further ensure the effect of the present embodiment, it is preferable to set the upper limit of the conditional expression (9) to 0.70.

In order to ensure the effect of the present embodiment, it is preferable to set the lower limit of the conditional expression (9) to 0.30. In order to further ensure the effect of the present embodiment, it is preferable to set the lower limit of the conditional expression (9) to 0.35. In order to further ensure the effect of the present embodiment, it is preferable to set the lower limit of the conditional expression (9) to 0.40.

In the lens system according to the present embodiment, it is preferable that the second lens group has negative refractive power, the fifth lens group has positive refractive power, and the following conditional expression (10) is satisfied, where f2 denotes a focal length of the second lens group, and f5 denotes a focal length of the fifth lens group.

$$0.43<(-f2)/f5<1.00 \quad (10)$$

The conditional expression (10) is a conditional expression for specifying an appropriate range of the ratio of the focal lengths of the second lens group and the fifth lens group. If the upper limit of the conditional expression (10) is exceeded, the refractive power of the second lens group becomes relatively low, and the fluctuation of the coma aberration generated in the second lens group upon zooming increases. The refractive power of the fifth lens group becomes relatively high, and the shift distance increases upon zooming, and a fluctuation of spherical aberration generated in the fifth lens group increases. As a result, it becomes difficult to suppress the deterioration of performance in the total zooming range from the wide angle end state to the telephoto end state.

If the lower limit of the conditional expression (10) is not reached, the refractive power of the second lens group becomes relatively high, and since the second lens group cannot contribute efficiently to zooming, high zoom ratio, about four times or more, cannot be secured. Further, the refractive power of the fifth lens group becomes relatively low, and spherical aberration and curvature of field, which are generated in the fifth lens group, increased excessively, which makes it difficult to achieve the objective of the present invention, that is, implementing excellent optical performance.

In order to ensure the effect of the present embodiment, it is preferable to set the upper limit of the conditional expression (10) to 0.95. In order to further ensure the effect of the present embodiment, it is preferable to set the upper limit of the conditional expression (10) to 0.90. In order to further ensure the effect of the present embodiment, it is preferable to set the upper limit of the conditional expression (10) to 0.85.

In order to ensure the effect of the present embodiment, it is preferable to set the lower limit of the conditional expression (10) to 0.50. In order to further ensure the effect of the present embodiment, it is preferable to set the lower limit of the conditional expression (10) to 0.55. In order to further ensure the effect of the present embodiment, it is preferable to set the lower limit of the conditional expression (10) to 0.60.

In the lens system according to the present embodiment, it is preferable that the first lens group has positive refractive power in order to implement both correction of distortion and decrease in the total length of the lens system.

In the lens system according to the present embodiment, it is preferable that the first lens group has, at least a front portion lens group, and a rear portion lens group disposed to the image side of the front portion lens group with an air distance therebetween, in order to implement both correction of distortion and decrease in the total length of the lens system.

In the lens system according to the present embodiment, it is preferable that focusing is performed by shifting the rear portion lens group of the first lens group in the optical axis direction, in order to simplify the focusing mechanism and minimize the close distance fluctuation of the spherical aberration and curvature of field due to focusing.

In the lens system according to the present embodiment, it is preferable that at least one of the front portion lens group and the rear portion lens group of the first lens group has positive refractive power. It is preferable that the front portion lens group of the first lens group has positive refractive power, in order to decrease the total length thereof and minimize the generation of distortion. It is preferable that the rear portion lens group of the first lens group has positive refractive power, in order to minimize close distance fluctuation of spherical aberration and curvature of field due to focusing.

In the lens system according to the present embodiment, it is preferable that the following conditional expression (11) is satisfied, where ft denotes a focal length of the total lens system in the telephoto end state, and f1b denotes a focal length of the rear portion lens group of the first lens group.

$$1.30<ft/f1b<3.10 \quad (11)$$

The conditional expression (11) is a conditional expression for specifying an appropriate range of the ratio of the focal length of the total lens system in the telephoto end state and the focal length of the rear portion lens group of the first lens group that is disposed closest to the image. If the upper limit of the conditional expression (11) is exceeded, the refractive power of the rear portion lens group becomes relatively high. As a result, an aberration fluctuation of the coma aberration and a curvature of field upon focusing increases, which is not desirable. If the lower limit of the conditional expression (11) is not reached, the refractive power of the rear portion lens group becomes relatively low. This is advantageous in terms of aberration correction, but increase the shift distance of the focusing lens group, which makes it difficult to balance decreasing size and increase performance. As a result, the total lens length increases, which runs against the intention of the present invention, and is therefore not desirable.

In order to ensure the effect of the present embodiment, it is preferable to set the upper limit of the conditional expression (11) to 2.95. In order to further ensure the effect of the present embodiment, it is preferable to set the upper limit of the conditional expression (11) to 2.80. In order to further ensure the effect of the present embodiment, it is preferable to set the upper limit of the conditional expression (11) to 2.65.

In order to ensure the effect of the present embodiment, it is preferable to set the lower limit of the conditional expression (11) to 1.50. In order to further ensure the effect of the present embodiment, it is preferable to set the lower limit of the conditional expression (11) to 1.70. In order to further ensure the effect of the present embodiment, it is preferable to set the lower limit of the conditional expression (11) to 1.90.

In the lens system according to the present embodiment, it is preferable that the following conditional expression (12) is satisfied, where TL denotes a total length of the lens system in the telephoto end state, and f1b denotes a focal length of the rear portion lens group of the first lens group.

$$0.90<TL/f1b<2.48 \qquad (12)$$

The conditional expression (12) is a conditional expression for specifying an appropriate range of the ratio of the total length of the lens system and the focal length of the rear portion lens group of the first lens group that is disposed closest to the object. If the upper limit of the conditional expression (12) is exceeded, the refractive power of the rear portion lens group becomes relatively high. As a result, an aberration fluctuation of the coma aberration and a curvature of field upon focusing increases, which is not desirable. If the lower limit of the conditional expression (12) is not reached, the refractive power of the rear portion lens group becomes relatively low. This is advantageous in terms of aberration correction, but increase the shift distance of the focusing lens group, which makes it difficult to balance decreasing size and increase performance. As a result, the total lens length increases, which runs against the intention of the present invention, and is therefore not desirable.

In order to ensure the effect of the present embodiment, it is preferable to set the upper limit of the conditional expression (12) to 2.20. In order to further ensure the effect of the present embodiment, it is preferable to set the upper limit of the conditional expression (12) to 1.90. In order to further ensure the effect of the present embodiment, it is preferable to set the upper limit of the conditional expression (12) to 1.75.

In order to ensure the effect of the present embodiment, it is preferable to set the lower limit of the conditional expression (12) to 1.00. In order to further ensure the effect of the present embodiment, it is preferable to set the lower limit of the conditional expression (12) to 1.10. In order to further ensure the effect of the present embodiment, it is preferable to set the lower limit of the conditional expression (12) to 1.20.

In the lens system according to the present embodiment, it is preferable that the first lens group is fixed in the optical axis direction with respect to the image plane upon focusing on infinity in zooming from the wide angle end state to the telephoto end state, in order to reduce performance deterioration due to decentering, particularly to minimize deterioration of curvature of field, and implement good optical performance.

It is preferable that the lens system according to the present embodiment further has a sixth lens group that is disposed to the image side of the fifth lens group, wherein the first lens group has positive refractive power, the second lens group has negative refractive power, the third lens group has positive refractive power, the fourth lens group has negative refractive power, the fifth lens group has positive refractive power, and the sixth lens group has negative refractive power, in order to correct spherical aberration, coma aberration and curvature of field well, and implement excellent optical performance with high zoom ratio.

It is preferable that the lens system according to the present embodiment further has a fifth lens group and a sixth lens group which are disposed to the image side of the fourth lens group, wherein the first lens group has positive refractive power, the second lens group has negative refractive power, the third lens group has positive refractive power, the fourth lens group has negative refractive power, the fifth lens group has positive refractive power, and the sixth lens group has negative refractive power, in order to correct spherical aberration, coma aberration and curvature of field well, and implement excellent optical performance with high zoom ratio.

Examples of the Third Embodiment Group

Each example (Example 14 to Example 22) in the third embodiment group will now be described with reference to the drawings. For the lens systems according to these examples as well, allocation of refractive power and a shifting state of each lens group upon changing of the focal length state from the wide angle end state (W) to the telephoto end state (T) are shown in FIG. 1.

Example 14

Figure 51:
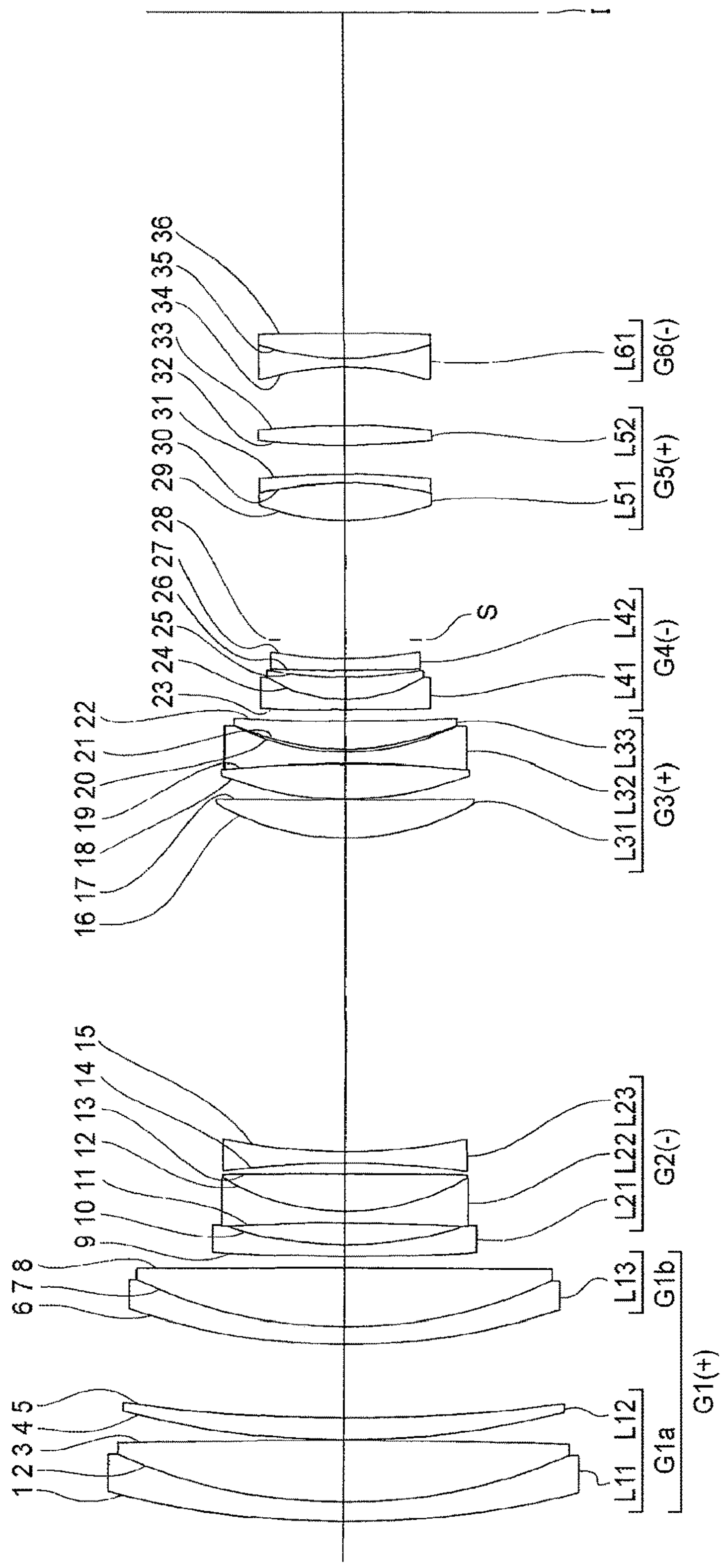
FIG. 51 is a diagram depicting a configuration of a lens system according to Example 14.

Example 14 will now be described with reference to FIG. 51 to FIG. 54 and Table 66 to Table 70. FIG. 51 is a diagram depicting a configuration of a lens system according to Example 14. As FIG. 51 shows, in the lens system according to Example 14, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a positive meniscus lens L31 having a convex surface facing the object, a cemented positive lens L32 in which a biconvex lens and a biconcave lens are cemented, and a positive meniscus lens L33 having a convex surface facing the object.

The fourth lens group G4 has, in order from the object, a cemented negative lens L41 in which a negative meniscus lens having a convex surface facing the object and a positive meniscus lens having a convex surface facing the object are cemented, and a negative meniscus lens L42 having a convex surface facing the object. In this example, all or a part of the fourth lens group G4 shift as a shift lens group, so as to have a component in an approximately orthogonal to the optical axis.

The fifth lens group G5 has, in order from the object, a cemented positive lens L51 in which a biconvex lens and a negative meniscus lens having a convex surface facing the image are cemented, and a biconvex lens L52.

The sixth lens group G6 has, in order from the object, a cemented negative lens L61 in which a biconcave lens and a biconvex lens are cemented.

The image plane I is formed on a picture element, which is not illustrated, and the picture element is constituted by a CCD, CMOS or the like (description on the image plane I is the same for the examples herein below).

The aperture stop S is disposed closest to the image in the fourth lens group G4, and is fixed with respect to the image plane I upon zooming from the wide angle end state to the telephoto end state.

Parameter values of Example 14 are shown in Table 66.

TABLE 66

[All parameters]

| | Wide-angle end | intermediate focal length | telephoto end |
|---|---|---|---|
| f | 81.59~ | 199.36~ | 392.00 |
| FNO | 4.59~ | 5.61~ | 5.80 |
| 2ω | 29.77~ | 12.13~ | 6.20 |
| Image Height | 21.60~ | 21.60~ | 21.60 |
| Total lens Length | 258.89~ | 258.89~ | 258.89 |

[Lens data]

| Surface Number | r | d | nd | vd |
|---|---|---|---|---|
| 1 | 133.8083 | 3.30 | 1.79952 | 42.24 |
| 2 | 78.8175 | 10.60 | 1.49782 | 82.52 |
| 3 | −1382.5946 | 0.10 | | |
| 4 | 123.9007 | 3.70 | 1.49782 | 82.52 |
| 5 | 225.7793 | (d5) | | |
| 6 | 96.4071 | 3.00 | 1.84666 | 23.78 |
| 7 | 69.2697 | 10.00 | 1.58913 | 61.16 |
| 8 | 4131410.10 | (d8) | | |
| 9 | 285.2072 | 2.00 | 1.81600 | 46.62 |
| 10 | 56.3264 | 3.69 | | |
| 11 | −326.3135 | 2.00 | 1.75500 | 52.32 |
| 12 | 33.7548 | 6.48 | 1.80810 | 22.76 |
| 13 | −2938.9650 | 1.80 | | |
| 14 | −139.5484 | 2.00 | 1.81600 | 46.62 |
| 15 | 80.6087 | (d15) | | |
| 16 | 36.3892 | 6.50 | 1.63854 | 55.38 |
| 17 | 1172.1590 | 0.20 | | |
| 18 | 47.5000 | 6.00 | 1.60300 | 65.44 |
| 19 | −193.2842 | 2.00 | 1.79504 | 28.69 |
| 20 | 34.9652 | 0.50 | | |
| *21 | 34.4094 | 4.75 | 1.59201 | 67.02 |
| 22 | 250.3789 | (d22) | | |
| 23 | 338.2642 | 1.80 | 1.75500 | 52.32 |
| 24 | 21.0000 | 3.84 | 1.85026 | 32.35 |

TABLE 66-continued

| Surface Number | r | d | nd | vd |
|---|---|---|---|---|
| 25 | 55.4412 | 1.25 | | |
| 26 | 257.4850 | 2.00 | 1.81600 | 46.62 |
| 27 | 55.5783 | 3.30 | | |
| 28 | 0.0000 | (d28) | (aperture stop S) | |
| 29 | 34.7699 | 6.40 | 1.48749 | 70.23 |
| 30 | −54.0693 | 1.50 | 1.78470 | 26.29 |
| 31 | −118.0352 | 5.00 | | |
| *32 | 101.5391 | 3.44 | 1.59201 | 67.02 |
| 33 | −103.4701 | (d33) | | |
| 34 | −37.4152 | 1.50 | 1.81600 | 46.62 |
| 35 | 39.2241 | 4.35 | 1.76182 | 26.52 |
| 36 | −273.3331 | (Bf) | | |

[Each group focal length data]

| Group | First surface | Focal length |
|---|---|---|
| G1 | 1 | 111.2886 |
| G2 | 9 | −33.1811 |
| G3 | 16 | 45.7397 |
| G4 | 23 | −50.3605 |
| G5 | 29 | 40.4786 |
| G6 | 34 | −49.4603 |

In Example 14, the twenty first and thirty second lens surfaces are aspherical. Table 67 shows the [Aspherical data].

TABLE 67

[Aspherical data]

| R | κ | $C_4$ | $C_6$ | $C_8$ | $C_{10}$ |
|---|---|---|---|---|---|
| Twenty first surface | | | | | |
| 34.4094 | +2.1394 | $-7.8728 \times 10^{-6}$ | $-1.0276 \times 10^{-8}$ | $+5.7397 \times 10^{-13}$ | $-3.9681 \times 10^{-14}$ |
| Thirty second surface | | | | | |
| 101.5391 | +8.6994 | $-3.7200 \times 10^{-6}$ | $-5.5601 \times 10^{-9}$ | $+2.6654 \times 10^{-11}$ | $-6.1182 \times 10^{-14}$ |

In Example 14, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 68 shows the [Variable distance data].

TABLE 68

[Variable distance data]

| | Wide-angle end | intermediate focal length | telephoto end |
|---|---|---|---|
| d5 | 12.5694 | 12.5694 | 12.5694 |
| d8 | 2.0000 | 24.6107 | 29.4259 |
| d15 | 53.7638 | 23.9276 | 2.0000 |
| d22 | 2.0000 | 9.2256 | 26.3380 |
| d28 | 20.5472 | 13.9626 | 2.0000 |
| d33 | 10.0198 | 7.9655 | 1.9516 |
| Bf | 54.9999 | 63.6389 | 81.6154 |

Table 69 shows the [Focusing lens group shift distance] in Example 14.

TABLE 69

| [Focusing lens group shift distance] | | | |
|---|---|---|---|
| | Wide-angle end | intermediate focal length | telephoto end |
| f | 81.5936 | 199.3606 | 392.0046 |
| Δ1b | 10.5694 | 10.5694 | 10.5694 |

Table 70 shows the [Conditional expression correspondence value] in Example 14.

TABLE 70

| [Conditional expression correspondence value] |
|---|
| f2 = −33.1811 |
| f4 = −50.3605 |
| f5 = 40.4786 |
| ft = 392.0046 |
| f1b = 195.4172 |
| TL = 258.8949 |
| (9)(−f2)/(−f4) = 0.6589 |
| (10)(−f2)/f5 = 0.8197 |
| (11)ft/f1b = 2.0060 |
| (12)TL/f1b = 1.3248 |

Figure 52A:
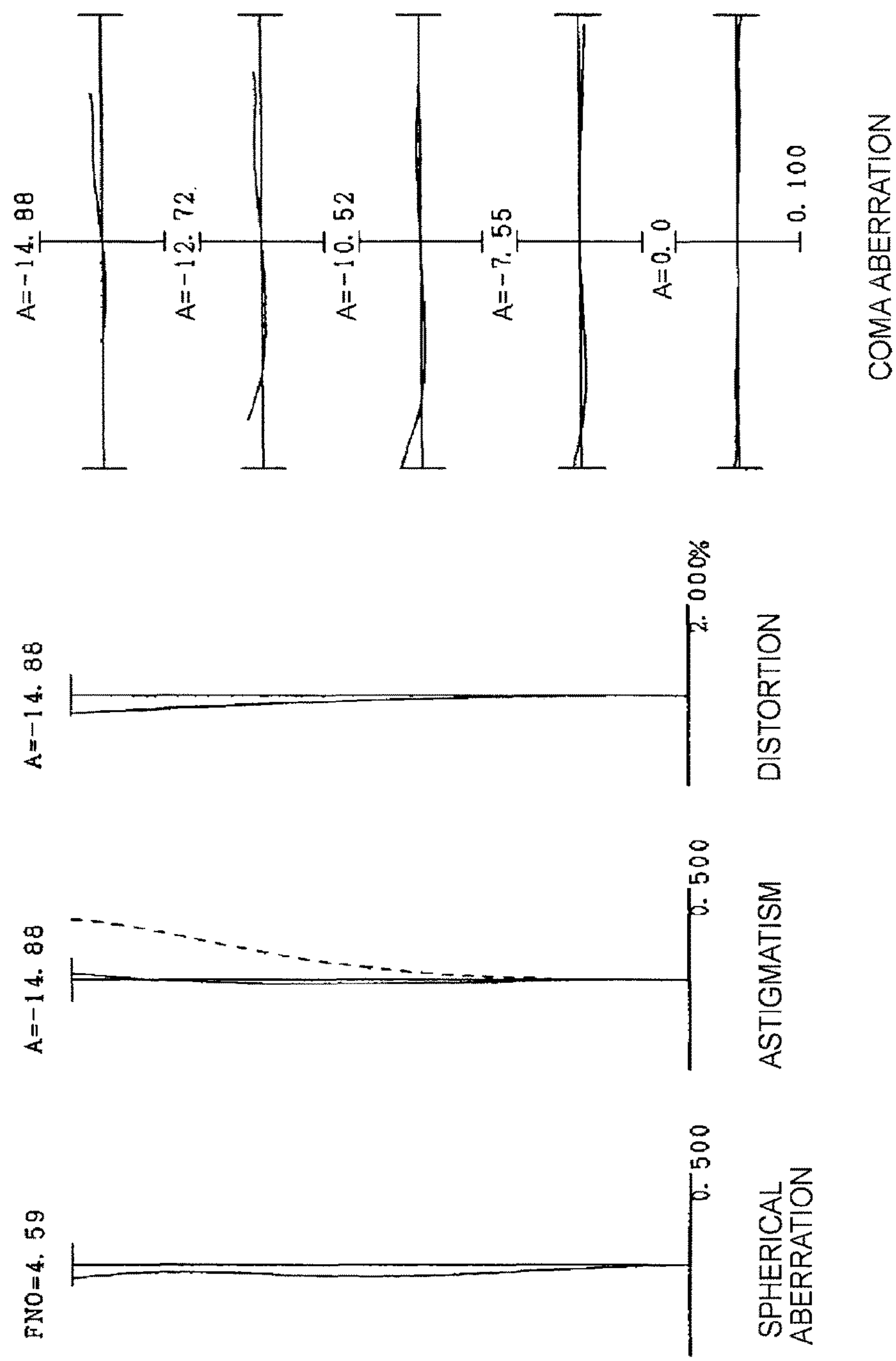
FIG. 52A shows the wide angle end state.
Figure 52B:
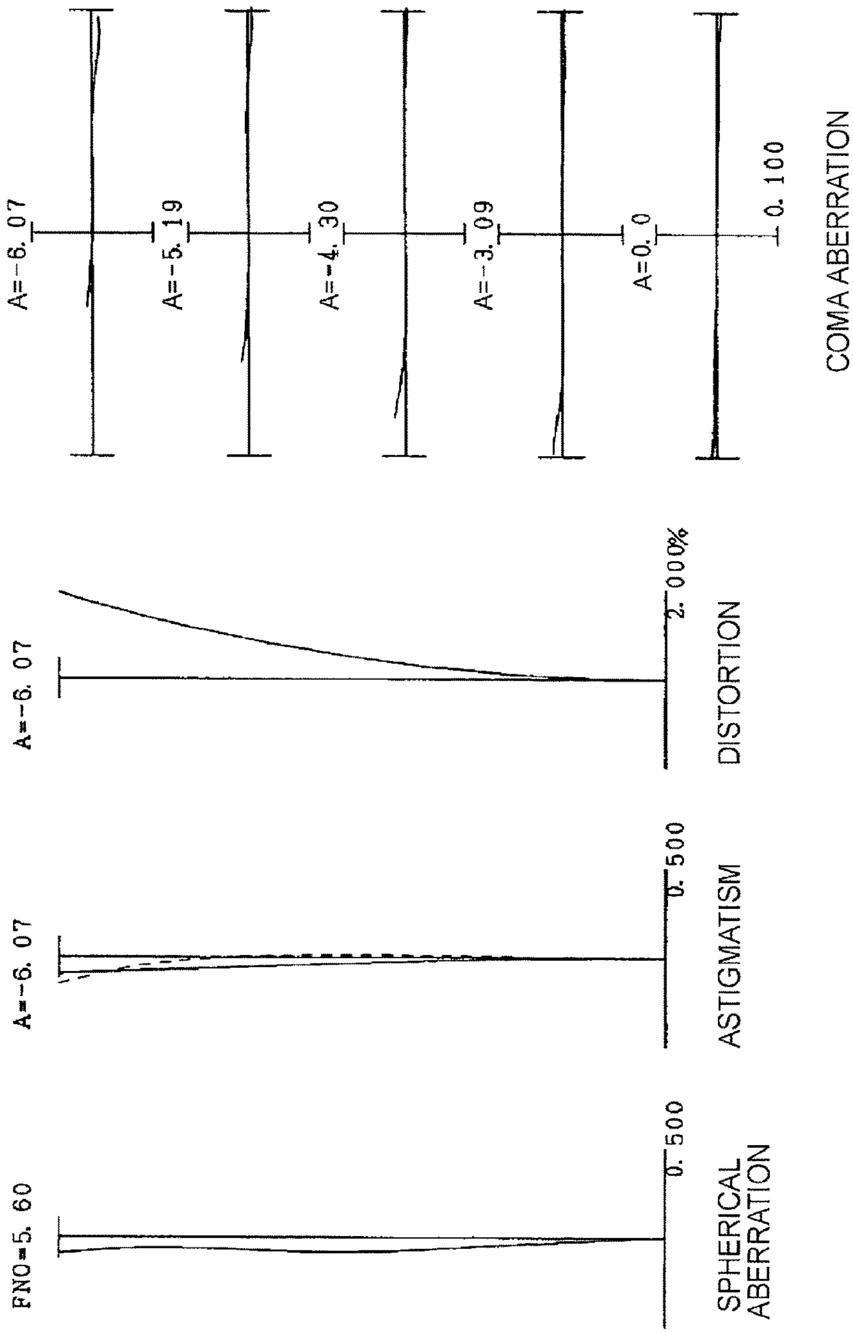
FIG. 52B shows the intermediate focal length state.
Figure 52C:
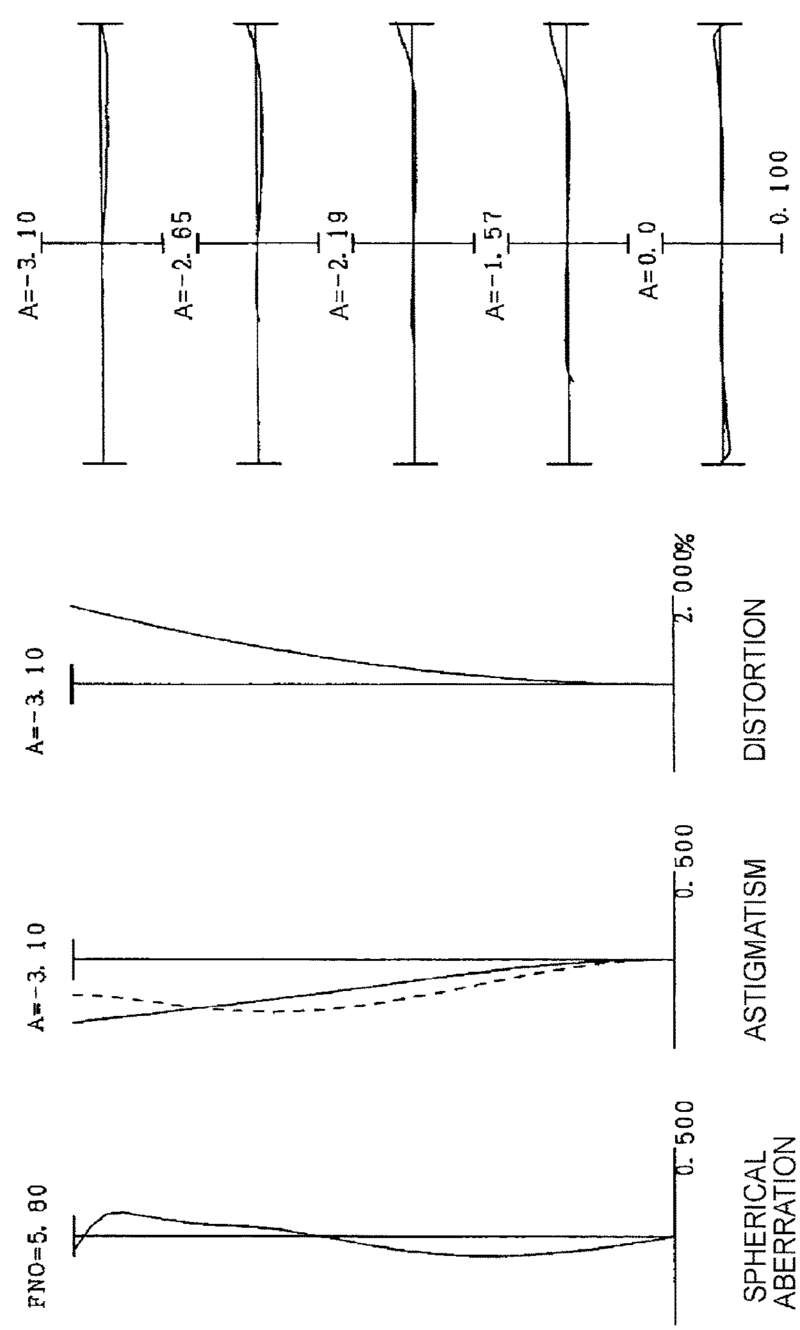
FIG. 52C shows the telephoto end state.
Figure 53A:
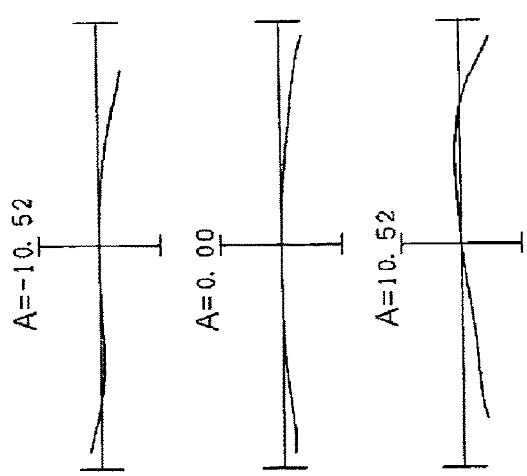
FIG. 53A shows the wide angle end state.
Figure 53B:
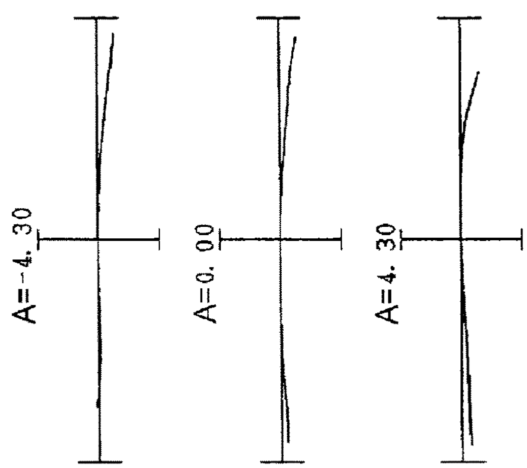
FIG. 53B shows the intermediate focal length state.
Figure 53C:
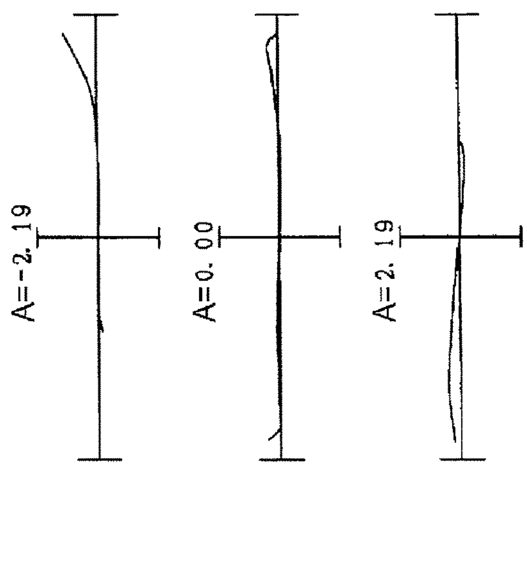
FIG. 53C shows the telephoto end state.
Figure 54A:
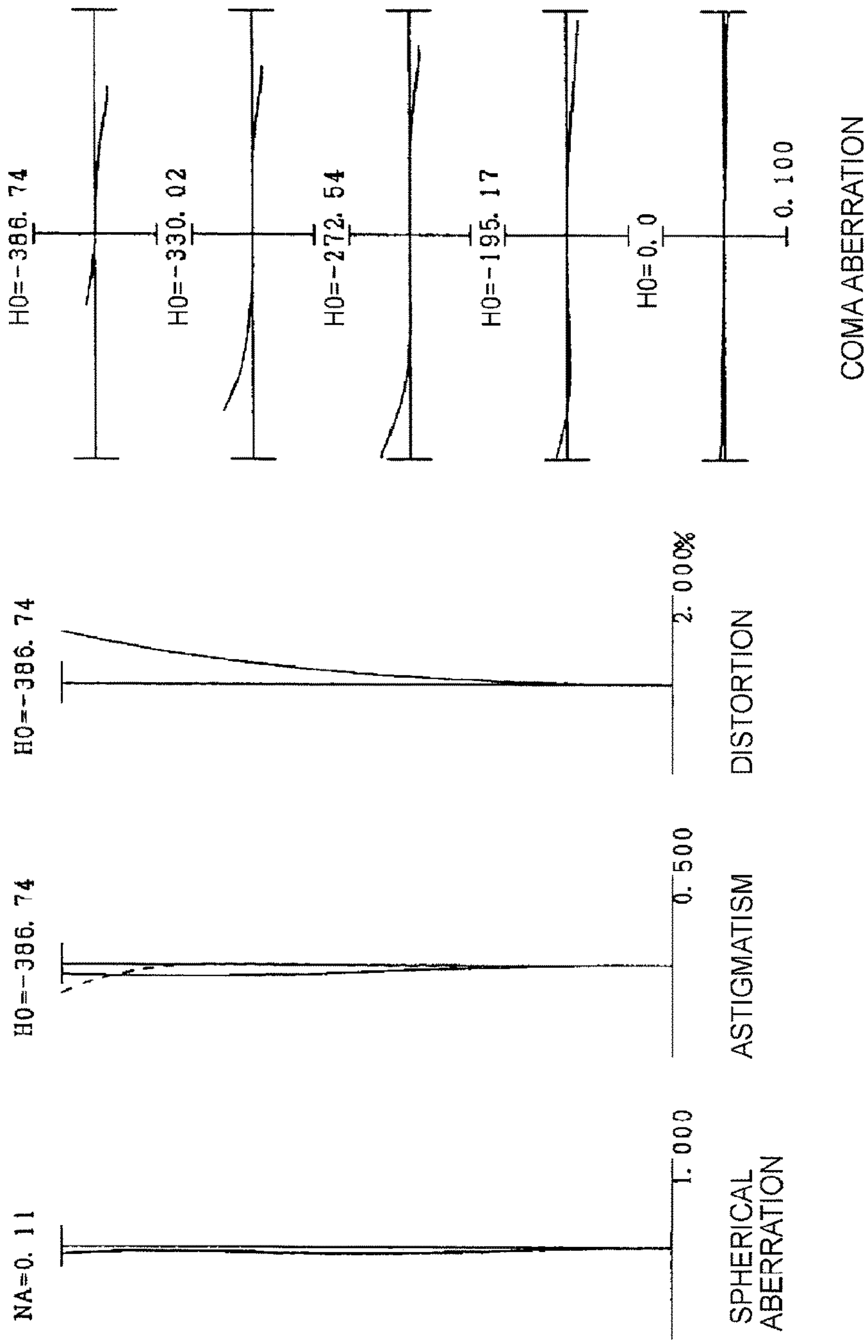
FIG. 54A shows the wide angle end state.
Figure 54B:
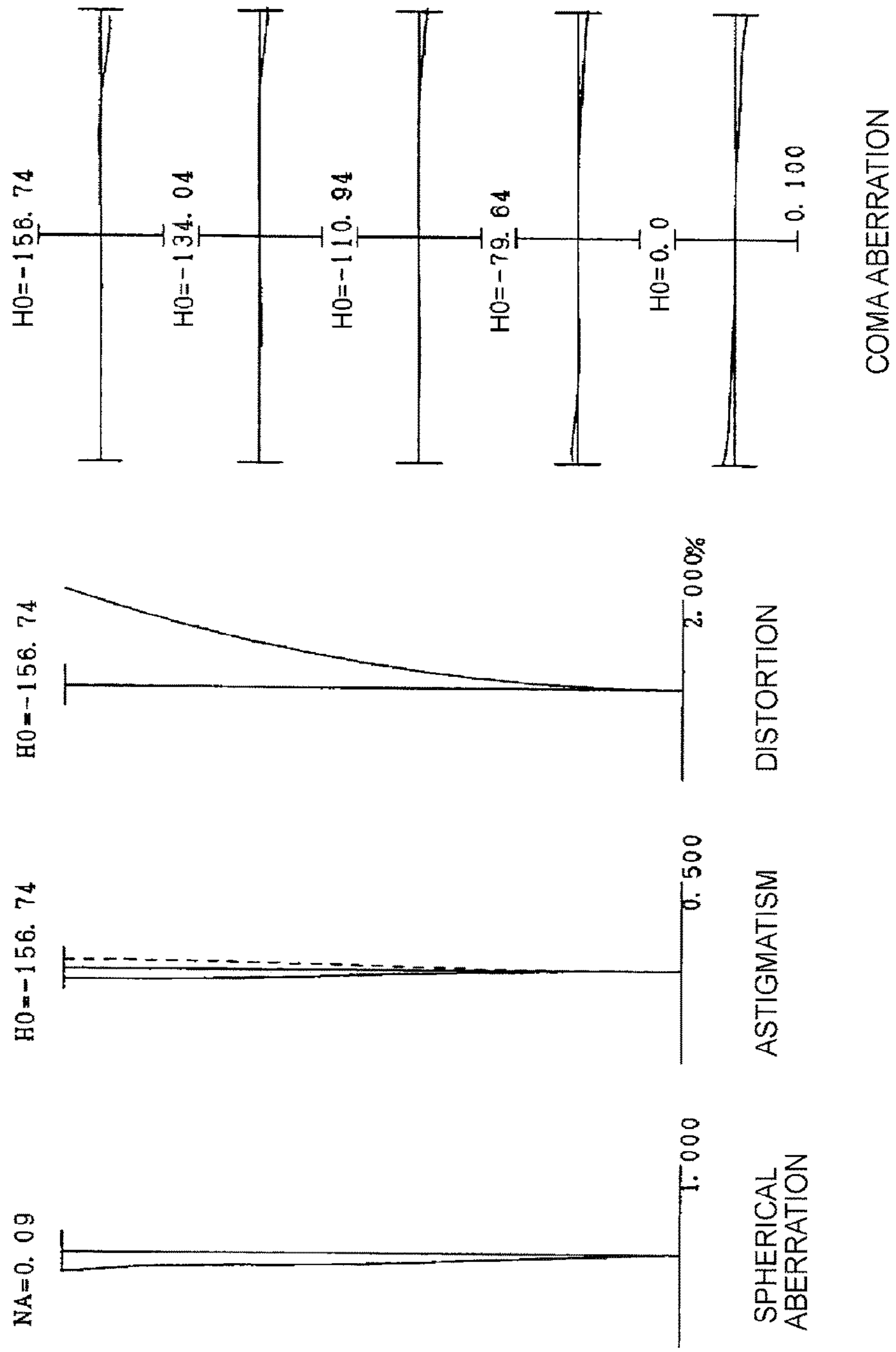
FIG. 54B shows the intermediate focal length state.
Figure 54C:
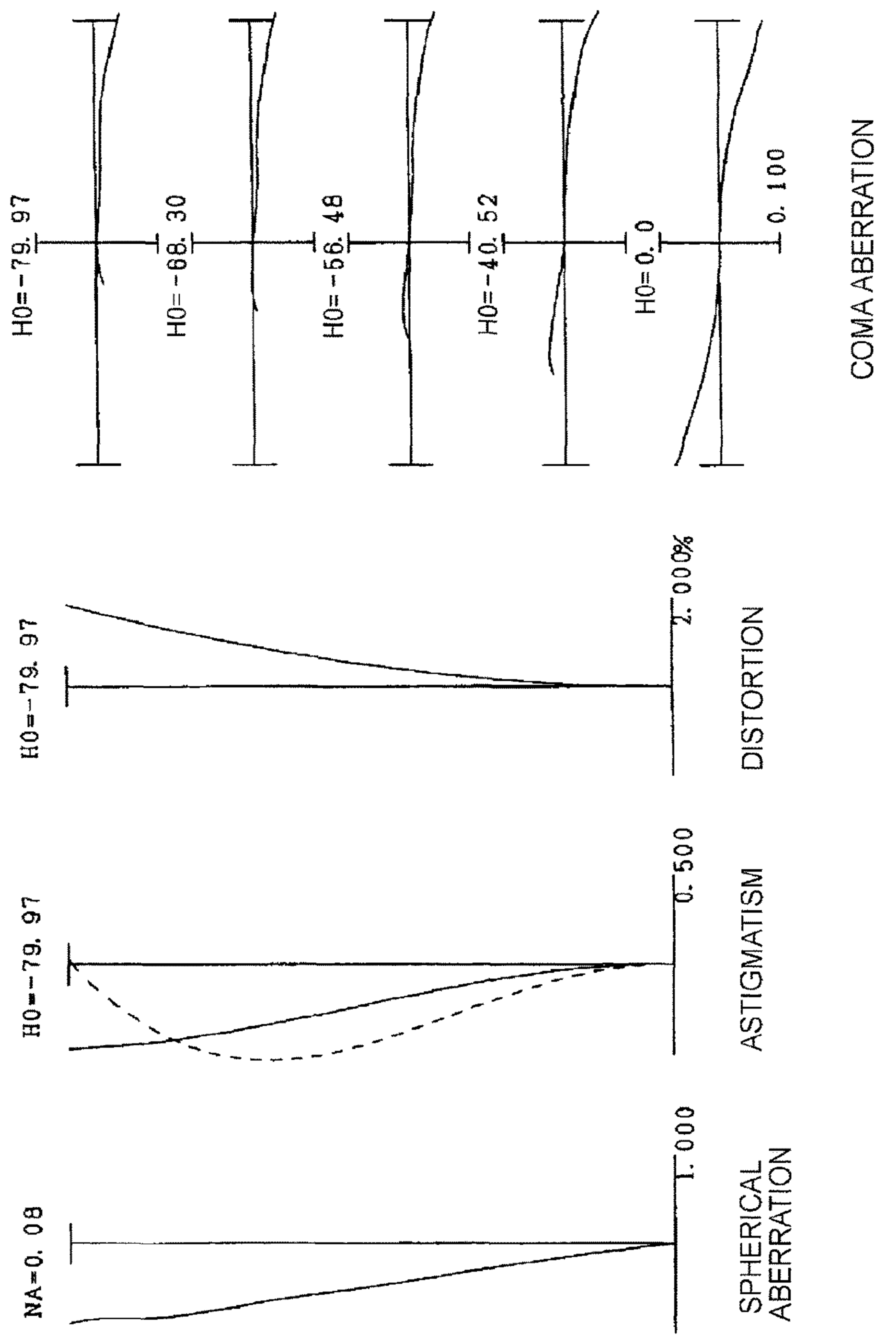
FIG. 54C shows the telephoto end state.

FIGS. 52 to 54 are graphs showing various aberrations of Example 14 at d-line (wavelength: 587.6 nm). In other words, FIG. 52A are graphs showing various aberrations upon focusing on infinity in the wide angle end state (f=81.59 mm), FIG. 52B are graphs showing various aberrations upon focusing on infinity in the intermediate focal length state (f=199.36 mm), and FIG. 52C are graphs showing various aberrations upon focusing on infinity in the telephoto end state (f=392.00 mm). FIG. 53A is a graph showing a coma aberration in the lens shift state (0.4 mm) upon focusing on infinity in the wide angle end state (f=81.59 mm), FIG. 53B is a graph showing a coma aberration in the lens shift state (0.4 mm) upon focusing on infinity in the intermediate focal length state (f=199.36 mm), and FIG. 53C is a graph showing a coma aberration in the lens shift state (0.4 mm) upon focusing on infinity in the telephoto end state (f=392.00 mm). FIG. 54A are graphs showing various aberrations upon close distance focusing (photographic distance: 1.8 m) in the wide angle end state (f=81.59 mm), FIG. 54B are graphs showing various aberrations upon close distance focusing (photographic distance: 1.8 m) in the intermediate focal length state (f=199.36 mm), and FIG. 54C are graphs showing various aberrations upon close distance focusing (photographic distance: 1.8 m) in the telephoto end state (f=392.00 mm).

In each graph showing aberrations, FNO denotes an F number, A denotes a half angle of view, and H0 denotes an object height with respect to each image height. In the graphs showing spherical aberration, a value of the F number corresponding to a maximum aperture is shown, in the graphs showing astigmatism and distortion, a maximum value of the image height is shown respectively, and in the graphs showing coma aberration, a value of each image height is shown. In the graph showing astigmatism, a solid line indicates a sagittal image surface, and a broken line indicates a meridional image surface. This description on graphs showing aberrations is the same for the other examples, for which description is omitted.

As each graph showing aberrations indicates, according to Example 14, various aberrations are corrected well in each focal length state, from the wide angle end state to the telephoto end state, implementing excellent image forming performance.

Example 15

Figure 55:
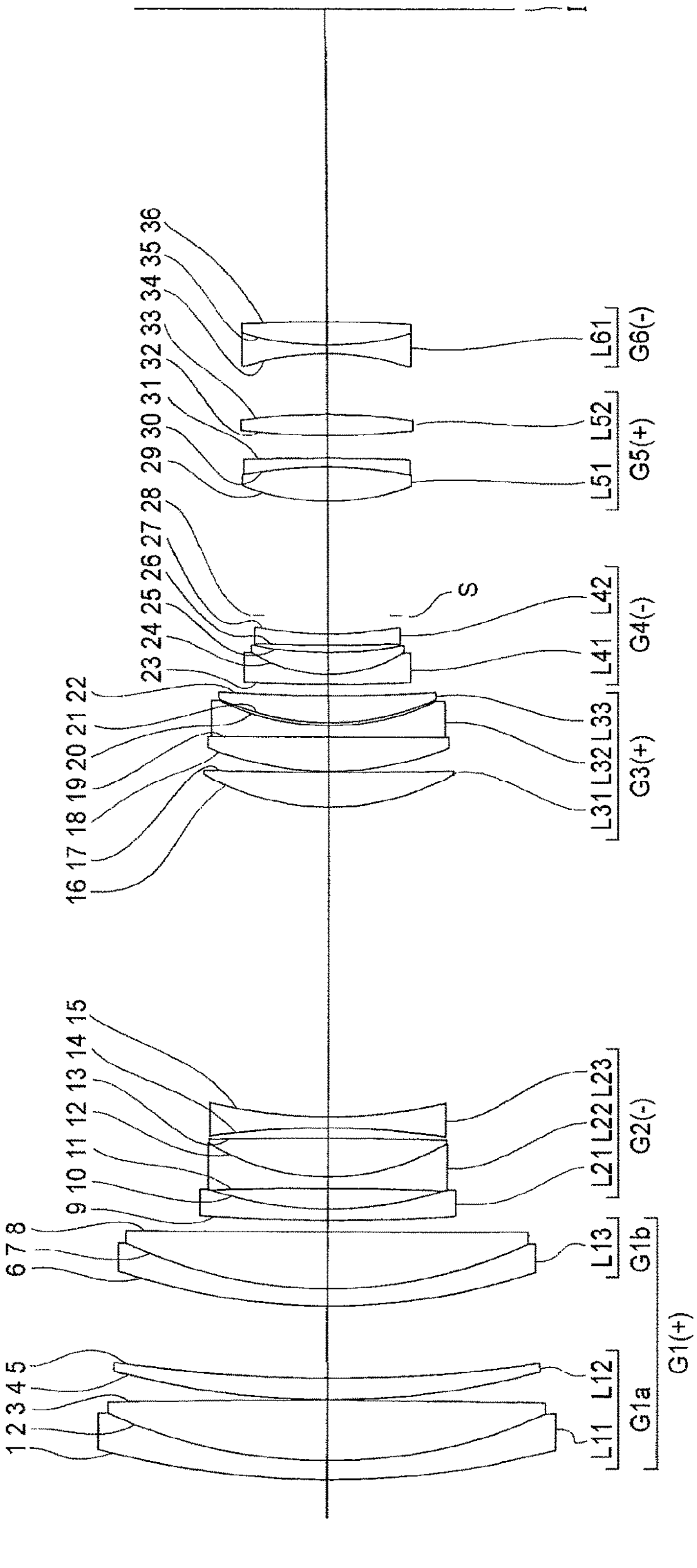
FIG. 55 is a diagram depicting a configuration of a lens system according to Example 15.

Example 15 will now be described with reference to FIG. 55 to FIG. 58 and Table 71 to Table 75. FIG. 55 is a diagram depicting a configuration of a lens system according to Example 15. As FIG. 55 shows, in the lens system according to Example 15, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a positive meniscus lens L31 having a convex surface facing the object, a cemented positive lens L32 in which a biconvex lens and a biconcave lens are cemented, and a positive meniscus lens L33 having a convex surface facing the object.

The fourth lens group G4 has, in order from the object, a cemented negative lens L41 in which a negative meniscus lens having a convex surface facing the object and a positive meniscus lens having a convex surface facing the object are cemented, and a negative meniscus lens L42 having a convex surface facing the object. In this example, all or a part of the fourth lens group G4 shift as a shift lens group, so as to have a component in an approximately orthogonal to the optical axis.

The fifth lens group G5 has, in order from the object, a cemented positive lens L51 in which a biconvex lens and a negative meniscus lens having a convex surface facing the image are cemented, and a biconvex lens L52.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 15 are shown in Table 71.

TABLE 71

| [All parameters] | | | |
|---|---|---|---|
| | Wide-angle end | intermediate focal length | telephoto end |
| f | 81.59~ | 199.36~ | 392.00 |
| FNO | 4.59~ | 5.61~ | 5.81 |
| 2ω | 29.77~ | 12.13~ | 6.20 |
| Image Height | 21.60~ | 21.60~ | 21.60 |
| Total lens Length | 258.89~ | 258.89~ | 258.89 |

TABLE 71-continued

[Lens data]

| Surface Number | r | d | nd | νd |
|---|---|---|---|---|
| 1 | 133.2189 | 3.30 | 1.79952 | 42.24 |
| 2 | 78.8413 | 10.60 | 1.49782 | 82.52 |
| 3 | −1349.4584 | 0.10 | | |
| 4 | 122.6506 | 3.70 | 1.49782 | 82.52 |
| 5 | 220.7135 | (d5) | | |
| 6 | 97.4575 | 3.00 | 1.84666 | 23.78 |
| 7 | 69.9753 | 10.00 | 1.58913 | 61.16 |
| 8 | 24541.3080 | (d8) | | |
| 9 | 282.3894 | 2.00 | 1.81600 | 46.62 |
| 10 | 56.0314 | 3.60 | | |
| 11 | −461.8664 | 2.00 | 1.75500 | 52.32 |
| 12 | 33.3947 | 6.76 | 1.80810 | 22.76 |
| 13 | −738.5057 | 1.80 | | |
| 14 | −126.0189 | 2.00 | 1.81600 | 46.62 |
| 15 | 74.9764 | (d15) | | |
| 16 | 37.2017 | 6.19 | 1.64000 | 60.08 |
| 17 | 576.2061 | 0.20 | | |
| 18 | 47.5000 | 6.00 | 1.60300 | 65.44 |
| 19 | −7507.9456 | 2.00 | 1.80518 | 25.42 |
| 20 | 36.3965 | 0.50 | | |
| *21 | 34.8130 | 4.75 | 1.59201 | 67.02 |
| 22 | 233.2302 | (d22) | | |
| 23 | 229.8851 | 1.80 | 1.75500 | 52.32 |
| 24 | 21.0000 | 3.87 | 1.85026 | 32.35 |
| 25 | 56.8337 | 1.27 | | |
| 26 | 310.8842 | 2.00 | 1.81600 | 46.62 |
| 27 | 51.7027 | 3.30 | | |
| 28 | 0.0000 | (d28) | (aperture stop S) | |
| 29 | 33.4670 | 6.20 | 1.48749 | 70.23 |
| 30 | −59.9741 | 1.50 | 1.72342 | 37.95 |
| 31 | −389.3003 | 4.00 | | |
| *32 | 92.5529 | 3.79 | 1.59201 | 67.02 |
| 33 | −79.9013 | (d33) | | |
| 34 | −36.8881 | 1.50 | 1.81600 | 46.62 |
| 35 | 44.4662 | 4.15 | 1.75520 | 27.51 |
| 36 | −209.2278 | (Bf) | | |

[Each group focal length data]

| Group | First surface | Focal length |
|---|---|---|
| G1 | 1 | 111.9505 |
| G2 | 9 | −33.2912 |
| G3 | 16 | 45.4892 |
| G4 | 23 | −50.1305 |
| G5 | 29 | 40.9529 |
| G6 | 34 | −50.9236 |

In Example 15, the twenty first and thirty second lens surfaces are aspherical. Table 72 shows the [Aspherical data].

TABLE 72

[Aspherical data]

| R | κ | $C_4$ | $C_6$ | $C_8$ | $C_{10}$ |
|---|---|---|---|---|---|
| Twenty first surface | | | | | |
| 34.8130 | +2.1787 | $-7.5607 \times 10^{-6}$ | $-9.8093 \times 10^{-9}$ | $+7.0798 \times 10^{-13}$ | $-3.7586 \times 10^{-14}$ |
| Thirty second surface | | | | | |
| 92.5529 | +10.9948 | $-5.1008 \times 10^{-6}$ | $-6.0990 \times 10^{-9}$ | $+2.5694 \times 10^{-11}$ | $-6.0529 \times 10^{-14}$ |

In Example 15, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 73 shows the [Variable distance data].

TABLE 73

[Variable distance data]

| | Wide-angle end | intermediate focal length | telephoto end |
|---|---|---|---|
| d5 | 12.7700 | 12.7700 | 12.7700 |
| d8 | 2.0000 | 24.7297 | 29.0024 |
| d15 | 54.4773 | 24.4138 | 2.0000 |
| d22 | 2.0000 | 9.3337 | 27.4749 |
| d28 | 20.1271 | 13.9837 | 2.0000 |
| d33 | 10.6112 | 8.2089 | 1.8252 |
| Bf | 54.9997 | 63.5451 | 81.9118 |

Table 74 shows the [Focusing lens group shift distance] in Example 15.

TABLE 74

[Focusing lens group shift distance]

| | Wide-angle end | intermediate focal length | telephoto end |
|---|---|---|---|
| f | 81.5935 | 199.3602 | 392.0023 |
| Δ1b | 10.7700 | 10.7700 | 10.7700 |

Table 75 shows the [Conditional expression correspondence value] in Example 15.

TABLE 75

[Conditional expression correspondence value]

$f2 = -33.2912$
$f4 = -50.1305$
$f5 = 40.9529$
$ft = 392.0023$
$f1b = 198.5617$
$TL = 258.8947$
(9)$(-f2)/(-f4) = 0.6641$
(10)$(-f2)/f5 = 0.8129$
(11)$ft/f1b = 1.9742$
(12)$TL/f1b = 1.3039$

Figure 56A:
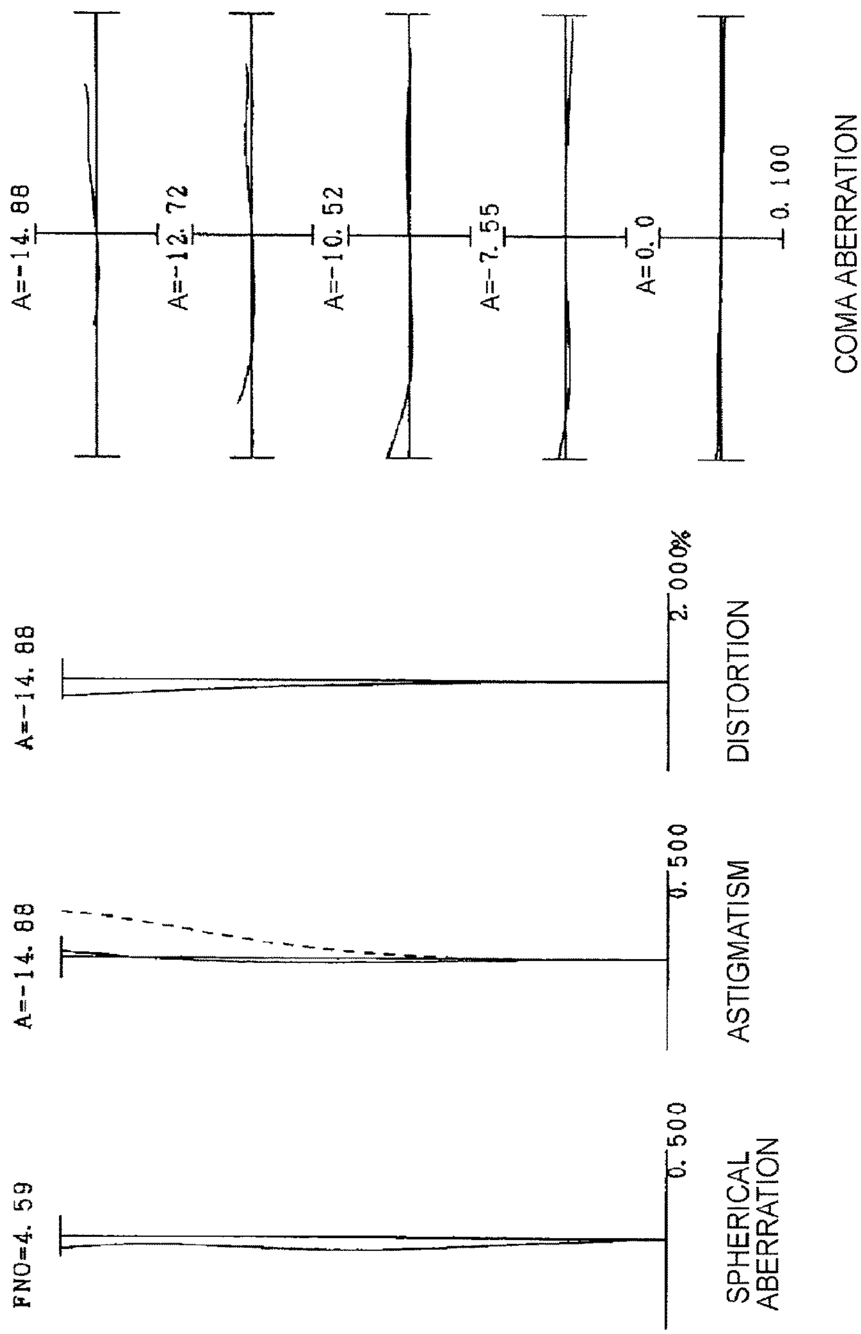
FIG. 56A shows the wide angle end state.
Figure 56B:
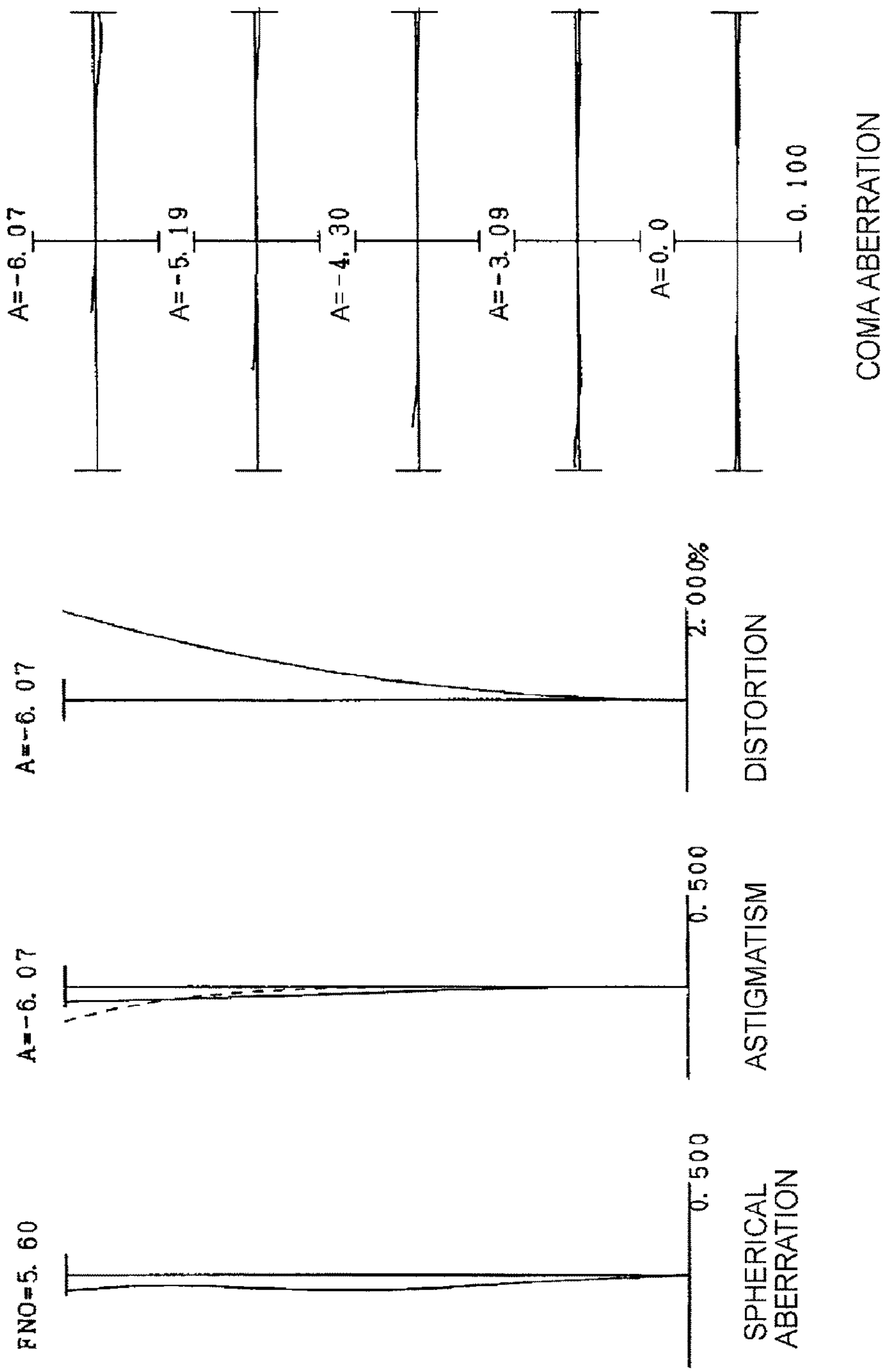
FIG. 56B shows the intermediate focal length state.
Figure 56C:
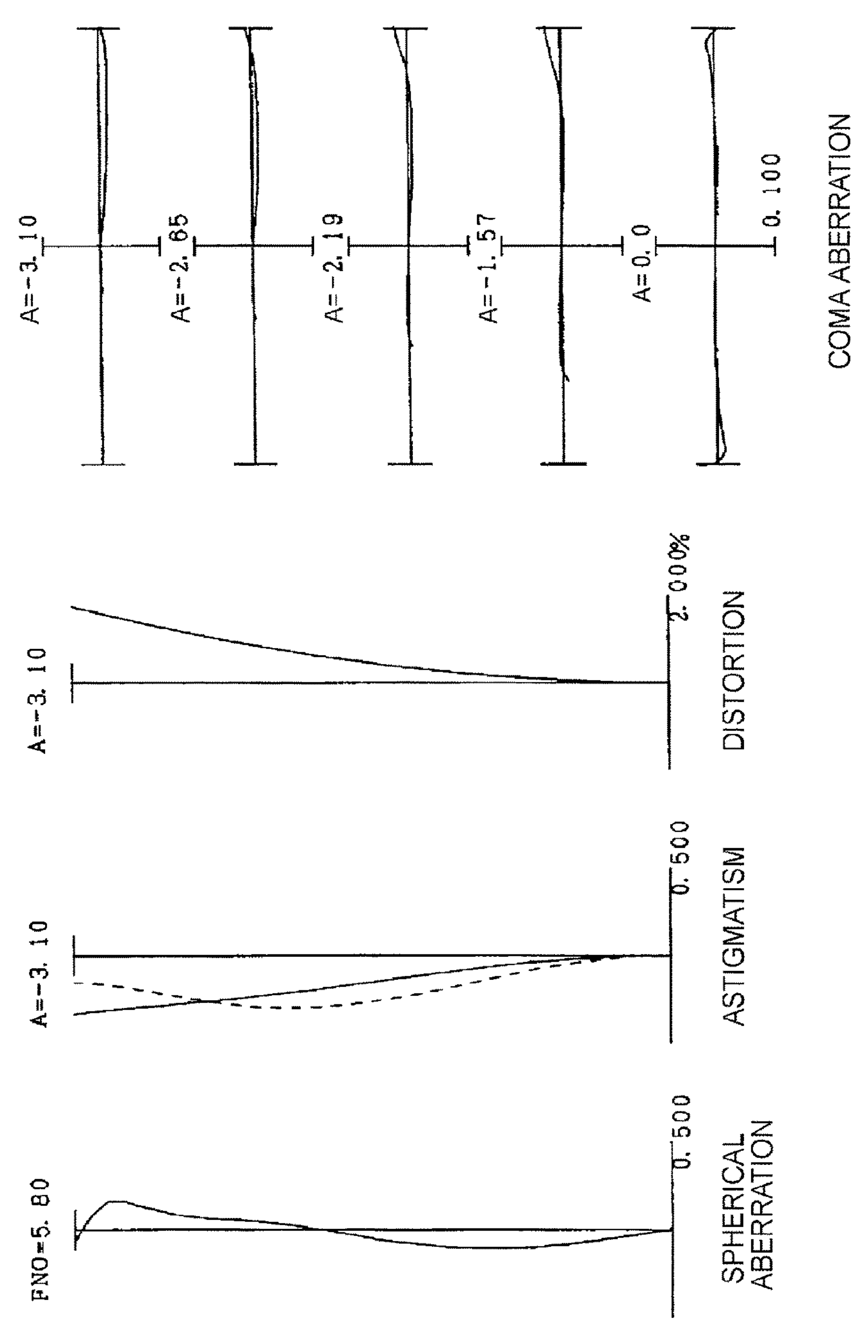
FIG. 56C shows the telephoto end state.
Figure 57C:
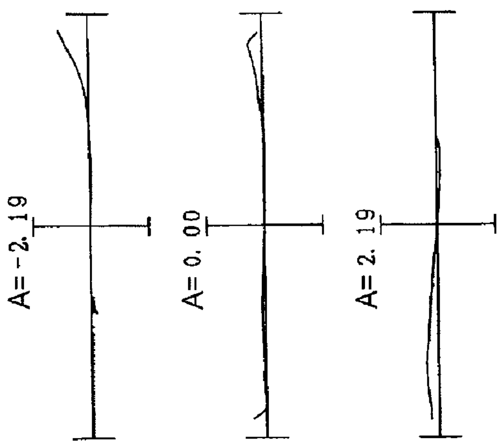
FIG. 57C shows the telephoto end state.
Figure 57B:
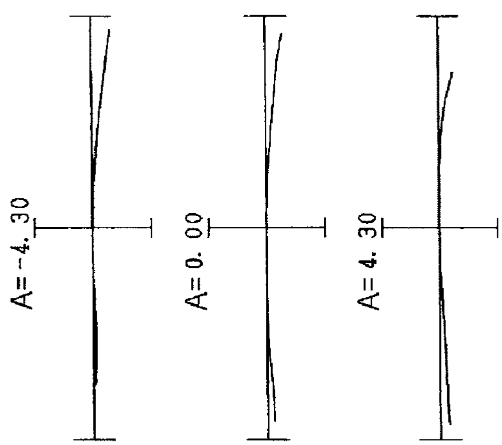
FIG. 57B shows the intermediate focal length state.
Figure 57A:
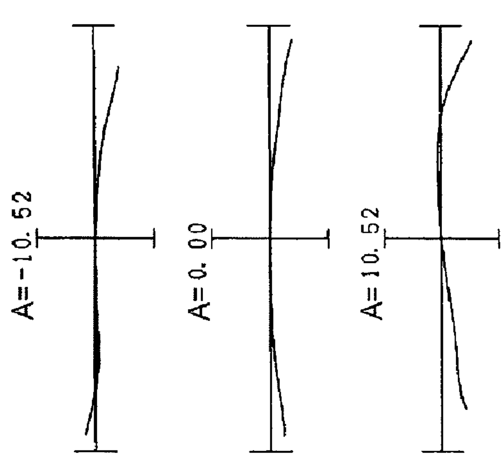
FIG. 57A shows the wide angle end state.
Figure 58A:
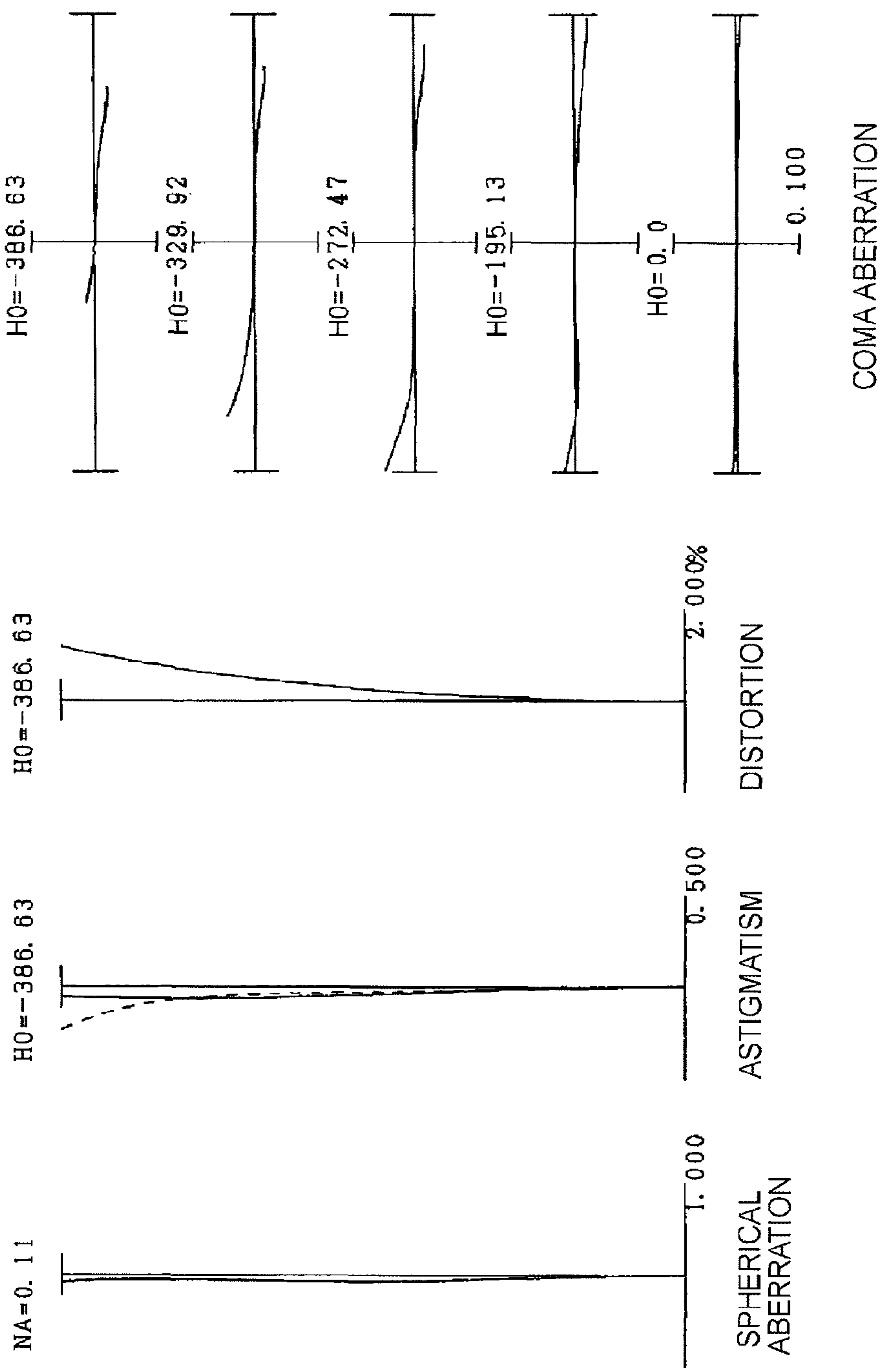
FIG. 58A shows the wide angle end state.
Figure 58B:
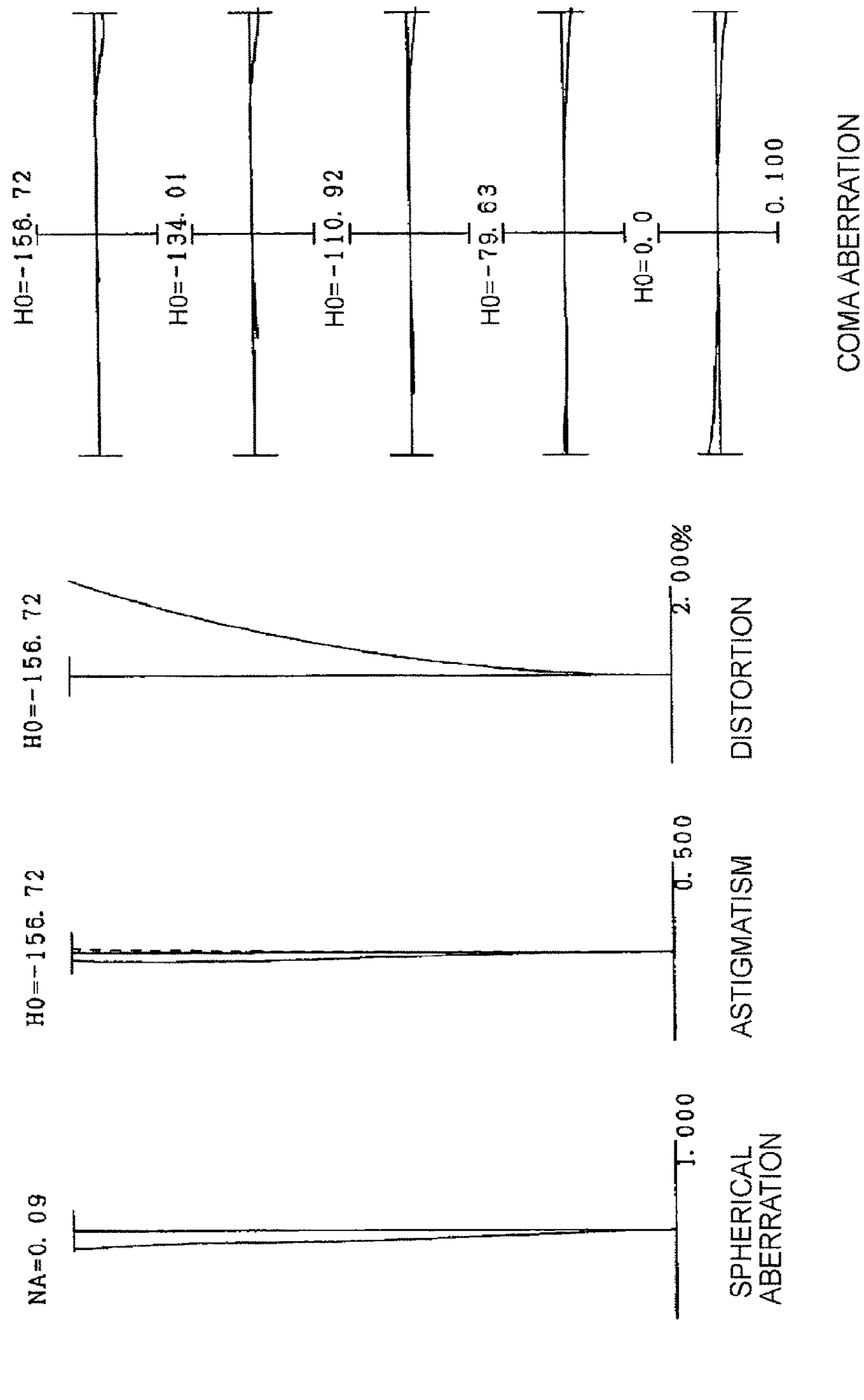
FIG. 58B shows the intermediate focal length state.
Figure 58C:
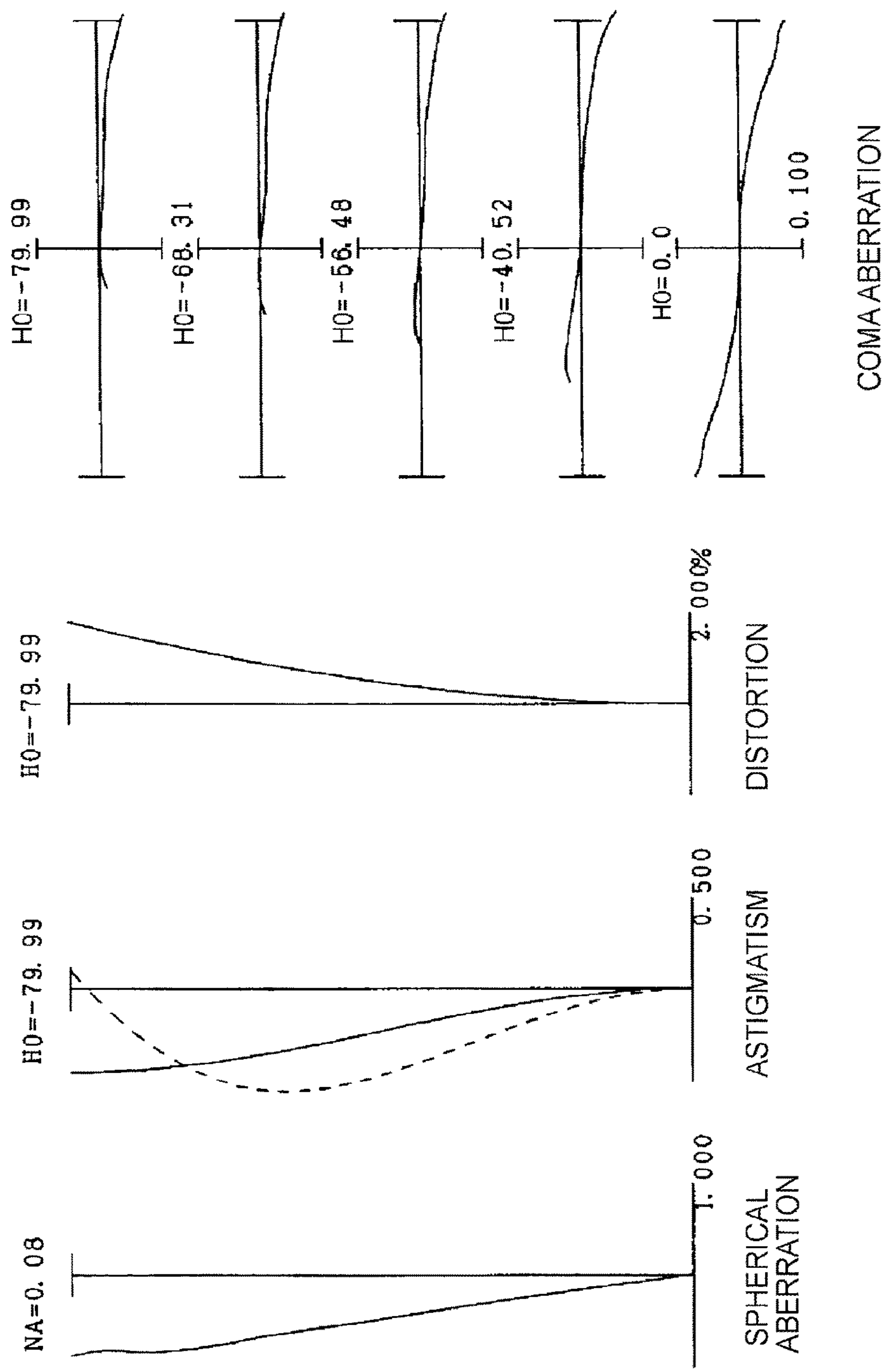
FIG. 58C shows the telephoto end state.

FIGS. 56 to 58 are graphs showing various aberrations of Example 15 at d-line (wavelength: 587.6 nm). In other words, FIG. 56A are graphs showing various aberrations upon focusing on infinity in the wide angle end state (f=81.59 mm), FIG. 56B are graphs showing various aberrations upon focusing on infinity in the intermediate focal length state (f=199.36 mm), and FIG. 56C are graphs showing various aberrations upon focusing on infinity in the telephoto end state (f=392.00 mm). FIG. 57A is a graph showing a coma aberration in the lens shift state (0.4 mm) upon focusing on infinity in the wide angle end state (f=81.59 mm), FIG. 57B is a graph showing a coma aberration in the lens shift state (0.4 mm) upon focusing on infinity in the intermediate focal length state (f=199.36 mm), and FIG. 57C is a graph showing a coma aberration in the lens shift state (0.4 mm) upon focusing on infinity in the telephoto end state (f=392.00 mm). FIG. 58A are graphs showing various aberrations upon close distance focusing (photographic distance: 1.8 m) in the wide angle end state (f=81.59 mm), FIG. 58B are graphs showing various aberrations upon close distance focusing (photographic distance: 1.8 m) in the intermediate focal length state (f=199.36 mm), and FIG. 58C are graphs showing various aberrations upon close distance focusing (photographic distance: 1.8 m) in the telephoto end state (f=392.00 mm).

As each graph showing aberrations indicates, according to Example 15, various aberrations are corrected well in each focal length state, from the wide angle end state to the telephoto end state, implementing excellent image forming performance.

Example 16

Figure 59:
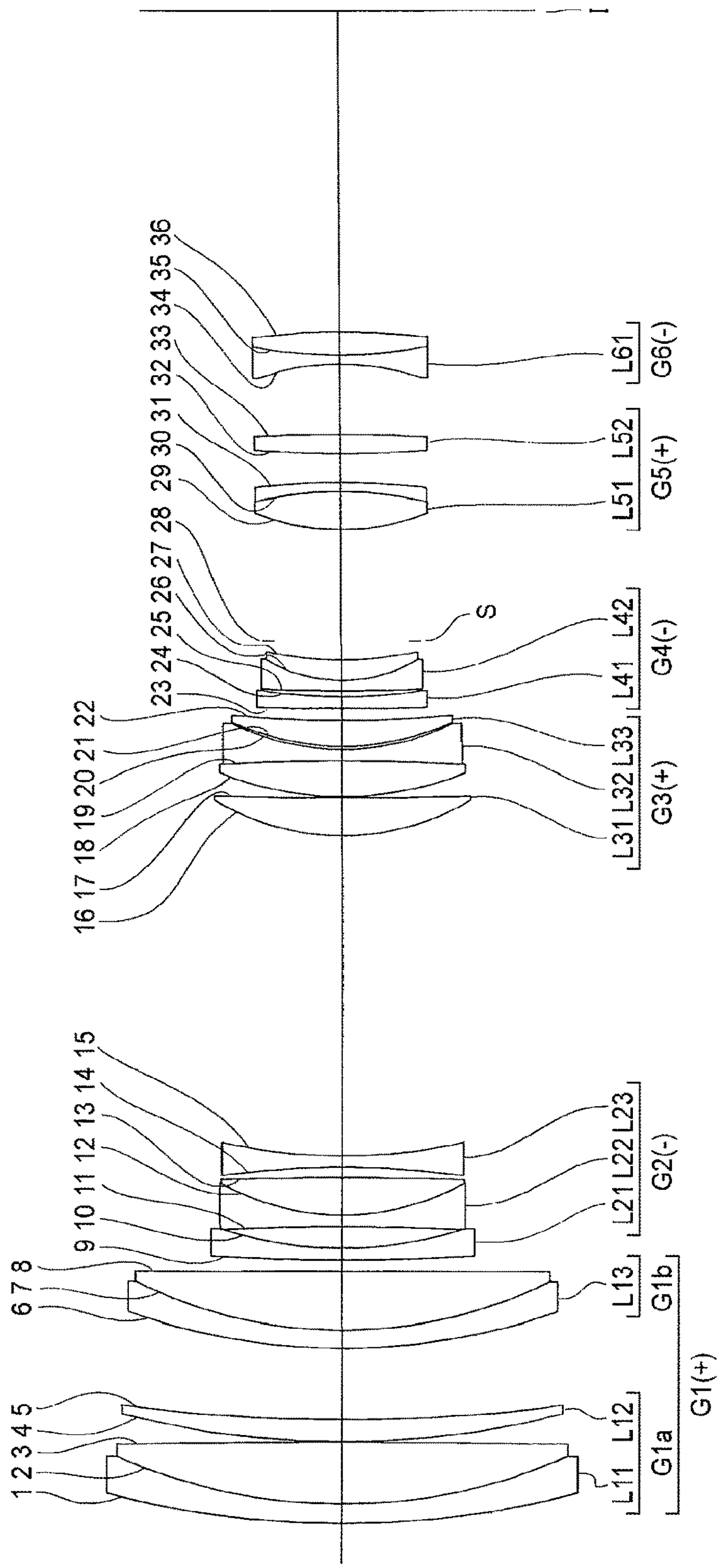
FIG. 59 is a diagram depicting a configuration of a lens system according to Example 16.

Example 16 will now be described with reference to FIG. 59 to FIG. 61 and Table 76 to Table 80. FIG. 59 is a diagram depicting a configuration of a lens system according to Example 16. As FIG. 59 shows, in the lens system according to Example 16, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a biconvex lens are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a positive meniscus lens L31 having a convex surface facing the object, a cemented positive lens L32 in which a biconvex lens and a biconcave lens are cemented, and a positive meniscus lens L33 having a convex surface facing the object.

The fourth lens group G4 has, in order from the object, a negative meniscus lens L41 having a convex surface facing the object, and a cemented negative lens L42 in which a negative meniscus lens having a convex surface facing the object and a positive meniscus lens having a convex surface facing the object are cemented.

The fifth lens group G5 has, in order from the object, a cemented positive lens L51 in which a biconvex lens and a negative meniscus lens having a convex surface facing the image are cemented, and a biconvex lens L52.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 16 are shown in Table 76.

TABLE 76

[All parameters]

| | Wide-angle end | | intermediate focal length | | telephoto end |
|---|---|---|---|---|---|
| f | 81.59 | ~ | 199.36 | ~ | 392.00 |
| FNO | 4.59 | ~ | 5.61 | ~ | 5.80 |
| 2ω | 29.77 | ~ | 12.13 | ~ | 6.21 |
| Image Height | 21.60 | ~ | 21.60 | ~ | 21.60 |

TABLE 76-continued

| | | | | | |
|---|---|---|---|---|---|
| Total lens Length | 258.90 | ~ | 258.90 | ~ | 258.90 |

[Lens data]

| Surface Number | r | d | nd | νd |
|---|---|---|---|---|
| 1 | 134.8455 | 3.30 | 1.79952 | 42.24 |
| 2 | 79.5748 | 10.60 | 1.49782 | 82.52 |
| 3 | −1547.8058 | 0.10 | | |
| 4 | 128.2096 | 3.70 | 1.49782 | 82.52 |
| 5 | 242.3479 | (d5) | | |
| 6 | 93.5271 | 3.00 | 1.84666 | 23.78 |
| 7 | 66.9353 | 10.00 | 1.58913 | 61.16 |
| 8 | −75015.782 | (d8) | | |
| 9 | 332.8521 | 2.00 | 1.81600 | 46.62 |
| 10 | 55.2905 | 3.62 | | |
| 11 | −438.4927 | 2.00 | 1.75500 | 52.32 |
| 12 | 35.2527 | 6.40 | 1.80810 | 22.76 |
| 13 | −696.2189 | 1.80 | | |
| 14 | −129.8079 | 2.00 | 1.81600 | 46.62 |
| 15 | 77.0152 | (d15) | | |
| 16 | 35.4471 | 6.49 | 1.63854 | 55.38 |
| 17 | 578.5681 | 0.20 | | |
| 18 | 47.5000 | 6.01 | 1.60300 | 65.44 |
| 19 | −313.3385 | 2.00 | 1.79504 | 28.69 |
| 20 | 35.4290 | 0.50 | | |
| *21 | 33.7197 | 4.50 | 1.59201 | 67.02 |
| 22 | 162.9293 | (d22) | | |
| 23 | 403.1724 | 2.00 | 1.81600 | 46.62 |
| 24 | 70.4507 | 1.06 | | |
| 25 | 229.8851 | 1.80 | 1.75500 | 52.32 |
| 26 | 21.0000 | 3.56 | 1.85026 | 32.35 |
| 27 | 49.2909 | 3.30 | | |
| 28 | 0.0000 | (d28) | (aperture stop S) | |
| 29 | 33.1928 | 6.40 | 1.48749 | 70.23 |
| 30 | −53.2227 | 1.50 | 1.78470 | 26.29 |
| 31 | −111.4723 | 5.00 | | |
| *32 | 121.2854 | 3.30 | 1.59201 | 67.02 |
| 33 | −199.8057 | (d33) | | |
| 34 | −33.5352 | 1.50 | 1.81600 | 46.62 |
| 35 | 60.5640 | 3.97 | 1.76182 | 26.52 |
| 36 | −106.9829 | (Bf) | | |

[Each group focal length data]

| Group | First surface | Focal length |
|---|---|---|
| G1 | 1 | 109.8643 |
| G2 | 9 | −32.9572 |
| G3 | 16 | 46.0530 |
| G4 | 23 | −52.1621 |
| G5 | 29 | 44.3871 |
| G6 | 34 | −56.8957 |

In Example 16, the twenty first and thirty second lens surfaces are aspherical. Table 77 shows the [Aspherical data].

TABLE 77

| [Aspherical data] | | | | | |
|---|---|---|---|---|---|
| R | κ | $C_4$ | $C_6$ | $C_8$ | $C_{10}$ |
| Twenty first surface | | | | | |
| 33.7197 | +2.0962 | $-8.1989 \times 10^{-6}$ | $-1.1471 \times 10^{-8}$ | $+1.2837 \times 10^{-12}$ | $-4.5945 \times 10^{-14}$ |
| Thirty second surface | | | | | |
| 121.2854 | −5.4957 | $-2.6213 \times 10^{-6}$ | $-8.3350 \times 10^{-9}$ | $+4.5271 \times 10^{-11}$ | $-1.0236 \times 10^{-13}$ |

In Example 16, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 78 shows the [Variable distance data].

TABLE 78

| [Variable distance data] | | | |
|---|---|---|---|
| | Wide-angle end | intermediate focal length | telephoto end |
| d5 | 12.1838 | 12.1838 | 12.1838 |
| d8 | 2.0000 | 25.0203 | 29.4123 |
| d15 | 54.7687 | 24.6430 | 2.0000 |
| d22 | 2.0000 | 9.1053 | 27.3564 |
| d28 | 19.2143 | 13.8160 | 2.0000 |
| d33 | 12.1235 | 9.6991 | 2.4325 |
| Bf | 55.0001 | 62.8228 | 81.9052 |

Table 79 shows the [Focusing lens group shift distance] in Example 16.

TABLE 79

| [Focusing lens group shift distance] | | | |
|---|---|---|---|
| | Wide-angle end | intermediate focal length | telephoto end |
| f | 81.5937 | 199.3609 | 392.0048 |
| Δ1b | 10.1838 | 10.1838 | 10.1838 |

Table 80 shows the [Conditional expression correspondence value] in Example 16.

TABLE 80

| [Conditional expression correspondence value] |
|---|
| f2 = −32.9572 |
| f4 = −52.1621 |
| f5 = 44.3871 |
| ft = 392.0048 |
| f1b = 189.7831 |
| TL = 258.8951 |
| (9) (−f2)/(−f4) = 0.6318 |
| (10) (−f2)/f5 = 0.7425 |
| (11) ft/f1b = 2.0655 |
| (12) TL/f1b = 1.3642 |

Figure 60A:
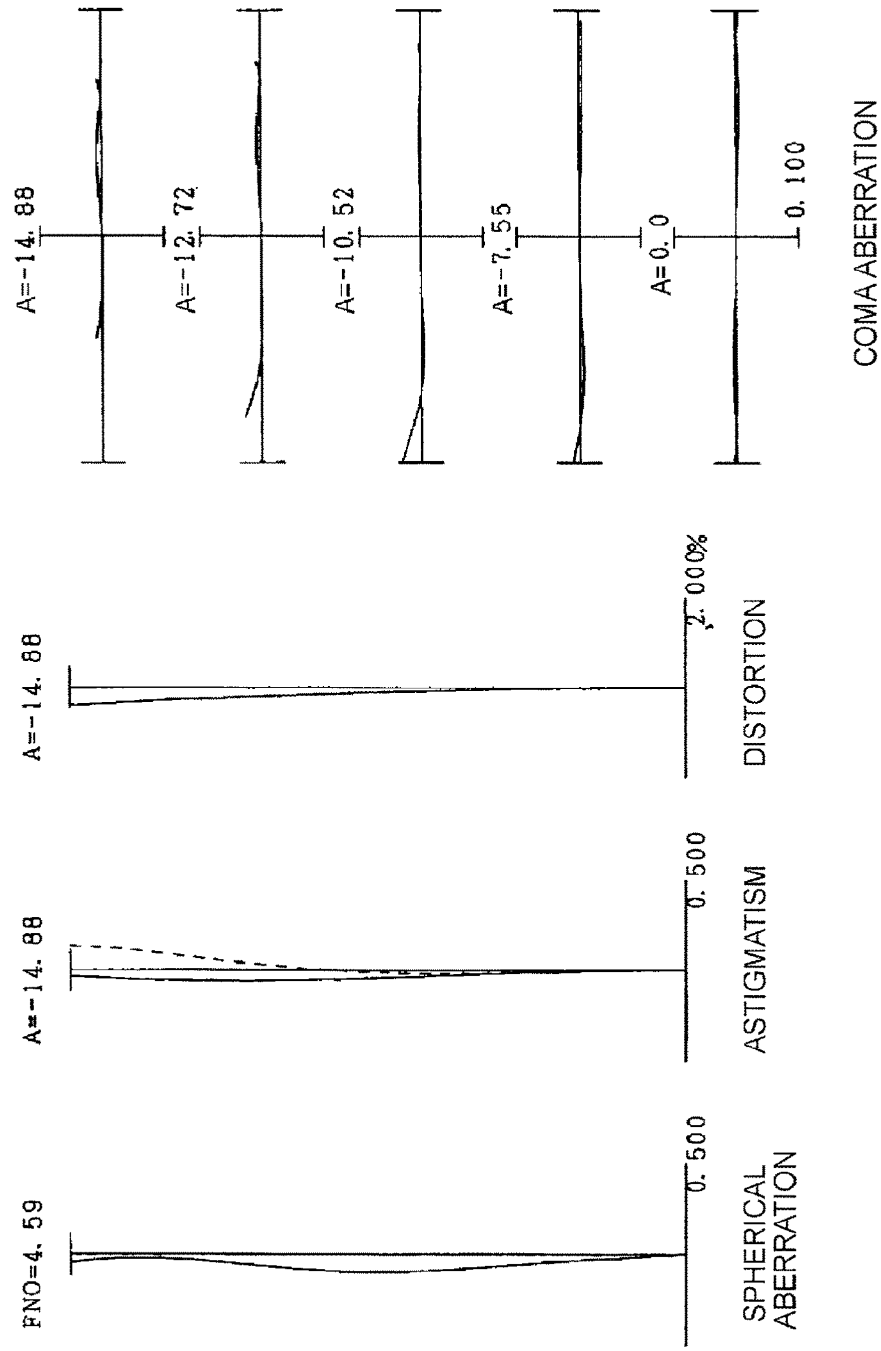
FIG. 60A shows the wide angle end state.
Figure 60B:
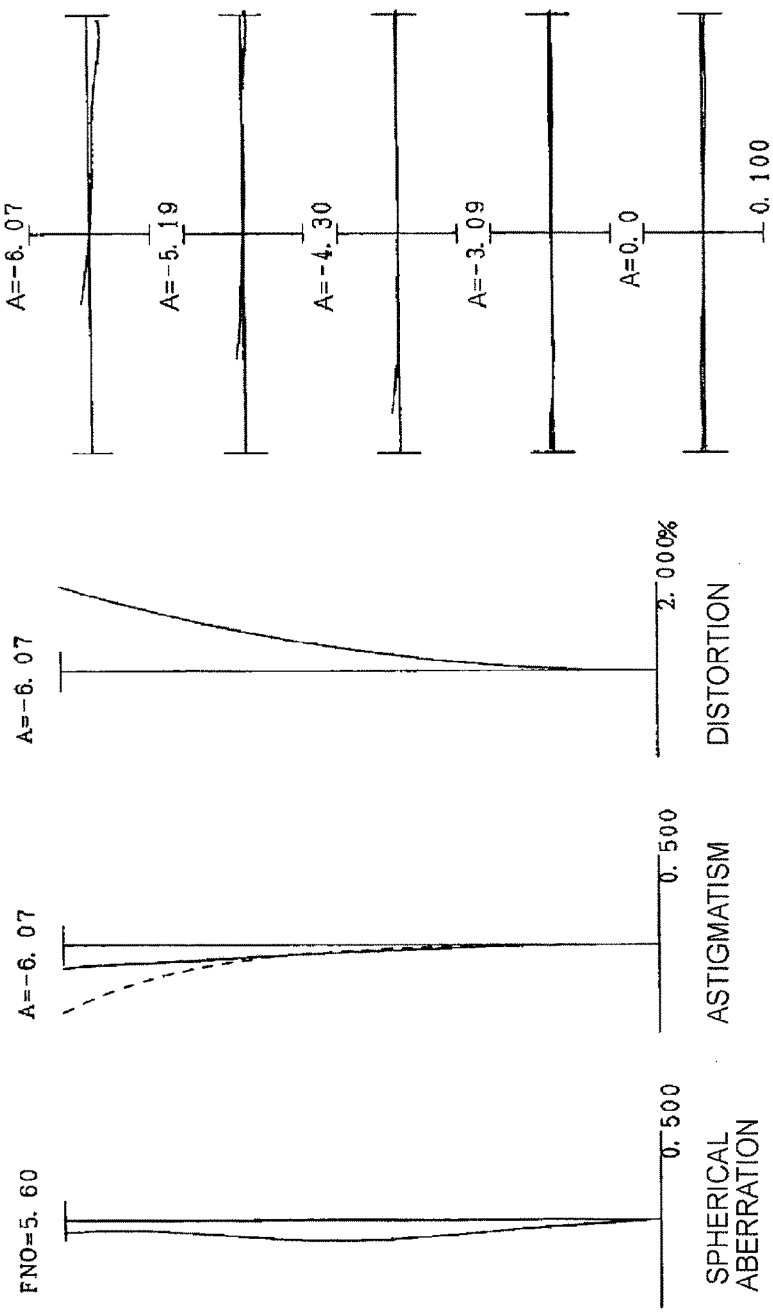
FIG. 60B shows the intermediate focal length state.
Figure 60C:
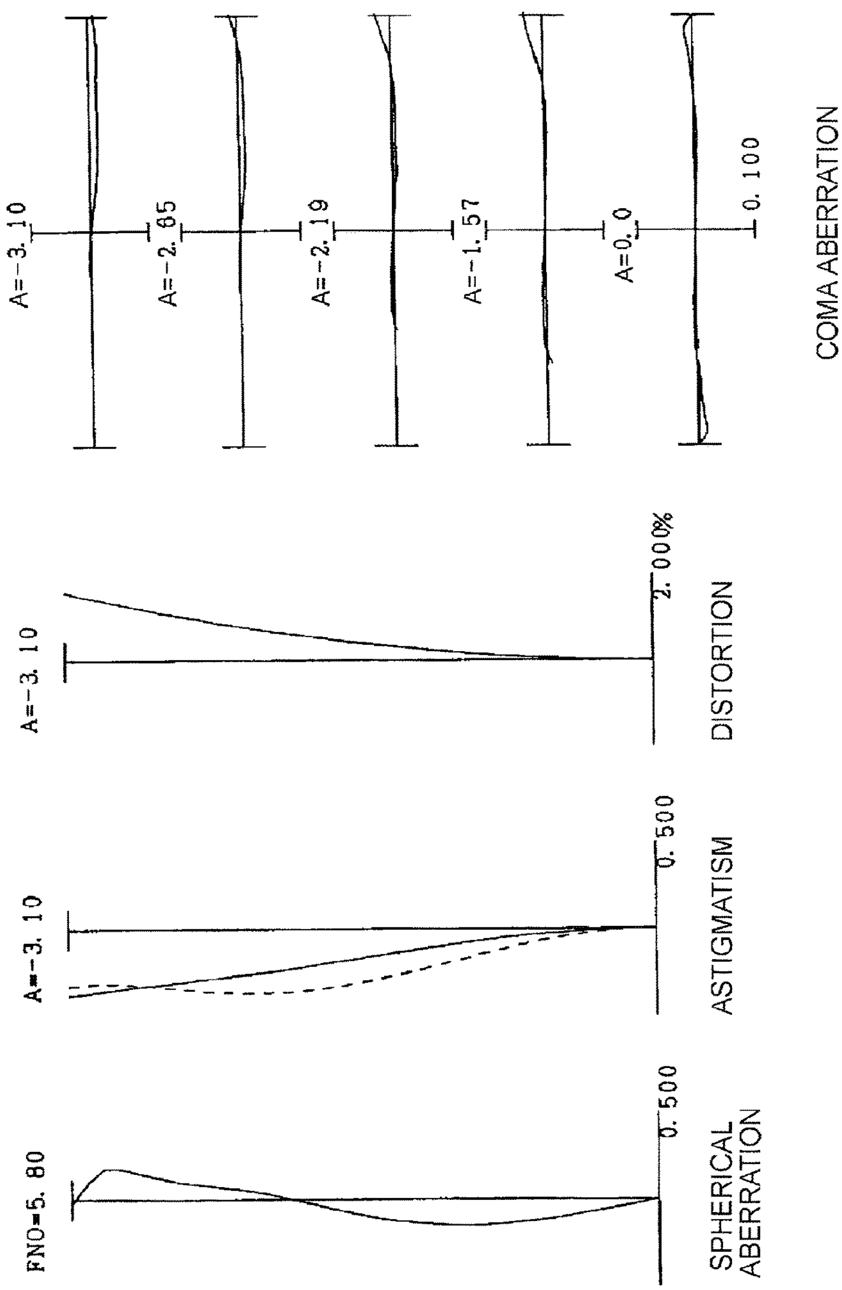
FIG. 60C shows the telephoto end state.
Figure 61A:
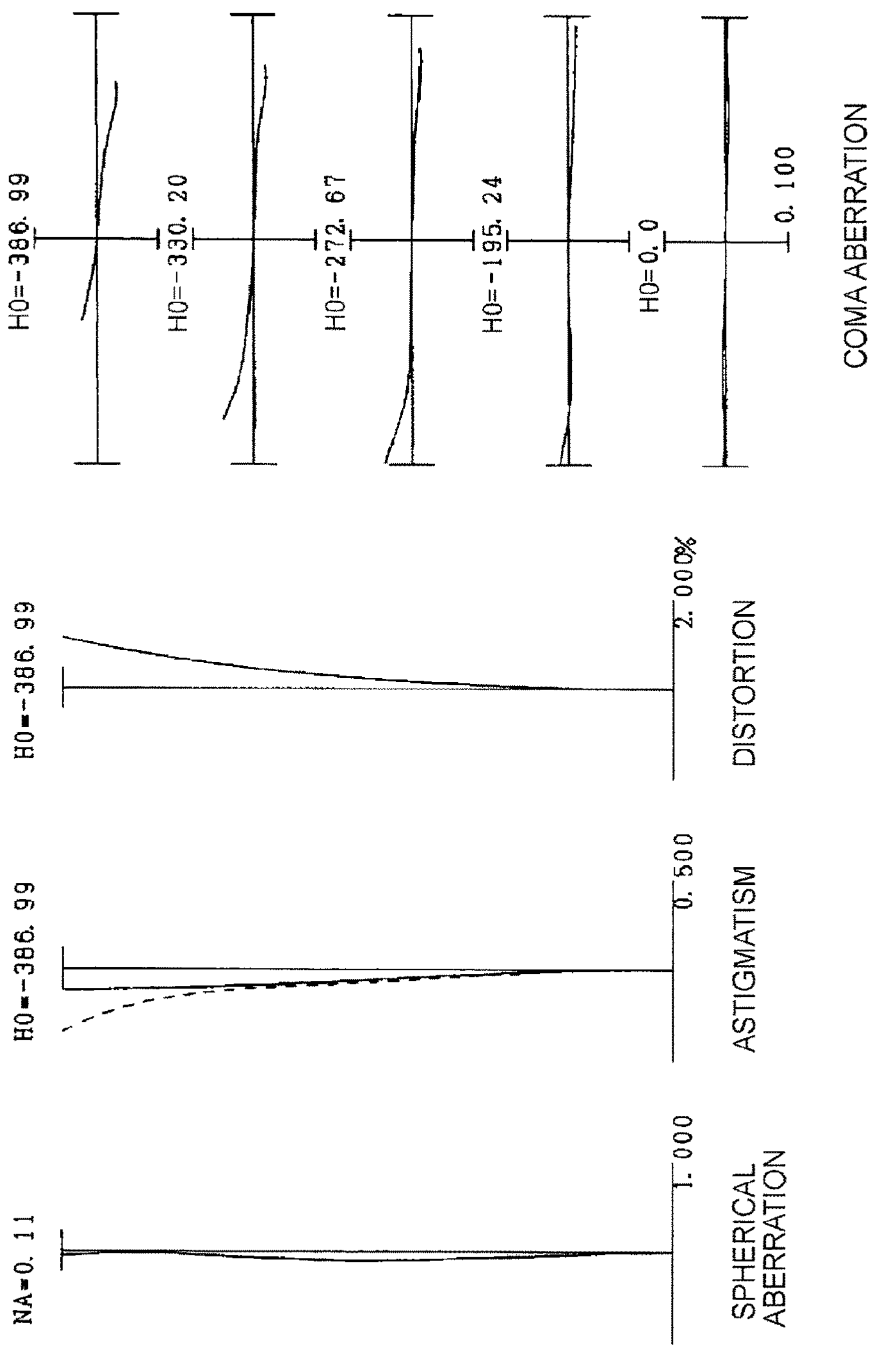
FIG. 61A shows the wide angle end state.
Figure 61B:
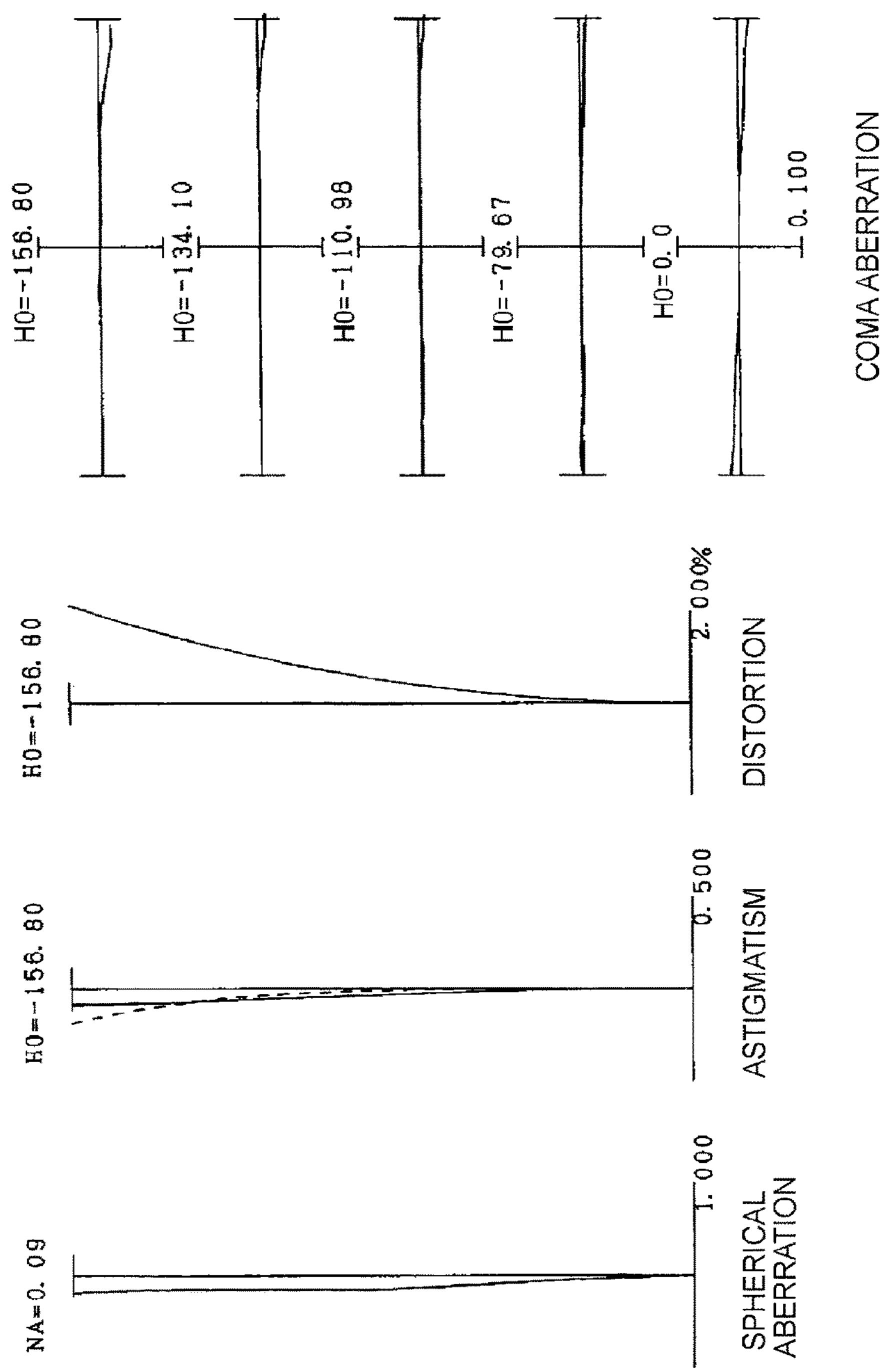
FIG. 61B shows the intermediate focal length state.
Figure 61C:
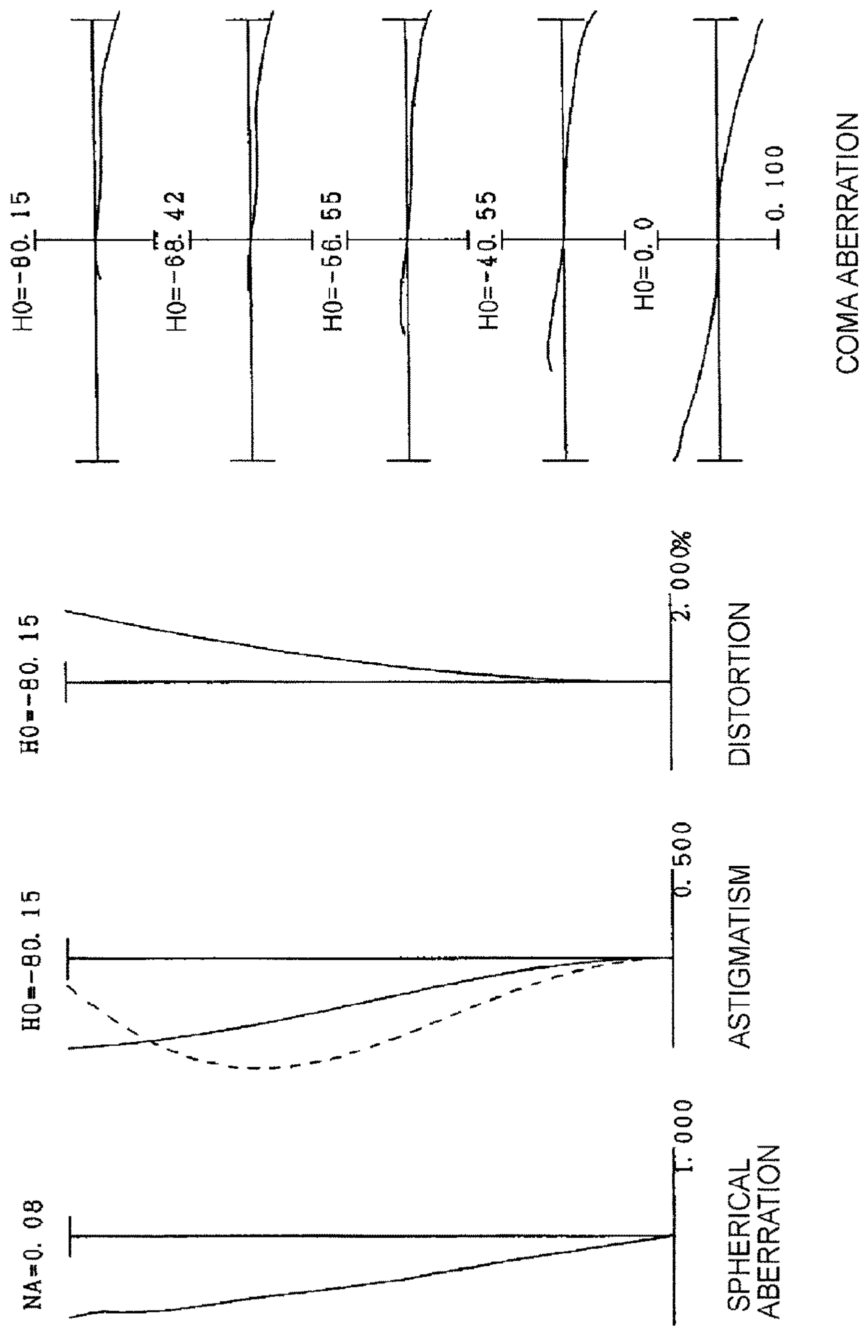
FIG. 61C shows the telephoto end state.

FIG. 60 and FIG. 61 are graphs showing various aberrations of Example 16 at d-line (wavelength: 587.6 nm). In other words, FIG. 60A are graphs showing various aberrations upon focusing on infinity in the wide angle end state (f=81.59 mm), FIG. 60B are graphs showing various aberrations upon focusing on infinity in the intermediate focal length state (f=199.36 mm), and FIG. 60C are graphs showing various aberrations upon focusing on infinity in the telephoto end state (f=392.00 mm). FIG. 61A are graphs showing various aberrations upon close distance focusing (photographic distance: 1.8 m) in the wide angle end state (f=81.59 mm), FIG. 61B are graphs showing various aberrations upon close distance focusing (photographic distance: 1.8 m) in the intermediate focal length state (f=199.36 mm), and FIG. 61C are graphs showing various aberrations upon close distance focusing (photographic distance: 1.8 m) in the telephoto end state (f=392.00 mm).

As each graph showing aberrations indicates, according to Example 16, various aberrations are corrected well in each focal length state, from the wide angle end state to the telephoto end state, implementing excellent image forming performance.

Example 17

Figure 62:
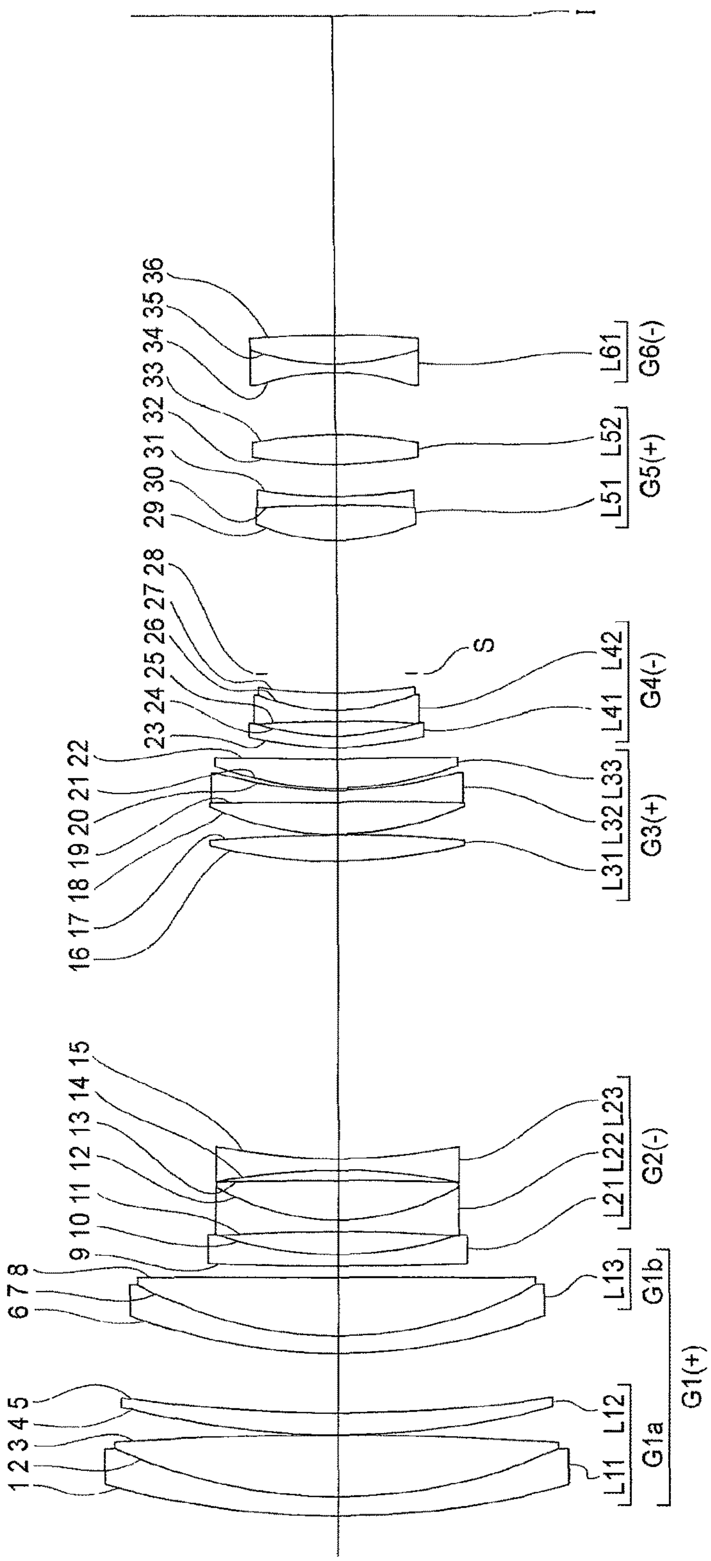
FIG. 62 is a diagram depicting a configuration of a lens system according to Example 17.

Example 17 will now be described with reference to FIG. 62 to FIG. 64 and Table 81 to Table 85. FIG. 62 is a diagram depicting a configuration of a lens system according to Example 17. As FIG. 62 shows, in the lens system according to Example 17, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a positive meniscus lens L33 having a convex surface facing the object.

The fourth lens group G4 has, in order from the object, a cemented negative lens L41 in which a negative meniscus lens having a convex surface facing the object and a positive meniscus lens having a convex surface facing the object are cemented, and a negative meniscus lens L42 having a convex surface facing the object. In this example, all or a part of the fourth lens group G4 shift as a shift lens group, so as to have a component in an approximately orthogonal to the optical axis.

The fourth lens group G4 has, in order from the object, a negative meniscus lens L41 having a convex surface facing the object, and a cemented negative lens L42 in which a biconcave lens and a positive meniscus lens having a convex surface facing the object are cemented.

The fifth lens group G5 has, in order from the object, a cemented positive lens L51 in which a biconvex lens and a biconcave lens are cemented, and a biconvex lens L52.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 17 are shown in Table 81.

TABLE 81

[All parameters]

| | Wide-angle end | | intermediate focal length | | telephoto end |
|---|---|---|---|---|---|
| f | 81.59 | ~ | 199.36 | ~ | 392.00 |
| FNO | 4.59 | ~ | 5.61 | ~ | 5.80 |
| 2ω | 29.77 | ~ | 12.13 | ~ | 6.20 |
| Image Height | 21.60 | ~ | 21.60 | ~ | 21.60 |
| Total lens Length | 258.89 | ~ | 258.89 | ~ | 258.89 |

[Lens data]

| Surface Number | r | d | nd | νd |
|---|---|---|---|---|
| 1 | 126.0186 | 3.30 | 1.79952 | 42.24 |
| 2 | 77.5473 | 10.60 | 1.49782 | 82.52 |
| 3 | −547.5618 | 0.10 | | |
| 4 | 122.6966 | 3.70 | 1.49782 | 82.52 |
| 5 | 217.2231 | (d5) | | |
| 6 | 84.6235 | 3.00 | 1.84666 | 23.78 |
| 7 | 60.1469 | 10.00 | 1.58913 | 61.16 |
| 8 | 4800.8473 | (d8) | | |
| 9 | 506.2739 | 2.00 | 1.81600 | 46.62 |
| 10 | 55.4834 | 4.00 | | |
| 11 | −233.2084 | 2.00 | 1.75500 | 52.32 |
| 12 | 35.7567 | 6.75 | 1.80810 | 22.76 |
| 13 | −542.5552 | 1.80 | | |
| 14 | −89.1219 | 2.00 | 1.81600 | 46.62 |
| 15 | 88.6080 | (d15) | | |
| 16 | 76.9231 | 4.50 | 1.72916 | 54.68 |
| 17 | −220.3525 | 0.20 | | |
| 18 | 45.3282 | 5.50 | 1.60300 | 65.44 |
| 19 | −1753.6227 | 2.00 | 1.84666 | 23.78 |
| 20 | 60.5621 | 0.40 | | |
| *21 | 48.1025 | 5.10 | 1.59201 | 67.02 |
| 22 | 1154.9344 | (d22) | | |
| 23 | 54.9083 | 2.00 | 1.83481 | 42.71 |
| 24 | 40.6717 | 2.50 | | |
| 25 | −166.6667 | 1.80 | 1.77250 | 49.60 |
| 26 | 30.6534 | 2.95 | 1.84666 | 23.78 |
| 27 | 75.2024 | 3.30 | | |
| 28 | 0.0000 | (d28) | (aperture stop S) | |
| 29 | 29.3279 | 6.10 | 1.48749 | 70.23 |
| 30 | −170.5677 | 1.50 | 1.78470 | 26.29 |
| 31 | 73.5357 | 5.50 | | |
| *32 | 59.7416 | 5.20 | 1.59201 | 67.02 |
| 33 | −59.5375 | (d33) | | |
| 34 | −33.3814 | 1.50 | 1.81600 | 46.62 |
| 35 | 38.9044 | 5.00 | 1.76182 | 26.52 |
| 36 | −133.0942 | (Bf) | | |

[Each group focal length data]

| Group | First surface | Focal length |
|---|---|---|
| G1 | 1 | 97.2288 |
| G2 | 9 | −28.9504 |
| G3 | 16 | 42.3244 |
| G4 | 23 | −53.7194 |
| G5 | 29 | 44.6089 |
| G6 | 34 | −51.0052 |

In Example 17, the twenty first and thirty second lens surfaces are aspherical. Table 82 shows the [Aspherical data].

TABLE 82

[Aspherical data]

| R | κ | $C_4$ | $C_6$ | $C_8$ | $C_{10}$ |
|---|---|---|---|---|---|
| Twenty first surface | | | | | |
| 48.1025 | +3.3060 | $-3.4244 \times 10^{-6}$ | $-3.5396 \times 10^{-9}$ | $+1.6713 \times 10^{-12}$ | $-1.0047 \times 10^{-14}$ |
| Thirty second surface | | | | | |
| 59.7416 | +10.6606 | $-1.0210 \times 10^{-5}$ | $-1.3998 \times 10^{-8}$ | $+1.6666 \times 10^{-11}$ | $-1.7273 \times 10^{-13}$ |

In Example 17, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 83 shows the [Variable distance data].

TABLE 83

| [Variable distance data] | | | |
|---|---|---|---|
| | Wide-angle end | intermediate focal length | telephoto end |
| d5 | 10.2121 | 10.2121 | 10.2121 |
| d8 | 2.0000 | 15.7033 | 21.7781 |
| d15 | 51.3519 | 24.5386 | 2.0000 |
| d22 | 2.0000 | 15.1100 | 31.5738 |
| d28 | 23.2999 | 11.0484 | 2.0000 |
| d33 | 10.7312 | 4.7535 | 1.8048 |
| Bf | 54.9997 | 73.2287 | 85.2252 |

Table 84 shows the [Focusing lens group shift distance] in Example 17.

TABLE 84

| [Focusing lens group shift distance] | | | |
|---|---|---|---|
| | Wide-angle end | intermediate focal length | telephoto end |
| f | 81.5935 | 199.3602 | 392.0024 |
| Δ1b | 8.2121 | 8.2121 | 8.2121 |

Table 85 shows the [Conditional expression correspondence value] in Example 17.

TABLE 85

| [Conditional expression correspondence value] |
|---|
| f2 = −28.9504 |
| f4 = −53.7194 |
| f5 = 44.6089 |
| ft = 392.0024 |
| f1b = 176.1592 |
| TL = 258.8947 |
| (9) (−f2)/(−f4) = 0.5389 |
| (10) (−f2)/f5 = 0.6490 |
| (11) ft/f1b = 2.2253 |
| (12) TL/f1b = 1.4697 |

Figure 63A:
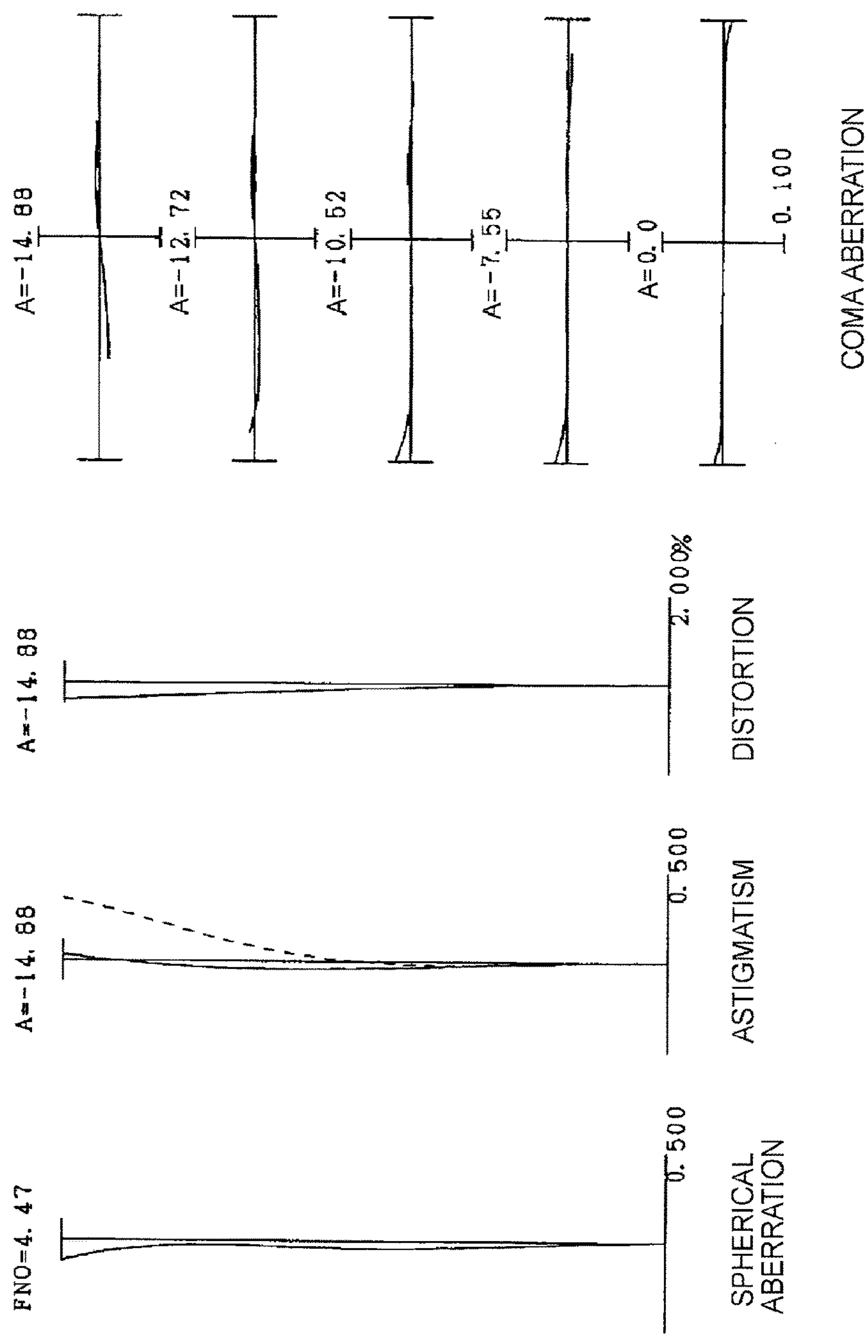
FIG. 63A shows the wide angle end state.
Figure 63B:
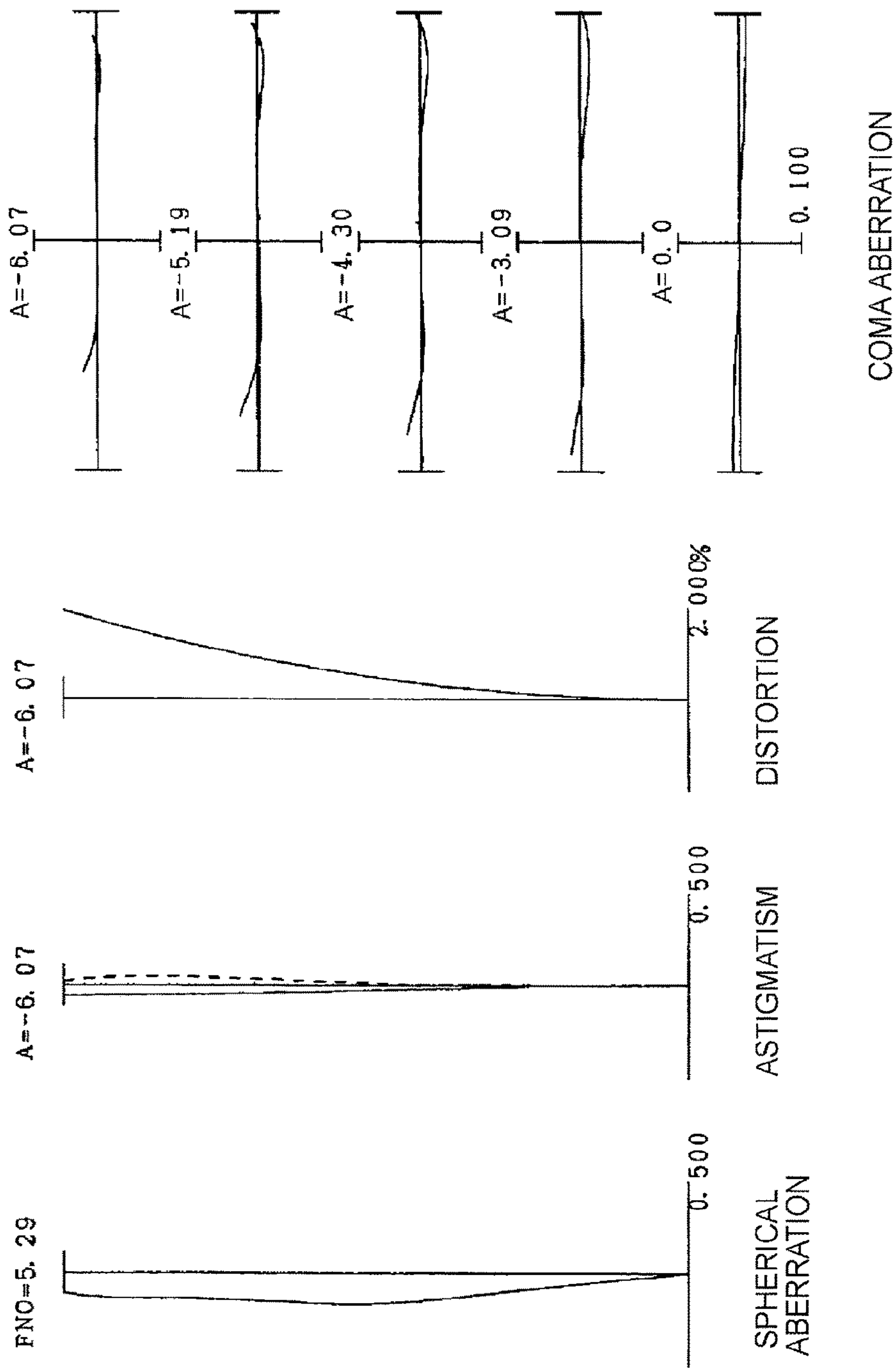
FIG. 63B shows the intermediate focal length state.
Figure 63C:
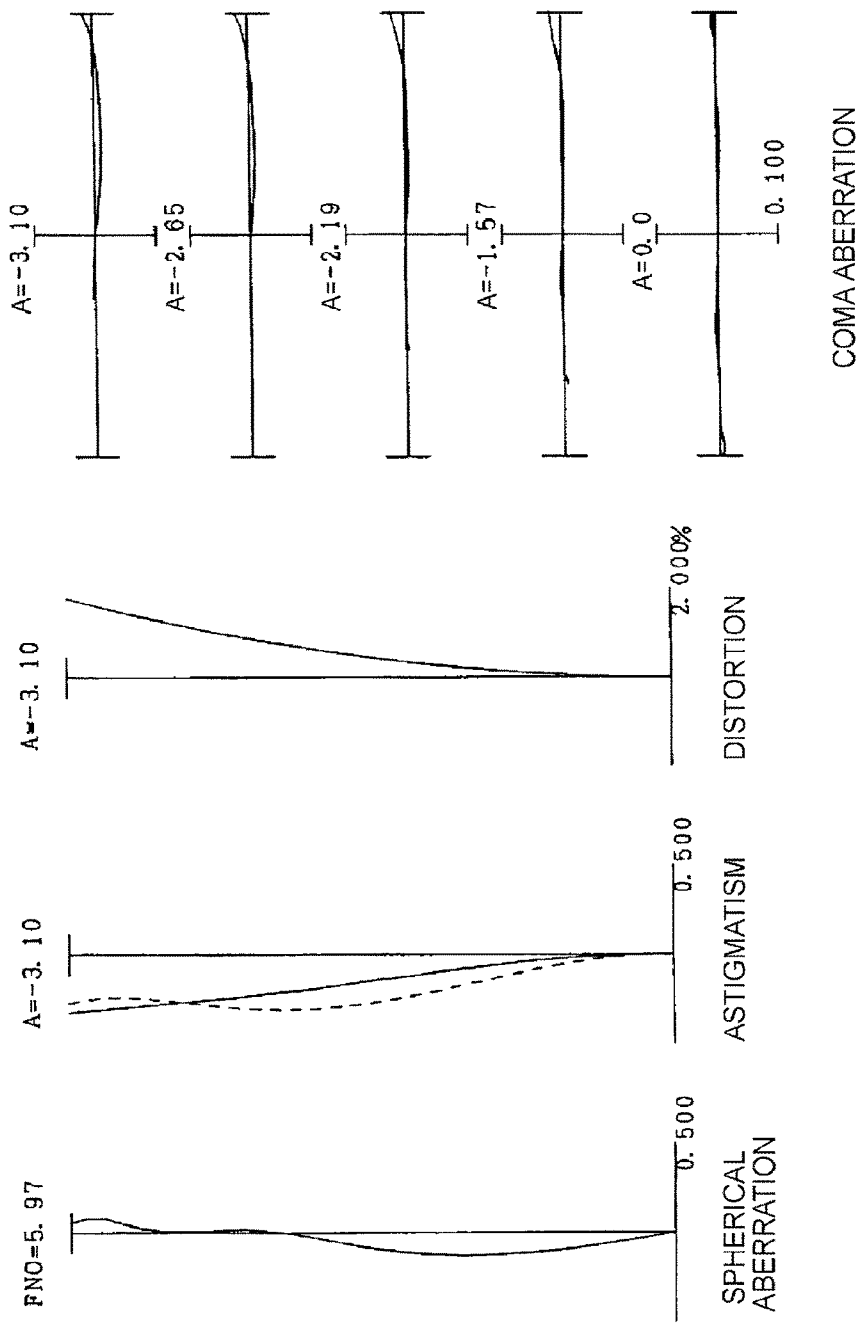
FIG. 63C shows the telephoto end state.
Figure 64A:
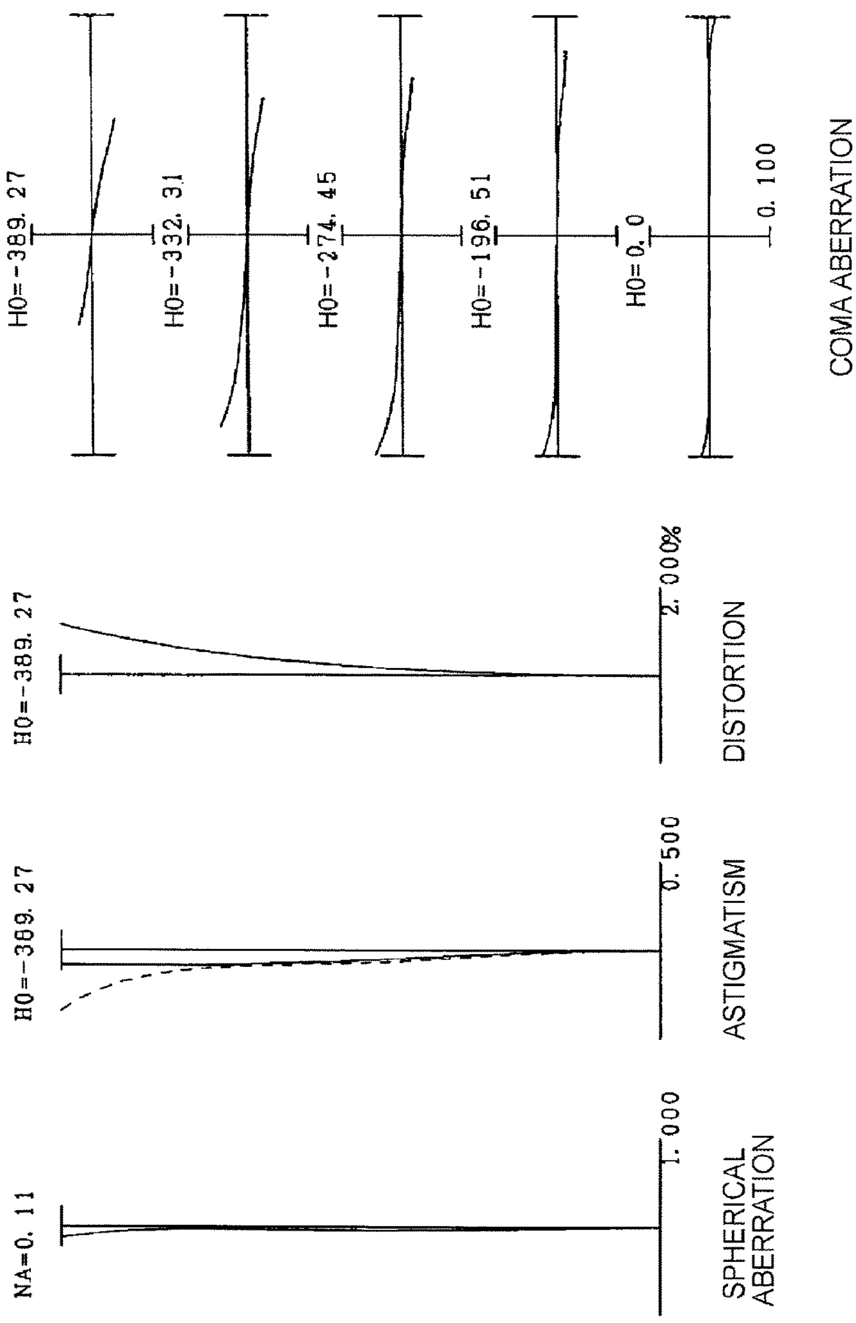
FIG. 64A shows the wide angle end state.
Figure 64B:
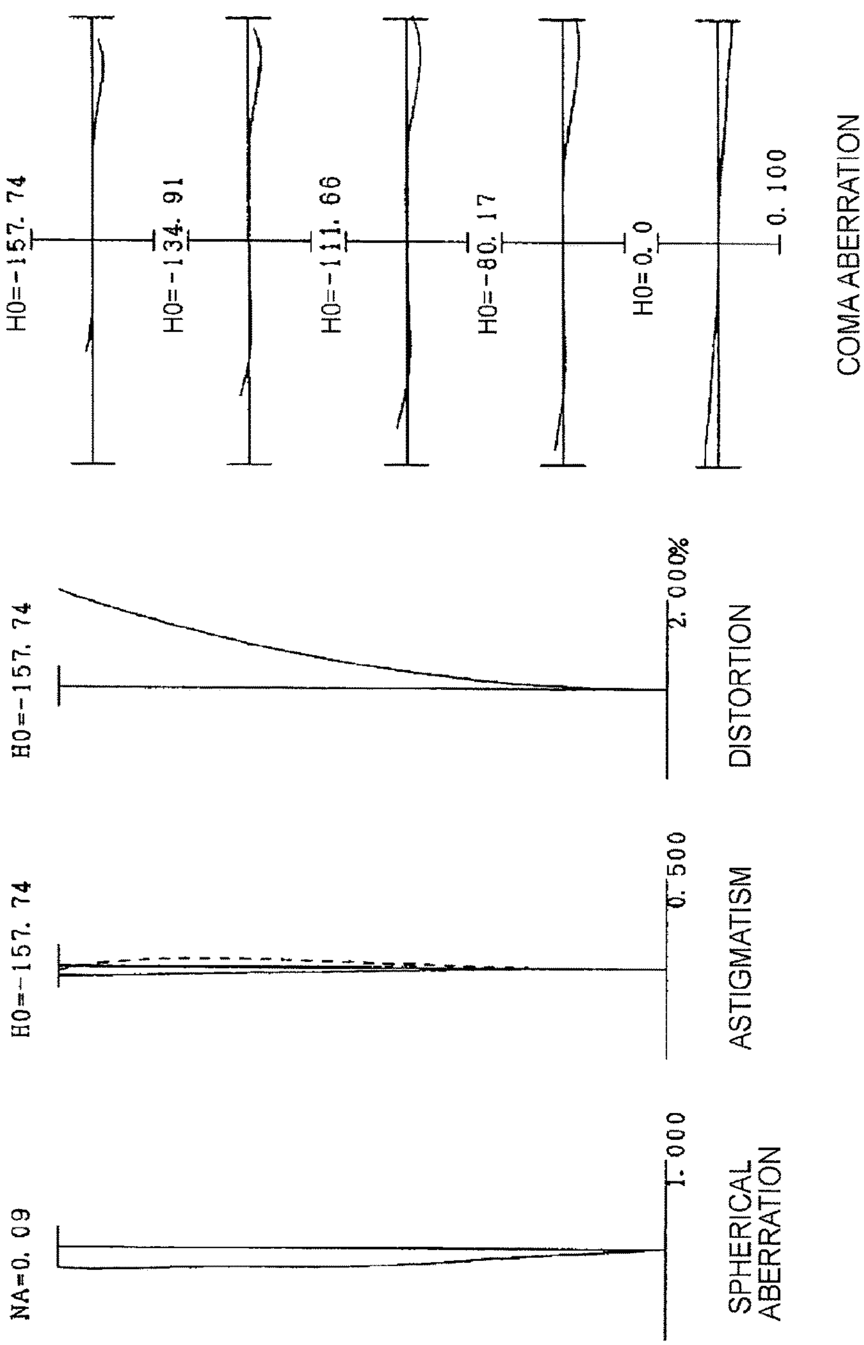
FIG. 64B shows the intermediate focal length state.
Figure 64C:
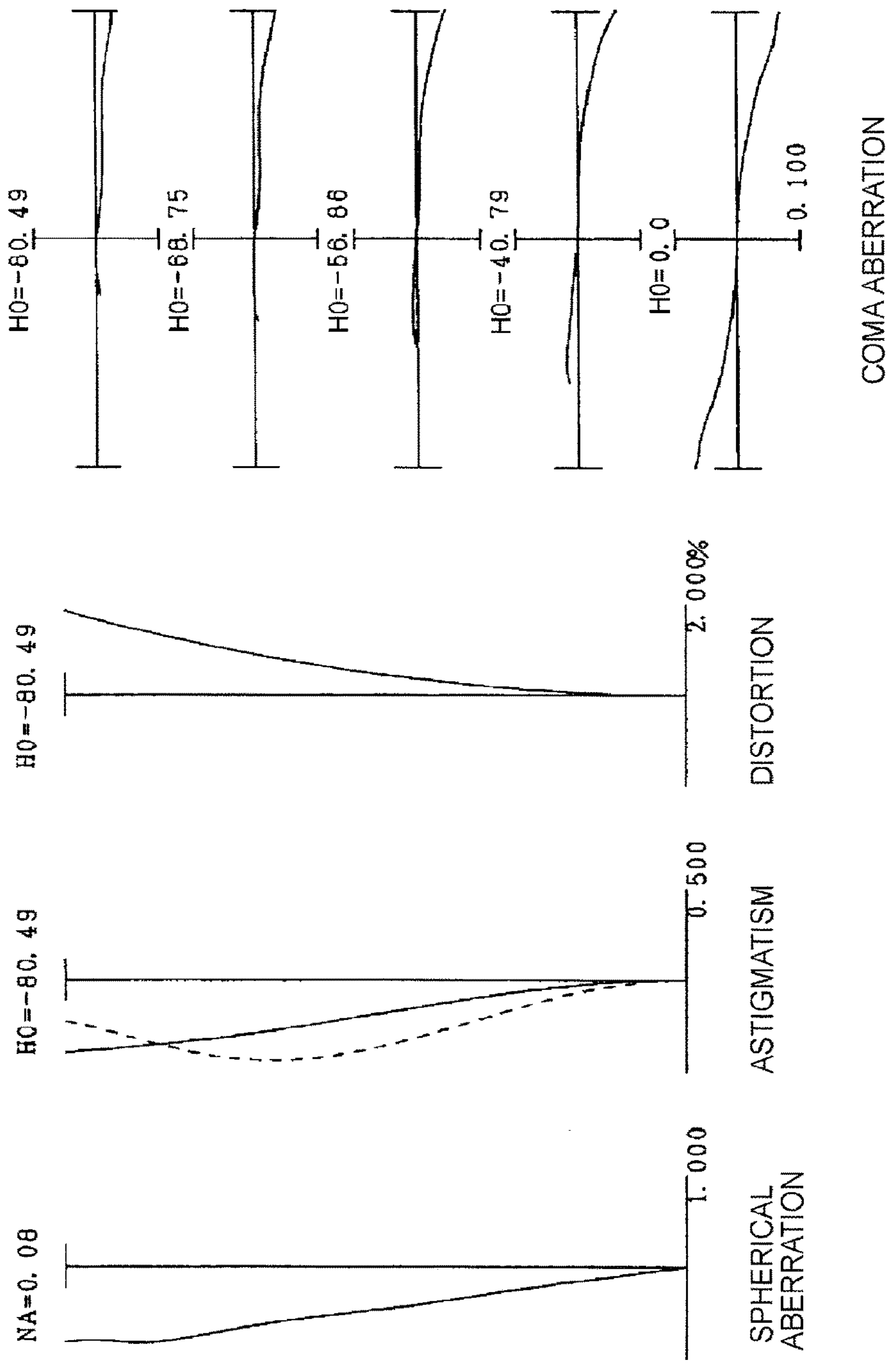
FIG. 64C shows the telephoto end state.

FIG. 63 and FIG. 64 are graphs showing various aberrations of Example 17 at d-line (wavelength: 587.6 nm). In other words, FIG. 63A are graphs showing various aberrations upon focusing on infinity in the wide angle end state (f=81.59 mm), FIG. 63B are graphs showing various aberrations upon focusing on infinity in the intermediate focal length state (f=199.36 mm), and FIG. 63C are graphs showing various aberrations upon focusing on infinity in the telephoto end state (f=392.00 mm). FIG. 64A are graphs showing various aberrations upon close distance focusing (photographic distance: 1.8 m) in the wide angle end state (f=81.59 mm), FIG. 64B are graphs showing various aberrations upon close distance focusing (photographic distance: 1.8 m) in the intermediate focal length state (f=199.36 mm), and FIG. 64C are graphs showing various aberrations upon close distance focusing (photographic distance: 1.8 m) in the telephoto end state (f=392.00 mm).

As each graph showing aberrations indicates, according to Example 17, various aberrations are corrected well in each focal length state, from the wide angle end state to the telephoto end state, implementing excellent image forming performance.

Example 18

Figure 65:
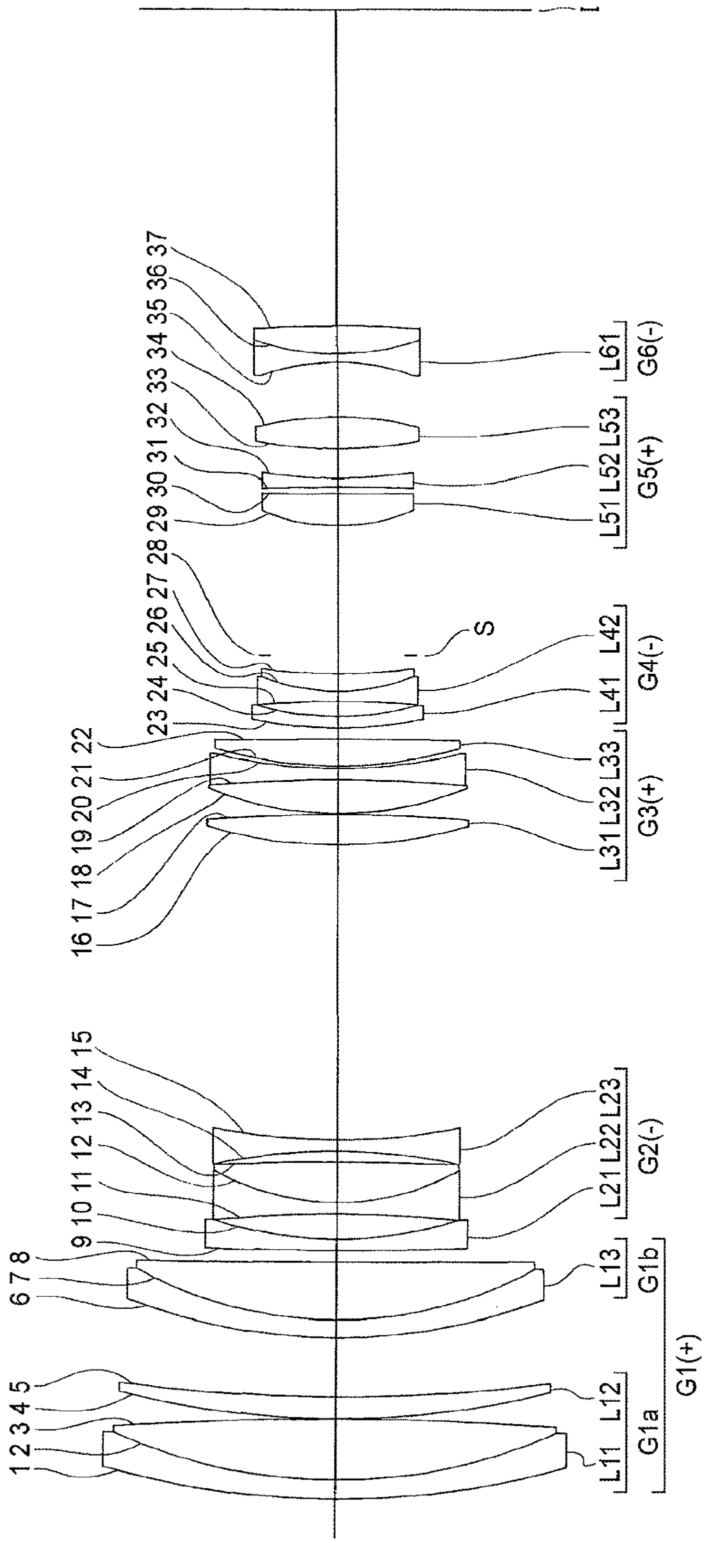
FIG. 65 is a diagram depicting a configuration of a lens system according to Example 18.

Example 18 will now be described with reference to FIG. 65 to FIG. 67 and Table 86 to Table 90. FIG. 65 is a diagram depicting a configuration of a lens system according to Example 18. As FIG. 65 shows, in the lens system according to Example 18, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a biconvex lens L33.

The fourth lens group G4 has, in order from the object, a negative meniscus lens L41 having a convex surface facing the object, and a cemented negative lens L42 in which a biconcave lens and a positive meniscus lens having a convex surface facing the object are cemented.

The fifth lens group G5 has, in order from the object, a positive meniscus lens L51 having a convex surface facing the object, a biconcave lens L52, and a biconvex lens L53.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 18 are shown in Table 86.

TABLE 86

| [All parameters] | | | | | |
|---|---|---|---|---|---|
| | Wide-angle end | | intermediate focal length | | telephoto end |
| f | 81.59 | ~ | 199.36 | ~ | 392.00 |
| FNO | 4.59 | ~ | 5.61 | ~ | 5.90 |
| 2ω | 29.77 | ~ | 12.13 | ~ | 6.19 |
| Image Height | 21.60 | ~ | 21.60 | ~ | 21.60 |
| Total lens Length | 258.89 | ~ | 258.89 | ~ | 258.89 |

| [Lens data] | | | | |
|---|---|---|---|---|
| Surface Number | r | d | nd | νd |
| 1 | 122.4311 | 3.30 | 1.79952 | 42.24 |
| 2 | 77.4140 | 10.60 | 1.49782 | 82.52 |
| 3 | −539.5955 | 0.10 | | |
| 4 | 126.8126 | 3.70 | 1.49782 | 82.52 |
| 5 | 233.0088 | (d5) | | |
| 6 | 84.8861 | 3.00 | 1.84666 | 23.78 |
| 7 | 60.3167 | 10.00 | 1.58913 | 61.16 |
| 8 | 2560.7553 | (d8) | | |
| 9 | 472.5913 | 2.00 | 1.81600 | 46.62 |
| 10 | 56.1997 | 4.36 | | |
| 11 | −193.0227 | 2.00 | 1.75500 | 52.32 |
| 12 | 35.9906 | 7.04 | 1.80810 | 22.76 |
| 13 | −530.3842 | 1.87 | | |
| 14 | −87.5435 | 2.00 | 1.81600 | 46.62 |

TABLE 86-continued

| | | | | |
|---|---|---|---|---|
| 15 | 89.2753 | (d15) | | |
| 16 | 65.7140 | 5.27 | 1.72916 | 54.68 |
| 17 | −266.7227 | 0.20 | | |
| 18 | 49.1422 | 5.82 | 1.60300 | 65.44 |
| 19 | −233.9052 | 2.00 | 1.84666 | 23.78 |
| 20 | 75.7754 | 0.40 | | |
| *21 | 59.1575 | 4.57 | 1.59201 | 67.02 |
| 22 | −2322.4950 | (d22) | | |
| 23 | 57.8236 | 2.00 | 1.83400 | 37.16 |
| 24 | 41.8455 | 2.60 | | |
| 25 | −170.2688 | 1.80 | 1.77250 | 49.60 |
| 26 | 29.0742 | 3.05 | 1.84666 | 23.78 |
| 27 | 74.4580 | 3.30 | | |
| 28 | 0.0000 | (d28) | (aperture stop S) | |
| 29 | 27.5941 | 5.56 | 1.48749 | 70.23 |
| 30 | 777.9248 | 1.11 | | |
| 31 | −405.8904 | 1.50 | 1.84666 | 23.78 |
| 32 | 67.1692 | 5.10 | | |
| *33 | 54.0531 | 5.56 | 1.59201 | 67.02 |
| 34 | −51.4056 | (d34) | | |
| 35 | −33.4861 | 1.50 | 1.81600 | 46.62 |
| 36 | 35.9355 | 4.90 | 1.78472 | 25.68 |
| 37 | −185.1792 | (Bf) | | |

[Each group focal length data]

| Group | First surface | Focal length |
|---|---|---|
| G1 | 1 | 96.4408 |
| G2 | 9 | −28.4070 |
| G3 | 16 | 42.0108 |
| G4 | 23 | −53.3548 |
| G5 | 29 | 43.2894 |
| G6 | 35 | −58.4510 |

In Example 18, the twenty first and thirty third lens surfaces are aspherical. Table 87 shows the [Aspherical data].

TABLE 87

[Aspherical data]

| R | κ | $C_4$ | $C_6$ | $C_8$ | $C_{10}$ |
|---|---|---|---|---|---|
| Twenty first surface | | | | | |
| 59.1575 | +5.1063 | $-3.5087 \times 10^{-6}$ | $-3.5087 \times 10^{-6}$ | $-3.3186 \times 10^{-9}$ | $+1.9541 \times 10^{-12}$ |
| Thirty third surface | | | | | |
| 54.0531 | +7.8072 | $-1.1372 \times 10^{-5}$ | $-1.3002 \times 10^{-8}$ | $-1.3002 \times 10^{-8}$ | $+1.1857 \times 10^{-11}$ |

In Example 18, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d34 between the fifth lens group G5 and the sixth lens group G6, and the back focus Bf, change upon zooming. Table 88 shows the [Variable distance data].

TABLE 88

[Variable distance data]

| | Wide-angle end | intermediate focal length | telephoto end |
|---|---|---|---|
| d5 | 10.2449 | 10.2449 | 10.2449 |
| d8 | 2.0000 | 14.4836 | 20.8984 |
| d15 | 51.2074 | 24.5569 | 2.0000 |
| d22 | 2.0000 | 16.1668 | 32.3090 |
| d28 | 22.6985 | 10.0915 | 2.0000 |
| d34 | 9.5237 | 3.4816 | 1.6163 |
| Bf | 54.9999 | 73.6490 | 83.6053 |

Table 89 shows the [Focusing lens group shift distance] in Example 18.

TABLE 89

[Focusing lens group shift distance]

| | Wide-angle end | intermediate focal length | telephoto end |
|---|---|---|---|
| f | 81.5936 | 199.3605 | 392.0030 |
| Δ1b | 8.2449 | 8.2449 | 8.2449 |

Table 90 shows the [Conditional expression correspondence value] in Example 18.

TABLE 90

[Conditional expression correspondence value]

f2 = −28.4070
f4 = −53.3548
f5 = 43.2894
ft = 392.0030
f1b = 179.9971
TL = 258.8948
(9) (−f2)/(−f4) = 0.5324
(10) (−f2)/f5 = 0.6562
(11) ft/f1b = 2.1778
(12) TL/f1b = 1.4383

Figure 66A:
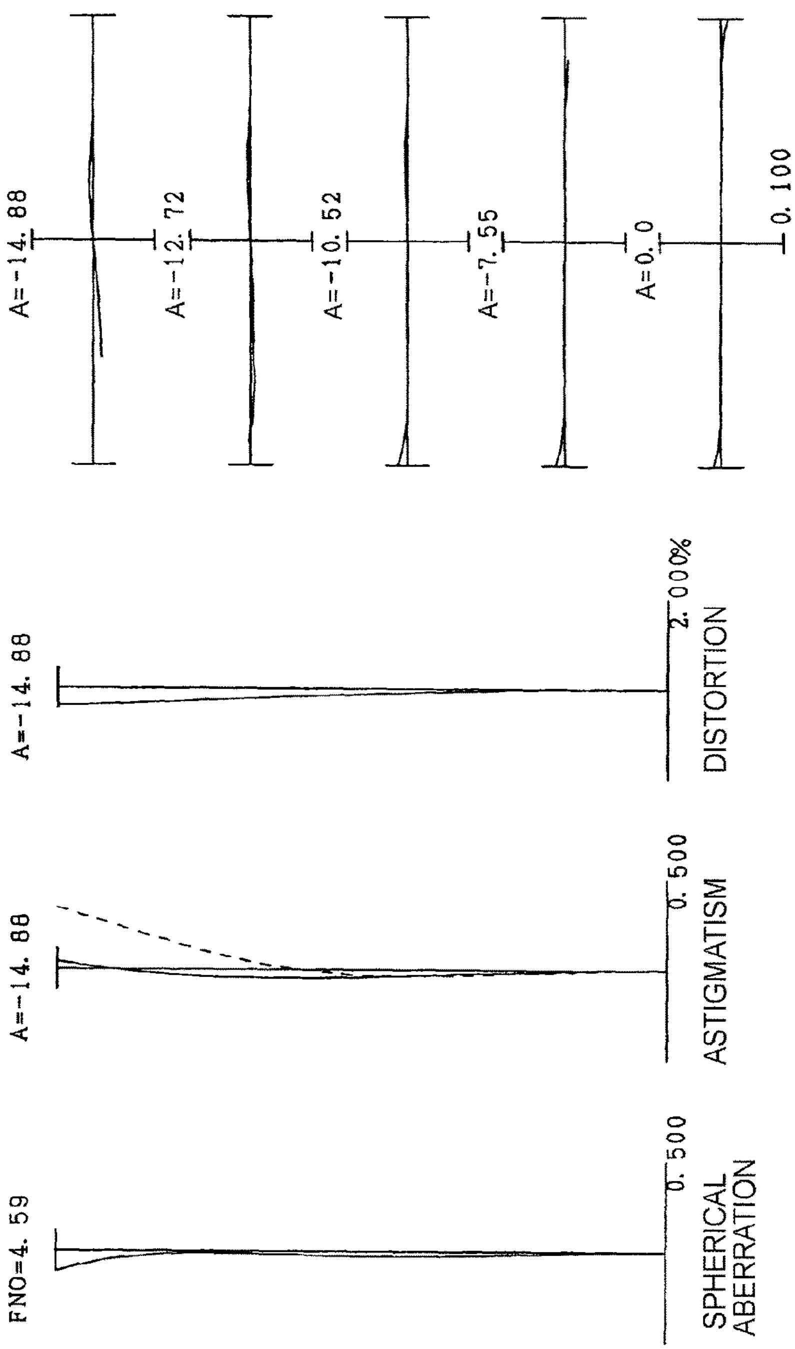
FIG. 66A shows the wide angle end state.
Figure 66B:
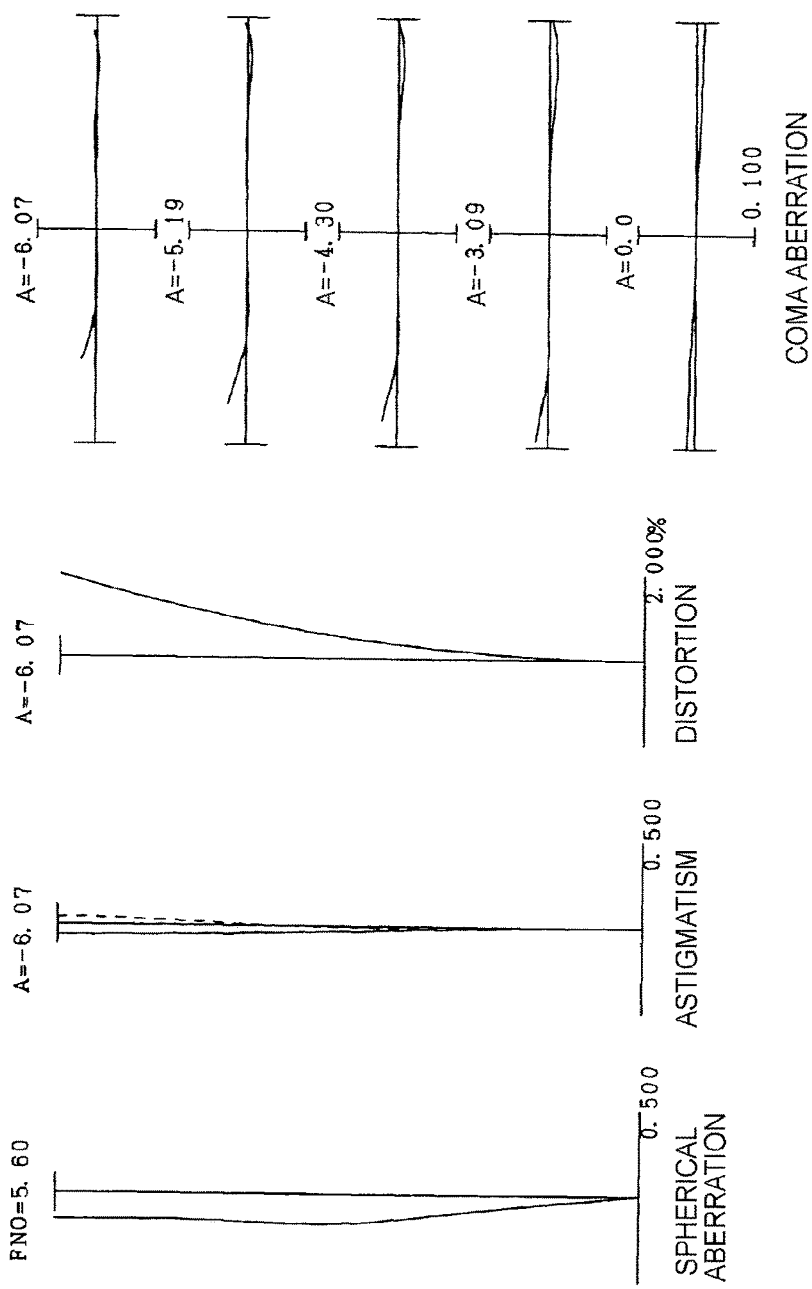
FIG. 66B shows the intermediate focal length state.
Figure 66C:
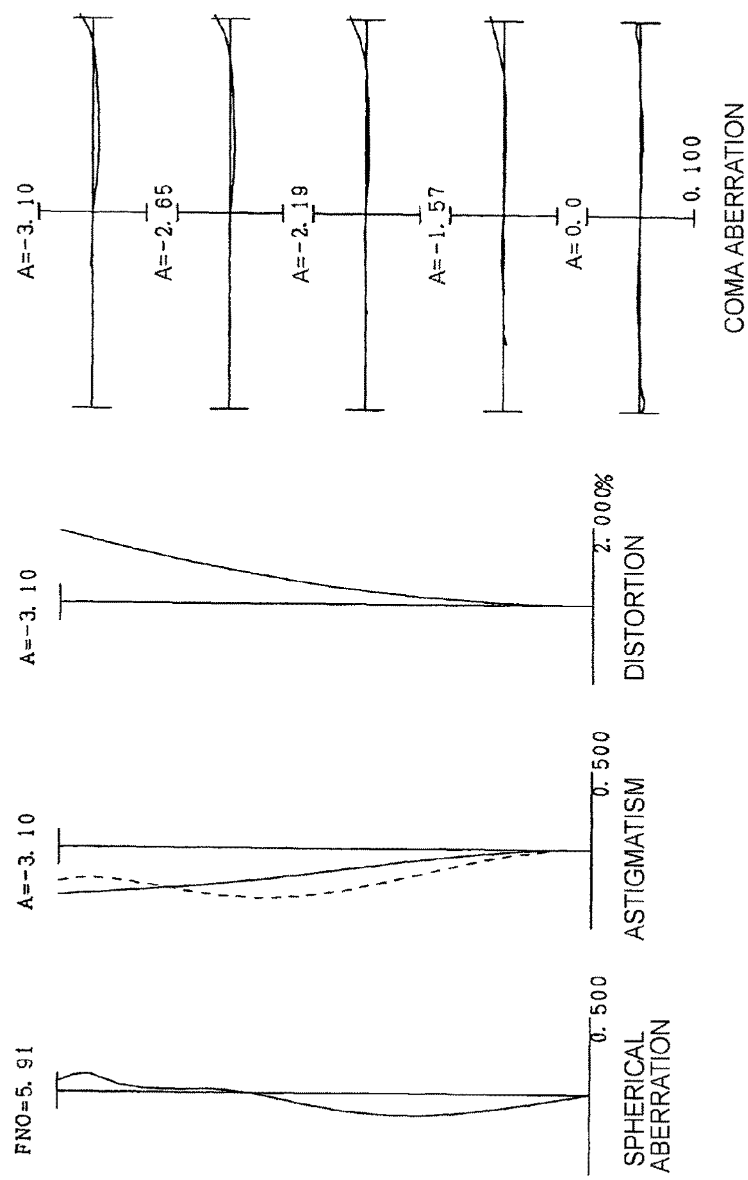
FIG. 66C shows the telephoto end state.
Figure 67A:
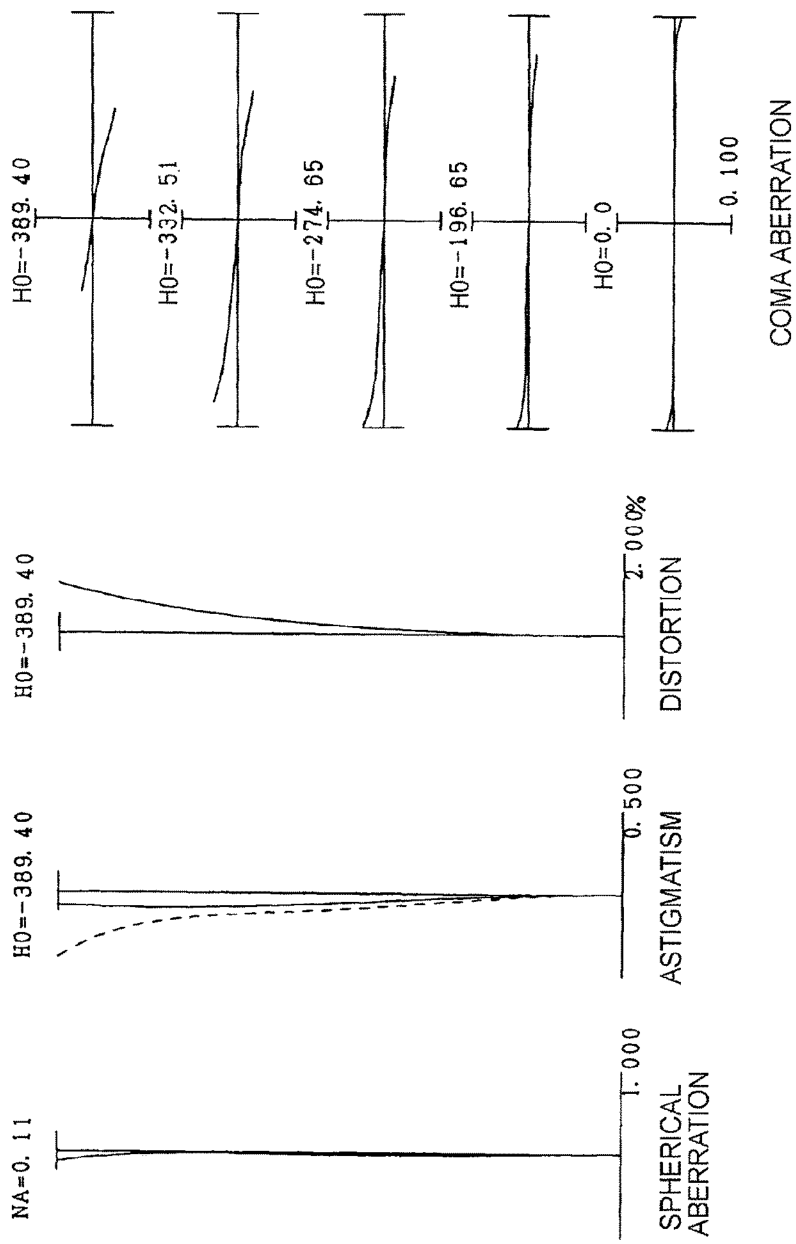
FIG. 67A shows the wide angle end state.
Figure 67B:
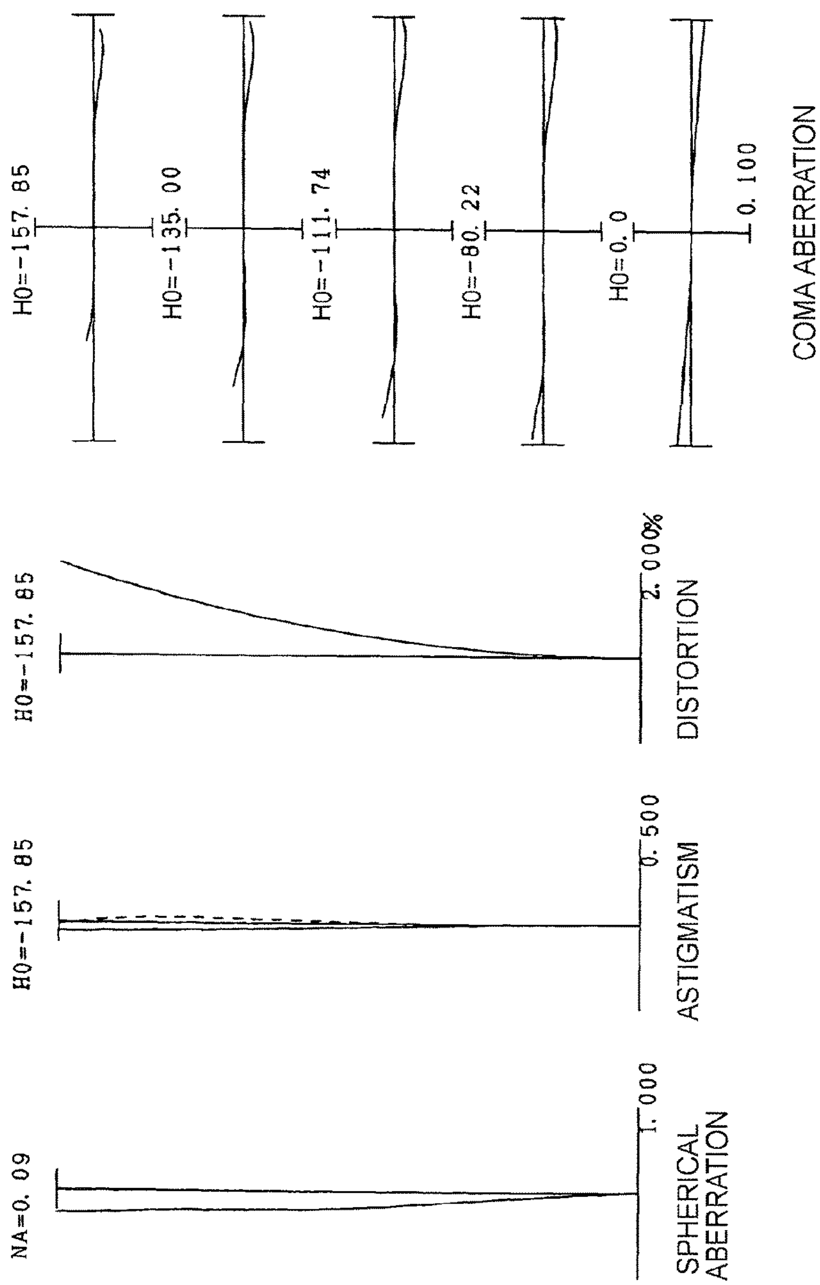
FIG. 67B shows the intermediate focal length state.
Figure 67C:
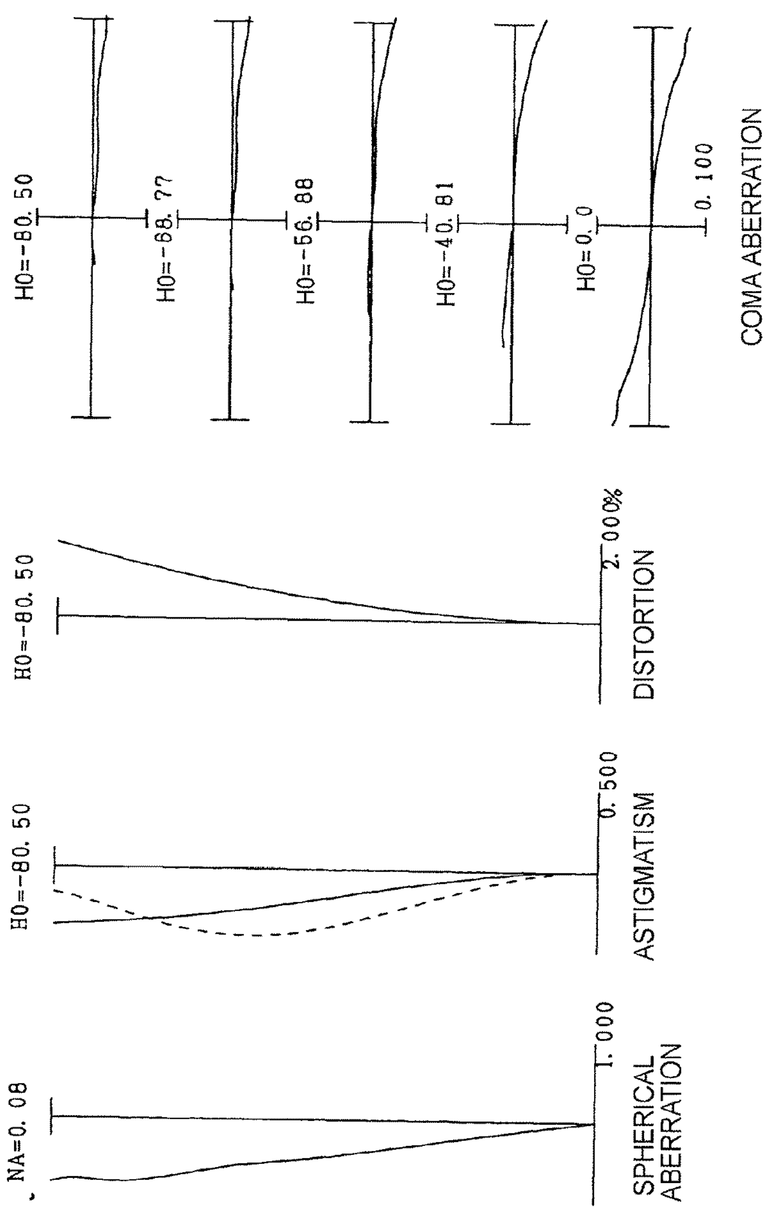
FIG. 67C shows the telephoto end state.

FIG. 66 and FIG. 67 are graphs showing various aberrations of Example 18 at d-line (wavelength: 587.6 nm). In other words, FIG. 66A are graphs showing various aberrations upon focusing on infinity in the wide angle end state (f=81.59 mm), FIG. 66B are graphs showing various aberrations upon focusing on infinity in the intermediate focal length state (f=199.36 mm), and FIG. 66C are graphs showing various aberrations upon focusing on infinity in the telephoto end state (f=392.00 mm). FIG. 67A are graphs showing various aberrations upon close distance focusing (photographic distance: 1.8 m) in the wide angle end state (f=81.59 mm), FIG. 67B are graphs showing various aberrations upon close distance focusing (photographic distance:

1.8 m) in the intermediate focal length state (f=199.36 mm), and FIG. 67C are graphs showing various aberrations upon close distance focusing (photographic distance: 1.8 m) in the telephoto end state (f=392.00 mm).

As each graph showing aberrations indicates, according to Example 18, various aberrations are corrected well in each focal length state, from the wide angle end state to the telephoto end state, implementing excellent image forming performance.

Example 19

Figure 68:
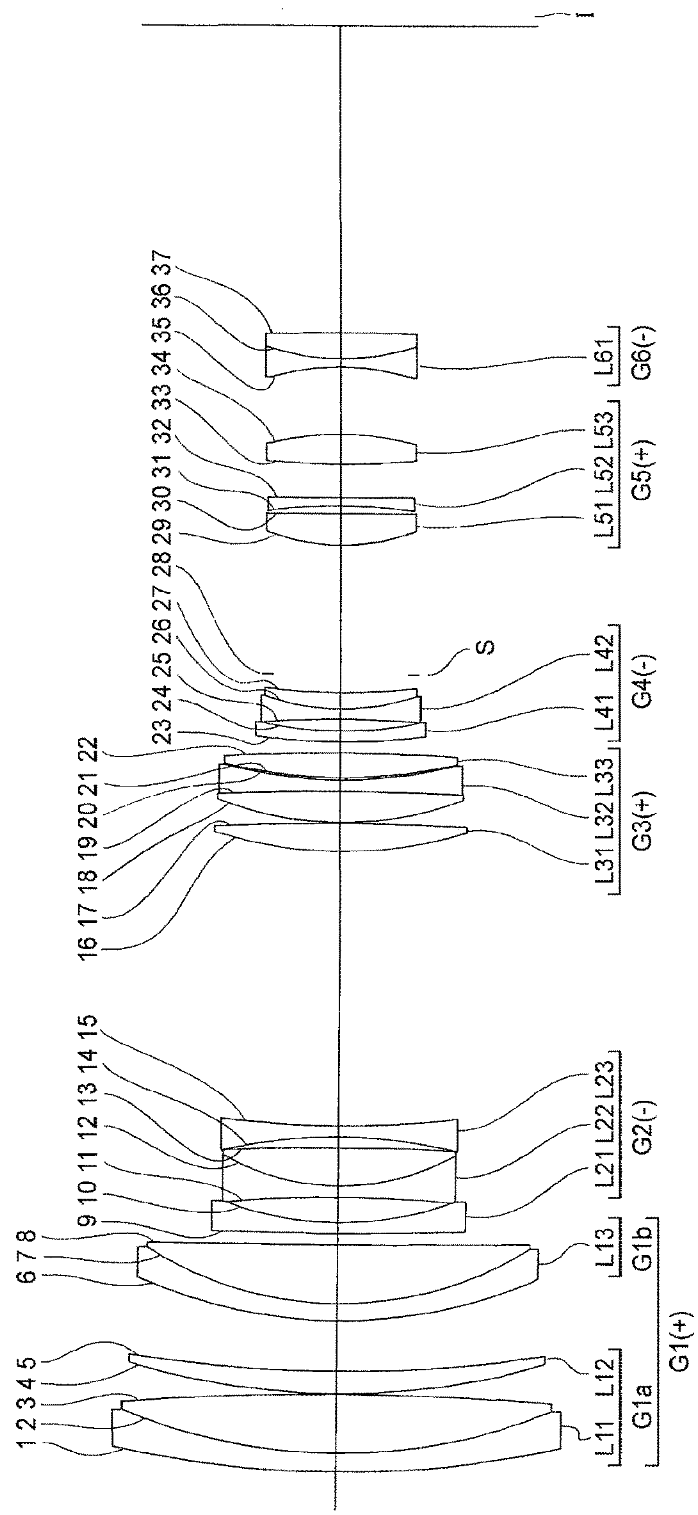
FIG. 68 is a diagram depicting a configuration of a lens system according to Example 19.

Example 19 will now be described with reference to FIG. 68 to FIG. 70 and Table 91 to Table 95. FIG. 68 is a diagram depicting a configuration of a lens system according to Example 19. As FIG. 68 shows, in the lens system according to Example 19, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a biconvex lens L33.

The fourth lens group G4 has, in order from the object, a negative meniscus lens L41 having a convex surface facing the object, and a cemented negative lens L42 in which a biconcave lens and a positive meniscus lens having a convex surface facing the object are cemented.

The fifth lens group G5 has, in order from the object, a biconvex lens L51, a negative meniscus lens L52 having a convex surface facing the image, and a biconvex lens L53.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 19 are shown in Table 91.

TABLE 91

[All parameters]

| | Wide-angle end | | intermediate focal length | | telephoto end |
|---|---|---|---|---|---|
| f | 81.59 | ~ | 200.00 | ~ | 392.00 |
| FNO | 4.59 | ~ | 5.80 | ~ | 6.02 |
| 2ω | 29.75 | ~ | 12.08 | ~ | 6.19 |
| Image Height | 21.60 | ~ | 21.60 | ~ | 21.60 |

TABLE 91-continued

| | | | | | |
|---|---|---|---|---|---|
| Total lens Length | 259.00 | ~ | 259.00 | ~ | 259.00 |

[Lens data]

| Surface Number | r | d | nd | νd |
|---|---|---|---|---|
| 1 | 157.3816 | 3.30 | 1.79952 | 42.24 |
| 2 | 84.5029 | 10.50 | 1.49782 | 82.52 |
| 3 | −400.0243 | 0.10 | | |
| 4 | 109.4238 | 4.00 | 1.49782 | 82.52 |
| 5 | 201.1329 | (d5) | | |
| 6 | 75.0577 | 3.00 | 1.84666 | 23.78 |
| 7 | 54.2010 | 10.50 | 1.58913 | 61.16 |
| 8 | 2984.3552 | (d8) | | |
| 9 | 533.6900 | 2.00 | 1.81600 | 46.62 |
| 10 | 49.9474 | 4.50 | | |
| 11 | −184.3948 | 2.00 | 1.75500 | 52.32 |
| 12 | 35.1698 | 6.80 | 1.80810 | 22.76 |
| 13 | −356.9356 | 1.95 | | |
| 14 | −73.9121 | 2.00 | 1.81600 | 46.62 |
| 15 | 144.9031 | (d15) | | |
| 16 | 62.1563 | 5.02 | 1.72916 | 54.68 |
| 17 | −386.4902 | 0.20 | | |
| 18 | 49.9745 | 5.66 | 1.60300 | 65.44 |
| 19 | −362.7248 | 2.00 | 1.84666 | 23.78 |
| 20 | 68.0406 | 0.40 | | |
| *21 | 68.1766 | 4.43 | 1.59201 | 67.02 |
| 22 | −290.1053 | (d22) | | |
| 23 | 94.2996 | 2.00 | 1.81600 | 46.62 |
| 24 | 56.8700 | 2.11 | | |
| 25 | −152.8690 | 1.80 | 1.77250 | 49.60 |
| 26 | 33.8096 | 2.94 | 1.84666 | 23.78 |
| 27 | 89.5000 | 3.30 | | |
| 28 | 0.0000 | (d28) | (aperture stop S) | |
| 29 | 30.7985 | 5.59 | 1.49700 | 81.54 |
| 30 | −1866.1065 | 1.50 | | |
| 31 | −83.0064 | 1.50 | 1.84666 | 23.78 |
| 32 | 1498.2397 | 5.93 | | |
| *33 | 94.2945 | 5.40 | 1.59201 | 67.02 |
| 34 | −44.4597 | (d34) | | |
| 35 | −35.9775 | 1.50 | 1.81600 | 46.62 |
| 36 | 34.6595 | 4.65 | 1.76182 | 26.52 |
| 37 | −333.2838 | (Bf) | | |

[Each group focal length data]

| Group | First surface | Focal length |
|---|---|---|
| G1 | 1 | 92.7571 |
| G2 | 9 | −28.7665 |
| G3 | 16 | 43.5730 |
| G4 | 23 | −55.2171 |
| G5 | 29 | 43.3727 |
| G6 | 35 | −45.8752 |

In Example 19, the twenty first and thirty third lens surfaces are aspherical. Table 92 shows the [Aspherical data].

TABLE 92

| [Aspherical data] | | | | | |
|---|---|---|---|---|---|
| R | κ | $C_4$ | $C_6$ | $C_8$ | $C_{10}$ |
| Twenty first surface | | | | | |
| 68.1766 | +6.4289 | $-3.5300 \times 10^{-6}$ | $-2.4444 \times 10^{-9}$ | $+1.4025 \times 10^{-13}$ | $-5.1737 \times 10^{-15}$ |
| Thirty third surface | | | | | |
| 94.2945 | +3.6771 | $-6.3530 \times 10^{-6}$ | $-2.3874 \times 10^{-9}$ | $+8.1294 \times 10^{-12}$ | $-2.0403 \times 10^{-14}$ |

In Example 19, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d34 between the fifth lens group G5 and the sixth lens group G6, and the back focus Bf, change upon zooming. Table 93 shows the [Variable distance data].

TABLE 93

| [Variable distance data] | | | |
|---|---|---|---|
| | Wide-angle end | intermediate focal length | telephoto end |
| d5 | 9.0611 | 9.0611 | 9.0611 |
| d8 | 2.0000 | 15.6658 | 22.0846 |
| d15 | 49.0479 | 23.2194 | 2.0000 |
| d22 | 2.0000 | 14.1624 | 28.9641 |
| d28 | 23.2684 | 10.6609 | 2.0000 |
| d34 | 12.0408 | 7.0601 | 2.0000 |
| Bf | 55.0001 | 72.5884 | 86.3084 |

Table 94 shows the [Focusing lens group shift distance] in Example 19. In the table, the direction of shift to the object is defined as a positive direction.

TABLE 94

| [Focusing lens group shift distance] | | | |
|---|---|---|---|
| | Wide-angle end | intermediate focal length | telephoto end |
| f | 81.5937 | 199.9999 | 392.0039 |
| Δ1b | 7.0610 | 7.0610 | 7.0610 |

Table 95 shows the [Conditional expression correspondence value] in Example 19.

TABLE 95

| [Conditional expression correspondence value] |
|---|
| f2 = −28.7665 |
| f4 = −55.2171 |
| f5 = 43.3727 |
| ft = 392.0039 |
| f1b = 155.5055 |
| TL = 259.0000 |
| (9)(−f2)/(−f4) = 0.5210 |
| (10)(−f2)/f5 = 0.6632 |
| (11)ft/f1b = 2.5208 |
| (12)TL/f1b = 1.6655 |

Figure 69A:
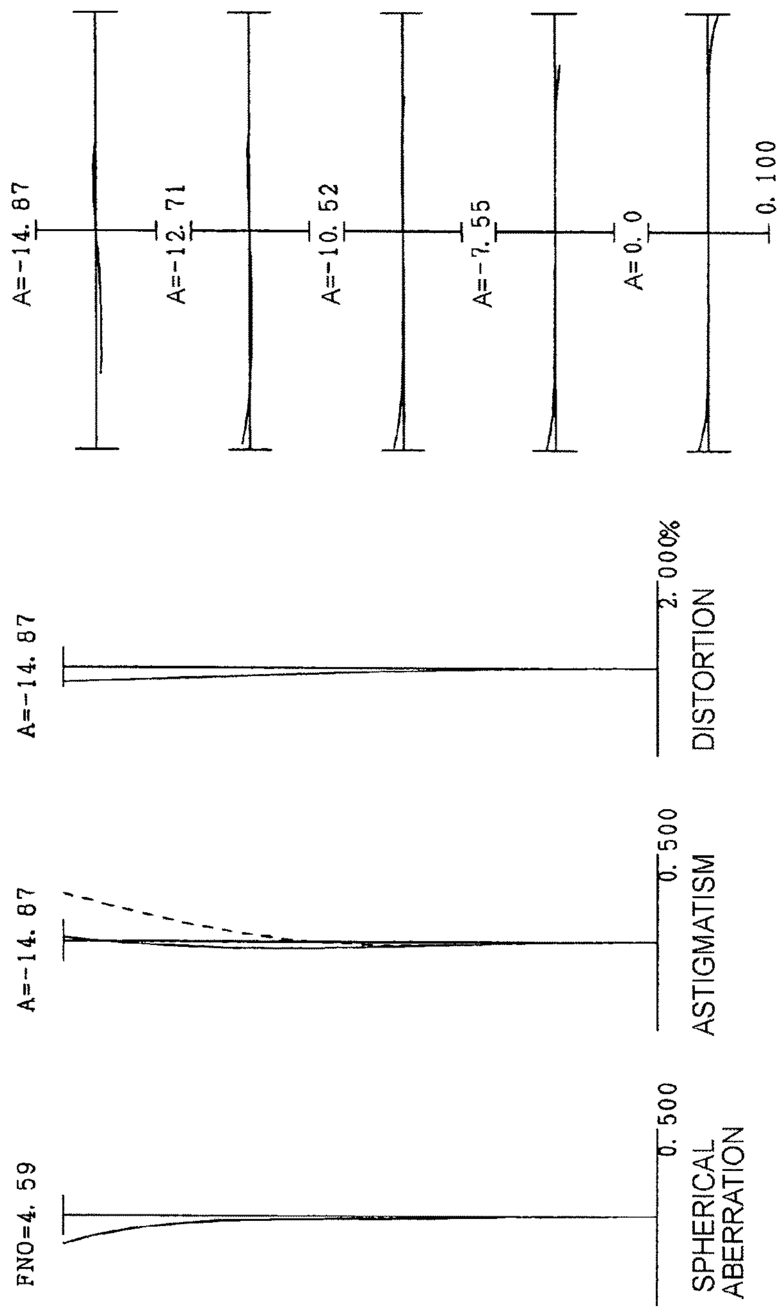
FIG. 69A shows the wide angle end state.
Figure 69B:
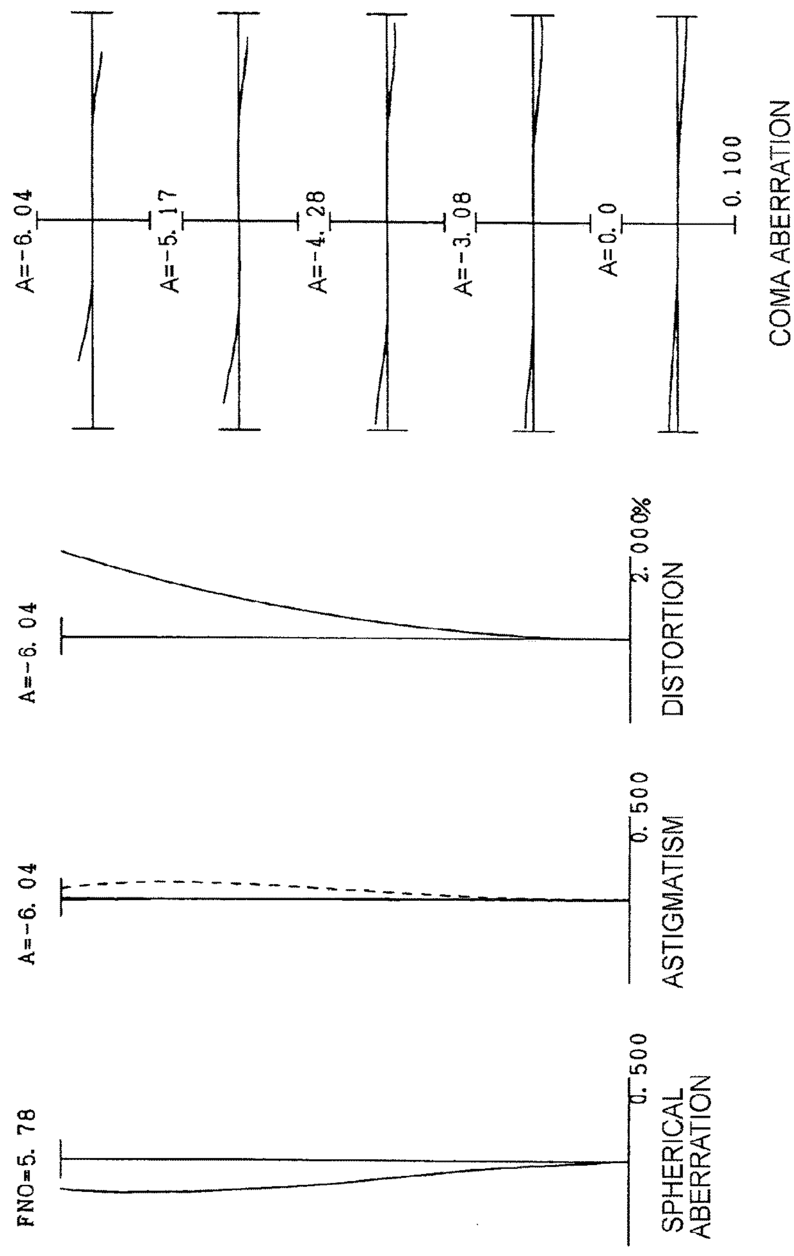
FIG. 69B shows the intermediate focal length state.
Figure 69C:
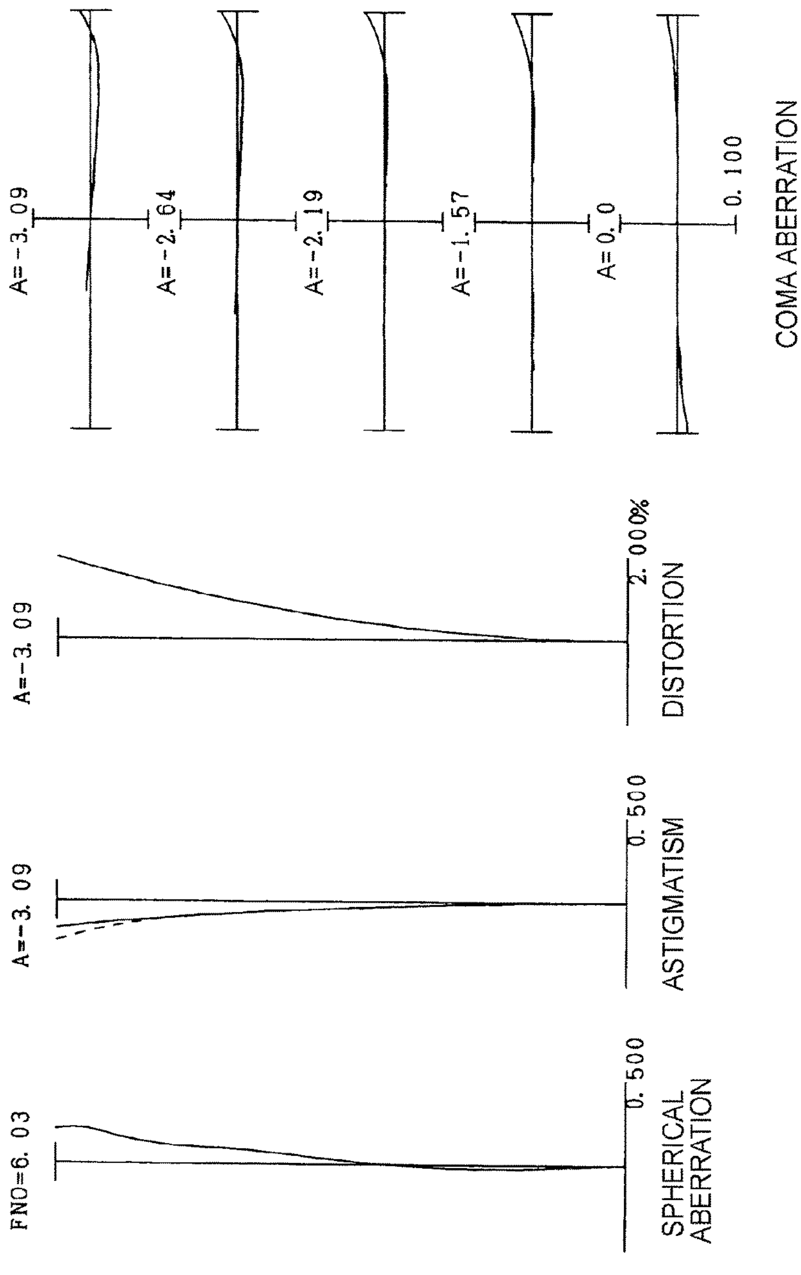
FIG. 69C shows the telephoto end state.
Figure 70A:
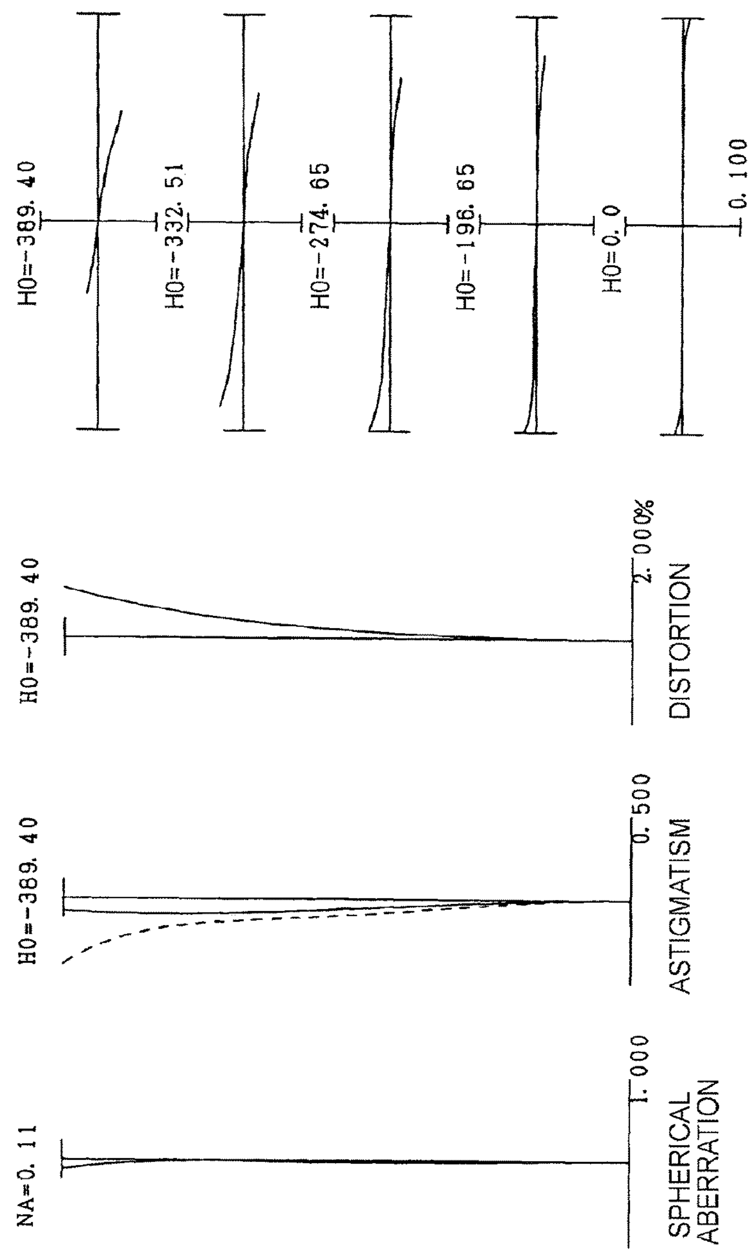
FIG. 70A shows the wide angle end state.
Figure 70B:
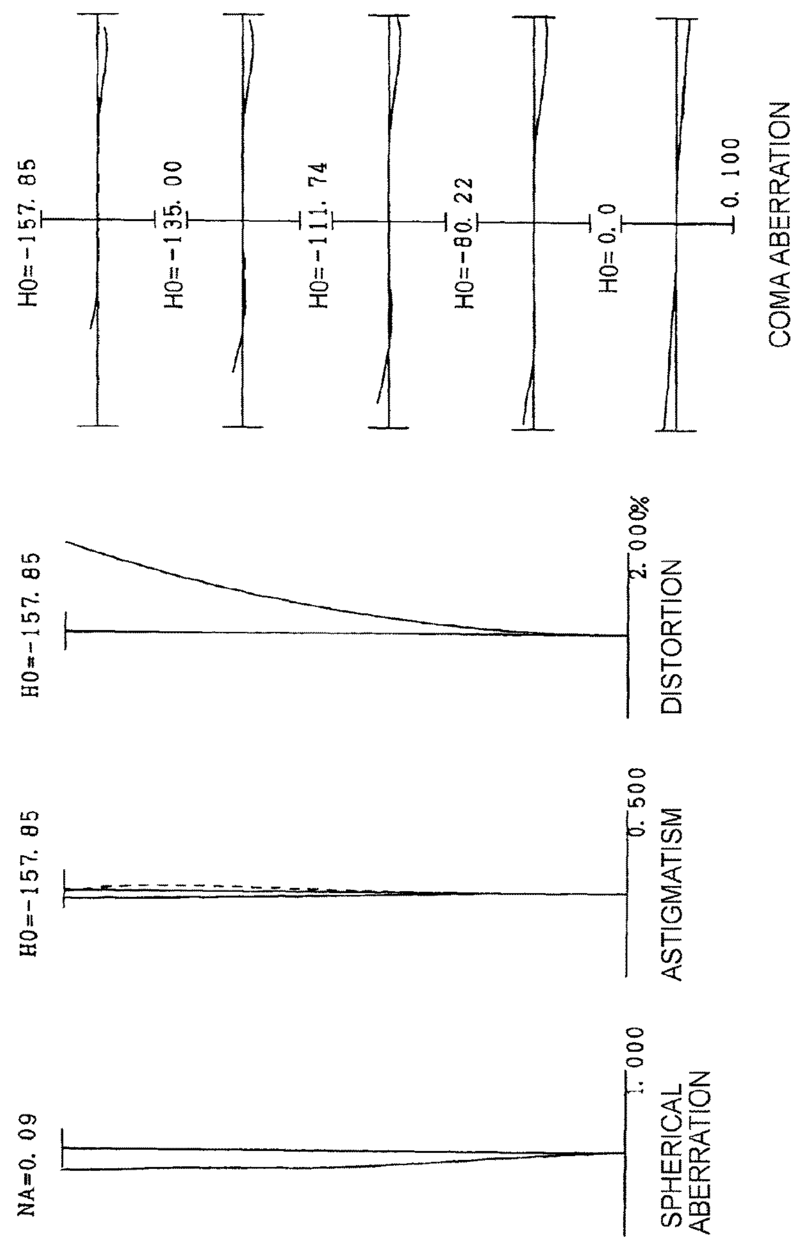
FIG. 70B shows the intermediate focal length state.
Figure 70C:
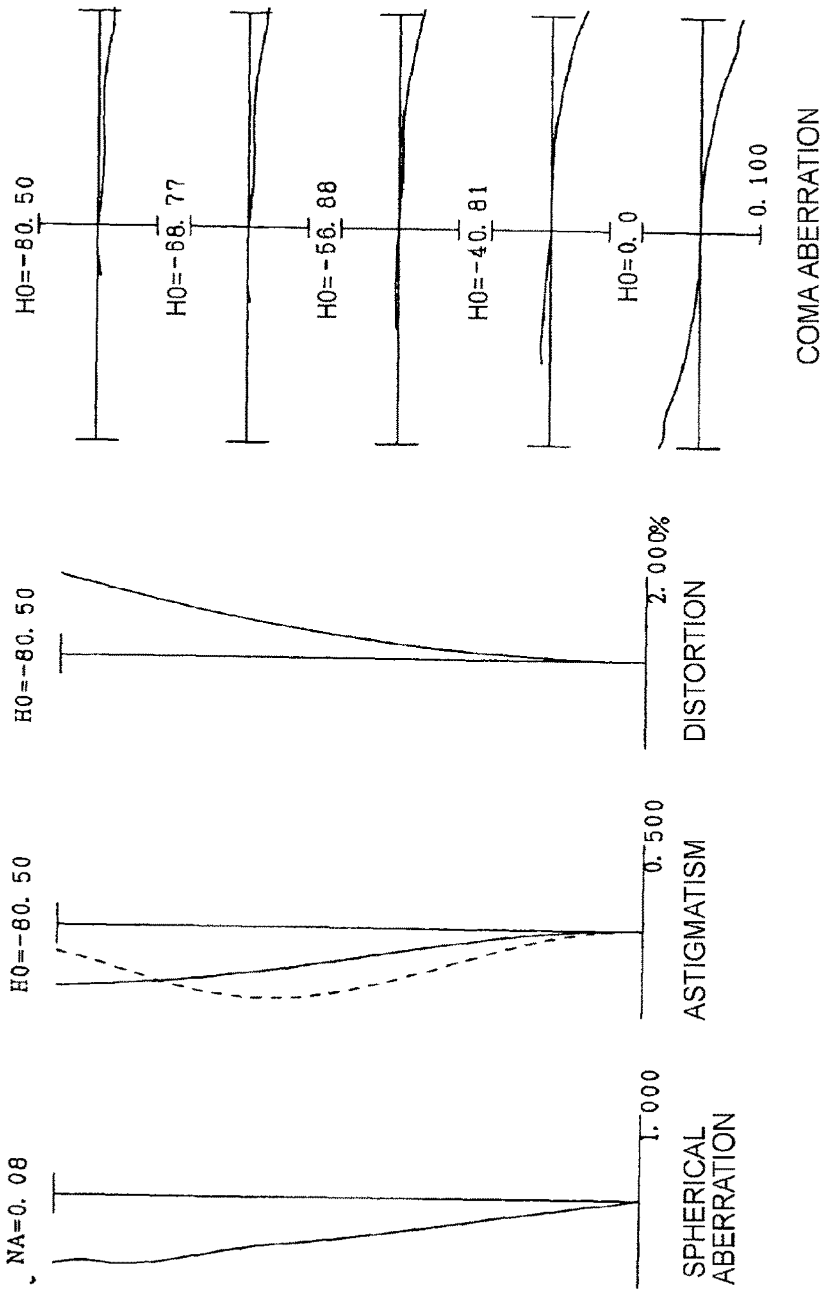
FIG. 70C shows the telephoto end state.

FIG. 69 and FIG. 70 are graphs showing various aberrations of Example 19 at d-line (wavelength: 587.6 nm). In other words, FIG. 69A are graphs showing various aberrations upon focusing on infinity in the wide angle end state (f=81.59 mm), FIG. 69B are graphs showing various aberrations upon focusing on infinity in the intermediate focal length state (f=200.00 mm), and FIG. 69C are graphs showing various aberrations upon focusing on infinity in the telephoto end state (f=392.00 mm). FIG. 70A are graphs showing various aberrations upon close distance focusing (photographic distance: 1.8 m) in the wide angle end state (f=81.59 mm), FIG. 70B are graphs showing various aberrations upon close distance focusing (photographic distance: 1.8 m) in the intermediate focal length state (f=200.00 mm), and FIG. 70C are graphs showing various aberrations upon close distance focusing (photographic distance: 1.8 m) in the telephoto end state (f=392.00 mm).

As each graph showing aberrations indicates, according to Example 19, various aberrations are corrected well in each focal length state, from the wide angle end state to the telephoto end state, implementing excellent image forming performance.

Example 20

Figure 71:
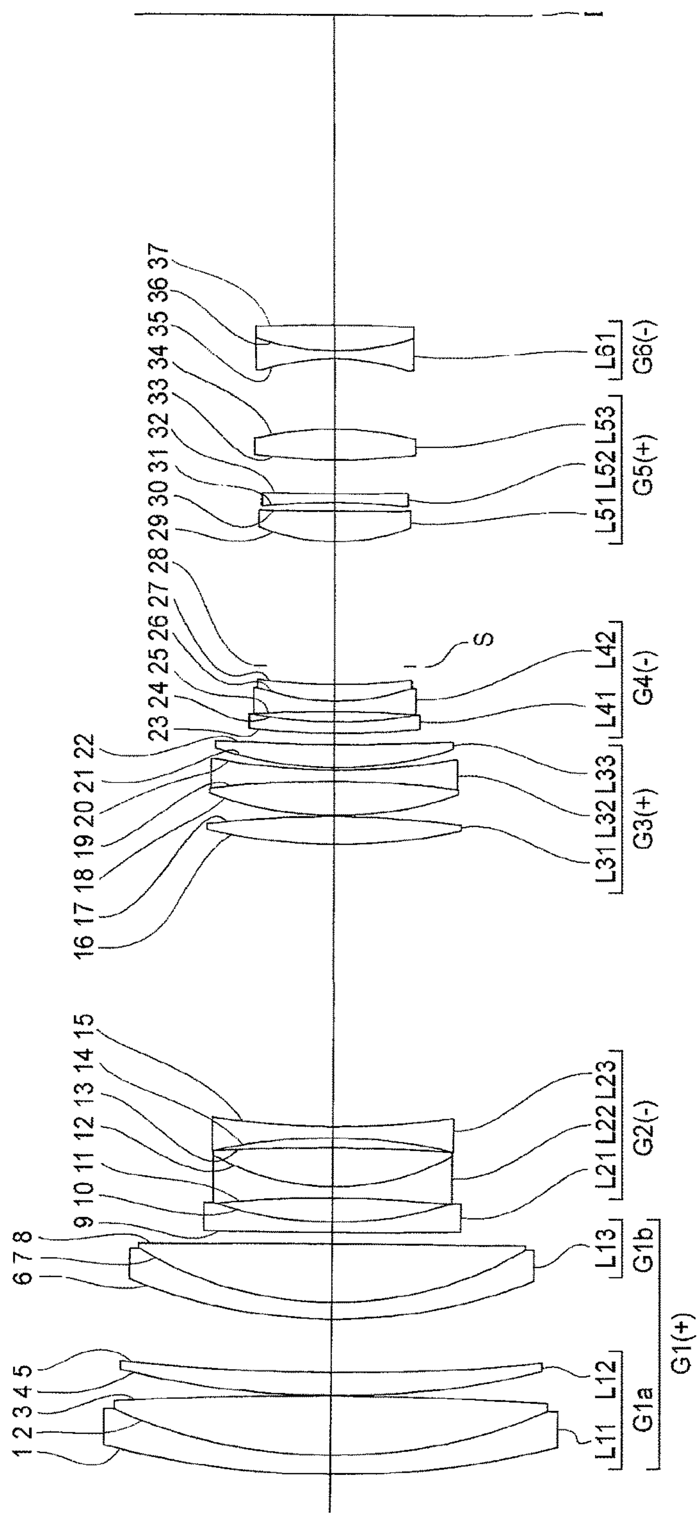
FIG. 71 is a diagram depicting a configuration of a lens system according to Example 20.

Example 20 will now be described with reference to FIG. 71 to FIG. 73 and Table 96 to Table 100. FIG. 71 is a diagram depicting a configuration of a lens system according to Example 20. As FIG. 71 shows, in the lens system according to Example 9, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a biconvex lens are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a positive meniscus lens L33 having a convex surface facing the object.

The fourth lens group G4 has, in order from the object, a negative meniscus lens L41 having a convex surface facing the object, and a cemented negative lens L42 in which a biconcave lens and a positive meniscus lens having a convex surface facing the object are cemented.

The fifth lens group G5 has, in order from the object, a positive meniscus lens L51 having a convex surface facing the object, a biconcave lens L52, and a biconvex lens L53.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 20 are shown in Table 96.

TABLE 96

[All parameters]

| | Wide-angle end | | intermediate focal length | | telephoto end |
|---|---|---|---|---|---|
| f | 81.59 | ~ | 200.00 | ~ | 392.00 |
| FNO | 4.59 | ~ | 5.80 | ~ | 6.00 |
| 2ω | 29.89 | ~ | 12.08 | ~ | 6.19 |
| Image Height | 21.60 | ~ | 21.60 | ~ | 21.60 |
| Total lens Length | 259.00 | ~ | 259.00 | ~ | 259.00 |

TABLE 96-continued

[Lens data]

| Surface Number | r | d | nd | νd |
|---|---|---|---|---|
| 1 | 137.8365 | 3.30 | 1.79952 | 42.24 |
| 2 | 80.3919 | 10.50 | 1.49782 | 82.52 |
| 3 | −590.6028 | 0.10 | | |
| 4 | 135.6109 | 3.98 | 1.49782 | 82.52 |
| 5 | 316.8088 | (d5) | | |
| 6 | 80.3916 | 3.00 | 1.84666 | 23.78 |
| 7 | 56.9394 | 10.26 | 1.58913 | 61.16 |
| 8 | −5092.0839 | (d8) | | |
| 9 | 898.2577 | 2.00 | 1.81600 | 46.62 |
| 10 | 55.8033 | 4.27 | | |
| 11 | −178.3098 | 2.00 | 1.75500 | 52.32 |
| 12 | 36.2625 | 6.80 | 1.80810 | 22.76 |
| 13 | −330.4063 | 1.88 | | |
| 14 | −76.4913 | 2.00 | 1.81600 | 46.62 |
| 15 | 124.0482 | (d15) | | |
| 16 | 87.2446 | 4.88 | 1.72916 | 54.68 |
| 17 | −147.6473 | 0.20 | | |
| 18 | 54.4904 | 6.00 | 1.60300 | 65.44 |
| 19 | −149.7863 | 2.00 | 1.84666 | 23.78 |
| 20 | 96.7062 | 0.40 | | |
| 21 | 55.3506 | 4.18 | 1.60300 | 65.44 |
| 22 | 314.2168 | (d22) | | |
| 23 | 122.2514 | 2.00 | 1.81600 | 46.62 |
| 24 | 65.1247 | 1.84 | | |
| 25 | −179.0558 | 1.80 | 1.77250 | 49.60 |
| 26 | 32.8901 | 2.96 | 1.84666 | 23.78 |
| 27 | 84.4546 | 3.30 | | |
| 28 | 0.0000 | (d28) | (aperture stop S) | |
| 29 | 30.2362 | 5.41 | 1.49700 | 81.54 |
| 30 | 691.6772 | 1.50 | | |
| 31 | −97.7031 | 1.50 | 1.84666 | 23.78 |
| 32 | 369.7789 | 6.00 | | |
| *33 | 74.2923 | 5.57 | 1.59319 | 67.87 |
| 34 | −47.4634 | (d34) | | |
| 35 | −33.9102 | 1.50 | 1.81600 | 46.62 |
| 36 | 36.4984 | 4.64 | 1.76182 | 26.52 |
| 37 | −220.4591 | (Bf) | | |

[Each group focal length data]

| Group | First surface | Focal length |
|---|---|---|
| G1 | 1 | 93.8532 |
| G2 | 9 | −29.3096 |
| G3 | 16 | 43.9086 |
| G4 | 23 | −55.2735 |
| G5 | 29 | 43.2494 |
| G6 | 35 | −45.8281 |

In Example 20, the thirty third lens surface is aspherical. Table 97 shows the [Aspherical data].

TABLE 97

[Aspherical data]
Thirty third surface

| R | κ | $C_4$ | $C_6$ | $C_8$ | $C_{10}$ |
|---|---|---|---|---|---|
| 74.2923 | +1.2435 | $-5.7876 \times 10^{-6}$ | $-3.0853 \times 10^{-9}$ | $+1.6355 \times 10^{-11}$ | $-4.2846 \times 10^{-14}$ |

In Example 20, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d34 between the fifth lens group G5 and the sixth lens group G6, and the back focus Bf, change upon zooming. Table 98 shows the [Variable distance data].

TABLE 98

| [Variable distance data] | | | |
|---|---|---|---|
| | Wide-angle end | intermediate focal length | telephoto end |
| d5 | 9.3719 | 9.3719 | 9.3719 |
| d8 | 2.0000 | 15.3558 | 21.7726 |
| d15 | 50.0575 | 23.6986 | 2.0000 |
| d22 | 2.0000 | 15.0031 | 30.2850 |
| d28 | 22.3623 | 10.1959 | 2.0000 |
| d34 | 12.4482 | 7.0738 | 2.0000 |
| Bf | 55.0002 | 72.5408 | 85.8099 |

Table 99 shows the [Focusing lens group shift distance] in Example 20. In the table, the direction of shift to the object is defined as a positive direction.

TABLE 99

| [Focusing lens group shift distance] | | | |
|---|---|---|---|
| | Wide-angle end | intermediate focal length | telephoto end |
| f | 81.5938 | 200.0002 | 392.0050 |
| Δ1b | 7.3707 | 7.3707 | 7.3707 |

Table 100 shows the [Conditional expression correspondence value] in Example 20.

TABLE 100

| [Conditional expression correspondence value] |
|---|
| f2 = −29.3096 |
| f4 = −55.2735 |
| f5 = 43.2494 |
| ft = 392.0050 |
| f1b = 161.4108 |
| TL = 259.0001 |
| (9)(−f2)/(−f4) = 0.5303 |
| (10)(−f2)/f5 = 0.6777 |
| (11)ft/f1b = 2.4286 |
| (12)TL/f1b = 1.6046 |

Figure 72A:
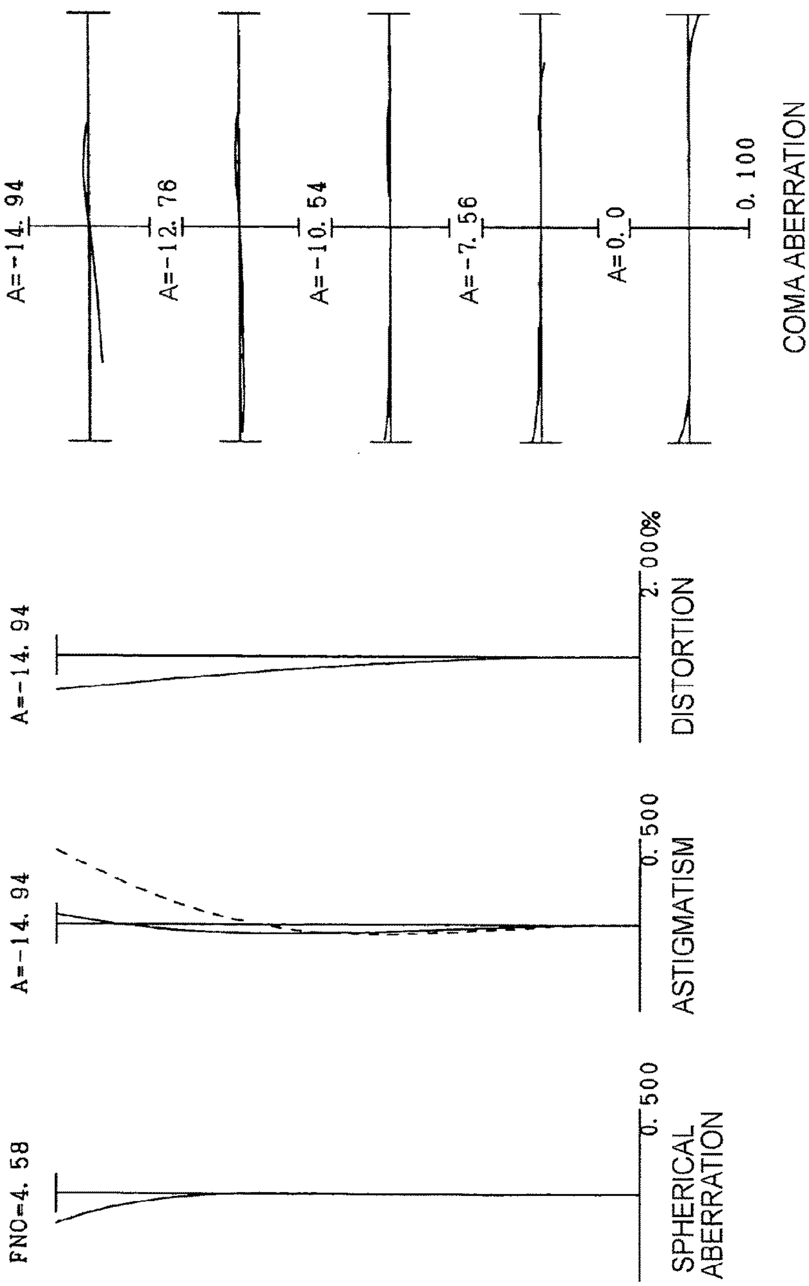
FIG. 72A shows the wide angle end state.
Figure 72B:
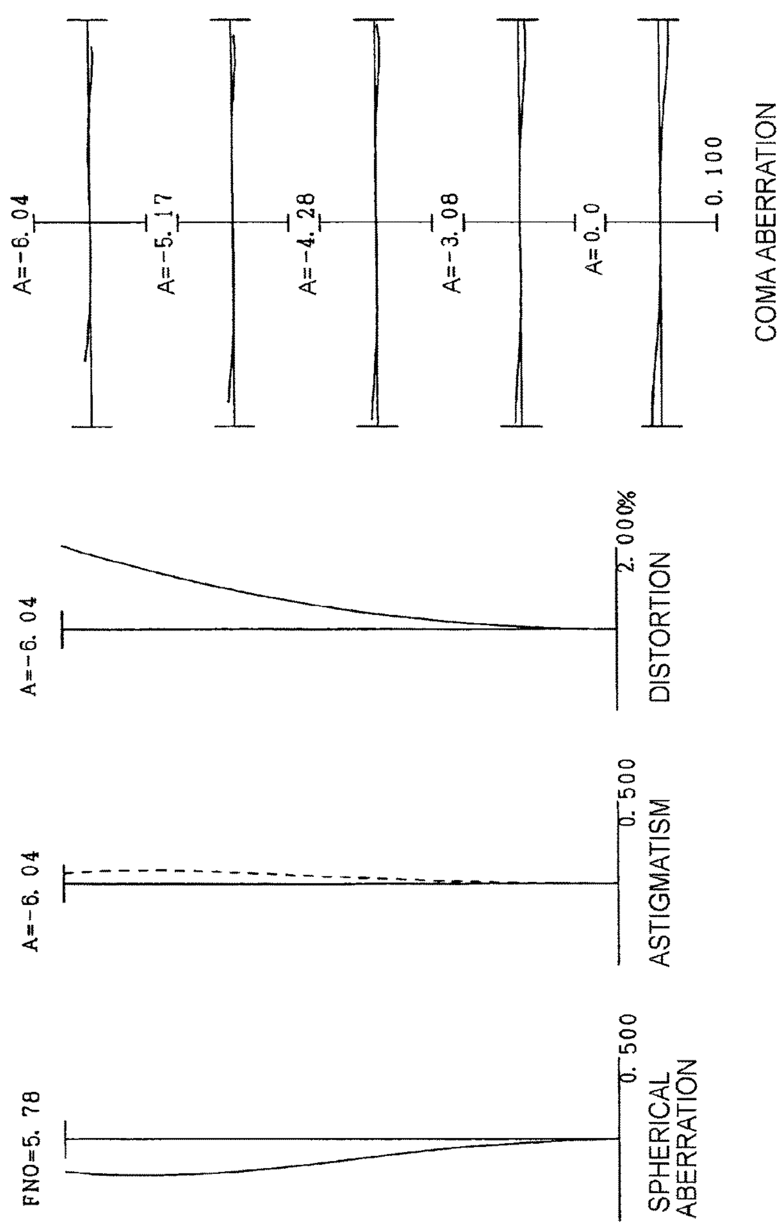
FIG. 72B shows the intermediate focal length state.
Figure 72C:
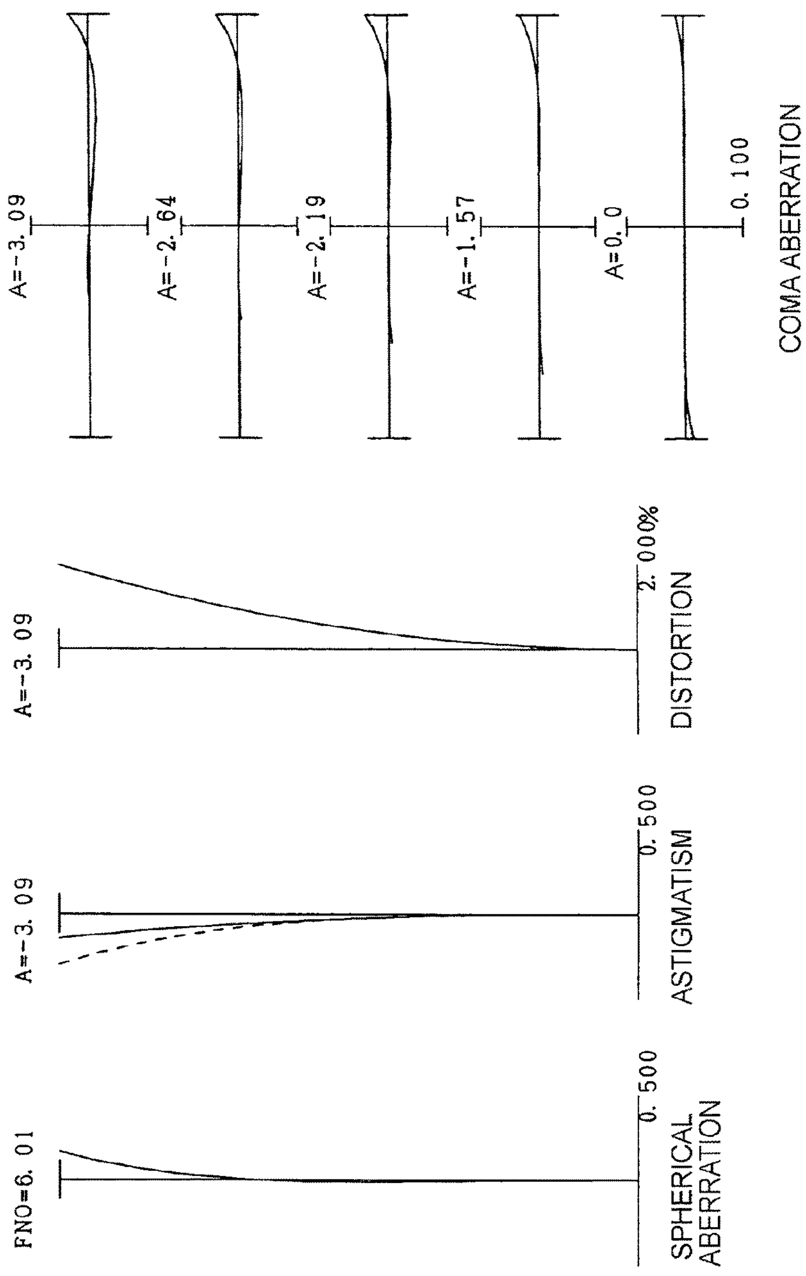
FIG. 72C shows the telephoto end state.
Figure 73A:
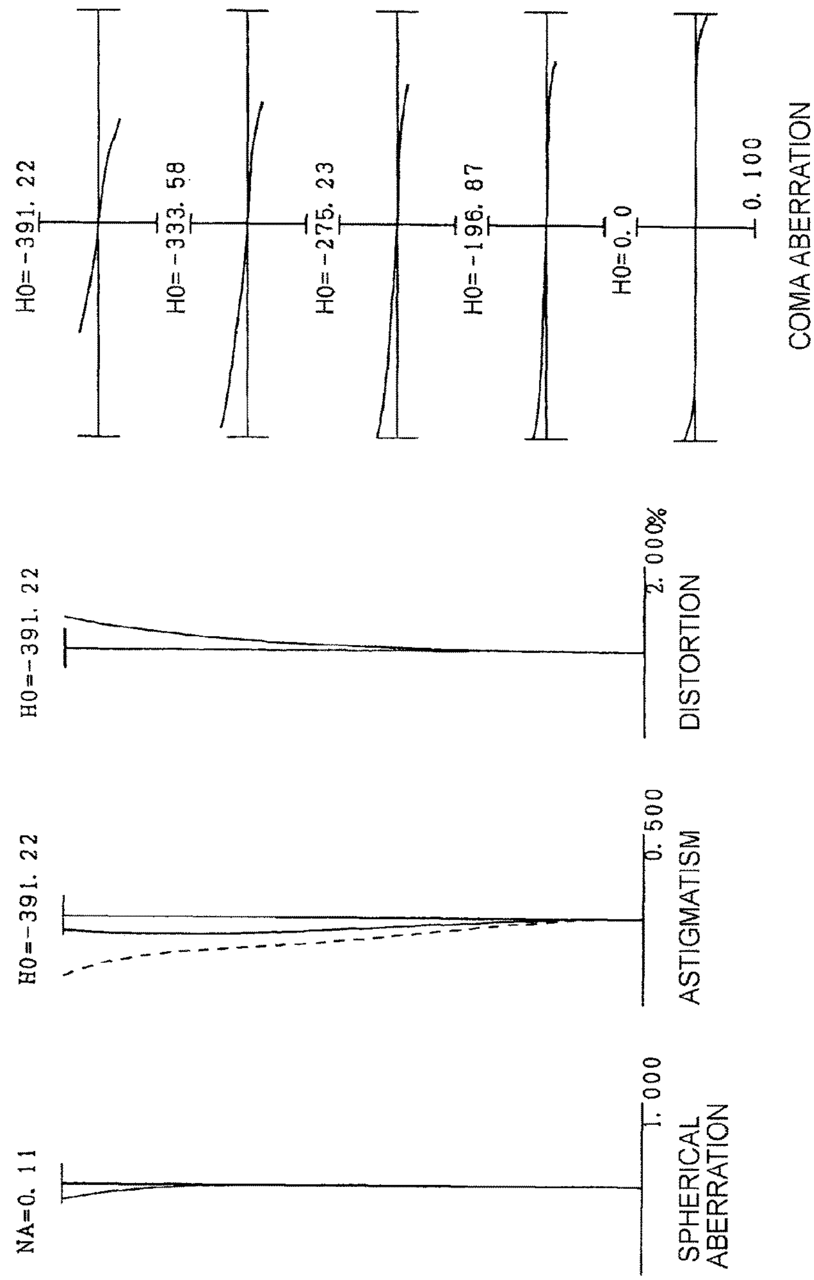
FIG. 73A shows the wide angle end state.
Figure 73B:
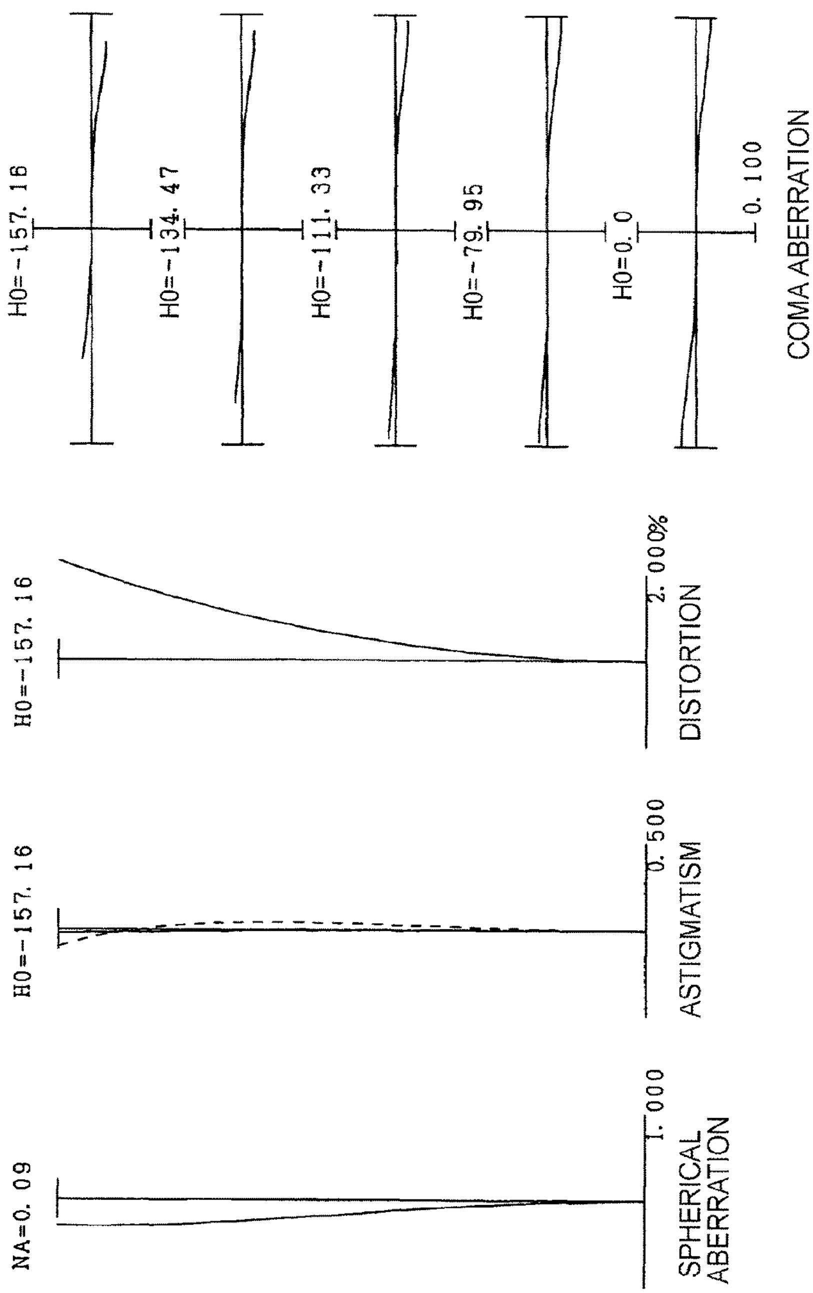
FIG. 73B shows the intermediate focal length state.
Figure 73C:
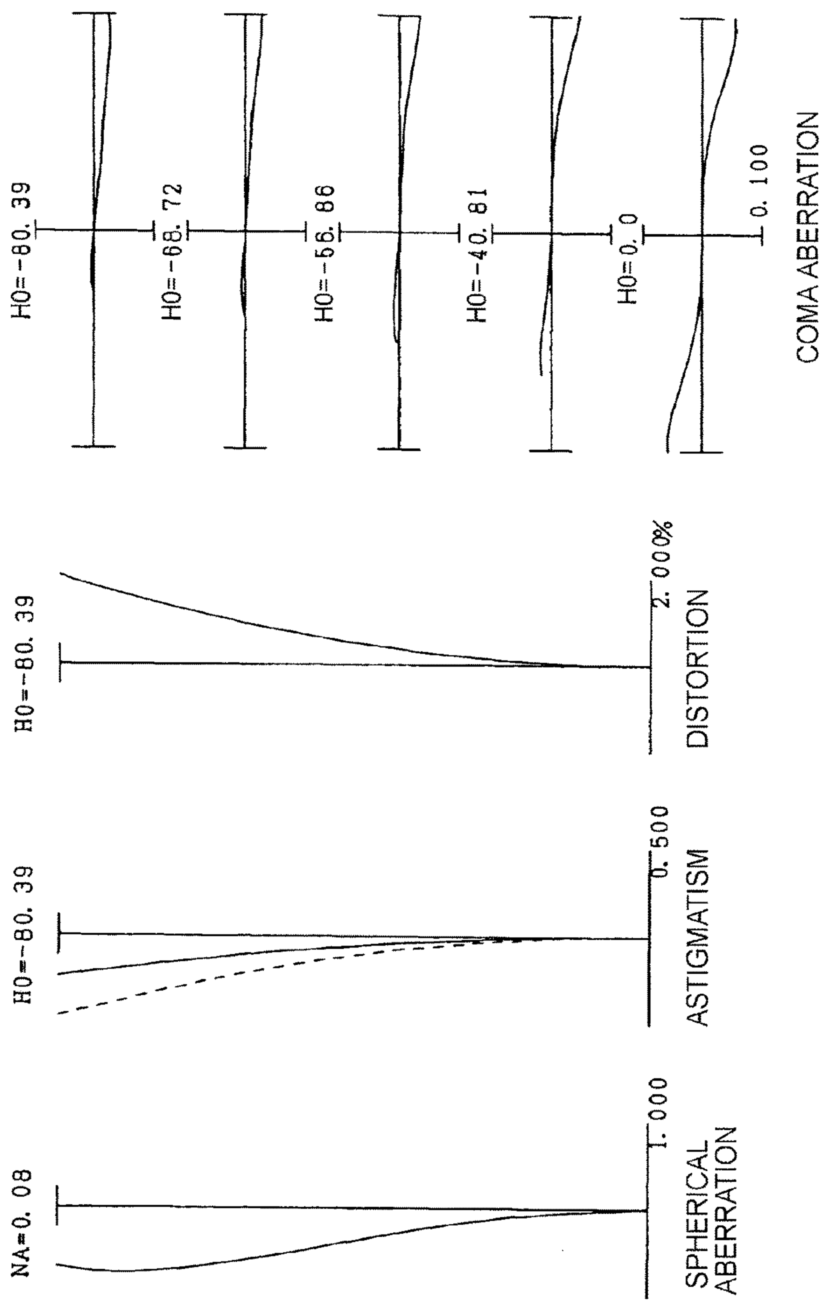
FIG. 73C shows the telephoto end state.

FIG. 72 and FIG. 73 are graphs showing various aberrations of Example 20 at d-line (wavelength: 587.6 nm). In other words, FIG. 72A are graphs showing various aberrations upon focusing on infinity in the wide angle end state (f=81.59 mm), FIG. 72B are graphs showing various aberrations upon focusing on infinity in the intermediate focal length state (f=200.00 mm), and FIG. 72C are graphs showing various aberrations upon focusing on infinity in the telephoto end state (f=392.00 mm). FIG. 73A are graphs showing various aberrations upon close distance focusing (photographic distance: 1.8 m) in the wide angle end state (f=81.59 mm), FIG. 73B are graphs showing various aberrations upon close distance focusing (photographic distance: 1.8 m) in the intermediate focal length state (f=200.00 mm), and FIG. 73C are graphs showing various aberrations upon close distance focusing (photographic distance: 1.8 m) in the telephoto end state (f=392.00 mm).

As each graph showing aberrations indicates, according to Example 20, various aberrations are corrected well in each focal length state, from the wide angle end state to the telephoto end state, implementing excellent image forming performance.

Example 21

Figure 74:
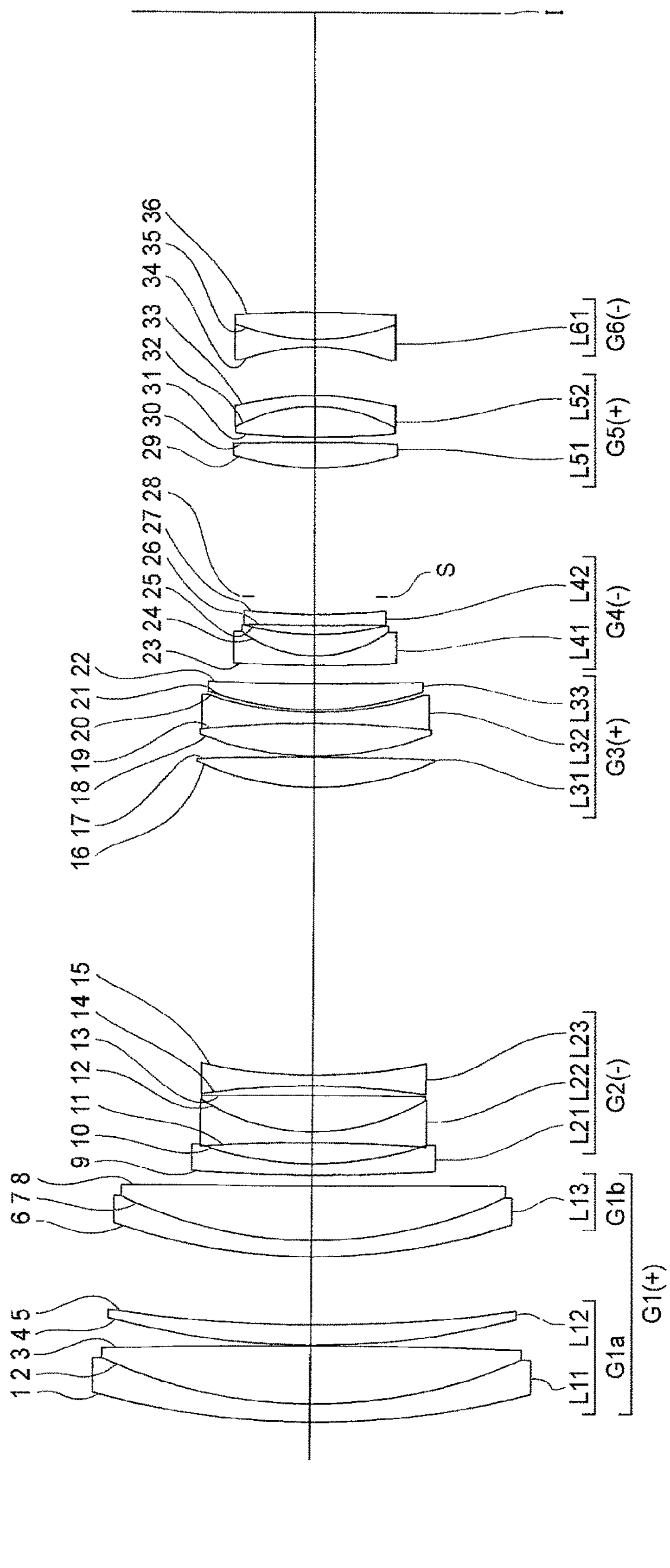
FIG. 74 is a diagram depicting a configuration of a lens system according to Example 21.

Example 21 will now be described with reference to FIG. 74 to FIG. 77 and Table 101 to Table 105. FIG. 74 is a diagram depicting a configuration of a lens system according to Example 21. As FIG. 74 shows, in the lens system according to Example 21, the first lens group G1 has, in order from the object, a front portion lens group G1_a_ and a rear portion lens group G1_b_. The front portion lens group G1_a_ has, in order from the object, a cemented positive lens L11 in which a negative meniscus lens having a convex surface facing the object and a biconvex lens are cemented, and a positive meniscus lens L12 having a convex surface facing the object. The rear portion lens group G1_b_ has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a positive meniscus lens L33 having a convex surface facing the object.

The fourth lens group G4 has, in order from the object, a cemented negative lens L41 in which a negative meniscus lens having a convex surface facing the object and a positive meniscus lens having a convex surface facing the object are cemented, and a negative meniscus lens L42 having a convex surface facing the object. In this example, all or a part of the fourth lens group G4 shift as a shift lens group, so as to have a component in an approximately orthogonal to the optical axis.

The fifth lens group G5 has, in order from the object, a biconvex lens L51, and a cemented positive lens L52 in which a biconvex lens and a negative meniscus lens having a convex surface facing the image are cemented.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 21 are shown in Table 101.

TABLE 101

| [All parameters] | | | | | |
|---|---|---|---|---|---|
| | Wide-angle end | | intermediate focal length | | telephoto end |
| f | 81.59 | ~ | 199.36 | ~ | 392.00 |
| FNO | 4.59 | ~ | 5.61 | ~ | 5.85 |
| 2ω | 29.77 | ~ | 12.13 | ~ | 6.20 |
| Image Height | 21.60 | ~ | 21.60 | ~ | 21.60 |
| Total lens Length | 258.89 | ~ | 258.89 | ~ | 258.89 |

| [Lens data] | | | | |
|---|---|---|---|---|
| Surface Number | r | d | nd | νd |
| 1 | 131.2682 | 3.30 | 1.79952 | 42.24 |
| 2 | 79.2077 | 10.60 | 1.49782 | 82.52 |
| 3 | −1090.3032 | 0.10 | | |
| 4 | 123.2408 | 3.70 | 1.49782 | 82.52 |
| 5 | 220.9763 | (d5 ) | | |

TABLE 101-continued

| | | | | |
|---|---|---|---|---|
| 6 | 96.1976 | 3.00 | 1.84666 | 23.78 |
| 7 | 69.0965 | 10.00 | 1.58913 | 61.16 |
| 8 | 4928.1656 | (d8) | | |
| 9 | 288.2296 | 2.00 | 1.81600 | 46.62 |
| 10 | 54.2542 | 3.80 | | |
| 11 | −249.4274 | 2.00 | 1.75500 | 52.32 |
| 12 | 32.8351 | 6.65 | 1.80810 | 22.76 |
| 13 | −1937.0128 | 1.80 | | |
| 14 | −118.0849 | 2.00 | 1.81600 | 46.62 |
| 15 | 86.5424 | (d15) | | |
| 16 | 44.5000 | 5.50 | 1.64000 | 60.08 |
| 17 | −500.0000 | 0.20 | | |
| 18 | 47.5000 | 6.15 | 1.60300 | 65.44 |
| 19 | −154.7487 | 2.00 | 1.80518 | 25.42 |
| 20 | 51.9426 | 0.50 | | |
| *21 | 45.3806 | 4.75 | 1.59201 | 67.02 |
| 22 | 409.1975 | (d22) | | |
| 23 | 229.8851 | 1.80 | 1.75700 | 47.82 |
| 24 | 19.2035 | 3.95 | 1.79504 | 28.54 |
| 25 | 42.0732 | 1.70 | | |
| 26 | 553.9438 | 2.00 | 1.75500 | 52.32 |
| 27 | 103.9914 | 3.30 | | |
| 28 | 0.0000 | (d28) | (aperture stop S) | |
| *29 | 41.2885 | 4.75 | 1.59201 | 67.02 |
| 30 | −299.5240 | 1.00 | | |
| 31 | 142.3003 | 5.60 | 1.48749 | 70.23 |
| 32 | −25.3123 | 2.00 | 1.72047 | 34.71 |
| 33 | −47.5235 | (d33) | | |
| 34 | −33.2184 | 1.50 | 1.80400 | 46.57 |
| 35 | 34.4337 | 4.90 | 1.72825 | 28.46 |
| 36 | −160.1625 | (Bf) | | |

[Each group focal length data]

| Group | First surface | Focal length |
|---|---|---|
| G1 | 1 | 110.1486 |
| G2 | 9 | −31.3559 |
| G3 | 16 | 42.7470 |
| G4 | 23 | −51.5772 |
| G5 | 29 | 40.9494 |
| G6 | 34 | −46.5805 |

In Example 21, the twenty first and twenty ninth lens surfaces are aspherical. Table 102 shows the [Aspherical data].

TABLE 102

[Aspherical data]

| R | κ | $C_4$ | $C_6$ | $C_8$ | $C_{10}$ |
|---|---|---|---|---|---|
| Twenty first surface | | | | | |
| 45.3806 | +3.5082 | $-6.2708 \times 10^{-6}$ | $-6.0885 \times 10^{-9}$ | $+8.5423 \times 10^{-13}$ | $-1.9843 \times 10^{-14}$ |
| Twenty ninth surface | | | | | |
| 41.2885 | +5.3966 | $-7.1249 \times 10^{-6}$ | $-1.6306 \times 10^{-8}$ | $+2.2822 \times 10^{-11}$ | $-2.6353 \times 10^{-13}$ |

In Example 21, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d33 between the fifth lens group G5 and the sixth lens group G6, and the back focus Bf, change upon zooming. Table 103 shows the [Variable distance data].

TABLE 103

[Variable distance data]

| | Wide-angle end | intermediate focal length | telephoto end |
|---|---|---|---|
| d5 | 12.5666 | 12.5666 | 12.5666 |
| d8 | 2.0000 | 23.5395 | 28.6365 |
| d15 | 52.7950 | 23.5222 | 2.0000 |
| d22 | 3.3567 | 11.0899 | 27.5152 |
| d28 | 23.7470 | 15.7538 | 2.7671 |
| d33 | 8.8798 | 7.1223 | 2.4250 |
| Bf | 54.9997 | 64.7502 | 82.4337 |

Table 104 shows the [Focusing lens group shift distance] in Example 21.

TABLE 104

[Focusing lens group shift distance]

| | Wide-angle end | intermediate focal length | telephoto end |
|---|---|---|---|
| f | 81.5935 | 199.3601 | 392.0023 |
| Δ1b | 10.5666 | 10.5666 | 10.5666 |

Table 105 shows the [Conditional expression correspondence value] in Example 21.

TABLE 105

[Conditional expression correspondence value]

ft = 392.0023
f1b = 199.4630
f2 = −31.3559
f4 = −51.5772
f5 = 40.9494
TL = 258.8947
(9)(−f2)/(−f4) = 0.6079
(10)(−f2)/f5 = 0.7657
(11)ft/f1b = 1.9653
(12)TL/f1b = 1.2980

Figure 75A:
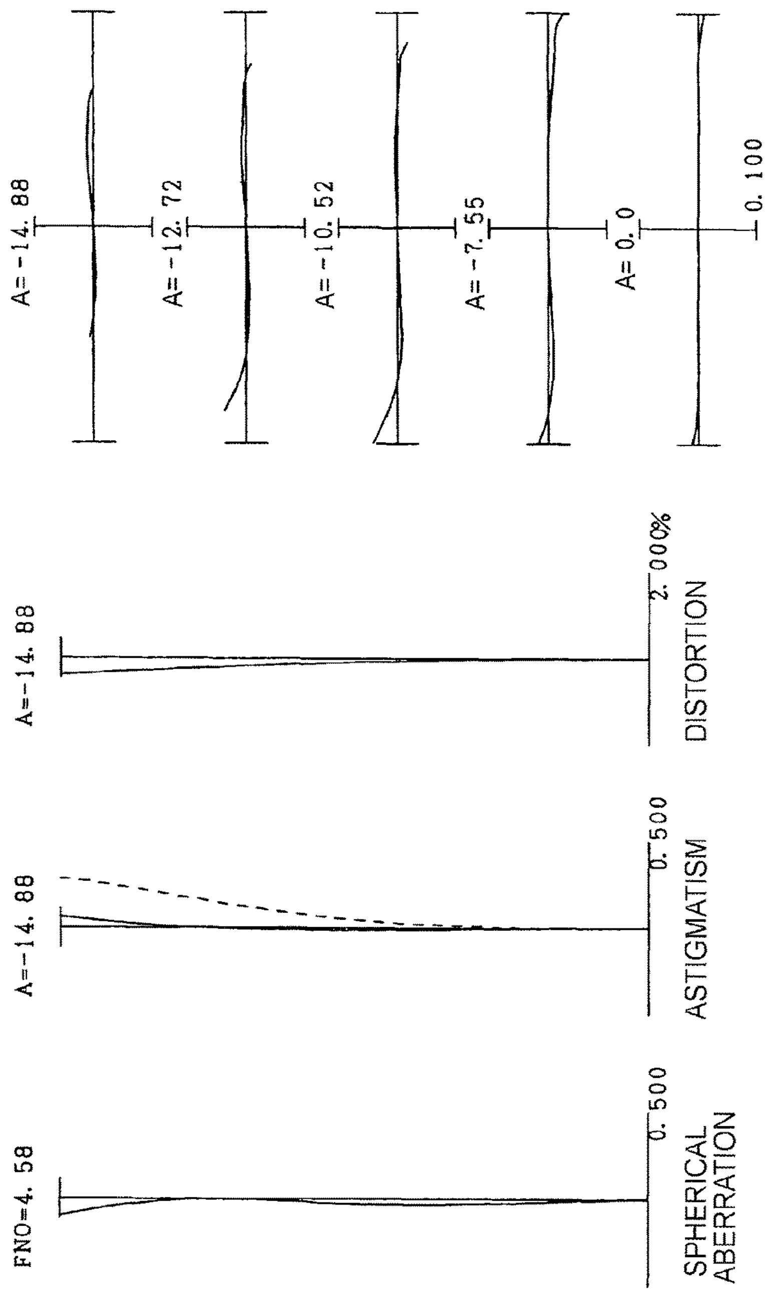
FIG. 75A shows the wide angle end state.
Figure 75B:
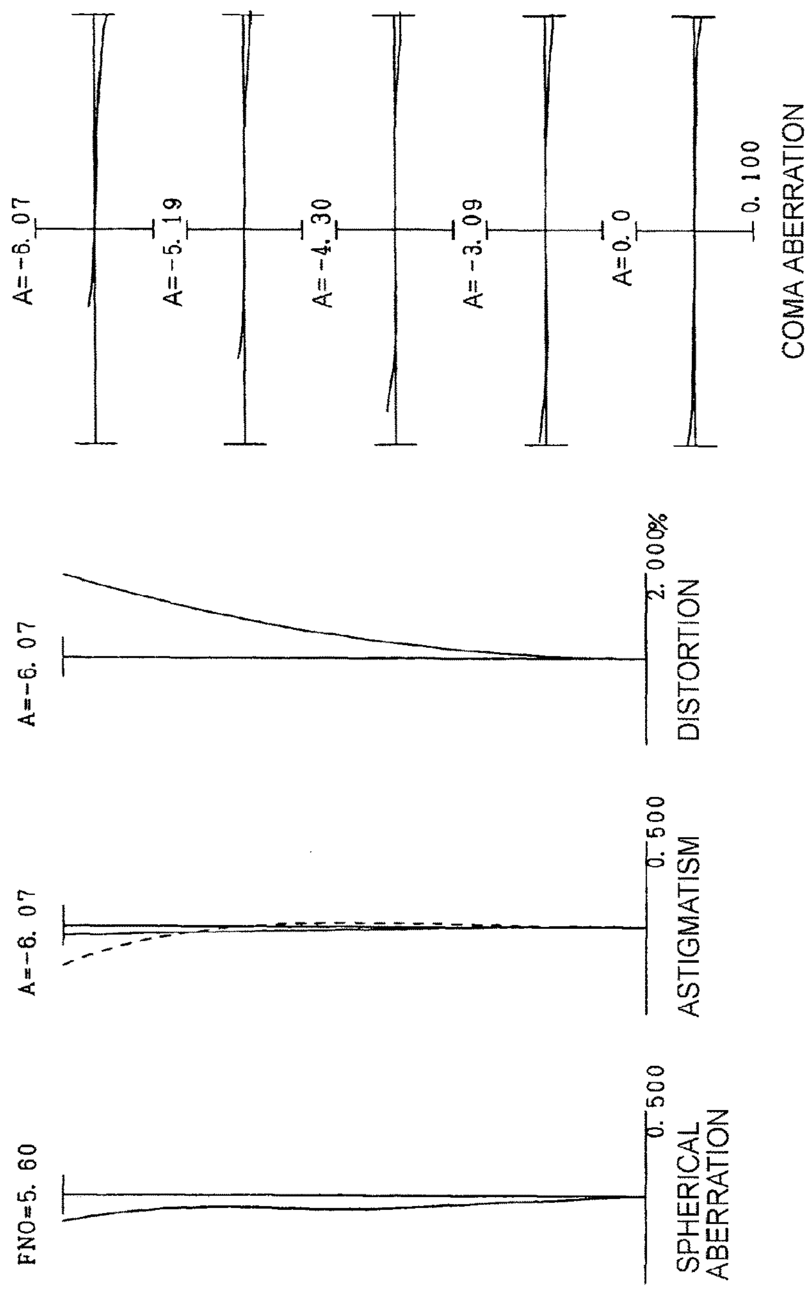
FIG. 75B shows the intermediate focal length state.
Figure 75C:
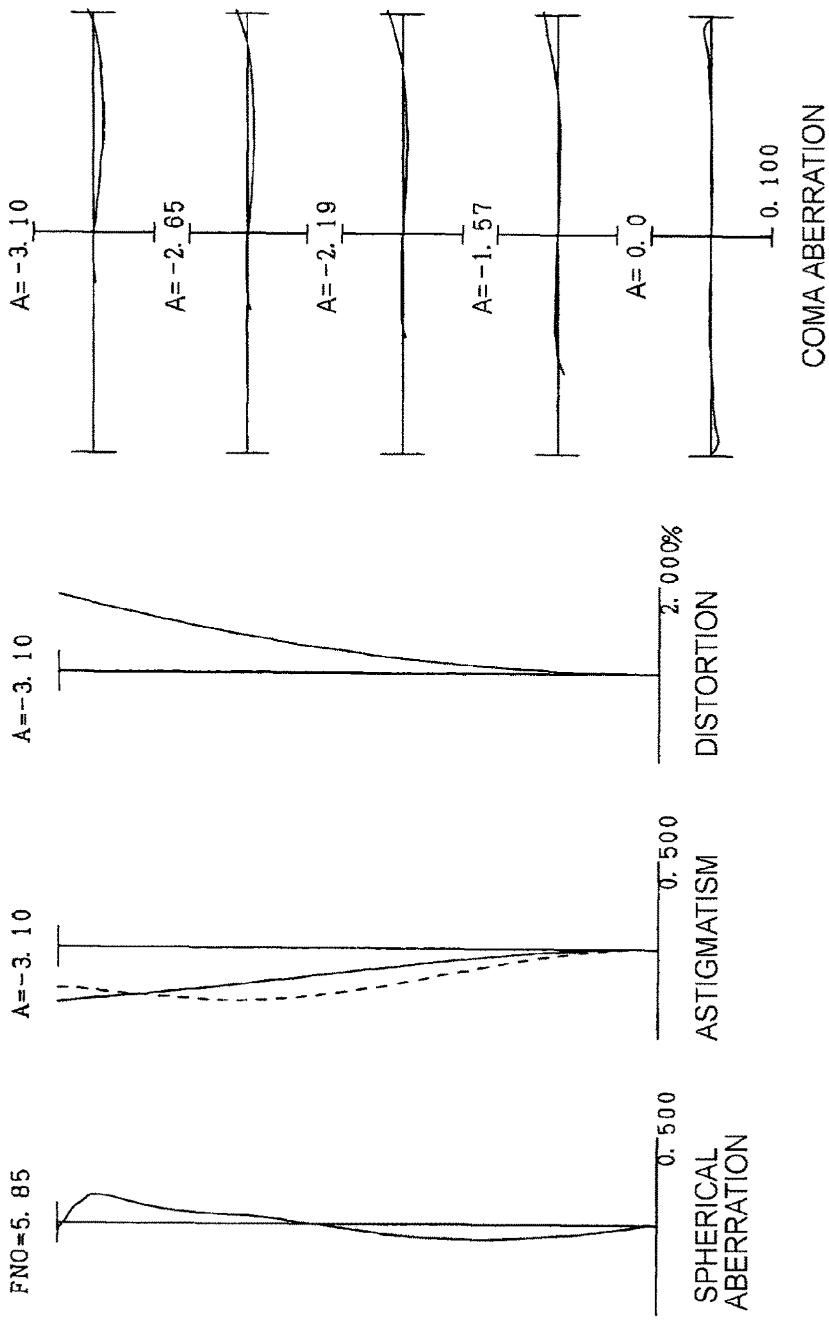
FIG. 75C shows the telephoto end state.
Figure 76A:
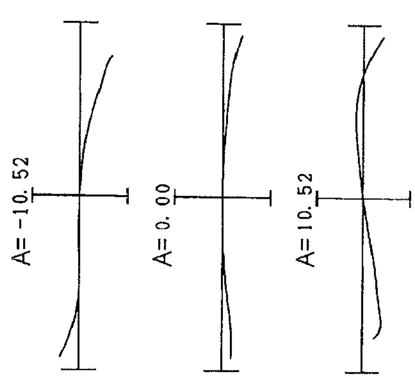
FIG. 76A shows the wide angle end state.
Figure 76B:
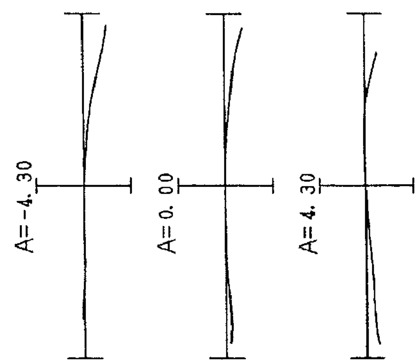
FIG. 76B shows the intermediate focal length state.
Figure 76C:
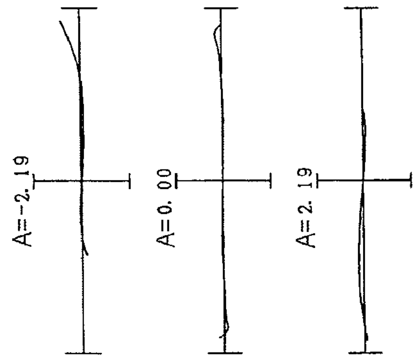
FIG. 76C shows the telephoto end state.
Figure 77A:
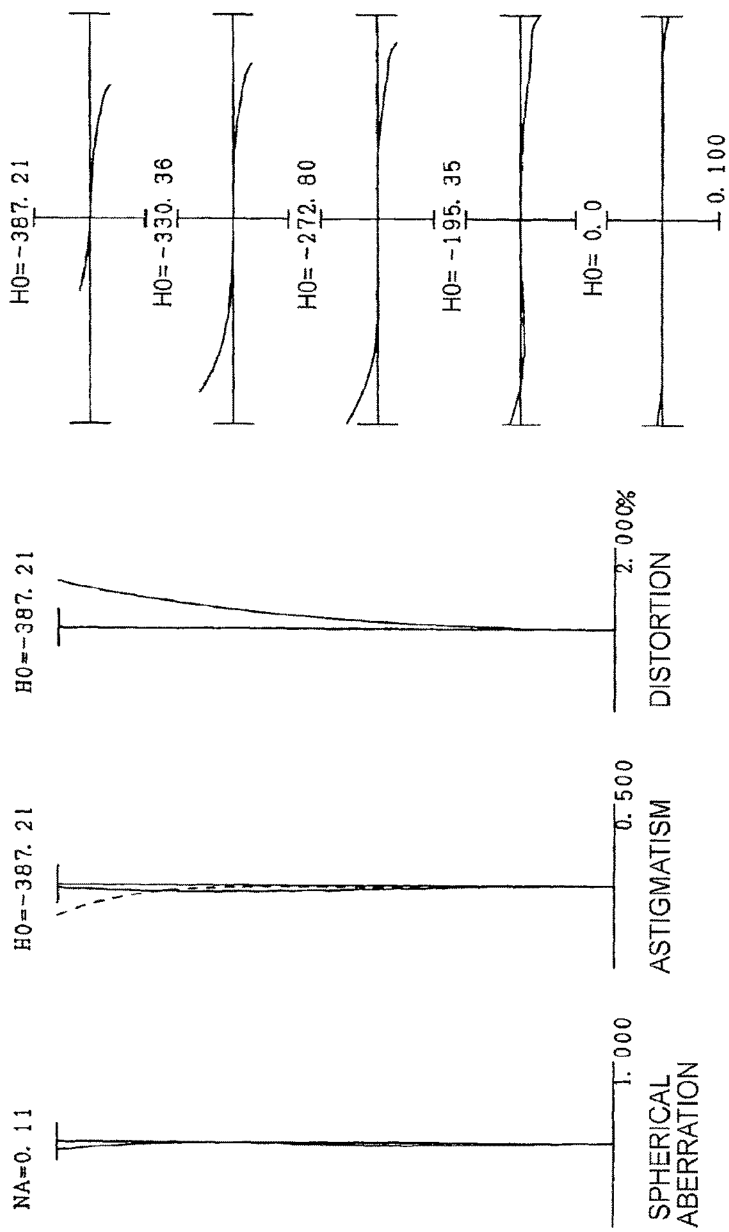
FIG. 77A shows the wide angle end state.
Figure 77B:
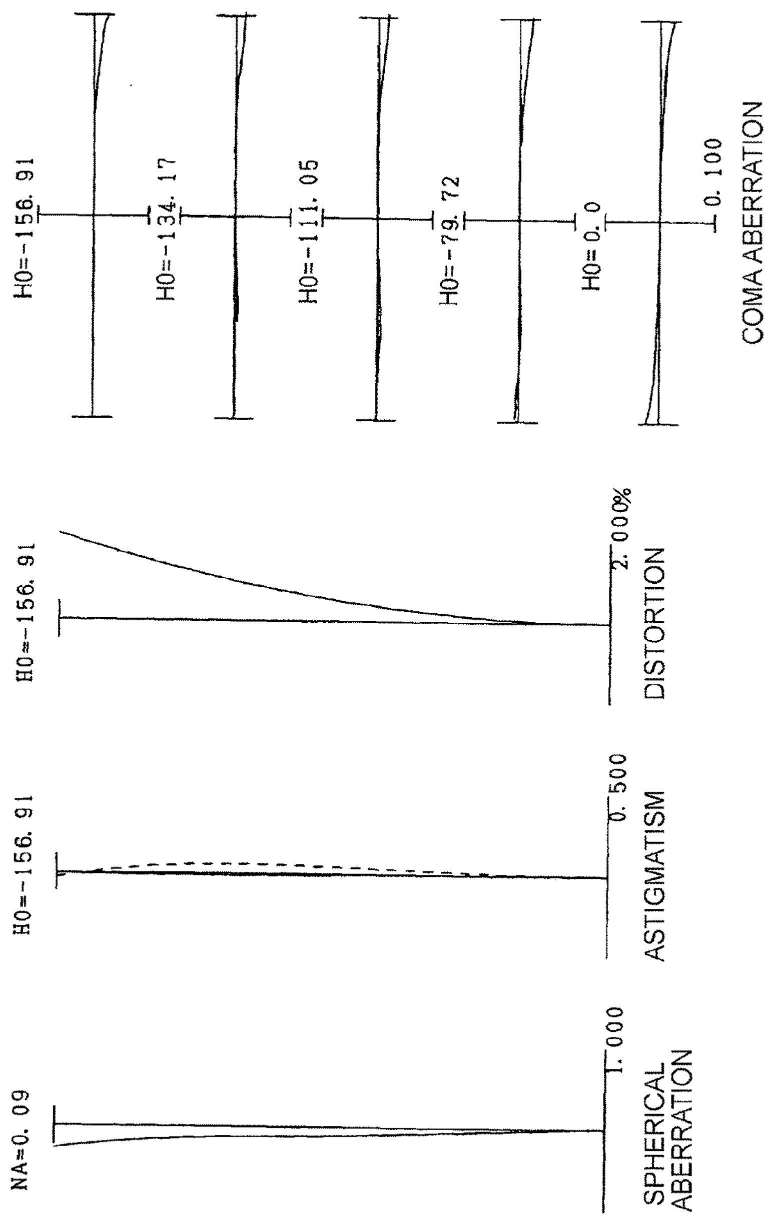
FIG. 77B shows the intermediate focal length state.
Figure 77C:
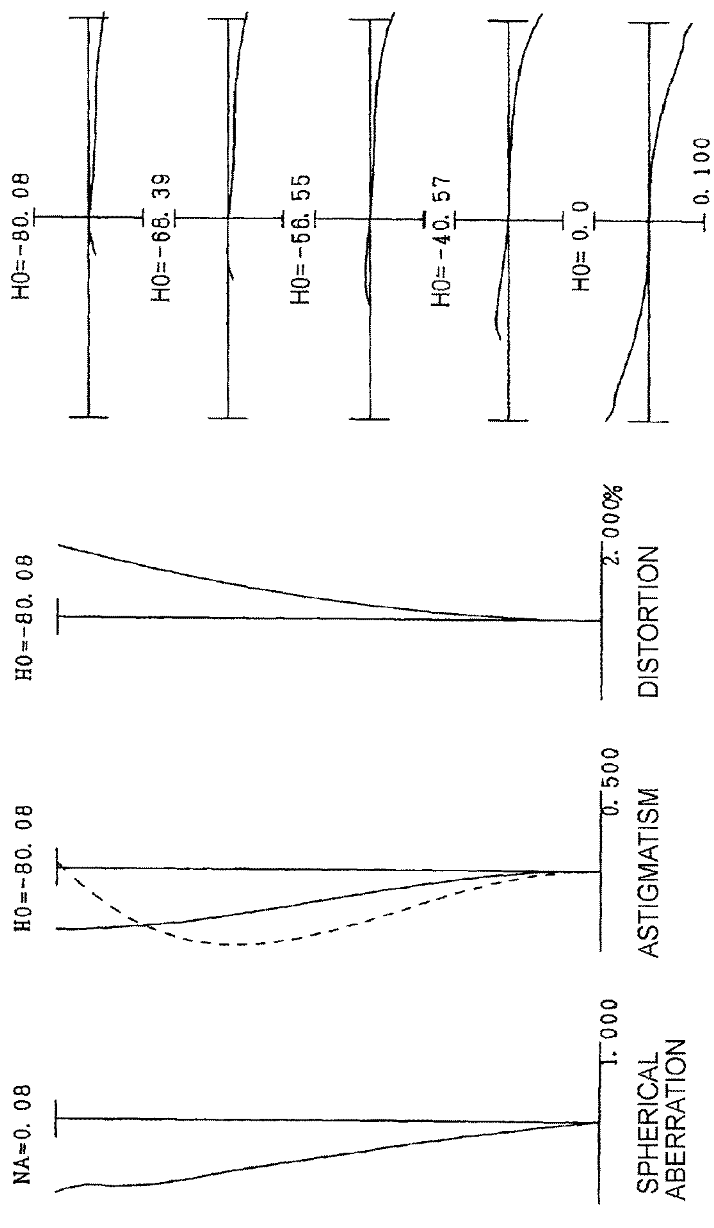
FIG. 77C shows the telephoto end state.

FIGS. 75 to 77 are graphs showing various aberrations of Example 21 at d-line (wavelength: 587.6 nm). In other words, FIG. 75A are graphs showing various aberrations upon focusing on infinity in the wide angle end state (f=81.59 mm), FIG. 75B are graphs showing various aberrations upon focusing on infinity in the intermediate focal length state (f=199.36 mm), and FIG. 75C are graphs showing various aberrations upon focusing on infinity in the telephoto end state (f=392.00 mm). FIG. 76A is a graph showing a coma aberration in the lens shift state (0.4 mm) upon focusing on infinity in the wide angle end state (f=81.59 mm), FIG. 76B is a graph showing a coma aberration in the lens shift state (0.4 mm) upon focusing on infinity in the intermediate focal length state (f=199.36 mm), and FIG. 76C is a graph showing a coma aberration in the lens shift state (0.4 mm) upon focusing on infinity in the telephoto end state (f=392.00 mm). FIG. 77A are graphs showing various aberrations upon close distance focusing (photographic distance: 1.8 m) in the wide angle end state (f=81.59 mm), FIG. 77B are graphs showing various aberrations upon close distance focusing (photographic distance: 1.8 m) in the intermediate focal length state (f=199.36 mm), and FIG. 77C are graphs showing various aberrations upon close distance focusing (photographic distance: 1.8 m) in the telephoto end state (f=392.00 mm).

As each graph showing aberrations indicates, according to Example 21, various aberrations are corrected well in each focal length state, from the wide angle end state to the telephoto end state, implementing excellent image forming performance.

Example 22

Figure 78:
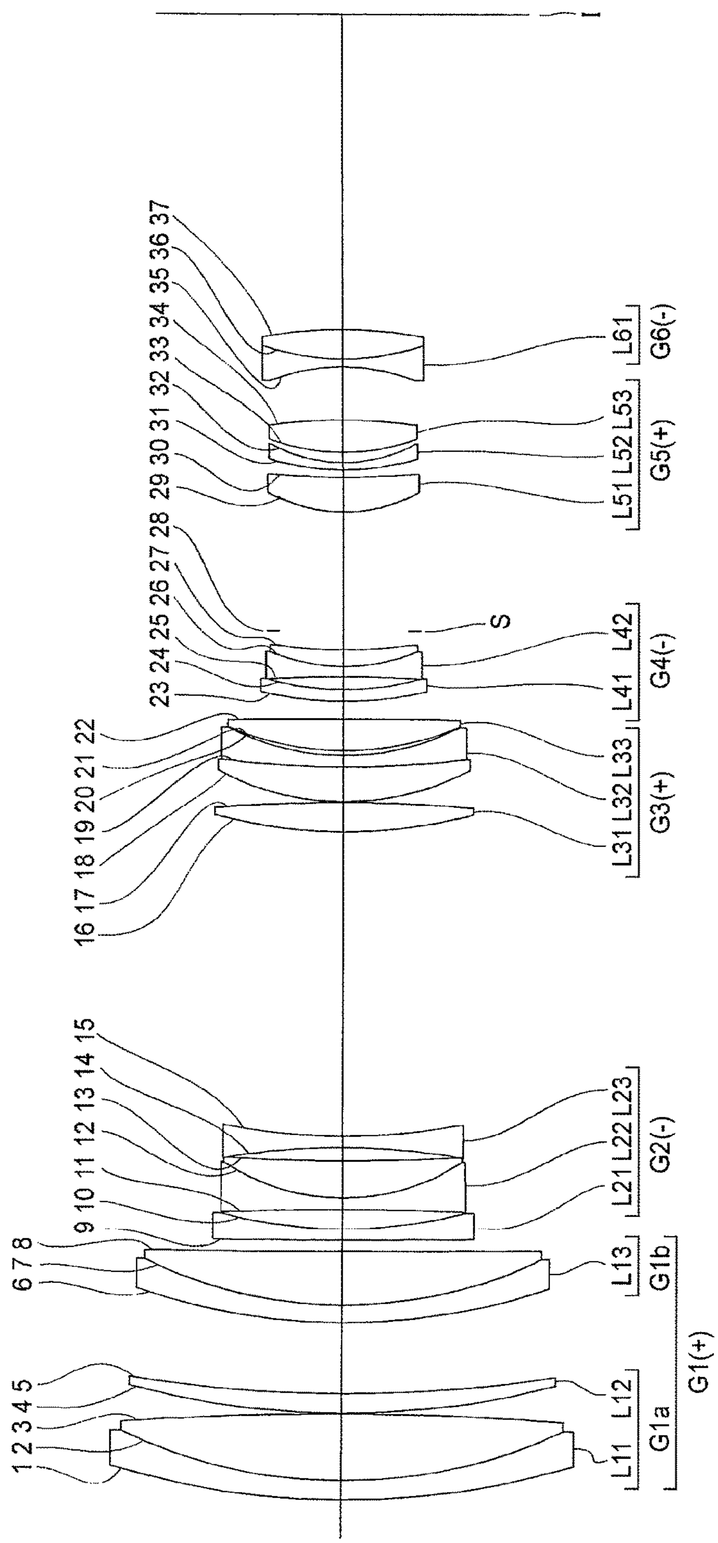
FIG. 78 is a diagram depicting a configuration of a lens system according to Example 22.

Example 22 will now be described with reference to FIG. 78 to FIG. 80 and Table 106 to Table 110. FIG. 78 is a diagram depicting a configuration of a lens system according to Example 22. As FIG. 78 shows, in the lens system according to Example 22, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a positive meniscus lens having a convex surface facing the object are cemented, and a biconcave lens L23.

The third lens group G3 has, in order from the object, a biconvex lens L31, a cemented positive lens L32 in which a positive meniscus lens having a convex surface facing the object and a negative meniscus lens having a convex surface facing the object are cemented, and a biconvex lens L33.

The fourth lens group G4 has, in order from the object, a negative meniscus lens L41 having a convex surface facing the object, and a cemented negative lens L42 in which a biconcave lens and a positive meniscus lens having a convex surface facing the object are cemented.

The fifth lens group G5 has, in order from the object, a positive meniscus lens L51 having a convex surface facing the object, a negative meniscus lens L52 having a convex surface facing the object, and a biconvex lens L53.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 22 are shown in Table 106.

TABLE 106

[All parameters]

| | Wide-angle end | | intermediate focal length | | telephoto end |
|---|---|---|---|---|---|
| f | 81.59 | ~ | 201.00 | ~ | 392.00 |
| FNO | 4.60 | ~ | 5.39 | ~ | 5.79 |
| 2ω | 29.91 | ~ | 12.03 | ~ | 6.18 |
| Image Height | 21.60 | ~ | 21.60 | ~ | 21.60 |
| Total lens Length | 259.00 | ~ | 259.00 | ~ | 259.00 |

[Lens data]

| Surface Number | r | d | nd | νd |
|---|---|---|---|---|
| 1 | 118.1283 | 3.30 | 1.79952 | 42.24 |
| 2 | 76.1986 | 11.54 | 1.49782 | 82.52 |
| 3 | −468.9331 | 0.10 | | |
| 4 | 123.2340 | 3.34 | 1.49782 | 82.52 |
| 5 | 193.0387 | (d5) | | |
| 6 | 92.7728 | 3.00 | 1.84666 | 23.78 |
| 7 | 66.0697 | 9.31 | 1.58913 | 61.16 |
| 8 | 1870.0149 | (d8) | | |
| 9 | 1495.9007 | 2.00 | 1.81600 | 46.62 |
| 10 | 68.3707 | 3.40 | | |
| 11 | −422.5660 | 2.00 | 1.75500 | 52.32 |
| 12 | 31.3386 | 6.50 | 1.80810 | 22.76 |
| 13 | 322.6311 | 2.26 | | |
| 14 | −100.9112 | 2.00 | 1.81600 | 46.62 |
| 15 | 88.5067 | (d15) | | |
| *16 | 68.0940 | 5.00 | 1.69350 | 53.20 |
| 17 | −253.1930 | 0.20 | | |
| 18 | 38.4565 | 6.08 | 1.60300 | 65.44 |
| 19 | 141.7401 | 2.00 | 1.84666 | 23.78 |
| 20 | 36.6971 | 0.82 | | |
| 21 | 41.7712 | 5.53 | 1.60300 | 65.44 |
| 22 | −1191.5383 | (d22) | | |
| 23 | 52.7285 | 2.00 | 1.83400 | 37.16 |
| 24 | 40.5429 | 2.28 | | |
| 25 | −171.4134 | 1.80 | 1.77250 | 49.60 |
| 26 | 27.0587 | 3.01 | 1.84666 | 23.78 |
| 27 | 65.4451 | 3.30 | | |
| 28 | 0.0000 | (d28) | (aperture stop S) | |
| *29 | 22.3402 | 6.00 | 1.51633 | 64.07 |
| 30 | 110.1142 | 1.32 | | |
| 31 | 37.5137 | 1.25 | 1.84666 | 23.78 |
| 32 | 21.3793 | 1.86 | | |
| 33 | 31.6341 | 5.59 | 1.48749 | 70.23 |
| 34 | −80.2836 | (d34) | | |
| 35 | −28.2255 | 1.50 | 1.81600 | 46.62 |
| 36 | 35.1019 | 5.13 | 1.75520 | 27.51 |
| 37 | −62.5141 | (Bf) | | |

[Each group focal length data]

| Group | First surface | Focal length |
|---|---|---|
| G1 | 1 | 102.2274 |
| G2 | 9 | −29.4765 |
| G3 | 16 | 44.2819 |
| G4 | 23 | −52.0367 |
| G5 | 29 | 44.1345 |
| G6 | 35 | −58.0368 |

In Example 22, the sixteenth and twenty ninth lens surfaces are aspherical. Table 107 shows the [Aspherical data].

TABLE 107

| [Aspherical data] | | | | | |
|---|---|---|---|---|---|
| R | κ | $C_4$ | $C_6$ | $C_8$ | $C_{10}$ |
| Sixteenth surface | | | | | |
| 68.0940 | +0.1069 | $-3.6795 \times 10^{-7}$ | $-1.9812 \times 10^{-10}$ | $+6.6723 \times 10^{-13}$ | $-7.0430 \times 10^{-16}$ |
| Twenty ninth surface | | | | | |
| 22.3402 | +1.7408 | $-1.1296 \times 10^{-5}$ | $-3.3539 \times 10^{-8}$ | $+2.0491 \times 10^{-11}$ | $-6.5848 \times 10^{-13}$ |

In Example 22, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d34 between the fifth lens group G5 and the sixth lens group G6, and the back focus Bf, change upon zooming. Table 108 shows the [Variable distance data].

TABLE 108

| [Variable distance data] | Wide-angle end | intermediate focal length | telephoto end |
|---|---|---|---|
| d5 | 12.3022 | 12.3022 | 12.3022 |
| d8 | 2.0518 | 17.3838 | 24.0609 |
| d15 | 53.0013 | 24.6712 | 2.0000 |
| d22 | 3.1071 | 16.1052 | 32.0992 |
| d28 | 20.8368 | 9.7828 | 2.0000 |
| d34 | 9.2686 | 4.9343 | 3.1842 |
| Bf | 55.0000 | 70.3880 | 79.9207 |

Table 109 shows the [Focusing lens group shift distance] in Example 22.

TABLE 109

| [Focusing lens group shift distance] | Wide-angle end | intermediate focal length | telephoto end |
|---|---|---|---|
| f | 81.5936 | 200.9997 | 392.0039 |
| Δ1b | 9.6478 | 9.6478 | 9.6478 |

Table 110 shows the [Conditional expression correspondence value] in Example 22.

TABLE 110

| [Conditional expression correspondence value] |
|---|
| f2 = −29.4765 |
| f4 = −52.0367 |
| f5 = 44.1345 |
| ft = 392.0039 |
| f1b = 200.5819 |
| TL = 258.9999 |
| (9) (−f2)/(−f4) = 0.5665 |
| (10) (−f2)/f5 = 0.6679 |
| (11) ft/f1b = 1.9543 |
| (12) TL/f1b = 1.2912 |

Figure 79A:
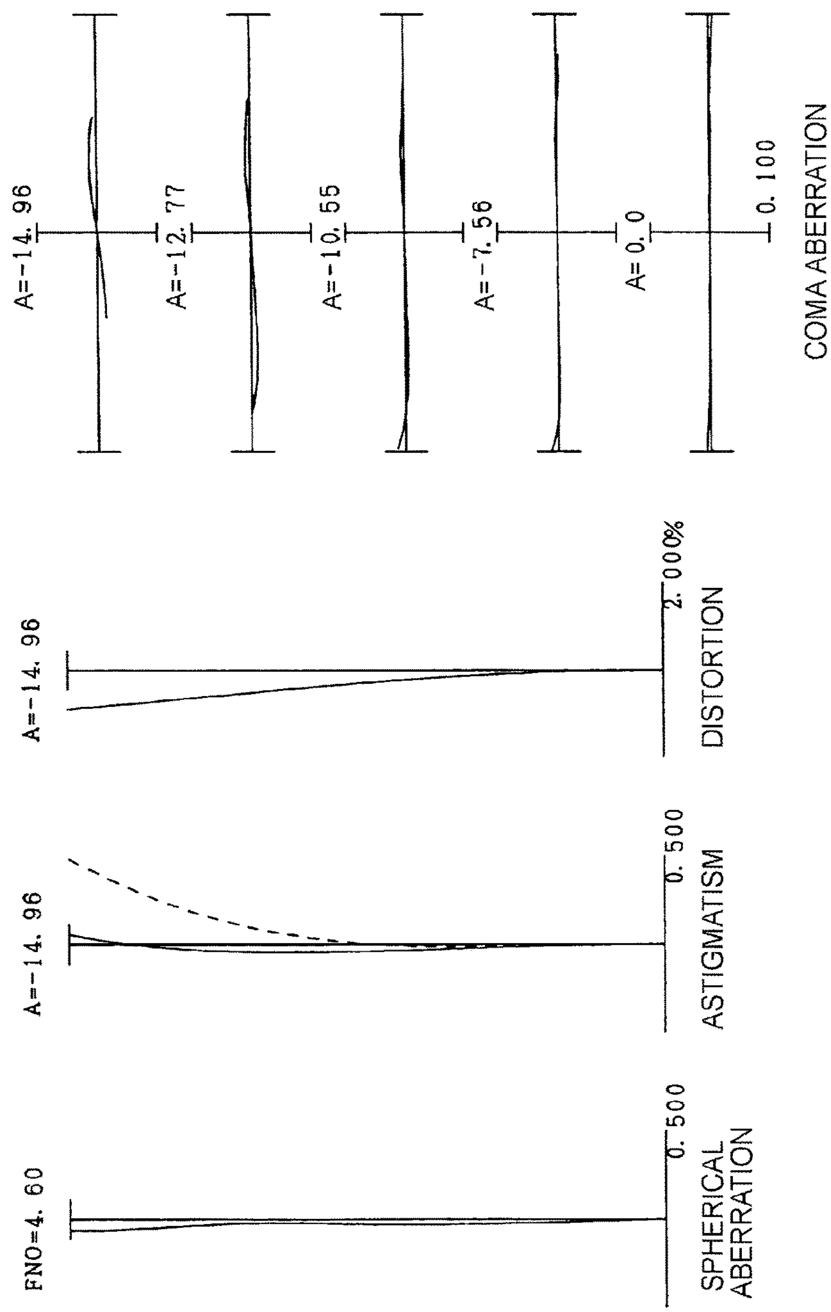
FIG. 79A shows the wide angle end state.
Figure 79B:
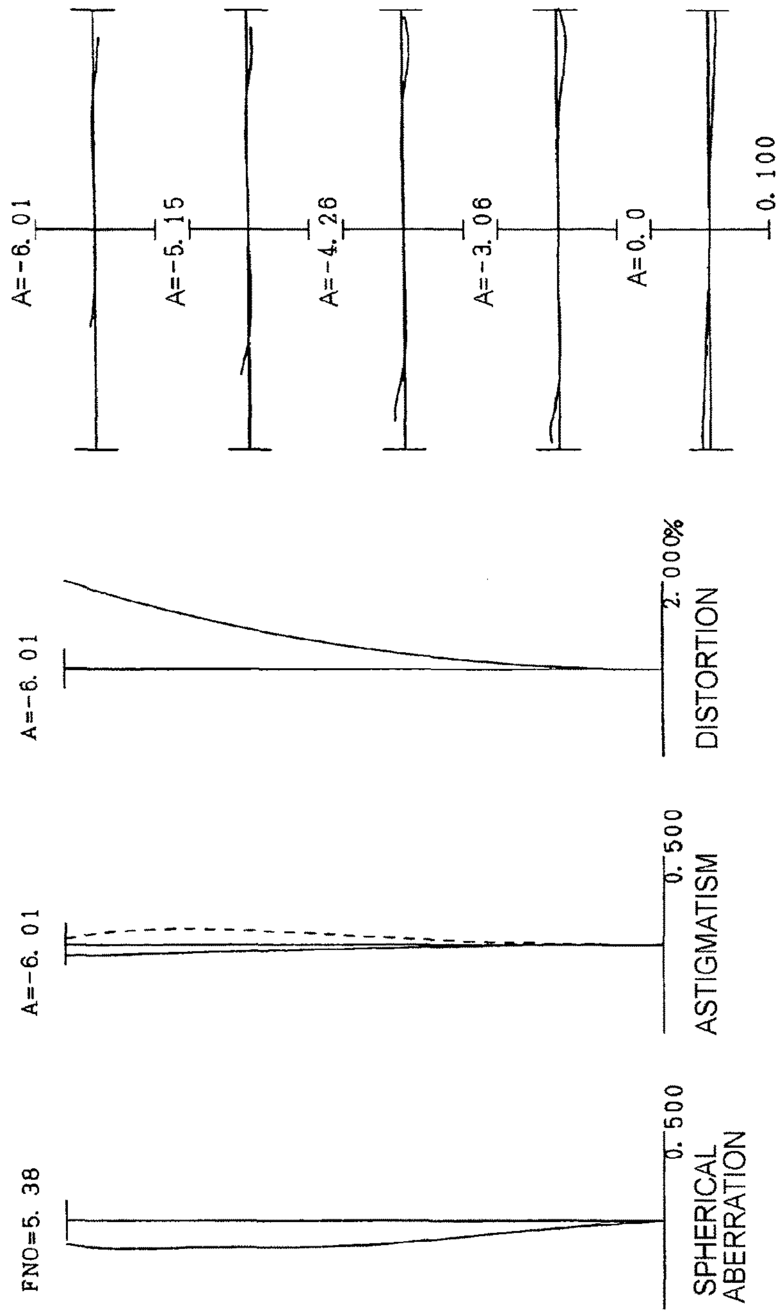
FIG. 79B shows the intermediate focal length state.
Figure 79C:
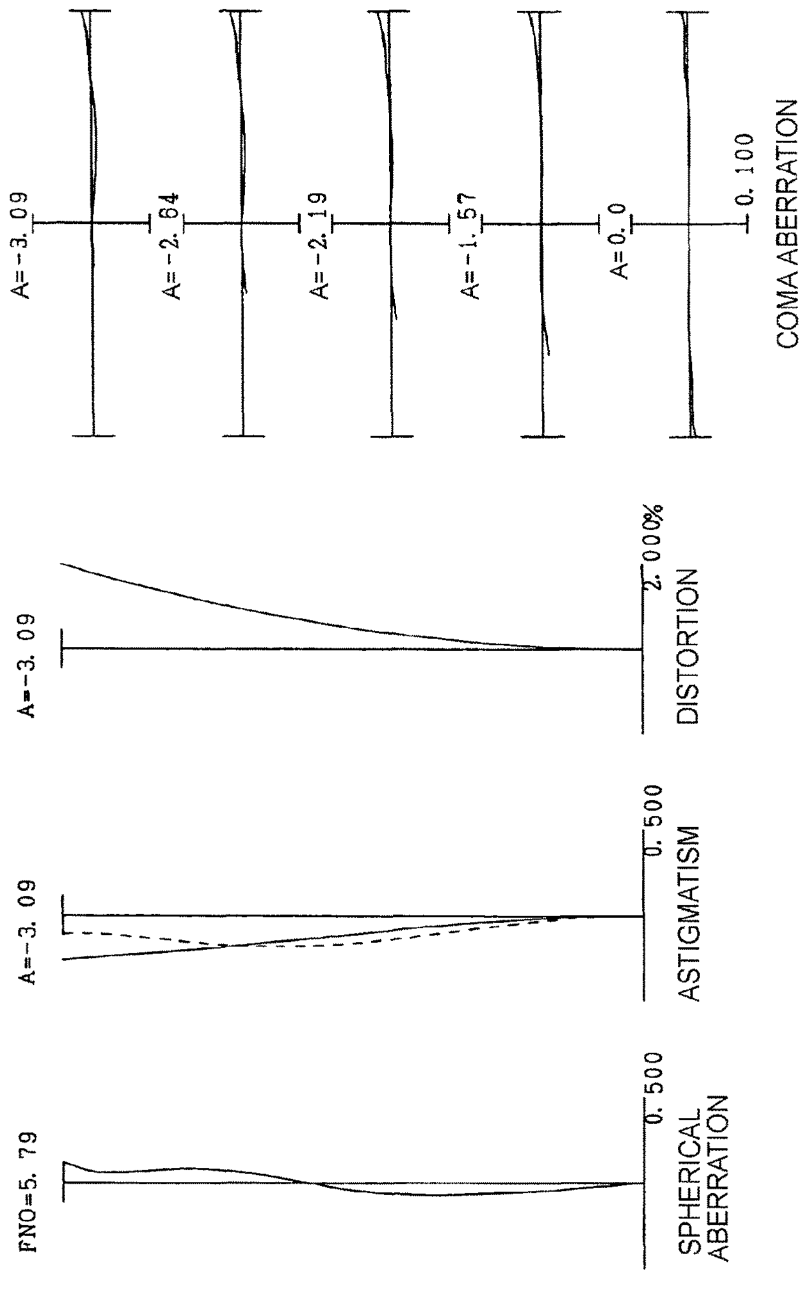
FIG. 79C shows the telephoto end state.
Figure 80A:
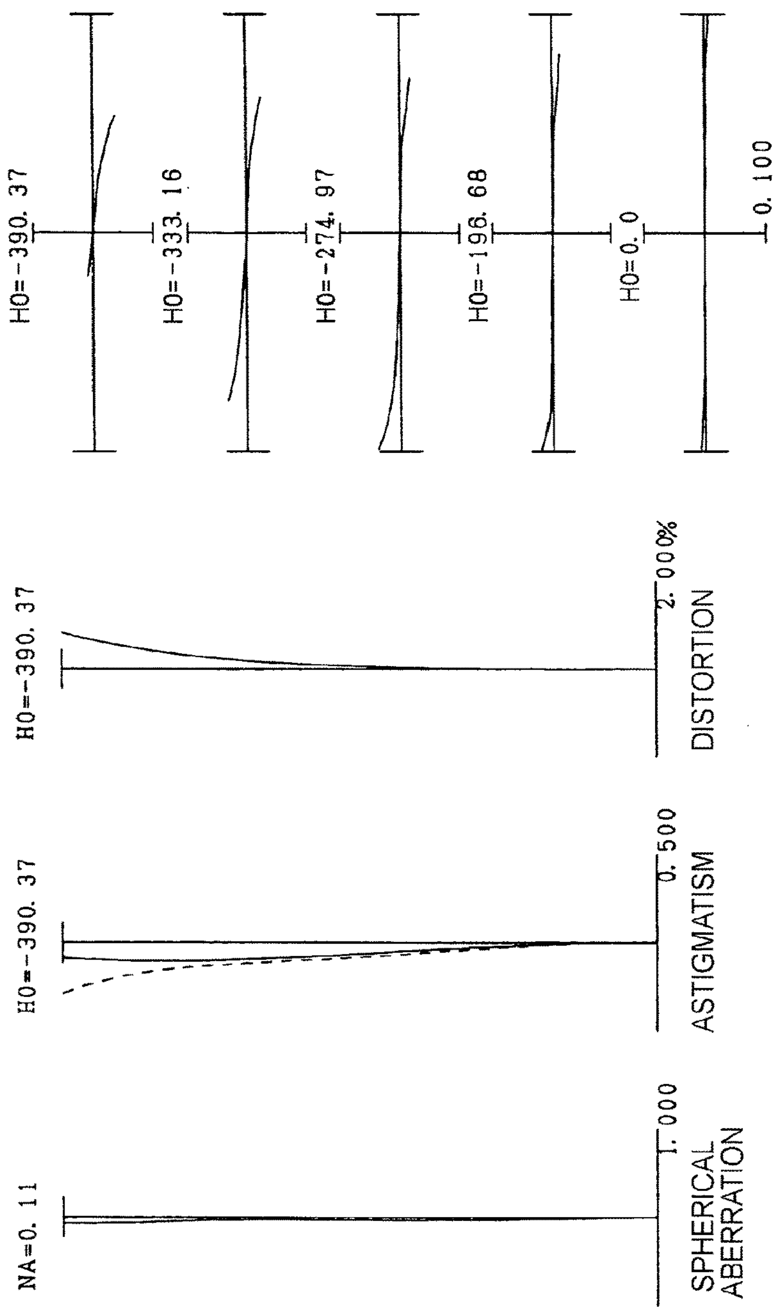
FIG. 80A shows the wide angle end state.
Figure 80B:
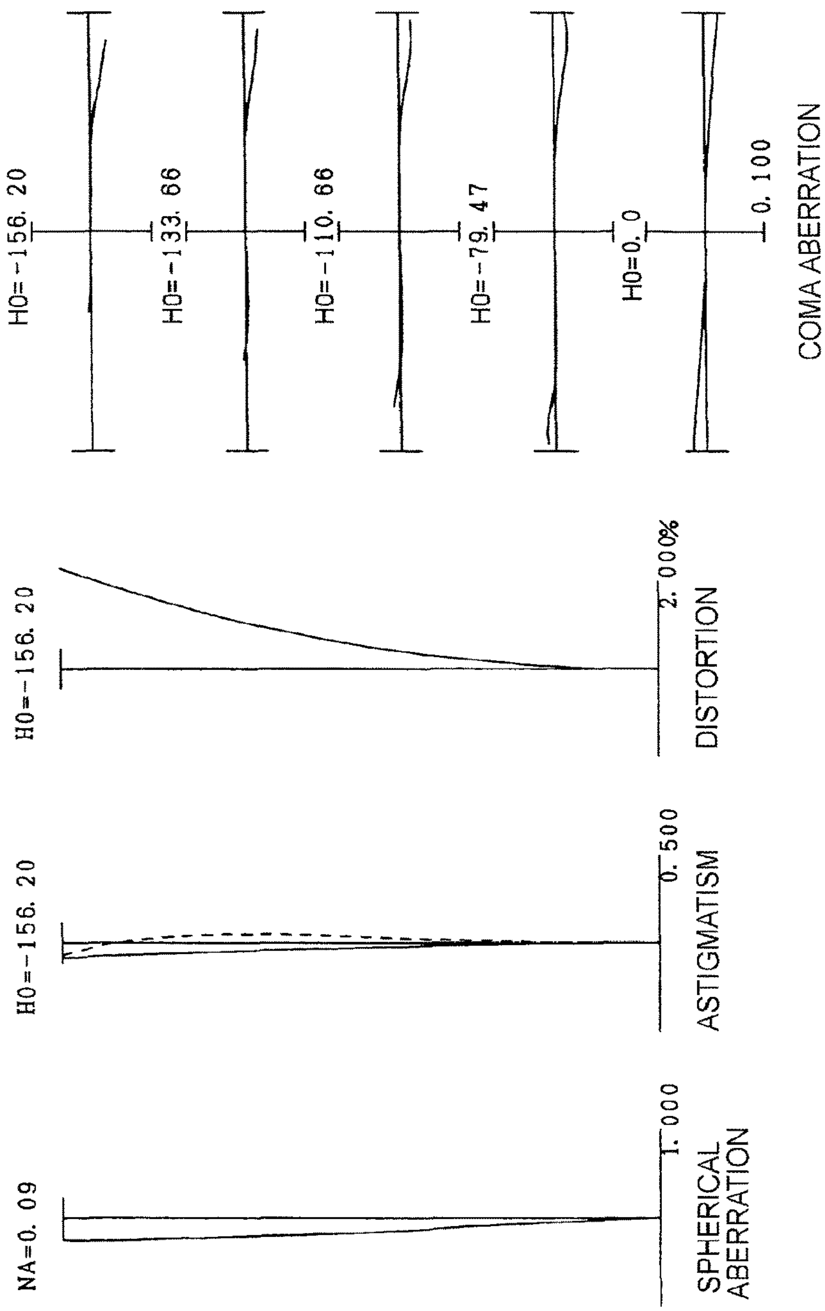
FIG. 80B shows the intermediate focal length state.
Figure 80C:
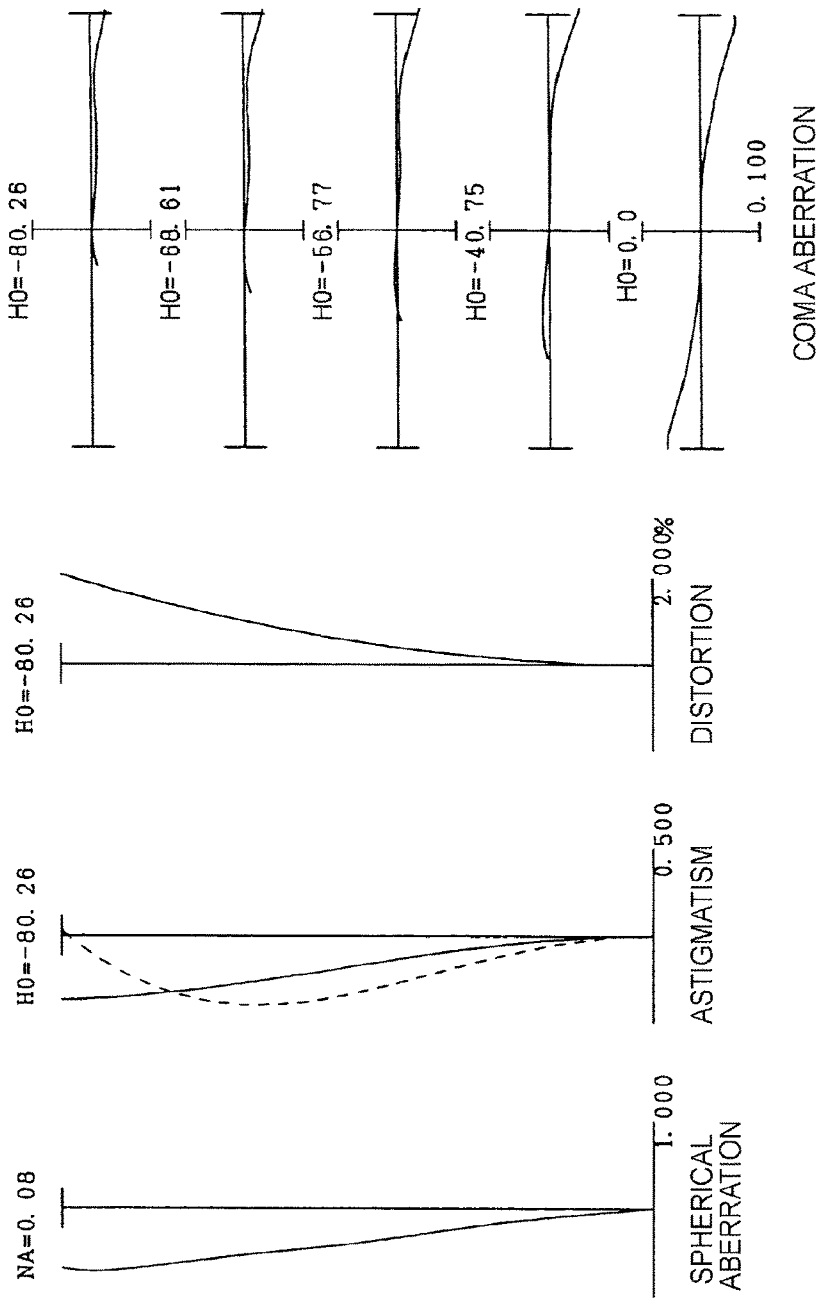
FIG. 80C shows the telephoto end state.

FIG. 79 and FIG. 80 are graphs showing various aberrations of Example 22 at d-line (wavelength: 587.6 nm). In other words, FIG. 79A are graphs showing various aberrations upon focusing on infinity in the wide angle end state (f=81.59 mm), FIG. 79B are graphs showing various aberrations upon focusing on infinity in the intermediate focal length state (f=201.00 mm), and FIG. 79C are graphs showing various aberrations upon focusing on infinity in the telephoto end state (f=392.00 mm). FIG. 80A are graphs showing various aberrations upon close distance focusing (photographic distance: 1.8 m) in the wide angle end state (f=81.59 mm), FIG. 80B are graphs showing various aberrations upon close distance focusing (photographic distance: 1.8 m) in the intermediate focal length state (f=201.00 mm), and FIG. 80C are graphs showing various aberrations upon close distance focusing (photographic distance: 1.8 m) in the telephoto end state (f=392.00 mm).

As each graph showing aberrations indicates, according to Example 22, various aberrations are corrected well in each focal length state, from the wide angle end state to the telephoto end state, implementing excellent image forming performance.

As described above, according to the present embodiment, a lens system which can achieve high image forming performance while simultaneously implementing a decrease in the total length of the lens system and simplification of the focusing mechanism, an optical apparatus having this lens system, and a manufacturing method thereof, can be provided. At the same time, a lens system, an optical apparatus and a manufacturing method which can minimize the influence of decentering, so as to prevent the deterioration of performance, can be provided.

Fourth Embodiment Group

A lens system according to the fourth embodiment group will now be described with reference to the drawings. A lens system of the present embodiment has, in order from an object, at least first to fifth lens groups, wherein the first lens group disposed closest to the object is divided into at least two subgroups, a front portion lens group, which is a subgroup closest to the object side out of the subgroups, has positive refractive power, and focusing is performed by shifting a rear portion lens group, which is a subgroup closest to an image out of the subgroups.

In the case of the lens system of the present embodiment, which is comprised of five or more lens groups, an optical system having a high zoom ratio can be easily constructed. Since the first lens group which is disposed closest to the object is divided into at least two subgroups and the front portion lens group, which is a subgroup closest to the object, has positive refractive power, a decrease in the total length of the lens system and correction of distortion can be balanced. Further, focusing is performed using the rear portion lens group, which is a subgroup closest to the image, so the focusing mechanism can be simplified, and as a result, the focusing speed can be increased. At the same time, close distance fluctuation of spherical aberration and curvature of field due to focusing can be minimized. Also objects in a same photographic distance can be focused on with a same feed amount throughout the entire zooming area from the wide angle end state to the telephoto end state.

In the lens system of the present embodiment having the above configuration, the following conditional expression (13) is satisfied, where TL denotes a total length of the lens system in the telephoto end state, and ft denotes a focal length of the total lens system in the telephoto end state.

$$0.59<TL/ft<0.70 \quad (13)$$

The conditional expression (13) is a conditional expression for specifying an appropriate range of the ratio of the total length of the lens system and the focal length of the total lens system in the telephoto end state. If the upper limit of the conditional expression (13) is exceeded, this is advantageous in terms of aberration correction (mainly spherical aberration and coma aberration), but the total length of the lens system increases, which makes it difficult to balance decreasing size and increasing performance. If the lower limit of the conditional expression (13) is not reached, this is advantageous in terms of decreasing size, but spherical aberration, coma aberration and curvature of field, which are generated in the lens system, cannot be corrected well, which is not desirable. It also becomes difficult to increase the back focus.

In order to ensure the effect of the present embodiment, it is preferable to set the upper limit of the conditional expression (13) to 0.69. In order to further ensure the effect of the present embodiment, it is preferable to set the upper limit of the conditional expression (13) to 0.68. In order to further ensure the effect of the present embodiment, it is preferable to set the upper limit of the conditional expression (13) to 0.67.

In order to ensure the effect of the present embodiment, it is preferable to set the lower limit of the conditional expression (13) to 0.60. In order to further ensure the effect of the present embodiment, it is preferable to set the lower limit of the conditional expression (13) to 0.61. In order to further ensure the effect of the present embodiment, it is preferable to set the lower limit of the conditional expression (13) to 0.62.

In the lens system according to the present embodiment, it is preferable that the first lens group has positive refractive power, in order to implement both correction of distortion and decreasing the total length.

In the lens system according to the present embodiment, it is preferable that the rear portion lens group of the first lens group has positive refractive power, in order to minimize the close distance fluctuation of the spherical aberration and curvature of field due to focusing.

In the lens system according to the present embodiment, it is preferable that the first lens group is fixed in the optical axis direction with respect to the image plane upon focusing on infinity in zooming from the wide angle end state to the telephoto end state, in order to reduce performance deterioration due to decentering, particularly to minimize deterioration of curvature of field, and implement good optical performance.

In the lens system according to the present embodiment, it is preferable that the following conditional expression (14) is satisfied, where ft denotes a focal length of the total lens system in the telephoto end state, and f1b denotes a focal length of the rear portion lens group of the first lens group.

$$0.10<ft/f1b<3.74 \quad (14)$$

The conditional expression (14) is a conditional expression for specifying an appropriate range of the ratio of the focal length of the total lens system in the telephoto end state and the focal length of the rear portion lens group of the first lens group. If the upper limit of the conditional expression (14) is exceeded, the refractive power of the rear portion lens group becomes relatively high. As a result, an aberration fluctuation of the coma aberration and a curvature of field upon focusing increases, which is not desirable. If the lower limit of the conditional expression (14) is not reached, the refractive power of the rear portion lens group becomes relatively low. This is advantageous in terms of aberration correction, but increase the shift distance of the focusing lens group, which makes it difficult to balance decreasing size and increase performance. As a result, the total lens length increases, which runs against the intention of the present invention, and is therefore not desirable.

In order to ensure the effect of the present embodiment, it is preferable to set the upper limit of the conditional expression (14) to 3.40. In order to further ensure the effect of the present embodiment, it is preferable to set the upper limit of the conditional expression (14) to 3.10. In order to further ensure the effect of the present embodiment, it is preferable to set the upper limit of the conditional expression (14) to 2.80.

In order to ensure the effect of the present embodiment, it is preferable to set the lower limit of the conditional expression (14) to 0.35. In order to further ensure the effect of the present embodiment, it is preferable to set the lower limit of the conditional expression (14) to 0.65. In order to further ensure the effect of the present embodiment, it is preferable to set the lower limit of the conditional expression (14) to 0.95.

In the lens system according to the present embodiment, it is preferable that the following conditional expression (15) is satisfied, where TL denotes a total length of the lens system in the telephoto end state, and f1b denotes a focal length of the rear portion lens group of the first lens group.

$$0.03<TL/f1b<2.48 \quad (15)$$

The conditional expression (15) is a conditional expression for specifying an appropriate range of the ratio of the total length of the lens system and the focal length of the rear portion lens group of the first lens group. If the upper limit of the conditional expression (15) is exceeded, the refractive power of the rear portion lens group becomes relatively high. As a result, an aberration fluctuation of the coma aberration and a curvature of field upon focusing increases, which is not desirable. If the lower limit of the conditional expression (15) is not reached, the refractive power of the rear portion lens group becomes relatively low. This is advantageous in terms of aberration correction, but increase the shift distance of the focusing lens group, which makes it difficult to balance decreasing size and increase performance. As a result, the total lens length increases, which runs against the intention of the present invention, and is therefore not desirable.

In order to ensure the effect of the present embodiment, it is preferable to set the upper limit of the conditional expression (15) to 2.20. In order to further ensure the effect of the present embodiment, it is preferable to set the upper limit of the conditional expression (15) to 1.90. In order to further ensure the effect of the present embodiment, it is preferable to set the upper limit of the conditional expression (15) to 1.75.

In order to ensure the effect of the present embodiment, it is preferable to set the lower limit of the conditional expression (15) to 0.20. In order to further ensure the effect of the present embodiment, it is preferable to set the lower limit of the conditional expression (15) to 0.45. In order to further ensure the effect of the present embodiment, it is preferable to set the lower limit of the conditional expression (15) to 0.70.

In the lens system according to the present embodiment, it is preferable that the second lens group has negative refractive power, in order to correct coma aberration and curvature of field well.

In the lens system according to the present embodiment, it is preferable that the following conditional expression (16) is satisfied, where f2 denotes a focal length of the second lens group, and f4 denotes a focal length of the fourth lens group.

$$0.23<|f2/f4|<0.88 \quad (16)$$

The conditional expression (16) is a conditional expression for specifying an appropriate range of the ratio of the focal lengths of the second lens group and the fourth lens group. If the upper limit of the conditional expression (16) is exceeded, the refractive power of the second lens group becomes relatively low, and correction of coma aberration becomes insufficient. Since the second lens group cannot contribute efficiently to zooming, a high zoom ratio, about four times or more, cannot be secured. Further, the refractive power of the fourth lens group becomes relatively high, and spherical aberration and curvature of field, which are generated in the fourth lens group, increase excessively, which makes it difficult to achieve the object of the present invention, that is, implementing excellent optical performance.

If the lower limit of the conditional expression (16) is not reached, the refractive power of the second lens group becomes relatively high, and fluctuation of coma aberration generated in the second lens group upon zooming increases. Also the refractive power of the fourth lens group becomes relatively low, and shift distance upon zooming increases, and fluctuation of curvature of field generated in the fourth lens group increases. As a result, it becomes difficult to suppress the deterioration of performance in the total zoom range from the wide angle end state to the telephoto end state.

In order to ensure the effect of the present embodiment, it is preferable to set the upper limit of the conditional expression (16) to 0.80. In order to further ensure the effect of the present embodiment, it is preferable to set the upper limit of the conditional expression (16) to 0.75. In order to further ensure the effect of the present embodiment, it is preferable to set the upper limit of the conditional expression (16) to 0.70.

In order to ensure the effect of the present embodiment, it is preferable to set the lower limit of the conditional expression (16) to 0.30. In order to further ensure the effect of the present embodiment, it is preferable to set the lower limit of the conditional expression (16) to 0.35. In order to further ensure the effect of the present embodiment, it is preferable to set the lower limit of the conditional expression (16) to 0.40.

In the lens system according to the present embodiment, it is preferable that the following conditional expression (17) is satisfied, where f2 denotes a focal length of the second lens group, and f5 denotes a focal length of the fifth lens group.

$$0.40<|f2/f5|<1.00 \quad (17)$$

The conditional expression (17) is a conditional expression for specifying an appropriate range of the ratio of the focal lengths of the second lens group and the fifth lens group. If the upper limit of the conditional expression (17) is exceeded, the refractive power of the second lens group becomes relatively low, and since the second lens group cannot contribute efficiently to zooming, the zoom ratio, about four times or more, cannot be secured. Further, the refractive power of the fifth lens group becomes relatively high, and spherical aberration and coma aberration, which are generated in the fifth lens group, increase excessively, which makes it difficult to achieve the object of the present invention, that is, implementing excellent optical performance.

If the lower limit of the conditional expression (17) is not reached, the refractive power of the second lens group becomes relatively high, and fluctuation of coma aberration generated in the second lens group upon zooming increases. Also the refractive power of the fifth lens group becomes relatively low, and shift distance upon zooming increases, and fluctuation of spherical aberration generated in the fifth lens group increases. As a result, it becomes difficult to suppress the deterioration of performance in the total zoom range from the wide angle end state to the telephoto end state.

In order to ensure the effect of the present embodiment, it is preferable to set the upper limit of the conditional expression (17) to 0.95. In order to further ensure the effect of the present embodiment, it is preferable to set the upper limit of the conditional expression (17) to 0.90. In order to further ensure the effect of the present embodiment, it is preferable to set the upper limit of the conditional expression (17) to 0.85.

In order to ensure the effect of the present embodiment, it is preferable to set the lower limit of the conditional expression (17) to 0.50. In order to further ensure the effect of the present embodiment, it is preferable to set the lower limit of the conditional expression (17) to 0.55. In order to further ensure the effect of the present embodiment, it is preferable to set the lower limit of the conditional expression (17) to 0.60.

In the lens system according to the present embodiment, it is preferable that the fourth lens group is fixed in the optical axis direction with respect to the image plane upon zooming from the wide angle end state to the telephoto end state in order to reduce performance deterioration due to decentering, particularly to minimize deterioration of curvature of field, and implement good optical performance.

It is preferable that the lens system according to the present embodiment has, in order from the object, a first lens group having positive refractive power, a second lens group having negative refractive power, a third lens group having positive refractive power, a fourth lens group having negative refractive power, and a fifth lens group having positive refractive power, in order to correct spherical aberration, coma aberration and curvature of field well, and implement excellent optical performance with high zoom ratio.

It is preferable that the lens system according to the present embodiment has a sixth lens group having negative refractive power, which is disposed to the image side of the fifth lens group, in order to correct spherical aberration, coma aberration and curvature of field well, and implement excellent optical performance with high zoom ratio.

Examples of the Fourth Embodiment Group

Each example (Example 23 to Example 27) in the fourth embodiment group will now be described with reference to the drawings. For the lens systems according to these examples as well, allocation of refractive power and a shifting state of each lens group upon changing of the focal length state from the wide angle end state (W) to the telephoto end state (T) are shown in FIG. 1.

Example 23

Figure 81:
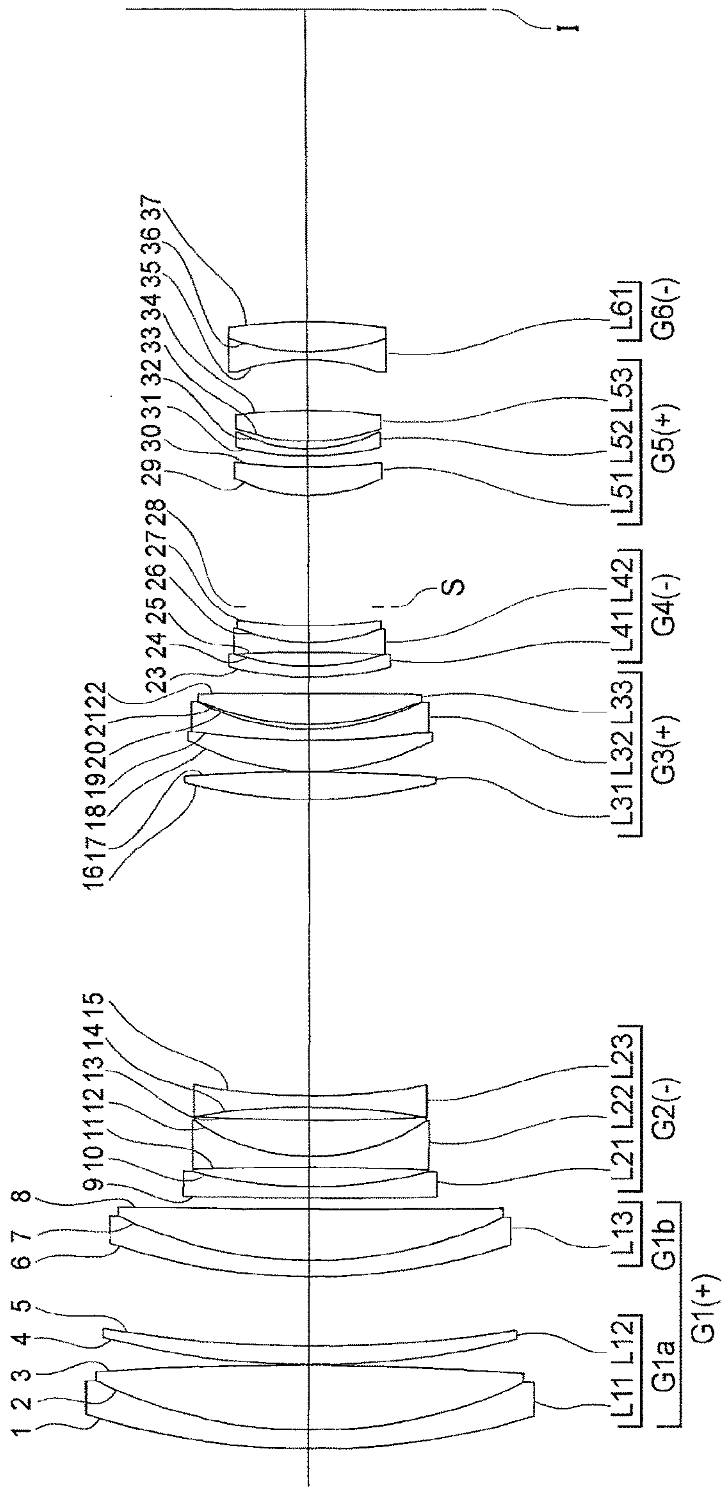
FIG. 81 is a diagram depicting a configuration of a lens system according to Example 23.

Example 23 will now be described with reference to FIG. 81 to FIG. 83 and Table 111 to Table 115. FIG. 81 is a diagram depicting a configuration of a lens system according to Example 23. As FIG. 81 shows, in the lens system according to Example 23, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a positive meniscus lens having a convex surface facing the object are cemented, and a biconcave lens L23.

The third lens group G3 has, in order from the object, a biconvex lens L31, a cemented negative lens L32 in which a positive meniscus lens having a convex surface facing the object and a negative meniscus lens having a convex surface facing the object are cemented, and a biconvex lens L33.

The fourth lens group G4 has, in order from the object, a negative meniscus lens L41 having a convex surface facing the object, and a cemented negative lens L42 in which a biconcave lens and a positive meniscus lens having a convex surface facing the object are cemented. In this example, all or a part of the fourth lens group G4 shift as a shift lens group, so as to have a component in an approximately orthogonal to the optical axis.

The fifth lens group G5 has, in order from the object, a positive meniscus lens L51 having a convex surface facing the object, a negative meniscus lens L52 having a convex surface facing the object, and a biconvex lens L53.

The sixth lens group G6 has, in order from the object, a cemented negative lens L61 in which a biconcave lens and a biconvex lens are cemented.

The image plane I is formed on a picture element, which is not illustrated, and the picture element is constituted by a CCD, CMOS or the like (description on the image plane I is the same for the examples herein below).

The aperture stop S is disposed closest to the image in the fourth lens group G4, and is fixed with respect to the image plane I upon zooming from the wide angle end state to the telephoto end state.

Parameter values of Example 23 are shown in Table 111.

TABLE 111

[All parameters]

| | Wide-angle end | | intermediate focal length | | telephoto end |
|---|---|---|---|---|---|
| f | 81.59 | ~ | 201.00 | ~ | 392.00 |
| FNO | 4.60 | ~ | 5.39 | ~ | 5.79 |
| 2ω | 29.29 | ~ | 12.03 | ~ | 6.19 |
| Image Height | 21.60 | ~ | 21.60 | ~ | 21.60 |
| Total lens Length | 259.31 | ~ | 259.31 | ~ | 259.31 |

TABLE 111-continued

[Lens data]

| Surface Number | r | d | nd | νd |
|---|---|---|---|---|
| 1 | 117.0358 | 3.30 | 1.79952 | 42.24 |
| 2 | 75.5978 | 11.54 | 1.49782 | 82.52 |
| 3 | −479.1944 | 0.10 | | |
| 4 | 121.5135 | 3.34 | 1.49782 | 82.52 |
| 5 | 188.1471 | (d5) | | |
| 6 | 92.7170 | 3.00 | 1.84666 | 23.78 |
| 7 | 66.0487 | 9.31 | 1.58913 | 61.16 |
| 8 | 1772.4253 | (d8) | | |
| 9 | 1217.4518 | 2.00 | 1.81600 | 46.62 |
| 10 | 67.3054 | 3.50 | | |
| 11 | −488.8357 | 2.00 | 1.75500 | 52.32 |
| 12 | 31.1170 | 6.50 | 1.80810 | 22.76 |
| 13 | 305.3582 | 2.31 | | |
| 14 | −99.3098 | 2.00 | 1.81600 | 46.62 |
| 15 | 88.9128 | (d15) | | |
| *16 | 69.0678 | 4.89 | 1.72916 | 54.68 |
| 17 | −279.9926 | 0.20 | | |
| 18 | 38.1546 | 5.59 | 1.60300 | 65.44 |
| 19 | 128.8266 | 2.00 | 1.84666 | 23.78 |
| 20 | 36.5881 | 0.87 | | |
| 21 | 41.9915 | 5.50 | 1.59201 | 67.02 |
| 22 | −1291.6436 | (d22) | | |
| 23 | 47.6793 | 2.00 | 1.83400 | 37.16 |
| 24 | 36.5546 | 2.58 | | |
| 25 | −135.6718 | 1.80 | 1.77250 | 49.60 |
| 26 | 28.7040 | 3.02 | 1.84666 | 23.78 |
| 27 | 77.3516 | 3.30 | | |
| 28 | 0.0000 | (d28) | (aperture stop S) | |
| 29 | 24.8138 | 5.13 | 1.58913 | 61.16 |
| 30 | 96.6340 | 1.99 | | |
| 31 | 46.2694 | 1.25 | 1.84666 | 23.78 |
| 32 | 23.7898 | 1.35 | | |
| *33 | 30.3557 | 5.60 | 1.48749 | 70.41 |
| 34 | −75.6773 | (d34) | | |
| 35 | −28.8995 | 1.50 | 1.81600 | 46.62 |
| 36 | 35.7191 | 5.50 | 1.75520 | 27.51 |
| 37 | −64.7405 | (Bf) | | |

[Each group focal length data]

| Group | First surface | Focal length |
|---|---|---|
| G1 | 1 | 102.3530 |
| G2 | 9 | −29.4177 |
| G3 | 16 | 44.1102 |
| G4 | 23 | −52.3971 |
| G5 | 29 | 44.4282 |
| G6 | 35 | −59.0152 |

In Example 23, the sixteenth and thirty third lens surfaces are aspherical. Table 112 shows the [Aspherical data].

TABLE 112

| [Aspherical data] | | | | | |
|---|---|---|---|---|---|
| R | κ | $C_4$ | $C_6$ | $C_8$ | $C_{10}$ |
| Sixteenth surface | | | | | |
| 69.0678 | +0.6071 | $-5.3514 \times 10^{-7}$ | $-2.5653 \times 10^{-10}$ | $+8.5073 \times 10^{-13}$ | $-9.1874 \times 10^{-16}$ |
| Thirty third surface | | | | | |
| 30.3557 | −0.3066 | $+1.6043 \times 10^{-6}$ | $-9.3189 \times 10^{-9}$ | $+4.0302 \times 10^{-11}$ | $-2.4676 \times 10^{-13}$ |

In Example 23, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d34 between the fifth lens group G5 and the sixth lens group G6, and the back focus Bf, change upon zooming. Table 113 shows the [Variable distance data].

TABLE 113

| [Variable distance data] | | | |
|---|---|---|---|
| | Wide-angle end | intermediate focal length | telephoto end |
| d5 | 12.3408 | 12.3408 | 12.3408 |
| d8 | 2.0131 | 17.3451 | 24.0215 |
| d15 | 53.4329 | 24.7523 | 2.0000 |
| d22 | 3.0130 | 16.3616 | 32.4371 |
| d28 | 20.2698 | 9.7537 | 2.0000 |
| d34 | 9.1535 | 4.7204 | 2.9873 |
| Bf | 56.0998 | 71.0487 | 80.5354 |

Table 114 shows the [Focusing lens group shift distance] in Example 23.

TABLE 114

| [Focusing lens group shift distance] | | | |
|---|---|---|---|
| | Wide-angle end | intermediate focal length | telephoto end |
| f | 81.5936 | 200.9994 | 392.0036 |
| Δ1b | 9.6854 | 9.6854 | 9.6854 |

Table 115 shows the [Conditional expression correspondence value] in Example 23.

TABLE 115

| [Conditional expression correspondence value] |
|---|
| TL = 259.3129 |
| ft = 392.0036 |
| f1b = 201.0756 |
| f2 = −29.4177 |
| f4 = −52.3971 |
| f5 = 44.4282 |
| (13) TL/ft = 0.6615 |
| (14) ft/f1b = 1.9495 |
| (15) TL/f1b = 1.2896 |
| (16) \|f2/f4\| = 0.5614 |
| (17) \|f2/f5\| = 0.6621 |

Figure 82A:
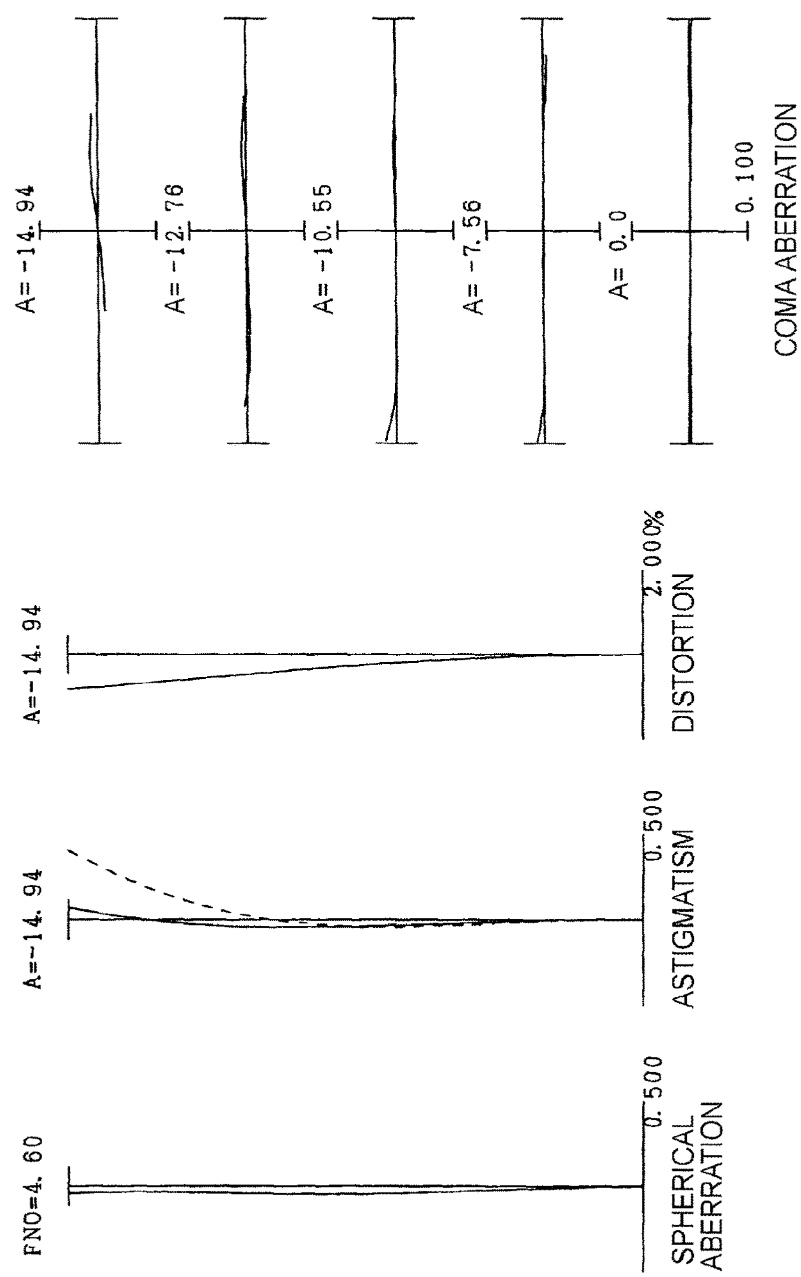
FIG. 82A shows the wide angle end state.
Figure 82B:
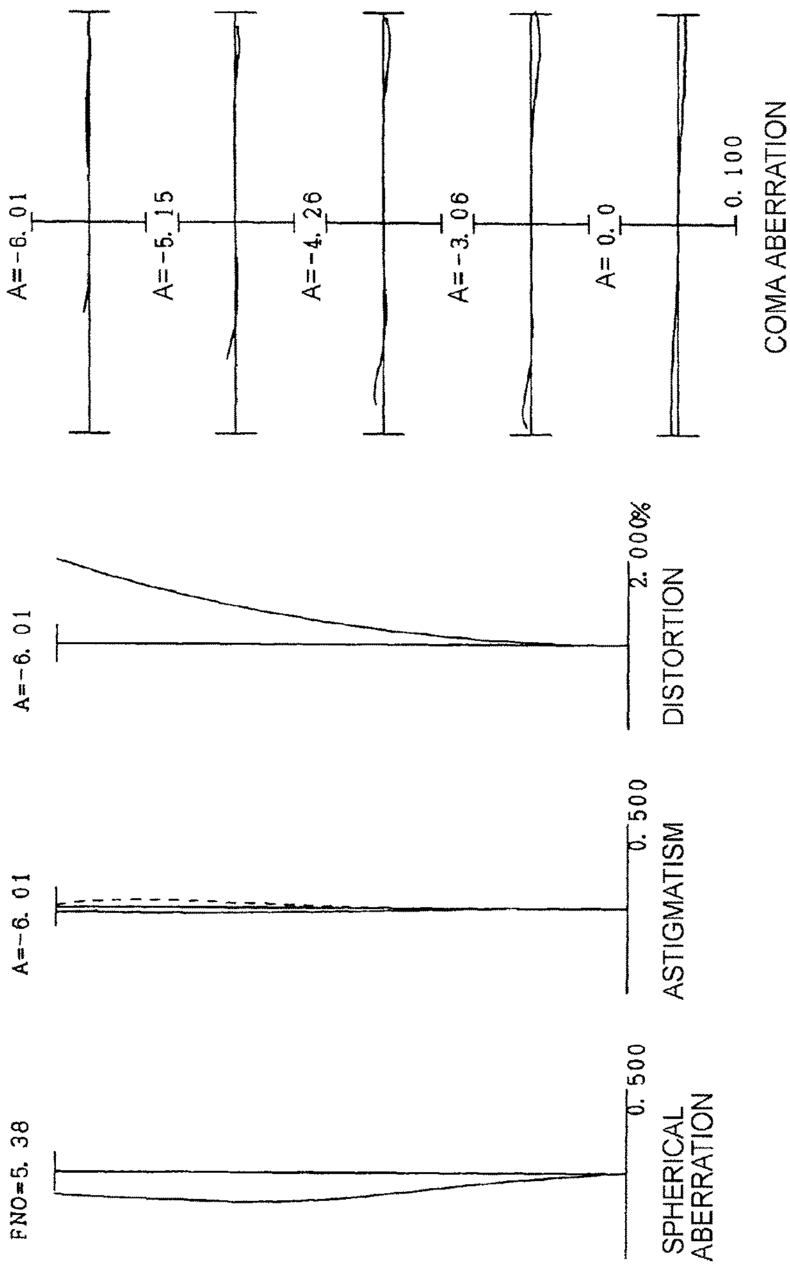
FIG. 82B shows the intermediate focal length state.
Figure 82C:
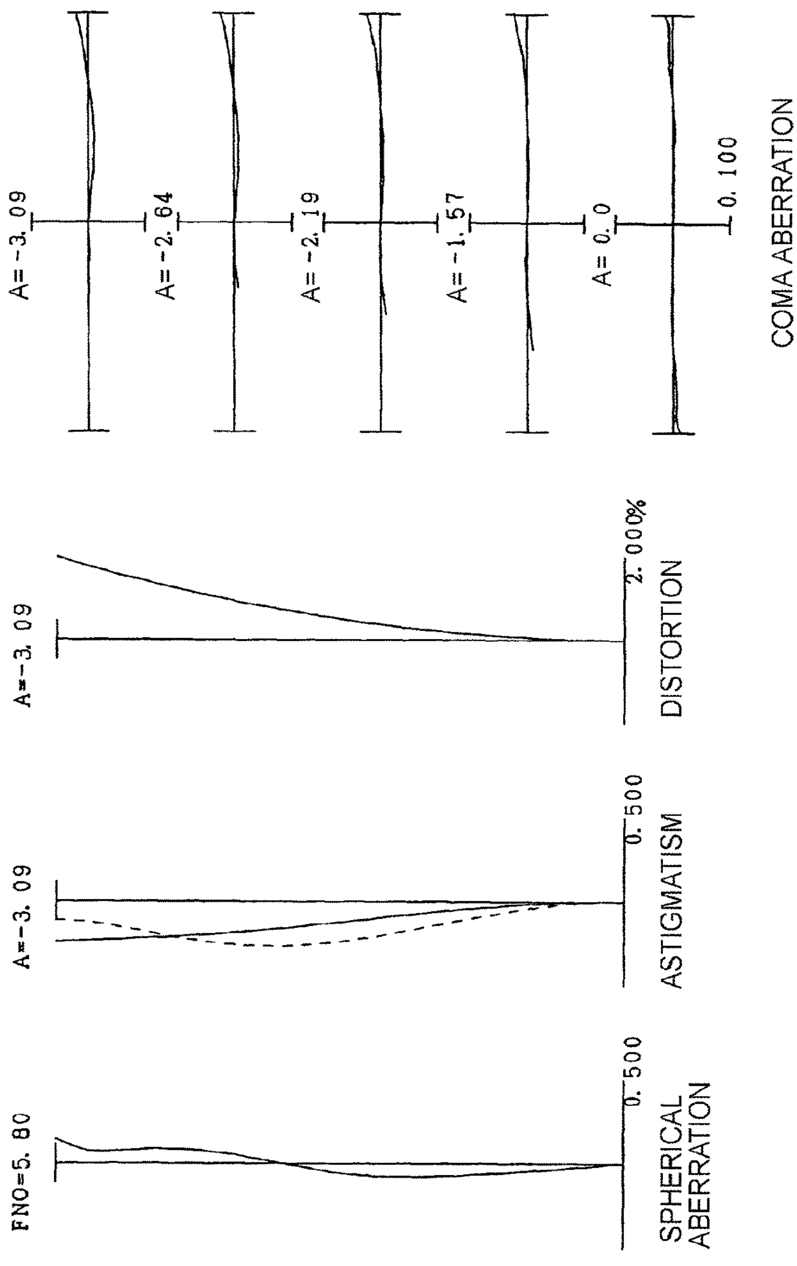
FIG. 82C shows the telephoto end state.
Figure 83A:
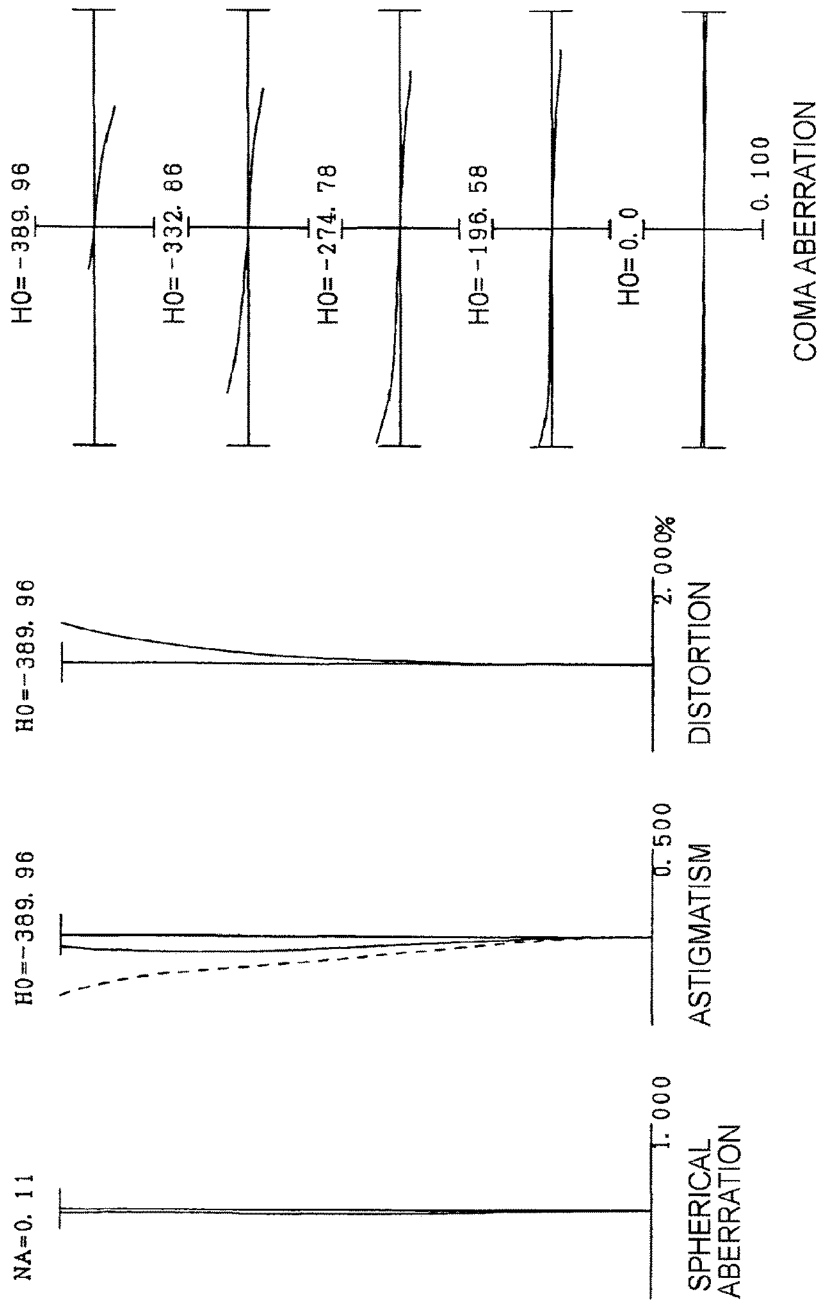
FIG. 83A shows the wide angle end state.
Figure 83B:
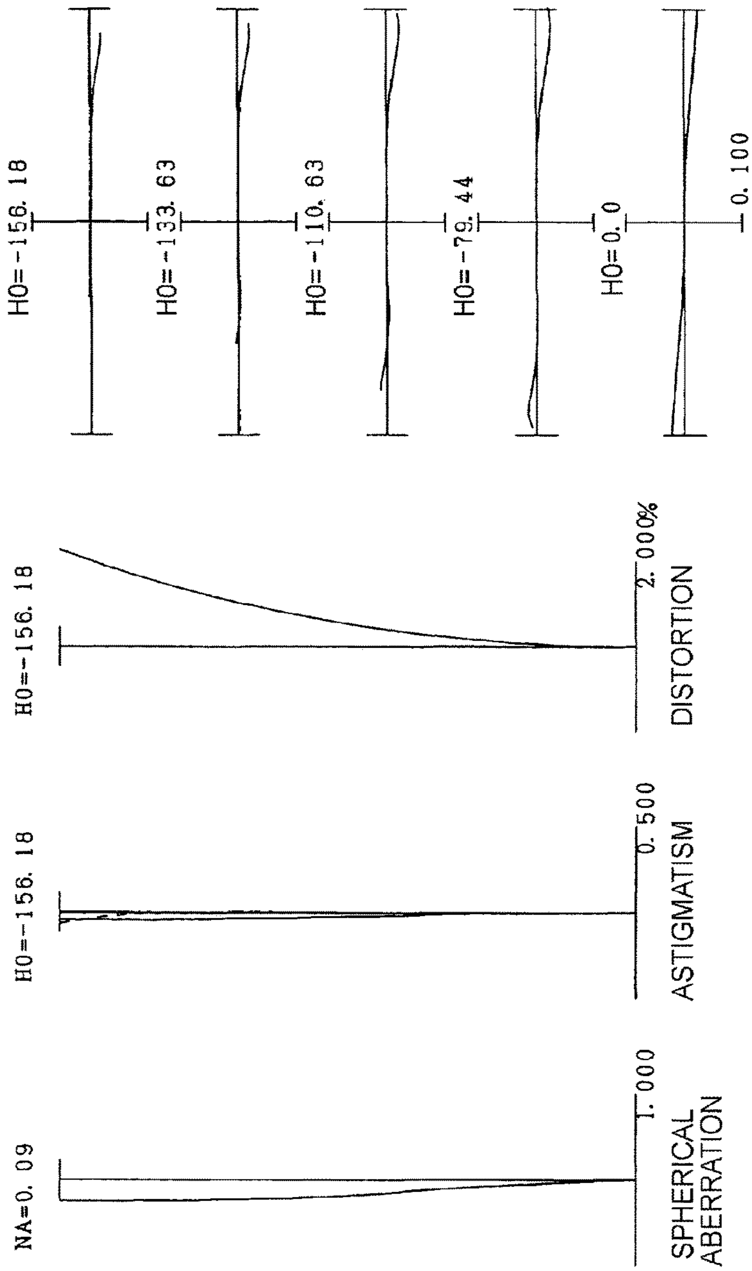
FIG. 83B shows the intermediate focal length state.
Figure 83C:
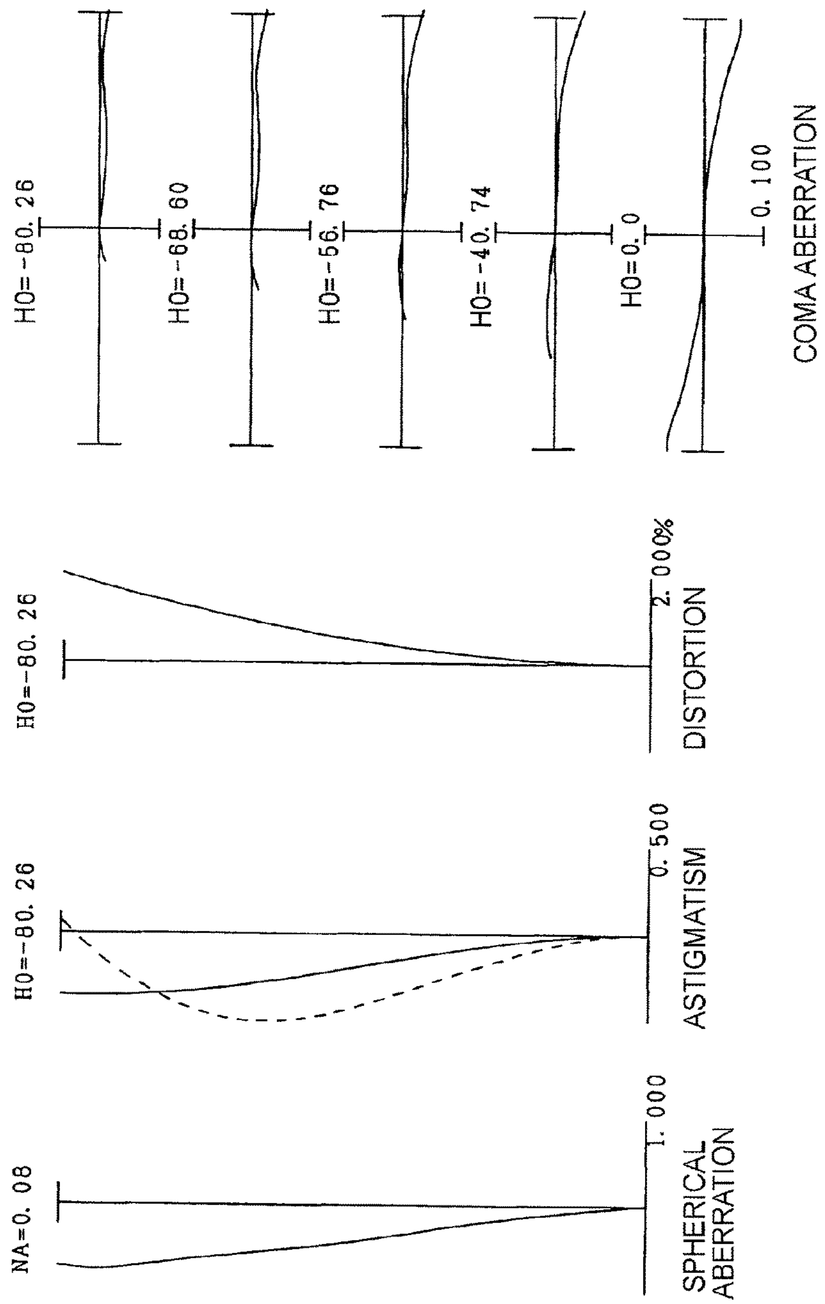
FIG. 83C shows the telephoto end state.

FIG. 82 and FIG. 83 are graphs showing various aberrations of Example 23 at d-line (wavelength: 587.6 nm). In other words, FIG. 82A are graphs showing various aberrations upon focusing on infinity in the wide angle end state (f=81.59 mm), FIG. 82B are graphs showing various aberrations upon focusing on infinity in the intermediate focal length state (f=201.00 mm), and FIG. 82C are graphs showing various aberrations upon focusing on infinity in the telephoto end state (f=392.00 mm). FIG. 83A are graphs showing various aberrations upon close distance focusing (photographic distance: 1.8 m) in the wide angle end state (f=81.59 mm), FIG. 83B are graphs showing various aberrations upon close distance focusing (photographic distance: 1.8 m) in the intermediate focal length state (f=201.00 mm), and FIG. 83C are graphs showing various aberrations upon close distance focusing (photographic distance: 1.8 m) in the telephoto end state (f=392.00 mm).

In each graph showing aberrations, FNO denotes an F number, A denotes a half angle of view, and H0 denotes an object height with respect to each image height. In the graphs showing spherical aberration, a value of the F number corresponding to a maximum aperture is shown, in the graphs showing astigmatism and distortion, a maximum value of the image height is shown respectively, and in the graphs showing coma aberration, a value of each image height is shown. In the graph showing astigmatism, a solid line indicates a sagittal image surface, and a broken line indicates a meridional image surface. This description on graphs showing aberrations is the same for the other examples, for which description is omitted.

As each graph showing aberrations indicates, according to Example 23, various aberrations are corrected well in each focal length state, from the wide angle end state to the telephoto end state, implementing excellent image forming performance.

Example 24

Figure 84:
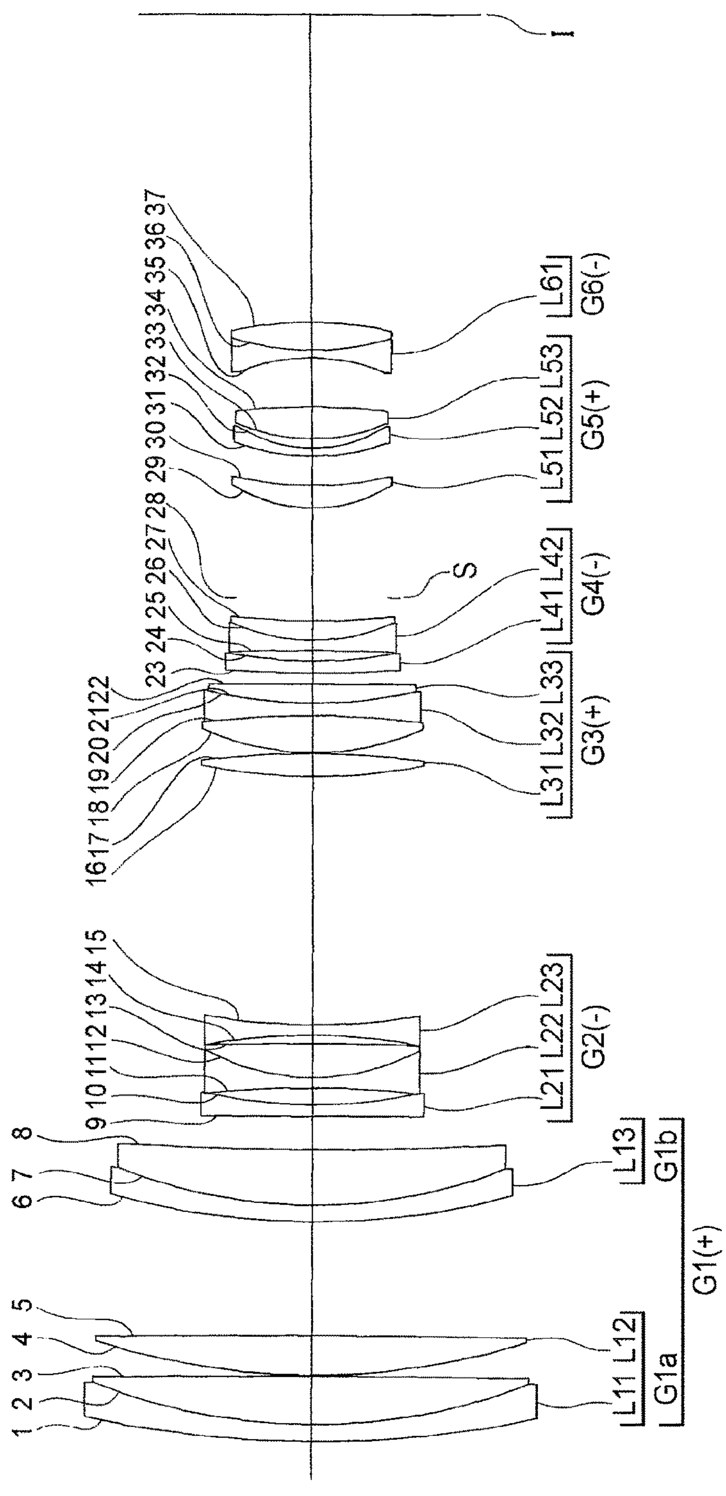
FIG. 84 is a diagram depicting a configuration of a lens system according to Example 24.

Example 24 will now be described with reference to FIG. 84 to FIG. 86 and Table 116 to Table 120. FIG. 84 is a diagram depicting a configuration of a lens system according to Example 24. As FIG. 84 shows, in the lens system according to Example 24, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a biconvex lens L12. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a biconvex lens L33.

The fourth lens group G4 has, in order from the object, a negative meniscus lens L41 having a convex surface facing the object, and a cemented negative lens L42 in which a biconcave lens and a positive meniscus lens having a convex surface facing the object are cemented.

The fifth lens group G5 has, in order from the object, a positive meniscus lens L51 having a convex surface facing the object, a negative meniscus lens L52 having a convex surface facing the object, and a biconvex lens L53.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 24 are shown in Table 116.

TABLE 116

[All parameters]

| | Wide-angle end | | intermediate focal length | | telephoto end |
|---|---|---|---|---|---|
| f | 102.00 | ~ | 200.00 | ~ | 392.00 |
| FNO | 4.12 | ~ | 4.83 | ~ | 5.77 |
| 2ω | 23.68 | ~ | 11.96 | ~ | 6.15 |
| Image Height | 21.60 | ~ | 21.60 | ~ | 21.60 |
| Total lens Length | 255.00 | ~ | 255.00 | ~ | 255.00 |

TABLE 116-continued

[Lens data]

| Surface Number | r | d | nd | νd |
|---|---|---|---|---|
| 1 | 163.4801 | 3.00 | 1.83400 | 37.16 |
| 2 | 90.8226 | 8.52 | 1.49782 | 82.52 |
| 3 | −2163.4247 | 0.20 | | |
| 4 | 106.4057 | 6.98 | 1.49782 | 82.52 |
| 5 | −2235.9865 | (d5) | | |
| 6 | 112.1217 | 3.00 | 1.80518 | 25.42 |
| 7 | 78.9055 | 9.91 | 1.58313 | 59.37 |
| 8 | 522.3679 | (d8) | | |
| 9 | 11854.9330 | 2.08 | 1.88300 | 40.76 |
| 10 | 71.4854 | 3.00 | | |
| 11 | −151.9921 | 1.85 | 1.75500 | 52.32 |
| 12 | 32.7891 | 6.00 | 1.80810 | 22.76 |
| 13 | −503.5686 | 1.48 | | |
| 14 | −86.3546 | 1.85 | 1.81600 | 46.62 |
| 15 | 93.9649 | (d15) | | |
| 16 | 83.6033 | 4.08 | 1.75500 | 52.32 |
| 17 | −142.4959 | 0.20 | | |
| 18 | 39.8810 | 6.55 | 1.60300 | 65.44 |
| 19 | −133.0017 | 2.20 | 1.80518 | 25.42 |
| 20 | 62.5022 | 0.10 | | |

TABLE 116-continued

| | | | | |
|---|---|---|---|---|
| 21 | 69.6347 | 3.40 | 1.51633 | 64.14 |
| 22 | −3944.5756 | (d22) | | |
| 23 | 173.3539 | 2.20 | 1.83400 | 37.16 |
| 24 | 68.9202 | 1.83 | | |
| 25 | −316.7717 | 2.00 | 1.79952 | 42.22 |
| 26 | 29.7037 | 3.39 | 1.84666 | 23.78 |
| 27 | 102.3637 | 4.13 | | |
| 28 | 0.0000 | (d28) | (aperture stop S) | |
| *29 | 21.3151 | 4.09 | 1.51633 | 64.07 |
| 30 | 50.9813 | 5.25 | | |
| 31 | 33.0404 | 1.50 | 1.84666 | 23.78 |
| 32 | 20.9352 | 1.63 | | |
| 33 | 28.6951 | 5.73 | 1.51633 | 64.14 |
| 34 | −92.4185 | (d34) | | |
| 35 | −26.6672 | 1.40 | 1.88300 | 40.76 |
| 36 | 40.8727 | 4.96 | 1.78472 | 25.68 |
| 37 | −56.7842 | (Bf) | | |

[Each group focal length data]

| Group | First surface | Focal length |
|---|---|---|
| G1 | 1 | 107.5829 |
| G2 | 9 | −28.8919 |
| G3 | 16 | 42.9992 |
| G4 | 23 | −59.9044 |
| G5 | 29 | 44.9108 |
| G6 | 35 | −49.8749 |

In Example 24, the twenty ninth lens surface is aspherical. Table 117 shows the [Aspherical data].

TABLE 117

[Aspherical data]
Twenty ninth surface

| R | κ | $C_4$ | $C_6$ | $C_8$ | $C_{10}$ |
|---|---|---|---|---|---|
| 21.3151 | +1.4060 | $-9.3994 \times 10^{-6}$ | $-2.6975 \times 10^{-8}$ | $+3.8131 \times 10^{-11}$ | $-4.5952 \times 10^{-13}$ |

In Example 24, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d34 between the fifth lens group G5 and the sixth lens group G6, and the back focus Bf, change upon zooming. Table 118 shows the [Variable distance data].

TABLE 118

[Variable distance data]

| | Wide-angle end | intermediate focal length | telephoto end |
|---|---|---|---|
| d5 | 20.3152 | 20.3152 | 20.3152 |
| d8 | 5.8700 | 20.2798 | 25.1462 |
| d15 | 44.4384 | 23.7131 | 2.0000 |
| d22 | 2.0000 | 8.3155 | 25.1621 |
| d28 | 16.0855 | 12.3558 | 2.0000 |

TABLE 118-continued

| [Variable distance data] | | | |
|---|---|---|---|
| | Wide-angle end | intermediate focal length | telephoto end |
| d34 | 8.7867 | 7.2704 | 3.4708 |
| Bf | 55.0000 | 60.2458 | 74.4012 |

Table 119 shows the [Focusing lens group shift distance] in Example 24.

TABLE 119

| [Focusing lens group shift distance] | | | |
|---|---|---|---|
| | Wide-angle end | intermediate focal length | telephoto end |
| f | 101.9997 | 199.9993 | 391.9983 |
| Δ1b | 14.1059 | 14.1059 | 14.1059 |

Table 120 shows the [Conditional expression correspondence value] in Example 24.

TABLE 120

| [Conditional expression correspondence value] |
|---|
| TL = 255.0000 |
| ft = 391.9983 |
| f1b = 300.4379 |
| f2 = −28.8919 |
| f4 = −59.9044 |
| f5 = 44.9108 |
| (13) TL/ft = 0.6505 |
| (14) ft/f1b = 1.3048 |
| (15) TL/f1b = 0.8488 |
| (16) \|f2/f4\| = 0.4823 |
| (17) \|f2/f5\| = 0.6433 |

Figure 85A:
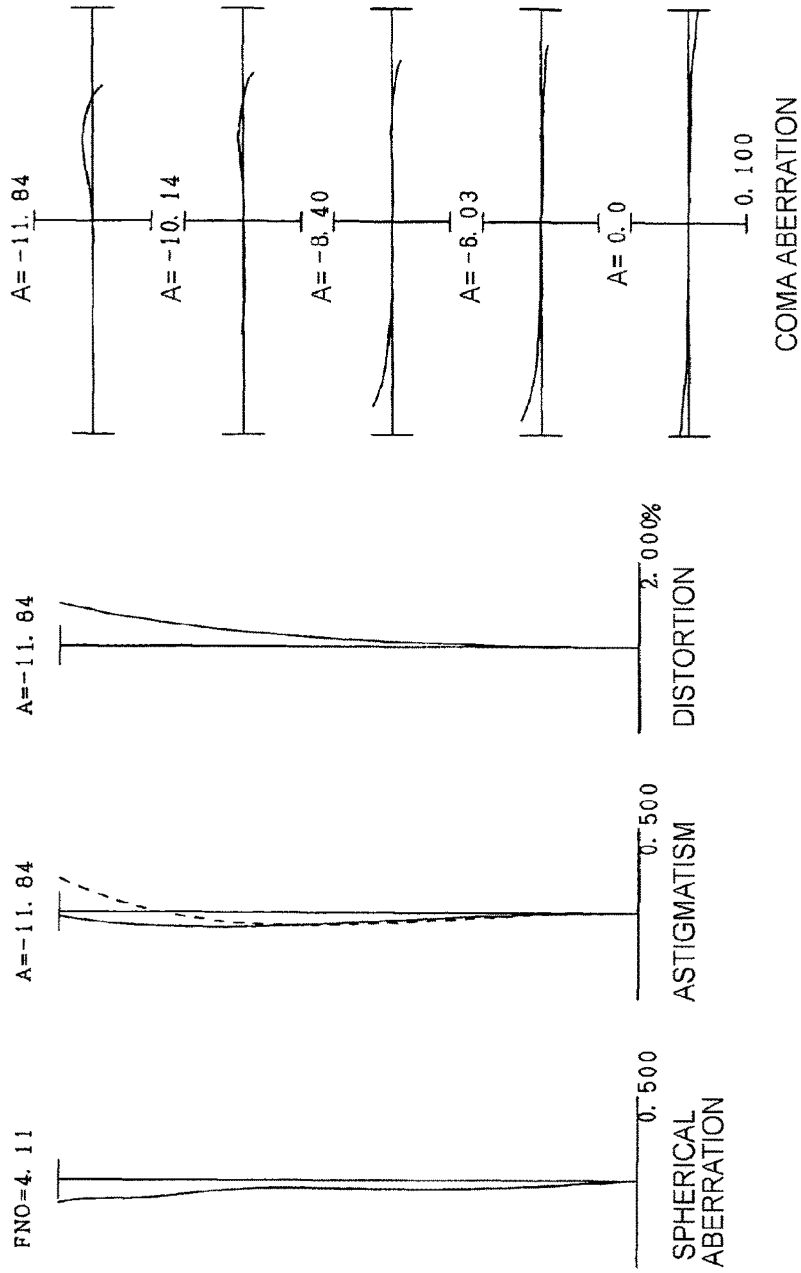
FIG. 85A shows the wide angle end state.
Figure 85B:
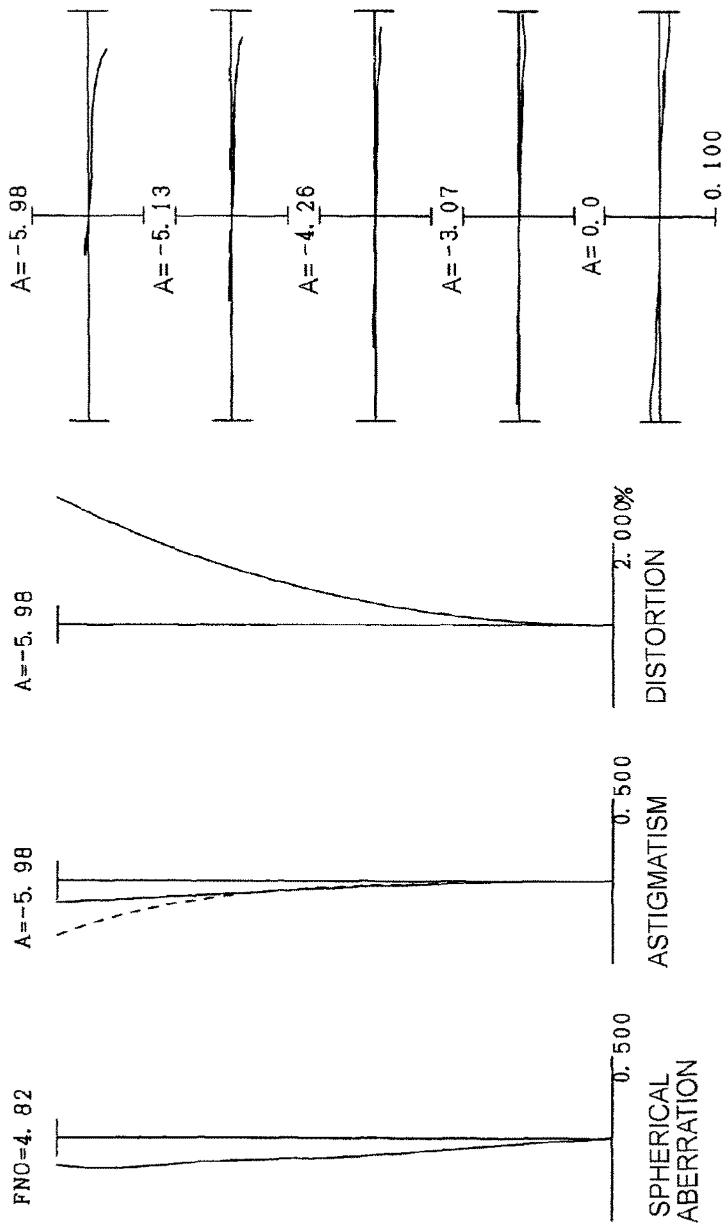
FIG. 85B shows the intermediate focal length state.
Figure 85C:
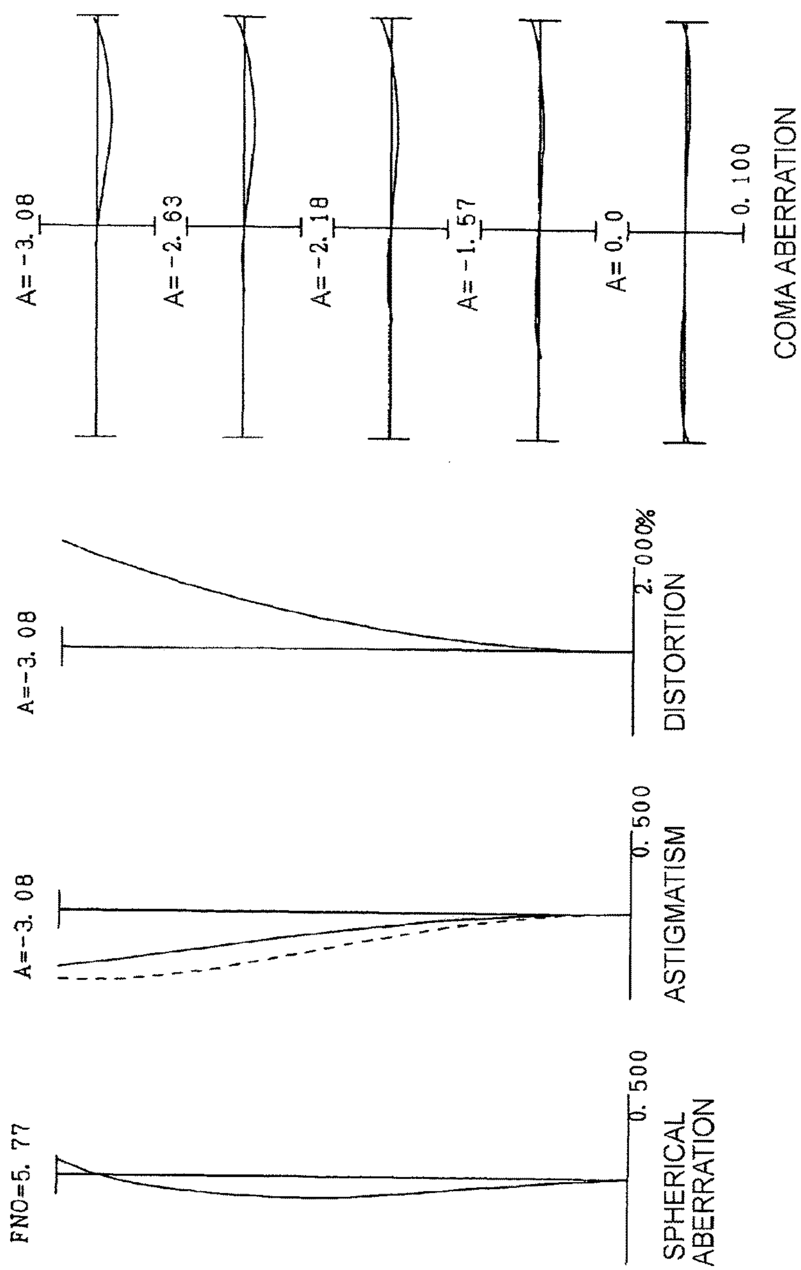
FIG. 85C shows the telephoto end state.
Figure 86A:
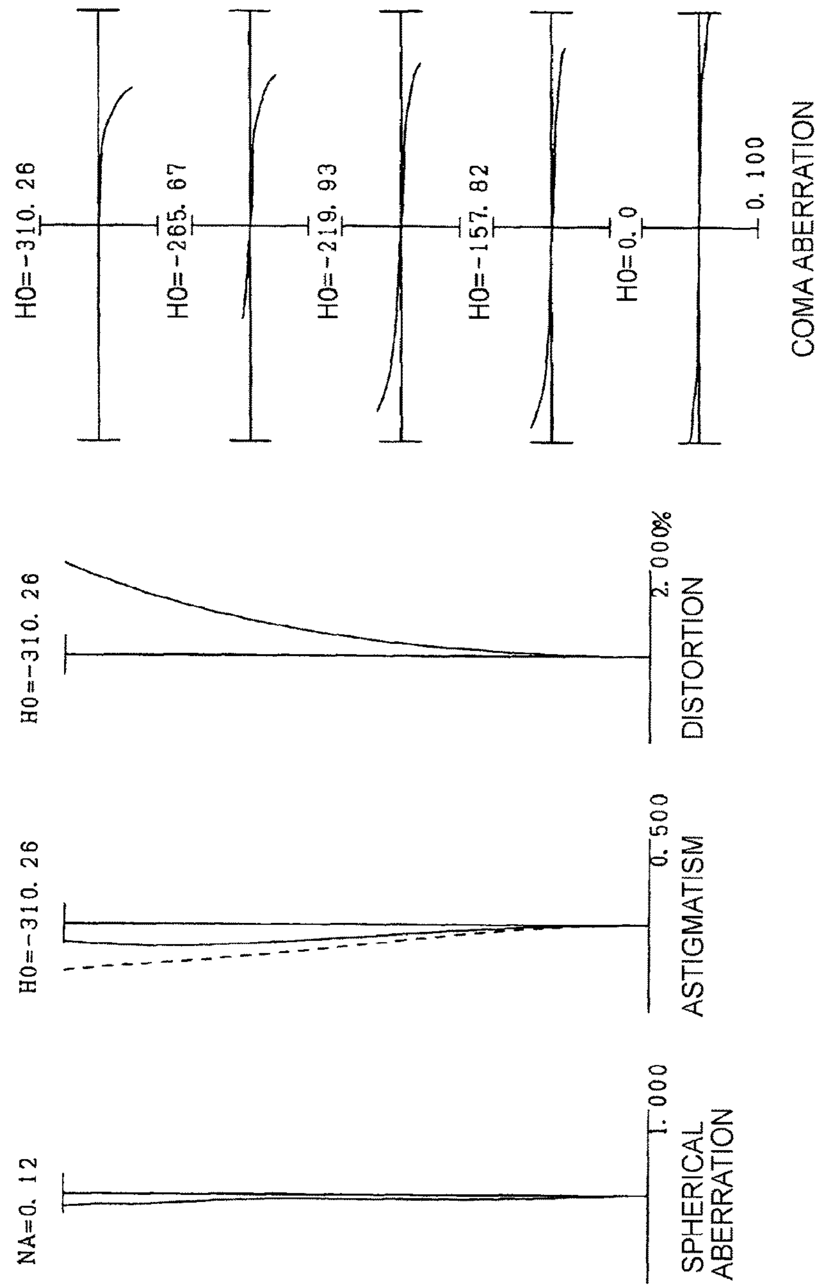
FIG. 86A shows the wide angle end state.
Figure 86B:
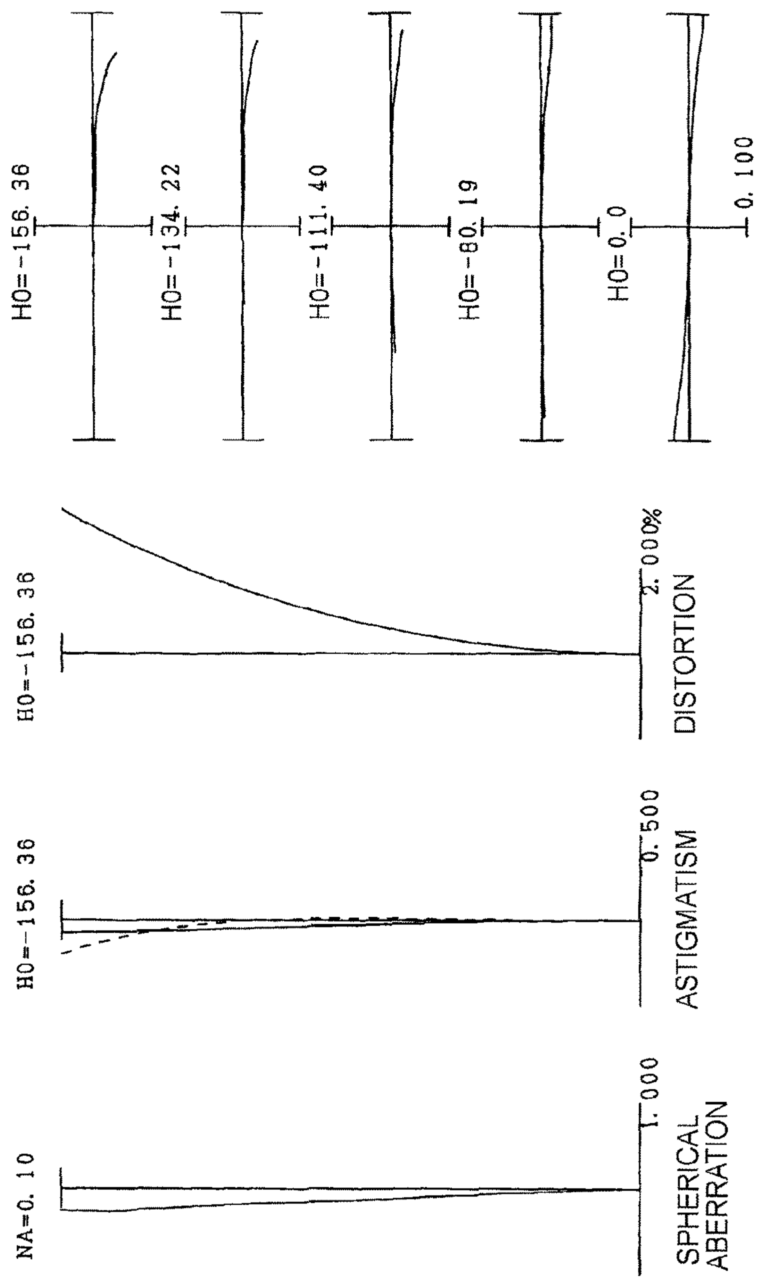
FIG. 86B shows the intermediate focal length state.
Figure 86C:
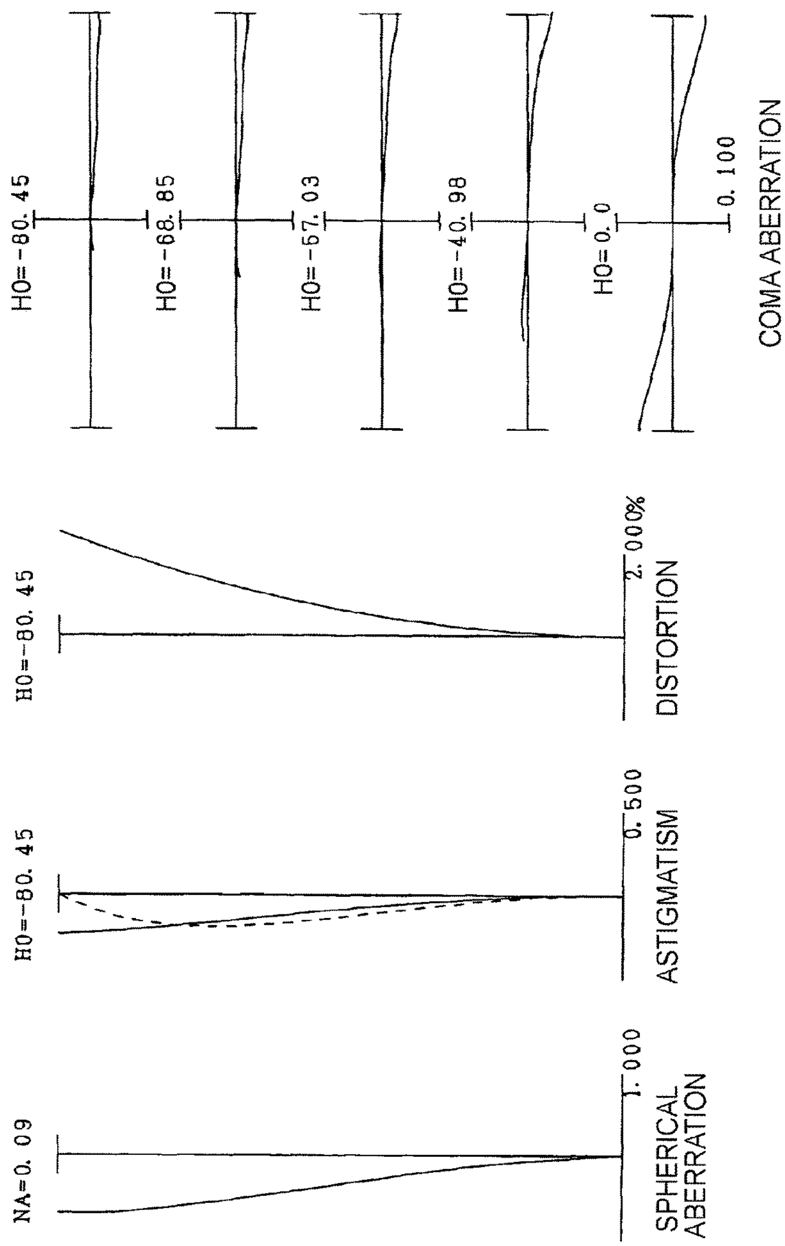
FIG. 86C shows the telephoto end state.

FIG. 85 and FIG. 86 are graphs showing various aberrations of Example 24 at d-line (wavelength: 587.6 nm). In other words, FIG. 85A are graphs showing various aberrations upon focusing on infinity in the wide angle end state (f=102.00 mm), FIG. 85B are graphs showing various aberrations upon focusing on infinity in the intermediate focal length state (f=200.00 mm), and FIG. 85C are graphs showing various aberrations upon focusing on infinity in the telephoto end state (f=392.00 mm). FIG. 86A are graphs showing various aberrations upon close distance focusing (photographic distance: 1.8 m) in the wide angle end state (f=102.00 mm), FIG. 86B are graphs showing various aberrations upon close distance focusing (photographic distance: 1.8 m) in the intermediate focal length state (f=200.00 mm), and FIG. 86C are graphs showing various aberrations upon close distance focusing (photographic distance: 1.8 m) in the telephoto end state (f=392.00 mm).

As each graph showing aberrations indicates, according to Example 24, various aberrations are corrected well in each focal length state, from the wide angle end state to the telephoto end state, implementing excellent image forming performance.

Example 25

Figure 87:
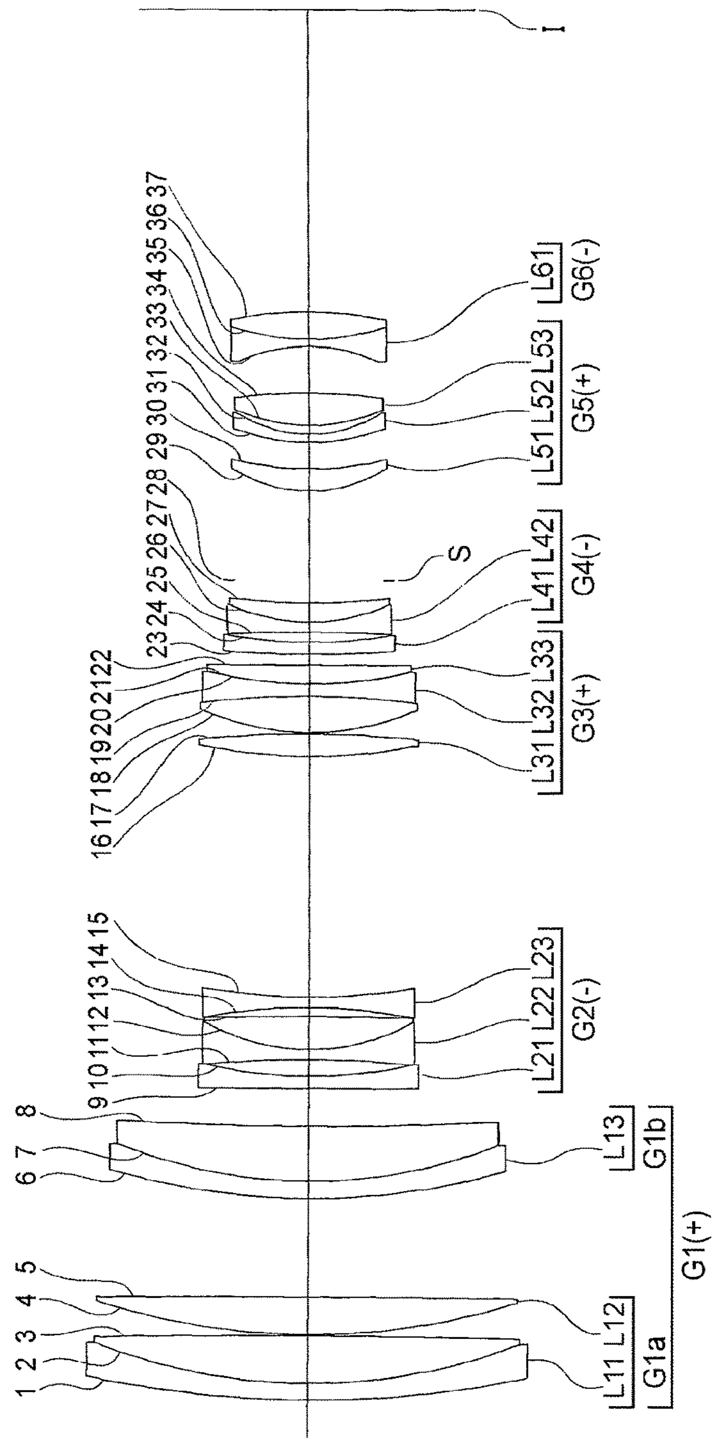
FIG. 87 is a diagram depicting a configuration of a lens system according to Example 25.

Example 25 will now be described with reference to FIG. 87 to FIG. 89 and Table 121 to Table 125. FIG. 87 is a diagram depicting a configuration of a lens system according to Example 25. As FIG. 87 shows, in the lens system according to Example 25, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a biconvex lens L12. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a biconvex lens L33.

The fourth lens group G4 has, in order from the object, a negative meniscus lens L41 having a convex surface facing the object, and a cemented negative lens L42 in which a biconcave lens and a positive meniscus lens having a convex surface facing the object are cemented.

The fifth lens group G5 has, in order from the object, a positive meniscus lens L51 having a convex surface facing the object, a negative meniscus lens L52 having a convex surface facing the object, and a biconvex lens L53.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 25 are shown in Table 121.

TABLE 121

| [All parameters] | | | | | |
|---|---|---|---|---|---|
| | Wide-angle end | | intermediate focal length | | telephoto end |
| f | 102.00 | ~ | 200.00 | ~ | 392.00 |
| FNO | 4.13 | ~ | 4.83 | ~ | 5.77 |
| 2ω | 23.67 | ~ | 11.96 | ~ | 6.15 |
| Image Height | 21.60 | ~ | 21.60 | ~ | 21.60 |
| Total lens Length | 253.00 | ~ | 253.00 | ~ | 253.00 |

| [Lens data] | | | | |
|---|---|---|---|---|
| Surface Number | r | d | nd | νd |
| 1 | 161.5135 | 3.00 | 1.83400 | 37.16 |
| 2 | 90.5285 | 8.53 | 1.49782 | 82.52 |
| 3 | −1750.3262 | 0.20 | | |
| 4 | 105.5734 | 6.81 | 1.49782 | 82.52 |
| 5 | −3920.2297 | (d5) | | |
| 6 | 110.9147 | 3.00 | 1.80518 | 25.42 |
| 7 | 77.7105 | 10.00 | 1.58313 | 59.37 |
| 8 | 538.4049 | (d8) | | |
| 9 | 3389.0372 | 2.20 | 1.88300 | 40.76 |
| 10 | 69.7772 | 3.01 | | |
| 11 | −160.0773 | 1.85 | 1.75500 | 52.32 |
| 12 | 32.1395 | 6.00 | 1.80810 | 22.76 |
| 13 | −612.1529 | 1.56 | | |
| 14 | −84.5418 | 1.85 | 1.81600 | 46.62 |
| 15 | 92.2772 | (d15) | | |
| 16 | 82.1865 | 4.12 | 1.75500 | 52.32 |
| 17 | −149.4747 | 0.20 | | |
| 18 | 40.7142 | 6.55 | 1.60300 | 65.44 |

TABLE 121-continued

| | | | | |
|---|---|---|---|---|
| 19 | −127.3464 | 2.20 | 1.80518 | 25.42 |
| 20 | 64.2484 | 0.10 | | |
| 21 | 65.0600 | 3.40 | 1.51633 | 64.14 |
| 22 | −5745.9391 | (d22) | | |
| 23 | 166.2994 | 2.20 | 1.83400 | 37.16 |
| 24 | 69.4946 | 1.80 | | |
| 25 | −367.4122 | 2.00 | 1.79952 | 42.22 |
| 26 | 28.9758 | 3.47 | 1.84666 | 23.78 |
| 27 | 94.4215 | 4.13 | | |
| 28 | 0.0000 | (d28) | (aperture stop S) | |
| *29 | 20.9486 | 4.12 | 1.51633 | 64.07 |
| 30 | 48.7262 | 4.82 | | |
| 31 | 32.5846 | 1.50 | 1.84666 | 23.78 |
| 32 | 20.5062 | 1.59 | | |
| 33 | 27.6644 | 5.80 | 1.51633 | 64.14 |
| 34 | −91.9499 | (d34) | | |
| 35 | −26.3195 | 1.40 | 1.88300 | 40.76 |
| 36 | 38.4600 | 4.95 | 1.78472 | 25.68 |
| 37 | −56.7086 | (Bf) | | |

[Each group focal length data]

| Group | First surface | Focal length |
|---|---|---|
| G1 | 1 | 105.8884 |
| G2 | 9 | −28.4278 |
| G3 | 16 | 42.5989 |
| G4 | 23 | −59.9146 |
| G5 | 29 | 44.4268 |
| G6 | 35 | −48.5528 |

In Example 25, the twenty ninth lens surface is aspherical. Table 122 shows the [Aspherical data].

TABLE 122

[Aspherical data]
Twenty ninth surface

| R | κ | $C_4$ | $C_6$ | $C_8$ | $C_{10}$ |
|---|---|---|---|---|---|
| 20.9486 | +1.4728 | $-1.0457 \times 10^{-5}$ | $-3.5430 \times 10^{-8}$ | $+7.1991 \times 10^{-11}$ | $-7.2011 \times 10^{-13}$ |

In Example 25, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d34 between the fifth lens group G5 and the sixth lens group G6, and the back focus Bf, change upon zooming. Table 123 shows the [Variable distance data].

TABLE 123

[Variable distance data]

| | Wide-angle end | intermediate focal length | telephoto end |
|---|---|---|---|
| d5 | 18.0421 | 18.0421 | 18.0421 |
| d8 | 6.8440 | 20.9111 | 25.7775 |
| d15 | 43.9312 | 23.5006 | 2.0000 |
| d22 | 2.0000 | 8.3635 | 24.9977 |
| d28 | 16.2487 | 12.3530 | 2.0000 |
| d34 | 8.5786 | 7.0709 | 3.4740 |
| Bf | 54.9996 | 60.4030 | 74.3528 |

Table 124 shows the [Focusing lens group shift distance] in Example 25.

TABLE 124

[Focusing lens group shift distance]

| | Wide-angle end | intermediate focal length | telephoto end |
|---|---|---|---|
| f | 101.9992 | 199.9983 | 391.9962 |
| Δ1b | 13.4746 | 13.4746 | 13.4746 |

Table 125 shows the [Conditional expression correspondence value] in Example 25.

TABLE 125

[Conditional expression correspondence value]

TL = 252.9996
ft = 391.9962
f1b = 294.3923
f2 = −28.4278
f4 = −59.9146
f5 = 44.42681
(13) TL/ft = 0.6454
(14) ft/f1b = 1.3315
(15) TL/f1b = 0.8594
(16) |f2/f4| = 0.4745
(17) |f2/f5| = 0.6399

Figure 88A:
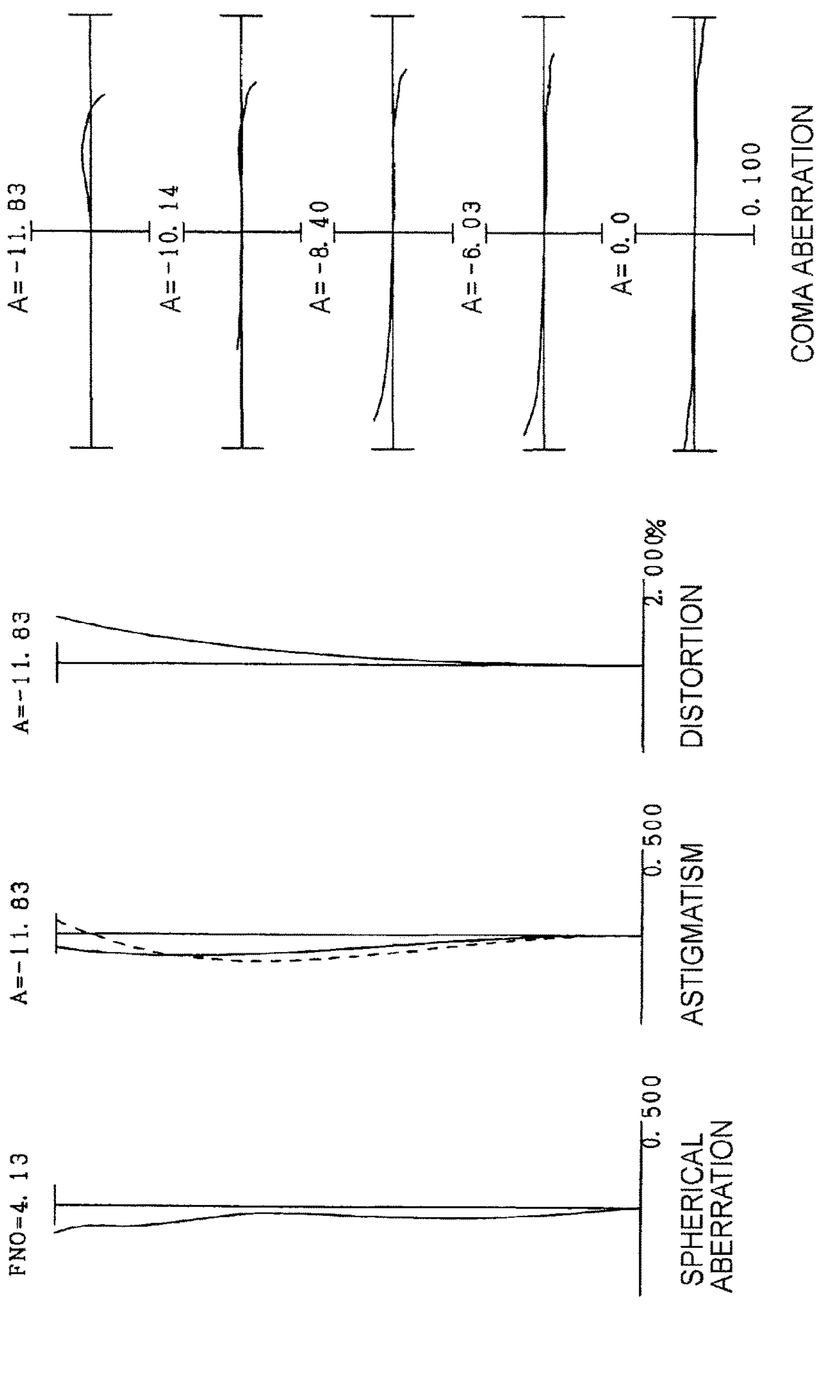
FIG. 88A shows the wide angle end state.
Figure 88B:
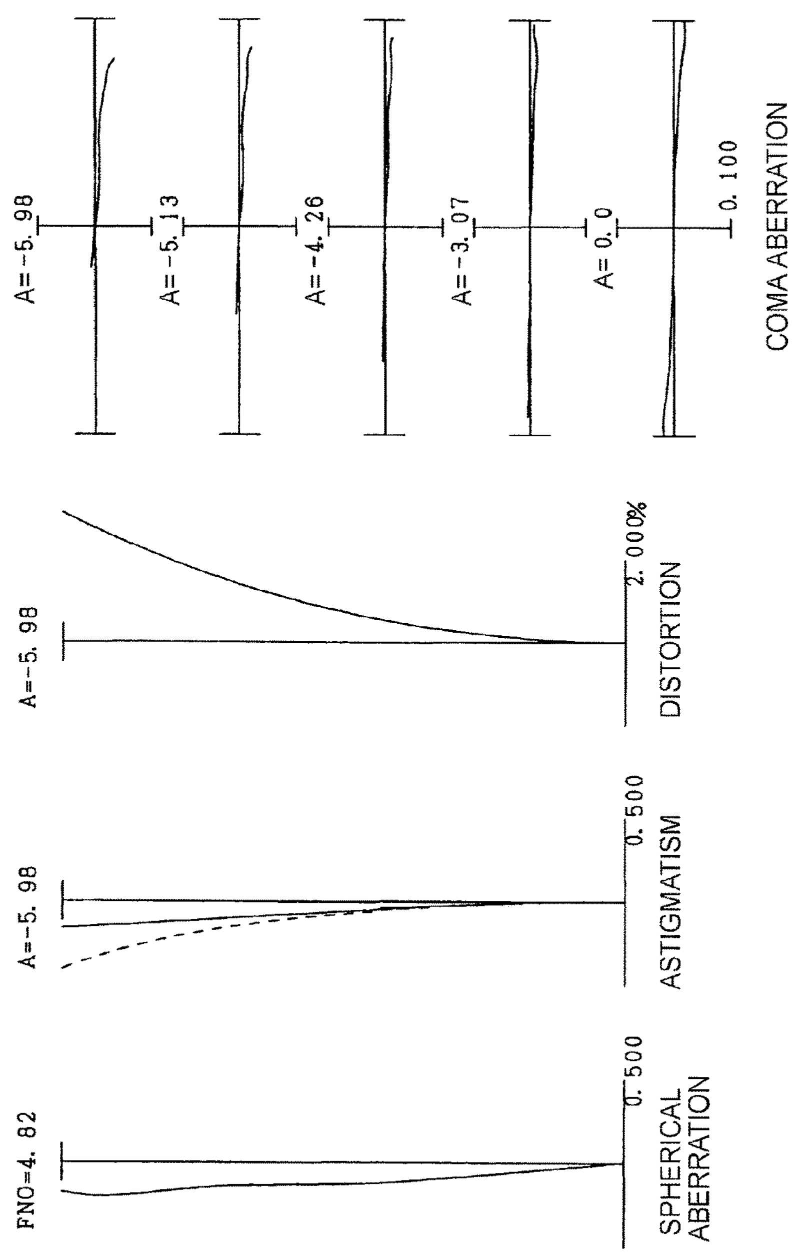
FIG. 88B shows the intermediate focal length state.
Figure 88C:
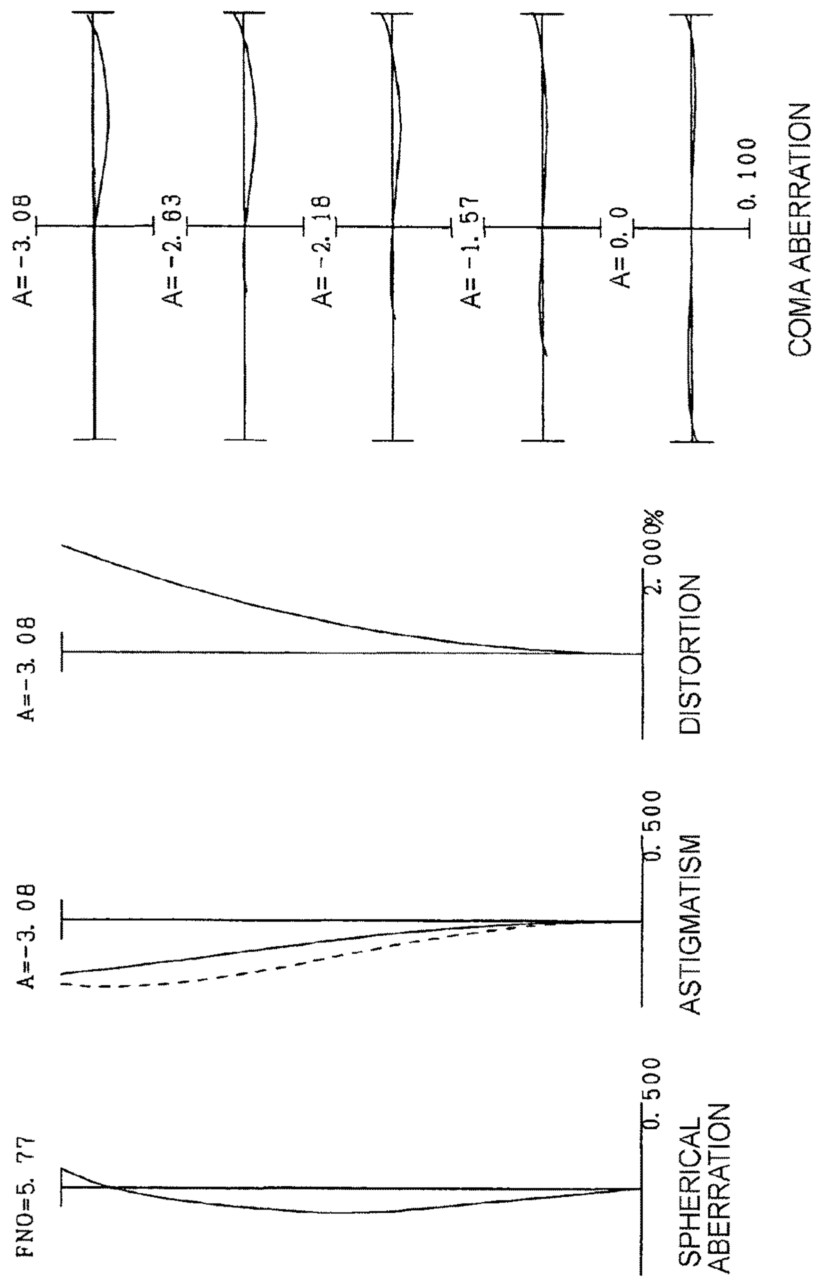
FIG. 88C shows the telephoto end state.
Figure 89A:
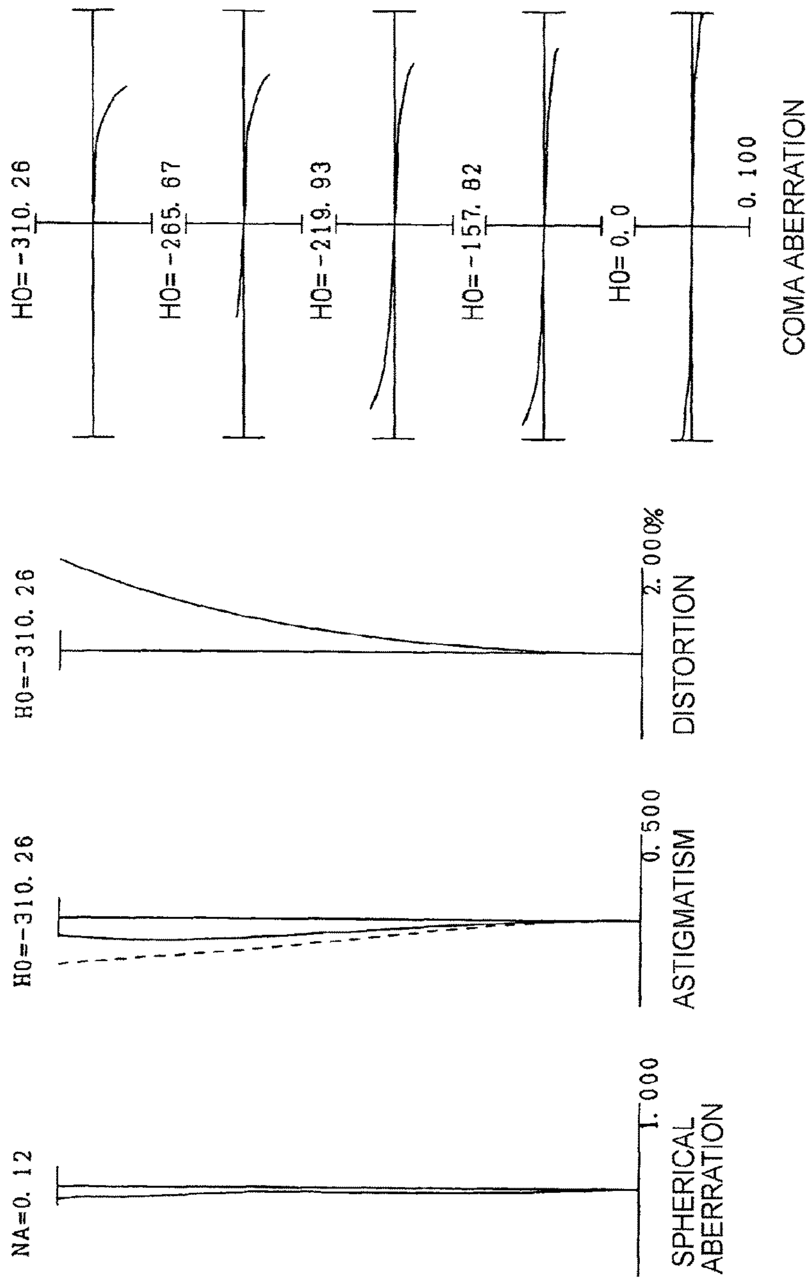
FIG. 89A shows the wide angle end state.
Figure 89B:
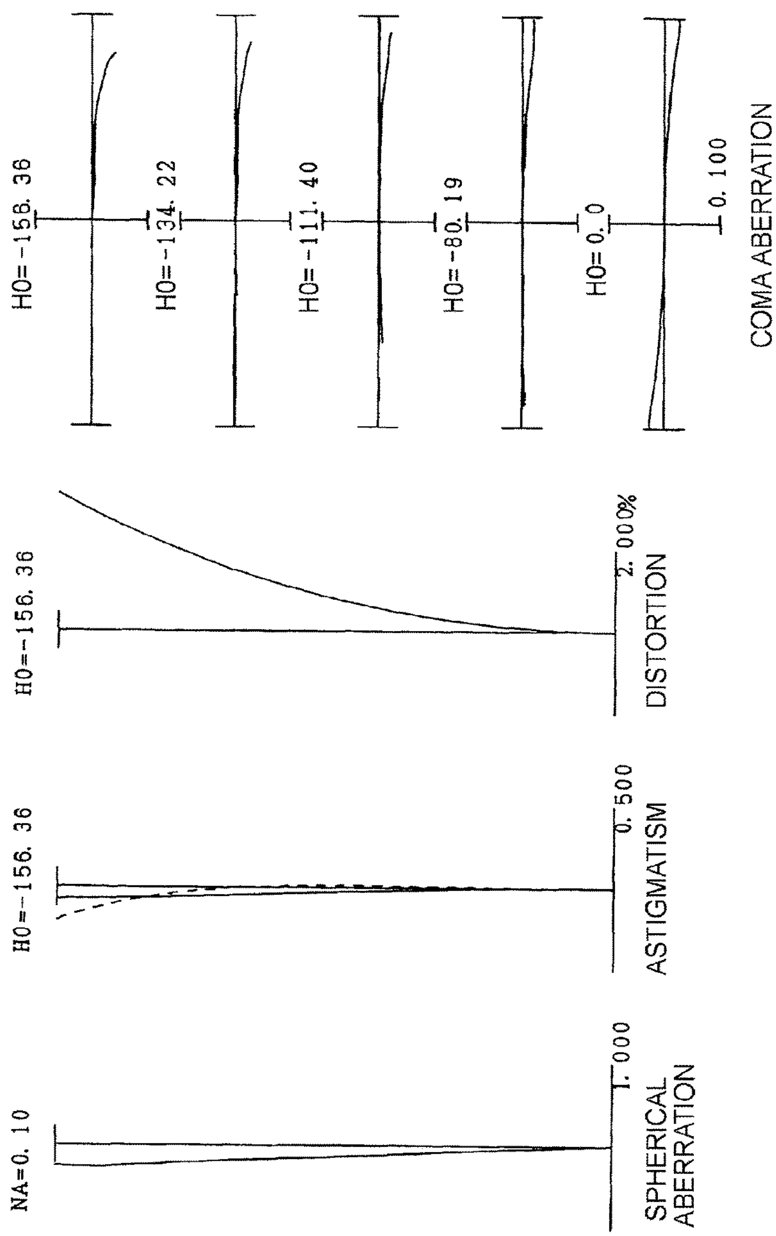
FIG. 89B shows the intermediate focal length state.
Figure 89C:
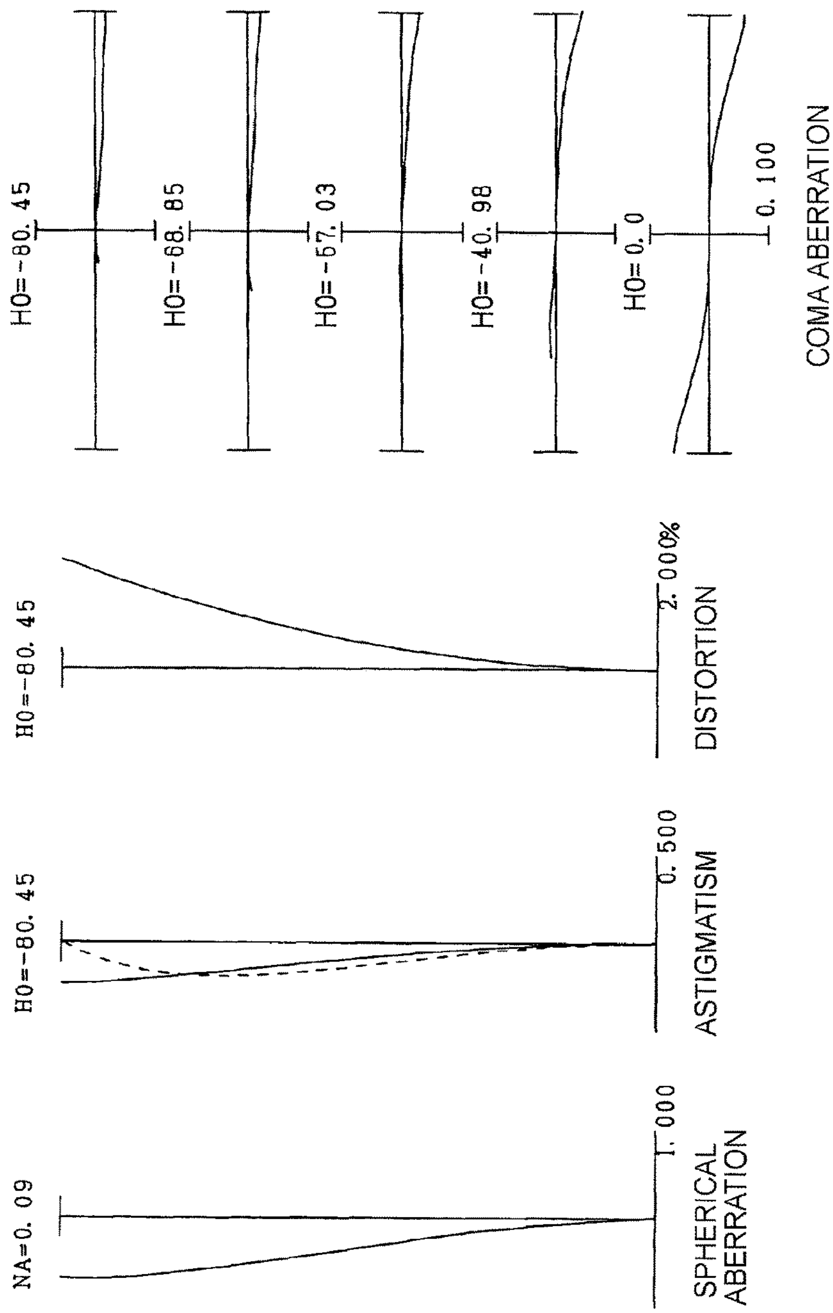
FIG. 89C shows the telephoto end state.

FIG. 88 and FIG. 89 are graphs showing various aberrations of Example 25 at d-line (wavelength: 587.6 nm). In other words, FIG. 88A are graphs showing various aberrations upon focusing on infinity in the wide angle end state (f=102.00 mm), FIG. 88B are graphs showing various aberrations upon focusing on infinity in the intermediate focal length state (f=200.00 mm), and FIG. 88C are graphs showing various aberrations upon focusing on infinity in the telephoto end state (f=392.00 mm). FIG. 89A are graphs showing various aberrations upon close distance focusing (photographic distance: 1.8 m) in the wide angle end state (f=102.00 mm), FIG. 89B are graphs showing various aberrations upon close distance focusing (photographic distance: 1.8 m) in the intermediate focal length state (f=200.00 mm), and FIG. 89C are graphs showing various aberrations upon close distance focusing (photographic distance: 1.8 m) in the telephoto end state (f=392.00 mm).

As each graph showing aberrations indicates, according to Example 25, various aberrations are corrected well in each focal length state, from the wide angle end state to the telephoto end state, implementing excellent image forming performance.

Example 26

Figure 90:
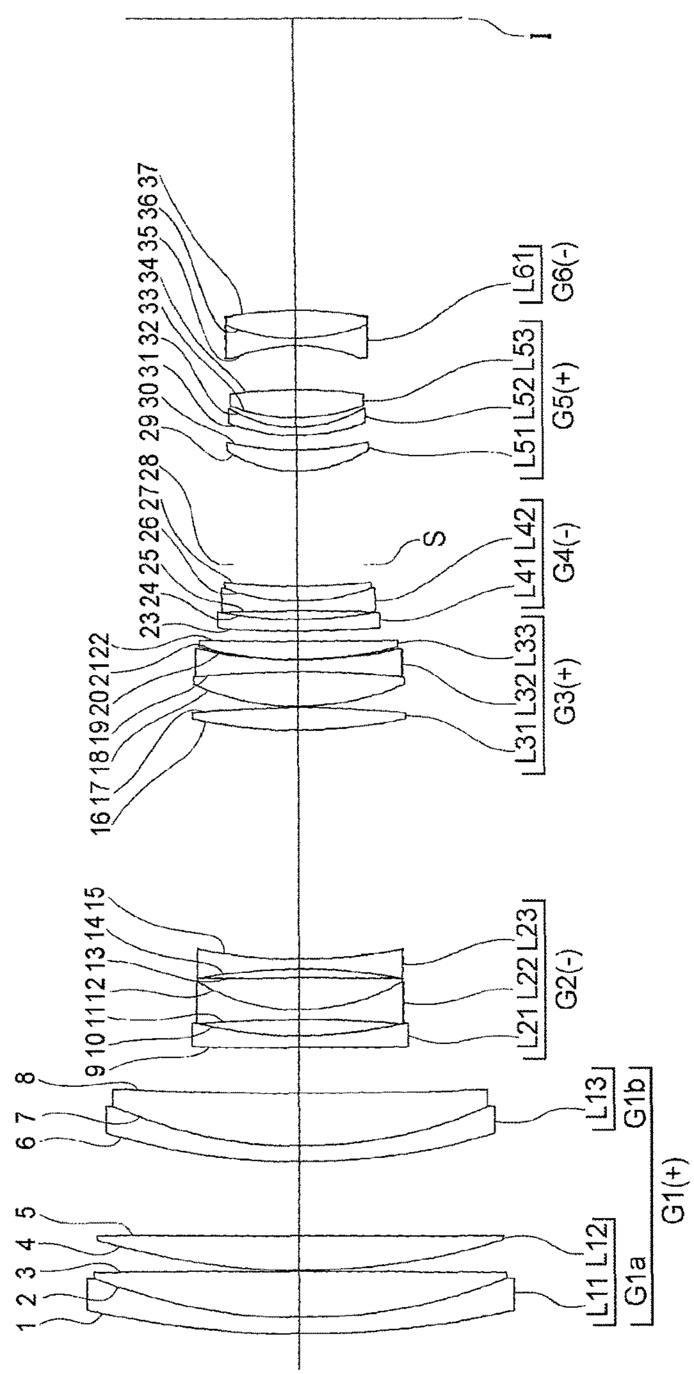
FIG. 90 is a diagram depicting a configuration of a lens system according to Example 26.

Example 26 will now be described with reference to FIG. 90 to FIG. 92 and Table 126 to Table 130. FIG. 90 is a diagram depicting a configuration of a lens system according to Example 26. As FIG. 90 shows, in the lens system according to Example 26, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a biconvex lens are cemented, and a biconcave lens L23.

The third lens group G3 has, in order from the object, a biconvex lens L31, a cemented positive lens L32 in which a biconvex lens and a biconcave lens are cemented, and a positive meniscus lens L33 having a convex surface facing the object.

The fourth lens group G4 has, in order from the object, a negative meniscus lens L41 having a convex surface facing the object, and a cemented negative lens L42 in which a biconcave lens and a positive meniscus lens having a convex surface facing the object are cemented.

The fifth lens group G5 has, in order from the object, a positive meniscus lens L51 having a convex surface facing the object, a negative meniscus lens L52 having a convex surface facing the object, and a biconvex lens L53.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 26 are shown in Table 126.

TABLE 126

[All parameters]

| | Wide-angle end | | intermediate focal length | | telephoto end |
|---|---|---|---|---|---|
| f | 102.00 | ~ | 200.00 | ~ | 392.00 |
| FNO | 4.60 | ~ | 5.08 | ~ | 5.84 |
| 2ω | 23.63 | ~ | 11.96 | ~ | 6.15 |
| Image Height | 21.60 | ~ | 21.60 | ~ | 21.60 |
| Total lens Length | 247.50 | ~ | 247.50 | ~ | 247.50 |

TABLE 126-continued

[Lens data]

| Surface Number | r | d | nd | νd |
|---|---|---|---|---|
| 1 | 155.1837 | 3.00 | 1.83400 | 37.16 |
| 2 | 89.5977 | 8.58 | 1.49782 | 82.52 |
| 3 | −2509.4933 | 0.20 | | |
| 4 | 109.2143 | 6.49 | 1.49782 | 82.52 |
| 5 | 102910.350 | (d5) | | |
| 6 | 106.4727 | 3.00 | 1.80518 | 25.42 |
| 7 | 73.6259 | 9.83 | 1.58313 | 59.37 |
| 8 | 674.9651 | (d8) | | |
| 9 | 2472.3901 | 2.20 | 1.83481 | 42.71 |
| 10 | 67.6264 | 3.00 | | |
| 11 | −183.1924 | 1.85 | 1.75500 | 52.32 |
| 12 | 31.2861 | 6.00 | 1.80810 | 22.76 |
| 13 | −2862.1527 | 1.68 | | |
| 14 | −87.2211 | 1.85 | 1.81600 | 46.62 |
| 15 | 85.7575 | (d15) | | |
| 16 | 77.5257 | 4.24 | 1.75500 | 52.32 |
| 17 | −164.3998 | 0.20 | | |
| 18 | 40.0875 | 6.52 | 1.60300 | 65.44 |
| 19 | −166.4363 | 2.20 | 1.84666 | 23.78 |
| 20 | 69.9213 | 0.10 | | |
| 21 | 60.7205 | 3.40 | 1.51633 | 64.14 |
| 22 | 769.1576 | (d22) | | |
| 23 | 149.9171 | 2.20 | 1.83400 | 37.16 |
| 24 | 66.3034 | 1.53 | | |
| 25 | −529.1770 | 2.00 | 1.81600 | 46.62 |
| 26 | 32.1799 | 2.82 | 1.84666 | 23.78 |
| 27 | 95.4511 | 4.13 | | |
| 28 | 0.0000 | (d28) | (aperture stop S) | |
| *29 | 19.8265 | 4.00 | 1.51633 | 64.07 |
| 30 | 48.1949 | 2.77 | | |
| 31 | 29.7430 | 1.50 | 1.84666 | 23.78 |
| 32 | 19.4599 | 1.80 | | |
| 33 | 28.8462 | 5.26 | 1.48749 | 70.23 |
| 34 | −82.8179 | (d34) | | |
| 35 | −25.8437 | 1.40 | 1.88300 | 40.76 |
| 36 | 29.8779 | 5.17 | 1.78470 | 26.29 |
| 37 | −58.1205 | (Bf) | | |

[Each group focal length data]

| Group | First surface | Focal length |
|---|---|---|
| G1 | 1 | 103.0673 |
| G2 | 9 | −28.0635 |
| G3 | 16 | 41.4638 |
| G4 | 23 | −60.2261 |
| G5 | 29 | 43.3436 |
| G6 | 35 | −44.9879 |

In Example 26, the twenty ninth lens surface is aspherical. Table 127 shows the [Aspherical data].

TABLE 127

[Aspherical data]
Twenty ninth surface

| R | κ | $C_4$ | $C_6$ | $C_8$ | $C_{10}$ |
|---|---|---|---|---|---|
| 19.8265 | +1.4673 | $-1.1806 \times 10^{-5}$ | $-4.5495 \times 10^{-8}$ | $+1.0109 \times 10^{-10}$ | $-1.1488 \times 10^{-12}$ |

In Example 26, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d34 between the fifth lens group G5 and the sixth lens group G6, and the back focus Bf, change upon zooming. Table 128 shows the [Variable distance data].

TABLE 128

| [Variable distance data] | | | |
|---|---|---|---|
| | Wide-angle end | intermediate focal length | telephoto end |
| d5 | 13.9248 | 13.9248 | 13.9248 |
| d8 | 8.6086 | 22.4610 | 27.3273 |
| d15 | 43.0646 | 23.0621 | 2.0000 |
| d22 | 2.0000 | 8.1501 | 24.3459 |
| d28 | 17.5925 | 13.0574 | 2.0000 |
| d34 | 8.4008 | 6.9073 | 3.3522 |
| Bf | 54.9999 | 61.0284 | 75.6409 |

Table 129 shows the [Focusing lens group shift distance] in Example 26.

TABLE 129

| [Focusing lens group shift distance] | | | |
|---|---|---|---|
| | Wide-angle end | intermediate focal length | telephoto end |
| f | 101.9999 | 199.9996 | 391.9991 |
| Δ1b | 11.9248 | 11.9248 | 11.9248 |

Table 130 shows the [Conditional expression correspondence value] in Example 26.

TABLE 130

| [Conditional expression correspondence value] |
|---|
| TL = 247.4999 |
| ft = 391.9991 |
| f1b = 266.2590 |
| f2 = −28.0635 |
| f4 = −60.2261 |
| f5 = 43.3436 |
| (13) TL/ft = 0.6314 |
| (14) ft/f1b = 1.4722 |
| (15) TL/f1b = 0.9295 |
| (16) \|f2/f4\| = 0.4660 |
| (17) \|f2/f5\| = 0.6475 |

Figure 91A:
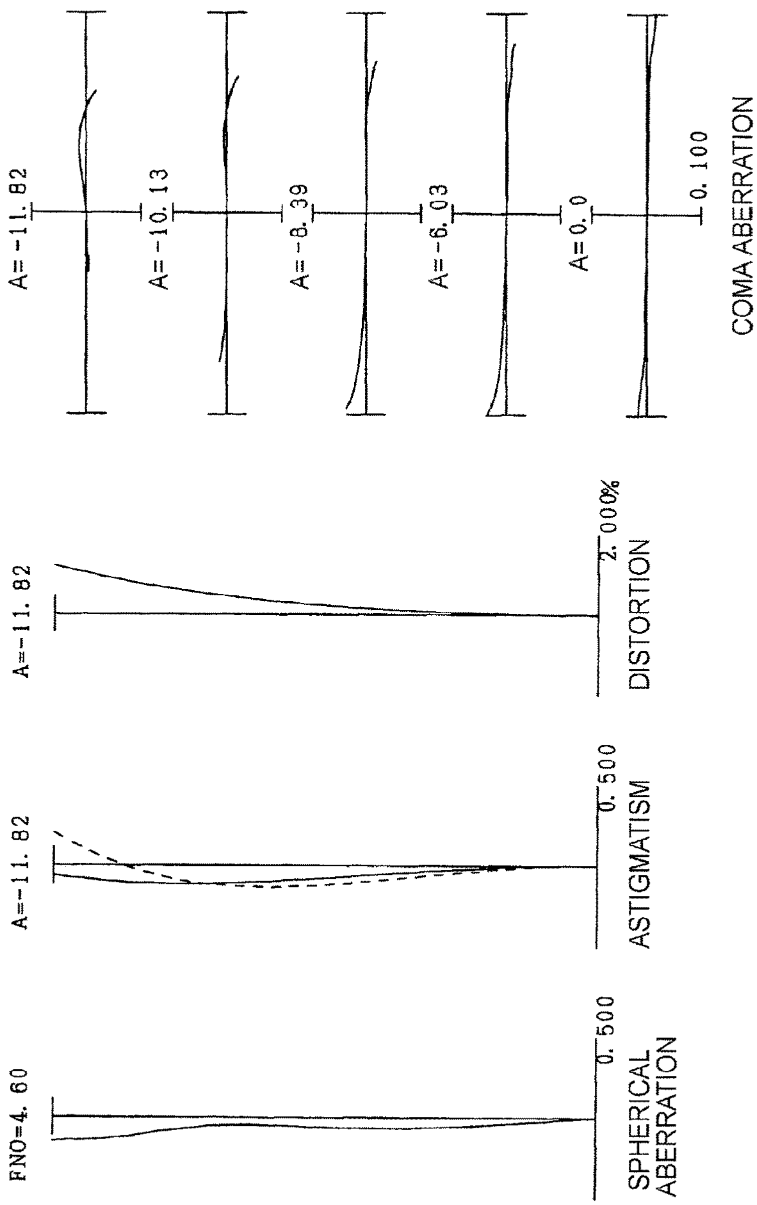
FIG. 91A shows the wide angle end state.
Figure 91B:
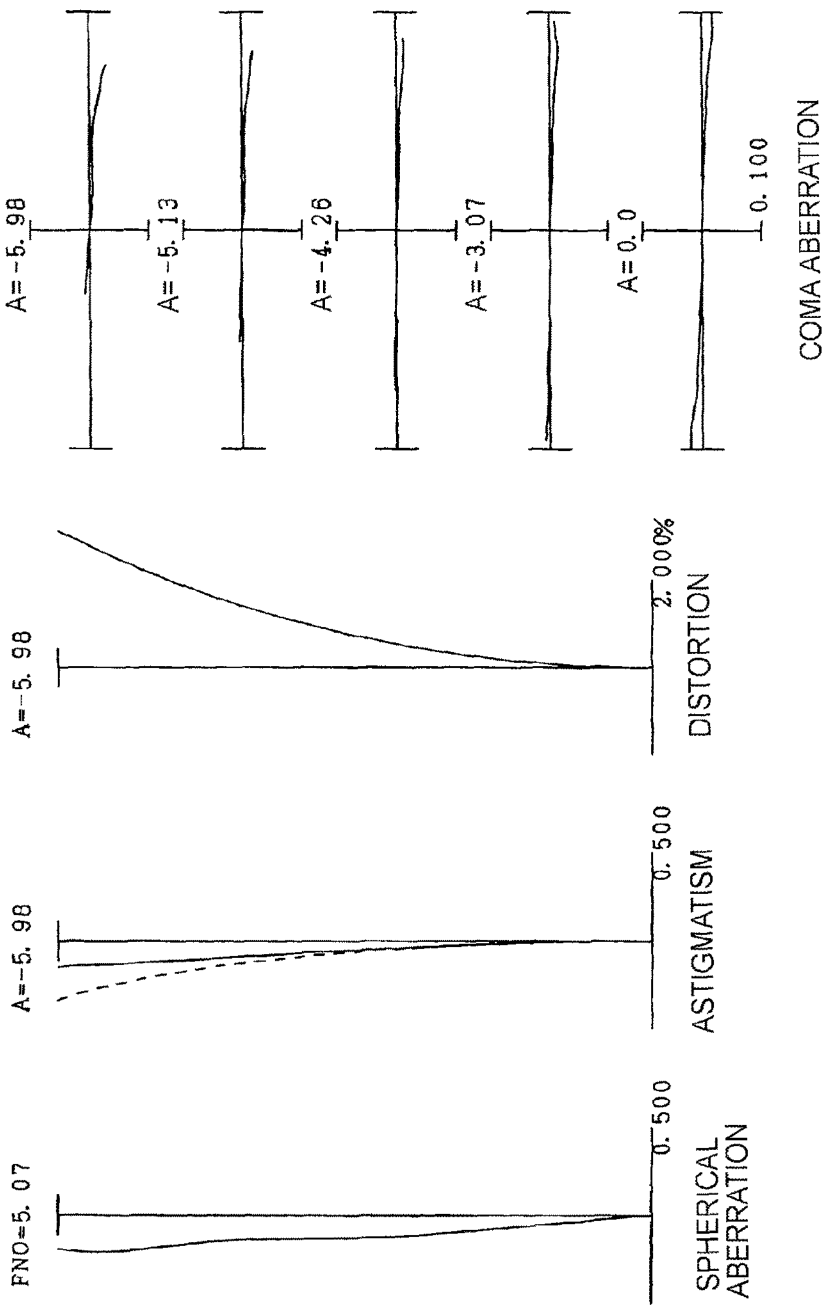
FIG. 91B shows the intermediate focal length state.
Figure 91C:
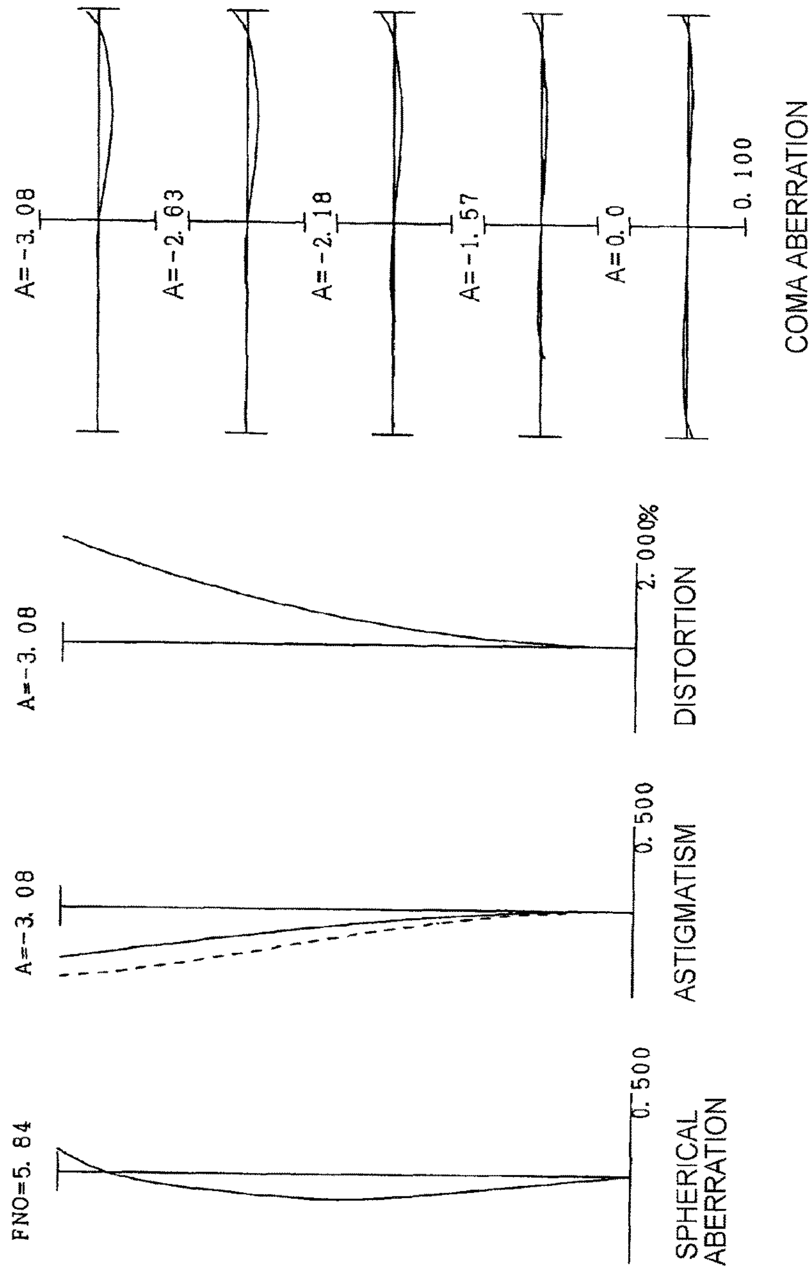
FIG. 91C shows the telephoto end state.
Figure 92A:
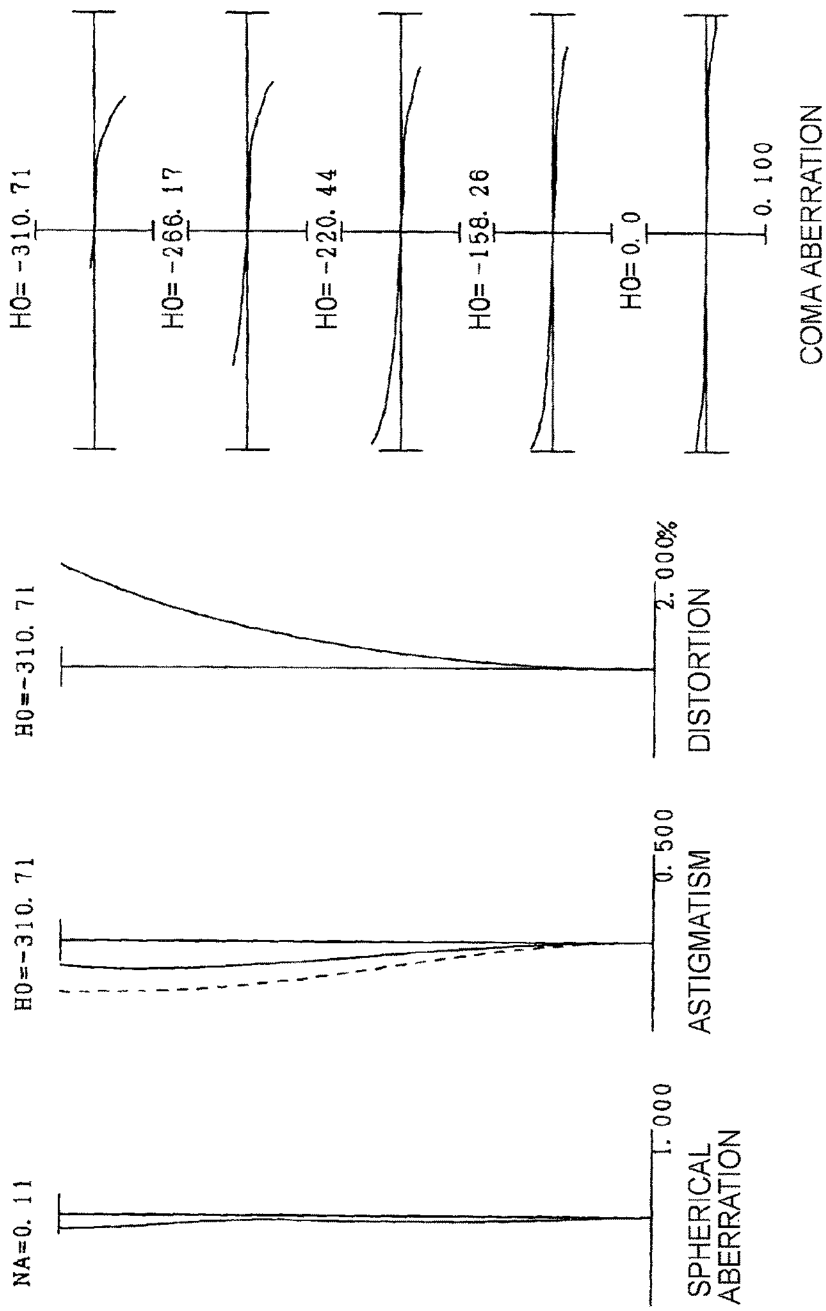
FIG. 92A shows the wide angle end state.
Figure 92B:
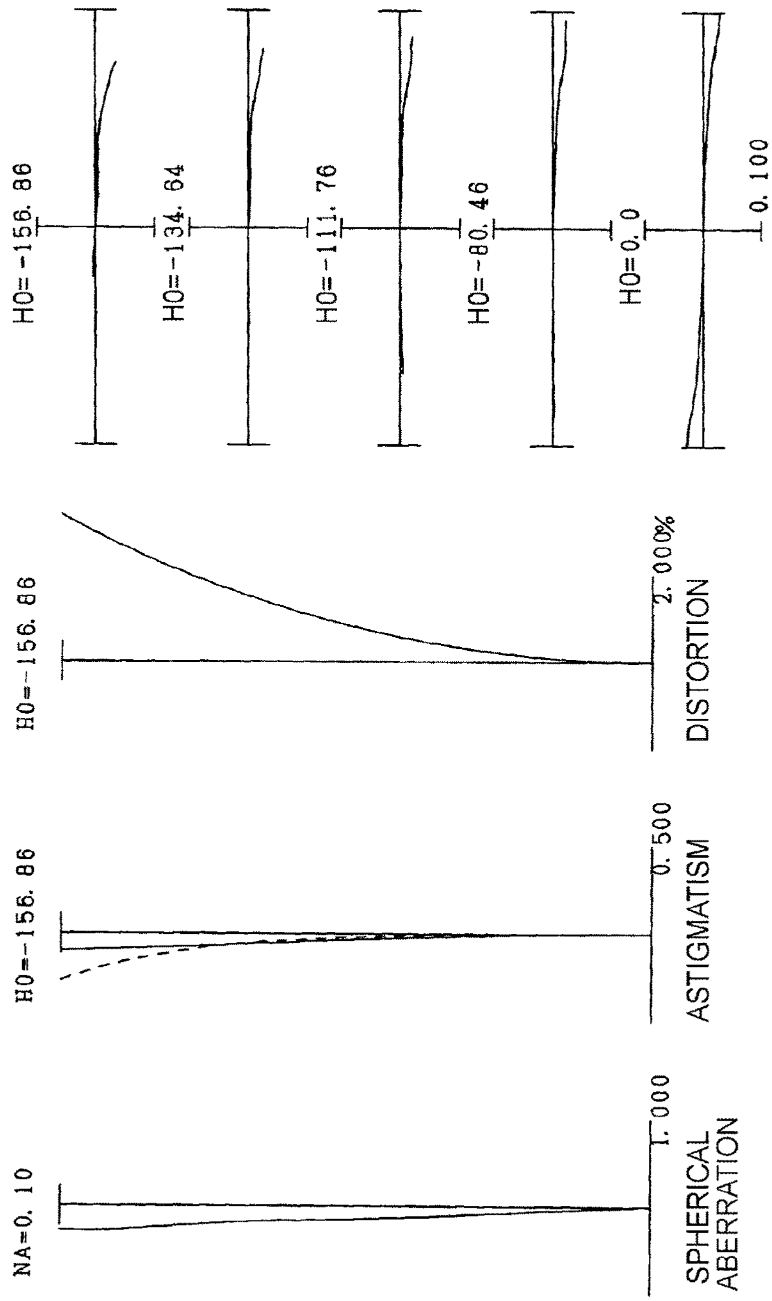
FIG. 92B shows the intermediate focal length state.
Figure 92C:
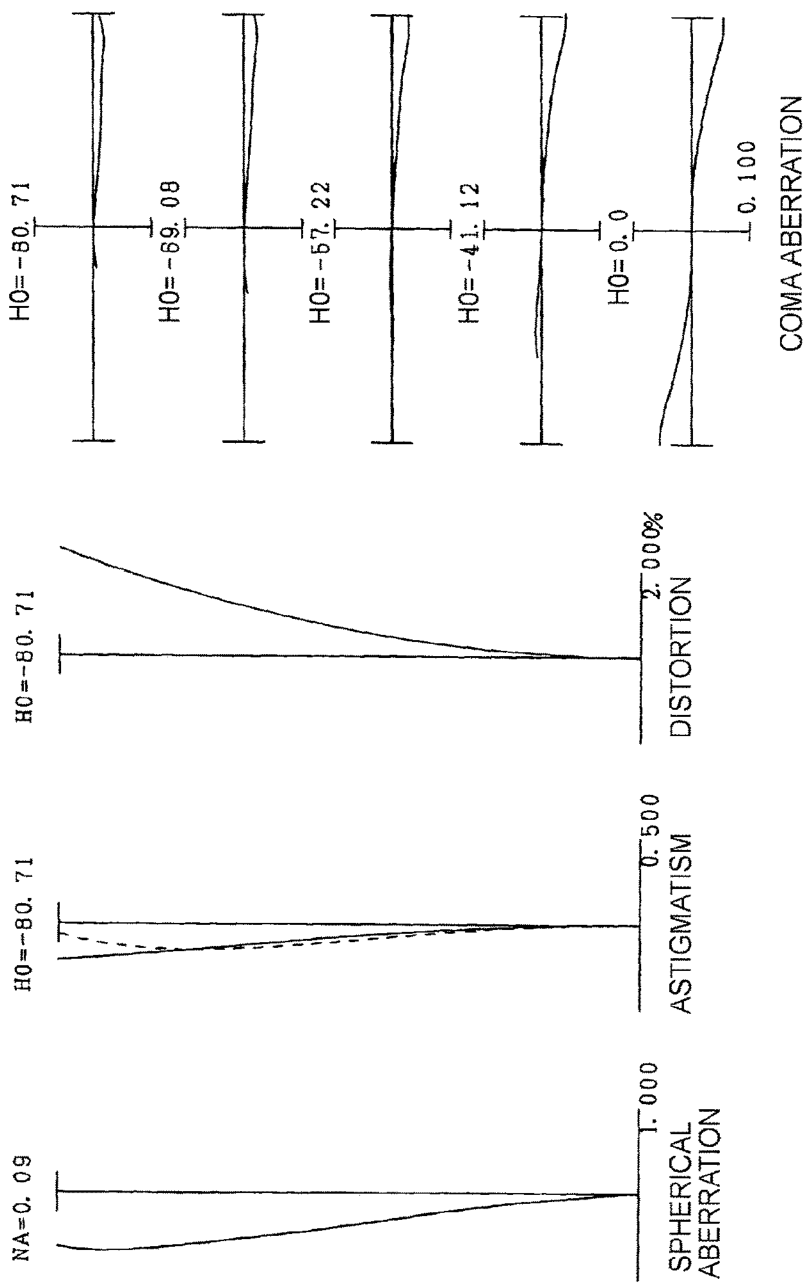
FIG. 92C shows the telephoto end state.

FIG. 91 and FIG. 92 are graphs showing various aberrations of Example 26 at d-line (wavelength: 587.6 nm). In other words, FIG. 91A are graphs showing various aberrations upon focusing on infinity in the wide angle end state (f=102.00 mm), FIG. 91B are graphs showing various aberrations upon focusing on infinity in the intermediate focal length state (f=200.00 mm), and FIG. 91C are graphs showing various aberrations upon focusing on infinity in the telephoto end state (f=392.00 mm). FIG. 92A are graphs showing various aberrations upon close distance focusing (photographic distance: 1.8 m) in the wide angle end state (f=102.00 mm), FIG. 92B are graphs showing various aberrations upon close distance focusing (photographic distance: 1.8 m) in the intermediate focal length state (f=200.00 mm), and FIG. 92C are graphs showing various aberrations upon close distance focusing (photographic distance: 1.8 m) in the telephoto end state (f=392.00 mm).

As each graph showing aberrations indicates, according to Example 26, various aberrations are corrected well in each focal length state, from the wide angle end state to the telephoto end state, implementing excellent image forming performance.

Example 27

Figure 93:
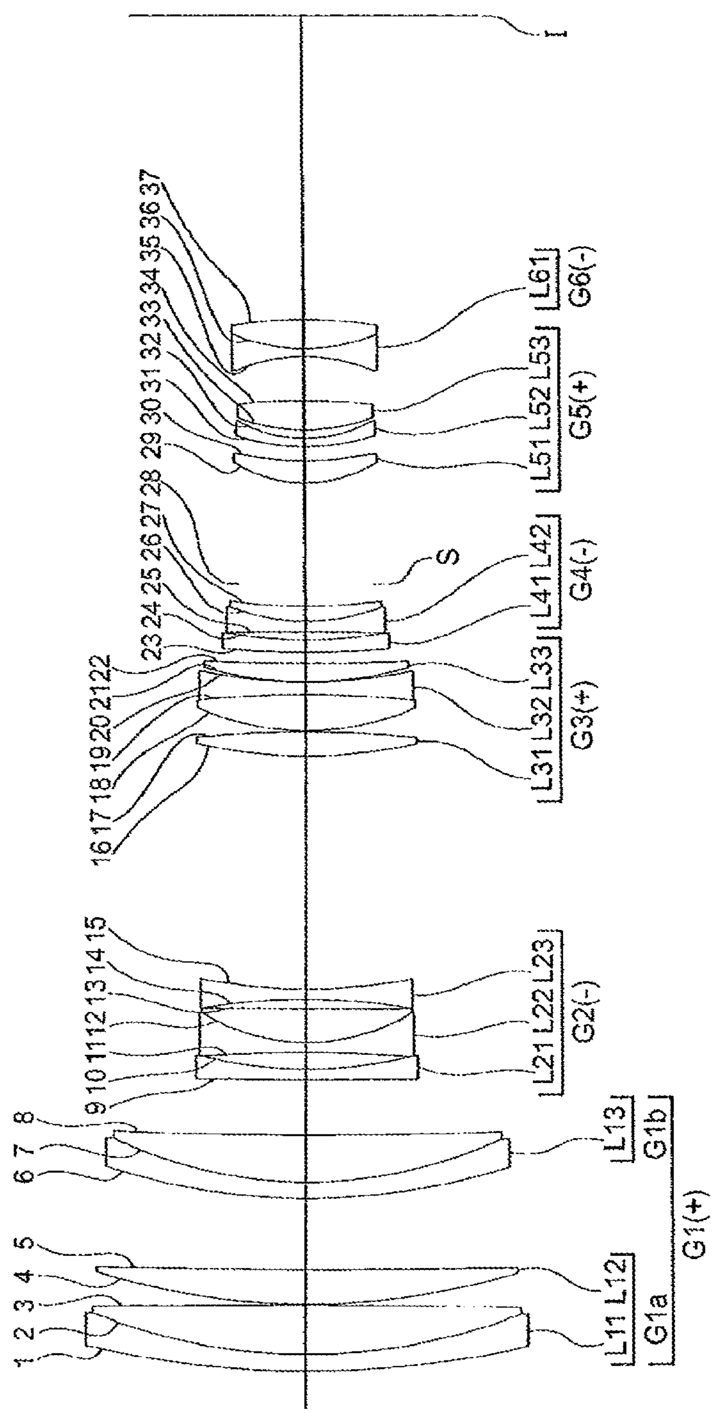
FIG. 93 is a diagram depicting a configuration of a lens system according to Example 27.

Example 27 will now be described with reference to FIG. 93 to FIG. 95 and Table 131 to Table 135. FIG. 93 is a diagram depicting a configuration of a lens system according to Example 27. As FIG. 93 shows, in the lens system according to Example 27, the first lens group G1 has, in order from the object, a front portion lens group G1*a* and a rear portion lens group G1*b*. The front portion lens group G1*a* has, in order from the object, a cemented positive lens L11 in which a negative meniscus lens having a convex surface facing the object and a biconvex lens are cemented, and a positive meniscus lens L12 having a convex surface facing the object. The rear portion lens group G1*b* has, in order from the object, a cemented positive lens L13 in which a negative meniscus lens having a convex surface facing the object and a positive meniscus lens having a convex surface facing the object are cemented.

The second lens group G2 has, in order from the object, a negative meniscus lens L21 having a convex surface facing the object, a cemented negative lens L22 in which a biconcave lens and a positive meniscus lens having a convex surface facing the object are cemented, and a biconcave lens L23.

The third lens group G3 has, in order from the object, a biconvex lens L31, a cemented positive lens L32 in which a biconvex lens and a biconcave lens are cemented, and a positive meniscus lens L33 having a convex surface facing the object.

The fourth lens group G4 has, in order from the object, a negative meniscus lens L41 having a convex surface facing the object, and a cemented negative lens L42 in which a biconcave lens and a positive meniscus lens having a convex surface facing the object are cemented.

The fifth lens group G5 has, in order from the object, a positive meniscus lens L51 having a convex surface facing the object, a negative meniscus lens L52 having a convex surface facing the object, and a biconvex lens L53.

The sixth lens group G6 has, in order from the object, a cemented negative lens L61 in which a biconcave lens and a biconvex lens are cemented.

The aperture stop S is disposed closest to the image in the fourth lens group G4, and is fixed with respect to the image plane I upon zooming from the wide angle end state to the telephoto end state.

Parameter values of Example 131 are shown in Table 27.

TABLE 131

| [All parameters] | | | | | |
|---|---|---|---|---|---|
| | Wide-angle end | | intermediate focal length | | telephoto end |
| f | 102.00 | ~ | 200.00 | ~ | 392.00 |
| FNO | 4.60 | ~ | 5.08 | ~ | 5.84 |
| 2ω | 23.59 | ~ | 11.96 | ~ | 6.15 |
| Image Height | 21.60 | ~ | 21.60 | ~ | 21.60 |
| Total lens Length | 245.00 | ~ | 245.00 | ~ | 245.00 |

| [Lens data] | | | | |
|---|---|---|---|---|
| Surface Number | r | d | nd | νd |
| 1 | 150.0974 | 3.00 | 1.83400 | 37.16 |
| 2 | 88.7906 | 8.81 | 1.49782 | 82.52 |
| 3 | −1897.9477 | 0.20 | | |
| 4 | 109.7739 | 6.16 | 1.49782 | 82.52 |

TABLE 131-continued

| | | | | |
|---|---|---|---|---|
| 5 | 1534.5032 | (d5) | | |
| 6 | 100.8820 | 3.00 | 1.80518 | 25.42 |
| 7 | 69.0231 | 8.50 | 1.58313 | 59.37 |
| 8 | 809.7480 | (d8) | | |
| 9 | 2057.5735 | 1.85 | 1.83481 | 42.71 |
| 10 | 63.9258 | 3.03 | | |
| 11 | −209.9404 | 1.85 | 1.75500 | 52.32 |
| 12 | 30.4507 | 6.02 | 1.80810 | 22.76 |
| 13 | 299633.870 | 1.74 | | |
| 14 | −85.9912 | 1.85 | 1.81600 | 46.62 |
| 15 | 83.9562 | (d15) | | |
| 16 | 73.8023 | 4.33 | 1.75500 | 52.32 |
| 17 | −167.1480 | 0.20 | | |
| 18 | 40.5216 | 6.55 | 1.60300 | 65.44 |
| 19 | −157.6365 | 2.20 | 1.84666 | 23.78 |
| 20 | 70.6375 | 0.10 | | |
| 21 | 55.0698 | 3.40 | 1.51633 | 64.14 |
| 22 | 362.9926 | (d22) | | |
| 23 | 152.1651 | 2.20 | 1.83481 | 42.71 |
| 24 | 69.6876 | 1.40 | | |
| 25 | −1113.5306 | 2.00 | 1.81600 | 46.62 |
| 26 | 32.2728 | 2.70 | 1.84666 | 23.78 |
| 27 | 82.7284 | 4.13 | | |
| 28 | 0.0000 | (d28) | (aperture stop S) | |
| *29 | 20.0473 | 4.00 | 1.51633 | 64.07 |
| 30 | 49.2102 | 2.50 | | |
| 31 | 32.6167 | 1.50 | 1.84666 | 23.78 |
| 32 | 20.1997 | 1.56 | | |
| 33 | 28.4080 | 5.35 | 1.51633 | 64.14 |
| 34 | −81.0924 | (d34) | | |
| 35 | −25.7651 | 1.40 | 1.88300 | 40.76 |
| 36 | 27.5076 | 5.32 | 1.78470 | 26.29 |
| 37 | −60.6825 | (Bf) | | |

[Each group focal length data]

| Group | First surface | Focal length |
|---|---|---|
| G1 | 1 | 101.5470 |
| G2 | 9 | −27.4148 |
| G3 | 16 | 40.7536 |
| G4 | 23 | −60.1647 |
| G5 | 29 | 42.2802 |
| G6 | 35 | −43.0800 |

In Example 27, the twenty ninth lens surface is aspherical. Table 132 shows the [Aspherical data].

TABLE 132

[Aspherical data]
Twenty ninth surface

| R | κ | $C_4$ | $C_6$ | $C_8$ | $C_{10}$ |
|---|---|---|---|---|---|
| 20.0473 | +1.5471 | $-1.2472 \times 10^{-5}$ | $-4.9721 \times 10^{-8}$ | $+1.2183 \times 10^{-10}$ | $-1.3351 \times 10^{-12}$ |

In Example 27, the axial air distance d5 between the front portion lens group G1*a* and the rear portion lens group G1*b*, the axial air distance d8 between the first lens group G1 and the second lens group G2, the axial air distance d15 between the second lens group G2 and the third lens group G3, the axial air distance d22 between the third lens group G3 and the fourth lens group G4, the axial air distance d28 between the fourth lens group G4 and the fifth lens group G5, the axial air distance d34 between the fifth lens group G5 and the sixth lens group G6, and the back focus Bf, change upon zooming. Table 133 shows the [Variable distance data].

TABLE 133

[Variable distance data]

| | Wide-angle end | intermediate focal length | telephoto end |
|---|---|---|---|
| d5 | 12.8128 | 12.8128 | 12.8128 |
| d8 | 9.9834 | 23.5730 | 28.4394 |
| d15 | 42.1167 | 22.6048 | 2.0000 |
| d22 | 2.0000 | 7.9223 | 23.6607 |
| d28 | 18.2972 | 13.3974 | 2.0000 |
| d34 | 7.9570 | 6.6089 | 3.3265 |
| Bf | 54.9999 | 61.2478 | 75.9274 |

Table 134 shows the [Focusing lens group shift distance] in Example 27.

TABLE 134

[Focusing lens group shift distance]

| | Wide-angle end | intermediate focal length | telephoto end |
|---|---|---|---|
| f | 101.9999 | 199.9997 | 391.9986 |
| Δ1b | 10.8127 | 10.8127 | 10.8127 |

Table 135 shows the [Conditional expression correspondence value] in Example 27.

TABLE 135

[Conditional expression correspondence value]

TL = 244.9999
ft = 391.9986
f1b = 243.0148
f2 = −27.41475
f4 = −60.1647
f5 = 42.2802
(13) TL/ft = 0.6250
(14) ft/f1b = 1.6131
(15) TL/f1b = 1.0082
(16) |f2/f4| = 0.4557
(17) |f2/f5| = 0.6484

Figure 94A:
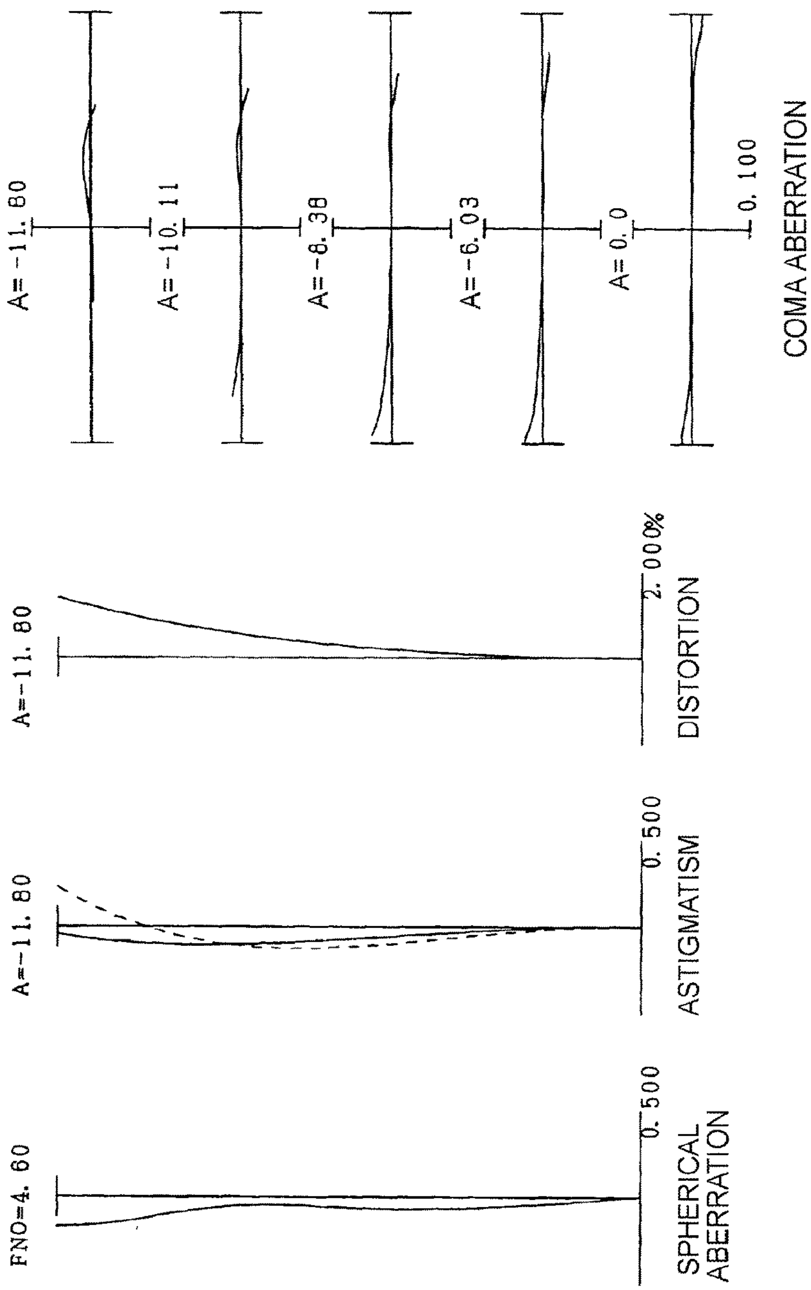
FIG. 94A shows the wide angle end state.
Figure 94B:
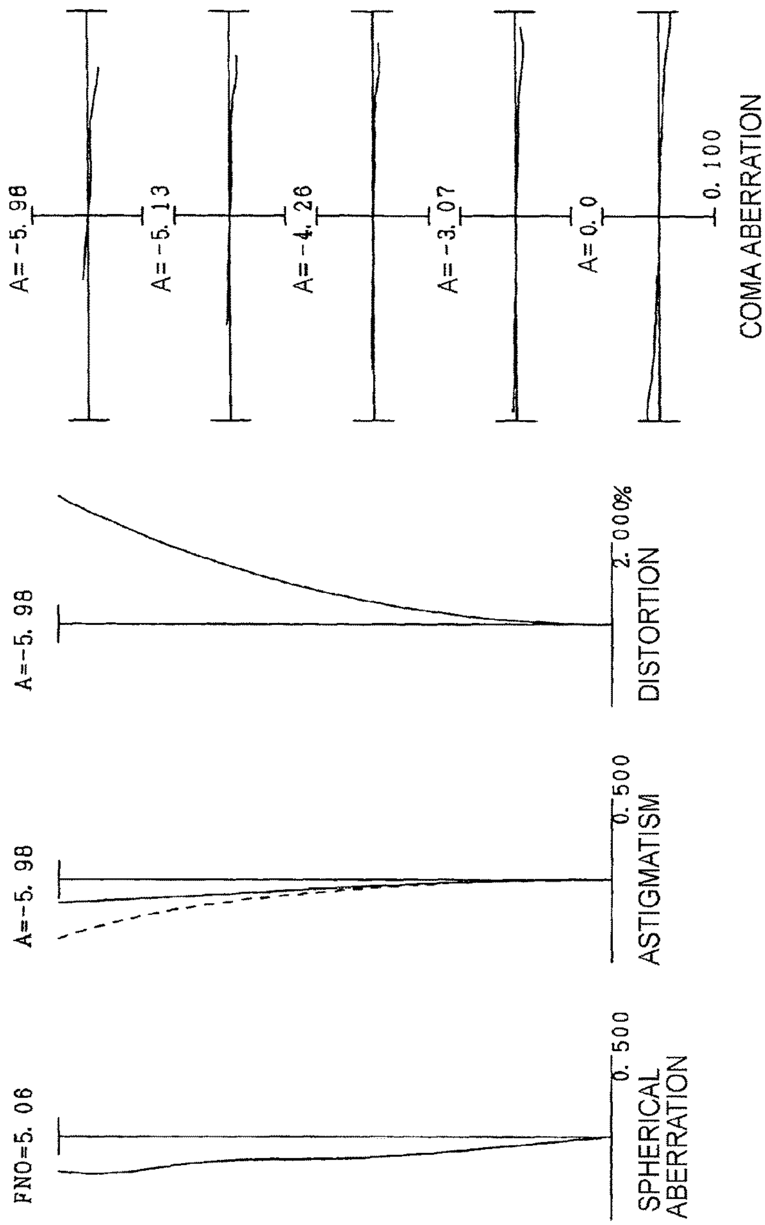
FIG. 94B shows the intermediate focal length state.
Figure 94C:
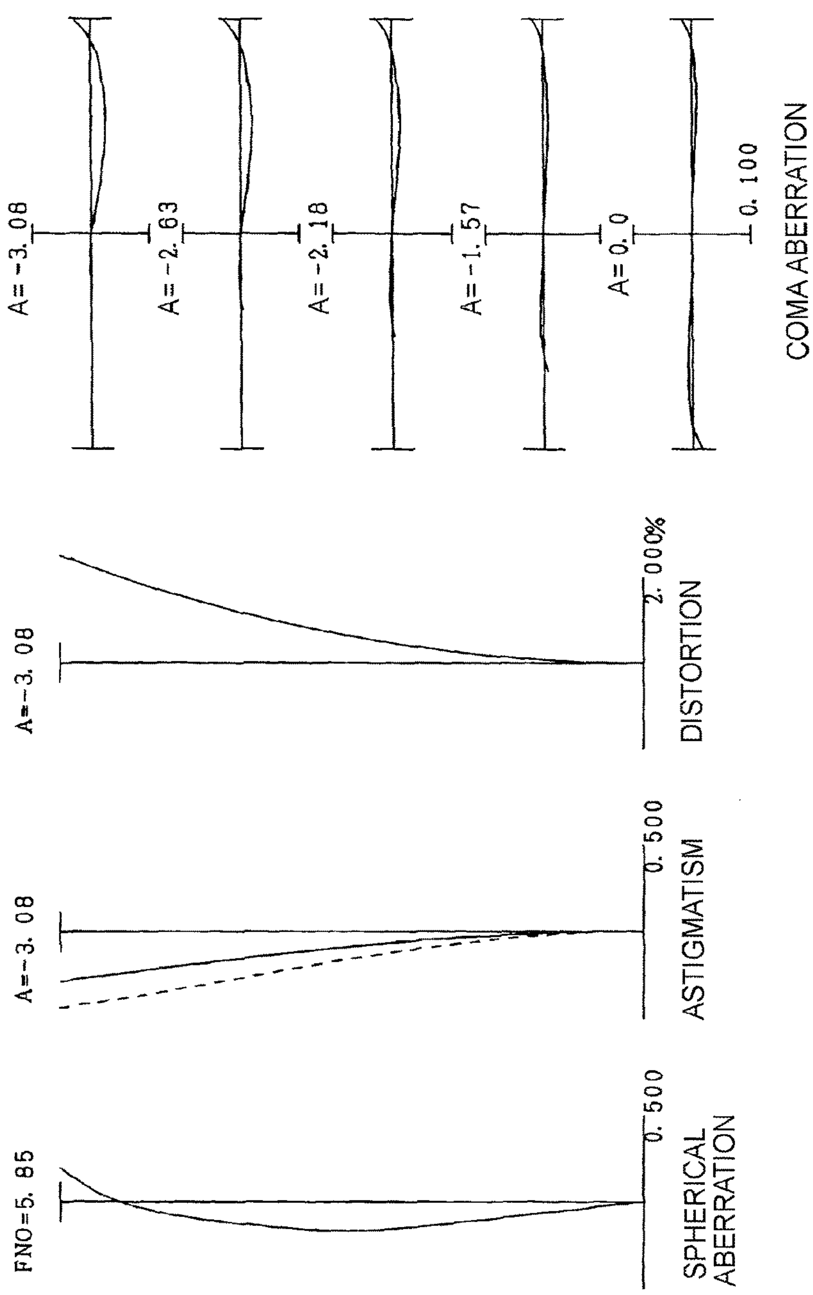
FIG. 94C shows the telephoto end state.
Figure 95A:
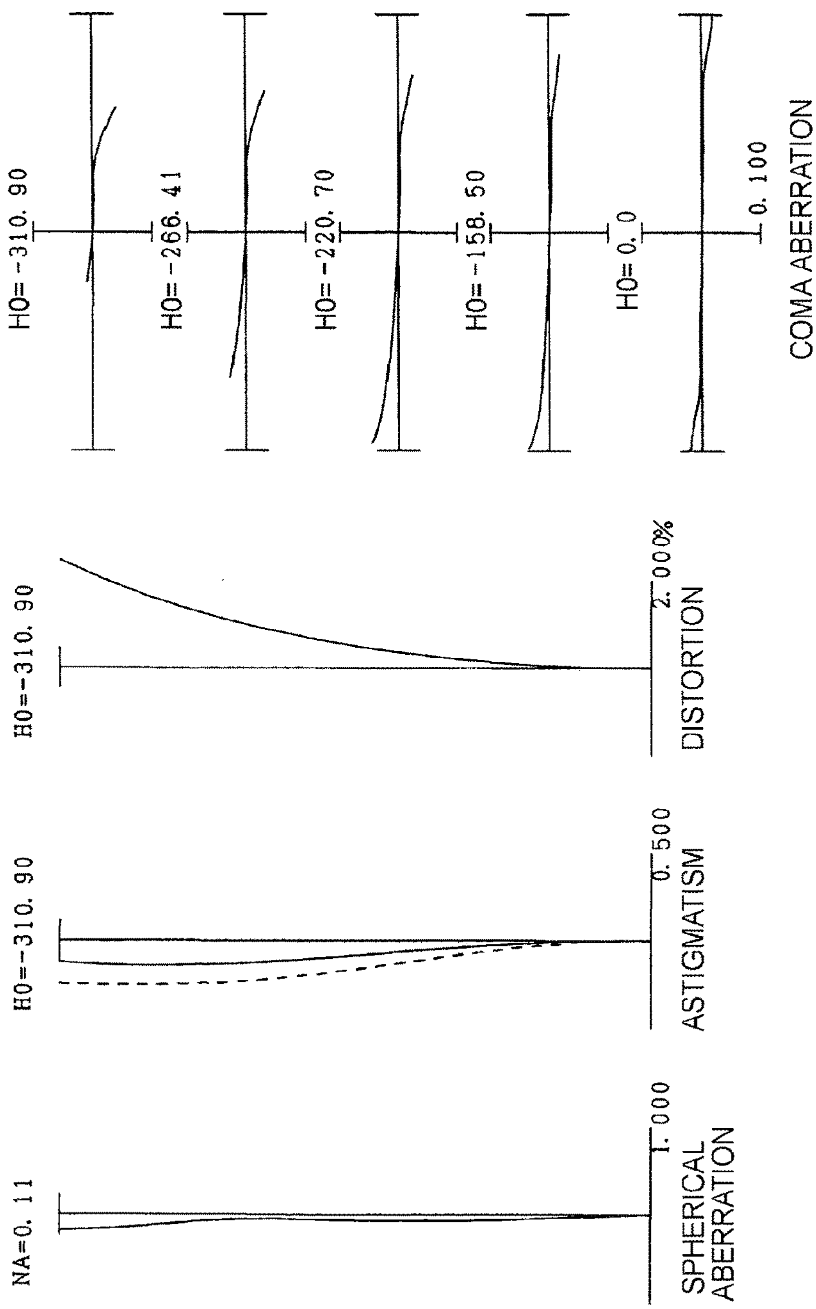
FIG. 95A shows the wide angle end state.
Figure 95B:
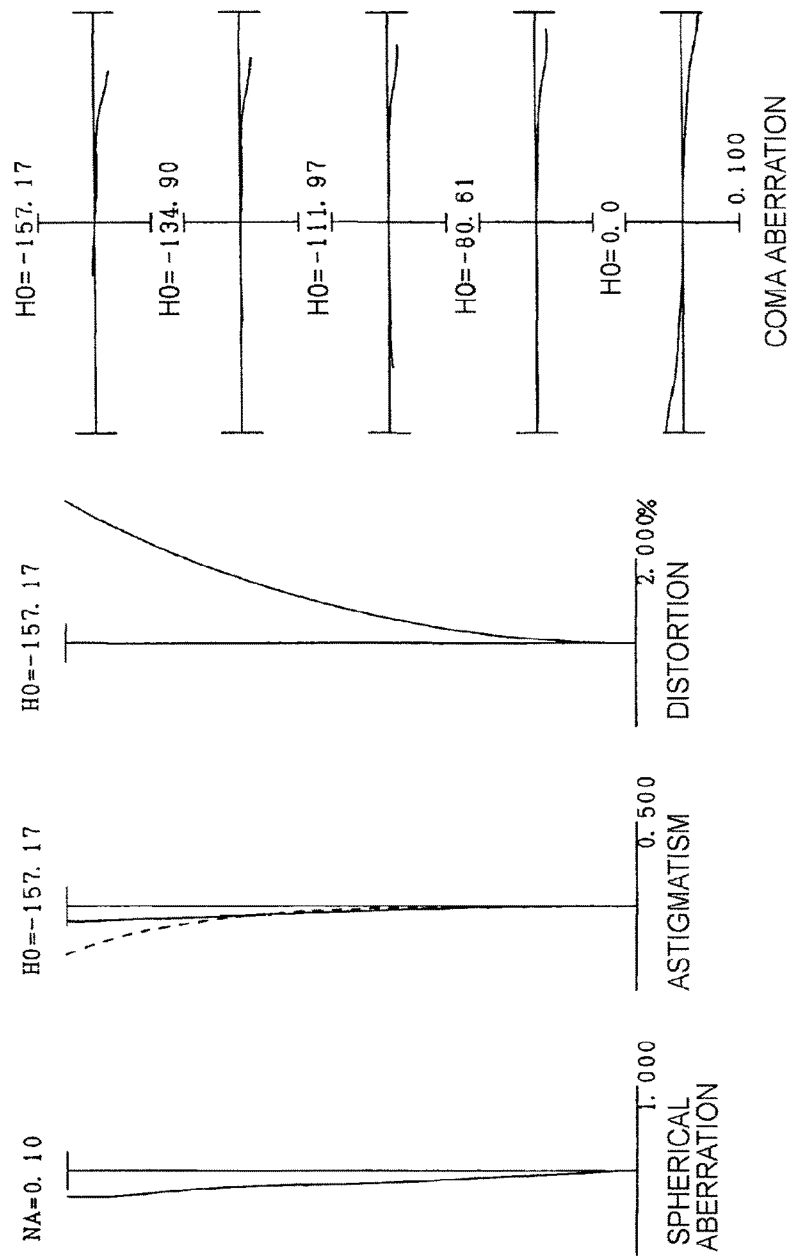
FIG. 95B shows the intermediate focal length state.
Figure 95C:
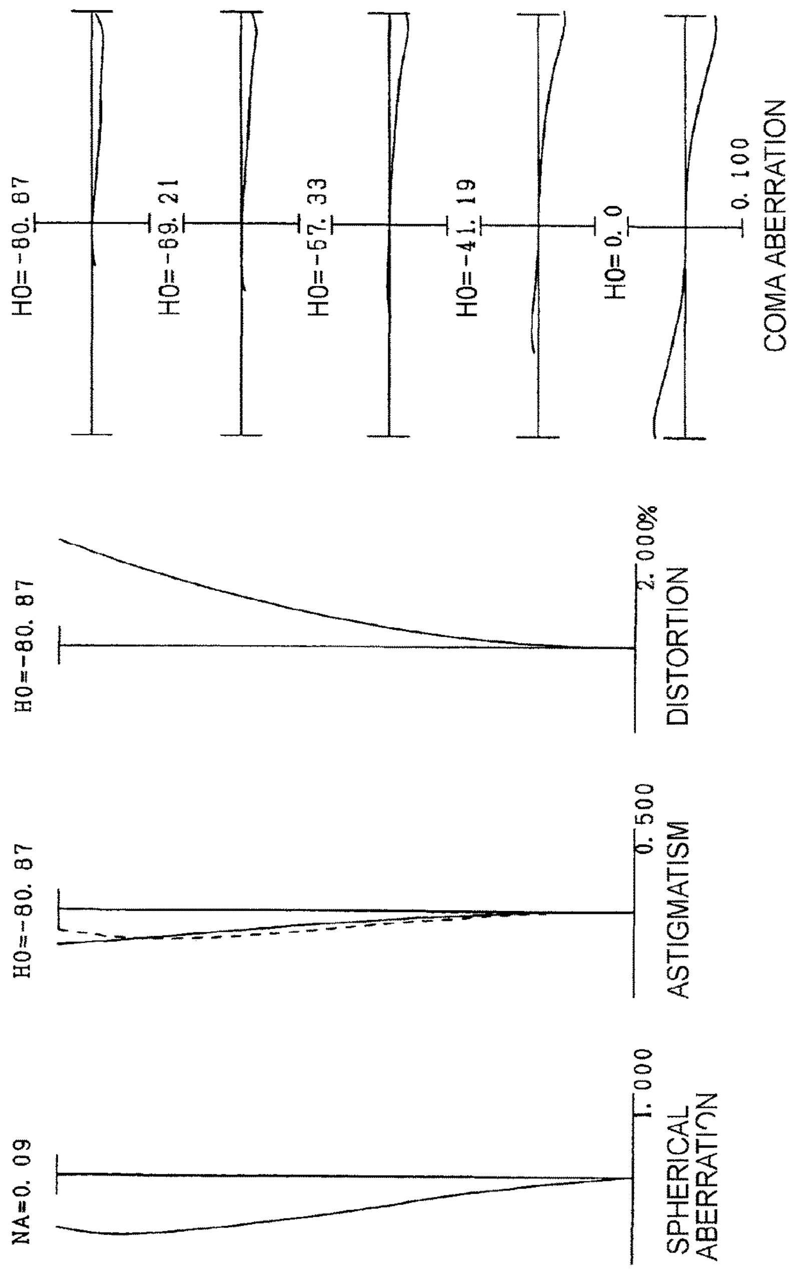
FIG. 95C shows the telephoto end state.

FIG. 94 and FIG. 95 are graphs showing various aberrations of Example 27 at d-line (wavelength: 587.6 nm). In other words, FIG. 94A are graphs showing various aberrations upon focusing on infinity in the wide angle end state (f=102.00 mm), FIG. 94B are graphs showing various aberrations upon focusing on infinity in the intermediate focal length state (f=200.00 mm), and FIG. 94C are graphs showing various aberrations upon focusing on infinity in the telephoto end state (f=392.00 mm). FIG. 95A are graphs showing various aberrations upon close distance focusing (photographic distance: 1.8 m) in the wide angle end state (f=102.00 mm), FIG. 95B are graphs showing various aberrations upon close distance focusing (photographic distance: 1.8 m) in the intermediate focal length state (f=200.00 mm), and FIG. 95C are graphs showing various aberrations upon close distance focusing (photographic distance: 1.8 m) in the telephoto end state (f=392.00 mm).

As each graph showing aberrations indicates, according to Example 27, various aberrations are corrected well in each focal length state, from the wide angle end state to the telephoto end state, implementing excellent image forming performance.

Now a manufacturing method for the lens system with the above configuration will be described with reference to FIG. 97 to FIG. 100.

Figure 97:
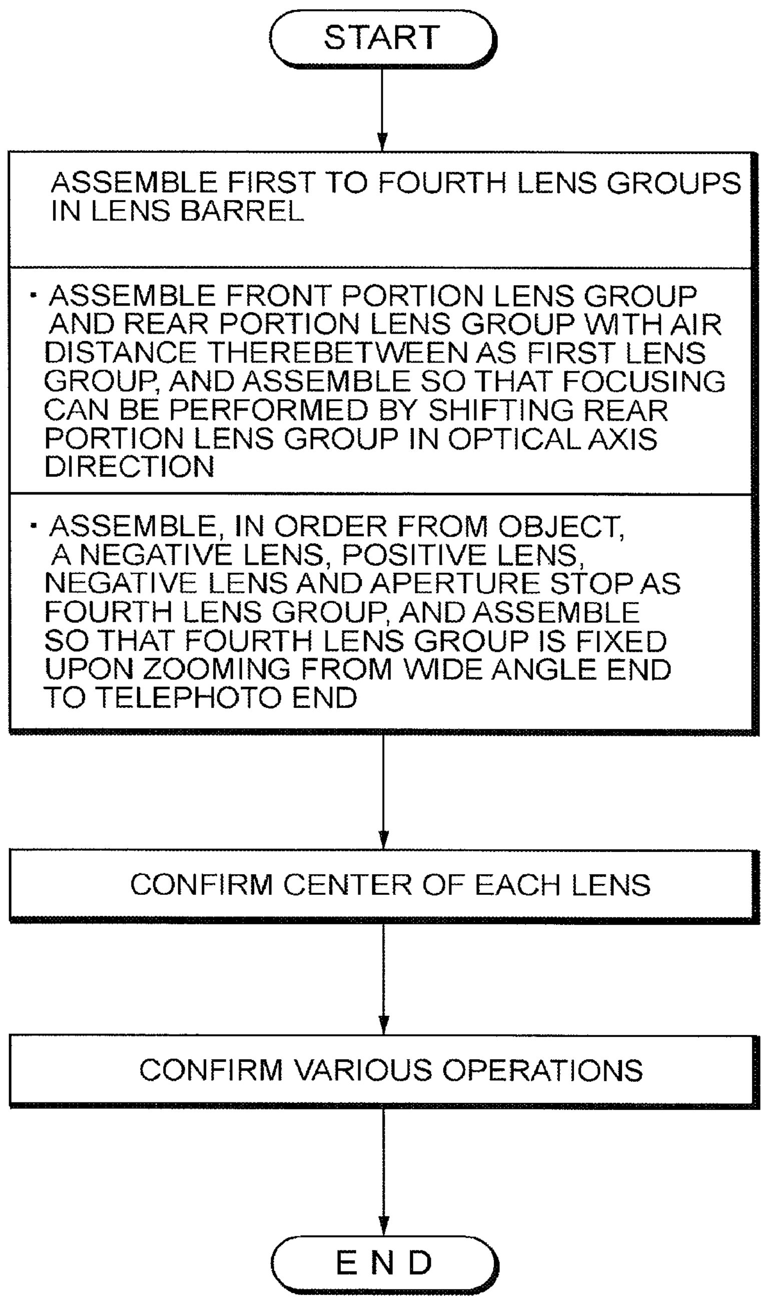
FIG. 97 is a flow chart depicting a manufacturing method for a lens system according to the first embodiment group.

First a manufacturing method for the lens system according to the first embodiment group will be described with reference to FIG. 97. According to this manufacturing method, the first to the fourth lens groups are assembled in a cylindrical lens barrel. The first lens group has positive refractive power. In this assembly step, the front portion lens group and the rear portion lens group are assembled with an air distance therebetween as the first lens group, such that focusing can be performed by shifting the rear portion lens group in the optical axis direction. The fourth lens group has, in order from the object, a negative lens, a positive lens, a negative lens and an aperture stop, and each lens is assembled in the lens barrel so that the fourth lens group is fixed in the optical axis direction with respect to the image plane upon zooming from the wide angle end state to the telephoto end state. After confirming whether the center of each lens is aligned, various operations are checked.

Figure 98:
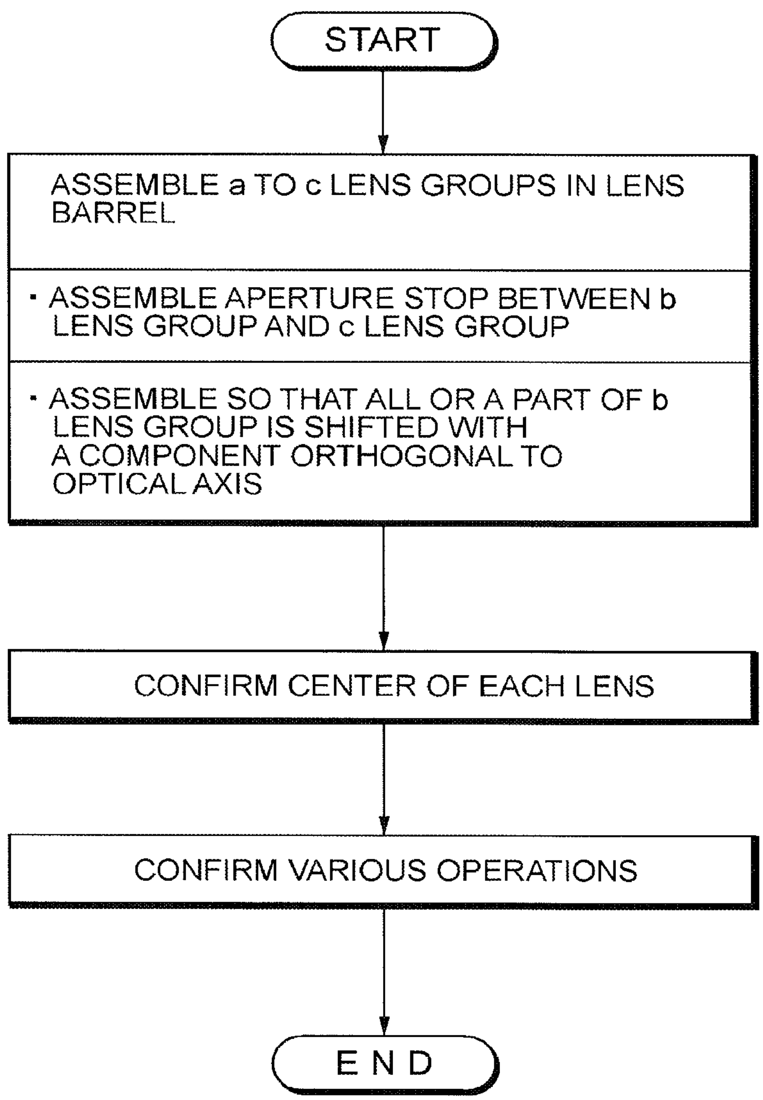
FIG. 98 is a flow chart depicting a manufacturing method for a lens system according to the second embodiment group.

Now a manufacturing method for the lens system according to the second embodiment group will be described with reference to FIG. 98. According to this manufacturing method, the a to c4 lens groups are assembled in a cylindrical lens barrel. In this assembly step, the aperture stop is assembled between the "b" lens group and the "c" lens group, so that a portion or all of the "b" lens group shifts with a component orthogonal to the optical axis. After confirming whether the center of each lens is aligned, various operations are checked.

Figure 99:
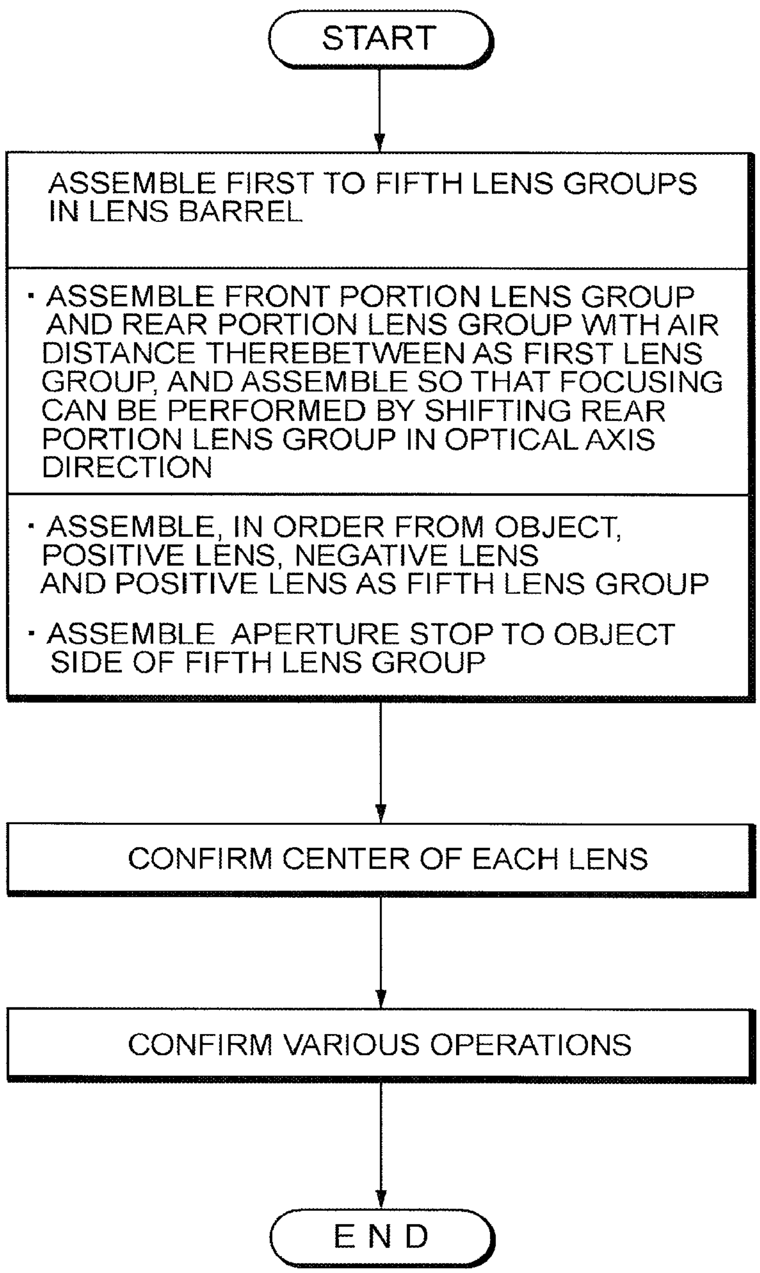
FIG. 99 is a flow chart depicting a manufacturing method for a lens system according to the third embodiment group.

Now a manufacturing method for the lens system according to the third embodiment group will be described with reference to FIG. 99. First the first to the fifth lens groups are assembled in a cylindrical lens barrel. In this assembly step, the front portion lens group and the rear portion lens group are assembled with an air distance therebetween as the first lens group, such that focusing can be performed by shifting the rear portion lens group in the optical axis direction. Further, a positive lens, a negative lens and a positive lens, in order from the object, are assembled in the fifth lens group, and the aperture stop is assembled to the object side of the fifth lens group. After confirming whether the center of each lens is aligned, various operations are checked.

Figure 100:
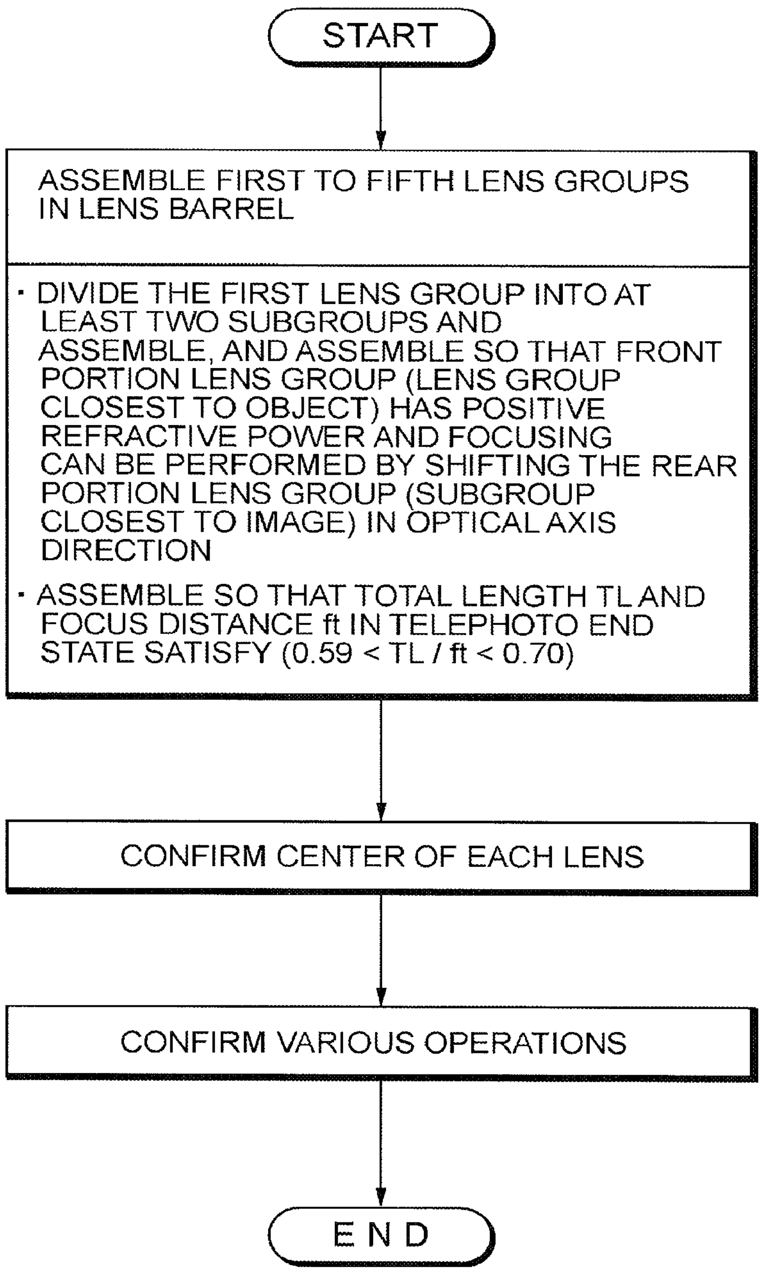
FIG. 100 is a flow chart depicting a manufacturing method for a lens system according to the fourth embodiment group.

Now the manufacturing method for the lens system according to the third embodiment group will be described with reference to FIG. 100. According to this manufacturing method, the first to the fifth lens groups are assembled in the cylindrical lens barrel first. In this assembly step, the first lens group is divided into at least two subgroups, in which the front portion lens group, that is, a subgroup disposed closest to the object, has positive refractive power, and is assembled so that focusing is performed by shifting the rear portion lens group, that is, a subgroup disposed closest to the image, in the optical axis direction. Further, each lens is assembled in the lens barrel so as to satisfy the conditional expression $0.59<TL/ft<0.70$, where TL denotes a total length of the lens system in the telephoto end state, and ft denotes a focal length of the total lens system in the telephoto end state. After confirming whether the center of each lens is aligned, various operations are checked.

In the above mentioned first to fourth embodiment groups, the following content can be used if necessary within a range where the optical performance is not diminished.

In the above examples, a six-lens group configuration was shown, but the present invention can be applied to another group configuration, such as a five-lens group or a seven-lens group. A configuration having an additional lens or a lens group which is disposed closest to the object, or a configuration having an additional lens or a lens group which is disposed closest to the image, can also be used. A lens group refers to a portion having at least one lens isolated by an air distance which changes upon zooming.

A focusing lens group, for focusing on an object from infinity to a close distance by shifting a single or a plurality of lens group(s), or a partial lens group in the optical axis direction, may be used. This focusing lens group can be applied to auto focus, and is also appropriate for driving a motor for auto focus (e.g. ultrasonic motor). It is particularly preferable to use the rear portion lens group G1*b* as the focusing lens group.

A lens group or a partial lens group may be constructed as a vibration proof lens group, which corrects image blur generated due to hand motion, by shifting the lens group or the partial lens group so as to have a component orthogonal to the optical axis, or rotating (oscillating) the lens or the partial lens group in the plane direction including the optical axis. It is particularly desirable to construct at least a part of the fourth lens group G4 as the vibration proof lens group.

Each lens surface can be spherical or a plane, or aspherical. If the lens surface is spherical or a plane, a lens can be easily processed, assembled or adjusted, and deterioration of optical performance due to errors in processing, assembly and adjustment can be prevented, which is desirable. Also even if the image plane is shifted, deterioration of writing performance is minor, which is desirable. If the lens surface is aspherical, this aspherical surface can be any of an aspherical surface generated by grinding, a glass mold aspherical surface in which glass is formed to be an aspherical shape using a die, or a composite type aspherical surface in which resin is formed in an aspherical shape on the surface of the glass. Each lens surface may be a diffraction surface, and each lens may be a refractive index distributed lens (GRIN lens) or a plastic lens.

It is preferable that the aperture stop S is disposed near the fourth lens group G4 (image side of the fourth lens group G4 in the present embodiment), but a lens frame may take over this part, without disposing an independent element as the aperture stop.

An anti-reflection film which has high transmittance in a wide wavelength range may be formed on each lens surface in order to decrease flares and ghosts, and to implement high optical performance with high contrast.

The zoom ratio of the lens system of the present embodiment is about 4 to 5, and the focal length thereof in the telephoto end state is 300 mm or more.

In the lens system of the present embodiment, it is preferable that the fourth lens group G4 has one positive lens component and two negative lens components. It is preferable to dispose the lens components in a sequence of negative, positive and negative, in order from the object, with an air distance therebetween.

Embodiments were described with configuration requirements, in order to assist in understanding the present invention, but needless to say, the present invention is not limited to these embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lens system comprising, in order from an object, an "a" lens group having positive refractive power, a "b" lens group having negative refractive power, and a "c" lens group having positive refractive power, an aperture stop being disposed between the "b" lens group and the "c" lens group, all or a part of the "b" lens group being shifted so as to have a component orthogonal to the optical axis, wherein the "b" lens group is fixed in an optical axis direction with respect to an image plane upon zooming from a wide angle end state to a telephoto end state, and wherein upon zooming from a wide angle end state to a telephoto end state, a distance between the "a" lens group and the "b" lens group varies and a distance between the "b" lens group and the "c" lens group varies, and the aperture stop is integrated with the "b" lens group, and further comprising a first lens group which is closest to the object and placed closer to the object than the "a", "b" and "c" lens groups, and is placed closest to the object among the lens groups of the lens system, the first lens group having positive refractive power, and a second lens group, which is the second lens group from the object side, has negative refractive power, and the following conditional expression is satisfied:

$$0.55<(-f2)/fc<1.00 \quad (5)$$

where f2 denotes a focal length of the second lens group, and fc denotes a focal length of the "c" lens group, wherein the first lens group includes a front portion lens group, and a rear portion lens group disposed to an image side of the front portion lens group with an air distance therebetween, and wherein the following conditional expression is satisfied:

$$1.30<ft/f1b<3.10$$

wherein ft denotes a focal length of the total lens system in the telephoto end state, and f1b denotes a focal length of the rear portion lens group of the first lens group.

2. The lens system according to claim 1, wherein the "b" lens group is a fourth lens group from the object side.

3. The lens system according to claim 1, wherein the following conditional expression is satisfied:

$$0.23<(-f2)/(-fb)<0.88$$

where f2 denotes a focal length of the second lens group, and fb denotes a focal length of the "b" lens group.

4. The lens system according to claim 1, wherein focusing can be performed by shifting only the rear portion lens group of the first lens group in the optical axis direction.

5. The lens system according to claim 1, wherein at least one of the rear portion lens group and the front portion lens group of the first lens group has positive refractive power.

6. The lens system according to claim 1, wherein the first lens group is fixed in the optical axis direction with respect to the image plane upon focusing on infinity in zooming from the wide angle end state to the telephoto end state.

7. The lens system according to claim 1, wherein the "a" lens group is a third lens group from the object side, the "b" lens group is a fourth lens group from the object side, the "c" lens group is a fifth lens group from the object side, and further comprising a sixth lens group from the object side having negative refractive power.

8. The lens system according to claim 1, wherein the following conditional expression is satisfied:

$$0.90<TL/f1b<2.48$$

where TL denotes a total length of the lens system in the telephoto end, and f1b denotes a focal length of the rear portion lens group of the first lens group.

9. An optical apparatus comprising a lens system for forming an image of an object on a predetermined image plane, the lens system being the lens system according to claim 1.

10. A manufacturing method for the lens system of claim 1 which comprises:

assembling each lens of the lens system in a lens barrel.

11. A lens system according to claim 1, wherein a total focus length is larger than 300 mm.

12. A lens system according to claim 1, wherein the number of lenses of the "a" group is more than the number of lenses of the "c" group.

13. A lens system according to claim 1, wherein the second additional expression is modified to be:

$$1.50<ft/f1b<3.10.$$

14. A lens system according to claim 1, wherein the second additional expression is modified to be:

$$1.70<ft/f1b<3.10.$$

15. A lens system comprising, in order from an object, an "a" lens group having positive refractive power, a "b" lens group having negative refractive power, and a "c" lens group having positive refractive power, an aperture stop being disposed between the "b" lens group and the "c" lens group, all or a part of the "b" lens group being shifted so as to have a component orthogonal to the optical axis, wherein the "b" lens group is fixed in an optical axis direction with respect to an image plane upon zooming from a wide angle end state to a telephoto end state, and wherein upon zooming from a wide angle end state to a telephoto end state, a distance between the "a" lens group and the "b" lens group varies and a distance between the "b" lens group and the "c" lens group varies, and the aperture stop is integrated with the "b" lens group, and further comprising a first lens group which is closest to the object and placed closer to the object than the "a", "b" and "c" lens groups, and is placed closest to the object among the lens groups of the lens system, the first lens group having positive refractive power, and a second lens group, which is the second lens group from the object side, has negative refractive power, and the following conditional expression is satisfied:

$$0.55<(-f2)/fc<1.00 \quad (5)$$

where f2 denotes a focal length of the second lens group, and fc denotes a focal length of the "c" lens group, wherein the first lens group includes a front portion lens group, and a rear portion lens group disposed to an image side of the front portion lens group with an air distance therebetween, and wherein focusing can be performed by shifting only the rear portion lens group of the first lens group in the optical axis direction.

16. A method of manufacturing a lens system comprising, in order from an object, an "a" lens group having positive refractive power, a "b" lens group having negative refractive power, and a "c" lens group having positive refractive power, an aperture stop being disposed between the "b" lens group and the "c" lens group, all or a part of the "b" lens group being shifted so as to have a component orthogonal to the optical axis, wherein the "b" lens group is fixed in an optical axis direction with respect to an image plane upon zooming from a wide angle end state to a telephoto end state, and wherein upon zooming from a wide angle end state to a telephoto end state, a distance between the "a" lens group and the "b" lens group varies and a distance between the "b" lens group and the "c" lens group varies, and the aperture stop is integrated with the "b" lens group, and further comprising a first lens group which is closest to the object and placed closer to the object than the "a", "b" and "c" lens groups, and is placed closest to the object among the lens groups of the lens system, the first lens group having positive refractive power, and a second lens group, which is the second lens group from the object side, has negative refractive power, and the following conditional expression is satisfied:

$$0.55<(-f2)/fc<1.00 \quad (5)$$

where f2 denotes a focal length of the second lens group, and fc denotes a focal length of the "c" lens group, wherein the first lens group includes a front portion lens group, and a rear portion lens group disposed to an image side of the front portion lens group with an air distance therebetween, wherein focusing can be performed by shifting only the rear portion lens group of the first lens group in the optical axis direction, the method comprising:

assembling each lens of the lens system in a lens barrel.

* * * * *